United States Patent
Beswick et al.

(10) Patent No.: US 12,459,974 B2
(45) Date of Patent: *Nov. 4, 2025

(54) BICYCLIC PEPTIDE LIGANDS SPECIFIC FOR NECTIN-4

(71) Applicant: BicycleTx Limited, Cambridge (GB)

(72) Inventors: Paul Beswick, Cambridge (GB); Liuhong Chen, Cambridge (GB); Gemma Elizabeth Mudd, Cambridge (GB); Peter Park, Lexington, MA (US); Katerine Van Rietschoten, Cambridge (GB); Michael Rigby, Saffron Walden (GB); Stephen Blakemore, Littleton, MA (US); Tara Gelb, Cambridge, MA (US); Nicholas Keen, Carlisle, MA (US)

(73) Assignee: BicycleTx Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/906,616

(22) Filed: Oct. 4, 2024

(65) Prior Publication Data

US 2025/0066421 A1 Feb. 27, 2025

Related U.S. Application Data

(63) Continuation of application No. 17/252,038, filed as application No. PCT/GB2019/051740 on Jun. 21, 2019.

(30) Foreign Application Priority Data

Jun. 22, 2018 (GB) .................................. 1810250
Sep. 26, 2018 (GB) .................................. 1815684
Nov. 13, 2018 (GB) .................................. 1818499
Apr. 2, 2019 (GB) .................................. 1904632

(51) Int. Cl.
| | |
|---|---|
| *C07K 7/08* | (2006.01) |
| *A61K 38/10* | (2006.01) |
| *A61K 47/55* | (2017.01) |
| *A61K 47/64* | (2017.01) |
| *A61K 47/65* | (2017.01) |
| *A61P 35/00* | (2006.01) |
| *A61K 31/40* | (2006.01) |
| *A61K 31/5375* | (2006.01) |
| *A61K 38/00* | (2006.01) |

(52) U.S. Cl.
CPC .............. *C07K 7/08* (2013.01); *A61K 38/10* (2013.01); *A61K 47/55* (2017.08); *A61K 47/64* (2017.08); *A61K 47/65* (2017.08); *A61P 35/00* (2018.01); *A61K 31/40* (2013.01); *A61K 31/5375* (2013.01); *A61K 38/00* (2013.01)

(58) Field of Classification Search
None
See application file for complete search history.

(56) References Cited

U.S. PATENT DOCUMENTS

| | | | |
|---|---|---|---|
| 2,642,514 | A | 6/1953 | Herkenhoff |
| 4,650,750 | A | 3/1987 | Giese |
| 4,709,016 | A | 11/1987 | Giese |
| 5,360,819 | A | 11/1994 | Giese |
| 5,516,931 | A | 5/1996 | Giese et al. |
| 5,595,756 | A | 1/1997 | Bally et al. |
| 5,602,273 | A | 2/1997 | Giese et al. |
| 5,604,104 | A | 2/1997 | Giese et al. |
| 5,610,020 | A | 3/1997 | Giese et al. |
| 5,650,270 | A | 7/1997 | Giese et al. |
| 6,326,144 | B1 | 12/2001 | Bawendi et al. |
| 6,468,808 | B1 | 10/2002 | Nie et al. |
| 6,552,065 | B2 | 4/2003 | Remiszewski et al. |
| 7,151,047 | B2 | 12/2006 | Chan et al. |
| 7,192,785 | B2 | 3/2007 | Nie et al. |
| 7,390,799 | B2 | 6/2008 | Bruncko et al. |
| 8,138,347 | B2 | 3/2012 | Knight et al. |
| 8,680,022 | B2 | 3/2014 | Gregory et al. |
| 8,685,890 | B2 | 4/2014 | Winter et al. |
| 8,778,844 | B2 | 7/2014 | Winter et al. |
| 8,906,682 | B2 | 12/2014 | June et al. |
| 8,986,655 | B2 | 3/2015 | Weiss et al. |
| 9,518,081 | B2 | 12/2016 | Winter et al. |
| 9,644,201 | B2 | 5/2017 | Winter et al. |
| 9,657,288 | B2 | 5/2017 | Winter et al. |
| 9,670,482 | B2 | 6/2017 | Winter et al. |
| 9,670,484 | B2 | 6/2017 | Winter et al. |
| 9,670,521 | B2 | 6/2017 | Grabstein et al. |
| 9,828,643 | B2 | 11/2017 | Rosenberg et al. |
| 9,868,767 | B2 | 1/2018 | Pei et al. |
| 9,932,367 | B2 | 4/2018 | Stace et al. |

(Continued)

FOREIGN PATENT DOCUMENTS

| | | |
|---|---|---|
| CN | 101497878 A | 8/2009 |
| CN | 105307686 A | 2/2016 |

(Continued)

OTHER PUBLICATIONS

Wang et al. ('Steric configuration-enabled selective antimicrobial activity of chiral cysteine' Biochemical and Biophysical Research Communications v512 2019 pp. 505-510) (Year: 2019).*

(Continued)

*Primary Examiner* — Ronald T Niebauer
(74) *Attorney, Agent, or Firm* — Wolf, Greenfield & Sacks, P.C.

(57) ABSTRACT

The present invention relates to polypeptides which are covalently bound to molecular scaffolds such that two or more peptide loops are subtended between attachment points to the scaffold. In particular, the invention describes peptides which are high affinity binders of Nectin-4. The invention also includes drug conjugates comprising said peptides, conjugated to one or more effector and/or functional groups, to pharmaceutical compositions comprising said peptide ligands and drug conjugates and to the use of said peptide ligands and drug conjugates in preventing, suppressing or treating a disease or disorder mediated by Nectin-4.

11 Claims, 49 Drawing Sheets

Specification includes a Sequence Listing.

(56) References Cited

U.S. PATENT DOCUMENTS

| | | |
|---|---|---|
| 9,994,617 B2 | 6/2018 | Tite et al. |
| 10,118,947 B2 | 11/2018 | Teufel et al. |
| 10,294,274 B2 | 5/2019 | Teufel et al. |
| 10,441,663 B2 | 10/2019 | Bennett et al. |
| 10,532,106 B2 | 1/2020 | Teufel et al. |
| 10,624,968 B2 | 4/2020 | Bennett et al. |
| 10,626,147 B2 | 4/2020 | Pei et al. |
| 10,792,368 B1 | 10/2020 | Teufel et al. |
| 10,800,813 B2 | 10/2020 | Tite et al. |
| 10,857,196 B2 | 12/2020 | Beswick et al. |
| 10,870,679 B2 | 12/2020 | Teufel et al. |
| 10,875,894 B2 | 12/2020 | Chen et al. |
| 10,894,808 B2 | 1/2021 | Teufel et al. |
| 10,899,798 B2 | 1/2021 | Bennett et al. |
| 10,919,937 B2 | 2/2021 | Beswick et al. |
| 10,994,019 B2 | 5/2021 | Teufel et al. |
| 11,103,591 B2 | 8/2021 | Teufel et al. |
| 11,180,531 B2 | 11/2021 | Beswick et al. |
| 11,208,697 B2 | 12/2021 | Davicioni et al. |
| 11,241,473 B2 | 2/2022 | Beswick et al. |
| 11,261,214 B2 | 3/2022 | Chen et al. |
| 11,306,123 B2 | 4/2022 | Mudd et al. |
| 11,312,749 B2 | 4/2022 | Mudd et al. |
| 11,332,500 B2 | 5/2022 | Mudd et al. |
| 11,396,530 B2 | 7/2022 | Beswick et al. |
| 11,414,488 B2 | 8/2022 | Bennett et al. |
| 11,433,137 B2 | 9/2022 | Bennett et al. |
| 11,453,702 B2 | 9/2022 | Beswick et al. |
| 11,453,703 B2 | 9/2022 | Keen et al. |
| 11,484,602 B2 | 11/2022 | Chen et al. |
| 11,542,304 B2 | 1/2023 | Chen et al. |
| 11,613,560 B2 | 3/2023 | Stephen et al. |
| 11,623,012 B2 | 4/2023 | Chen et al. |
| 11,672,868 B2 | 6/2023 | Teufel et al. |
| 11,696,956 B2 | 7/2023 | Chen et al. |
| 11,730,819 B2 | 8/2023 | Teufel et al. |
| 11,746,126 B2 | 9/2023 | Bennett et al. |
| 11,814,447 B2 | 11/2023 | Teufel et al. |
| 11,833,211 B2 | 12/2023 | Chen et al. |
| 11,851,715 B2 | 12/2023 | Mayhew et al. |
| 11,912,792 B2 | 2/2024 | Beswick et al. |
| 11,946,041 B2 | 4/2024 | Chen et al. |
| 11,970,553 B2 | 4/2024 | Mudd et al. |
| 12,049,520 B2 | 7/2024 | Chen et al. |
| 2002/0164788 A1 | 11/2002 | Ellis et al. |
| 2005/0169931 A1 | 8/2005 | Kinch et al. |
| 2009/0222937 A1 | 9/2009 | Arnould et al. |
| 2009/0304721 A1 | 12/2009 | Kinch et al. |
| 2012/0101253 A1 | 4/2012 | Heinis et al. |
| 2012/0172235 A1 | 7/2012 | Winter et al. |
| 2013/0064791 A1 | 3/2013 | Poelstra et al. |
| 2013/0072598 A1 | 3/2013 | Yang et al. |
| 2014/0163201 A1 | 6/2014 | Winter et al. |
| 2014/0249292 A1 | 9/2014 | Tite et al. |
| 2014/0256596 A1 | 9/2014 | Tite et al. |
| 2014/0274759 A1 | 9/2014 | Walker et al. |
| 2015/0038434 A1 | 2/2015 | Yang et al. |
| 2015/0087810 A1 | 3/2015 | Moore et al. |
| 2016/0031939 A1 | 2/2016 | Stace et al. |
| 2016/0046721 A1 | 2/2016 | Qian et al. |
| 2016/0122430 A1 | 5/2016 | Gish et al. |
| 2016/0256579 A1 | 9/2016 | Shalom |
| 2016/0326232 A1 | 11/2016 | Rosa et al. |
| 2017/0067045 A1 | 3/2017 | Winter et al. |
| 2017/0190743 A1 | 7/2017 | Pei et al. |
| 2017/0204150 A1 | 7/2017 | Liu et al. |
| 2017/0304342 A1 | 10/2017 | Cox et al. |
| 2017/0306032 A1 | 10/2017 | Gehlsen |
| 2017/0360952 A1 | 12/2017 | Schwartz et al. |
| 2018/0135132 A1 | 5/2018 | Rosenberg et al. |
| 2018/0169254 A1 | 6/2018 | Bennett et al. |
| 2018/0200378 A1 | 7/2018 | Bennett et al. |
| 2018/0280525 A1 | 10/2018 | Teufel et al. |
| 2018/0311300 A1 | 11/2018 | Beswick et al. |
| 2018/0318451 A1 | 11/2018 | Skerra et al. |
| 2018/0362585 A1 | 12/2018 | Teufel et al. |
| 2018/0371020 A1 | 12/2018 | Bennett et al. |
| 2019/0134213 A1 | 5/2019 | Teufel et al. |
| 2019/0184025 A1 | 6/2019 | Chen et al. |
| 2019/0263866 A1 | 8/2019 | Chen et al. |
| 2019/0307836 A1 | 10/2019 | Keen et al. |
| 2019/0389906 A1 | 12/2019 | Beswick et al. |
| 2019/0389907 A1 | 12/2019 | Teufel et al. |
| 2020/0129630 A1 | 4/2020 | Koehler et al. |
| 2020/0131228 A1 | 4/2020 | Beswick et al. |
| 2020/0171161 A1 | 6/2020 | Teufel et al. |
| 2020/0190213 A1 | 6/2020 | Preyer et al. |
| 2020/0215199 A1 | 7/2020 | Bennett et al. |
| 2020/0255477 A1 | 8/2020 | Chen et al. |
| 2020/0283482 A1 | 9/2020 | Keen et al. |
| 2020/0289657 A1 | 9/2020 | Teufel et al. |
| 2020/0291096 A1 | 9/2020 | Keen et al. |
| 2020/0316209 A1 | 10/2020 | Teufel et al. |
| 2020/0338203 A1 | 10/2020 | Chen et al. |
| 2020/0354406 A1 | 11/2020 | Stephen et al. |
| 2020/0354456 A1 | 11/2020 | Bennett et al. |
| 2020/0407709 A1 | 12/2020 | Chen et al. |
| 2021/0040154 A1 | 2/2021 | Mudd et al. |
| 2021/0046145 A1 | 2/2021 | Beswick et al. |
| 2021/0069287 A1 | 3/2021 | Mudd et al. |
| 2021/0079045 A1 | 3/2021 | Bennett et al. |
| 2021/0101932 A1 | 4/2021 | Chen et al. |
| 2021/0101933 A1 | 4/2021 | Chen et al. |
| 2021/0101937 A1 | 4/2021 | Mudd et al. |
| 2021/0122785 A1 | 4/2021 | Teufel et al. |
| 2021/0122804 A1 | 4/2021 | Teufel et al. |
| 2021/0147484 A1 | 5/2021 | Beswick et al. |
| 2021/0147485 A1 | 5/2021 | Teufel et al. |
| 2021/0261620 A1 | 8/2021 | Teufel et al. |
| 2021/0269480 A1 | 9/2021 | Beswick et al. |
| 2021/0299210 A2 | 9/2021 | Keen et al. |
| 2022/0023432 A1 | 1/2022 | Teufel et al. |
| 2022/0024982 A1 | 1/2022 | Chen et al. |
| 2022/0031858 A1 | 2/2022 | Mcdonnell et al. |
| 2022/0054646 A1 | 2/2022 | Chen et al. |
| 2022/0064218 A1 | 3/2022 | Baldassarre et al. |
| 2022/0064221 A1 | 3/2022 | Lani et al. |
| 2022/0072140 A1 | 3/2022 | Stace et al. |
| 2022/0088118 A1 | 3/2022 | Baldassarre et al. |
| 2022/0088207 A1 | 3/2022 | Chen et al. |
| 2022/0089643 A1 | 3/2022 | Beswick et al. |
| 2022/0119488 A1 | 4/2022 | Lani et al. |
| 2022/0133732 A1 | 5/2022 | Baldassarre et al. |
| 2022/0133733 A1 | 5/2022 | Baldassarre et al. |
| 2022/0135614 A1 | 5/2022 | Teufel |
| 2022/0184222 A1 | 6/2022 | Bennett et al. |
| 2022/0194983 A1 | 6/2022 | Teufel et al. |
| 2022/0213145 A1 | 7/2022 | Chen et al. |
| 2022/0227811 A1 | 7/2022 | Mudd et al. |
| 2022/0242911 A1 | 8/2022 | Mudd et al. |
| 2022/0257784 A1 | 8/2022 | Upadhyaya et al. |
| 2022/0275053 A1 | 9/2022 | Upadhyaya et al. |
| 2022/0281918 A1 | 9/2022 | Van Rietschoten et al. |
| 2022/0289792 A1 | 9/2022 | Chen et al. |
| 2022/0306689 A9 | 9/2022 | Chen et al. |
| 2022/0306694 A1 | 9/2022 | Mudd et al. |
| 2022/0325352 A1 | 10/2022 | Davicioni et al. |
| 2022/0362390 A1 | 11/2022 | Stace et al. |
| 2022/0387611 A1 | 12/2022 | Bennett et al. |
| 2023/0002596 A1 | 1/2023 | Zhang et al. |
| 2023/0008076 A1 | 1/2023 | Keen et al. |
| 2023/0025916 A1 | 1/2023 | Bennett et al. |
| 2023/0025971 A1 | 1/2023 | Bennett et al. |
| 2023/0086865 A1 | 3/2023 | Balmford et al. |
| 2023/0106511 A1 | 4/2023 | Balmforth et al. |
| 2023/0129258 A1 | 4/2023 | Upadhyaya et al. |
| 2023/0144799 A1 | 5/2023 | Chen et al. |
| 2023/0165966 A1 | 6/2023 | Koehler et al. |
| 2023/0181749 A1 | 6/2023 | Dickson et al. |
| 2023/0220008 A1 | 7/2023 | Chen et al. |
| 2023/0233698 A1 | 7/2023 | Bennett et al. |
| 2023/0236203 A1 | 7/2023 | Menon et al. |
| 2023/0265522 A1 | 8/2023 | Reiche et al. |
| 2023/0287047 A1 | 9/2023 | Beswick et al. |

(56) References Cited

U.S. PATENT DOCUMENTS

| | | |
|---|---|---|
| 2023/0314441 A1 | 10/2023 | Weyergang et al. |
| 2023/0340020 A1 | 10/2023 | Teufel et al. |
| 2024/0000957 A1 | 1/2024 | Chen et al. |
| 2024/0060141 A1 | 2/2024 | Velculescu et al. |
| 2024/0082410 A1 | 3/2024 | Teufel et al. |
| 2024/0108738 A1 | 4/2024 | Keen et al. |
| 2024/0148917 A1 | 5/2024 | Karlström et al. |
| 2024/0158444 A1 | 5/2024 | Bennett et al. |
| 2024/0173422 A1 | 5/2024 | Beswick et al. |
| 2024/0189436 A1 | 6/2024 | Chen et al. |
| 2024/0197897 A1 | 6/2024 | Keen et al. |
| 2024/0240255 A1 | 7/2024 | Blakemore et al. |
| 2024/0325554 A1 | 10/2024 | Keen et al. |
| 2024/0336656 A1 | 10/2024 | Mudd et al. |
| 2024/0400616 A1 | 12/2024 | Beswick et al. |
| 2025/0002536 A1 | 1/2025 | Blakemore et al. |
| 2025/0051392 A1 | 2/2025 | Blakemore et al. |

FOREIGN PATENT DOCUMENTS

| | | | |
|---|---|---|---|
| EP | 2393520 A1 | 12/2011 | |
| EP | 2970954 A1 | 1/2016 | |
| EP | 3192802 A1 | 7/2017 | |
| EP | 3754030 A1 | 12/2020 | |
| FR | 2932189 A1 | 12/2009 | |
| GB | 1239978 A | 7/1971 | |
| JP | 2006514104 A | 4/2006 | |
| JP | 2011513298 A | 4/2011 | |
| JP | 2011522794 A | 8/2011 | |
| JP | 2013518807 A | 5/2013 | |
| JP | 2016527180 A | 9/2016 | |
| JP | 2018502825 A | 2/2018 | |
| WO | WO 1997/008320 A1 | 3/1997 | |
| WO | WO 1998/019705 A1 | 5/1998 | |
| WO | WO 2001/042246 A2 | 6/2001 | |
| WO | WO 2002/088112 A1 | 11/2002 | |
| WO | WO 2003/063794 A2 | 8/2003 | |
| WO | WO 2004/005348 A1 | 1/2004 | |
| WO | WO 2004/019973 A1 | 3/2004 | |
| WO | WO 2004/077062 A2 | 9/2004 | |
| WO | WO 2004/089925 A1 | 10/2004 | |
| WO | WO 2004/106328 A1 | 12/2004 | |
| WO | WO 2005/007623 A2 | 1/2005 | |
| WO | WO 2005/103083 A2 | 11/2005 | |
| WO | WO 2005/113554 A2 | 12/2005 | |
| WO | WO 2006/029879 A2 | 3/2006 | |
| WO | WO 2006/078161 A1 | 7/2006 | |
| WO | WO 2006/078846 A1 | 7/2006 | |
| WO | WO 2006/101187 A1 | 9/2006 | |
| WO | WO 2006/105021 A2 | 10/2006 | |
| WO | WO 2006/122806 A2 | 11/2006 | |
| WO | WO 2007/005874 A2 | 1/2007 | |
| WO | WO 2007/016176 A2 | 2/2007 | |
| WO | WO 2007/044729 A2 | 4/2007 | |
| WO | WO 2007/053452 A1 | 5/2007 | |
| WO | WO 2007/070514 A1 | 6/2007 | |
| WO | WO 2007/084786 A1 | 7/2007 | |
| WO | WO 2007/129161 A2 | 11/2007 | |
| WO | WO 2008/033561 A2 | 3/2008 | |
| WO | WO 2008/039218 A2 | 4/2008 | |
| WO | WO 2008/089627 A1 | 7/2008 | |
| WO | WO 2008/109943 A1 | 9/2008 | |
| WO | WO 2008/118802 A1 | 10/2008 | |
| WO | WO 2008/132601 A1 | 11/2008 | |
| WO | WO 2008/134761 A2 | 11/2008 | |
| WO | WO 2008/157490 A1 | 12/2008 | |
| WO | WO 2009/009116 A2 | 1/2009 | |
| WO | WO 2009/044273 A2 | 4/2009 | |
| WO | WO 2009/073620 A2 | 6/2009 | |
| WO | WO 2009/097397 A2 | 8/2009 | |
| WO | WO 2009/098450 A2 | 8/2009 | |
| WO | WO 2009/114512 A1 | 9/2009 | |
| WO | WO 2010/017369 A2 | 2/2010 | |
| WO | WO 2010/019570 A2 | 2/2010 | |
| WO | WO 2010/077634 A1 | 7/2010 | |
| WO | WO 2010/089117 A1 | 8/2010 | |
| WO | WO 2011/018227 A2 | 2/2011 | |
| WO | WO 2011/028683 A1 | 3/2011 | |
| WO | WO 2011/056652 A1 | 5/2011 | |
| WO | WO 2011/070024 A1 | 6/2011 | |
| WO | WO 2011/079015 A1 | 6/2011 | |
| WO | WO 2011/090760 A1 | 7/2011 | |
| WO | WO 2011/107553 A1 | 9/2011 | |
| WO | WO 2011/109400 A2 | 9/2011 | |
| WO | WO 2011/131407 A1 | 10/2011 | |
| WO | WO 2011/140249 A2 | 11/2011 | |
| WO | WO 2012/032433 A1 | 3/2012 | |
| WO | WO 2012/057624 A1 | 5/2012 | |
| WO | WO 2012/142237 A1 | 10/2012 | |
| WO | WO 2012/145493 A1 | 10/2012 | |
| WO | WO 2012/159030 A1 | 11/2012 | |
| WO | WO 2013/050615 A1 | 4/2013 | |
| WO | WO 2013/050616 A1 | 4/2013 | |
| WO | WO 2013/050617 A1 | 4/2013 | |
| WO | WO 2013/079174 A1 | 6/2013 | |
| WO | WO 2013/087699 A1 | 6/2013 | |
| WO | WO 2013/119716 A1 | 8/2013 | |
| WO | WO 2013/132044 A1 | 9/2013 | |
| WO | WO 2013/169264 A1 | 11/2013 | |
| WO | WO 2014/008218 A1 | 1/2014 | |
| WO | WO 2014/036357 A1 | 3/2014 | |
| WO | WO 2014/044872 A1 | 3/2014 | |
| WO | WO 2014/063012 A1 | 4/2014 | |
| WO | WO 2014/164693 A2 | 10/2014 | |
| WO | WO 2014/167122 A1 | 10/2014 | |
| WO | WO 2014/190257 A2 | 11/2014 | |
| WO | WO 2015/013330 A2 | 1/2015 | |
| WO | WO 2015/116904 A1 | 8/2015 | |
| WO | WO 2015/171938 A1 | 11/2015 | |
| WO | WO 2015/179691 A2 | 11/2015 | |
| WO | WO 2016/046574 A1 | 3/2016 | |
| WO | WO 2016/050361 A1 | 4/2016 | |
| WO | WO-2016067035 A1 * | 5/2016 | ........... A61K 31/195 |
| WO | WO 2016/171242 A1 | 10/2016 | |
| WO | WO 2016/171272 A1 | 10/2016 | |
| WO | WO 2016/174103 A1 | 11/2016 | |
| WO | WO 2017/004243 A1 | 1/2017 | |
| WO | WO 2017/019918 A1 | 2/2017 | |
| WO | WO 2017/046658 A1 | 3/2017 | |
| WO | WO 2017/062989 A1 | 4/2017 | |
| WO | WO 2017/102906 A1 | 6/2017 | |
| WO | WO 2017/161069 A1 | 9/2017 | |
| WO | WO 2017/173408 A1 | 10/2017 | |
| WO | WO 2017/182672 A1 | 10/2017 | |
| WO | WO 2017/191460 A1 | 11/2017 | |
| WO | WO 2017/205738 A1 | 11/2017 | |
| WO | WO 2018/048354 A1 | 3/2018 | |
| WO | WO 2018/064229 A1 | 4/2018 | |
| WO | WO 2018/096365 A1 | 5/2018 | |
| WO | WO 2018/115203 A1 | 6/2018 | |
| WO | WO 2018/115204 A1 | 6/2018 | |
| WO | WO 2018/127699 A1 | 7/2018 | |
| WO | WO 2018/144854 A1 | 8/2018 | |
| WO | WO 2018/156740 A1 | 8/2018 | |
| WO | WO 2018/197509 A1 | 11/2018 | |
| WO | WO 2018/197893 A1 | 11/2018 | |
| WO | WO 2018/222987 A1 | 12/2018 | |
| WO | WO 2018/226578 A1 | 12/2018 | |
| WO | WO 2019/002842 A1 | 1/2019 | |
| WO | WO 2019/025811 A1 | 2/2019 | |
| WO | WO 2019/034866 A1 | 2/2019 | |
| WO | WO 2019/034868 A1 | 2/2019 | |
| WO | WO 2019/084060 A1 | 5/2019 | |
| WO | WO 2019/094395 A2 | 5/2019 | |
| WO | WO 2019/122860 A1 | 6/2019 | |
| WO | WO 2019/122861 A1 | 6/2019 | |
| WO | WO 2019/122863 A1 | 6/2019 | |
| WO | WO 2019/136442 A1 | 7/2019 | |
| WO | WO 2019/157345 A1 | 8/2019 | |
| WO | WO 2019/162682 A1 | 8/2019 | |
| WO | WO 2019/193328 A1 | 10/2019 | |
| WO | WO 2019/226617 A1 | 11/2019 | |
| WO | WO 2019/243313 A1 | 12/2019 | |
| WO | WO 2019/243329 A1 | 12/2019 | |

(56) References Cited

FOREIGN PATENT DOCUMENTS

| | | |
|---|---|---|
| WO | WO 2019/243353 A1 | 12/2019 |
| WO | WO 2019/243455 A1 | 12/2019 |
| WO | WO 2019/243832 A1 | 12/2019 |
| WO | WO 2019/243833 A1 | 12/2019 |
| WO | WO 2020/081549 A1 | 4/2020 |
| WO | WO 2020/084305 A1 | 4/2020 |
| WO | WO 2020/089627 A1 | 5/2020 |
| WO | WO 2020/120980 A1 | 6/2020 |
| WO | WO 2020/120981 A1 | 6/2020 |
| WO | WO 2020/120983 A1 | 6/2020 |
| WO | WO 2020/120984 A1 | 6/2020 |
| WO | WO 2020/128526 A1 | 6/2020 |
| WO | WO 2020/128527 A1 | 6/2020 |
| WO | WO 2020/148525 A1 | 7/2020 |
| WO | WO 2020/148526 A1 | 7/2020 |
| WO | WO 2020/148527 A1 | 7/2020 |
| WO | WO 2020/148528 A1 | 7/2020 |
| WO | WO 2020/148529 A1 | 7/2020 |
| WO | WO 2020/148530 A1 | 7/2020 |
| WO | WO 2020/165600 A1 | 8/2020 |
| WO | WO 2020/178574 A1 | 9/2020 |
| WO | WO 2020/201753 A1 | 10/2020 |
| WO | WO 2020/205626 A1 | 10/2020 |
| WO | WO 2020/225577 A1 | 11/2020 |
| WO | WO 2020/229803 A1 | 11/2020 |
| WO | WO 2020/243568 A1 | 12/2020 |
| WO | WO 2020/243570 A1 | 12/2020 |
| WO | WO 2021/019243 A1 | 2/2021 |
| WO | WO 2021/019244 A1 | 2/2021 |
| WO | WO 2021/019245 A1 | 2/2021 |
| WO | WO 2021/019246 A1 | 2/2021 |
| WO | WO 2021/028686 A1 | 2/2021 |
| WO | WO 2021/038232 A1 | 3/2021 |
| WO | WO 2021/064428 A1 | 4/2021 |
| WO | WO 2021/074622 A1 | 4/2021 |
| WO | WO 2021/074647 A1 | 4/2021 |
| WO | WO 2021/092221 A1 | 5/2021 |
| WO | WO 2021/105694 A1 | 6/2021 |
| WO | WO 2021/148974 A1 | 7/2021 |
| WO | WO 2021/171028 A1 | 9/2021 |
| WO | WO 2021/171029 A1 | 9/2021 |
| WO | WO 2021/234391 A1 | 11/2021 |
| WO | WO 2021/250418 A1 | 12/2021 |
| WO | WO 2021/252595 A1 | 12/2021 |
| WO | WO 2022/029420 A1 | 2/2022 |
| WO | WO 2022/038158 A1 | 2/2022 |
| WO | WO 2022/148969 A1 | 7/2022 |
| WO | WO 2022/148974 A2 | 7/2022 |
| WO | WO 2022/148975 A1 | 7/2022 |
| WO | WO 2022/148979 A1 | 7/2022 |
| WO | WO 2023/031623 A2 | 3/2023 |
| WO | WO 2023/089308 A1 | 5/2023 |

OTHER PUBLICATIONS

"Bicycle Therapeutics Investor Presentation", Retrieved from: https://investors.bicycletherapeutics.com/static-files/f456c054-95c8-4e19-a62a-fcf5feb0650b, Aug. 2024, 61 pages.

U.S. Appl. No. 19/025,596, Daniel, filed on Jan. 16, 2025.

Battula et al., "Abstract 4613: A novel fully synthetic dual targeted EphA2/CD137 Bicycle® peptide induces tumor localized CD137 agonism", American Association of Cancer Research, Jun. 22, 2020, 1 page.

Battula et al., "Abstract P794: A novel fully synthetic dual targeted EphA2/4-1BB Bicycle® peptide induces tumor localized 4-1BB agonism", SITC, Nov. 9, 2019, 1 page.

Bendell et al., "TPS3655: BT5528-100 Phase I/II Study; Safety, Pharmacokinetics & Preliminary Clinical Activity of BT5528 in Patients with Advanced Malignancies Associated with EphA2 Expression", ASCO, May 29, 2020, 1 page.

Bennett et al., "Abstract 5854: BT5528, a Bicycle Toxin Conjugate (BTC) targeting EphA2 has potent antitumour activity without bleeding or coagulation abnormalities in animal models", American Association of Cancer Research, Apr. 14, 2018, 1 page.

Bennett et al., "Abstract 5855: Bicycle Toxin Conjugates (BTCs) targeting EphA2 for the treatment of solid tumours: Discovery and selection of BT5528", American Association of Cancer Research, Apr. 14, 2018, 1 page.

Bennett et al., "Abstract C066: BT5528, a Bicycle Toxin Conjugate targeting EphA2: mechanism of action and clinical translation", AACR-NCI-EORTC, Oct. 29, 2019, 1 page.

Bennett, "Abstract 4481: BT5528, an EphA2-targeting Bicycle® Toxin Conjugate (BTC): Profound efficacy without bleeding and coagulation abnormalities in animal models", AACR Annual Meeting, Apr. 4, 2019, 11 pages.

U.S. Appl. No. 18/424,386, filed Jan. 26, 2024, Mudd et al.

U.S. Appl. No. 18/427,414, filed Jan. 30, 2024, Beswick et al.

U.S. Appl. No. 18/742,691, filed Jun. 13, 2024, Chen.

[No Author Listed], Bicycle Conjugates. Retrieved from https://web.archive.org/web/20210104063050/https://www.bicycletherapeutics.com/programs, 2021. 4 pages.

[No Author Listed], Bicycle Therapeutics to Present New Translational Research for BT5528 and Preclinical Data for Tumor-targeted Immune Cell Agonists at the AACR Virtual Annual Meeting II. Business Wire. May 15, 2020. Retrieved from: https://www.businesswire.com/news/home/20200515005111/en/Bicycle-Therapeutics-to-Present-New-Translational-Research-for-BT5528-and-Preclinical-Data-for-Tumor-targeted-Immune-Cell-Agonists-at-the-AACR-Virtual-Annual-Meeting-II.

[No Author Listed], ClinicalTrials.gov, Identifier NCT02426892, Nivolumab and HPV-16 Vaccination in Patients with HPV-16 Positive Incurable Solid Tumors. Retrieved from: https://clinicaltrials.gov/ct2/show/study/NCT02426892. Last updated Apr. 18, 2023. 8 pages.

[No Author Listed], ClinicalTrials.gov, Identifier NCT02488759, An Investigational Immuno-therapy Study to Investigate the Safety and Effectiveness of Nivolumab, and Nivolumab Combination Therapy in Virus-associated Tumors (CheckMate358). Retrieved from: https://clinicaltrials.gov/ct2/show/study/NCT02488759. Last updated Nov. 13, 2023. 7 pages.

[No Author Listed], Constrained Peptides Unconstrained Thinking: Forward-Looking Statements. Retrieved from https://investors.bicycletherapeutics.com/static-files/5f7f462f-2417-439d-b829-d723b3fd65f7, Aug. 2019. 26 pages.

[No Author Listed], Soft tissue sarcomas. Cancer Research UK. Retrieved from: https://www.cancerresearchuk.org/about-cancer/soft-tissue-sarcoma. Sep. 2022.

[No Author Listed], Solid Tumors. GenPath Oncology. Retrieved from: https://genpathdiagnostics.com/patients/oncology/solid-tumors/. Jun. 30, 2023. 4 pages.

[No Author Listed], Triple Negative Breast Cancer. Cancer Research UK. Retrieved from: https://www.cancerresearchuk.org/about-cancer/breast-cancer/types/triple-negative-breast-cancer. Sep. 2022. 6 pages.

[No Author Listed], Your mouth and cancer drugs. Cancer Research UK. Retrieved from: https://www.cancerresearchuk.org/about-cancer/treatment/cancer-drugs/side-effects/your-mouth, Sep. 2022. 5 pages.

[No Author Listed], CAS No. 18226-42-1, "1,3,5-Tris(bromomethyl)benzene", Chemical Book, Retrieved from: https://www.chemicalbook.com/ProductChemicalPropertiesCB0500I71_EN.htm, 2023, 2 pages.

[No Author Listed], GenBank Accession No. CZR33441.1, uncharacterized protein FPRO_01747 [Fusarium proliferatum ET1], National Center for Biotechnology Information, Retrieved from: https://www.ncbi.nlm.nih.gov/protein/1111492376, Dec. 6, 2016, 1 page.

Adams et al., Big opportunities for small molecules in immuno-oncology. Nat Rev Drug Discov. Sep. 2015;14(9):603-22. doi: 10.1038/nrd4596. Epub Jul. 31, 2015.

Adams R., Molecular control of arterial-venous blood vessel identity. J Anat. Jan. 2003;202(1):105-12. doi: 10.1046/j.1469-7580.2003.00137.x.

Adley et al., Expression of membrane type 1 matrix metalloproteinase (MMP-14) in epithelial ovarian cancer: high level expression in clear cell carcinoma. Gynecol Oncol. Feb. 2009;112(2):319-24. doi: 10.1016/j.ygyno.2008.09.025. Epub Oct. 30, 2008.

(56) References Cited

OTHER PUBLICATIONS

Akanuma et al., MicroRNA-133a regulates the mRNAs of two invadopodia-related proteins, FSCN1 and MMP14, in esophageal cancer. Br J Cancer. Jan. 7, 2014;110(1):189-98. doi: 10.1038/bjc.2013.676. Epub Nov. 5, 2013.

Angelini et al., Bicyclic peptide inhibitor reveals large contact interface with a protease target. ACS Chem Biol. May 18, 2012;7(5):817-21. doi: 10.1021/cb200478t. Epub Feb. 15, 2012.

Annunziata et al., Phase 1, open-label study of MEDI-547 in patients with relapsed or refractory solid tumors. Invest New Drugs. Feb. 2013;31(1):77-84. doi: 10.1007/s10637-012-9801-2. Epub Feb. 28, 2012.

Anthony et al., Recapitulation of IVIG anti-inflammatory activity with a recombinant IgG Fc. Science. Apr. 18, 2008;320(5874):373-6. doi: 10.1126/science.1154315.

Arkadash et al., Development of High Affinity and High Specificity Inhibitors of Matrix Metalloproteinase 14 through Computational Design and Directed Evolution. J Biol Chem. Feb. 24, 2017;292(8):3481-3495. doi: 10.1074/jbc.M116.756718. Epub Jan. 13, 2017.

Arnon et al., The mechanisms controlling the recognition of tumor- and virus-infected cells by NKp46. Blood. Jan. 15, 2004;103(2):664-72. doi: 10.1182/blood-2003-05-1716. Epub Sep. 22, 2003.

Arnould et al., Trastuzumab-based treatment of HER2-positive breast cancer: an antibody-dependent cellular cytotoxicity mechanism? Br J Cancer. Jan. 30, 2006;94(2):259-67. doi: 10.1038/sj.bjc.6602930.

Askoxylakis et al., A new peptide ligand for targeting human carbonic anhydrase IX, identified through the phage display technology. PLoS One. Dec. 31, 2010;5(12):e15962. doi: 10.1371/journal.pone.0015962.

Augoff et al., Upregulated expression and activation of membrane-associated proteases in esophageal squamous cell carcinoma. Oncol Rep. Jun. 2014;31(6):2820-6. doi: 10.3892/or.2014.3162. Epub Apr. 29, 2014.

Ausiello et al., Functional topography of discrete domains of human CD38. Tissue Antigens. Dec. 2000;56(6):539-47. doi: 10.1034/j.1399-0039.2000.560608.x.

Bader et al, Abstract 3088: Breaking from the paradigm of antibody-drug conjugates: Evaluation of clinical pharmacokinetics and safety of Bicycle Toxin Conjugates® (BTCs). Presented at ASCO 2024 Annual Meeting, May 31-Jun. 4, 2024. Retrieved from: https://www.bicycletherapeutics.com/wp-content/uploads/2024/05/ASCO_BTC-PK-Safety-Poster_BTx-Author-Approval_17May2024-FINAL.pdf. 1 page.

Baek et al. Effects of Histidine and Sucrose on the Biophysical Properties of a Monoclonal Antibody. Pharm Res. Mar. 2017;34(3):629-639. doi: 10.1007/s11095-016-2092-0. Epub Dec. 29, 2016.

Baldini et al., Abstract 498: BT8009-100: A Phase I/II Study of Novel Bicyclic Peptide and MMAE Conjugate BT8009 in Patients (pts) with Advanced Malignancies Associated with Nectin-4 Expression, Including Urothelial Cancer (UC). Presented at ASCO Genitourinary (GU) Cancers Symposium Conference. Feb. 17, 2023. Retrieved from: https://www.bicycletherapeutics.com/wp-content/uploads/2023/05/Baldini_BT8009-100_DoseEsc_ASCOGU_2023.pdf. 1 page.

Bambury et al., DNA copy number analysis of metastatic urothelial carcinoma with comparison to primary tumors. BMC Cancer. Apr. 9, 2015;15:242. doi: 10.1186/s12885-015-1192-2.

Banerji et al., A Cancer Research UK phase I/IIa trial of BT1718 (a first in class Bicycle Drug Conjugate) given intravenously in patients with advanced solid tumours. ASCO. Jun. 5, 2018. 1 page.

Banerji et al., A Cancer Research UK phase I/IIa trial of BT1718 (a first in class Bicycle Drug Conjugate) given intravenously in patients with advanced solid tumours. NCRI. Oct. 1, 2018. 1 page.

Banerji et al., Preliminary pharmacokinetic assessment of BT1718: A phase I/IIa trial of BT1718 (a first in class Bicycle Toxin Conjugate) in patients with advanced solid tumours. Euro J Cancer. 2018;103:E65. 1 page.

Barbas III et al., Semisynthetic combinatorial antibody libraries: a chemical solution to the diversity problem. Proc Natl Acad Sci U S A. May 15, 1992;89(10):4457-61. doi: 10.1073/pnas.89.10.4457.

Barbolina et al., Microenvironmental regulation of membrane type 1 matrix metalloproteinase activity in ovarian carcinoma cells via collagen-induced EGR1 expression. J Biol Chem. Feb. 16, 2007;282(7):4924-4931. doi: 10.1074/jbc.M608428200. Epub Dec. 11, 2006.

Bardia et al., Efficacy and Safety of Anti-Trop-2 Antibody Drug Conjugate Sacituzumab Govitecan (IMMU-132) in Heavily Pretreated Patients With Metastatic Triple-Negative Breast Cancer. J Clin Oncol. Jul. 1, 2017;35(19):2141-2148. doi: 10.1200/JCO.2016.70.8297. Epub Mar. 14, 2017.

Battula et al., Abstract 4613: A novel fully synthetic dual targeted EphA2/CD137 Bicycle® peptide induces tumor localized CD137 agonism. AACR Jun. 22, 2020. Retrieved from: https://www.bicycletherapeutics.com/wp-content/uploads/2022/07/2020_AACR_EphA2-CD137-poster_6703_FINAL_CD137-in-title.pdf. 1 page.

Battula et al., Abstract P794: A novel fully synthetic dual targeted EphA2/4-1BB Bicycle® peptide induces tumor localized 4-1BB agonism. SITC Nov. 9, 2019. Retrieved from: https://www.bicycletherapeutics.com/wp-content/uploads/2022/07/2019_SITC_EphA2-CD137-poster-P794_final.pdf. 1 page.

Bech et al., Chemical Strategies for Half-Life Extension of Biopharmaceuticals: Lipidation and Its Alternatives. ACS Med Chem Lett. Jun. 15, 2018;9(7):577-580. doi: 10.1021/acsmedchemlett.8b00226.

Bendell et al., TPS3655: BT5528-100 Phase I/II Study; Safety, Pharmacokinetics & Preliminary Clinical Activity of BT5528 in Patients with Advanced Malignancies Associated with EphA2 Expression (ASCO 2020). May 29, 2020. Retrieved from: https://www.bicycletherapeutics.com/wp-content/uploads/2022/07/2020_ASCO_Poster_Bendell-Bicycle_v12May2020-002.pdf. 1 page.

Bennett, Bicycle Conjugates to Target Solid Tumors. Next Generation Conjugates Summit, Feb. 27, 2023. 23 pages.

Bennett, BT5528: A Bicycle Toxin Conjugate Targeting EphA2 for the Treatment of Solid Tumours. 9th Annual World ADC Conference, Mar. 6, 2019.13 pages.

Bennett et al., Abstract 1167/2: Development of BT1718, a novel Bicycle Drug Conjugate for the treatment of lung cancer. American Association of Cancer Research, Apr. 1, 2017. 1 page.

Bennett et al., Abstract 164: BT5528, an EphA2-targeting Bicycle Toxin Conjugate (BTC): profound efficacy without bleeding and coagulation abnormalities in animal models. EORTC. Nov. 13, 2018. 1 page.

Bennett et al., Abstract 4481: BT5528, an EphA2-targeting Bicycle Toxin Conjugate (BTC): Profound efficacy without bleeding and coagulation abnormalities in animal models. Cancer Res. Jul. 2019;79(13 suppl):4481. doi: 10.1158/1538-7445.AM2019-4481. 2 pages.

Bennett et al., Abstract 4481: BT5528, an EphA2-targeting Bicycle Toxin Conjugate (BTC): Profound efficacy without bleeding and coagulation abnormalities in animal models. AACR Annual Meeting, Apr. 4, 2019. 11 pages.

Bennett et al., Abstract 5854: BT5528, a Bicycle Toxin Conjugate targeting EphA2 has potent anti-tumor activity without bleeding or coagulation abnormalities in animal models. American Association of Cancer Research. Apr. 14, 2018, 1 page.

Bennett et al., Abstract 5855: Bicycle Drug Conjugates Targeting EphA2 for the Treatment of Solid Tumors: Discovery and Selection of BT5528. Cancer Research. 2018;78(13 suppl):5855. doi: 10.1158/1538-7445.AM2018-5855. 1 page.

Bennett et al., Abstract C066: BT5528, a Bicycle Toxin Conjugate targeting EphA2: mechanism of action and clinical translation. Presented at the AACR-NCI-EORTC. Oct. 29, 2019. Retrieved from: https://www.bicycletherapeutics.com/wp-content/uploads/2022/07/BT5528-Triple-Meeting-poster-2019-vF.pdf. 1 page.

Bennett et al., Development of BT1718, a Bicycle Drug Conjugate® (BDC) targeting MT1-MMP for treatment of solid tumours. Eur J Cancer. Dec. 2016;69(suppl 1):S21. doi: 10.1016/S0959-8049(16)32642-9.

Bennett et al., MMAE Delivery Using the Bicycle Toxin Conjugate BT5528. Mol Cancer Ther. Jul. 2020;19(7):1385-1394. doi: 10.1158/1535-7163.MCT-19-1092. Epub May 12, 2020.

(56) References Cited

OTHER PUBLICATIONS

Bennett et al., The Mechanism of Action of BT1718, a Novel Small-Molecule Drug Conjugate for the Treatment of Solid Tumors Expressing MT1-MMP. AACR-NCI-EORTC International Conference. Mol Cancer Ther. Jan. 2018;(1_Supplement):B135. doi: 10.1158/1535-7163.TARG-17-B135.

Bennett, BT1718, a Bicycle Drug Conjugate (BTC): Profound Efficacy Without Bleeding and Coagulation Abnormalities in Animal Models. AACR Annual Meeting 2019. 4481. 2 pages.

Ben-Shmuel et al., Unleashing Natural Killer Cells in the Tumor Microenvironment—The Next Generation of Immunotherapy? Front Immunol. Feb. 21, 2020;11:275. doi: 10.3389/fimmu.2020.00275.

Berenson, Multiple Myeloma. Merck Manual. Retrieved from: https://www.merckmanuals.com/professional/hematology-and-oncology/plasma-cell-disorders/multiple-myeloma. Oct. 2022.

Berge et al., Pharmaceutical salts. J Pharm Sci. Jan. 1977;66(1):1-19. doi: 10.1002/jps.2600660104.

Berkel et al. Binding of (5S)-penicilloic acid to penicillin binding protein 3. ACS Chem Biol. Oct. 18, 2013;8(10):2112-6. doi: 10.1021/cb400200h. Epub Aug. 15, 2013.

Bernhagen et al., Design, synthesis and characterization of different bicyclic peptides with enhanced binding and selectivity for various integrins, Retrieved from: https://ec.europa.eu/research/participants/documents/downloadPublic?documentIds=080166e5acfd6757&appid=PPGMS. Oct. 14, 2016. XP55622035:1-6.

Beswick P., Bicycles—An entirely new class of therapeutics. Presented at 30th RSC-BMCS Symposium on Medicinal Chemistry in Eastern England. May 2, 2019. Retrieved from: https://www.bicycletherapeutics.com/wp-content/uploads/RSC-02-May-2019.pdf. 21 pages.

Bicycle Therapeutics, Bicycle Therapeutics and Cancer Research UK Announce Initiation of First Clinical Study of a Bicyclic Peptide (Bicycle®). Press Release. Feb. 13, 2018. Retrieved from: https://investors.bicycletherapeutics.com/node/6651/pdf. 2 pages.

Bicycle Therapeutics, BT8009 Regulatory Update. Sep. 2023. Retrieved from: https://investors.bicycletherapeutics.com/static-files/265210c3-233f-4dd8-af32-d34592398d85. 23 pages.

Bicycle Therapeutics, R&D Day. Dec. 14, 2023. Retrieved from: https://investors.bicycletherapeutics.com/static-files/46599fde-67dc-40a8-9dcb-10ed8444f31e. 155 pages.

Bicycle Therapeutics, Bicycle Therapeutics Investor Presentation. Retrieved from: https://investors.bicycletherapeutics.com/static-files/f456c054-95c8-4e19-a62a-fcf5feb0650b, Aug. 2024, 61 pages.

Bilsky, Mark H., Gliomas. Merck Manual. Retrieved from: https://www.merckmanuals.com/professional/neurologic-disorders/intracranial-and-spinal-tumors/gliomas. May 2023. 8 pages.

Biron et al., Improving oral bioavailability of peptides by multiple N-methylation: somatostatin analogues. Angew Chem Int Ed Engl. 2008;47(14):2595-9. doi: 10.1002/anie.200705797.

Blank et al., Absence of programmed death receptor 1 alters thymic development and enhances generation of CD4/CD8 double-negative TCR-transgenic T cells. J Immunol. Nov. 1, 2003;171(9):4574-81. doi: 10.4049/jimmunol.171.9.4574.

Bogaerts et al., Individual patient data analysis to assess modifications to the RECIST criteria. Eur J Cancer. Jan. 2009;45(2):248-60. doi: 10.1016/j.ejca.2008.10.027. Epub Dec. 16, 2008.

Bolland et al., Spontaneous autoimmune disease in Fc(gamma)RIIB-deficient mice results from strain-specific epistasis. Immunity. Aug. 2000;13(2):277-85. doi: 10.1016/s1074-7613(00)00027-3.

Borghaei et al., Nivolumab versus Docetaxel in Advanced Nonsquamous Non-Small-Cell Lung Cancer. N Engl J Med. Oct. 22, 2015;373(17):1627-39. doi: 10.1056/NEJMoa1507643. Epub Sep. 27, 2015.

Borrelli et al., Cell Penetrating Peptides as Molecular Carriers for Anti-Cancer Agents. Molecules. Jan. 31, 2018;23(2):295. doi: 10.3390/molecules23020295. 28 pages.

Bouchard et al., Antibody-drug conjugates—a new wave of cancer drugs. Bioorg Med Chem Lett. Dec. 1, 2014;24(23):5357-63. doi: 10.1016/j.bmcl.2014.10.021. Epub Oct. 13, 2014.

Bournakas et al., PBP inhibitors discovered using a modified phage display platform (Bicycles). ESCMID. Oct. 11, 2022, 1 page.

Brahmer et al., Nivolumab versus Docetaxel in Advanced Squamous-Cell Non-Small-Cell Lung Cancer. New England Journal of Medicine, Jul. 9, 2015, 373(2):123-135.

Brandish P., Bicycle Therapeutics: Precision-guided immune agonism for the treatment of cancer. Presented at the Immuno UK meeting, London. Sep. 30, 2022. Retrieved from: https://www.bicycletherapeutics.com/wp-content/uploads/2022/09/Bicycle-Therapeutics-Precision-guided-immune-agonism-for-the-treatment-of-cancer.pdf. 25 pages.

Bristol-Myers Squibb, An Investigational Immuno-Therapy Study to Investigate the Safety and Effectiveness of Nivolumab, and Nivolumab Combination Therapy in Vims-Associated Tumors-Full Text View-Clinicaltrials. Gov.[(accessed on Jan. 30, 2021)] (2018).

Brown et al., Blockade of programmed death-1 ligands on dendritic cells enhances T cell activation and cytokine production. J Immunol. Feb. 1, 2003;170(3):1257-66. doi: 10.4049/jimmunol.170.3.1257.

Cabanillas et al., Phase I study of maytansine using a 3-day schedule. Cancer Treat Rep. Mar. 1978;62(3):425-8.

Cancer Research UK, "Types of lung cancer," Retrieved form: https://www.cancerresearchuk.org/about-cancer/lung-cancer/stages-types-grades/types. Sep. 2022.

Campbell et al., Bicycle Therapeutics Poster No. 1197: A multi tumor survey of Nectin-4 expression to guide BT8009 indication selection. AACR, Apr. 12, 2021. Retrieved from: https://www.bicycletherapeutics.com/wp-content/uploads/2022/07/A-multi-tumor-survey-of-Nectin-4-expression-to-guide-BT8009-indication-selection.pdf. 1 page.

Campbell et al., Poster 5300: A survey of EphA2 expression by immunohistochemistry (IHC) in tumor tissue microarrays (TMAs) to support BT5528 indication selection. American Association of Cancer Research, Jun. 22, 2020, 1 page.

Carabateas et al., Strong Analgesics, Some I-Substituted 4-Phenyl-4-Propionoxypiperidines. J Med Pharm Chem., Sep. 1962, 5:913-919.

Caratelli et al., FCγ Chimeric Receptor-Engineered T Cells: Methodology, Advantages, Limitations, and Clinical Relevance. Front Immunol. Apr. 27, 2017;8:457. doi: 10.3389/fimmu.2017.00457. 8 pages.

Chabner et al., Initial clinical trials of maytansine, an antitumor plant alkaloid. Cancer Treat Rep. Mar. 1978;62(3):429-33.

Chahinian et al., Phase I study of weekly maytansine given by iv bolus or 24-hour infusion. Cancer Treat Rep. Nov.-Dec. 1979;63(11-12):1953-60.

Challita-Eid et al., Enfortumab Vedotin Antibody-Drug Conjugate Targeting Nectin-4 Is a Highly Potent Therapeutic Agent in Multiple Preclinical Cancer Models. Cancer Res. May 15, 2016;76(10):3003-13. doi: 10.1158/0008-5472.CAN-15-1313. Epub Mar. 24, 2016.

Chandrasekar, Bladder Cancer. Merck Manual. Retrieved from: https://www.merckmanuals.com/professional/genitourinary-disorders/genitourinary-cancers/bladder-cancer. Sep. 2022.

Chandrasekar, Prostate Cancer. Merck Manual. Retrieved from: https://www.merckmanuals.com/professional/genitourinary-disorders/genitourinary-cancers/prostate-cancer. Sep. 2022.

Chang et al., Subtiligase: a tool for semisynthesis of proteins. Proc Natl Acad Sci U S A. Dec. 20, 1994;91(26):12544-8. doi: 10.1073/pnas.91.26.12544.

Chemnitz et al., RNA fingerprints provide direct evidence for the inhibitory role of TGFbeta and PD-1 on CD4+ T cells in Hodgkin lymphoma. Blood. Nov. 1, 2007;110(9):3226-33. doi: 10.1182/blood-2006-12-064360. Epub Jul. 20, 2007.

Chen at al., Abstract A8: Novel Multimers of Bicyclic Peptides Cluster and Activate CD137 (4-1BB): A Costimulatory T-Cell Checkpoint Receptor. PEGS, Nov. 12, 2018, 1 page.

Chen at al., Peptide ligands stabilized by small molecules. Angew Chem Int Ed Engl. Feb. 3, 2014;53(6):1602-6. doi: 10.1002/anie.201309459. Epub Jan. 22, 2014.

Chen et al., Association of FCGR3A and FCGR3B copy number variations with systemic lupus erythematosus and rheumatoid arthritis in Taiwanese patients. Arthritis Rheumatol. Nov. 2014;66(11):3113-21. doi: 10.1002/art.38813.

(56) References Cited

OTHER PUBLICATIONS

Chen et al., Cell-penetrating peptides in drug development: enabling intracellular targets. Biochem Soc Trans. Aug. 2007;35(Pt 4):821-5. doi: 10.1042/BST0350821.
Cheng et al, Memorial Sloan Kettering-Integrated Mutation Profiling of Actionable Cancer Targets (MSK-Impact): A Hybridization Capture-Based Next-Generation Sequencing Clinical Assay for Solid Tumor Molecular Oncology. J Mol Diagn. May 2015;17(3):251-64. doi: 10.1016/j.jmoldx.2014.12.006. Epub Mar. 20, 2015.
Cherney et al., Macrocyclic amino carboxylates as selective MMP-8 inhibitors. J Med Chem. May 21, 1998;41(11):1749-51. doi: 10.1021/jm970850y.
Chinnery et al., Viral antigen mediated NKp46 activation of NK cells results in tumor rejection via NK-DC crosstalk. Oncoimmunology. Sep. 1, 2012;1(6):874-883. doi: 10.4161/onci.20636.
Chung et al., Bicycle synthesis through peptide macrocyclization using aziridine aldehydes followed by late stage disulfide bond installation. MedChemComm. 2023;4(7):1124-1128. doi: 10.1039/C3MD00054K.
Clarkson et al., Treatment of refractory immune thrombocytopenic purpura with an anti-Fc gamma-receptor antibody. N Engl J Med. May 8, 1986;314(19):1236-9. doi: 10.1056/NEJM198605083141907.
Claus et al., Tumor-targeted 4-1BB agonists for combination with T cell bispecific antibodies as off-the-shelf therapy. Sci Transl Med. Jun. 12, 2019;11(496):eaav5989. doi: 10.1126/scitranslmed.aav5989. 12 pages.
Clynes et al., Inhibitory Fc receptors modulate in vivo cytotoxicity against tumor targets. Nat Med. Apr. 2000;6(4):443-6. doi: 10.1038/74704.
Cohen et al., Bicycle Therapeutics Abstract 2: Quantitation of CD137 and Nectin-4 expression across multiple tumor types to support indication selection for BT7480, a Bicycle tumor-targeted immune cell agonist™ (Bicycle TICA™). Presented at the Society for Immunotherapy of Cancer Meeting. Nov. 12, 2021. Retrieved from: https://www.bicycletherapeutics.com/wp-content/uploads/2022/07/Quantitation-of-CD137-and-Nectin-4-expression-across-multiple-tumor-types-to-support-indication-selection-for-BT7480.pdf. 1 page.
Cohen et al., Bicycle Therapeutics Abstract 5555: Development of a CD137 receptor occupancy assay to support the phase I/II study of BT7480,a Bicycle® tumor-targeted immune cell agonist (Bicycle TICA™). Presented at the American Association for Cancer Research Meeting. Apr. 8, 2022. Retrieved from: https://www.bicycletherapeutics.com/wp-content/uploads/2022/06/Development-of-a-CD137-receptor-occupancy-assay-to-support-the-phase-I-II-study-of-BT7480.pdf. 1 page.
Cohen et al., Abstract A65: Development of a CD137 receptor occupancy assay to support the phase I/II study of BT7480, a Bicycle tumor-targeted immune cell agonist® (Bicycle TICA®). AACR-BC-EORTC, Oct. 26, 2022, 1 page.
Cohen H., Translating preclinical findings into clinical biomarker assays to support the Phase I/II study of BT7480, a Bicycle tumor-targeted immune cell agonist®. Presented at the World Clinical Biomarkers & CDx Summit. Sep. 28, 2022. Retrieved from: https://www.bicycletherapeutics.com/wp-content/uploads/2022/09/Translating-preclinical-findings-clinical-biomarker-assays-Phase-I-II-study-BT7480-Bicycle-tumor-targeted-immune-cell-agonist.pdf. 21 pages.
Cohen H., Turning preclinical findings into clinic-ready biomarker assays to support BT7480 development. Presented at the MarketsandMarkets Biomarker and Companion Diagnostics Conference. Feb. 15, 2023. Retrieved from: https://www.bicycletherapeutics.com/wp-content/uploads/2023/02/Turning_preclinical_findings_into_clinic-ready_biomarker_assays_to_support_BT7480_development.pdf. 21 pages.
Committee for Medicinal Products for Human Use (CHMP), Assessment Report: Kadcyla; International non-proprietary name: Trastuzumab emtansine; Procedure No. EMEA/H/C/002389/0000. European Medicines Agency. Sep. 19, 2013. Retrieved from: https://www.ema.europa.eu/en/documents/assessment-report/kadcyla-epar-public-assessment-report_en.pdf. 121 pages.

Connolly et al., Complexities of TGF-β targeted cancer therapy. Int J Biol Sci. 2012;8(7):964-78. doi: 10.7150/ijbs.4564. Epub Jul. 12, 2012.
Cook et al., 464P—Pharmacokinetic (PK) assessment of BT1718: A phase I/II a study of BT1718, a first in class bicycle toxin conjugate (BTC), in patients (pts) with advanced solid tumours. Annals of Oncology. Oct. 2019;30(Suppl 5):v174.
Cook et al., Abstract 5764: Pharmacokinetic (PK) assessment of BT1718: A phase 1/2a study of BT1718, a first in class bicycle toxin conjugate (BTC), in patients with advanced solid tumours. EMSO, Sep. 28, 2019, 1 page.
Cooke, Bicycles as precision guided therapeutics. UK Symposium: Advancing Drug Discovery for Oncology, Mar. 13, 2023, 15 pages.
Cortes et al., Phase II study of the halichondrin B analog eribulin mesylate in patients with locally advanced or metastatic breast cancer previously treated with an anthracycline, a taxane, and capecitabine. J Clin Oncol. Sep. 1, 2010;28(25):3922-8. doi: 10.1200/JCO.2009.25.8467. Epub Aug. 2, 2010.
Costello et al., Defective expression and function of natural killer cell-triggering receptors in patients with acute myeloid leukemia. Blood. May 15, 2002;99(10):3661-7. doi: 10.1182/blood.v99.10.3661.
Crameri et al., Construction and evolution of antibody-phage libraries by DNA shuffling. Nat Med. Jan. 1996;2(1):100-2. doi: 10.1038/nm0196-100.
Cui, JJ, A new challenging and promising era of tyrosine kinase inhibitors. ACS Med Chem Lett. Mar. 6, 2014;5(4):272-4. doi: 10.1021/ml500091p.
Curiel et al., Blockade of B7-H1 improves myeloid dendritic cell-mediated antitumor immunity. Nat Med. May 2003;9(5):562-7. doi: 10.1038/nm863. Epub Apr. 21, 2003.
Davies et al., Antibody VH domains as small recognition units. Biotechnology (N Y). May 1995;13(5):475-9. doi: 10.1038/nbt0595-475.
Davis et al., Natural killer cells unleashed: Checkpoint receptor blockade and BiKE/TriKE utilization in NK-mediated anti-tumor immunotherapy. Semin Immunol. Jun. 2017;31:64-75. doi: 10.1016/j.smim.2017.07.011. Epub Sep. 5, 2017.
Dawson et al., Synthesis of proteins by native chemical ligation. Science. Nov. 4, 1994;266(5186):776-9. doi: 10.1126/science.7973629.
De Kruif et al., Selection and application of human single chain Fv antibody fragments from a semi-synthetic phage antibody display library with designed CDR3 regions. J Mol Biol. Apr. 21, 1995;248(1):97-105. doi: 10.1006/jmbi.1995.0204.
De La Peña et al., Expression of the matrix metalloproteases 2, 14, 24, and 25 and tissue inhibitor 3 as potential molecular markers in advanced human gastric cancer. Dis Markers. 2014;2014:285906. doi: 10.1155/2014/285906. Epub Feb. 11, 2014.
Debre et al., Infusion of Fc gamma fragments for treatment of children with acute immune thrombocytopenia purpura. Lancet. Oct. 16, 1993;342(8877):945-9. doi: 10.1016/0140-6736(93)92000-j.
Derossi et al., The third helix of the Antennapedia homeodomain translocates through biological membranes. J Biol Chem. Apr. 8, 1994;269(14):10444-50.
Dharmadhikari, et al., CD137 and CD137L signals are main drivers of type 1, cell-mediated immune responses. Oncoimmunology. Nov. 11, 2015;5(4):e1113367. doi: 10.1080/2162402X.2015.1113367.
Diamantis et al., Antibody-drug conjugates—an emerging class of cancer treatment. Br J Cancer. Feb. 16, 2016;114(4):362-7. doi: 10.1038/bjc.2015.435. Epub Jan. 7, 2016.
Diaz-Perlas et al., Branched BBB-shuttle peptides: chemoselective modification of proteins to enhance blood-brain barrier transport. Chem Sci. Sep. 18, 2018;9(44):8409-8415. doi: 10.1039/c8sc02415d.
Dong et al., Tumor-associated B7-H1 promotes T-cell apoptosis: a potential mechanism of immune evasion. Nat Med. Aug. 2002;8(8):793-800. doi: 10.1038/nm730. Epub Jun. 24, 2002. Erratum in: Nat Med Sep. 2002;8(9):1039.

(56) References Cited

OTHER PUBLICATIONS

Dorfman et al., Programmed death-1 (PD-1) is a marker of germinal center-associated T cells and angioimmunoblastic T-cell lymphoma. Am J Surg Pathol. Jul. 2006;30(7):802-10. doi: 10.1097/01.pas.0000209855.28282.ce.

Driggers et al., The exploration of macrocycles for drug discovery—an underexploited structural class. Nat Rev Drug Discov. Jul. 2008;7(7):608-24. doi: 10.1038/nrd2590.

Drumm et al., Genetic Variation and Clinical Heterogeneity in Cystic Fibrosis. Annu. Rev. Pathol. Mech. Dis., 2012, 7:267-282.

Dubois et al., New ways to image and target tumour hypoxia and its molecular responses. Radiother Oncol. Sep. 2015;116(3):352-7. doi: 10.1016/j.radonc.2015.08.022. Epub Aug. 28, 2015.

Dufort, Bicycles: Bispecific, Precision guided NK Cell Activators for the Treatment of Solid Tumors. Innate Killer Summit, Mar. 29, 2023, 23 pages.

Dufort et al., 789 Generation of a Bicycle NK-TICA™, a novel NK cell engaging molecule to enhance targeted tumor cytotoxicity. J. Immuno Ther Cancer. Nov. 10, 2021;9(Suppl 2):A824-A824. doi: 10.1136/jitc-2021-SITC2021.789. Retrieved from: https://jitc.bmj.com/content/9/Suppl_2/A824.

Dufort et al., Abstract 1340: Modulation of the natural killer cell immune response to tumor with a synthetic tumor-immune cell agonist, NK-TICA®. American Association for Cancer Research Annual Meeting, Apr. 8, 2024, 1 page.

Dufort et al., Abstract 15699: Generation of a Bicycle NK-TICA™, a novel NK cell engaging molecule designed to induce targeted tumor cytotoxicity. SITC, Nov. 12, 2022, 1 page.

Dufort et al., Abstract 1806: Modulation of the natural killer (NK) cell immune response to tumor with novel synthetic tumor-immune cell agonist, NK-TICA™. American Association for Cancer Research Annual Meeting, Apr. 17, 2023, 1 page.

Dufort et al., Abstract 4233: Generation of a Bicycle NK-TICA™, a novel NK cell engaging molecule designed to induce targeted tumor cytotoxicity. American Association for Cancer Research, Apr. 8, 2022, 1 page.

Eagan et al., Early clinical study of an intermittent schedule for maytansine (NSC-153858): brief communication. J Natl Cancer Inst. Jan. 1978;60(1):93-6. doi: 10.1093/jnci/60.1.93.

Eder et al., A phage display derived stabilised bicyclic peptide targeting MMP-14 shows high imaging contrast in small animal PET imaging. Eur J Nuc Med Mol Imag. 2015, 42:S140-S141.

Eder et al., Bicyclic Peptides as a New Modality for Imaging and Targeting of Proteins Overexpressed by Tumors, AACR Journals, Feb. 15, 2019, 79(4):841-852.

Eisenhauer et al., New response evaluation criteria in solid tumours: revised RECIST guideline (version 1.1). Eur J Cancer. Jan. 2009;45(2):228-47. doi: 10.1016/j.ejca.2008.10.026.

Ellenrieder et al., Role of MT-MMPs and MMP-2 in pancreatic cancer progression. Int J Cancer. Jan. 1, 2000;85(1):14-20. doi: 10.1002/(sici)1097-0215(20000101)85:1<14::aid-ijc3>3.0.co;2-o.

Elson-Schwab et al., Guanidinylated neomycin delivers large, bioactive cargo into cells through a heparan sulfate-dependent pathway. J Biol Chem. May 4, 2007;282(18):13585-91. doi: 10.1074/jbc.M700463200. Epub Feb. 20, 2007.

Evans et al., Abstract CT253: Phase 1/2 study of the safety, pharmacokinetics, and preliminary clinical activity ofBT7480 in patients with Nectin-4 associated advanced malignancies. American Association for Cancer Research Annual Meeting, Apr. 18, 2023, 1 page.

Fauriat et al., Deficient expression of NCR in NK cells from acute myeloid leukemia: Evolution during leukemia treatment and impact of leukemia cells in NCRdull phenotype induction. Blood. Jan. 1, 2007;109(1):323-30. doi: 10.1182/blood-2005-08-027979. Epub Aug. 29, 2006.

Fehrenbacher et al., Atezolizumab versus docetaxel for patients with previously treated non-small-cell lung cancer (POPLAR): a multicentre, open-label, phase 2 randomised controlled trial. Lancet. Apr. 30, 2016;387(10030):1837-46. doi: 10.1016/S0140-6736(16)00587-0. Epub Mar. 10, 2016.

Felices et al., Generation of BiKEs and TriKEs to Improve NK Cell-Mediated Targeting of Tumor Cells. Methods Mol Biol. 2016;1441:333-46. doi: 10.1007/978-1-4939-3684-7_28.

Felices et al., Novel CD19-targeted TriKE restores NK cell function and proliferative capacity in CLL. Blood Adv. Mar. 26, 2019;3(6):897-907. doi: 10.1182/bloodadvances.2018029371.

Fiacco et al., N-Methyl scanning mutagenesis generates protease-resistant G protein ligands with improved affinity and selectivity. Chembiochem. Sep. 22, 2008;9(14):2200-3. doi: 10.1002/cbic.200800208.

Flaherty et al., Nonclinical evaluation of GMA161—an antihuman CD16 (FcγRIII) monoclonal antibody for treatment of autoimmune disorders in CD16 transgenic mice. Toxicol Sci. Jan. 2012;125(1):299-309. doi: 10.1093/toxsci/kfr278. Epub Oct. 24, 2011.

Forsberg et al., CD137 Plays Both Pathogenic and Protective Roles in Type 1 Diabetes Development in NOD Mice. J Immunol. May 15, 2017;198(10):3857-3868. doi: 10.4049/jimmunol.1601851. Epub Mar. 31, 2017.

Francis et al., Bone and Soft Tissue Sarcomas: UK Incidence and Survival: 1996-2010. National Cancer Intelligence Network. Nov. 2013, v2.0.

Frigerio, Expanding the Potential of ADCs: Bicyclic Peptide (Bicycle®) Toxin Conjugates May Offer Advancements Over Traditional ADCs. World ADC, Mar. 20, 2023, 28 pages.

Frigerio, Targeting Tumors with Bicycle Conjugates. PEGS Boston, May 17, 2023, 31 pages.

Fumet et al. Phase Ib/II trial evaluating the safety, tolerability and immunological activity of durvalumab (MEDI4736) (anti-PD-L1) plus tremelimumab (anti-CTLA-4) combined with FOLFOX in patients with metastatic colorectal cancer. ESMO Open. Jun. 19, 2018;3(4):e000375. doi: 10.1136/esmoopen-2018-000375. Erratum in: ESMO Open. Apr. 2023;8(2):101185. doi: 10.1016/j.esmoop.2023.101185.

Galsky et al., Phase I trial of the prostate-specific membrane antigen-directed immunoconjugate MLN2704 in patients with progressive metastatic castration-resistant prostate cancer. J Clin Oncol. May 1, 2008;26(13):2147-54. doi: 10.1200/JCO.2007.15.0532.

Garcia-Iglesias et al., Low NKp30, NKp46 and NKG2D expression and reduced cytotoxic activity on NK cells in cervical cancer and precursor lesions. BMC Cancer. Jun. 16, 2009;9:186. doi: 10.1186/1471-2407-9-186.

Gauthier et al., Multifunctional Natural Killer Cell Engagers Targeting NKp46 Trigger Protective Tumor Immunity. Cell. Jun. 13, 2019;177(7):1701-1713.e16. doi: 10.1016/j.cell.2019.04.041. Epub May 30, 2019.

Gelb et al., Abstract 391: Molecular-based enrichment strategy for Nectin-4 targeted Bicycle toxin conjugate BT8009. Cancer Res. Jul. 1, 2021;81(13 suppl):391. Poster.

Gelb et al., Abstract A047: MT1-MMP Immunohistochemistry (IHC) analysis of tumor microarrays (TMAs) using a novel scoring system guides patient selection for BT1718 expansion cohorts. AACR-NCI-EORTC, Oct. 27, 2019, 1 page.

Gentilucci et al., Chemical modifications designed to improve peptide stability: incorporation of non-natural amino acids, pseudo-peptide bonds, and cyclization. Curr Pharm Des. 2010;16(28):3185-203. doi: 10.2174/138161210793292555.

Gfeller et al., Current tools for predicting cancer-specific T cell immunity. Oncoimmunology. Apr. 25, 2016;5(7):e1177691. doi: 10.1080/2162402X.2016.1177691.

Gleason et al., CD16xCD33 bispecific killer cell engager (BiKE) activates NK cells against primary MDS and MDSC CD33+ targets. Blood. May 8, 2014;123(19):3016-26. doi: 10.1182/blood-2013-10-533398. Epub Mar. 20, 2014.

Gokel et al., Crown ethers: sensors for ions and molecular scaffolds for materials and biological models. Chem Rev. May 2004;104(5):2723-50. doi: 10.1021/cr020080k.

Gradishar et al., Significantly longer progression-free survival with nab-paclitaxel compared with docetaxel as first-line therapy for metastatic breast cancer. J Clin Oncol. Aug. 1, 2009;27(22):3611-9. doi: 10.1200/JCO.2008.18.5397. Epub May 26, 2009. Erratum in: J Clin Oncol. Jul. 1, 2011;29(19):2739.

(56) References Cited

OTHER PUBLICATIONS

Gresh, Neuroblastoma. Merck Manual. Retrieved from: https://www.msdmanuals.com/en-in/professional/pediatrics/pediatric-cancers/neuroblastoma. Sep. 2022. 4 pages.
Griffiths et al., Isolation of high affinity human antibodies directly from large synthetic repertoires. EMBO J. Jul. 15, 1994;13(14):3245-60. doi: 10.1002/j.1460-2075.1994.tb06626.x.
Grisold et al., Peripheral neuropathies from chemotherapeutics and targeted agents: diagnosis, treatment, and prevention. Neuro Oncol. Sep. 2012;14 Suppl 4(Suppl 4):iv45-54. doi: 10.1093/neuonc/nos203.
Gu et al., The influence of the penetrating peptide iRGD on the effect of paclitaxel-loaded MT1-AF7p-conjugated nanoparticles on glioma cells. Biomaterials. Jul. 2013;34(21):5138-48. doi: 10.1016/j.biomaterials.2013.03.036. Epub Apr. 9, 2013.
Gupta et al., Intracellular delivery of large molecules and small particles by cell-penetrating proteins and peptides. Adv Drug Deliv Rev. Feb. 28, 2005;57(4):637-51. doi: 10.1016/j.addr.2004.10.007. Epub Dec. 22, 2004.
Hacker et al., Highly-Constrained Bicyclic Scaffolds for the Discovery of Protease-Stable Peptides via mRNA Display.ACS Chem. Biol., Mar. 17, 2017, 12(3):795-804.
Hadjicharalambous et al., Investigating Penetration and Antimicrobial Activity of Vector Bicycle Conjugates. ACS Infectious Diseases, Jun. 12, 2024, 10(7):2381-2389.
Hamanishi et al. Programmed cell death 1 ligand 1 and tumor-infiltrating CD8+ T lymphocytes are prognostic factors of human ovarian cancer. Proc Natl Acad Sci U S A. Feb. 27, 2007;104(9):3360-5. doi: 10.1073/pnas.0611533104. Epub Feb. 21, 2007.
Han et al., Altered NKp30, NKp46, NKG2D, and DNAM-1 Expression on Circulating NK Cells Is Associated with Tumor Progression in Human Gastric Cancer. J Immunol Res. Sep. 3, 2018;2018:6248590. doi: 10.1155/2018/6248590. 10 pages.
Hanna et al., Randomized phase III trial of pemetrexed versus docetaxel in patients with non-small-cell lung cancer previously treated with chemotherapy. J Clin Oncol. May 1, 2004;22(9):1589-97. doi: 10.1200/JCO.2004.08.163.
Harrison et al., Abstract 5144: BT1718, a novel bicyclic peptide-maytansinoid conjugate targeting MT1-MMP for the treatment of solid tumours: Design ofbicyclic peptide and linker selection. AACR Annual meeting, April 0I, 20I 7, 1 page.
Harrison et al., Discovery and development of BT1718, a novel bicyclic peptidemaytansinoid conjugate targeting MT1-MMP for the treatment of solid tumours: In vitro and in vivo activities, PEGS, Apr. 30, 2017, 1 page.
Hart et al., Cell binding and internalization by filamentous phage displaying a cyclic Arg-Gly-Asp-containing peptide. J Biol Chem. Apr. 29, 1994;269(17):12468-74.
Hart et al., De novo identification of lipid II binding lipopeptides with antibacterial activity against vancomycin-resistant bacteria. Chem Sci. Dec. 1, 2017;8(12):7991-7997. doi: 10.1039/c7sc03413j. Epub Oct. 2, 2017.
Hasmim et al., Critical Role of Tumor Microenvironment in Shaping NK Cell Functions: Implication of Hypoxic Stress. Front Immunol. Sep. 23, 2015;6:482. doi: 10.3389/fimmu.2015.00482. 9 pages.
He et al., Matrix metalloproteinase-14 is a negative prognostic marker for patients with gastric cancer. Dig Dis Sci. May 2013;58(5):1264-70. doi: 10.1007/s10620-012-2513-9. Epub Jan. 13, 2013.
Heinis et al., Phage-encoded combinatorial chemical libraries based on bicyclic peptides. Nat Chem Biol. Jul. 2009;5(7):502-7. doi: 10.1038/nchembio.184.
Helft et al., A phase I study of cantuzumab mertansine administered as a single intravenous infusion once weekly in patients with advanced solid tumors. Clin Cancer Res. Jul. 1, 2004;10(13):4363-8. doi: 10.1158/1078-0432.CCR-04-0088.
Henriques et al., Functional characterization of peripheral blood dendritic cells and monocytes in systemic lupus erythematosus. Rheumatol Int. Apr. 2012;32(4):863-9. doi: 10.1007/s00296-010-1709-6. Epub Jan. 8, 2011.
Herbst et al., Pembrolizumab versus docetaxel for previously treated, PD-L1-positive, advanced non-small-cell lung cancer (KEYNOTE-010): a randomised controlled trial. Lancet. Apr. 9, 2016;387(10027):1540-1550. doi: 10.1016/S0140-6736(15)01281-7. Epub Dec. 19, 2015.
Hershman, Thyroid Cancers. Merck Manual, Retrieved from: https://www.merckmanuals.com/professional/endocrine-and-metabolic-disorders/thyroid-disorders/thyroid-cancers. Sep. 2020.
Hess et al., Backbone cyclic peptidomimetic melanocortin-4 receptor agonist as a novel orally administrated drug lead for treating obesity. J Med Chem. Feb. 28, 2008;51(4):1026-34. doi: 10.1021/jm701093y. Epub Jan. 26, 2008.
Hill et al: Constraining cyclic peptides to mimic protein structure motifs. Angew Chem Int Ed Engl. Nov. 24, 2014;53(48):13020-41. doi: 10.1002/anie.201401058. Epub Oct. 6, 2014.
Hirano et al. Blockade of B7-H1 and PD-1 by monoclonal antibodies potentiates cancer therapeutic immunity. Cancer Res. Feb. 1, 2005;65(3):1089-96.
Ho et al., Expression of CD137 on Hodgkin and Reed-Sternberg Cells Inhibits T-cell Activation by Eliminating CD137 Ligand Expression. Cancer Research, Jan. 15, 2013, 73(2):652-661.
Hoogenboom et al., By-passing immunisation. Human antibodies from synthetic repertoires of germline VH gene segments rearranged in vitro. J Mol Biol. Sep. 20, 1992;227(2):381-8. doi: 10.1016/0022-2836(92)90894-p.
Hsu et al., Efficacy of plasmin-treated intravenous gamma-globulin for therapy of Kawasaki syndrome. Pediatr Infect Dis J. Jun. 1993;12(6):509-12. doi: 10.1097/00006454-199306000-00010.
Hu et al., Lessons Learned from Molecular Scaffold Analysis. Journal of Chemical Information and Modeling, 2011, 51(8):1742-1753.
Hurov, BT7480, a novel and fully synthetic Bicycle tumor-targeted immune cell agonist®. Festival of Biologics, Nov. 4, 2022, 23 pages.
Hurov et al., BT7480, a novel fully synthetic tumor-targeted immune cell agonist (TICA™) induces tumor localized CD137 agonism. Retrieved from: https://www.bicycletherapeutics.com/wp-content/uploads/2020-06-16-BT7480-AACR-2020-poster-P5552_Final_CD137-in-title-002.pdf. Jun. 20, 2020. 1 page.
Hurov et al., Abstract 1340: BT7455, a fully synthetic Bicycle tumor-targeted immune cell agonist®, leads to potent EphA2-dependent CDI 37 agonism and robust anti-tumor efficacy. SITC, Nov. 10, 2022, 1 page.
Hurov et al., Abstract 3257: Activation of 4-1BB using multivalent and tumour targeted bicyclic peptides. American Association of Cancer Research, Apr. 2, 2019, 1 page.
Hurov et al., Abstract 3257: Activation of CD137 using multivalent and tumor targeted Bicyclic peptides. Cancer Res, Jul. 1, 2019, 79(13_Supplement):3257, 3 pages.
Hurov et al., Abstract 700: EphA2/CD137 Bicycle® tumor-targeted immune cell agonists (TICAs™) induce tumor regressions, immunogenic memory, and reprogramming of the tumor immune microenvironment. SITC, Nov. 9, 2020, 1 page.
Hurov et al., Abstract P398: Activation of the T cell costimulatory protein CD137 using multivalent bicyclic peptides. SITC, Nov. 6, 2018, 1 page.
Hurov et al., Abstract P782: A novel fully synthetic dual targeted Nectin-4/4-1BB Bicycle® peptide induces tumor localized 4-IBB agonism. SITC, Nov. 9, 2019, 1 page.
Hurov et al., BT7480, a novel fully synthetic Bicycle tumor-targeted immune cell agonist™ (Bicycle TICA™) induces tumor localized CDI37 agonism.Journal for ImmunoTherapy of Cancer, 2021, 9(11):e002883, pp. 1-13.
Hurov et al., Poster 1728: Nectin-4-dependent immune cell stimulation and anti-tumor efficacy by BT7480, a Nectin-4/CD137 Bicycle® tumor-targeted immune cell agonist (TICA™), American Association of Cancer Research, Apr. 12, 2021, 1 page.

(56) References Cited

OTHER PUBLICATIONS

Ide et al., A novel method for artificial lipid-bilayer formation. Biosens Bioelectron. Oct. 15, 2005;21(4):672-7. doi: 10.1016/j.bios.2004.12.018. Epub Jan. 26, 2005.

Inman et al., PD-L1 (B7-H1) expression by urothelial carcinoma of the bladder and BCG-induced granulomata: associations with localized stage progression. Cancer. Apr. 15, 2007;109(8):1499-505. doi: 10.1002/cncr.22588.

Ip et al., Atypical localization of membrane type 1-matrix metalloproteinase in the nucleus is associated with aggressive features of hepatocellular carcinoma. Mol Carcinog. Mar. 2007;46(3):225-30. doi: 10.1002/mc.20270.

Izawa et al., $H_2O_2$ production within tumor microenvironment inversely correlated with infiltration of CD56(dim) NK cells in gastric and esophageal cancer: possible mechanisms of NK cell dysfunction. Cancer Immunol Immunother. Dec. 2011;60(12):1801-10. doi: 10.1007/s00262-011-1082-7. Epub Aug. 3, 2011.

Jackson et al., Using the Lessons Learned From the Clinic to Improve the Preclinical Development of Antibody Drug Conjugates. Pharm Res. Nov. 2015;32(11):3458-69. doi: 10.1007/s11095-014-1536-7. Epub Oct. 23, 2014.

Janeway et al., Immunobiology: The Immune System in Health and Disease. Garland Science, 2001. Figure 3.8.

Jespers et al., Selection of optical biosensors from chemisynthetic antibody libraries. Protein Eng Des Sel. Oct. 2004;17(10):709-13. doi: 10.1093/protein/gzh083. Epub Nov. 10, 2004.

Johnson et al., Melanoma-specific MHC-II expression represents a tumour-autonomous phenotype and predicts response to anti-PD-1/PD-L1 therapy. Nat Commun. Jan. 29, 2016;7:10582. doi: 10.1038/ncomms10582. 10 pages.

Johnson et al., Relationships between drug activity in NCI preclinical in vitro and in vivo models and early clinical trials. Br J Cancer. May 18, 2001;84(10):1424-31. doi: 10.1054/bjoc.2001.1796.

Jones et al., Randomized phase III study of docetaxel compared with paclitaxel in metastatic breast cancer. J Clin Oncol. Aug. 20, 2005;23(24):5542-51. doi: 10.1200/JCO.2005.02.027.

Jones et al., Targeting membrane proteins for antibody discovery using phage display. Sci Rep. May 18, 2016;6:26240. doi: 10.1038/srep26240.

Kamat et al., The clinical relevance of stromal matrix metalloproteinase expression in ovarian cancer. Clin Cancer Res. Mar. 15, 2006;12(6):1707-14. doi: 10.1158/1078-0432.CCR-05-2338.

Kamijo et al., Aberrant CD137 ligand expression induced by GATA6 overexpression promotes tumor progression in cutaneous T-cell lymphoma. Blood. Nov. 1, 2018;132(18):1922-1935. doi: 10.1182/blood-2018-04-845834. Epub Sep. 7, 2018.

Kanakia et al., Development of CD137 (4-1BB) receptor occupancy assay using fluorescently labeled Bicycles®. AACR Tumor Immunology & Immunotherapy, Oct. 19, 2020, 1 page.

Kanazawa et al., Non-obese-diabetic mice: immune mechanisms of pancreatic beta-cell destruction. Diabetologia. Jul. 1984;27 Suppl:113-5. doi: 10.1007/BF00275663.

Kang et al., A randomized, open-label, multicenter, adaptive phase 2/3 study of trastuzumab emtansine (T-DM1) versus a taxane (TAX) in patients (pts) with previously treated HER2-positive locally advanced or metastatic gastric/gastroesophageal junction adenocarcinoma (LA/MGC/GEJC). J Clin Oncol. 2016;34(4 Suppl):5. doi: 10.1200/jco.2016.34.4_suppl.5.

Kang et al., Anti-CD137 Suppresses Tumor Growth by Blocking Reverse Signaling by CD137 Ligand. Cancer Res. Nov. 1, 2017;77(21):5989-6000. doi: 10.1158/0008-5472.CAN-17-0610. Epub Sep. 18, 2017.

Keen, A novel fully synthetic dual targeted Nectin-4/4-1BB Bicycle® peptide induces tumor localized 4-1BB agonism. SITC, Nov. 6-10, 2019, 19 pages.

Keen, BT5528, an EphA2-targeting Bicycle® Toxin Conjugate. World ADC congress, Oct. 11, 2019, 24 pages.

Keen, BT7480, a novel Nectin-4 dependent agonist of the immune cell costimulatory receptor CDI37. AACR Annual Meeting, Apr. 10-15 and May 17-21, 2021, 23 pages.

Keith, Lung Carcinoma. Merck Manual. Retrieved from: https://www.merckmanuals.com/professional/pulmonary-disorders/tumors-of-the-lungs/lung-carcinoma. Sep. 2021. 18 pages.

Kell D., The Transporter-Mediated Cellular Uptake and Efflux of Pharmaceutical Drugs and Biotechnology Products: How and Why Phospholipid Bilayer Transport Is Negligible in Real Biomembranes. Molecules. Sep. 16, 2021;26(18):5629. doi: 10.3390/molecules26185629.

Kellogg et al., Disulfide-linked antibody-maytansinoid conjugates: optimization of in vivo activity by varying the steric hindrance at carbon atoms adjacent to the disulfide linkage. Bioconjug Chem. Apr. 20, 2011;22(4):717-27. doi: 10.1021/bc100480a. Epub Mar. 22, 2011.

Kemp et al., Conformationally Restricted Cyclic Nonapeptides Derived from L-Cysteine and LL-3-Amino-2-Piperidone-6-Carboxylic Acid (LL-Acp), a Potent β-Turn-Inducing Dipeptide Analogue. J Orq Chem. 1985;50:5834-5838.

Kerkela et al., Differential patterns of stromelysin-2 (MMP-10) and MT1-MMP (MMP-14) expression in epithelial skin cancers. Br J Cancer. Mar. 2, 2001;84(5):659-69. doi: 10.1054/bjoc.2000.1634.

Kessenbrock et al., Matrix metalloproteinases: regulators of the tumor microenvironment. Cell. Apr. 2, 2010;141(1):52-67. doi: 10.1016/j.cell.2010.03.015.

Khan et al., Engineering lipid bilayer membranes for protein studies. Int J Mol Sci. Oct. 31, 2013;14(11):21561-97. doi: 10.3390/ijms141121561.

Kikuchi et al., Immunohistochemical detection of membrane-type-1-matrix metalloproteinase in colorectal carcinoma. Br J Cancer. Jul. 2000;83(2):215-8. doi: 10.1054/bjoc.2000.1195.

Kim et al., Synergistic signals for natural cytotoxicity are required to overcome inhibition by c-Cbl ubiquitin ligase. Immunity. Feb. 26, 2010;32(2):175-86. doi: 10.1016/j.immuni.2010.02.004.

Kim, et al., Reverse signaling through the costimulatory ligand CD137L in epithelial cells is essential for natural killer cell-mediated acute tissue inflammation. Proc Natl Acad Sci U S A. Jan. 3, 2012;109(1):E13-22. doi: 10.1073/pnas.1112256109. Epub Dec. 12, 2011.

Kleinau et al., Induction and suppression of collagen-induced arthritis is dependent on distinct fcgamma receptors. J Exp Med. May 1, 2000;191(9):1611-6. doi: 10.1084/jem.191.9.1611.

Knight et al., Three genes for lupus nephritis in NZB x NZW mice. J Exp Med. Jun. 1, 1978;147(6):1653-60. doi: 10.1084/jem.147.6.1653.

Konishi et al., B7-H1 expression on non-small cell lung cancer cells and its relationship with tumor-infiltrating lymphocytes and their PD-1 expression. Clin Cancer Res. Aug. 1, 2004;10(15):5094-100. doi: 10.1158/1078-0432.CCR-04-0428.

Koo et al., Reduction of the CD16(−)CD56bright NK cell subset precedes NK cell dysfunction in prostate cancer. PLoS One. Nov. 4, 2013;8(11):e78049. doi: 10.1371/journal.pone.0078049. 8 pages.

Kreidieh et al., Overview, prevention and management of chemotherapy extravasation. World J Clin Oncol. Feb. 10, 2016;7(1):87-97. doi: 10.5306/wjco.v7.i1.87.

Krishnamoorthy et al., Breaking the Permeability Barrier of *Escherichia coli* by Controlled Hyperporination of the Outer Membrane. Antimicrob Agents Chemother. Nov. 21, 2016;60(12):7372-7381. doi: 10.1128/AAC.01882-16.

Kristensson et al., Novel Bicyclic Peptide Multimers Activate T Cell Costimulatory Protein CD137. ELRIG Drug Discovery, Oct. 9, 2018, 1 page.

Kristensson et al., Novel Bicyclic Peptide Multimers Activate T Cell Costimulatory Protein CD137. Promega Biologics, Jul. 18, 2018, 1 page.

Krop et al., Trastuzumab emtansine versus treatment of physician's choice for pretreated HER2-positive advanced breast cancer (TH3RESA): a randomised, open-label, phase 3 trial. Lancet Oncol. Jun. 2014;15(7):689-99. doi: 10.1016/S1470-2045(14)70178-0. Epub May 2, 2014.

Kumara et al., Fusarium proliferatum, an endophytic fungus from Dysoxylum binectariferum Hook.f, produces rohitukine, a chromane alkaloid possessing anti-cancer activity. Antonie van Leeuwenhoek, 2012, 101(2):323-329.

(56) References Cited

OTHER PUBLICATIONS

Kylvaja et al., Penicillin binding protein 3 of *Staphylococcus aureus* NCTC 8325-4 binds and activates human plasminogen. BMC Res Notes. Aug. 4, 2016;9:389. doi: 10.1186/s13104-016-2190-4.

Lahdenranta et al., Abstract 1356: Transcriptional profiling of Bicycle® tumor-targeted CD137 agonist-treated mouse tumors revealed an early and rapid activation of myeloid cells followed by infiltration of cytotoxic T cells into the tumor. SITC, Nov. 10, 2022, 1 page.

Lahdenranta et al., Abstract 5301: Tumor-targeted activation of CD137 using Bicycle® molecules: New insights into mechanism of action and discovery of BT7455, a clinical candidate for the treatment of EphA2-expressing cancers. American Association for Cancer Research Annual Meeting, Apr. 9, 2024, 1 page.

Lahdenranta et al., Abstract A067: BT7480, a synthetic Bicycle tumor-targeted immune cell agonist® (Bicycle TICA®), induces reprogramming of the tumor immune microenvironment through tumor localized CD137 agonism. CICON, Sep. 29, 2022, 1 page.

Lahdenranta et al., Poster 1319: Rapid accumulation of cytotoxic payload in tumor tissue drives BT5528 activity in tumor models. American Association of Cancer Research, Apr. 12, 2021, 1 page.

Lahdenranta et al., Poster 1724: Microinjection of Nectin-4/CD137 tumor-targeted immune cell agonist (TICA™) activates the local tumor microenvironment. American Association of Cancer Research, Apr. 12, 2021, 1 page.

Lahdenranta et al., Poster 706: BT7480, a fully synthetic tumor-targeted immune cell agonist (TICA™) induces tumor localized CD137 agonism and modulation of tumor immune microenvironment. SITC, Nov. 9, 2020, 1 page.

Lamnan et al., Analytical and Clinical Validation of a Digital Sequencing Panel for Quantitative, Highly Accurate Evaluation of Cell-Free Circulating Tumor DNA. PLoS One. Oct. 16, 2015;10(10):e0140712. doi: 10.1371/journal.pone.0140712.

Landolt et al., Clear Cell Renal Cell Carcinoma is linked to Epithelial-to-Mesenchymal Transition and to Fibrosis. Physiol Rep. Jun. 2017;5(11):e13305. doi: 10.14814/phy2.13305. Erratum in: Physiol Rep. Apr. 2018;6(8):e13671. doi: 10.14814/phy2.13671.

Lani et al., Identification of high affinity, highly selective bicyclic peptides (Bicycles®) to transmembrane proteins using phage display screening on whole cells. Abstract. PEGS Summit, Boston, Massachusetts. May 2017. 1 page.

Lau et al., A penicillin-binding protein that can promote advanced-generation cephalosporin resistance and genome adaptation in the opportunistic pathogen Pseudomonas aeruginosa. Int J Antimicrob Agents. Mar. 2020;55(3):105896. doi: 10.1016/j.ijantimicag.2020.105896. Epub Jan. 10, 2020.

Laudanski et al., Increased serum level of membrane type 1-matrix metalloproteinase (MT1-MMP/MMP-14) in patients with breast cancer. Folia Histochem Cytobiol. Jan. 1, 2010;48(1):101-3. doi: 10.2478/v10042-009-0085-0.

Lea et al., Fluorescence polarization assays in small molecule screening. Expert Opin Drug Discov. Jan. 2011;6(1):17-32. doi: 10.1517/17460441.2011.537322.

Levi et al., Characterization of tumor infiltrating natural killer cell subset. Oncotarget. May 30, 2015;6(15):13835-43. doi: 10.18632/oncotarget.3453.

Levine et al. Methionine residues as endogenous antioxidants in proteins. Proc Natl Acad Sci U S A. Dec. 24, 1996;93(26):15036-40. doi: 10.1073/pnas.93.26.15036.

Li et al., A novel strategy for in vitro selection of peptide-drug conjugates. Chem Biol. Mar. 2003;10(3):233-9. doi: 10.1016/s1074-5521(03)00047-4.

Li et al., Fluorescent mu selective opioid ligands from a mixture based cyclic peptide library. ACS Comb Sci. Dec. 10, 2012;14(12):673-9. doi: 10.1021/co300110t. Epub Nov. 8, 2012.

Li et al., Increasing the Antimicrobial Activity of Nisin-Based Lantibiotics against Gram-Negative Pathogens. Appl Environ Microbiol. May 31, 2018;84(12):e00052-18. doi: 10.1128/AEM.00052-18.

Li et al., Targeting the Fc receptor in autoimmune disease. Expert Opin Ther Targets. Mar. 2014;18(3):335-50. doi: 10.1517/14728222.2014.877891.

Li et al., The overexpression membrane type 1 matrix metalloproteinase is associated with the progression and prognosis in breast cancer. Am J Transl Res. Jan. 15, 2015;7(1):120-7.

Lian et al., Cell-permeable bicyclic peptide inhibitors against intracellular proteins. J Am Chem Soc. Jul. 16, 2014;136(28):9830-3. doi: 10.1021/ja503710n. Epub Jul. 2, 2014.

Lian et al., Screening bicyclic peptide libraries for protein-protein interaction inhibitors: discovery of a tumor necrosis factor-α antagonist. J Am Chem Soc. Aug. 14, 2013;135(32):11990-5. doi: 10.1021/ja405106u. Epub Aug. 1, 2013.

Linde et al., Structure-activity relationship and metabolic stability studies of backbone cyclization and N-methylation of melanocortin peptides. Biopolymers. 2008;90(5):671-82. doi: 10.1002/bip.21057.

Lindstrom et al., Myasthenia gravis. Adv Immunol. 1988;42:233-84. doi: 10.1016/s0065-2776(08)60847-0.

Liu et al., Plasma cells from multiple myeloma patients express B7-H1 (PD-L1) and increase expression after stimulation with IFN-{gamma} and TLR ligands via a MyD88-, TRAF6-, and MEK-dependent pathway. Blood. Jul. 1, 2007;110(1):296-304. doi: 10.1182/blood-2006-10-051482. Epub Mar. 15, 2007.

Loriot et al., Abstract TPS4619: A phase 2/3 study of Bicycle® Toxin Conjugate zelenectide pevedotin (BT8009) targeting Nectin-4 in patients with locally advanced or metastatic urothelial cancer (la/mUC) (Duravelo-2). American Society of Clinical Oncology Annual Meeting, May 31-Jun. 4, 2024, 1 page.

Lopus, M., Antibody-DM1 conjugates as cancer therapeutics. Cancer Lett. Aug. 28, 2011;307(2):113-8. doi: 10.1016/j.canlet.2011.03.017. Epub Apr. 9, 2011.

Lovering et al. Escape from flatland: increasing saturation as an approach to improving clinical success. J Med Chem. Nov. 12, 2009;52(21):6752-6. doi: 10.1021/jm901241e.

Lovering, Escape from Flatland 2: complexity and promiscuity. Medicinal Chemistry Communication. Dec. 2012;4(3):515-519. doi: 10.1039/C2MD20347B.

Lowe, Not Alphafold's Fault, blog—In the pipeline, Sep. 7, 2022, 6 pages.

Lowe, The Good Sides and Bad Sides of Polar Compounds, blog—In the pipeline, Feb. 23, 2017, 15 pages.

Ludbrook, Bicycle Toxin Conjugates to Target Solid Tumors. 3rd ADC Target Selection Summit, Dec. 6, 2023, 20 pages.

Luus et al., Abstract 1832: EphA2-dependent CD137 agonism and anti-tumor efficacy by BT7455, a Bicycle tumor-targeted immune cell agonist®. American Association for Cancer Research Annual Meeting, Apr. 17, 2023, 1 page.

M.D. Anderson Cancer Center, "Nivolumab and HPV-16 Vaccination in Patients With HPV-16 Positive Incurable Solid Tumors," In ClinicalTrials.gov Identifier NCT02426892. Retreived form https://clinicaltrials.gov/ct2/show/study/NCT02426892, 2015.

Macfarlane et al., NK cell dysfunction in chronic lymphocytic leukemia is associated with loss of the mature cells expressing inhibitory killer cell Ig-like receptors. Oncoimmunology. May 19, 2017;6(7):e1330235. doi: 10.1080/2162402X.2017.1330235.

Macheboeuf et al., Penicillin binding proteins: key players in bacterial cell cycle and drug resistance processes. FEMS Microbiol Rev. Sep. 2006;30(5):673-91. doi: 10.1111/j.1574-6976.2006.00024.x.

Mamessier et al., Human breast tumor cells induce self-tolerance mechanisms to avoid NKG2D-mediated and DNAM-mediated NK cell recognition. Cancer Res. Nov. 1, 2011;71(21):6621-32. doi: 10.1158/0008-5472.CAN-11-0792. Epub Sep. 21, 2011.

Manches et al., In vitro mechanisms of action of rituximab on primary non-Hodgkin lymphomas. Blood. Feb. 1, 2003;101(3):949-54. doi: 10.1182/blood-2002-02-0469. Epub Oct. 3, 2002.

Mark J.R, Renal Cell Carcinoma (Adenocarcinoma of the Kidneys). Merck Manual. Retrieved from: https://www.merckmanuals.com/home/kidney-and-urinary-tract-disorders/cancers-of-the-kidney-and-genitourinary-tract/kidney-cancer. Sep. 30, 2021. 4 pages.

Marks et al., By-passing immunization. Human antibodies from V-gene libraries displayed on phage. J Mol Biol. Dec. 5, 1991;222(3):581-97. doi: 10.1016/0022-2836(91)90498-u.

Maron et al., H-2K mutation controls immune response phenotype of autoimmune thyroiditis. Critical expression of mutant gene

(56) References Cited

OTHER PUBLICATIONS product in both thymus and thyroid glands. J Exp Med. Oct. 1, 1980;152(4):1115-20. doi: 10.1084/jem.152.4.1115.
McDonnell, Bicycles for precision guided delivery. Boulder Peptide Symposium, Nov. 9, 2022, 29 pages.
Mckean et al., A Combined Phase I/II Study of BT8009 a Novel Bicycle® Toxin Conjugate with MMAE in Patients with Advanced Malignancies with Nectin-4. ASCO, Jun. 4, 2021, 1 page.
Mckean et al., BT8009-100 Phase I/II Study of Novel Bicyclic Peptide and MMAE Conjugate BT8009 in Patients with Advanced Malignancies Associated with Nectin-4 Expression. American Association for Cancer Research, Apr. 8-13, 2022, 17 pages.
Mckean et al., BT8009-1 00 Phase I/II Study of the Safety, Pharmacokinetics, & Preliminary Clinical Activity of BT8009 in Patients with Nectin-4 Expressing Advanced Malignancies. ESMO, Sep. 17, 2020, 1 page.
Mckean., A first in class phase I/II study of the novel bicyclic peptide and MMAE conjugate, BT5528, in patients with advanced malignancies associated with EphA2 expression. AACR-NCI-EORTC, Oct. 7-10, 2021, 19 pages.
Mcfarlin et al., Experimental allergic encephalomyelitis in the rat: response to encephalitogenic proteins and peptides. Science. Feb. 2, 1973;179(4072):478-80. doi: 10.1126/science.179.4072.478.
Michel et al., Expression of soluble CD137 correlates with activation-induced cell death of lymphocytes. Cytokine. Jun. 2000;12(6):742-6. doi: 10.1006/cyto.1999.0623.
Micoine et al., A general Strategy for Ligation of Organic and Biological Molecules to Dawson and Keggin Polyoxotungstates. Organic Letters, Jul. 18, 2007, 9(20):3981-3984.
Milowsky et al., Phase 1/2 multiple ascending dose trial of the prostate-specific membrane antigen-targeted antibody drug conjugate MLN2704 in metastatic castration-resistant prostate cancer. Urol Oncol. Dec. 2016;34(12):530.e15-530.e21. doi: 10.1016/j.urolonc.2016.07.005. Epub Oct. 17, 2016. Author Manuscript, 16 pages.
Mistry et al., Abstract 15523: Establishing the preclinical/translational PK/PD relationship for BT7480, a Nectin4/CD137 Bicycle tumor-targeted immune cell agonist™ (Bicycle TICA™). SITC, Nov. 12, 2021, 1 page.
Mistry et al., Synthesis of Bicycle® Peptides using Gold-mediated Cysteine Arylation. European Peptide Synthesis Conference. Mar. 7, 2023, 1 page.
Mittler el al., Anti-CD137 antibodies in the treatment of autoimmune disease and cancer. Immunol Res. 2004;29(1-3):197-208. doi: 10.1385/IR:29:1-3:197.
Miyoshi et al., Nectin and nectin-like molecules: biology and pathology. Am J Nephrol. 2007;27(6):590-604. doi: 10.1159/000108103. Epub Sep. 6, 2007.
Mohammad et al., Prognostic value of membrane type 1 and 2 matrix metalloproteinase expression and gelatinase A activity in bladder cancer. Int J Biol Markers. Apr.-Jun. 2010;25(2):69-74. doi: 10.1177/172460081002500202.
Moore et al., A novel bispecific antibody format enables simultaneous bivalent and monovalent co-engagement of distinct target antigens. MAbs. Nov.-Dec. 2011;3(6):546-57. doi: 10.4161/mabs.3.6.18123. Epub Nov. 1, 2011.
Moretta et al., Surface NK receptors and their ligands on tumor cells. Semin Immunol. Jun. 2006;18(3):151-8. doi: 10.1016/j.smim.2006.03.002. Epub May 26, 2006.
Morgan et al., FcgammaRIIIA-158V and rheumatoid arthritis: a confirmation study. Rheumatology (Oxford). Apr. 2003;42(4):528-33. doi: 10.1093/rheumatology/keg169.
Mudd et al., Bicyclic Peptides for Positron Emission Tomography (PET) Imaging of MT1-MMP Expressing tumours. PEGS, Apr. 30, 2017, 1 page.
Mudd et al., Discovery of BT8009: A Nectin-4 Targeting Bicycle Toxin Conjugate for the Treatment of Cancer. Journal of Medicinal Chemistry, 2022, 65(21): 14261-14970.
Mudd et al., Gold-Mediated Multiple Cysteine Arylation for the Construction of Highly Constrained Bicycle Peptides. Bioconjugate Chemistry, 2022, 33(8):1441-1445.
Mudd et al., Potent anti-tumor activity of a Lead-212 labelled MT1-MMP targeting Bicycle Radionuclide ConjugateTM. Tides USA—Oligonucleotide, May 8, 2023, 1 page.
Mugera et al., Acute toxicity of maytansine in F344 rats. Cancer Treat Rep. Oct. 1977;61(7):1333-8.
Mullis et al., Specific synthesis of DNA in vitro via a polymerase-catalyzed chain reaction. Methods Enzymol. 1987;155:335-50. doi: 10.1016/0076-6879(87)55023-6.
Muta et al., A 13-amino-acid motif in the cytoplasmic domain of Fc gamma RIIB modulates B-cell receptor signalling. Nature. Mar. 3, 1994;368(6466):70-3. doi: 10.1038/368070a0. Erratum in: Nature. May 26, 1994;369(6478):340. doi: 10.1038/369340a0.
Nabbe et al., Coordinate expression of activating Fc gamma receptors I and III and inhibiting Fc gamma receptor type II in the determination of joint inflammation and cartilage destruction during immune complex-mediated arthritis. Arthritis Rheum. Jan. 2003;48(1):255-65. doi: 10.1002/art.10721.
Nair et al., Mimicry of native peptide antigens by the corresponding retro-inverso analogs is dependent on their intrinsic structure and interaction propensities. J Immunol. Feb. 1, 2003;170(3):1362-73. doi: 10.4049/jimmunol.170.3.1362.
Nakanishi et al., Overexpression of B7-H1 (PD-L1) significantly associates with tumor grade and postoperative prognosis in human urothelial cancers. Cancer Immunol Immunother. Aug. 2007;56(8):1173-82. doi: 10.1007/s00262-006-0266-z. Epub Dec. 22, 2006.
Nam et al., The therapeutic potential of 4-1BB (CD137) in cancer. Curr Cancer Drug Targets. Aug. 2005;5(5):357-63. doi: 10.2174/1568009054629681.
Nayyar et al., Overcoming Resistance to Natural Killer Cell Based Immunotherapies for Solid Tumors. Front Oncol. Feb. 11, 2019;9:51. doi: 10.3389/fonc.2019.00051.
Nestor J., The medicinal chemistry of peptides. Curr Med Chem. 2009; 16(33):4399-418. doi: 10.2174/092986709789712907.
Newman, Characterisation of novel, noncovalent cyclic peptide (Bicycles®) inhibitors of PBP3s from important Gram-negative pathogens. ESCMID, Oct. 11, 2022, 18 pages.
Newman et al., Anti-Infectives Drug Discovery at Bicycle Therapeutics. ESCMID, Oct. 11, 2022, 1 page.
Ngo et al., Abstract 333: Activity of the erythropoietin-producing hepatocellular A2 receptor (EphA2) targeting Bicycle® Toxin Conjugate (BTC™) BCY6033 in EGFR inhibitor resistant non-small cell lung cancer (NSCLC) patient derived xenografts. American Association for Cancer Research, Apr. 8, 2022, 1 page.
Nguyen., Colorectal Cancer, Merck Manual, Retrieved from https://www.merckmanuals.com/professional/gastrointestinal-disorders/tumors-of-the-gastrointestinal-tract/colorectal-cancer, 2021.
Nishiwada et al., Nectin-4 expression contributes to tumor proliferation, angiogenesis and patient prognosis in human pancreatic cancer. J Exp Clin Cancer Res. Mar. 28, 2015;34(1):30. doi: 10.1186/s13046-015-0144-7.
Nissim et al., Antibody fragments from a 'single pot' phage display library as immunochemical reagents. EMBO J. Feb. 1, 1994;13(3):692-8. doi: 10.1002/j.1460-2075.1994.tb06308.x.
Nomi et al., Clinical significance and therapeutic potential of the programmed death-1 ligand/programmed death-1 pathway in human pancreatic cancer. Clin Cancer Res. Apr. 1, 2007;13(7):2151-7. doi: 10.1158/1078-0432.CCR-06-2746.
Oehlke et al., Cellular uptake of an alpha-helical amphipathic model peptide with the potential to deliver polar compounds into the cell interior non-endocytically. Biochim Biophys Acta. Nov. 11, 1998;1414(1-2):127-39. doi: 10.1016/s0005-2736(98)00161-8.
Okazaki et al., A rheostat for immune responses: the unique properties of PD-1 and their advantages for clinical application. Nat Immunol. Dec. 2013;14(12):1212-8. doi: 10.1038/ni.2762.
Okuyama et al., Small-molecule mimics of an alpha-helix for efficient transport of proteins into cells. Nat Methods. Feb. 2007;4(2):153-9. doi: 10.1038/nmeth997. Epub Jan. 14, 2007.

(56) References Cited

OTHER PUBLICATIONS

Ortiz et al., Elucidating the interplay between IgG-Fc valency and FcγR activation for the design of immune complex inhibitors. Sci Transl Med. Nov. 16, 2016;8(365):365ra158. doi: 10.1126/scitranslmed.aaf9418.

Pahwa et al., Monitoring and Inhibiting MT1-MMP during Cancer Initiation and Progression. Cancers (Basel). Feb. 17, 2014;6(1):416-35. doi: 10.3390/cancers6010416.

Palma et al., CD137 and CD137 Ligand Constitutively Coexpressed on Human T and B Leukemia Cells Signal Proliferation and Survival. Int J Cancer. 2004, 108(3):390-398.

Papadopoulos et al., Abstract TPS2689: Combined Phase I/II Study of a Novel Bicycle Tumortargeted Immune Cell Agonist® BT7480 in Patients with Nectin-4 Associated Advanced Malignancies. ASCO, Jun. 6, 2022, 1 page.

Park et al., Abstract 3756: Small Synthetic, Multivalent Bicyclic Peptides That Activate T Cell Costimulatory Protein CD137. American Association of Cancer Research, Apr. 14, 2018, 1 page.

Park et al., Abstract 3756: Small Synthetic, Multivalent Bicyclic Peptides That Activate T Cell Costimulatory Protein CD137. Elrig Drug Discovery, Oct. 9, 2018, 1 page.

Park et al., Abstract 3756: Small Synthetic, Multivalent Bicyclic Peptides That Activate T Cell Costimulatory Protein CD137. Cancer Res., Jul. 1, 2018, 78(13_Supplement):3756, 2 pages.

Pasero et al., Highly effective NK cells are associated with good prognosis in patients with metastatic prostate cancer. Oncotarget. Jun. 10, 2015;6(16):14360-73. doi: 10.18632/oncotarget.3965.

Pavlidou et al., Nanodiscs allow phage display selection for ligands to non-linear epitopes on membrane proteins. PLoS One. Sep. 9, 2013;8(9):e72272. doi: 10.1371/journal.pone.0072272.

Pavlova et al., A role for PVRL4-driven cell-cell interactions in tumorigenesis. Elife. Apr. 30, 2013;2:e00358. doi: 10.7554/eLife.00358.

Pearson et al., High-Level Clonal FGFR Amplification and Response to FGFR Inhibition in a Translational Clinical Trial. Cancer Discov. Aug. 2016;6(8):838-851. doi: 10.1158/2159-8290.CD-15-1246. Epub May 13, 2016.

Peng et al., Combined features based on MT1-MMP expression, CD11b + immunocytes density and LNR predict clinical outcomes of gastric cancer. J Transl Med. Jun. 20, 2013;11:153. doi: 10.1186/1479-5876-11-153.

Phichith et al., Novel peptide inhibiting both TEM-1 β-lactamase and penicillin-binding proteins. FEBS J. Dec. 2010;277(23):4965-72. doi: 10.1111/j.1742-4658.2010.07906.x. Epub Nov. 2, 2010.

Pivot et al., Pooled analyses of eribulin in metastatic breast cancer patients with at least one prior chemotherapy. Ann Oncol. Aug. 2016;27(8):1525-31. doi: 10.1093/annonc/mdw203. Epub May 13, 2016.

Platonova et al., Profound coordinated alterations of intratumoral NK cell phenotype and function in lung carcinoma. Cancer Res. Aug. 15, 2011;71(16):5412-22. doi: 10.1158/0008-5472.CAN-10-4179. Epub Jun. 27, 2011.

Polakis P., Antibody Drug Conjugates for Cancer Therapy. Pharmacol Rev. Jan. 2016;68(1):3-19. doi: 10.1124/pr.114.009373.

Poon et al., Preclinical safety profile of trastuzumab emtansine (T-DM1): mechanism of action of its cytotoxic component retained with improved tolerability. Toxicol Appl Pharmacol. Dec. 1, 2013;273(2):298-313. doi: 10.1016/j.taap.2013.09.003. Epub Sep. 12, 2013.

Poreba M., Protease-activated prodrugs: strategies, challenges, and future directions. FEBS J. May 2020;287(10):1936-1969. doi: 10.1111/febs.15227. Epub Feb. 26, 2020.

Pricop et al., Differential modulation of stimulatory and inhibitory Fc gamma receptors on human monocytes by Th1 and Th2 cytokines. J Immunol. Jan. 1, 2001;166(1):531-7. doi: 10.4049/jimmunol.166.1.531.

Purdie et al., Piperazinedione formation from esters of dipeptides containing glycine, alanine, and sarcosine: the kinetics in aqueous solution. Journal of the Chemical Society, Perkin Transactions 2, 1973, 14: 1845-1852. doi.org/10.1039/P29730001845.

Qi et al., Serial determination of glomerular filtration rate in conscious mice using FITC-inulin clearance. Am J Physiol Renal Physiol. Mar. 2004;286(3):F590-6. doi: 10.1152/ajprenal.00324.2003. Epub Nov. 4, 2003.

Rajendran et al., CD137 signaling in Hodgkin and Reed-Sternberg cell lines induces IL-13 secretion, immune deviation and enhanced growth. Oncoimmunology, 2016, 5(6):e1160188, 7 pages.

Rataj et al., High-affinity CD16-polymorphism and Fc-engineered antibodies enable activity of CD16-chimeric antigen receptor-modified T cells for cancer therapy. Br J Cancer. Jan. 2019;120(1):79-87. doi: 10.1038/s41416-018-0341-1. Epub Nov. 15, 2018.

Ravetch et al., IgG Fc receptors. Annu Rev Immunol. 2001;19:275-90. doi: 10.1146/annurev.immunol.19.1.275.

Reinertsen et al., B-lymphocyte alloantigens associated with systemic lupus erythematosus. N Engl J Med. Sep. 7, 1978;299(10):515-8. doi: 10.1056/NEJM197809072991004.

Remacle et al., Membrane type I-matrix metalloproteinase (MT1-MMP) is internalised by two different pathways and is recycled to the cell surface. J Cell Sci. Oct. 1, 2003;116(Pt 19):3905-16. doi: 10.1242/jcs.00710. Epub Aug. 12, 2003.

Repash et al., BT7480, a novel fully synthetic tumor-targeted immune cell agonist (TICA™) induces tumor localized CD137 agonism. AACR Tumor Immunology & Immunotherapy, Oct. 19, 2020, 10 pages.

Rezvaya et al., Abstract 1207: NKp46 engaging Bicycle NK-TICA® drives tumor targeted cytotoxicity. SITC, Nov. 10, 2022, 1 page.

Rhodes et al., Bicyclic Peptides as Next-Generation Therapeutics. Chemistry. Sep. 18, 2017;23(52):12690-12703. doi: 10.1002/chem.201702117. Epub Jul. 27, 2017. Author Manuscript, 27 pages.

Riddle et al., Tumor cell surface display of immunoglobulin heavy chain Fc by gene transfer as a means to mimic antibody therapy. Hum Gene Ther. Jul. 2005;16(7):830-44. doi: 10.1089/hum.2005.16.830.

Rietschoten et al., Abstract 268: Small Synthetic, Multivalent Bicyclic Peptides That Activate T Cell Costimulatory Protein CD137. 35th European Peptide Symposium, Aug. 1, 2018, 1 page.

Rigby et al., Abstract C061: BT8009, a Bicycle® Toxin Conjugate targeting Nectin-4, shows target selectivity, and efficacy in preclinical large and small tumor models. AACR-NCI-EORTC, Oct. 29, 2019, 1 page.

Rigby et al., BT8009; A Nectin-4 Targeting Bicycle® Toxin Conjugate for Treatment of Solid Tumors. Molecular Cancer Therapeutics, 2022, 21(12):1-27.

Rigby, Abstract 4479: BT8009: A bicyclic peptide toxin conjugate targeting Nectin-4 (PVRL4) displays efficacy in preclinical tumour models. AACR Annual Meeting, Apr. 2, 2019, 10 pages.

Robinson et al., Integrative clinical genomics of advanced prostate cancer. Cell. May 21, 2015;161(5):1215-1228. doi: 10.1016/j.cell.2015.05.001. Erratum in: Cell. Jul. 16, 2015;162(2):454.

Rocca et al., Phenotypic and Functional Dysregulated Blood NK Cells in Colorectal Cancer Patients Can Be Activated by Cetuximab Plus IL-2 or IL-15. Front Immunol. Oct. 10, 2016;7:413. doi: 10.3389/fimmu.2016.00413.

Rodon et al., Cantuzumab mertansine in a three-times a week schedule: a phase I and pharmacokinetic study. Cancer Chemother Pharmacol. Oct. 2008;62(5):911-9. doi: 10.1007/s00280-007-0672-8. Epub Feb. 27, 2008.

Ross et al., Bispecific T cell engager (BiTE®) antibody constructs can mediate bystander tumor cell killing. PLoS One. Aug. 24, 2017;12(8):e0183390. doi: 10.1371/journal.pone.0183390.

Roth et al., Docetaxel, cisplatin, and fluorouracil; docetaxel and cisplatin; and epirubicin, cisplatin, and fluorouracil as systemic treatment for advanced gastric carcinoma: a randomized phase II trial of the Swiss Group for Clinical Cancer Research. J Clin Oncol. Aug. 1, 2007;25(22):3217-23. doi: 10.1200/JCO.2006.08.0135.

Rothwell et al, Utility of ctDNA to support patient selection for early phase clinical trials: the Target study. Nat Med. May 2019;25(5):738-743. doi: 10.1038/s41591-019-0380-z. Epub Apr. 22, 2019.

(56) References Cited

OTHER PUBLICATIONS

Rudgers et al., Binding properties of a peptide derived from beta-lactamase inhibitory protein. Antimicrob Agents Chemother. Dec. 2001;45(12):3279-86. doi: 10.1128/AAC.45.12.3279-3286. 2001.

Salmon et al., Human receptors for immunoglobulin G: key elements in the pathogenesis of rheumatic disease. Arthritis Rheum. Apr. 2001;44(4):739-50. doi: 10.1002/1529-0131(200104)44:4<739::AID-ANR129>3.0.CO;2-O.

Santos et al., Abstract 35472: Characterization of Nectin-4 protein expression in non-small cell lung cancer patients. AACR-BC-EORTC, Oct. 13, 2023, 1 page.

Satoh et al., Experimental allergic encephalomyelitis mediated by murine encephalitogenic T cell lines specific for myelin proteolipid apoprotein. J Immunol. Jan. 1, 1987;138(1):179-84.

Sausville et al., Contributions of human tumor xenografts to anticancer drug development. Cancer Res. Apr. 1, 2006;66(7):3351-4, discussion 3354. doi: 10.1158/0008-5472.CAN-05-3627.

Scagliotti et al., Phase III study comparing cisplatin plus gemcitabine with cisplatin plus pemetrexed in chemotherapy-naive patients with advanced-stage non-small-cell lung cancer. J Clin Oncol. Jul. 20, 2008;26(21):3543-51. doi: 10.1200/JCO.2007.15.0375. Epub May 27, 2008.

Schiller et al., Comparison of four chemotherapy regimens for advanced non-small-cell lung cancer. N Engl J Med. Jan. 10, 2002;346(2):92-8. doi: 10.1056/NEJMoa011954.

Schreiber et al., Rapid, electrostatically assisted association of proteins. Nat Struct Biol. May 1996;3(5):427-31. doi: 10.1038/nsb0596-427 . . . .

Seely et al., Regulatory Forum Opinion Piece: Dispelling Confusing Pathology Terminology: Recognition and Interpretation of Selected Rodent Renal Tubule Lesions. Toxicol Pathol. Jun. 2015;43(4):457-63. doi: 10.1177/0192623315573044. Epub Apr. 12, 2015.

Segal et al., Results from an Integrated Safety Analysis of Urelumab, an Agonist Anti-CD137 Monoclonal Antibody. Clin Cancer Res. Apr. 15, 2017;23(8):1929-1936. doi: 10.1158/1078-0432.CCR-16-1272. Epub Oct. 18, 2016.

Seiki M., Membrane-type 1 matrix metalloproteinase: a key enzyme for tumor invasion. Cancer Lett. May 8, 2003;194(1):1-11. doi: 10.1016/s0304-3835(02)00699-7.

Sepiashvili et al., Potentially novel candidate biomarkers for head and neck squamous cell carcinoma identified using an integrated cell line-based discovery strategy. Mol Cell Proteomics. Nov. 2012;11(11):1404-15. doi: 10.1074/mcp.M112.020933. Epub Aug. 23, 2012.

Shaabani et al., A patent review on PD-1/PD-L1 antagonists: small molecules, peptides, and macrocycles (2015-2018). Expert Opin Ther Pat. Sep. 2018;28(9):665-678. doi: 10.1080/13543776.2018. 1512706. Epub Sep. 10, 2018.

Shah et al., Abstract A28: Establishment of an ex vivo tissue culture platform as a preclinical model to assess the mechanism of action of Bicycle® tumor-targeted immune cell agonists in NSCLC. AACR-BC-EORTC, Oct. 26, 2022, 1 page.

Shah et al., Phase I study of IMGN901, a CD56-targeting antibody-drug conjugate, in patients with CD56-positive solid tumors. Invest New Drugs. Jun. 2016;34(3):290-9. doi: 10.1007/s10637-016-0336-9. Epub Mar. 9, 2016.

Shah M., Update on metastatic gastric and esophageal cancers. J Clin Oncol. Jun. 1, 2015;33(16):1760-9. doi: 10.1200/JCO.2014. 60.1799. Epub Apr. 27, 2015.

Shao et al., Copy number variation is highly correlated with differential gene expression: a pan-cancer study. BMC Med Genet. Nov. 9, 2019;20(1):175. doi: 10.1186/s12881-019-0909-5.

Shao, et al., CD137 ligand, a member of the tumor necrosis factor family, regulates immune responses via reverse signal transduction. J Leukoc Biol. Jan. 2011;89(1):21-9. doi: 10.1189/jlb.0510315. Epub Jul. 19, 2010.

Sharma et al., Plasmacytoid dendritic cells from mouse tumor-draining lymph nodes directly activate mature Tregs via indoleamine 2,3-dioxygenase. J Clin Invest. Sep. 2007;117(9):2570-82. doi: 10.1172/JCI31911.

Shen et al., Evaluation of phage display discovered peptides as ligands for prostate-specific membrane antigen (PSMA). PLoS One. Jul. 25, 2013;8(7):e68339. doi: 10.1371/journal.pone.0068339.

Shen et al., Non-Clinical Disposition and Metabolism of DM1, a Component of Trastuzumab Emtansine (T-DM1), in Sprague Dawley Rats. Drug Metab Lett. 2015;9(2):119-31. doi: 10.2174/1872312809666150602151922.

Shimauchi et al., Augmented expression of programmed death-1 in both neoplastic and non-neoplastic CD4+ T-cells in adult T-cell leukemia/lymphoma. Int J Cancer. Dec. 15, 2007;121(12):2585-90. doi: 10.1002/ijc.23042.

Sibaud et al., [Pigmentary disorders induced by anticancer agents. part I: chemotherapy]. Ann Dermatol Venereol. Mar. 2013;140(3):183-96. French. doi: 10.1016/j.annder.2012.12.012. Epub Jan. 11, 2013.

Siddharth et al., Nectin-4 is a breast cancer stem cell marker that induces WNT/β-catenin signaling via Pi3k/Akt axis. Int J Biochem Cell Biol. Aug. 2017;89:85-94. doi: 10.1016/j.biocel.2017.06.007. Epub Jun. 7, 2017.

Silver L., Multi-targeting by monotherapeutic antibacterials. Nat Rev Drug Discov. Jan. 2007;6(1):41-55. doi: 10.1038/nrd2202. Erratum in: Nat Rev Drug Discov. Feb. 2007;6(2):126.

Singh et al., Protein Engineering Approaches in the Post-Genomic Era. Current Protein and Peptide Science, 2017, 18:1-11.

Skynner et al., BT1718, a novel Bicycle Drug Conjugate® shows potent anti-tumor activity in diverse cell-derived and patient-derived tumor xenograft models. PEGS, Apr. 30, 2017, 1 page.

Soderstrom, et al., CD137: A checkpoint regulator involved in atherosclerosis. Atherosclerosis. May 2018;272:66-72. doi: 10.1016/j.atherosclerosis.2018.03.007. Epub Mar. 5, 2018.

Solomons, Organic Chemistry, 4th ed, 1988, p. 902. 3 pages.

Sordo-Bahamonde et al., Mechanisms of Resistance to NK Cell Immunotherapy. Cancers (Basel). Apr. 7, 2020;12(4):893. doi: 10.3390/cancers12040893.

Sporn et al., Chemoprevention of cancer. Carcinogenesis. Mar. 2000;21(3):525-30. doi: 10.1093/carcin/21.3.525.

Stanczuk et al., Abstract 1388: Utility of humanized animal models for in vivo evaluation of NK-TICA®, novel Bicycle® tumor-targeted immune cell agonist® (Bicycle TICA®) designed to engage NK cells. SITC, Nov. 10, 2022, 1 page.

Stanczuk et al., Abstract 1826: Development of in vivo models for evaluation of NK-TICA™, novel Bicycle® tumortargeted immune cell agonist® designed to engage NK cells. American Association for Cancer Research Annual Meeting, Apr. 17, 2023, 1 page.

Stathis et al., A Phase I Study of IMGN529, an Antibody-Drug Conjugate (ADC) Targeting CD37, in Adult Patients with Relapsed or Refractory B-Cell Non-Hodgkin's Lymphoma (NHL). Blood. Dec. 6, 2014; 124(21): 1760. doi.org/10.1182/blood.V124.21.1760. 1760.

Steck et al., Inside-out red cell membrane vesicles: preparation and purification. Science. Apr. 10, 1970;168(3928):255-7. doi: 10.1126/science.168.3928.255.

Stojanovic et al., Natural killer cells and solid tumors. J Innate Immun. 2011;3(4):355-64. doi: 10.1159/000325465. Epub Apr. 18, 2011.

Stringaris et al., Leukemia-induced phenotypic and functional defects in natural killer cells predict failure to achieve remission in acute myeloid leukemia. Haematologica. May 2014;99(5):836-47. doi: 10.3324/haematol.2013.087536. Epub Jan. 31, 2014.

Strome et al., B7-H1 blockade augments adoptive T-cell immunotherapy for squamous cell carcinoma. Cancer Res. Oct. 1, 2003;63(19):6501-5.

Stuart et al., Collagen autoimmune arthritis. Annu Rev Immunol. 1984;2:199-218. doi: 10.1146/annurev.iy.02.040184.001215.

Su, Key DMPK Attributes of BT7480, a Bicycle Tumor-targeted Immune Cell Agonist™ Targeting Nectin-4 and Agonizing CD137. NEDMDG symposium, May 31, 2023, 20 pages.

(56) References Cited

OTHER PUBLICATIONS

Sun et al., NK cell receptor imbalance and NK cell dysfunction in HBV infection and hepatocellular carcinoma. Cell Mol Immunol. May 2015;12(3):292-302. doi: 10.1038/cmi.2014.91. Epub Oct. 13, 2014.

Suojanen et al., A novel and selective membrane type-1 matrix metalloproteinase (MT1-MMP) inhibitor reduces cancer cell motility and tumor growth. Cancer Biol Ther. Dec. 2009;8(24):2362-70. doi: 10.4161/cbt.8.24.10139. Epub Dec. 19, 2009.

Tarazona et al., Current progress in NK cell biology and NK cell-based cancer immunotherapy. Cancer Immunol Immunother. May 2020;69(5):879-899. doi: 10.1007/s00262-020-02532-9. Epub Mar. 4, 2020.

Tetu et al., The influence of MMP-14, TIMP-2 and MMP-2 expression on breast cancer prognosis. Breast Cancer Res. 2006;8(3):R28. doi: 10.1186/bcr1503. Epub Jun. 15, 2006.

Teufel et al., Abstract 4920: Bicyclic Peptides for Positron Emission Tomography (PET) Imaging of MT1-MMP Expressing Tumors. American Association of Cancer Research, Apr. 1, 2017, 1 page.

Thake et al., Toxicity of Maytansine (NSC 153858) in dogs and monkeys.PB-US National Technical Information Service (1975). Feb. 28, 1975. 244628.

Thevenard et al., The YSNSG cyclopeptide derived from tumstatin inhibits tumor angiogenesis by down-regulating endothelial cell migration. Int J Cancer. Mar. 1, 2010;126(5):1055-66. doi: 10.1002/ijc.24688.

Thompson et al., Costimulatory B7-H1 in renal cell carcinoma patients: Indicator of tumor aggressiveness and potential therapeutic target. Proc Natl Acad Sci U S A. Dec. 7, 2004;101(49):17174-9. doi: 10.1073/pnas.0406351101. Epub Nov. 29, 2004.

Thornber, Isosterism and Molecular Modification in Drug Design. Chem. Soc. Rev, 1979, 8(4):563-580.

Tiberghien, Highlighting the Potential of Bicycle Conjugates to Target Solid Tumours. World ADC, Mar. 20, 2023, 24 pages.

Timmerman et al., Rapid and quantitative cyclization of multiple peptide loops onto synthetic scaffolds for structural mimicry of protein surfaces. Chembiochem. May 2005;6(5):821-4. doi: 10.1002/cbic.200400374.

Tolcher et al., Cantuzumab mertansine, a maytansinoid immunoconjugate directed to the CanAg antigen: a phase I, pharmacokinetic, and biologic correlative study. J Clin Oncol. Jan. 15, 2003;21(2):211-22. doi: 10.1200/JCO.2003.05.137.

Toogood P., Small molecule immuno-oncology therapeutic agents. Bioorg Med Chem Lett. Feb. 1, 2018;28(3):319-329. doi: 10.1016/j.bmcl.2017.12.044. Epub Dec. 20, 2017.

Touati J., Phage Selection of Bicyclic Peptide Ligands and Development of a New Peptide Cyclisation Method. Ecole Polytechnique Fédérale de Lausanne. Thesis No. 5536. Oct. 19, 2012. 117 pages.

Trouche et al., Small multivalent architectures mimicking homotrimers of the TNF superfamily member CD40L: delineating the relationship between structure and effector function. J Am Chem Soc. Nov. 7, 2007;129(44):13480-92. doi: 10.1021/ja073169m. Epub Oct. 13, 2007.

Trudel et al., Membrane-type-1 matrix metalloproteinase, matrix metalloproteinase 2, and tissue inhibitor of matrix proteinase 2 in prostate cancer: identification of patients with poor prognosis by immunohistochemistry. Hum Pathol. May 2008;39(5):731-9. doi: 10.1016/j.humpath.2007.09.021. Epub Mar. 10, 2008.

Tugyi et al., Partial D-amino acid substitution: Improved enzymatic stability and preserved Ab recognition of a MUC2 epitope peptide. Proc Natl Acad Sci U S A. Jan. 11, 2005;102(2):413-8. doi: 10.1073/pnas.0407677102. Epub Jan. 3, 2005.

Tutt et al., Abstract S3-01: The TNT trial: a randomized phase III trial of carboplatin (C) compared with docetaxel (D) for patients with metastatic or recurrent locally advanced triple negative or BRCA1/2 breast cancer (CRUK/07/012). Cancer Research. May 1, 2015; 75(9_Suppl):S3-01. doi.org/10.1158/1538-7445.SABCS14-S3-01.

Ulasov et al., Inhibition of MMP14 potentiates the therapeutic effect of temozolomide and radiation in gliomas. Cancer Med. Aug. 2013;2(4):457-67. doi: 10.1002/cam4.104. Epub Jun. 30, 2013.

Uhlenbroich et al., Abstract 0000: NKp46 engaging Bicycle NK-TICA™ drives tumor targeted cytotoxicity. PEGS Boston, May 17, 2023, 1 page.

Uhlenbroich, Bicycles—a modality for Tumor-Targeted Immune Cell Agonism. Antibody Engineering & Therapeutics, Jun. 12, 2023, 23 pages.

Upadhyaya et al., Abstract 888: An integrative approach to optimize a synthetic EphA2-dependent CD137 agonist: Balancing potency, physiochemical properties, and pharmacokinetics to achieve robust anti-tumor activity. SITC, Nov. 12, 2021, 1 page.

Upadhyaya et al., Anticancer immunity induced by a synthetic tumor-targeted CD137 agonist. 2021, 9(1):e001762, pp. 1-10.

Upadhyaya et al., Discovery and Optimization of a Synthetic Class of Nectin-4-Targeted CD137 Agonists for Immuno-oncology. Molecular Cancer Therapeutics, 2022, 65:9858-9872.

Upadhyaya P., Activation of CD137 Using Multivalent and Tumour Targeted Bicyclic Peptides. Bicyle Therapeutics.URL: https://www.bicycletherapeutics.com/wp-content/uploads/PU_2019-Peptide-Congress_publication.pdf#:~:text=Fully%20synthetic%20molecules%20comprising%20CD137%20and%20tumour, Peptide Congress. Apr. 25, 2019. 25 Pages.

Valko et al., Application of biomimetic HPLC to estimate lipophilicity, protein and phospholipid binding of potential peptide therapeutics. ADMET and DMPK, 2018, 6(2):162-175.

Van Eden et al., Cloning of the mycobacterial epitope recognized by T lymphocytes in adjuvant arthritis. Nature. Jan. 14, 1988;331(6152):171-3. doi: 10.1038/331171a0.

Van Glabbeke et al., Progression-free rate as the principal end-point for phase II trials in soft-tissue sarcomas. Eur J Cancer. Mar. 2002;38(4):543-9. doi: 10.1016/s0959-8049(01)00398-7.

Vandenbroucke et al., Is there new hope for therapeutic matrix metalloproteinase inhibition? Nat Rev Drug Discov. Dec. 2014;13(12):904-27. doi: 10.1038/nrd4390. Epub Nov. 7, 2014.

Wagstaff et al., An Assay for Periplasm Entry Advances the Development of Chimeric Peptide Antibiotics. ACS Infectious Diseases, 2020, 6(9):2355-2361.

Wallack et al., Abstract P05: Investigating soluble Nectin-4 and EphA2 as cancer biomarkers in plasma. Bio-IT World, May 23, 2023, 1 page.

Walsh et al., Abstract 5807: Bicycle Toxin Conjugates® for the treatment of solid tumors. American Association for Cancer Research Annual Meeting, Apr. 9, 2024, 1 page.

Wang et al., Comprehensive Surfaceome Profiling to Identify and Validate Novel Cell-Surface Targets in Osteosarcoma. Molecular Cancer Therapeutics, Jun. 2022, 21(6):903-913.

Wang et al., Integrative surfaceome profiling identifies immunotherapeutic targets in osteosarcoma and preclinical testing of BT1769, an MTI-MMP-targeted Bicycle® toxin conjugate, in osteosarcoma by the Pediatric Preclinical Testing Consortium (PPTC). AACR Annual Meeting, Apr. 10-15 and May 17-21, 2021, 15 pages.

Wang et al., Co-expression of MMP-14 and MMP-19 predicts poor survival in human glioma. Clin Transl Oncol. Feb. 2013;15(2):139-45. doi: 10.1007/s12094-012-0900-5. Epub Jul. 19, 2012.

Wang et al., MMP-14 overexpression correlates with poor prognosis in non-small cell lung cancer. Tumour Biol. Oct. 2014;35(10):9815-21. doi: 10.1007/s13277-014-2237-x. Epub Jul. 2, 2014.

Watanabe et al., NK cell dysfunction with down-regulated CD16 and up-regulated CD56 molecules in patients with esophageal squamous cell carcinoma. Dis Esophagus. Nov. 2010;23(8):675-81. doi: 10.1111/j.1442-2050.2010.01073.x.

Waterhouse et al., Safety profile of nivolumab administered as 30-min infusion: analysis of data from CheckMate 153. Cancer Chemother Pharmacol. Apr. 2018;81(4):679-686. doi: 10.1007/s00280-018-3527-6. Epub Feb. 13, 2018.

Watts T., TNF/TNFR family members in costimulation of T cell responses. Annu Rev Immunol. 2005;23:23-68. doi: 10.1146/annurev.immunol.23.021704.115839.

(56) References Cited

OTHER PUBLICATIONS

Weber J., Immune checkpoint proteins: a new therapeutic paradigm for cancer—preclinical background: CTLA-4 and PD-1 blockade. Semin Oncol. Oct. 2010;37(5):430-9. doi: 10.1053/j.seminoncol. 2010.09.005.

Wei et al., Discovery of Peptidomimetic Antibody-Drug Conjugate Linkers with Enhanced Protease Specificity. J Med Chem. Feb. 8, 2018;61(3):989-1000. doi: 10.1021/acs.jmedchem.7b01430. Epub Dec. 21, 2017.

Winter et al., Making antibodies by phage display technology. Annu Rev Immunol. 1994; 12:433-55. doi: 10.1146/annurev.iy.12.040194. 002245.

Wu et al., A novel polymorphism of FcgammaRIIIa (CD16) alters receptor function and predisposes to autoimmune disease. J Clin Invest. Sep. 1, 1997;100(5):1059-70. doi: 10.1172/JCI119616.

Wu et al., Immunohistochemical localization of programmed death-1 ligand-1 (PD-L1) in gastric carcinoma and its clinical significance. Acta Histochem. 2006;108(1):19-24. doi: 10.1016/j.acthis.2006.01. 003. Epub Mar. 13, 2006.

Wu et al., Natural killer cells in cancer biology and therapy. Mol Cancer. Aug. 6, 2020;19(1):120. doi: 10.1186/s12943-020-01238-x.

Wu et al., Structures of the CXCR4 chemokine GPCR with small-molecule and cyclic peptide antagonists. Science. Nov. 19, 2010;330(6007):1066-71. doi: 10.1126/science. 1194396. Epub Oct. 7, 2010.

Xiong et al., Crystal structure of the extracellular segment of integrin alpha Vbeta3 in complex with an Arg-Gly-Asp ligand. Science. Apr. 5, 2002;296(5565):151-5. doi: 10.1126/science. 1069040. Epub Mar. 7, 2002.

Xu et al., The application of PK/PD modelling in the clinical development of BT5528—a novel toxin delivery platform. ACoP, Oct. 30-Nov. 2, 2022, 21 pages.

Yampolsky et al., The exchangeability of amino acids in proteins. Genetics. Aug. 2005, 170(4):1459-1472.

Yardley et al., Emerge: A Randomized Phase II Study of the Antibody-Drug Conjugate Glembatumumab Vedotin in Advanced Glycoprotein NMB-Expressing Breast Cancer. J Clin Oncol. May 10, 2015;33(14):1609-19. doi: 10.1200/JCO.2014.56.2959. Epub Apr. 6, 2015.

Yoon et al., An efficient strategy for cell-based antibody library selection using an integrated vector system. BMC Biotechnol. Sep. 18, 2012;12:62. doi: 10.1186/1472-6750-12-62.

Yoshihara et al., Tags for labeling protein N-termini with subtiligase for proteomics. Bioorg Med Chem Lett. Nov. 15, 2008;18(22):6000-3. doi: 10.1016/j.bmcl.2008.08.044. Epub Aug. 19, 2008.

Yu et al., A new strategy applied to the synthesis of an a-helical bicyclic peptide constrained by two overlapping i, i+ 7 side-chain bridges of novel design. Tetrahedron Letters. Mar. 11, 1996;37(11):1731-1734. doi.org/10.1016/0040-4039(96)00121-9.

Yuan et al., Neuropilin-1 and the development progress of the same as a therapeutic target for malignant tumors. Tumor. 2016; 36:358-364.

Zapun et al., Penicillin-binding proteins and Beta-lactam resistance. FEMS Microbiology Reviews, 2008, 32 (2):361-385.

Zarrabi et al., Inhibition of matrix metalloproteinase 14 (MMP-14)-mediated cancer cell migration. J Biol Chem. Sep. 23, 2011;286(38):33167-77. doi: 10.1074/jbc.M111.256644. Epub Jul. 27, 2011.

Zervosen et al., Development of new drugs for an old target: the penicillin binding proteins. Molecules. Oct. 24, 2012;17(11):12478-505. doi: 10.3390/molecules171112478.

Zhang et al., A new anti-HER2 antibody that enhances the anti-tumor efficacy of trastuzumab and pertuzumab with a distinct mechanism of action. Mol Immunol. Mar. 2020;119:48-58. doi: 10.1016/j.molimm.2020.01.009. Epub Jan. 21, 2020.

Zhang et al., Characterization and application of three novel monoclonal antibodies against human 4-1BB: distinct epitopes of human 4-1 BB on lung tumor cells and immune cells. Tissue Antigens, 2007, 70(6):470-479.

Zhang et al., FCGR2A and FCGR3A polymorphisms associated with clinical outcome of epidermal growth factor receptor expressing metastatic colorectal cancer patients treated with single-agent cetuximab. J Clin Oncol. Aug. 20, 2007;25(24):3712-8. doi: 10.1200/JCO.2006.08.8021.

Zhang et al., Propagated Perturbations from a Peripheral Mutation Show Interactions Supporting WW Domain Thermostability. Structure, Nov. 6, 2018, 26(11):1474-1485.

Zhao et al., Structural basis of specificity of a peptidyl urokinase inhibitor, upain-1. J Struct Biol. Oct. 2007;160(1):1-10. doi: 10.1016/j.jsb.2007.06.003. Epub Jun. 20, 2007.

Zhou et al., Significance of semaphorin-3A and MMP-14 protein expression in non-small cell lung cancer. Oncol Lett. May 2014;7(5):1395-1400. doi: 10.3892/ol.2014.1920. Epub Feb. 27, 2014.

Zhu et al., High-affinity peptide against MT1-MMP for in vivo tumor imaging. J Control Release. Mar. 30, 2011;150(3):248-55. doi: 10.1016/j.jconrel.2011.01.032. Epub Feb. 2, 2011.

Zou et al., PD-L1 (B7-H1) and PD-1 pathway blockade for cancer therapy: Mechanisms, response biomarkers, and combinations. Sci Transl Med. Mar. 2, 2016;8(328):328rv4. doi: 10.1126/scitranslmed. aad7118.

Zubiaur et al., CD38 ligation results in activation of the Raf-1/mitogen-activated protein kinase and the CD3-zeta/zeta-associated protein-70 signaling pathways in Jurkat T lymphocytes. J Immunol. Jul. 1, 1997;159(1):193-205.

Zugazagoitia et al., Current Challenges in Cancer Treatment. Clin Ther. Jul. 2016;38(7):1551-66. doi: 10.1016/j.clinthera.2016.03. 026. Epub May 2, 2016.

\* cited by examiner (A)

(B)

(A)

(B)

(A)

(B)

(A)

(B)

(A)

(B)

BICYCLIC PEPTIDE LIGANDS SPECIFIC FOR NECTIN-4

CROSS-REFERENCE TO RELATED APPLICATIONS

This application is a continuation application of U.S. patent application Ser. No. 17/252,038, filed Dec. 14, 2020, which is a U.S. national stage application under 35 U.S.C. § 371 of International Application No. PCT/GB2019/051740, filed Jun. 21, 2019, which claims priority under 35 U.S.C. § 119 to United Kingdom Application No. GB1810250.9, filed Jun. 22, 2018; United Kingdom Application No. GB1815684.4, filed Sep. 26, 2018; United Kingdom Application No. GB1818499.4, filed Nov. 13, 2018; and United Kingdom Application No. GB1904632.5, filed Apr. 2, 2019, each of which is incorporated herein by reference in its entirety.

REFERENCE TO AN ELECTRONIC SEQUENCE LISTING

The content of the electronic sequence listing (B170170027US03-SUBSEQ-HJD.xml; Size: 427,438 bytes; and Date of Creation: May 14, 2025) is herein incorporated by reference in its entirety.

FIELD OF THE INVENTION

The present invention relates to polypeptides which are covalently bound to molecular scaffolds such that two or more peptide loops are subtended between attachment points to the scaffold. In particular, the invention describes peptides which are high affinity binders of Nectin-4. The invention also includes drug conjugates comprising said peptides, conjugated to one or more effector and/or functional groups, to pharmaceutical compositions comprising said peptide ligands and drug conjugates and to the use of said peptide ligands and drug conjugates in preventing, suppressing or treating a disease or disorder mediated by Nectin-4.

BACKGROUND OF THE INVENTION

Cyclic peptides are able to bind with high affinity and target specificity to protein targets and hence are an attractive molecule class for the development of therapeutics. In fact, several cyclic peptides are already successfully used in the clinic, as for example the antibacterial peptide vancomycin, the immunosuppressant drug cyclosporine or the anti-cancer drug octreotide (Driggers et al. (2008), Nat Rev Drug Discov 7 (7), 608-24). Good binding properties result from a relatively large interaction surface formed between the peptide and the target as well as the reduced conformational flexibility of the cyclic structures. Typically, macrocycles bind to surfaces of several hundred square angstrom, as for example the cyclic peptide CXCR4 antagonist CVX15 (400 Å$^2$; Wu et al. (2007), Science 330, 1066-71), a cyclic peptide with the Arg-Gly-Asp motif binding to integrin αVb3 (355 Å$^2$) (Xiong et al. (2002), Science 296 (5565), 151-5) or the cyclic peptide inhibitor upain-1 binding to urokinase-type plasminogen activator (603 Å$^2$; Zhao et al. (2007), J Struct Biol 160 (1), 1-10).

Due to their cyclic configuration, peptide macrocycles are less flexible than linear peptides, leading to a smaller loss of entropy upon binding to targets and resulting in a higher binding affinity. The reduced flexibility also leads to locking target-specific conformations, increasing binding specificity compared to linear peptides. This effect has been exemplified by a potent and selective inhibitor of matrix metalloproteinase 8 (MMP-8), which lost its selectivity over other MMPs when its ring was opened (Cherney et al. (1998), J Med Chem 41 (11), 1749-51). The favorable binding properties achieved through macrocyclization are even more pronounced in multicyclic peptides having more than one peptide ring as for example in vancomycin, nisin and actinomycin.

Different research teams have previously tethered polypeptides with cysteine residues to a synthetic molecular structure (Kemp and McNamara (1985), J. Org. Chem; Timmerman et al. (2005), ChemBioChem). Meloen and co-workers had used tris(bromomethyl)benzene and related molecules for rapid and quantitative cyclisation of multiple peptide loops onto synthetic scaffolds for structural mimicry of protein surfaces (Timmerman et al. (2005), ChemBioChem). Methods for the generation of candidate drug compounds wherein said compounds are generated by linking cysteine containing polypeptides to a molecular scaffold as for example TATA (1,1',1''-(1,3,5-triazinane-1,3,5-triyl)triprop-2-en-1-one, Heinis et al. Angew Chem, Int Ed. 2014; 53:1602-1606).

Phage display-based combinatorial approaches have been developed to generate and screen large libraries of bicyclic peptides to targets of interest (Heinis et al. (2009), Nat Chem Biol 5 (7), 502-7 and WO 2009/098450). Briefly, combinatorial libraries of linear peptides containing three cysteine residues and two regions of six random amino acids (Cys-(Xaa)$_6$-Cys-(Xaa)$_6$-Cys) were displayed on phage and cyclised by covalently linking the cysteine side chains to a small molecule scaffold.

SUMMARY OF THE INVENTION

According to a first aspect of the invention, there is provided a peptide ligand specific for Nectin-4 comprising a polypeptide comprising at least three cysteine residues, separated by at least two loop sequences, and a molecular scaffold which forms covalent bonds with the cysteine residues of the polypeptide such that at least two polypeptide loops are formed on the molecular scaffold.

According to a further aspect of the invention, there is provided a drug conjugate comprising a peptide ligand as defined herein conjugated to one or more effector and/or functional groups.

According to a further aspect of the invention, there is provided a pharmaceutical composition comprising a peptide ligand or a drug conjugate as defined herein in combination with one or more pharmaceutically acceptable excipients.

According to a further aspect of the invention, there is provided a peptide ligand or drug conjugate as defined herein for use in preventing, suppressing or treating a disease or disorder mediated by Nectin-4.

BRIEF DESCRIPTION OF THE FIGURES

Where present in the figures, error bars represent standard error of the mean (SEM).

FIGS. 33-37: Gating strategy for Nectin-4 in Bladder cancer (HT1376; FIG. 33), Breast cancer (MDA-MB-468; FIG. 34), Colorectal cancer (HT-29; FIG. 37), respectively.

DETAILED DESCRIPTION OF THE INVENTION

Figure 1:
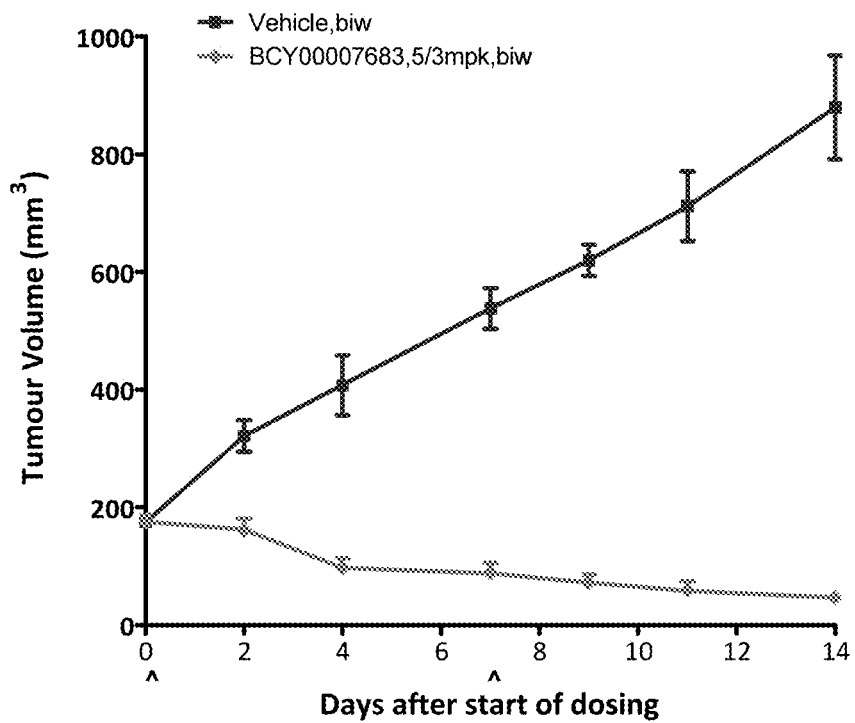
FIGS. 1 to 7: Tumor volume traces after administering BCY7683, BCY7825, BCY7826, BCY8245, BCY8253, BCY8254 and BCY8255, respectively, to female BALB/c nude mice bearing NCI-H292 xenograft.
Figure 2:
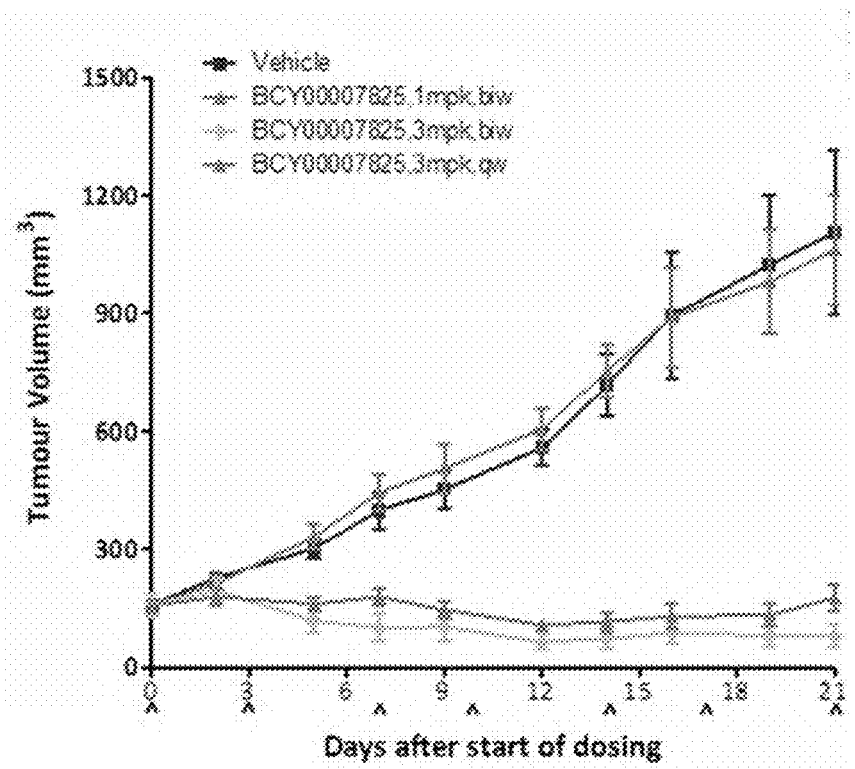
Figure 3:
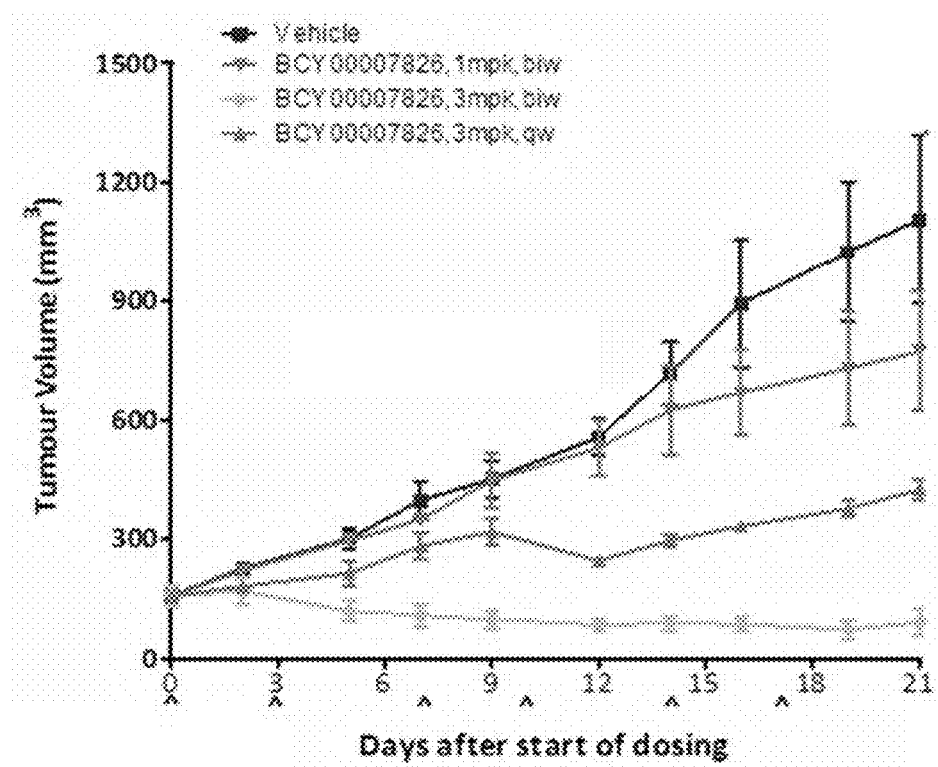
Figure 4:
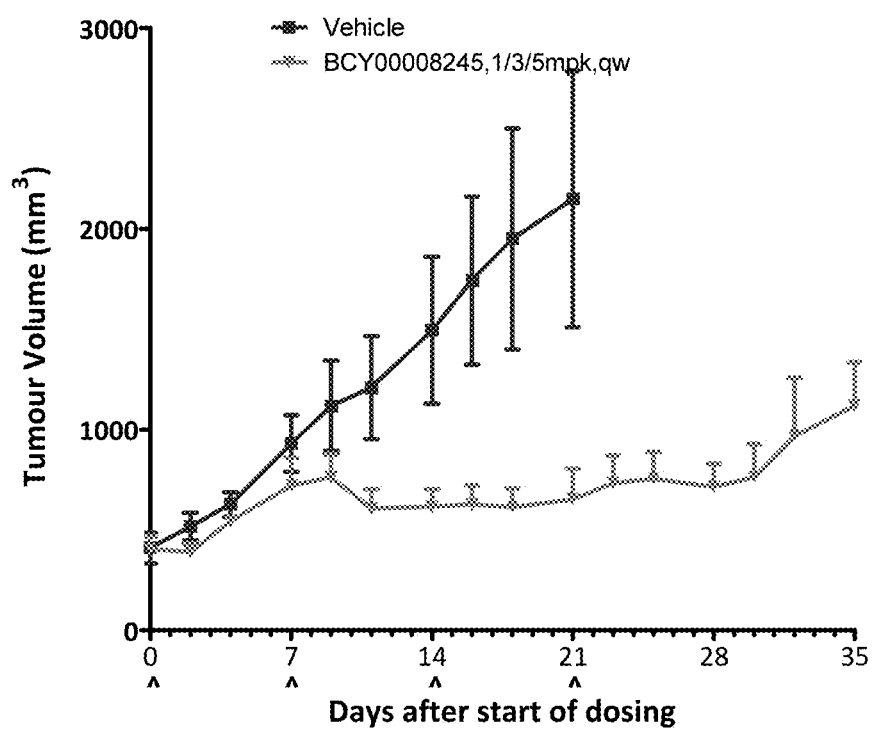
Figure 5:
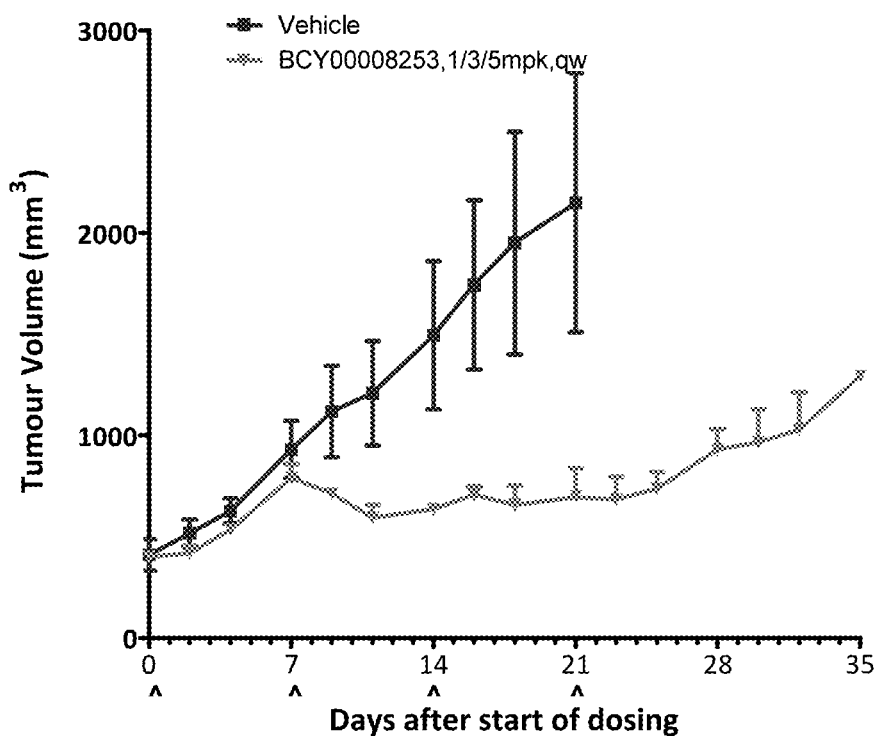
Figure 6:
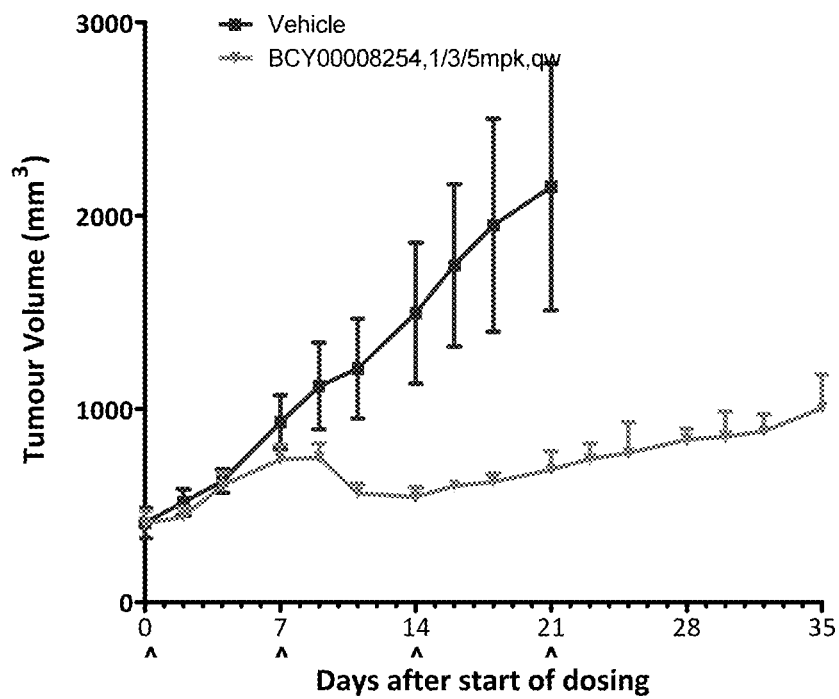
Figure 7:
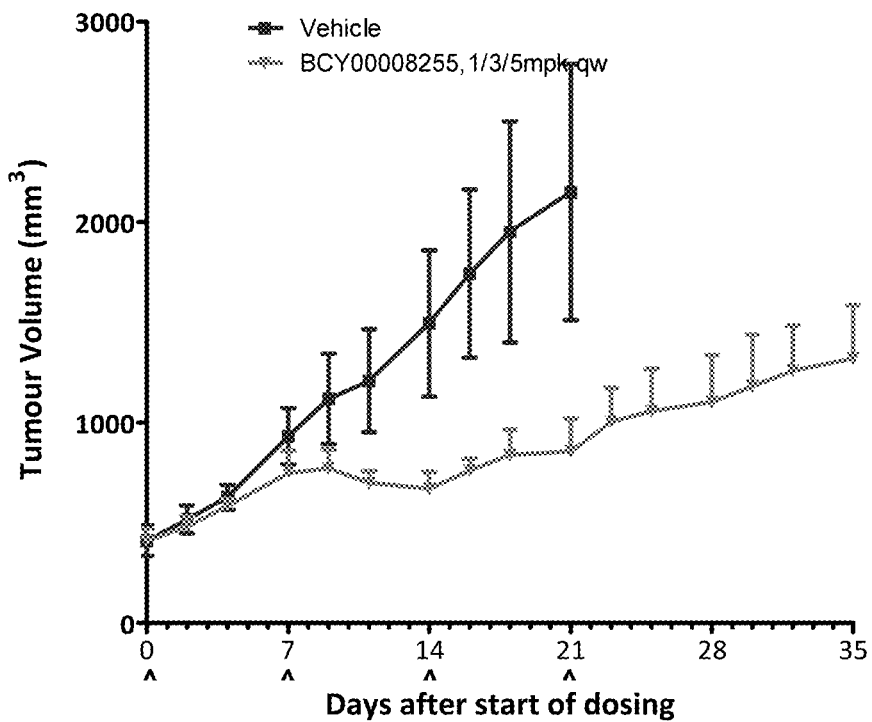
Figure 8:
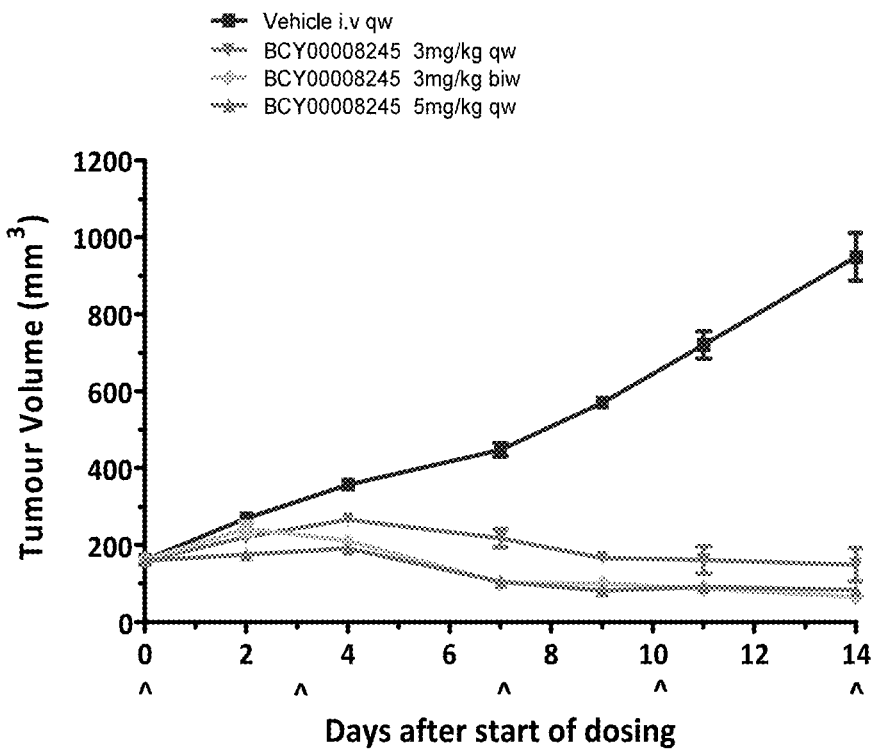
FIGS. 8 to 10: Tumor volume traces after administering BCY8245, BCY8253 and BCY8255, respectively, to female Balb/c nude mice bearing NCI-H292 xenograft.
Figure 9:
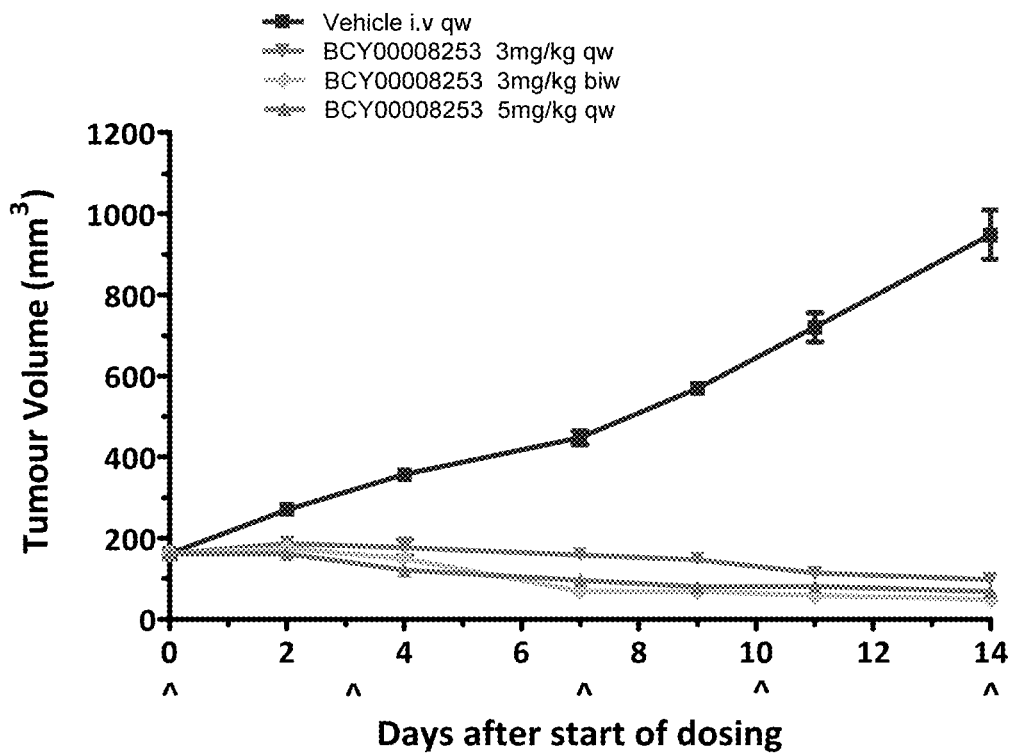
Figure 10:
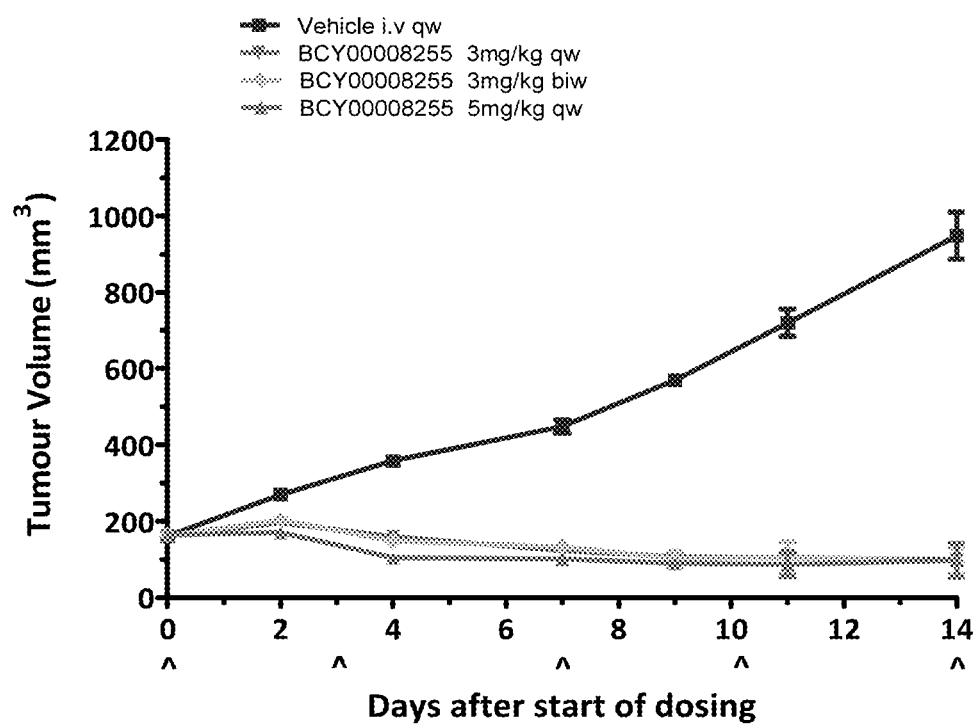
Figure 11:
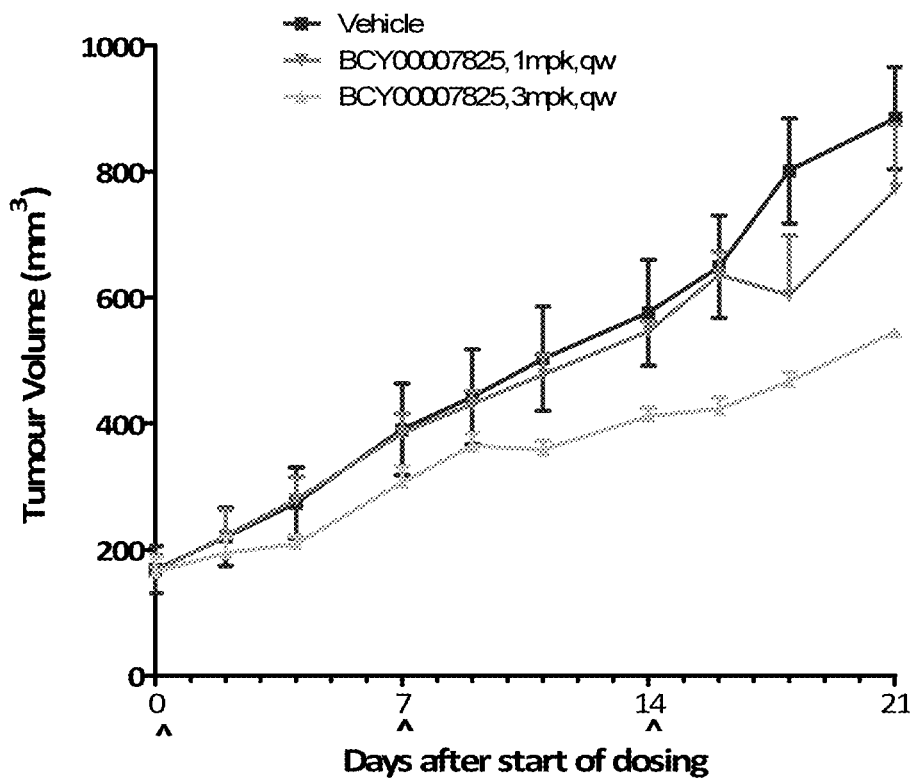
FIGS. 11 to 15: Tumor volume traces after administering BCY7825, BCY8245, BCY8253, BCY8254 and BCY8255, respectively, to female CB17-SCID mice bearing HT-1376 xenograft.
Figure 12:
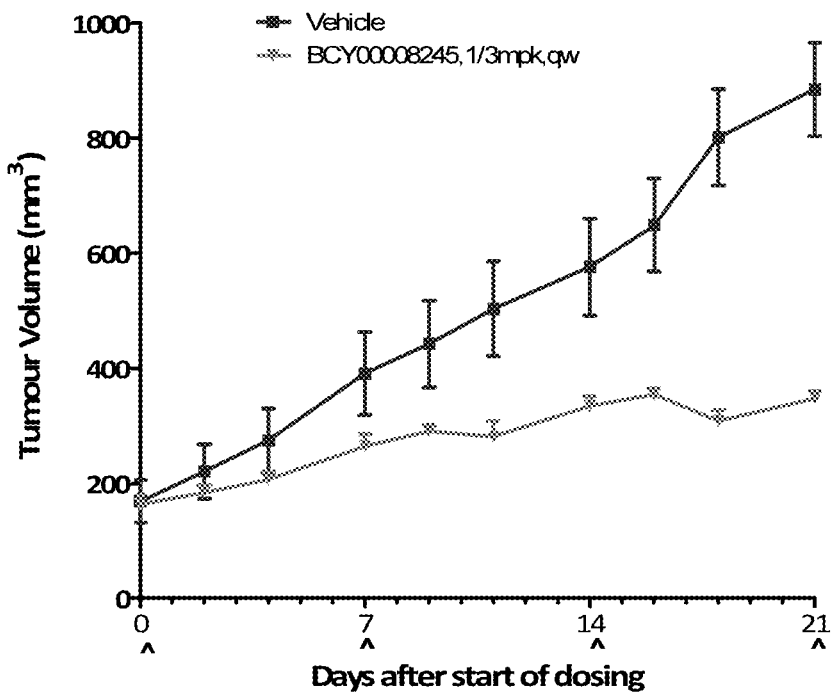
Figure 13:
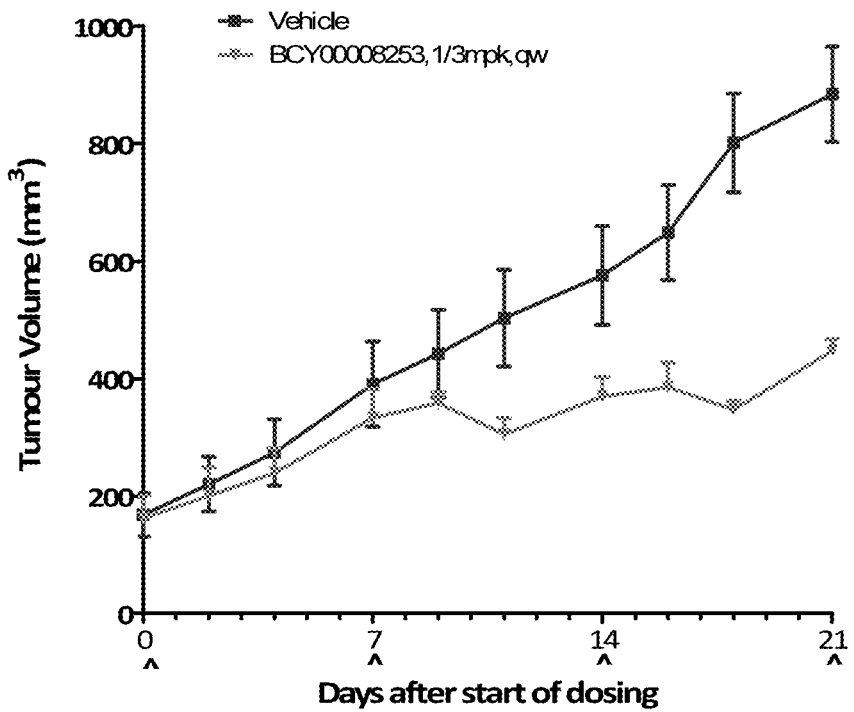
Figure 14:
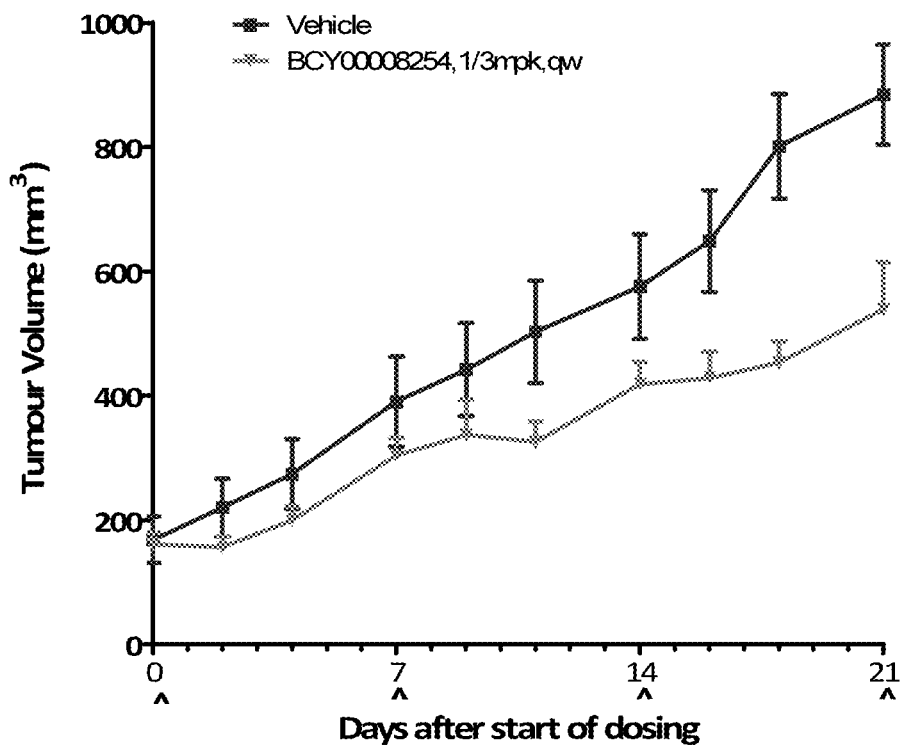
Figure 15:
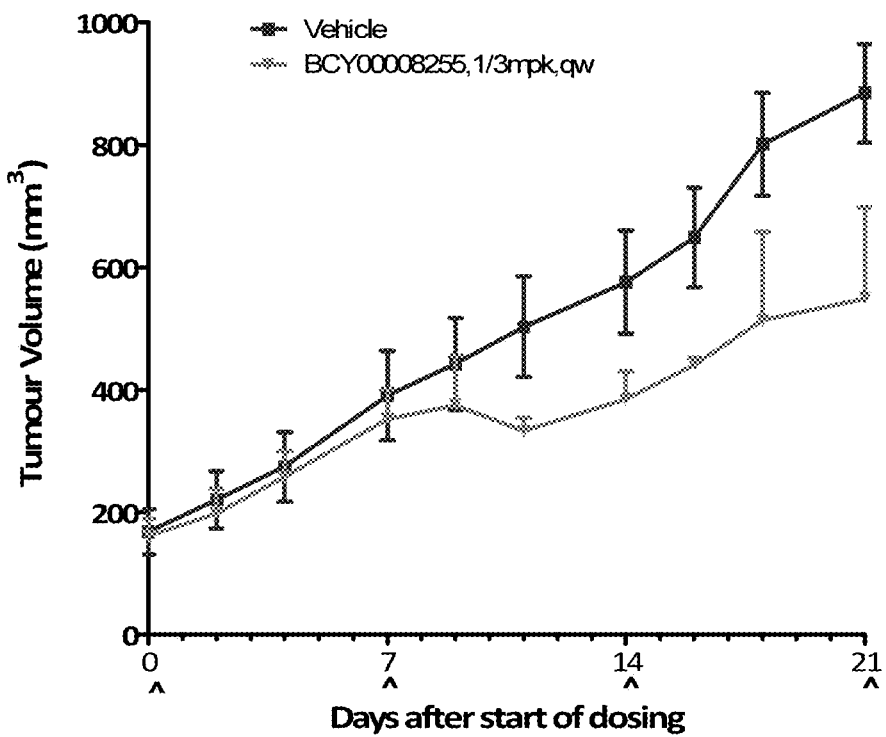

In one embodiment, said loop sequences comprise 3, 6, 7, 8 or 9 amino acids. In a further embodiment, said loop sequences comprise 3, 6, 7 or 9 amino acids. In a yet further embodiment, said loop sequences comprise 3 or 9 amino acids.

In a further embodiment, said loop sequences comprise three cysteine residues separated by two loop sequences one of which consists of 3 amino acids and the other of which consists of 9 amino acids.

In a further embodiment, said loop sequences comprise three cysteine residues separated by two loop sequences one of which consists of 3 amino acids and the other of which consists of 8 amino acids.

In a further embodiment, said loop sequences comprise three cysteine residues separated by two loop sequences one of which consists of 7 amino acids and the other of which consists of 3 amino acids.

In a further embodiment, said loop sequences comprise three cysteine residues separated by two loop sequences both of which consist of 6 amino acids.

In one embodiment, said peptide ligand comprises an amino acid sequence selected from:

(SEQ ID NO: 38)
$C_i$-P/A/Hyp-F/Y-G/A-$C_{ii}$-$X_1$-$X_2$-$X_3$-W/1-Nal/2-Nal-S/A-$X_4$-P-I/D/A-W/1-Nal/2-Nal-$C_{iii}$;

(SEQ ID NO: 39)
$C_i$-W/A-P-L-D/S-S/D-Y-W-$C_{ii}$-$X_5$-R-I-$C_{iii}$;

(SEQ ID NO: 40)
$C_i$-V-T-T-S-Y-D-$C_{ii}$-F/W-L/V-H/R/T-L-L/G-G/Q/H-$C_{iii}$;

(SEQ ID NO: 41)
$C_i$-$X_6$-$X_7$-$X_8$-$C_{ii}$-$X_9$-$X_{10}$-$X_{11}$-$X_{12}$-$X_{13}$-$X_{14}$-$X_{15}$-$X_{16}$-$X_{17}$-$C_{iii}$;
and (SEQ ID NO: 42)
$C_i$-W/A/Y-P/A-L-D/S/A-S/D/P/A-Y-W/1-Nal-$C_{ii}$-$X_5$-R/HArg/A-I-$C_{iii}$;

wherein:
- $X_1$-$X_5$ represent any amino acid residue, including modified and non-natural amino acids;
- $X_6$ represents: Gly; Pro or a non-natural derivative of selected from azetidine (Aze), hydroxyproline (HyP), 4-amino-proline (Pro(4NH)), oxazolidine-4-carboxylic acid (Oxa), octahydroindolecarboxylic acid (Oic) or 4,4-difluoroproline (4,4-DFP); Ala or a non-natural derivative of Ala selected from aminoisobutyric acid (Alb); or Sarcosine (Sar);
- $X_7$ represents: Phe or a non-natural derivative of Phe selected from 3-methyl-phenylalanine (3MePhe), 4-methyl-phenylalanine (4MePhe), homophenylalanine (HPhe), 4,4-biphenylalanine (4,4-BPA) or 3,4-dihydroxy-phenylalanine (DOPA); Tyr; or Ala or a non-natural derivative of Ala selected from 1-naphth-ylalanine (1-Nal), 2-naphthylalanine (2-Nal) or 2-pyridylalanine (2Pal);

$X_8$ represents: Gly; Ala; Asp; Lys or a non-natural derivative of Lys selected from acetyl-lysine (KAc or Lys (Ac)); Phe; Glu; Gln; Leu; Ser; Arg; or cysteic acid (Cya);

$X_9$ is either absent or represents: Met or a non-natural derivative of Met selected from methionine sulfone (Met(O2)); Gln or a non-natural derivative of Gln selected from homoglutamine (HGln); Leu or a non-natural derivative of Leu selected from homoleucine (HLeu) or norleucine (Nle); Lys; Ile; t-butyl-alanine (tBuAla); or homoserine-methyl (HSe(Me));

$X_{10}$ represents: Pro; Lys or a non-natural derivative of Lys selected from acetyl-lysine (KAc or Lys (Ac)); Arg or a non-natural derivative of Arg selected from 2-amino-4-guanidinobutyric acid (Agb), homoarginine (HArg) or N-methyl-homoarginine; Glu; Ser; Asp; Gln; Ala; hydroxyproline (HyP); or cysteic acid (Cya);

$X_{11}$ represents: Asn or a non-natural derivative of Asn selected from N-methyl-asparagine; Thr; Asp; Gly; Ser; His; Ala or a non-natural derivative of Ala selected from thienyl-alanine (Thi), 2-(1,2,4-triazol-1-yl)-alanine (1,2,4-TriAz) or Beta-(4-thiazolyl)-alanine (4ThiAz); Lys; or cysteic acid (Cya);

$X_{12}$ represents: Trp or a non-natural derivative of Trp selected from azatryptophan (AzaTrp), 5-fluoro-L-tryptophan (5FTrp) or methyl-tryptophan (TrpMe); or Ala or a non-natural derivative of Ala selected from 1-naphthyl alanine (1-Nal) or 2-naphthyl alanine (2-Nal);

$X_{13}$ represents: Ser or a non-natural derivative of Ser selected from homoserine (HSer); Ala; Asp; or Thr;

$X_{14}$ represents: Trp or a non-natural derivative of Trp selected from azatryptophan (AzaTrp); Ser; Ala or a non-natural derivative of Ala selected from 2-(1,2,4-triazol-1-yl)-alanine (1,2,4-TriAz), 1-naphthyl alanine (1-Nal) or 2-naphthyl alanine (2-Nal); Asp; Phe or a non-natural derivative of Phe selected from 3,4-dihydroxy-phenylalanine (DOPA); Tyr; Thr or a non-natural derivative of Thr selected from N-methyl-threonine; tetrahydropyran-4-propanoic acid (THP(O)); or dioxo-4-tetrahydrothiopyranylacetic acid (THP(SO2));

$X_{15}$ represents Pro or a non-natural derivative of Pro selected from azetidine (Aze), pipecolic acid (Pip) or oxazolidine-4-carboxylic acid (Oxa);

$X_{16}$ represents: Ile or a non-natural derivative of Ile selected from N-methyl-isoleucine (NMeIle); Ala or a non-natural derivative of Ala selected from 3-cyclohexyl-alanine (Cha) or cyclopropyl-alanine (Cpa); Pro or a non-natural derivative of Pro selected from hydroxyproline (HyP); Asp; Lys; cyclopentyl-glycine (C5A); tetrahydropyran-4-propanoic acid (THP(O)); or dioxo-4-tetrahydrothiopyranylacetic acid (THP(SO2);

$X_{17}$ represents: Trp or a non-natural derivative of Trp selected from azatryptophan (AzaTrp) or 5-fluoro-L-tryptophan (5FTrp); Phe; Tyr; 1-naphthyl alanine (1-Nal); or 2-naphthyl alanine (2-Nal);

Hyp represents hydroxyproline, 1-Nal represents 1-naphthyl alanine, 2-Nal represents 2-naphthyl alanine, HArg represents homoarginine and $C_i$, $C_{ii}$ and $C_{iii}$ represent first, second and third cysteine residues, respectively or a pharmaceutically acceptable salt thereof.

In one embodiment, said loop sequences comprise three cysteine residues separated by two loop sequences the first of which consists of 3 amino acids and the second of which consists of 9 amino acids, and said peptide ligand comprises an amino acid sequence selected from:

$$C_i\text{-}X_6\text{-}X_7\text{-}X_8\text{-}C_{ii}\text{-}X_9\text{-}X_{10}\text{-}X_{11}\text{-}X_{12}\text{-}X_{13}\text{-}X_{14}\text{-}X_{15}\text{-}X_{16}\text{-}X_{17}\text{-}C_{iii};$$ (SEQ ID NO: 41)

wherein $X_6$ to $X_{17}$ are as defined herein.

In one embodiment, Xe represents: Pro or a non-natural derivative of Pro selected from azetidine (Aze), hydroxyproline (HyP), 4-amino-proline (Pro(4NH)), oxazolidine-4-carboxylic acid (Oxa), octahydroindolecarboxylic acid (Oic) or 4,4-difluoroproline (4,4-DFP). In a further embodiment, $X_6$ represents Pro.

In one embodiment, $X_7$ represents: Phe or a non-natural derivative of Phe selected from 3-methyl-phenylalanine (3MePhe), 4-methyl-phenylalanine (4MePhe), homophenylalanine (HPhe), 4,4-biphenylalanine (4,4-BPA) or 3,4-dihydroxy-phenylalanine (DOPA); Ala or a non-natural derivative of Ala selected from 1-naphthylalanine (1-Nal), 2-naphthylalanine (2-Nal) or 2-pyridylalanine (2Pal). In a further embodiment, $X_7$ represents Phe or 1-naphthylalanine (1-Nal). In a yet further embodiment, $X_7$ represents 1-naphthylalanine (1-Nal).

In one embodiment, $X_8$ represents Asp, Arg, Lys or cysteic acid (Cya). In a further embodiment, $X_8$ represents D-Asp, D-Arg, D-Lys or D-Cya. In a yet further embodiment, $X_8$ represents D-Asp.

In one embodiment, Xe represents: Met or a non-natural derivative of Met selected from methionine sulfone (Met (O2)); or Leu or a non-natural derivative of Leu selected from homoleucine (HLeu) or norleucine (Nle). In a further embodiment, $X_9$ represents Met or Leu. In a yet further embodiment, $X_9$ represents Met.

In one embodiment, $X_{10}$ represents Arg or a non-natural derivative of Arg selected from 2-amino-4-guanidinobutyric acid (Agb), homoarginine (HArg) or N-methyl-homoarginine; or cysteic acid (Cya). In a further embodiment, $X_{10}$ represents homoarginine (HArg) or cysteic acid (Cya) (such as D-Cya). In a yet further embodiment, $X_{10}$ represents homoarginine (HArg). In an alternative embodiment, $X_{10}$ represents lysine.

In one embodiment, $X_{11}$ represents: Asn or a non-natural derivative of Asn selected from N-methyl-asparagine; Asp; or His; or cysteic acid (Cya). In a further embodiment, $X_{11}$ represents Asn, Asp, His or cysteic acid (Cya) (such as D-Cya). In a further embodiment, $X_{11}$ represents Asp.

In one embodiment, $X_{12}$ represents: Trp or a non-natural derivative of Trp selected from azatryptophan (AzaTrp), 5-fluoro-L-tryptophan (5FTrp) or methyl-tryptophan (TrpMe). In a further embodiment, $X_{12}$ represents Trp.

In one embodiment, $X_{13}$ represents Ser or a non-natural derivative of Ser selected from homoserine (HSer). In a further embodiment, $X_{13}$ represents Ser.

In one embodiment, $X_{14}$ represents Thr or a non-natural derivative of Thr selected from N-methyl-threonine. In a further embodiment, $X_{14}$ represents Thr.

In one embodiment, $X_{15}$ represents Pro.

In one embodiment, $X_{16}$ represents: Ile or a non-natural derivative of Ile selected from N-methyl-isoleucine (NMeIle); or Pro or a non-natural derivative of Pro selected from hydroxyproline (HyP). In a further embodiment, $X_{16}$ represents: Ile; or Pro or a non-natural derivative of Pro selected from hydroxyproline (HyP). In a yet further embodiment, $X_{16}$ represents Ile, Pro or hydroxyproline (HyP). In a still yet further embodiment, $X_{16}$ represents hydroxyproline (HyP).

In one embodiment, $X_{17}$ represents Trp or a non-natural derivative of Trp selected from azatryptophan (AzaTrp) or 5-fluoro-L-tryptophan (5FTrp). In a further embodiment, $X_{17}$ represents Trp.

In a further embodiment, said loop sequences comprise three cysteine residues separated by two loop sequences the first of which consists of 3 amino acids and the second of which consists of 9 amino acids, and said peptide ligand comprises an amino acid sequence selected from:

(SEQ ID NO: 213)
$C_i$-P-$X_7$-$X_8$-$C_{ii}$-$X_9$-HArg/Lys-$X_{11}$-W-S-T-P-$X_{16}$-W-$C_{iii}$;

wherein $X_7$, $X_8$, $X_9$, $X_{11}$ and $X_{16}$ are as defined herein.

In a further embodiment, said loop sequences comprise three cysteine residues separated by two loop sequences the first of which consists of 3 amino acids and the second of which consists of 9 amino acids, and said peptide ligand comprises an amino acid sequence selected from:

(SEQ ID NO: 204)
$C_i$-P-$X_7$-$X_8$-$C_{ii}$-$X_9$-HArg-$X_{11}$-W-S-T-P-$X_{16}$-W-$C_{iii}$;

wherein $X_7$, $X_8$, $X_9$, $X_{11}$ and $X_{16}$ are as defined herein.

In a yet further embodiment, said loop sequences comprise three cysteine residues separated by two loop sequences the first of which consists of 3 amino acids and the second of which consists of 9 amino acids, and said peptide ligand comprises an amino acid sequence selected from:

(SEQ ID NO: 214)
$C_i$-P-F/1-Nal-dD/dR-$C_{ii}$-M/L-HArg/Lys-N/H/D-W-S-T-P-I/P/HyP-W-$C_{iii}$.

In a yet further embodiment, said loop sequences comprise three cysteine residues separated by two loop sequences the first of which consists of 3 amino acids and the second of which consists of 9 amino acids, and said peptide ligand comprises an amino acid sequence selected from:

(SEQ ID NO: 205)
$C_i$-P-F/1-Nal-dD/dR-$C_{ii}$-M/L-HArg-N/H/D-W-S-T-P-I/P/HyP-W-$C_{iii}$ In one embodiment, said loop sequences comprise three cysteine residues separated by two loop sequences the first of which consists of 3 amino acids and the second of which consists of 8 amino acids, and said peptide ligand comprises an amino acid sequence selected from:

(SEQ ID NO: 206)
$C_i$-$X_6$-$X_7$-$X_8$-$C_{ii}$-$X_{10}$-$X_{11}$-$X_{12}$-$X_{13}$-$X_{14}$-$X_{15}$-$X_{16}$-$X_{17}$-$C_{iii}$ wherein $X_6$ to $X_8$ and $X_{10}$ to $X_{17}$ are as defined herein.

In one embodiment, said loop sequences comprise three cysteine residues separated by two loop sequences the first of which consists of 3 amino acids and the second of which consists of 8 amino acids, and said peptide ligand comprises an amino acid sequence selected from:

(SEQ ID NO: 207)
$C_i$-P-1-Nal-D/Cya-$C_{ii}$-M-HArg/Cya-D/Cya-W-S-T-P-HyP-W-$C_{iii}$ In one embodiment, said loop sequences either comprise three cysteine residues separated by two loop sequences the first of which consists of 3 amino acids and the second of which consists of 9 amino acids, and said peptide ligand comprises an amino acid sequence selected from:

(SEQ ID NO: 38)
$C_i$-P/A/Hyp-F/Y-G/A-$C_{ii}$-$X_1$-$X_2$-$X_3$-W/1-Nal/2-Nal-S/A-$X_4$-P-I/D/A-W/1-Nal/2-Nal-$C_{iii}$;

wherein $X_1$-$X_4$ represent any amino acid residue, including modified and non-natural amino acids, Hyp represents hydroxyproline, 1-Nal represents 1-naphthyl alanine, 2-Nal represents 2-naphthyl alanine, and $C_i$, $C_{ii}$ and $C_{iii}$ represent first, second and third cysteine residues, respectively or a pharmaceutically acceptable salt thereof.

In one embodiment, $X_1$ is selected from M, Npg, HLeu, I, Q and Nle; wherein Npg is neopentyl glycine, HLeu is homoleucine, and Nle is norleucine.

In one embodiment, $X_2$ is selected from K, R, S, D, HArg, K(Ac) and A; wherein HArg is homoarginine, K(Ac) is N-acetyllysine, and A is present as either the L- or D-isoform of alanine.

In one embodiment, $X_3$ is selected from N, D, H and A; wherein A is present as either the L- or D-isoform of alanine.

In one embodiment, $X_4$ is selected from W, D, T and A.

In one embodiment, said loop sequences comprise three cysteine residues separated by two loop sequences the first of which consists of 7 amino acids and the second of which consists of 3 amino acids, and said peptide ligand comprises an amino acid sequence selected from:

$C_i$-W/A/Y-P/A-L-D/S/A-S/D/P/A-Y-W/1-Nal-$C_{ii}$-$X_5$-R/HArg/A-I-$C_{iii}$ (SEQ ID NO: 42);

wherein $X_5$ represents any amino acid residue, 1-Nal represents 1-naphthyl alanine, HArg represents homoarginine and $C_i$, $C_{ii}$ and $C_{iii}$ represent first, second and third cysteine residues, respectively or a pharmaceutically acceptable salt thereof.

In one embodiment, $X_5$ is selected from A, dA, G, dD, N, E and P.

In one embodiment, said loop sequences comprise three cysteine residues separated by two loop sequences the first of which consists of 7 amino acids and the second of which consists of 3 amino acids, and said peptide ligand comprises an amino acid sequence selected from:

(SEQ ID NO: 39)
$C_i$-W/A-P-L-D/S-S/D-Y-W-$C_{ii}$-$X_5$-R-I-$C_{iii}$;

wherein $X_5$ represents any amino acid residue, and $C_i$, $C_{ii}$ and $C_{iii}$ represent first, second and third cysteine residues, respectively or a pharmaceutically acceptable salt thereof.

In one embodiment, $X_5$ is selected from A, G, D and N.

In one embodiment, said loop sequences comprise three cysteine residues separated by two loop sequences both of which consist of 6 amino acids, and said peptide ligand comprises an amino acid sequence selected from:

(SEQ ID NO: 40)
$C_i$-V-T-T-S-Y-D-$C_{ii}$-F/W-L/V-H/R/T-L-L/G-G/Q/H-$C_{iii}$;

wherein $C_i$, $C_{ii}$ and $C_{iii}$ represent first, second and third cysteine residues, respectively or a pharmaceutically acceptable salt thereof.

In a further embodiment, the peptide ligand of $C_i$-P/A/Hyp-F/Y-G/A-$C_{ii}$-$X_1$-$X_2$-$X_3$-W/1-Nal/2-Nal-S/A-$X_4$-P-I/D/A-W/1-Nal/2-Nal-$C_{iii}$ (SEQ ID NO: 38) comprises an amino acid sequence selected from any one of SEQ ID NOS: 1-30:

$C_i$PFG$C_{ii}$MKNWSWPIW$C_{iii}$; (SEQ ID NO: 1)

$C_i$PFG$C_{ii}$MRNWSWPIW$C_{iii}$; (SEQ ID NO: 2)

$C_i$PFG$C_{ii}$(Npg)KNWSWPIW$C_{iii}$; (SEQ ID NO: 3)

$C_i$PFG$C_{ii}$(HLeu)KNWSWPIW$C_{iii}$; (SEQ ID NO: 4)

$C_i$PFG$C_{ii}$IKNWSWPIW$C_{iii}$; (SEQ ID NO: 5)

$C_i$PFA$C_{ii}$MKNWSWPIW$C_{iii}$; (SEQ ID NO: 6)

$C_i$PFG$C_{ii}$QKNWSWPIW$C_{iii}$; (SEQ ID NO: 7)

$C_i$PFG$C_{ii}$MKNWSDPIW$C_{iii}$; (SEQ ID NO: 8)

$C_i$PFG$C_{ii}$MKNWSWPI(1-Nal)$C_{iii}$; (SEQ ID NO: 9)

$C_i$(Hyp)FG$C_{ii}$MKNWSWPIW$C_{iii}$; (SEQ ID NO: 10)

$C_i$PYG$C_{ii}$MKNWSWPIW$C_{iii}$; (SEQ ID NO: 11)

$C_i$PFG$C_{ii}$MSNWSWPIW$C_{iii}$; (SEQ ID NO: 12)

$C_i$PFG$C_{ii}$MDNWSWPIW$C_{iii}$; (SEQ ID NO: 13)

$C_i$PFG$C_{ii}$M(HArg)NWSWPIW$C_{iii}$; (SEQ ID NO: 14)

$C_i$PFG$C_{ii}$MKDWSWPIW$C_{iii}$; (SEQ ID NO: 15)

$C_i$PFG$C_{ii}$MKHWSWPIW$C_{iii}$; (SEQ ID NO: 16)

$C_i$PFG$C_{ii}$MKN(1-Nal)SWPIW$C_{iii}$; (SEQ ID NO: 17)

$C_i$PFG$C_{ii}$MKN(2-Nal)SWPIW$C_{iii}$; (SEQ ID NO: 18)

$C_i$PFG$C_{ii}$MKNWSTPIW$C_{iii}$; (SEQ ID NO: 19)

$C_i$PFG$C_{ii}$MKNWSWPDW$C_{iii}$; (SEQ ID NO: 20)

$C_i$PFG$C_{ii}$MKNWSWPI(2-Nal)$C_{iii}$; (SEQ ID NO: 21)

$C_i$PFG$C_{ii}$M(HArg)NWSWPIW$C_{iii}$; (SEQ ID NO: 22)

$C_i$PFG$C_{ii}$M(K(Ac))NWSWPIW$C_{iii}$; (SEQ ID NO: 23)

$C_i$PFG$C_{ii}$MKNWSAPIW$C_{iii}$; (SEQ ID NO: 24)

$C_i$PFG$C_{ii}$MKNWSWPAW$C_{iii}$; (SEQ ID NO: 25)

$C_i$AFG$C_{ii}$MKNWSWPIW$C_{iii}$; (SEQ ID NO: 26)

$C_i$PFG$C_{ii}$MANWSWPIW$C_{iii}$; (SEQ ID NO: 27)

$C_i$PFG$C_{ii}$MKAWSWPIW$C_{iii}$; (SEQ ID NO: 28)

$C_i$PFG$C_{ii}$(Nle)KNWSWPIW$C_{iii}$; and (SEQ ID NO: 29)

$C_i$PFG$C_{ii}$MKNWAWPIW$C_{iii}$; (SEQ ID NO: 30)

wherein $C_i$, $C_{ii}$ and $C_{iii}$ represent first, second and third cysteine residues, respectively, or a pharmaceutically acceptable salt thereof.

In a further embodiment, the peptide ligand of $C_i$-P/A/Hyp-F/Y-G/A-$C_{ii}$-$X_1$-$X_2$-$X_3$-W/1-Nal/2-Nal-S/A-$X_4$-P-I/D/A-W/1-Nal/2-Nal-$C_{iii}$ (SEQ ID NO: 38) comprises an amino acid sequence selected from:

A-(SEQ ID NO: 1)-A (herein referred to as 80-09-02-NO002 or BCY428);

Fl-A-(SQ ID NO: 1)-A (herein referred to as 80-09-02-N006);

Ac-(SEQ ID NO: 1) (herein referred to as 80-09-02-N008 or BCY7390);

Ac-[dD]-(SEQ ID NO: 1) (herein referred to as BCY7606);

A-(SEQ ID NO: 2)-A (herein referred to as 80-09-02-NO03 or BCY429);

(1-Nal) A-(SEQ ID NO: 1)-A (herein referred to as 80-09-02-N009 or BCY7420);

(2-Nal) A-(SEQ ID NO: 1)-A (herein referred to as 80-09-02-N010 or BCY7421);

(33DPA) A-(SEQ ID NO: 1)-A (herein referred to as 80-09-02-NO11 or BCY7422);

(44BPA) A-(SEQ ID NO: 1)-A (herein referred to as 80-09-02-NO12 or BCY7521);

Ac-(SEQ ID NO: 3) (herein referred to as 80-09-02-NO17);

Ac-(SEQ ID NO: 4) (herein referred to as 80-09-02-NO18);

Ac-(SQ ID NO: 5) (herein referred to as 80-09-02-NO19 or BCY7537);

Ac-(SEQ ID NO: 6) (herein referred to as 80-09-02-N020);

Ac-(SEQ ID NO: 7) (herein referred to as 80-09-02-NO21 or BCY7539);

Ac-(SEQ ID NO: 8) (herein referred to as 80-09-02-N022 or BCY7540);

Ac-(SEQ ID NO: 9) (herein referred to as 80-09-02-N023);

Ac-(pCoF)-(SEQ ID NO: 1) (herein referred to as 80-09-02-N044);

Ac-(SEQ ID NO: 10) (herein referred to as 80-09-02-N045);

Ac-(SEQ ID NO: 11) (herein referred to as 80-09-02-N046 or BCY7657);

Ac-(SEQ ID NO: 12) (herein referred to as 80-09-02-N047 or BCY7658);

Ac-(SEQ ID NO: 13) (herein referred to as 80-09-02-N048 or BCY7659);

Ac-(SEQ ID NO: 14) (herein referred to as 80-09-02-N049);

Ac-(SEQ ID NO: 15) (herein referred to as 80-09-02-N050 or BCY7661);

SDN-(SEQ ID NO: 15)-A (herein referred to as BCY3387);
Ac-(SEQ ID NO: 16) (herein referred to as 80-09-02-N051 or BCY7662);
Ac-(SEQ ID NO: 17) (herein referred to as 80-09-02-N052);
Ac-(SEQ ID NO: 18) (herein referred to as 80-09-02-N053);
Ac-(SEQ ID NO: 19) (herein referred to as 80-09-02-N054 or BCY7665);
Ac-(SEQ ID NO: 20) (herein referred to as 80-09-02-N055 or BCY7666);
Ac-(SEQ ID NO: 21) (herein referred to as 80-09-02-N056);
A-(SEQ ID NO: 1)-TNK (herein referred to as 80-09-02-T01-N001 or BCY3385);
A-(SEQ ID NO: 1)-TN (HArg) (herein referred to as 80-09-02-T01-N003 or BCY7281);
A-(SEQ ID NO: 1)-TN (D-K) (herein referred to as 80-09-02-T01-N004 or BCY7282);
A-(SEQ ID NO: 22)-TNK (herein referred to as 80-09-02-T01-N005);
A-(SEQ ID NO: 23)-TNK (herein referred to as 80-09-02-T01-N006);
Ac-(SEQ ID NO: 1)-TNK (herein referred to as 80-09-02-T01-N011 or BCY7391);
A-(SEQ ID NO: 24)-TNK (herein referred to as 80-09-02-T01-N012 or BCY7342);
A-(SEQ ID NO: 25)-TNK (herein referred to as 80-09-02-T01-N014 or BCY7344);
A-(SEQ ID NO: 1)-ANK (herein referred to as 80-09-02-T01-NO16 or BCY7346);
A-(SEQ ID NO: 1)-[dA]NK (herein referred to as BCY7367);
A-(SEQ ID NO: 1)-TAK (herein referred to as 80-09-02-T01-N017 or BCY7347);
A-(SEQ ID NO: 1)-T[dA]K (herein referred to as BCY7368);
A-(SEQ ID NO: 1)-TNA (herein referred to as 80-09-02-T01-N018 or BCY7348);
A-(SEQ ID NO: 1)-TN[dA] (herein referred to as BCY7369);
Ac-[pCoPhe]-(SEQ ID NO: 1) (herein referred to as BCY7656);
A-(SEQ ID NO: 6)-TNK (herein referred to as 80-09-02-T01-N020 or BCY7354);
A-(SEQ ID NO: 26)-TNK (herein referred to as 80-09-02-T01-N022 or BCY7352);
A-(SEQ ID NO: 27)-TNK (herein referred to as 80-09-02-T01-N026 or BCY7356);
A-(SEQ ID NO: 28)-TNK (herein referred to as 80-09-02-T01-N027 or BCY7357);
A-(SEQ ID NO: 29)-TNK (herein referred to as 80-09-02-T01-N041 or BCY7372); and
A-(SEQ ID NO: 30)-TNK (herein referred to as 80-09-02-T01-N042 or BCY7424).

In a yet further embodiment, the peptide ligand of $C_i$-P/A/Hyp-F/Y-G/A-$C_{ii}$-$X_1$-$X_2$-$X_3$-W/1-Nal/2-Nal-S/A-$X_4$-P-I/D/A-W/1-Nal/2-Nal-$C_{iii}$ (SEQ ID NO: 38) comprises an amino acid sequence selected from:
A-(SEQ ID NO: 1)-TNK (herein referred to as 80-09-02-T01-N001 or BCY3385);
Ac-(SEQ ID NO: 1) (herein referred to as 80-09-02-N008 or BCY7390); and
Ac-(SEQ ID NO: 1)-TNK (herein referred to as 80-09-02-T01-NO11 or BCY7391).

Data is presented herein in Table 3 which demonstrates that the peptide ligands of this embodiment exhibited good levels (<100 nM) of binding to human Nectin-4 as evidenced by the SPR binding data.

In a further embodiment, the peptide ligand of $C_i$-W/A-P-L-D/S-S/D-Y-W-$C_{ii}$-$X_5$-R-I-$C_{iii}$ (SEQ ID NO: 39) comprises an amino acid sequence selected from any one of SEQ ID NOS: 31-34:

$C_i$WPLDSYW$C_{ii}$ARI$C_{iii}$; (SEQ ID NO: 31)

$C_i$APLDDYW$C_{ii}$GRI$C_{iii}$; (SEQ ID NO: 32)

$C_i$APLDDYW$C_{ii}$DRI$C_{iii}$; (SEQ ID NO: 33)
and $C_i$APLSDYW$C_{ii}$NRI$C_{iii}$; (SEQ ID NO: 34)

wherein $C_i$, $C_{ii}$ and $C_{iii}$ represent first, second and third cysteine residues, respectively, or a pharmaceutically acceptable salt thereof.

In a further embodiment, the peptide ligand of $C_i$-W/A-P-L-D/S-S/D-Y-W-$C_{ii}$-$X_5$-R-I-$C_{iii}$ (SEQ ID NO: 39) comprises an amino acid sequence selected from:
A-(SEQ ID NO: 31)-A (herein referred to as 80-10-00 or BCY488);
A-(SEQ ID NO: 32)-A (herein referred to as BCY432);
DDW-(SEQ ID NO: 32)-A (herein referred to as 80-10-11-T01 or BCY433);
VDW-(SEQ ID NO: 33)-A (herein referred to as 80-10-12-T01 or BCY462);
QKW-(SEQ ID NO: 34)-A (herein referred to as 80-10-13-T01 or BCY3400);
Q[HArg]W-(SEQ ID NO: 34)-A (herein referred to as BCY7278);
Q[K(Ac)]W-(SEQ ID NO: 34)-A (herein referred to as BCY7280);
[Ac] QKW-(SEQ ID NO: 34) (herein referred to as BCY7392);
Q[dK]W-(SEQ ID NO: 34)-A (herein referred to as BCY7426);
Ac-AKW-(SEQ ID NO: 34) (herein referred to as BCY7622);
Ac-QAW-(SEQ ID NO: 34) (herein referred to as BCY7623);
Ac-QKA-(SEQ ID NO: 34) (herein referred to as BCY7624);
Ac-[dA]KW-(SEQ ID NO: 34) (herein referred to as BCY7634);
Ac-Q[dA]W-(SEQ ID NO: 34) (herein referred to as BCY7635);
Ac-QK[dA]-(SEQ ID NO: 34) (herein referred to as BCY7636);
Ac-Q[dD]W-(SEQ ID NO: 34) (herein referred to as BCY7993);
Ac-QK[1Nal]-(SEQ ID NO: 34) (herein referred to as BCY7996);
Ac-QK[2Nal]-(SEQ ID NO: 34) (herein referred to as BCY7997); and
Ac-(SEQ ID NO: 34) (herein referred to as BCY8044).

In a yet further embodiment, the peptide ligand of $C_i$-W/A-P-L-D/S-S/D-Y-W-$C_{ii}$-$X_5$-R-I-$C_{iii}$ (SEQ ID NO: 39) comprises an amino acid sequence selected from:

[Ac]QKW-(SEQ ID NO: 34) (herein referred to as BCY7392).

Data is presented herein in Table 3 which demonstrates that the peptide ligand of this embodiment exhibited good levels (<100 nM) of binding to human Nectin-4 as evidenced by the SPR binding data.

In a further embodiment, the peptide ligand of $C_i$-W/A/Y-P/A-L-D/S/A-S/D/P/A-Y-W/1-Nal-$C_{ii}$-$X_5$-R/HArg/A-I-$C_{iii}$ (SEQ ID NO: 42) comprises an amino acid sequence selected from:

```
                                    (SEQ ID NO: 43)
CWPLDPYWCGRIC;

(SEQ ID NO: 44)
CYPLSPYWCERIC;

(SEQ ID NO: 58)
CWPLDDYWCPRIC;

(SEQ ID NO: 65)
CAPLSDYWCN[HArg]IC;

(SEQ ID NO: 103)
CAALSDYWCNRIC;

(SEQ ID NO: 104)
CAPLADYWCNRIC;

(SEQ ID NO: 105)
CAPLSAYWCNRIC;

(SEQ ID NO: 106)
CAPLSDYWCARIC;

(SEQ ID NO: 107)
CAPLSDYWCNAIC;

(SEQ ID NO: 108)
CAPL[dA]DYWCNRIC;

(SEQ ID NO: 109)
CAPLS[dA]YWCNRIC;

(SEQ ID NO: 110)
CAPLSDYWC[dA]RIC;

(SEQ ID NO: 153)
CAPLSDY[1Nal]CNRIC;
and (SEQ ID NO: 154)
CAPLSDYWC[dD]RIC
```

In a further embodiment, the peptide ligand of $C_i$-W/A/Y-P/A-L-D/S/A-S/D/P/A-Y-W/1-Nal-$C_{ii}$-X-R/HArg/A-I-$C_{iii}$ (SEQ ID NO: 42) comprises an amino acid sequence selected from:

A-(SEQ ID NO: 43)-A (hereinafter referred to as BCY430);

A-(SEQ ID NO: 44)-A (hereinafter referred to as BCY431);

A-(SEQ ID NO: 58)-PQA (hereinafter referred to as BCY3401);

QKW-(SEQ ID NO: 65)-A (hereinafter referred to as BCY7279);

Ac-QKW-(SEQ ID NO: 103) (hereinafter referred to as BCY7625);

Ac-QKW-(SEQ ID NO: 104) (hereinafter referred to as BCY7627);

Ac-QKW-(SEQ ID NO: 105) (hereinafter referred to as BCY7628);

Ac-QKW-(SEQ ID NO: 106) (hereinafter referred to as BCY7631);

Ac-QKW-(SEQ ID NO: 107) (hereinafter referred to as BCY7632);

Ac-QKW-(SEQ ID NO: 108) (hereinafter referred to as BCY7639);

Ac-QKW-(SEQ ID NO: 109) (hereinafter referred to as BCY7640);

Ac-QKW-(SEQ ID NO: 110) (hereinafter referred to as BCY7643);

Ac-QKW-(SEQ ID NO: 153) (hereinafter referred to as BCY7998); and

Ac-QKW. (SEQ ID NO: 154) (hereinafter referred to as BCY8000).

In a further embodiment, the peptide ligand of $C_i$-V-T-T-S-Y-D-$C_{ii}$-F/W-L/V-H/R/T-L-UG-G/Q/H-$C_{iii}$ (SEQ ID NO: 40) comprises an amino acid sequence selected from any one of SEQ ID NOS: 35-37:

(SEQ ID NO: 35)
$C_i$VTTSYDC$_{ii}$FLHLLGC$_{iii}$;

(SEQ ID NO: 36)
$C_i$VTTSYDC$_{ii}$WVRLGQC$_{iii}$;
and (SEQ ID NO: 37)
$C_i$VTTSYDC$_{ii}$WVTLGHC$_{iii}$;

wherein $C_i$, $C_{ii}$ and $C_{iii}$ represent first, second and third cysteine residues, respectively, or a pharmaceutically acceptable salt thereof.

In a further embodiment, the peptide ligand of $C_i$-V-T-T-S-Y-D-$C_{ii}$-F/W-L/V-H/R/T-L-L/G-G/Q/H-$C_{iii}$ (SEQ ID NO: 40) comprises an amino acid sequence selected from:

A-(SEQ ID NO: 35)-A (herein referred to as 80-11-00 or BCY471);

A-(SEQ ID NO: 36)-A (herein referred to as 80-11-01 or BCY472); and

A-(SEQ ID NO: 37)-SRF (herein referred to as 80-11-08-T01 or BCY3406).

In a further embodiment, the peptide ligand of $C_i$-V-T-T-S-Y-D-$C_{ii}$-F/W-L/V-H/R/T-L-L/G-G/Q/H-$C_{iii}$ (SEQ ID NO: 40) comprises an amino acid sequence selected from:

Ac-(SEQ ID NO: 37)-SRF (herein referred to as BCY7393).

In a further embodiment, the peptide ligand of $C_i$-$X_6$-$X_7$-$X_8$-$C_{ii}$-$X_9$-$X_{10}$-$X_{11}$-$X_{12}$-$X_{13}$-$X_{14}$-$X_{15}$-$X_{16}$-$X_{17}$-$C_{iii}$ (SEQ ID NO: 41) comprises an amino acid sequence selected from:

```
                                    (SEQ ID NO: 45)
CPFGCMETWSWPIWC;

(SEQ ID NO: 46)
CPFGCMRGWSWPIWC;

(SEQ ID NO: 47)
CPFGCMSGWSWPIWC;

(SEQ ID NO: 48)
CPFGCMEGWSWPIWC;

(SEQ ID NO: 49)
CPFGCMEDWSWPIWC;

(SEQ ID NO: 50)
CPFGCMPGWSWPIWC;

(SEQ ID NO: 51)
CPFGCMKSWSWPIWC;

(SEQ ID NO: 52)
```

| | |
|---|---|
| CPFGCMKTWSWPIWC; | (SEQ ID NO: 53) |
| CPFGCMKGWSWPIWC | (SEQ ID NO: 54) |
| CPFGCQEHWSWPIWC; | (SEQ ID NO: 55) |
| CPFGCIKSWSWPIWC; | (SEQ ID NO: 56) |
| CPFGCQEDWSWPIWC; | (SEQ ID NO: 57) |
| CPFGCMSDWSWPIWC; | (SEQ ID NO: 59) |
| CPFGCM[HArg]NWSWPIWC; | (SEQ ID NO: 60) |
| CPFGCM[K(Ac)]NWSWPIWC; | (SEQ ID NO: 61) |
| CPFGCM[K(Ac)]SWSWPIWC; | (SEQ ID NO: 62) |
| CPFGC[Nle]KSWSWPIWC; | (SEQ ID NO: 63) |
| CPFGCM[HArg]SWSWPIWC; | (SEQ ID NO: 64) |
| CPFGCM[dK]SWSWPIWC; | (SEQ ID NO: 66) |
| CP[dA]GCMKNWSWPIWC; | (SEQ ID NO: 67) |
| CPF[dA]CMKNWSWPIWC; | (SEQ ID NO: 68) |
| CPFGCM[dA]NWSWPIWC; | (SEQ ID NO: 69) |
| CPFGCMK[dA]WSWPIWC; | (SEQ ID NO: 70) |
| CPFGCMKN[dA]SWPIWC; | (SEQ ID NO: 71) |
| CPFGCMKNWSP[dA]WC; | (SEQ ID NO: 72) |
| C[dA]FGCMKNWSWPIWC; | (SEQ ID NO: 73) |
| CPFGC[tBuAla]KNWSWPIWC; | (SEQ ID NO: 74) |
| CPFGC[HLeu]KNWSWPIWC; | (SEQ ID NO: 75) |
| CPFGCMKNWSWPI[1Nal]C; | (SEQ ID NO: 76) |
| CPF[dD]CM[HArg]NWSWPIWC; | (SEQ ID NO: 77) |
| CPF[dA]CM[HArg]NWSWPIWC; | (SEQ ID NO: 78) |
| CP[3MePhe]GCMKNWSWPIWC; | (SEQ ID NO: 79) |
| CP[4MePhe]GCMKNWSWPIWC; | (SEQ ID NO: 80) |
| CP[HPhe]GCMKNWSWPIWC; | |
| CPF[dD]CMKNWSWPIWC; | (SEQ ID NO: 81) |
| CPFGC[Hse(Me)]KNWSWPIWC; | (SEQ ID NO: 82) |
| CPFGCMKN[AzaTrp]SWPIWC; | (SEQ ID NO: 83) |
| CPFGCMKNWSFPIWC; | (SEQ ID NO: 84) |
| CPFGCMKNWSYPIWC; | (SEQ ID NO: 85) |
| CPFGCMKNWS[1Nal]PIWC; | (SEQ ID NO: 86) |
| CPFGCMKNWS[2Nal]PIWC; | (SEQ ID NO: 87) |
| CPFGCMKNWS[AzaTrp]PIWC; | (SEQ ID NO: 88) |
| CPFGCMKNWSW[Aze]IWC; | (SEQ ID NO: 89) |
| CPFGCMKNWSW[Pip]IWC; | (SEQ ID NO: 90) |
| CPFGCMKNWSWPIFC; | (SEQ ID NO: 91) |
| CPFGCMKNWSWPIYC; | (SEQ ID NO: 92) |
| CPFGCMKNWSWPI[AzaTrp]C; | (SEQ ID NO: 93) |
| CGFGCMKNWSWPIWC; | (SEQ ID NO: 94) |
| C[Aze]FGCMKNWSWPIWC; | (SEQ ID NO: 95) |
| CPF[K(Ac)]CMKNWSWPIWC; | (SEQ ID NO: 96) |
| CPFGCLKNWSWPIWC; | (SEQ ID NO: 97) |
| CPFGC[MetO2]KNWSWPIWC; | (SEQ ID NO: 98) |
| CPFGCMPNWSWPIWC; | (SEQ ID NO: 99) |
| CPFGCMQNWSWPIWC; | (SEQ ID NO: 100) |
| CPFGCMKNWSWPPWC; | (SEQ ID NO: 101) |
| CP[2Pal]GCMKNWSWPIWC; | (SEQ ID NO: 102) |
| CPFGCMKN[1Nal]SWPIWC; | (SEQ ID NO: 111) |
| CPFGCMKN[2Nal]SWPIWC; | (SEQ ID NO: 112) |
| CPFGCMKNWSWPI[2Nal]C; | (SEQ ID NO: 113) |
| C[HyP]FGCMKNWSWPIWC; | (SEQ ID NO: 114) |

CPF[dD]CM[HArg]NWSTPIWC; (SEQ ID NO: 115)

CPF[dD]CM[HArg][dK]WSTPIWC; (SEQ ID NO: 116)

CPF[dD]CM[HArg]NWSTPKWC; (SEQ ID NO: 117)

C[Pro(4NH)]F[dD]CM[HArg]NWSTPIWC; (SEQ ID NO: 118)

CPF[dD]CMKNWSTPIWC; (SEQ ID NO: 119)

CPF[dK]CM[HArg]NWSTPIWC; (SEQ ID NO: 120)

CPF[dD]CK[HArg]NWSTPIWC; (SEQ ID NO: 121)

CPF[dD]CM[HArg]KWSTPIWC; (SEQ ID NO: 122)

C[Oxa]F[dD]CM[HArg]NWSTPIWC; (SEQ ID NO: 123)

CPF[dD]CM[HArg][Thi]WSTPIWC; (SEQ ID NO: 124)

CPF[dD]CM[HArg][4ThiAz]WSTPIWC; (SEQ ID NO: 125)

CPF[dD]CM[HArg][124TriAz]WSTPIWC; (SEQ ID NO: 126)

CPF[dD]CM[HArg]NWS[124TriAz]PIWC; (SEQ ID NO: 127)

CPF[dD]CM[HArg]NWST[Oxa]IWC; (SEQ ID NO: 128)

CP[DOPA][dD]CM[HArg]NWSTPIWC; (SEQ ID NO: 129)

CPF[dD]CM[HArg]NWS[DOPA]PIWC; (SEQ ID NO: 130)

CPF[dD]CM[HArg]NWS[THP(SO2)]PIWC; (SEQ ID NO: 131)

CPF[dD]CM[HArg]NWSTP[THP(SO2)]WC; (SEQ ID NO: 132)

CPF[dD]CM[HArg]N[5FTrp]STPIWC; (SEQ ID NO: 133)

CPF[dD]CM[HArg]NWSTPI[5FTrp]C; (SEQ ID NO: 134)

CPF[dD]CM[HArg]NWS[THP(O)]PIWC; (SEQ ID NO: 135)

CPF[dD]CM[HArg]NWSTP[THP(O)]WC; (SEQ ID NO: 136)

C[44DFP]F[dD]CM[HArg]NWSTPIWC; (SEQ ID NO: 137)

C[Oic]F[dD]CM[HArg]NWSTPIWC; (SEQ ID NO: 138)

CPF[dF]CM[HArg]NWSTPIWC; (SEQ ID NO: 139)

CPF[dE]CM[HArg]NWSTPIWC; (SEQ ID NO: 140)

CPF[dQ]CM[HArg]NWSTPIWC; (SEQ ID NO: 141)

CPF[dL]CM[HArg]NWSTPIWC; (SEQ ID NO: 142)

CPF[dS]CM[HArg]NWSTPIWC; (SEQ ID NO: 143)

CPF[dD]CM[HArg]NW[HSer]TPIWC; (SEQ ID NO: 144)

CPF[dD]CM[HArg]NWSTP[C5A]WC; (SEQ ID NO: 145)

CPF[dD]CM[HArg]NWSTP[Cpa]WC; (SEQ ID NO: 146)

CPF[dD]CM[HArg]NWSTP[Cha]WC; (SEQ ID NO: 147)

CPF[dD]C[HGln][HArg]NWSTPIWC; (SEQ ID NO: 148)

CPF[dD]C[C5A][HArg]NWSTPIWC; (SEQ ID NO: 149)

CPF[dD]CM[HArg]N[Trp(Me)]STPIWC; (SEQ ID NO: 150)

CPF[dD][NMeCys]M[HArg]NWSTPIWC; (SEQ ID NO: 151)

CPF[dD]C[HArg]NWS[NMeThr]PIWC; (SEQ ID NO: 152)

CP[1Nal][dD]CM[HArg]NWSTPIWC; (SEQ ID NO: 155)

CP[2Nal][dD]CM[HArg]NWSTPIWC; (SEQ ID NO: 156)

CP[44BPA][dD]CM[HArg]NWSTPIWC; (SEQ ID NO: 157)

CPF[dD]CM[HArg]NWSTPPWC; (SEQ ID NO: 158)

CPF[dD]CM[HArg]NWSTP[HyP]WC; (SEQ ID NO: 159)

CPF[dD]CL[HArg]NWSTPPWC; (SEQ ID NO: 160)

CPF[dD]CL[HArg]NWSTPIWC; (SEQ ID NO: 161)

CPY[dD]CM[HArg]NWSTPIWC; (SEQ ID NO: 162)

C[Aib]F[dD]CM[HArg]NWSTPIWC; (SEQ ID NO: 163)

C[Sar]F[dD]CM[HArg]NWSTPIWC; (SEQ ID NO: 164)

CPF[dR]CM[HArg]NWSTPIWC; (SEQ ID NO: 165)

CPF[dD]CM[HArg]NWSTPKWC; (SEQ ID NO: 166)

CP[1Nal][dD]CM[HArg]NWSTP[HyP]WC; (SEQ ID NO: 167)

CP[1Nal][dD]CM[HArg]HWSTP[HyP]WC: (SEQ ID NO: 168)

CP[1Nal][dD]CM[HArg]DWSTP[HyP]WC; (SEQ ID NO: 169)

CP[1Nal][dD]CM[HArg]DWSTPIWC; (SEQ ID NO: 170)

```
CP[1Nal][dR]CM[HArg]NWSTP[HyP]WC;             (SEQ ID NO: 171)

CP[1Nal][dR]CM[HArg]HWSTP[HyP]WC;             (SEQ ID NO: 172)

CPF[dD]CM[NMeHArg]NWSTPIWC;                   (SEQ ID NO: 173)

CPF[dD]CM[HArg][NMeAsn]WSTPIWC;               (SEQ ID NO: 174)

CPF[dD]CM[HArg]NWS[NMeThr]PIWC;               (SEQ ID NO: 175)

CPF[dD]CM[HArg]NWSTP[NMeIle]WC;               (SEQ ID NO: 176)

CP[1Nal][dD]CM[HArg][Cya]WSTP[HyP]WC;         (SEQ ID NO: 177)

CP[1Nal][dD]CM[Cya]DWSTP[HyP]WC;              (SEQ ID NO: 178)

CP[1Nal][DCya]CM[HArg]DWSTP[HyP]WC;           (SEQ ID NO: 179)

CP[1Nal][dD]CM[HArg]DWDTP[HyP]WC;             (SEQ ID NO: 180)

CP[2Nal][dD]CM[HArg]DWSTP[HyP]WC;             (SEQ ID NO: 181)

CP[1Nal][dD]CM[HArg]DWTTP[HyP]WC;             (SEQ ID NO: 182)

CP[1Nal][dD]CM[HArg]DW[HSer]TP[HyP]WC;        (SEQ ID NO: 183)

CP[1Nal][dD]CM[HArg]DW[dS]TP[HyP]WC;          (SEQ ID NO: 184)

CP[1Nal][dD]CM[HArg]DWSSP[HyP]WC;             (SEQ ID NO: 185)

CP[1Nal][dD]CM[Agb]DWSTP[HyP]WC;              (SEQ ID NO: 186)

CP[1Nal][dD]CMPDWSTP[HyP]WC;                  (SEQ ID NO: 187)

CP[1Nal][dD]CM[HyP]DWSTP[HyP]WC;              (SEQ ID NO: 188)

CP[1Nal][dR]CM[HArg]DWSTP[HyP]WC;             (SEQ ID NO: 189)

CP[1Nal][dR]CM[HArg]DWDTP[HyP]WC;             (SEQ ID NO: 190)

CP[2Nal][dR]CM[HArg]DWSTP[HyP]WC;             (SEQ ID NO: 191)

CP[1Nal][dR]CM[HArg]DWTTP[HyP]WC;             (SEQ ID NO: 192)

CP[1Nal][dR]CM[HArg]DW[HSer]TP[HyP]WC;        (SEQ ID NO: 193)

CP[1Nal][dR]CM[HArg]DW[dS]TP[HyP]WC;          (SEQ ID NO: 194)

CP[1Nal][dR]CM[HArg]DWSSP[HyP]WC;             (SEQ ID NO: 195)

CP[1Nal][dR]CM[Agb]DWSTP[HyP]WC;              (SEQ ID NO: 196)

CP[1Nal][dR]CMPDWSTP[HyP]WC;                  (SEQ ID NO: 197)

CP[1Nal][dR]CM[HyP]DWSTP[HyP]WC;              (SEQ ID NO: 198)

CP[1Nal][dD]CL[HArg]DWSTPIWC;                 (SEQ ID NO: 199)

CP[1Nal][dD]CL[HArg]DWSTP[HyP]WC;             (SEQ ID NO: 200)

CP[1Nal][dR]CL[HArg]DWSTP[HyP]WC;             (SEQ ID NO: 201)

CP[1Nal][dR]CL[HArg]HWSTP[HyP]WC;             (SEQ ID NO: 202)

CP[1Nal][dR]CM[HArg]DWSTPIWC;                 (SEQ ID NO: 203)

CP[1Nal][DCya]CM[Cya]DWSTP[HyP]WC;            (SEQ ID NO: 208)

CP[1Nal][DCya]CM[HArg][Cya]WSTP[HyP]WC;       (SEQ ID NO: 209)

CP[1Nal][dD]CM[Cya][Cya]WSTP[HyP]WC           (SEQ ID NO: 210)

CP[1Nal][dK]CM[HArg]DWSTP[HyP]WC;             (SEQ ID NO: 211)

CP[1Nal][dD]CMKDWSTP[HyP]WC;                  (SEQ ID NO: 212)

CP[1Nal][dD]CM[HArg]D[dW]STP[HyP][dW]C;       (SEQ ID NO: 215)
and

CPFGCM[HArg]DWSTP[HyP]WC.                     (SEQ ID NO: 216)
```

In a further embodiment, the peptide ligand of $C_i$-$X_6$-$X_7$-$X_8$-$C_{ii}$-$X_9$-$X_{10}$-$X_{11}$-$X_{12}$-$X_{13}$-$X_{14}$-$X_{15}$-$X_{16}$-$X_{17}$-$C_{iii}$ (SEQ ID NO: 41) comprises an amino acid sequence selected from:

```
CP[1Nal][dD]CM[HArg]DWSTP[HyP]WC.             (SEQ ID NO: 169)
```

In one embodiment, the peptide ligand of the invention is a peptide ligand which is other than the amino acid sequence CP[1Nal][dD]CM[HArg]DWSTP[HyP]WC (SEQ ID NO: 169).

In a further embodiment, the peptide ligand of $C_i$-$X_6$-$X_7$-$X_8$-$C_{ii}$-$X_9$-$X_{10}$-$X_{11}$-$X_{12}$-$X_{13}$-$X_{14}$-$X_{15}$-$X_{16}$-$X_{17}$-$C_{iii}$ (SEQ ID NO: 41) comprises an amino acid sequence selected from:
DDA-(SEQ ID NO: 45)-A (hereinafter referred to as BCY3386);
DTA-(SEQ ID NO: 46)-A (hereinafter referred to as BCY3388);
DSE-(SEQ ID NO: 47)-A (hereinafter referred to as BCY3389);
HDA-(SEQ ID NO: 48)-A (hereinafter referred to as BCY3390);
MDT-(SEQ ID NO: 49)-A (hereinafter referred to as BCY3391);
DPG-(SEQ ID NO: 50)-A (hereinafter referred to as BCY3392);
HDS-(SEQ ID NO: 51)-A (hereinafter referred to as BCY3393);
(D-H)DS-(SEQ ID NO: 51)-A (hereinafter referred to as BCY7272);
A-(SEQ ID NO: 52)-TDK (hereinafter referred to as BCY3394);
A-(SEQ ID NO: 53)-LKD (hereinafter referred to as BCY3395);

A-(SEQ ID NO: 54)-TTA (hereinafter referred to as BCY3396);
A-(SEQ ID NO: 55)-QME (hereinafter referred to as BCY3397);
A-(SEQ ID NO: 56)-LSE (hereinafter referred to as BCY3398);
A-(SEQ ID NO: 57)-STD (hereinafter referred to as BCY3399);
A-(SEQ ID NO: 59)-TNK (hereinafter referred to as BCY7265);
Ac-(SEQ ID NO: 59) (hereinafter referred to as BCY7660);
A-(SEQ ID NO: 60)-TNK (hereinafter referred to as BCY7266);
Ac-(SEQ ID NO: 60) (hereinafter referred to as BCY7616);
HDS-(SEQ ID NO: 61)-A (hereinafter referred to as BCY7273);
HDS-(SEQ ID NO: 62)-A (hereinafter referred to as BCY7274);
HDS-(SEQ ID NO: 63)-A (hereinafter referred to as BCY7275);
HDS-(SEQ ID NO: 64)-A (hereinafter referred to as BCY7276);
A-(SEQ ID NO: 66)-TNK (hereinafter referred to as BCY7349);
A-(SEQ ID NO: 67)-TNK (hereinafter referred to as BCY7350);
Ac-(SEQ ID NO: 67) (hereinafter referred to as BCY7538);
A-(SEQ ID NO: 68)-TNK (hereinafter referred to as BCY7359);
A-(SEQ ID NO: 69)-TNK (hereinafter referred to as BCY7360);
A-(SEQ ID NO: 70)-TNK (hereinafter referred to as BCY7361);
A-(SEQ ID NO: 71)-TNK (hereinafter referred to as BCY7365);
A-(SEQ ID NO: 72)-TNK (hereinafter referred to as BCY7370);
Ac-(SEQ ID NO: 73) (hereinafter referred to as BCY7535);
Ac-(SEQ ID NO: 74) (hereinafter referred to as BCY7536);
Ac-(SEQ ID NO: 75) (hereinafter referred to as BCY7541);
[B-Ala][Sar$_5$]-(SEQ ID NO: 76) (hereinafter referred to as BCY7556);
Ac-[B-Ala][Sar$_5$]-(SEQ ID NO: 76) (hereinafter referred to as BCY7558);
[B-Ala][Sar$_5$]-(SEQ ID NO: 77) (hereinafter referred to as BCY7557);
Ac-[B-Ala][Sar$_5$]-(SEQ ID NO: 77) (hereinafter referred to as BCY7559);
Ac-(SEQ ID NO: 78) (hereinafter referred to as BCY7580);
Ac-(SEQ ID NO: 79) (hereinafter referred to as BCY7581);
Ac-(SEQ ID NO: 80) (hereinafter referred to as BCY7582);
Ac-(SEQ ID NO: 81) (hereinafter referred to as BCY7584);
Ac-(SEQ ID NO: 82) (hereinafter referred to as BCY7585);
Ac-(SEQ ID NO: 83) (hereinafter referred to as BCY7588);
Ac-(SEQ ID NO: 84) (hereinafter referred to as BCY7589);
Ac-(SEQ ID NO: 85) (hereinafter referred to as BCY7590);
Ac-(SEQ ID NO: 86) (hereinafter referred to as BCY7591);
Ac-(SEQ ID NO: 87) (hereinafter referred to as BCY7592);
Ac-(SEQ ID NO: 88) (hereinafter referred to as BCY7593);
Ac-(SEQ ID NO: 89) (hereinafter referred to as BCY7594);
Ac-(SEQ ID NO: 90) (hereinafter referred to as BCY7595);
Ac-(SEQ ID NO: 91) (hereinafter referred to as BCY7596);
Ac-(SEQ ID NO: 92) (hereinafter referred to as BCY7597);
Ac-(SEQ ID NO: 93) (hereinafter referred to as BCY7598);
Ac-(SEQ ID NO: 94) (hereinafter referred to as BCY7607);
Ac-(SEQ ID NO: 95) (hereinafter referred to as BCY7608);
Ac-(SEQ ID NO: 96) (hereinafter referred to as BCY7611);
Ac-(SEQ ID NO: 97) (hereinafter referred to as BCY7612);
Ac-(SEQ ID NO: 98) (hereinafter referred to as BCY7613);
Ac-(SEQ ID NO: 99) (hereinafter referred to as BCY7614);
Ac-(SEQ ID NO: 100) (hereinafter referred to as BCY7615);
Ac-(SEQ ID NO: 101) (hereinafter referred to as BCY7618);
Ac-(SEQ ID NO: 102) (hereinafter referred to as BCY7620);
Ac-(SEQ ID NO: 111) (hereinafter referred to as BCY7663);
Ac-(SEQ ID NO: 112) (hereinafter referred to as BCY7664);
Ac-(SEQ ID NO: 113) (hereinafter referred to as BCY7667);
Ac-(SEQ ID NO: 114) (hereinafter referred to as BCY7668);
Ac-(SEQ ID NO: 115) (hereinafter referred to as BCY7765);
(SEQ ID NO: 115) (hereinafter referred to as BCY7793);
(MeO-dPEG12) (SEQ ID NO: 115) (hereinafter referred to as BCY8087);
(Carboxyfluorescein) (SEQ ID NO: 115) (hereinafter referred to as BCY8208);
(PEG$_3$) (PEG$_3$) (SEQ ID NO: 115) (hereinafter referred to as BCY7815);
(MeO-dPEG12) (PEG3) (PEG3) (SEQ ID NO: 115) (hereinafter referred to as BCY8094);
Ac-DDD-(SEQ ID NO: 115) (hereinafter referred to as BCY8028);
Ac-[dD][dD][dD]-(SEQ ID NO: 115) (hereinafter referred to as BCY8029);
[B-Ala][Sar10]-(SEQ ID NO: 115) (hereinafter referred to as BCY7814);
Ac-(SEQ ID NO: 116) (hereinafter referred to as BCY7816);
Ac-(SEQ ID NO: 116) (MeO-dPEG12) linked to D-Lys6 (hereinafter referred to as BCY8084);

Ac-(SEQ ID NO: 117) (hereinafter referred to as BCY7817);
Ac-(SEQ ID NO: 118) (hereinafter referred to as BCY7818;
Ac-(SEQ ID NO: 118) (MeO-dPEG12) linked to Pro (4NH) 1 (hereinafter referred to as BCY8086);
Ac-(SEQ ID NO: 119) (hereinafter referred to as BCY7819;
Ac-(SEQ ID NO: 119) (MeO-dPEG12) linked to Lys5 (hereinafter referred to as BCY8088);
Ac-(SEQ ID NO: 120) (hereinafter referred to as BCY7820;
Ac-(SEQ ID NO: 120) (MeO-dPEG12) linked to D-Lys3 (hereinafter referred to as BCY8089);
Ac-(SEQ ID NO: 121) (hereinafter referred to as BCY7821);
Ac-(SEQ ID NO: 121) (MeO-dPEG12) linked to Lys4 (hereinafter referred to as BCY8090);
Ac-(SEQ ID NO: 122) (hereinafter referred to as BCY7822);
Ac-(SEQ ID NO: 122) (MeO-dPEG12) linked to Lys6 (hereinafter referred to as BCY8091);
Ac-(SEQ ID NO: 123) (hereinafter referred to as BCY7876);
Ac-(SEQ ID NO: 124) (hereinafter referred to as BCY7877);
Ac-(SEQ ID NO: 125) (hereinafter referred to as BCY7879);
Ac-(SEQ ID NO: 126) (hereinafter referred to as BCY7881);
Ac-(SEQ ID NO: 127) (hereinafter referred to as BCY7883);
Ac-(SEQ ID NO: 128) (hereinafter referred to as BCY7884);
Ac-(SEQ ID NO: 129) (hereinafter referred to as BCY7886);
Ac-(SEQ ID NO: 130) (hereinafter referred to as BCY7887);
Ac-(SEQ ID NO: 131) (hereinafter referred to as BCY7889);
Ac-(SEQ ID NO: 132) (hereinafter referred to as BCY7890);
Ac-(SEQ ID NO: 133) (hereinafter referred to as BCY7891);
Ac-(SEQ ID NO: 134) (hereinafter referred to as BCY7892);
Ac-(SEQ ID NO: 135) (hereinafter referred to as BCY7894);
Ac-(SEQ ID NO: 136) (hereinafter referred to as BCY7895);
Ac-(SEQ ID NO: 137) (hereinafter referred to as BCY7896);
Ac-(SEQ ID NO: 138) (hereinafter referred to as BCY7897);
Ac-(SEQ ID NO: 139) (hereinafter referred to as BCY7902);
Ac-(SEQ ID NO: 140) (hereinafter referred to as BCY7903);
Ac-(SEQ ID NO: 141) (hereinafter referred to as BCY7904);
Ac-(SEQ ID NO: 142) (hereinafter referred to as BCY7906);
Ac-(SEQ ID NO: 143) (hereinafter referred to as BCY7907);
Ac-(SEQ ID NO: 144) (hereinafter referred to as BCY7908);
Ac-(SEQ ID NO: 145) (hereinafter referred to as BCY7911);
Ac-(SEQ ID NO: 146) (hereinafter referred to as BCY7912);
Ac-(SEQ ID NO: 147) (hereinafter referred to as BCY7913);
Ac-(SEQ ID NO: 148) (hereinafter referred to as BCY7914);
Ac-(SEQ ID NO: 149) (hereinafter referred to as BCY7915);
Ac-(SEQ ID NO: 150) (hereinafter referred to as BCY7916);
Ac-(SEQ ID NO: 151) (hereinafter referred to as BCY7973);
Ac-(SEQ ID NO: 152) (hereinafter referred to as BCY7979);
Ac-(SEQ ID NO: 155) (hereinafter referred to as BCY8030);
Ac-(SEQ ID NO: 156) (hereinafter referred to as BCY8031);
Ac-(SEQ ID NO: 157) (hereinafter referred to as BCY8032);
Ac-(SEQ ID NO: 158) (hereinafter referred to as BCY8036);
Ac-(SEQ ID NO: 159) (hereinafter referred to as BCY8037);
Ac-(SEQ ID NO: 160) (hereinafter referred to as BCY8038);
Ac-(SEQ ID NO: 161) (hereinafter referred to as BCY8039);
Ac-(SEQ ID NO: 162) (hereinafter referred to as BCY8040);
Ac-(SEQ ID NO: 163) (hereinafter referred to as BCY8041);
Ac-(SEQ ID NO: 164) (hereinafter referred to as BCY8042);
Ac-(SEQ ID NO: 165) (hereinafter referred to as BCY8042);
Ac-(SEQ ID NO: 166) (hereinafter referred to as BCY8085);
Ac-[B-Ala][Sar$_5$]-(SEQ ID NO: 167) (hereinafter referred to as BCY8120);
Ac-(SEQ ID NO: 167) (hereinafter referred to as BCY8124);
Ac-[B-Ala][Sar$_5$]-(SEQ ID NO: 168) (hereinafter referred to as BCY8121);
Ac-(SEQ ID NO: 168) (hereinafter referred to as BCY8125);
Ac-[B-Ala][Sar$_5$]-(SEQ ID NO: 169) (hereinafter referred to as BCY8122);
Ac-(SEQ ID NO: 169) (hereinafter referred to as BCY8126);
(SEQ ID NO: 169) (hereinafter referred to as BCY8116);
Fluorescein-(SEQ ID NO: 169) (hereinafter referred to as BCY8205);
[B-Ala][Sar10]-(SEQ ID NO: 169) (hereinafter referred to as BCY8234);
[PYA][B-Ala][Sar10]-(SEQ ID NO: 169) (hereinafter referred to as BCY8846);
Ac-[B-Ala][Sar$_5$]-(SEQ ID NO: 170) (hereinafter referred to as BCY8123);
Ac-(SEQ ID NO: 170) (hereinafter referred to as BCY8127);
(SEQ ID NO: 170) (hereinafter referred to as BCY8206);
Ac-(SEQ ID NO: 171) (hereinafter referred to as BCY8128);
(SEQ ID NO: 171) (hereinafter referred to as BCY8207);

[B-Ala][Sar10]-(SEQ ID NO: 171) (hereinafter referred to as BCY8232);
Ac-(SEQ ID NO: 172) (hereinafter referred to as BCY8129);
Ac-(SEQ ID NO: 173) (hereinafter referred to as BCY8153);
Ac-(SEQ ID NO: 174) (hereinafter referred to as BCY8154);
Ac-(SEQ ID NO: 175) (hereinafter referred to as BCY8157);
Ac-(SEQ ID NO: 176) (hereinafter referred to as BCY8158);
Ac-(SEQ ID NO: 177) (hereinafter referred to as BCY8161);
Ac-[B-Ala][Sar10]-(SEQ ID NO: 177) (hereinafter referred to as BCY8278);
Ac-(SEQ ID NO: 178) (hereinafter referred to as BCY8162);
Ac-[B-Ala][Sar10]-(SEQ ID NO: 178) (hereinafter referred to as BCY8277);
Ac-(SEQ ID NO: 179) (hereinafter referred to as BCY8163);
Ac-[B-Ala][Sar10]-(SEQ ID NO: 179) (hereinafter referred to as BCY8276);
[B-Ala][Sar10]-(SEQ ID NO: 179) (hereinafter referred to as BCY8269);
Ac-(SEQ ID NO: 180) (hereinafter referred to as BCY8174);
Ac-(SEQ ID NO: 181) (hereinafter referred to as BCY8175);
Ac-(SEQ ID NO: 182) (hereinafter referred to as BCY8176);
Ac-(SEQ ID NO: 183) (hereinafter referred to as BCY8177);
Ac-(SEQ ID NO: 184) (hereinafter referred to as BCY8178);
Ac-(SEQ ID NO: 185) (hereinafter referred to as BCY8180);
Ac-(SEQ ID NO: 186) (hereinafter referred to as BCY8181);
Ac-(SEQ ID NO: 187) (hereinafter referred to as BCY8182);
Ac-(SEQ ID NO: 188) (hereinafter referred to as BCY8183);
Ac-(SEQ ID NO: 189) (hereinafter referred to as BCY8184);
[B-Ala][Sar10]-(SEQ ID NO: 189) (hereinafter referred to as BCY8235);
Ac-(SEQ ID NO: 190) (hereinafter referred to as BCY8185);
Ac-(SEQ ID NO: 191) (hereinafter referred to as BCY8186);
Ac-(SEQ ID NO: 192) (hereinafter referred to as BCY8187);
Ac-(SEQ ID NO: 193) (hereinafter referred to as BCY8188);
Ac-(SEQ ID NO: 194) (hereinafter referred to as BCY8189);
Ac-(SEQ ID NO: 195) (hereinafter referred to as BCY8191);
Ac-(SEQ ID NO: 196) (hereinafter referred to as BCY8192);
Ac-(SEQ ID NO: 197) (hereinafter referred to as BCY8193);
Ac-(SEQ ID NO: 198) (hereinafter referred to as BCY8194);
Ac-(SEQ ID NO: 199) (hereinafter referred to as BCY8211);
Ac-(SEQ ID NO: 200) (hereinafter referred to as BCY8212);
Ac-(SEQ ID NO: 201) (hereinafter referred to as BCY8213);
Ac-(SEQ ID NO: 202) (hereinafter referred to as BCY8214);
[B-Ala][Sar10]-(SEQ ID NO: 202) (hereinafter referred to as BCY8231);
Ac-(SEQ ID NO: 203) (hereinafter referred to as BCY8215);
Ac-[B-Ala][Sar10]-(SEQ ID NO: 208) (hereinafter referred to as BCY8279);
Ac-[B-Ala][Sar10]-(SEQ ID NO: 209) (hereinafter referred to as BCY8280);
[B-Ala][Sar10]-(SEQ ID NO: 209) (hereinafter referred to as BCY8273);
Ac-[B-Ala][Sar10]-(SEQ ID NO: 210) (hereinafter referred to as BCY8281);
Ac-(SEQ ID NO: 211) (hereinafter referred to as BCY8831);
[B-Ala][Sar10]-(SEQ ID NO: 212) (hereinafter referred to as BCY8238);
(SEQ ID NO: 215) (hereinafter referred to as BCY11415);
[PYA][B-Ala][Sar10]-(SEQ ID NO: 215) (hereinafter referred to as BCY11942); and
(SEQ ID NO: 216) (hereinafter referred to as BCY11414).

In a further embodiment, the peptide ligand of $C_i$-$X_6$-$X_7$-$X_8$-$C_{ii}$-$X_9$-$X_{10}$-$X_{11}$-$X_{12}$-$X_{13}$-$X_{14}$-$X_{15}$-$X_{16}$-$X_{17}$-$C_{iii}$ (SEQ ID NO: 41) comprises an amino acid sequence selected from:
Ac-[B-Ala][Sar$_5$]-(SEQ ID NO: 169) (hereinafter referred to as BCY8122);
Ac-(SEQ ID NO: 169) (hereinafter referred to as BCY8126);
(SEQ ID NO: 169) (hereinafter referred to as BCY8116);
Fluorescein-(SEQ ID NO: 169) (hereinafter referred to as BCY8205); and
[B-Ala][Sar10]-(SEQ ID NO: 169) (hereinafter referred to as BCY8234).

In one embodiment, the peptide ligand of the invention is a peptide ligand which is other than the amino acid sequence:
[B-Ala][Sar10]-(SEQ ID NO: 1) (hereinafter referred to as BCY8234);
Ac-[B-Ala][Sar$_5$]-(SEQ ID NO: 1) (hereinafter referred to as BCY8122);
Ac-(SEQ ID NO: 1) (hereinafter referred to as BCY8126);
(SEQ ID NO: 1) (hereinafter referred to as BCY8116);
Fluorescein-(SEQ ID NO: 1) (hereinafter referred to as BCY8205); and
[PYA][B-Ala][Sar10]-(SEQ ID NO: 1) (hereinafter referred to as BCY8846).

In a yet further embodiment, the peptide ligand of $C_i$-$X_6$-$X_7$-$X_8$-$C_{ii}$-$X_9$-$X_{10}$-$X_{11}$-$X_{12}$-$X_{13}$-$X_{14}$-$X_{15}$-$X_{16}$-$X_{17}$-$C_{iii}$ (SEQ ID NO: 41) comprises an amino acid sequence selected from:
[B-Ala][Sar10]-(SEQ ID NO: 169) (hereinafter referred to as BCY8234).

In a yet further embodiment, the peptide ligand of $C_i$-$X_6$-$X_7$-Xa-$C_{ii}$-$X_9$-$X_{10}$-$X_{11}$-$X_{12}$-$X_{13}$-$X_{14}$-$X_{15}$-$X_{16}$-$X_{17}$-$C_{iii}$ (SEQ ID NO: 41) comprises an amino acid sequence selected from:
Ac-[B-Ala][Sar$_5$]-(SEQ ID NO: 77) (hereinafter referred to as BCY7559);

Ac-(SEQ ID NO: 101) (hereinafter referred to as BCY7618);
Ac-(SEQ ID NO: 115) (hereinafter referred to as BCY7765);
(SEQ ID NO: 115) (hereinafter referred to as BCY7793);
Ac-(SEQ ID NO: 155) (hereinafter referred to as BCY8030);
Ac-(SEQ ID NO: 160) (hereinafter referred to as BCY8038);
Ac-[B-Ala][Sar$_5$]-(SEQ ID NO: 167) (hereinafter referred to as BCY8120);
Ac-[B-Ala][Sar$_5$]-(SEQ ID NO: 168) (hereinafter referred to as BCY8121);
Ac-[B-Ala][Sar$_5$]-(SEQ ID NO: 169) (hereinafter referred to as BCY8122);
Ac-[B-Ala][Sar$_5$]-(SEQ ID NO: 170) (hereinafter referred to as BCY8123);
Ac-(SEQ ID NO: 167) (hereinafter referred to as BCY8124);
Ac-(SEQ ID NO: 168) (hereinafter referred to as BCY8125);
Ac-(SEQ ID NO: 169) (hereinafter referred to as BCY8126);
Ac-(SEQ ID NO: 170) (hereinafter referred to as BCY8127);
Ac-(SEQ ID NO: 171) (hereinafter referred to as BCY8128);
Ac-(SEQ ID NO: 172) (hereinafter referred to as BCY8129);
Ac-(SEQ ID NO: 177) (hereinafter referred to as BCY8161);
Ac-(SEQ ID NO: 178) (hereinafter referred to as BCY8162);
Ac-(SEQ ID NO: 179) (hereinafter referred to as BCY8163);
Ac-(SEQ ID NO: 187) (hereinafter referred to as BCY8182);
Ac-(SEQ ID NO: 188) (hereinafter referred to as BCY8183);
Ac-(SEQ ID NO: 189) (hereinafter referred to as BCY8184);
Ac-(SEQ ID NO: 196) (hereinafter referred to as BCY8192);
Ac-(SEQ ID NO: 197) (hereinafter referred to as BCY8193);
Ac-(SEQ ID NO: 198) (hereinafter referred to as BCY8194);
Ac-(SEQ ID NO: 199) (hereinafter referred to as BCY8211);
Ac-(SEQ ID NO: 200) (hereinafter referred to as BCY8212);
Ac-(SEQ ID NO: 201) (hereinafter referred to as BCY8213);
Ac-(SEQ ID NO: 202) (hereinafter referred to as BCY8214);
Ac-(SEQ ID NO: 203) (hereinafter referred to as BCY8215);
Ac-[B-Ala][Sar10]-(SEQ ID NO: 179) (hereinafter referred to as BCY8276);
Ac-[B-Ala][Sar10]-(SEQ ID NO: 178) (hereinafter referred to as BCY8277);
Ac-[B-Ala][Sar10]-(SEQ ID NO: 177) (hereinafter referred to as BCY8278);
Ac-[B-Ala][Sar10]-(SEQ ID NO: 208) (hereinafter referred to as BCY8279);
Ac-[B-Ala][Sar10]-(SEQ ID NO: 209) (hereinafter referred to as BCY8280); and
Ac-[B-Ala][Sar10]-(SEQ ID NO: 210) (hereinafter referred to as BCY8281).

Data is presented herein in Table 3 which demonstrates that the peptide ligands of this embodiment exhibited good levels (<100 nM) of binding to human Nectin-4 as evidenced by the SPR binding data.

In a yet further embodiment, the peptide ligand of $C_i$-$X_6$-$X_7$-$X_8$-$C_{ii}$-$X_9$-$X_{10}$-$X_{11}$-$X_{12}$-$X_{13}$-$X_{14}$-$X_{15}$-$X_{16}$-$X_{17}$-$C_{iii}$ (SEQ ID NO: 41) comprises an amino acid sequence selected from:
Ac-(SEQ ID NO: 155) (hereinafter referred to as BCY8030);
Ac-[B-Ala][Sar$_5$]-(SEQ ID NO: 167) (hereinafter referred to as BCY8120);
Ac-[B-Ala][Sar$_5$]-(SEQ ID NO: 168) (hereinafter referred to as BCY8121);
Ac-[B-Ala][Sar$_5$]-(SEQ ID NO: 169) (hereinafter referred to as BCY8122);
Ac-[B-Ala][Sar$_5$]-(SEQ ID NO: 170) (hereinafter referred to as BCY8123);
Ac-(SEQ ID NO: 167) (hereinafter referred to as BCY8124);
Ac-(SEQ ID NO: 168) (hereinafter referred to as BCY8125);
Ac-(SEQ ID NO: 169) (hereinafter referred to as BCY8126);
Ac-(SEQ ID NO: 170) (hereinafter referred to as BCY8127);
Ac-(SEQ ID NO: 171) (hereinafter referred to as BCY8128);
Ac-(SEQ ID NO: 172) (hereinafter referred to as BCY8129);
Ac-(SEQ ID NO: 177) (hereinafter referred to as BCY8161);
Ac-(SEQ ID NO: 178) (hereinafter referred to as BCY8162);
Ac-(SEQ ID NO: 179) (hereinafter referred to as BCY8163);
Ac-(SEQ ID NO: 187) (hereinafter referred to as BCY8182);
Ac-(SEQ ID NO: 188) (hereinafter referred to as BCY8183);
Ac-(SEQ ID NO: 189) (hereinafter referred to as BCY8184);
Ac-(SEQ ID NO: 196) (hereinafter referred to as BCY8192);
Ac-(SEQ ID NO: 197) (hereinafter referred to as BCY8193);
Ac-(SEQ ID NO: 198) (hereinafter referred to as BCY8194);
Ac-(SEQ ID NO: 199) (hereinafter referred to as BCY8211);
Ac-(SEQ ID NO: 200) (hereinafter referred to as BCY8212);
Ac-(SEQ ID NO: 201) (hereinafter referred to as BCY8213);
Ac-(SEQ ID NO: 202) (hereinafter referred to as BCY8214);
Ac-(SEQ ID NO: 203) (hereinafter referred to as BCY8215);
Ac-[B-Ala][Sar10]-(SEQ ID NO: 179) (hereinafter referred to as BCY8276);
Ac-[B-Ala][Sar10]-(SEQ ID NO: 178) (hereinafter referred to as BCY8277);
Ac-[B-Ala][Sar10]-(SEQ ID NO: 177) (hereinafter referred to as BCY8278);

Ac-[B-Ala][Sar10]-(SEQ ID NO: 208) (hereinafter referred to as BCY8279);
Ac-[B-Ala][Sar10]-(SEQ ID NO: 209) (hereinafter referred to as BCY8280); and
Ac-[B-Ala][Sar10]-(SEQ ID NO: 210) (hereinafter referred to as BCY8281).

Data is presented herein in Table 3 which demonstrates that the peptide ligands of this embodiment exhibited excellent levels (<10 nM) of binding to human Nectin-4 as evidenced by the SPR binding data.

In one embodiment, the peptide ligand comprises an amino acid sequence selected from:
- A-(SEQ ID NO: 1)-A (herein referred to as 80-09-02-N002 or BCY428);
- FI-A-(SQ ID NO: 1)-A (herein referred to as 80-09-02-N006);
- Ac-(SEQ ID NO: 1) (herein referred to as 80-09-02-N008 or BCY7390);
- Ac-[dD]-(SEQ ID NO: 1) (herein referred to as BCY7606);
- A-(SEQ ID NO: 2)-A (herein referred to as 80-09-02-N003 or BCY429);
- (1-Nal) A-(SEQ ID NO: 1)-A (herein referred to as 80-09-02-N009 or BCY7420);
- (2-Nal) A-(SEQ ID NO: 1)-A (herein referred to as 80-09-02-N010 or BCY7421);
- (33DPA) A-(SEQ ID NO: 1)-A (herein referred to as 80-09-02-NO11 or BCY7422);
- (44BPA) A-(SEQ ID NO: 1)-A (herein referred to as 80-09-02-NO12 or BCY7521);
- Ac-(SEQ ID NO: 3) (herein referred to as 80-09-02-N017);
- Ac-(SEQ ID NO: 4) (herein referred to as 80-09-02-NO18);
- Ac-(SQ ID NO: 5) (herein referred to as 80-09-02-NO19 or BCY7537);
- Ac-(SEQ ID NO: 6) (herein referred to as 80-09-02-N020);
- Ac-(SEQ ID NO: 7) (herein referred to as 80-09-02-N021 or BCY7539);
- Ac-(SEQ ID NO: 8) (herein referred to as 80-09-02-N022 or BCY7540);
- Ac-(SEQ ID NO: 9) (herein referred to as 80-09-02-N023);
- Ac-(pCoF)-(SEQ ID NO: 1) (herein referred to as 80-09-02-N044);
- Ac-(SEQ ID NO: 10) (herein referred to as 80-09-02-N045);
- Ac-(SEQ ID NO: 11) (herein referred to as 80-09-02-N046 or BCY7657);
- Ac-(SEQ ID NO: 12) (herein referred to as 80-09-02-N047 or BCY7658);
- Ac-(SEQ ID NO: 13) (herein referred to as 80-09-02-N048 or BCY7659);
- Ac-(SEQ ID NO: 14) (herein referred to as 80-09-02-N049);
- Ac-(SEQ ID NO: 15) (herein referred to as 80-09-02-N050 or BCY7661);
- SDN-(SEQ ID NO: 15)-A (herein referred to as BCY3387);
- Ac-(SEQ ID NO: 16) (herein referred to as 80-09-02-N051 or BCY7662);
- Ac-(SEQ ID NO: 17) (herein referred to as 80-09-02-N052);
- Ac-(SEQ ID NO: 18) (herein referred to as 80-09-02-NO53);
- Ac-(SEQ ID NO: 19) (herein referred to as 80-09-02-N054 or BCY7665);
- Ac-(SEQ ID NO: 20) (herein referred to as 80-09-02-N055 or BCY7666);
- Ac-(SEQ ID NO: 21) (herein referred to as 80-09-02-N056);
- A-(SEQ ID NO: 1)-TNK (herein referred to as 80-09-02-T01-N001 or BCY3385);
- A-(SEQ ID NO: 1)-TN (HArg) (herein referred to as 80-09-02-T01-N003 or BCY7281);
- A-(SEQ ID NO: 1)-TN (D-K) (herein referred to as 80-09-02-T01-N004 or BCY7282);
- A-(SEQ ID NO: 22)-TNK (herein referred to as 80-09-02-T01-N005);
- A-(SEQ ID NO: 23)-TNK (herein referred to as 80-09-02-T01-N006);
- Ac-(SEQ ID NO: 1)-TNK (herein referred to as 80-09-02-T01-N011 or BCY7391);
- A-(SEQ ID NO: 24)-TNK (herein referred to as 80-09-02-T01-N012 or BCY7342);
- A-(SEQ ID NO: 25)-TNK (herein referred to as 80-09-02-T01-NO14 or BCY7344);
- A-(SEQ ID NO: 1)-ANK (herein referred to as 80-09-02-T01-NO16 or BCY7346);
- A-(SEQ ID NO: 1)-[dA]NK (herein referred to as BCY7367);
- A-(SEQ ID NO: 1)-TAK (herein referred to as 80-09-02-T01-N017 or BCY7347);
- A-(SEQ ID NO: 1)-T[dA]K (herein referred to as BCY7368);
- A-(SEQ ID NO: 1)-TNA (herein referred to as 80-09-02-T01-N018 or BCY7348);
- A-(SEQ ID NO: 1)-TN[dA] (herein referred to as BCY7369);
- Ac-[pCoPhe]-(SEQ ID NO: 1) (herein referred to as BCY7656);
- A-(SEQ ID NO: 6)-TNK (herein referred to as 80-09-02-T01-N020 or BCY7354);
- A-(SEQ ID NO: 26)-TNK (herein referred to as 80-09-02-T01-N022 or BCY7352);
- A-(SEQ ID NO: 27)-TNK (herein referred to as 80-09-02-T01-N026 or BCY7356);
- A-(SEQ ID NO: 28)-TNK (herein referred to as 80-09-02-T01-N027 or BCY7357);
- A-(SEQ ID NO: 29)-TNK (herein referred to as 80-09-02-T01-N041 or BCY7372);
- A-(SEQ ID NO: 30)-TNK (herein referred to as 80-09-02-T01-N042 or BCY7424);
- A-(SEQ ID NO: 31)-A (herein referred to as 80-10-00 or BCY488);
- A-(SEQ ID NO: 32)-A (herein referred to as BCY432);
- DDW-(SEQ ID NO: 32)-A (herein referred to as 80-10-11-T01 or BCY433);
- VDW-(SEQ ID NO: 33)-A (herein referred to as 80-10-12-T01 or BCY462);
- QKW-(SEQ ID NO: 34)-A (herein referred to as 80-10-13-T01 or BCY3400);
- Q[HArg]W-(SEQ ID NO: 34)-A (herein referred to as BCY7278);
- Q[K(Ac)]W-(SEQ ID NO: 34)-A (herein referred to as BCY7280);
- [Ac]QKW-(SEQ ID NO: 34) (herein referred to as BCY7392);
- Q[dK]W-(SEQ ID NO: 34)-A (herein referred to as BCY7426);
- Ac-AKW-(SEQ ID NO: 34) (herein referred to as BCY7622);

Ac-QAW-(SEQ ID NO: 34) (herein referred to as BCY7623);
Ac-QKA-(SEQ ID NO: 34) (herein referred to as BCY7624);
Ac-[dA]KW-(SEQ ID NO: 34) (herein referred to as BCY7634);
Ac-Q[dA]W-(SEQ ID NO: 34) (herein referred to as BCY7635);
Ac-QK[dA]-(SEQ ID NO: 34) (herein referred to as BCY7636);
Ac-Q[dD]W-(SEQ ID NO: 34) (herein referred to as BCY7993);
Ac-QK[1Nal]-(SEQ ID NO: 34) (herein referred to as BCY7996);
Ac-QK[2Nal]-(SEQ ID NO: 34) (herein referred to as BCY7997);
Ac-(SEQ ID NO: 34) (herein referred to as BCY8044);
A-(SEQ ID NO: 43)-A (hereinafter referred to as BCY430);
A-(SEQ ID NO: 44)-A (hereinafter referred to as BCY431);
A-(SEQ ID NO: 58)-PQA (hereinafter referred to as BCY3401);
QKW-(SEQ ID NO: 65)-A (hereinafter referred to as BCY7279);
Ac-QKW-(SEQ ID NO: 103) (hereinafter referred to as BCY7625);
Ac-QKW-(SEQ ID NO: 104) (hereinafter referred to as BCY7627);
Ac-QKW-(SEQ ID NO: 105) (hereinafter referred to as BCY7628);
Ac-QKW-(SEQ ID NO: 106) (hereinafter referred to as BCY7631);
Ac-QKW-(SEQ ID NO: 107) (hereinafter referred to as BCY7632);
Ac-QKW-(SEQ ID NO: 108) (hereinafter referred to as BCY7639);
Ac-QKW-(SEQ ID NO: 109) (hereinafter referred to as BCY7640);
Ac-QKW-(SEQ ID NO: 110) (hereinafter referred to as BCY7643);
Ac-QKW-(SEQ ID NO: 153) (hereinafter referred to as BCY7998);
Ac-QKW-(SEQ ID NO: 154) (hereinafter referred to as BCY8000);
A-(SEQ ID NO: 35)-A (herein referred to as 80-11-00 or BCY471);
A-(SEQ ID NO: 36)-A (herein referred to as 80-11-01 or BCY472);
A-(SEQ ID NO: 37)-SRF (herein referred to as 80-11-08-T01 or BCY3406);
Ac-(SEQ ID NO: 37)-SRF (herein referred to as BCY7393);
DDA-(SEQ ID NO: 45)-A (hereinafter referred to as BCY3386);
DTA-(SEQ ID NO: 46)-A (hereinafter referred to as BCY3388);
DSE-(SEQ ID NO: 47)-A (hereinafter referred to as BCY3389);
HDA-(SEQ ID NO: 48)-A (hereinafter referred to as BCY3390);
MDT-(SEQ ID NO: 49)-A (hereinafter referred to as BCY3391);
DPG-(SEQ ID NO: 50)-A (hereinafter referred to as BCY3392);
HDS-(SEQ ID NO: 51)-A (hereinafter referred to as BCY3393);
(D-H)DS-(SEQ ID NO: 51)-A (hereinafter referred to as BCY7272);
A-(SEQ ID NO: 52)-TDK (hereinafter referred to as BCY3394);
A-(SEQ ID NO: 53)-LKD (hereinafter referred to as BCY3395);
A-(SEQ ID NO: 54)-TTA (hereinafter referred to as BCY3396);
A-(SEQ ID NO: 55)-QME (hereinafter referred to as BCY3397);
A-(SEQ ID NO: 56)-LSE (hereinafter referred to as BCY3398);
A-(SEQ ID NO: 57)-STD (hereinafter referred to as BCY3399);
A-(SEQ ID NO: 59)-TNK (hereinafter referred to as BCY7265);
Ac-(SEQ ID NO: 59) (hereinafter referred to as BCY7660);
A-(SEQ ID NO: 60)-TNK (hereinafter referred to as BCY7266);
Ac-(SEQ ID NO: 60) (hereinafter referred to as BCY7616);
HDS-(SEQ ID NO: 61)-A (hereinafter referred to as BCY7273);
HDS-(SEQ ID NO: 62)-A (hereinafter referred to as BCY7274);
HDS-(SEQ ID NO: 63)-A (hereinafter referred to as BCY7275);
HDS-(SEQ ID NO: 64)-A (hereinafter referred to as BCY7276);
A-(SEQ ID NO: 66)-TNK (hereinafter referred to as BCY7349);
A-(SEQ ID NO: 67)-TNK (hereinafter referred to as BCY7350);
Ac-(SEQ ID NO: 67) (hereinafter referred to as BCY7538);
A-(SEQ ID NO: 68)-TNK (hereinafter referred to as BCY7359);
A-(SEQ ID NO: 69)-TNK (hereinafter referred to as BCY7360);
A-(SEQ ID NO: 70)-TNK (hereinafter referred to as BCY7361);
A-(SEQ ID NO: 71)-TNK (hereinafter referred to as BCY7365);
A-(SEQ ID NO: 72)-TNK (hereinafter referred to as BCY7370);
Ac-(SEQ ID NO: 73) (hereinafter referred to as BCY7535);
Ac-(SEQ ID NO: 74) (hereinafter referred to as BCY7536);
Ac-(SEQ ID NO: 75) (hereinafter referred to as BCY7541);
[B-Ala][Sar$_5$]-(SEQ ID NO: 76) (hereinafter referred to as BCY7556);
Ac-[B-Ala][Sar$_5$]-(SEQ ID NO: 76) (hereinafter referred to as BCY7558);
[B-Ala][Sar$_5$]-(SEQ ID NO: 77) (hereinafter referred to as BCY7557);
Ac-[B-Ala][Sar$_5$]-(SEQ ID NO: 77) (hereinafter referred to as BCY7559);
Ac-(SEQ ID NO: 78) (hereinafter referred to as BCY7580);
Ac-(SEQ ID NO: 79) (hereinafter referred to as BCY7581);
Ac-(SEQ ID NO: 80) (hereinafter referred to as BCY7582);

Ac-(SEQ ID NO: 81) (hereinafter referred to as BCY7584);
Ac-(SEQ ID NO: 82) (hereinafter referred to as BCY7585);
Ac-(SEQ ID NO: 83) (hereinafter referred to as BCY7588);
Ac-(SEQ ID NO: 84) (hereinafter referred to as BCY7589);
Ac-(SEQ ID NO: 85) (hereinafter referred to as BCY7590);
Ac-(SEQ ID NO: 86) (hereinafter referred to as BCY7591);
Ac-(SEQ ID NO: 87) (hereinafter referred to as BCY7592);
Ac-(SEQ ID NO: 88) (hereinafter referred to as BCY7593);
Ac-(SEQ ID NO: 89) (hereinafter referred to as BCY7594);
Ac-(SEQ ID NO: 90) (hereinafter referred to as BCY7595);
Ac-(SEQ ID NO: 91) (hereinafter referred to as BCY7596);
Ac-(SEQ ID NO: 92) (hereinafter referred to as BCY7597);
Ac-(SEQ ID NO: 93) (hereinafter referred to as BCY7598);
Ac-(SEQ ID NO: 94) (hereinafter referred to as BCY7607);
Ac-(SEQ ID NO: 95) (hereinafter referred to as BCY7608);
Ac-(SEQ ID NO: 96) (hereinafter referred to as BCY7611);
Ac-(SEQ ID NO: 97) (hereinafter referred to as BCY7612);
Ac-(SEQ ID NO: 98) (hereinafter referred to as BCY7613);
Ac-(SEQ ID NO: 99) (hereinafter referred to as BCY7614);
Ac-(SEQ ID NO: 100) (hereinafter referred to as BCY7615);
Ac-(SEQ ID NO: 101) (hereinafter referred to as BCY7618);
Ac-(SEQ ID NO: 102) (hereinafter referred to as BCY7620);
Ac-(SEQ ID NO: 111) (hereinafter referred to as BCY7663);
Ac-(SEQ ID NO: 112) (hereinafter referred to as BCY7664);
Ac-(SEQ ID NO: 113) (hereinafter referred to as BCY7667);
Ac-(SEQ ID NO: 114) (hereinafter referred to as BCY7668);
Ac-(SEQ ID NO: 115) (hereinafter referred to as BCY7765);
(SEQ ID NO: 115) (hereinafter referred to as BCY7793);
(MeO-dPEG12) (SEQ ID NO: 115) (hereinafter referred to as BCY8087);
(Carboxyfluorescein) (SEQ ID NO: 115) (hereinafter referred to as BCY8208);
(PEG$_3$) (PEG$_3$) (SEQ ID NO: 115) (hereinafter referred to as BCY7815);
(MeO-dPEG12) (PEG3) (PEG3) (SEQ ID NO: 115) (hereinafter referred to as BCY8094);
Ac-DDD-(SEQ ID NO: 115) (hereinafter referred to as BCY8028);
Ac-[dA][dA][dD]-(SEQ ID NO: 115) (hereinafter referred to as BCY8029);
[B-Ala][Sar10]-(SEQ ID NO: 115) (hereinafter referred to as BCY7814);
Ac-(SEQ ID NO: 116) (hereinafter referred to as BCY7816);
Ac-(SEQ ID NO: 116) (MeO-dPEG12) linked to D-Lys6 (hereinafter referred to as BCY8084);
Ac-(SEQ ID NO: 117) (hereinafter referred to as BCY7817);
Ac-(SEQ ID NO: 118) (hereinafter referred to as BCY7818;
Ac-(SEQ ID NO: 118) (MeO-dPEG12) linked to Pro (4NH) 1 (hereinafter referred to as BCY8086);
Ac-(SEQ ID NO: 119) (hereinafter referred to as BCY7819;
Ac-(SEQ ID NO: 119) (MeO-dPEG12) linked to Lys5 (hereinafter referred to as BCY8088);
Ac-(SEQ ID NO: 120) (hereinafter referred to as BCY7820;
Ac-(SEQ ID NO: 120) (MeO-dPEG12) linked to D-Lys3 (hereinafter referred to as BCY8089);
Ac-(SEQ ID NO: 121) (hereinafter referred to as BCY7821);
Ac-(SEQ ID NO: 121) (MeO-dPEG12) linked to Lys4 (hereinafter referred to as BCY8090);
Ac-(SEQ ID NO: 122) (hereinafter referred to as BCY7822);
Ac-(SEQ ID NO: 122) (MeO-dPEG12) linked to Lys6 (hereinafter referred to as BCY8091);
Ac-(SEQ ID NO: 123) (hereinafter referred to as BCY7876);
Ac-(SEQ ID NO: 124) (hereinafter referred to as BCY7877);
Ac-(SEQ ID NO: 125) (hereinafter referred to as BCY7879);
Ac-(SEQ ID NO: 126) (hereinafter referred to as BCY7881);
Ac-(SEQ ID NO: 127) (hereinafter referred to as BCY7883);
Ac-(SEQ ID NO: 128) (hereinafter referred to as BCY7884);
Ac-(SEQ ID NO: 129) (hereinafter referred to as BCY7886);
Ac-(SEQ ID NO: 130) (hereinafter referred to as BCY7887);
Ac-(SEQ ID NO: 131) (hereinafter referred to as BCY7889);
Ac-(SEQ ID NO: 132) (hereinafter referred to as BCY7890);
Ac-(SEQ ID NO: 133) (hereinafter referred to as BCY7891);
Ac-(SEQ ID NO: 134) (hereinafter referred to as BCY7892);
Ac-(SEQ ID NO: 135) (hereinafter referred to as BCY7894);
Ac-(SEQ ID NO: 136) (hereinafter referred to as BCY7895);
Ac-(SEQ ID NO: 137) (hereinafter referred to as BCY7896);
Ac-(SEQ ID NO: 138) (hereinafter referred to as BCY7897);
Ac-(SEQ ID NO: 139) (hereinafter referred to as BCY7902);
Ac-(SEQ ID NO: 140) (hereinafter referred to as BCY7903);
Ac-(SEQ ID NO: 141) (hereinafter referred to as BCY7904);

Ac-(SEQ ID NO: 142) (hereinafter referred to as BCY7906);
Ac-(SEQ ID NO: 143) (hereinafter referred to as BCY7907);
Ac-(SEQ ID NO: 144) (hereinafter referred to as BCY7908);
Ac-(SEQ ID NO: 145) (hereinafter referred to as BCY7911);
Ac-(SEQ ID NO: 146) (hereinafter referred to as BCY7912);
Ac-(SEQ ID NO: 147) (hereinafter referred to as BCY7913);
Ac-(SEQ ID NO: 148) (hereinafter referred to as BCY7914);
Ac-(SEQ ID NO: 149) (hereinafter referred to as BCY7915);
Ac-(SEQ ID NO: 150) (hereinafter referred to as BCY7916);
Ac-(SEQ ID NO: 151) (hereinafter referred to as BCY7973);
Ac-(SEQ ID NO: 152) (hereinafter referred to as BCY7979);
Ac-(SEQ ID NO: 155) (hereinafter referred to as BCY8030);
Ac-(SEQ ID NO: 156) (hereinafter referred to as BCY8031);
Ac-(SEQ ID NO: 157) (hereinafter referred to as BCY8032);
Ac-(SEQ ID NO: 158) (hereinafter referred to as BCY8036);
Ac-(SEQ ID NO: 159) (hereinafter referred to as BCY8037);
Ac-(SEQ ID NO: 160) (hereinafter referred to as BCY8038);
Ac-(SEQ ID NO: 161) (hereinafter referred to as BCY8039);
Ac-(SEQ ID NO: 162) (hereinafter referred to as BCY8040);
Ac-(SEQ ID NO: 163) (hereinafter referred to as BCY8041);
Ac-(SEQ ID NO: 164) (hereinafter referred to as BCY8042);
Ac-(SEQ ID NO: 165) (hereinafter referred to as BCY8042);
Ac-(SEQ ID NO: 166) (hereinafter referred to as BCY8085);
Ac-[B-Ala][Sar$_5$]-(SEQ ID NO: 167) (hereinafter referred to as BCY8120);
Ac-(SEQ ID NO: 167) (hereinafter referred to as BCY8124);
Ac-[B-Ala][Sar$_5$]-(SEQ ID NO: 168) (hereinafter referred to as BCY8121);
Ac-(SEQ ID NO: 168) (hereinafter referred to as BCY8125);
Ac-[B-Ala][Sar$_5$]-(SEQ ID NO: 169) (hereinafter referred to as BCY8122);
Ac-(SEQ ID NO: 169) (hereinafter referred to as BCY8126);
(SEQ ID NO: 169) (hereinafter referred to as BCY8116);
Fluorescein-(SEQ ID NO: 169) (hereinafter referred to as BCY8205);
[B-Ala][Sar10]-(SEQ ID NO: 169) (hereinafter referred to as BCY8234);
[PYA][B-Ala][Sar10]-(SEQ ID NO: 169) (hereinafter referred to as BCY8846);
Ac-[B-Ala][Sar$_5$]-(SEQ ID NO: 170) (hereinafter referred to as BCY8123);
Ac-(SEQ ID NO: 170) (hereinafter referred to as BCY8127);
(SEQ ID NO: 170) (hereinafter referred to as BCY8206);
Ac-(SEQ ID NO: 171) (hereinafter referred to as BCY8128);
(SEQ ID NO: 171) (hereinafter referred to as BCY8207);
[B-Ala][Sar10]-(SEQ ID NO: 171) (hereinafter referred to as BCY8232);
Ac-(SEQ ID NO: 172) (hereinafter referred to as BCY8129);
Ac-(SEQ ID NO: 173) (hereinafter referred to as BCY8153);
Ac-(SEQ ID NO: 174) (hereinafter referred to as BCY8154);
Ac-(SEQ ID NO: 175) (hereinafter referred to as BCY8157);
Ac-(SEQ ID NO: 176) (hereinafter referred to as BCY8158);
Ac-(SEQ ID NO: 177) (hereinafter referred to as BCY8161);
Ac-[B-Ala][Sar10]-(SEQ ID NO: 177) (hereinafter referred to as BCY8278);
Ac-(SEQ ID NO: 178) (hereinafter referred to as BCY8162);
Ac-[B-Ala][Sar10]-(SEQ ID NO: 178) (hereinafter referred to as BCY8277);
Ac-(SEQ ID NO: 179) (hereinafter referred to as BCY8163);
Ac-[B-Ala][Sar10]-(SEQ ID NO: 179) (hereinafter referred to as BCY8276);
[B-Ala][Sar10]-(SEQ ID NO: 179) (hereinafter referred to as BCY8269);
Ac-(SEQ ID NO: 180) (hereinafter referred to as BCY8174);
Ac-(SEQ ID NO: 181) (hereinafter referred to as BCY8175);
Ac-(SEQ ID NO: 182) (hereinafter referred to as BCY8176);
Ac-(SEQ ID NO: 183) (hereinafter referred to as BCY8177);
Ac-(SEQ ID NO: 184) (hereinafter referred to as BCY8178);
Ac-(SEQ ID NO: 185) (hereinafter referred to as BCY8180);
Ac-(SEQ ID NO: 186) (hereinafter referred to as BCY8181);
Ac-(SEQ ID NO: 187) (hereinafter referred to as BCY8182);
Ac-(SEQ ID NO: 188) (hereinafter referred to as BCY8183);
Ac-(SEQ ID NO: 189) (hereinafter referred to as BCY8184);
[B-Ala][Sar10]-(SEQ ID NO: 189) (hereinafter referred to as BCY8235);
Ac-(SEQ ID NO: 190) (hereinafter referred to as BCY8185);
Ac-(SEQ ID NO: 191) (hereinafter referred to as BCY8186);
Ac-(SEQ ID NO: 192) (hereinafter referred to as BCY8187);
Ac-(SEQ ID NO: 193) (hereinafter referred to as BCY8188);
Ac-(SEQ ID NO: 194) (hereinafter referred to as BCY8189);
Ac-(SEQ ID NO: 195) (hereinafter referred to as BCY8191);

Ac-(SEQ ID NO: 196) (hereinafter referred to as BCY8192);
Ac-(SEQ ID NO: 197) (hereinafter referred to as BCY8193);
Ac-(SEQ ID NO: 198) (hereinafter referred to as BCY8194);
Ac-(SEQ ID NO: 199) (hereinafter referred to as BCY8211);
Ac-(SEQ ID NO: 200) (hereinafter referred to as BCY8212);
Ac-(SEQ ID NO: 201) (hereinafter referred to as BCY8213);
Ac-(SEQ ID NO: 202) (hereinafter referred to as BCY8214);
[B-Ala][Sar10]-(SEQ ID NO: 202) (hereinafter referred to as BCY8231);
Ac-(SEQ ID NO: 203) (hereinafter referred to as BCY8215);
Ac-[B-Ala][Sar10]-(SEQ ID NO: 208) (hereinafter referred to as BCY8279);
Ac-[B-Ala][Sar10]-(SEQ ID NO: 209) (hereinafter referred to as BCY8280);
[B-Ala][Sar10]-(SEQ ID NO: 209) (hereinafter referred to as BCY8273);
Ac-[B-Ala][Sar10]-(SEQ ID NO: 210) (hereinafter referred to as BCY8281);
Ac-(SEQ ID NO: 211) (hereinafter referred to as BCY8831);
[B-Ala][Sar10]-(SEQ ID NO: 212) (hereinafter referred to as BCY8238);
(SEQ ID NO: 215) (hereinafter referred to as BCY11415);
[PYA][B-Ala][Sar10]-(SEQ ID NO: 215) (hereinafter referred to as BCY11942); and
(SEQ ID NO: 216) (hereinafter referred to as BCY11414).

In a further embodiment, the peptide ligand comprises an amino acid sequence selected from:
A-(SEQ ID NO: 1)-TNK (herein referred to as 80-09-02-T01-N001 or BCY3385);
Ac-(SEQ ID NO: 1) (herein referred to as 80-09-02-N008 or BCY7390);
Ac-(SEQ ID NO: 1)-TNK (herein referred to as 80-09-02-T01-N011 or BCY7391);
[Ac] QKW-(SEQ ID NO: 34) (herein referred to as BCY7392);
Ac-[B-Ala][Sar$_5$]-(SEQ ID NO: 77) (hereinafter referred to as BCY7559);
Ac-(SEQ ID NO: 101) (hereinafter referred to as BCY7618);
Ac-(SEQ ID NO: 115) (hereinafter referred to as BCY7765);
(SEQ ID NO: 115) (hereinafter referred to as BCY7793);
Ac-(SEQ ID NO: 155) (hereinafter referred to as BCY8030);
Ac-(SEQ ID NO: 160) (hereinafter referred to as BCY8038);
Ac-[B-Ala][Sar$_5$]-(SEQ ID NO: 167) (hereinafter referred to as BCY8120);
Ac-[B-Ala][Sar$_5$]-(SEQ ID NO: 168) (hereinafter referred to as BCY8121);
Ac-[B-Ala][Sar$_5$]-(SEQ ID NO: 169) (hereinafter referred to as BCY8122);
Ac-[B-Ala][Sar$_5$]-(SEQ ID NO: 170) (hereinafter referred to as BCY8123);
Ac-(SEQ ID NO: 167) (hereinafter referred to as BCY8124);
Ac-(SEQ ID NO: 168) (hereinafter referred to as BCY8125);
Ac-(SEQ ID NO: 169) (hereinafter referred to as BCY8126);
Ac-(SEQ ID NO: 170) (hereinafter referred to as BCY8127);
Ac-(SEQ ID NO: 171) (hereinafter referred to as BCY8128);
Ac-(SEQ ID NO: 172) (hereinafter referred to as BCY8129);
Ac-(SEQ ID NO: 177) (hereinafter referred to as BCY8161);
Ac-(SEQ ID NO: 178) (hereinafter referred to as BCY8162);
Ac-(SEQ ID NO: 179) (hereinafter referred to as BCY8163);
Ac-(SEQ ID NO: 187) (hereinafter referred to as BCY8182);
Ac-(SEQ ID NO: 188) (hereinafter referred to as BCY8183);
Ac-(SEQ ID NO: 189) (hereinafter referred to as BCY8184);
Ac-(SEQ ID NO: 196) (hereinafter referred to as BCY8192);
Ac-(SEQ ID NO: 197) (hereinafter referred to as BCY8193);
Ac-(SEQ ID NO: 198) (hereinafter referred to as BCY8194);
Ac-(SEQ ID NO: 199) (hereinafter referred to as BCY8211);
Ac-(SEQ ID NO: 200) (hereinafter referred to as BCY8212);
Ac-(SEQ ID NO: 201) (hereinafter referred to as BCY8213);
Ac-(SEQ ID NO: 202) (hereinafter referred to as BCY8214);
Ac-(SEQ ID NO: 203) (hereinafter referred to as BCY8215);
Ac-[B-Ala][Sar10]-(SEQ ID NO: 179) (hereinafter referred to as BCY8276);
Ac-[B-Ala][Sar10]-(SEQ ID NO: 178) (hereinafter referred to as BCY8277);
Ac-[B-Ala][Sar10]-(SEQ ID NO: 177) (hereinafter referred to as BCY8278);
Ac-[B-Ala][Sar10]-(SEQ ID NO: 208) (hereinafter referred to as BCY8279);
Ac-[B-Ala][Sar10]-(SEQ ID NO: 209) (hereinafter referred to as BCY8280); and
Ac-[B-Ala][Sar10]-(SEQ ID NO: 210) (hereinafter referred to as BCY8281).

Data is presented herein in Table 3 which demonstrates that the peptide ligands of this embodiment exhibited good levels (<100 nM) of binding to human Nectin-4 as evidenced by the SPR binding data.

In a yet further embodiment, the peptide ligand comprises an amino acid sequence selected from:
Ac-(SEQ ID NO: 155) (hereinafter referred to as BCY8030);
Ac-[B-Ala][Sar$_5$]-(SEQ ID NO: 167) (hereinafter referred to as BCY8120);
Ac-[B-Ala][Sar$_5$]-(SEQ ID NO: 168) (hereinafter referred to as BCY8121);
Ac-[B-Ala][Sar$_5$]-(SEQ ID NO: 169) (hereinafter referred to as BCY8122);
Ac-[B-Ala][Sar$_5$]-(SEQ ID NO: 170) (hereinafter referred to as BCY8123);
Ac-(SEQ ID NO: 167) (hereinafter referred to as BCY8124);

Ac-(SEQ ID NO: 168) (hereinafter referred to as BCY8125);
Ac-(SEQ ID NO: 169) (hereinafter referred to as BCY8126);
Ac-(SEQ ID NO: 170) (hereinafter referred to as BCY8127);
Ac-(SEQ ID NO: 171) (hereinafter referred to as BCY8128);
Ac-(SEQ ID NO: 172) (hereinafter referred to as BCY8129);
Ac-(SEQ ID NO: 177) (hereinafter referred to as BCY8161);
Ac-(SEQ ID NO: 178) (hereinafter referred to as BCY8162);
Ac-(SEQ ID NO: 179) (hereinafter referred to as BCY8163);
Ac-(SEQ ID NO: 187) (hereinafter referred to as BCY8182);
Ac-(SEQ ID NO: 188) (hereinafter referred to as BCY8183);
Ac-(SEQ ID NO: 189) (hereinafter referred to as BCY8184);
Ac-(SEQ ID NO: 196) (hereinafter referred to as BCY8192);
Ac-(SEQ ID NO: 197) (hereinafter referred to as BCY8193);
Ac-(SEQ ID NO: 198) (hereinafter referred to as BCY8194);
Ac-(SEQ ID NO: 199) (hereinafter referred to as BCY8211);
Ac-(SEQ ID NO: 200) (hereinafter referred to as BCY8212);
Ac-(SEQ ID NO: 201) (hereinafter referred to as BCY8213);
Ac-(SEQ ID NO: 202) (hereinafter referred to as BCY8214);
Ac-(SEQ ID NO: 203) (hereinafter referred to as BCY8215);
Ac-[B-Ala][Sar10]-(SEQ ID NO: 179) (hereinafter referred to as BCY8276);
Ac-[B-Ala][Sar10]-(SEQ ID NO: 178) (hereinafter referred to as BCY8277);
Ac-[B-Ala][Sar10]-(SEQ ID NO: 177) (hereinafter referred to as BCY8278);
Ac-[B-Ala][Sar10]-(SEQ ID NO: 208) (hereinafter referred to as BCY8279);
Ac-[B-Ala][Sar10]-(SEQ ID NO: 209) (hereinafter referred to as BCY8280); and
Ac-[B-Ala][Sar10]-(SEQ ID NO: 210) (hereinafter referred to as BCY8281).

Data is presented herein in Table 3 which demonstrates that the peptide ligands of this embodiment exhibited excellent levels (<10 nM) of binding to human Nectin-4 as evidenced by the SPR binding data.

In an alternative embodiment, the peptide ligand comprises an amino acid sequence selected from:
[B-Ala][Sar$_5$]-(SEQ ID NO: 76) (hereinafter referred to as BCY7556);
[B-Ala][Sar10]-(SEQ ID NO: 115) (hereinafter referred to as BCY7814);
[B-Ala][Sar10]-(SEQ ID NO: 169) (hereinafter referred to as BCY8234);
[B-Ala][Sar10]-(SEQ ID NO: 202) (hereinafter referred to as BCY8231);
[B-Ala][Sar10]-(SEQ ID NO: 171) (hereinafter referred to as BCY8232);
[B-Ala][Sar10]-(SEQ ID NO: 189) (hereinafter referred to as BCY8235);
Ac-(SEQ ID NO: 211) (hereinafter referred to as BCY8831);
[B-Ala][Sar10]-(SEQ ID NO: 179) (hereinafter referred to as BCY8269); and
[B-Ala][Sar10]-(SEQ ID NO: 209) (hereinafter referred to as BCY8273).

Data is presented herein in Table 4 which demonstrates that the peptide ligands of this embodiment when conjugated to a cytotoxic agent exhibited good levels (<100 nM) of binding to human Nectin-4 as evidenced by the SPR binding data.

In a further embodiment, the peptide ligand comprises an amino acid sequence selected from:
[B-Ala][Sar10]-(SEQ ID NO: 169) (hereinafter referred to as BCY8234);
[B-Ala][Sar10]-(SEQ ID NO: 202) (hereinafter referred to as BCY8231);
[B-Ala][Sar10]-(SEQ ID NO: 171) (hereinafter referred to as BCY8232);
[B-Ala][Sar10]-(SEQ ID NO: 189) (hereinafter referred to as BCY8235);
Ac-(SEQ ID NO: 211) (hereinafter referred to as BCY8831);
[B-Ala][Sar10]-(SEQ ID NO: 179) (hereinafter referred to as BCY8269); and
[B-Ala][Sar10]-(SEQ ID NO: 209) (hereinafter referred to as BCY8273).

Data is presented herein in Table 4 which demonstrates that the peptide ligands of this embodiment when conjugated to a cytotoxic agent exhibited excellent levels (<10 nM) of binding to human Nectin-4 as evidenced by the SPR binding data.

Unless defined otherwise, all technical and scientific terms used herein have the same meaning as commonly understood by those of ordinary skill in the art, such as in the arts of peptide chemistry, cell culture and phage display, nucleic acid chemistry and biochemistry. Standard techniques are used for molecular biology, genetic and biochemical methods (see Sambrook et al., Molecular Cloning: A Laboratory Manual, 3rd ed., 2001, Cold Spring Harbor Laboratory Press, Cold Spring Harbor, NY; Ausubel et al., Short Protocols in Molecular Biology (1999) 4$^{th}$ ed., John Wiley & Sons, Inc.), which are incorporated herein by reference.

Nomenclature

Numbering

When referring to amino acid residue positions within the peptides of the invention, cysteine residues ($C_i$, $C_{ii}$ and $C_{iii}$) are omitted from the numbering as they are invariant, therefore, the numbering of amino acid residues within the peptides of the invention is referred to as below:

(SEQ ID NO: 1)
$C_i$-P$_1$-F$_2$-G$_3$-C$_{ii}$-M$_4$-K$_5$-N$_6$-W$_7$-S$_8$-W$_9$-P$_{10}$-I$_{11}$-W12-C$_{iii}$.

For the purpose of this description, all bicyclic peptides are assumed to be cyclised with 1,1',1''-(1,3,5-triazinane-1,3,5-triyl)triprop-2-an-1-one (TATA) and yielding a tri-substituted structure. Cyclisation with TATA occurs on $C_i$, $C_{ii}$, and $C_{iii}$.

Molecular Format

N- or C-terminal extensions to the bicycle core sequence are added to the left or right side of the sequence, separated by a hyphen. For example, an N-terminal βAla-Sar10-Ala tail would be denoted as:

βAla-Sar10-A-. (SEQ ID NO: X)

Inversed Peptide Sequences

In light of the disclosure in Nair et al (2003) J Immunol 170 (3), 1362-1373, it is envisaged that the peptide sequences disclosed herein would also find utility in their retro-inverso form. For example, the sequence is reversed (i.e. N-terminus becomes C-terminus and vice versa) and their stereochemistry is likewise also reversed (i.e. D-amino acids become L-amino acids and vice versa).

Peptide Ligands

A peptide ligand, as referred to herein, refers to a peptide covalently bound to a molecular scaffold. Typically, such peptides comprise two or more reactive groups (i.e. cysteine residues) which are capable of forming covalent bonds to the scaffold, and a sequence subtended between said reactive groups which is referred to as the loop sequence, since it forms a loop when the peptide is bound to the scaffold. In the present case, the peptides comprise at least three cysteine residues (referred to herein as $C_i$, $C_{ii}$ and $C_{iii}$), and form at least two loops on the scaffold.

Advantages of the Peptide Ligands

Certain bicyclic peptides of the present invention have a number of advantageous properties which enable them to be considered as suitable drug-like molecules for injection, inhalation, nasal, ocular, oral or topical administration. Such advantageous properties include:

Species cross-reactivity. This is a typical requirement for preclinical pharmacodynamics and pharmacokinetic evaluation;

Protease stability. Bicyclic peptide ligands should ideally demonstrate stability to plasma proteases, epithelial ("membrane-anchored") proteases, gastric and intestinal proteases, lung surface proteases, intracellular proteases and the like. Protease stability should be maintained between different species such that a bicycle lead candidate can be developed in animal models as well as administered with confidence to humans;

Desirable solubility profile. This is a function of the proportion of charged and hydrophilic versus hydrophobic residues and intra/inter-molecular H-bonding, which is important for formulation and absorption purposes;

An optimal plasma half-life in the circulation. Depending upon the clinical indication and treatment regimen, it may be required to develop a bicyclic peptide for short exposure in an acute illness management setting, or develop a bicyclic peptide with enhanced retention in the circulation, and is therefore optimal for the management of more chronic disease states. Other factors driving the desirable plasma half-life are requirements of sustained exposure for maximal therapeutic efficiency versus the accompanying toxicology due to sustained exposure of the agent; and Selectivity. Certain peptide ligands of the invention demonstrate good selectivity over other nectins.

Pharmaceutically Acceptable Salts

It will be appreciated that salt forms are within the scope of this invention, and references to peptide ligands include the salt forms of said ligands.

The salts of the present invention can be synthesized from the parent compound that contains a basic or acidic moiety by conventional chemical methods such as methods described in *Pharmaceutical Salts: Properties, Selection, and Use*, P. Heinrich Stahl (Editor), Camille G. Wermuth (Editor), ISBN: 3-90639-026-8, Hardcover, 388 pages, August 2002. Generally, such salts can be prepared by reacting the free acid or base forms of these compounds with the appropriate base or acid in water or in an organic solvent, or in a mixture of the two.

Acid addition salts (mono- or di-salts) may be formed with a wide variety of acids, both inorganic and organic. Examples of acid addition salts include mono- or di-salts formed with an acid selected from the group consisting of acetic, 2,2-dichloroacetic, adipic, alginic, ascorbic (e.g. L-ascorbic), L-aspartic, benzenesulfonic, benzoic, 4-acetamidobenzoic, butanoic, (+) camphoric, camphor-sulfonic, (+)-(1S)-camphor-10-sulfonic, capric, caproic, caprylic, cinnamic, citric, cyclamic, dodecylsulfuric, ethane-1,2-disulfonic, ethanesulfonic, 2-hydroxyethanesulfonic, formic, fumaric, galactaric, gentisic, glucoheptonic, D-gluconic, glucuronic (e.g. D-glucuronic), glutamic (e.g. L-glutamic), a-oxoglutaric, glycolic, hippuric, hydrohalic acids (e.g. hydrobromic, hydrochloric, hydriodic), isethionic, lactic (e.g. (+)-L-lactic, (+)-DL-lactic), lactobionic, maleic, malic, (−)-L-malic, malonic, (+)-DL-mandelic, methanesulfonic, naphthalene-2-sulfonic, naphthalene-1,5-disulfonic, 1-hydroxy-2-naphthoic, nicotinic, nitric, oleic, orotic, oxalic, palmitic, pamoic, phosphoric, propionic, pyruvic, L-pyroglutamic, salicylic, 4-amino-salicylic, sebacic, stearic, succinic, sulfuric, tannic, (+)-L-tartaric, thiocyanic, p-toluenesulfonic, undecylenic and valeric acids, as well as acylated amino acids and cation exchange resins.

One particular group of salts consists of salts formed from acetic, hydrochloric, hydriodic, phosphoric, nitric, sulfuric, citric, lactic, succinic, maleic, malic, isethionic, fumaric, benzenesulfonic, toluenesulfonic, sulfuric, methanesulfonic (mesylate), ethanesulfonic, naphthalenesulfonic, valeric, propanoic, butanoic, malonic, glucuronic and lactobionic acids. One particular salt is the hydrochloride salt. Another particular salt is the acetate salt.

If the compound is anionic, or has a functional group which may be anionic (e.g., —COOH may be —COO⁻), then a salt may be formed with an organic or inorganic base, generating a suitable cation. Examples of suitable inorganic cations include, but are not limited to, alkali metal ions such as $Li^+$, $Na^+$ and $K^+$, alkaline earth metal cations such as $Ca^{2+}$ and $Mg^{2+}$, and other cations such as $Al^{3+}$ or $Zn^+$. Examples of suitable organic cations include, but are not limited to, ammonium ion (i.e., $NH_4^+$) and substituted ammonium ions (e.g., $NH_3R^+$, $NH_2R_2^+$, $NHR_3^+$, $NR_4^-$). Examples of some suitable substituted ammonium ions are those derived from: methylamine, ethylamine, diethylamine, propylamine, dicyclohexylamine, triethylamine, butylamine, ethylenediamine, ethanolamine, diethanolamine, piperazine, benzylamine, phenylbenzylamine, choline, meglumine, and tromethamine, as well as amino acids, such as lysine and arginine. An example of a common quaternary ammonium ion is $N(CH_3)_4^+$.

Where the peptides of the invention contain an amine function, these may form quaternary ammonium salts, for example by reaction with an alkylating agent according to methods well known to the skilled person. Such quaternary ammonium compounds are within the scope of the invention.

Modified Derivatives

It will be appreciated that modified derivatives of the peptide ligands as defined herein are within the scope of the present invention. Examples of such suitable modified derivatives include one or more modifications selected from: N-terminal and/or C-terminal modifications; replacement of one or more amino acid residues with one or more non-natural amino acid residues (such as replacement of one or more polar amino acid residues with one or more isosteric or isoelectronic amino acids; replacement of one or more non-polar amino acid residues with other non-natural isosteric or isoelectronic amino acids); addition of a spacer group; replacement of one or more oxidation sensitive amino acid residues with one or more oxidation resistant amino acid residues; replacement of one or more amino acid residues with an alanine, replacement of one or more L-amino acid residues with one or more D-amino acid residues; N-alkylation of one or more amide bonds within the bicyclic peptide ligand; replacement of one or more peptide bonds with a surrogate bond; peptide backbone length modification; substitution of the hydrogen on the alpha-carbon of one or more amino acid residues with another chemical group, modification of amino acids such as cysteine, lysine, glutamate/aspartate and tyrosine with suitable amine, thiol, carboxylic acid and phenol-reactive reagents so as to functionalise said amino acids, and introduction or replacement of amino acids that introduce orthogonal reactivities that are suitable for functionalisation, for example azide or alkyne-group bearing amino acids that allow functionalisation with alkyne or azide-bearing moieties, respectively.

In one embodiment, the modified derivative comprises an N-terminal and/or C-terminal modification. In a further embodiment, wherein the modified derivative comprises an N-terminal modification using suitable amino-reactive chemistry, and/or C-terminal modification using suitable carboxy-reactive chemistry. In a further embodiment, said N-terminal or C-terminal modification comprises addition of an effector group, including but not limited to a cytotoxic agent, a radiochelator or a chromophore.

In a further embodiment, the modified derivative comprises an N-terminal modification. In a further embodiment, the N-terminal modification comprises an N-terminal acetyl group. In this embodiment, the N-terminal cysteine group (the group referred to herein as $C_i$) is capped with acetic anhydride or other appropriate reagents during peptide synthesis leading to a molecule which is N-terminally acetylated. This embodiment provides the advantage of removing a potential recognition point for aminopeptidases and avoids the potential for degradation of the bicyclic peptide.

In an alternative embodiment, the N-terminal modification comprises the addition of a molecular spacer group which facilitates the conjugation of effector groups and retention of potency of the bicyclic peptide to its target.

In a further embodiment, the modified derivative comprises a C-terminal modification. In a further embodiment, the C-terminal modification comprises an amide group. In this embodiment, the C-terminal cysteine group (the group referred to herein as $C_{ii}$) is synthesized as an amide during peptide synthesis leading to a molecule which is C-terminally amidated. This embodiment provides the advantage of removing a potential recognition point for carboxypeptidase and reduces the potential for proteolytic degradation of the bicyclic peptide.

In one embodiment, the modified derivative comprises replacement of one or more amino acid residues with one or more non-natural amino acid residues. In this embodiment, non-natural amino acids may be selected having isosteric/isoelectronic side chains which are neither recognised by degradative proteases nor have any adverse effect upon target potency.

Alternatively, non-natural amino acids may be used having constrained amino acid side chains, such that proteolytic hydrolysis of the nearby peptide bond is conformationally and sterically impeded. In particular, these concern proline analogues, bulky sidechains, Cα-disubstituted derivatives (for example, aminoisobutyric acid, Aib), and cyclo amino acids, a simple derivative being amino-cyclopropylcarboxylic acid.

In one embodiment, the modified derivative comprises the addition of a spacer group. In a further embodiment, the modified derivative comprises the addition of a spacer group to the N-terminal cysteine ($C_i$) and/or the C-terminal cysteine ($C_{iii}$).

In one embodiment, the modified derivative comprises replacement of one or more oxidation sensitive amino acid residues with one or more oxidation resistant amino acid residues.

In one embodiment, the modified derivative comprises replacement of one or more charged amino acid residues with one or more hydrophobic amino acid residues. In an alternative embodiment, the modified derivative comprises replacement of one or more hydrophobic amino acid residues with one or more charged amino acid residues. The correct balance of charged versus hydrophobic amino acid residues is an important characteristic of the bicyclic peptide ligands. For example, hydrophobic amino acid residues influence the degree of plasma protein binding and thus the concentration of the free available fraction in plasma, while charged amino acid residues (in particular arginine) may influence the interaction of the peptide with the phospholipid membranes on cell surfaces. The two in combination may influence half-life, volume of distribution and exposure of the peptide drug, and can be tailored according to the clinical endpoint. In addition, the correct combination and number of charged versus hydrophobic amino acid residues may reduce irritation at the injection site (if the peptide drug has been administered subcutaneously).

In one embodiment, the modified derivative comprises replacement of one or more L-amino acid residues with one or more D-amino acid residues. This embodiment is believed to increase proteolytic stability by steric hindrance and by a propensity of D-amino acids to stabilise B-turn conformations (Tugyi et al (2005) PNAS, 102 (2), 413-418).

In one embodiment, the modified derivative comprises removal of any amino acid residues and substitution with alanines. This embodiment provides the advantage of removing potential proteolytic attack site(s).

It should be noted that each of the above mentioned modifications serve to deliberately improve the potency or stability of the peptide. Further potency improvements based on modifications may be achieved through the following mechanisms:

Incorporating hydrophobic moieties that exploit the hydrophobic effect and lead to lower off rates, such that higher affinities are achieved;

Incorporating charged groups that exploit long-range ionic interactions, leading to faster on rates and to higher affinities (see for example Schreiber et al, *Rapid, electrostatically assisted association of proteins* (1996), Nature Struct. Biol. 3, 427-31); and Incorporating additional constraint into the peptide, by for example constraining side chains of amino acids correctly such that loss in entropy is minimal upon target binding, constraining the torsional angles of the backbone such that loss in entropy is minimal upon target binding and introducing additional cyclisations in the molecule for identical reasons.

(for reviews see Gentilucci et al, Curr. Pharmaceutical Design, (2010), 16, 3185-203, and Nestor et al, Curr. Medicinal Chem (2009), 16, 4399-418).

Isotopic Variations

The present invention includes all pharmaceutically acceptable (radio) isotope-labeled peptide ligands of the invention, wherein one or more atoms are replaced by atoms having the same atomic number, but an atomic mass or mass number different from the atomic mass or mass number usually found in nature, and peptide ligands of the invention, wherein metal chelating groups are attached (termed "effector") that are capable of holding relevant (radio) isotopes, and peptide ligands of the invention, wherein certain functional groups are covalently replaced with relevant (radio) isotopes or isotopically labelled functional groups.

Examples of isotopes suitable for inclusion in the peptide ligands of the invention comprise isotopes of hydrogen, such as $^2$H (D) and $^3$H (T), carbon, such as $^{11}$C, $^{13}$C and $^{14}$C, chlorine, such as $^{36}$Cl, fluorine, such as $^{18}$F, iodine, such as $^{123}$I, $^{125}$I and $^{131}$I, nitrogen, such as $^{13}$N and $^{15}$N, oxygen, such as $^{15}$O, $^{17}$O and $^{18}$O, phosphorus, such as $^{32}$P, sulfur, such as $^{35}$S, copper, such as $^{64}$Cu, gallium, such as $^{67}$Ga or $^{68}$Ga, yttrium, such as $^9$Y and lutetium, such as $^{177}$Lu, and Bismuth, such as $^{213}$Bi.

Certain isotopically-labelled peptide ligands of the invention, for example, those incorporating a radioactive isotope, are useful in drug and/or substrate tissue distribution studies, and to clinically assess the presence and/or absence of the Nectin-4 target on diseased tissues. The peptide ligands of the invention can further have valuable diagnostic properties in that they can be used for detecting or identifying the formation of a complex between a labelled compound and other molecules, peptides, proteins, enzymes or receptors. The detecting or identifying methods can use compounds that are labelled with labelling agents such as radioisotopes, enzymes, fluorescent substances, luminous substances (for example, luminol, luminol derivatives, luciferin, aequorin and luciferase), etc. The radioactive isotopes tritium, i.e. $^3$H (T), and carbon-14, i.e. $^{14}$C, are particularly useful for this purpose in view of their ease of incorporation and ready means of detection.

Substitution with heavier isotopes such as deuterium, i.e. $^2$H (D), may afford certain therapeutic advantages resulting from greater metabolic stability, for example, increased in vivo half-life or reduced dosage requirements, and hence may be preferred in some circumstances.

Substitution with positron emitting isotopes, such as $^{11}$C, $^{18}$F, $^{15}$O and $^{13}$N, can be useful in Positron Emission Topography (PET) studies for examining target occupancy.

Isotopically-labeled compounds of peptide ligands of the invention can generally be prepared by conventional techniques known to those skilled in the art or by processes analogous to those described in the accompanying Examples using an appropriate isotopically-labeled reagent in place of the non-labeled reagent previously employed.

Molecular Scaffold

In one embodiment, the molecular scaffold comprises a non-aromatic molecular scaffold. References herein to "non-aromatic molecular scaffold" refer to any molecular scaffold as defined herein which does not contain an aromatic (i.e. unsaturated) carbocyclic or heterocyclic ring system.

Suitable examples of non-aromatic molecular scaffolds are described in Heinis et al (2014) *Angewandte Chemie, International Edition* 53(6) 1602-1606.

As noted in the foregoing documents, the molecular scaffold may be a small molecule, such as a small organic molecule.

In one embodiment the molecular scaffold may be a macromolecule. In one embodiment the molecular scaffold is a macromolecule composed of amino acids, nucleotides or carbohydrates.

In one embodiment the molecular scaffold comprises reactive groups that are capable of reacting with functional group(s) of the polypeptide to form covalent bonds.

The molecular scaffold may comprise chemical groups which form the linkage with a peptide, such as amines, thiols, alcohols, ketones, aldehydes, nitriles, carboxylic acids, esters, alkenes, alkynes, azides, anhydrides, succinimides, maleimides, alkyl halides and acyl halides.

An example of an αβ unsaturated carbonyl containing compound is 1,1',1"-(1,3,5-triazinane-1,3,5-triyl)triprop-2-en-1-one (TATA) (Angewandte Chemie, International Edition (2014), 53(6), 1602-1606).

Effector and Functional Groups

According to a further aspect of the invention, there is provided a drug conjugate comprising a peptide ligand as defined herein conjugated to one or more effector and/or functional groups.

Effector and/or functional groups can be attached, for example, to the N and/or C termini of the polypeptide, to an amino acid within the polypeptide, or to the molecular scaffold.

Appropriate effector groups include antibodies and parts or fragments thereof. For instance, an effector group can include an antibody light chain constant region (CL), an antibody CH1 heavy chain domain, an antibody CH2 heavy chain domain, an antibody CH3 heavy chain domain, or any combination thereof, in addition to the one or more constant region domains. An effector group may also comprise a hinge region of an antibody (such a region normally being found between the CH1 and CH2 domains of an IgG molecule).

In a further embodiment of this aspect of the invention, an effector group according to the present invention is an Fc region of an IgG molecule. Advantageously, a peptide ligand-effector group according to the present invention comprises or consists of a peptide ligand Fc fusion having a tβ half-life of a day or more, two days or more, 3 days or more, 4 days or more, 5 days or more, 6 days or more or 7 days or more. Most advantageously, the peptide ligand according to the present invention comprises or consists of a peptide ligand Fc fusion having a tβ half-life of a day or more.

Functional groups include, in general, binding groups, drugs, reactive groups for the attachment of other entities, functional groups which aid uptake of the macrocyclic peptides into cells, and the like.

The ability of peptides to penetrate into cells will allow peptides against intracellular targets to be effective. Targets that can be accessed by peptides with the ability to penetrate into cells include transcription factors, intracellular signalling molecules such as tyrosine kinases and molecules involved in the apoptotic pathway. Functional groups which enable the penetration of cells include peptides or chemical groups which have been added either to the peptide or the molecular scaffold. Peptides such as those derived from such as VP22, HIV-Tat, a homeobox protein of Drosophila (Antennapedia), e.g. as described in Chen and Harrison, Biochemical Society Transactions (2007) Volume 35, part 4, p 821; Gupta et al. in Advanced Drug Discovery Reviews (2004) Volume 57 9637. Examples of short peptides which have been shown to be efficient at translocation through plasma membranes include the 16 amino acid penetratin peptide from Drosophila Antennapedia protein (Derossi et al (1994) J Biol. Chem. Volume 269 p 10444), the 18 amino acid 'model amphipathic peptide' (Oehlke et al (1998) Biochim Biophys Acts Volume 1414 p 127) and arginine rich regions of the HIV TAT protein. Non peptidic approaches include the use of small molecule mimics or SMOCs that can be easily attached to biomolecules (Okuyama et al (2007) Nature Methods Volume 4 p 153). Other chemical strategies to add guanidinium groups to molecules also enhance cell penetration (Elson-Scwab et al (2007) J Biol Chem Volume 282 p 13585). Small molecular weight molecules such as steroids may be added to the molecular scaffold to enhance uptake into cells.

One class of functional groups which may be attached to peptide ligands includes antibodies and binding fragments thereof, such as Fab, Fv or single domain fragments. In particular, antibodies which bind to proteins capable of increasing the half-life of the peptide ligand in vivo may be used.

In one embodiment, a peptide ligand-effector group according to the invention has a t$\beta$ half-life selected from the group consisting of: 12 hours or more, 24 hours or more, 2 days or more, 3 days or more, 4 days or more, 5 days or more, 6 days or more, 7 days or more, 8 days or more, 9 days or more, 10 days or more, 11 days or more, 12 days or more, 13 days or more, 14 days or more, 15 days or more or 20 days or more. Advantageously a peptide ligand-effector group or composition according to the invention will have a t$\beta$ half-life in the range 12 to 60 hours. In a further embodiment, it will have a t$\beta$ half-life of a day or more. In a further embodiment still, it will be in the range 12 to 26 hours.

In one particular embodiment of the invention, the functional group is selected from a metal chelator, which is suitable for complexing metal radioisotopes of medicinal relevance.

Possible effector groups also include enzymes, for instance such as carboxypeptidase G2 for use in enzyme/prodrug therapy, where the peptide ligand replaces antibodies in ADEPT.

In one particular embodiment of the invention, the functional group is selected from a drug, such as a cytotoxic agent for cancer therapy. Suitable examples include: alkylating agents such as cisplatin and carboplatin, as well as oxaliplatin, mechlorethamine, cyclophosphamide, chlorambucil, ifosfamide; Anti-metabolites including purine analogs azathioprine and mercaptopurine or pyrimidine analogs; plant alkaloids and terpenoids including vinca alkaloids such as Vincristine, Vinblastine, Vinorelbine and Vindesine; Podophyllotoxin and its derivatives etoposide and teniposide; Taxanes, including paclitaxel, originally known as Taxol; topoisomerase inhibitors including camptothecins: irinotecan and topotecan, and type II inhibitors including amsacrine, etoposide, etoposide phosphate, and teniposide. Further agents can include antitumour antibiotics which include the immunosuppressant dactinomycin (which is used in kidney transplantations), doxorubicin, epirubicin, bleomycin, calicheamycins, and others.

In one further particular embodiment of the invention, the cytotoxic agent is selected from maytansinoids (such as DM1) or monomethyl auristatins (such as MMAE).

DM1 is a cytotoxic agent which is a thiol-containing derivative of maytansine and has the following structure:

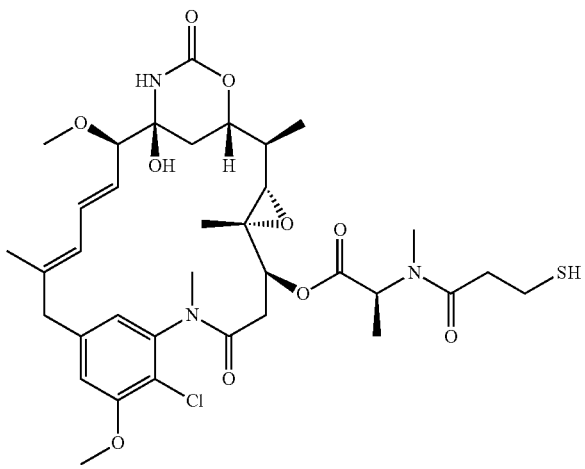

Data is presented herein in Table 4 which demonstrates the effects of a peptide ligand conjugated to a toxin containing DM1.

Monomethyl auristatin E (MMAE) is a synthetic antineoplastic agent and has the following structure:

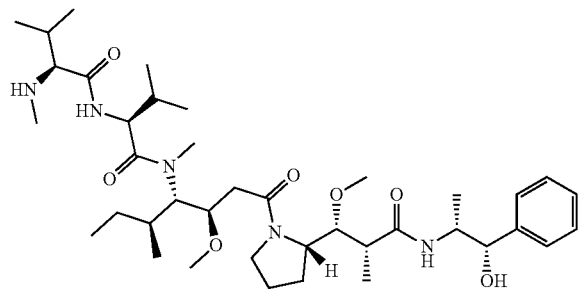 [SMILES: CC[C@H](C)[C@@H]([C@@H](CC(=O)N1CCC[C@H]1[C@H](OC)[C@@H](C)C(=O)N[C@H](C)[C@@H](O)c1ccccc1)OC)N(C)C(=O)[C@@H](NC(=O)[C@@H](NC)C(C)C)C(C)C]

Data is presented herein in Table 4 which demonstrates the effects of peptide ligands conjugated to a toxin containing MMAE.

In one yet further particular embodiment of the invention, the cytotoxic agent is selected from monomethyl auristatin E (MMAE).

In one embodiment, the cytotoxic agent is linked to the bicyclic peptide by a cleavable bond, such as a disulphide bond or a protease sensitive bond. In a further embodiment, the groups adjacent to the disulphide bond are modified to control the hindrance of the disulphide bond, and by this the rate of cleavage and concomitant release of cytotoxic agent.

Published work established the potential for modifying the susceptibility of the disulphide bond to reduction by introducing steric hindrance on either side of the disulphide bond (Kellogg et al (2011) Bioconjugate Chemistry, 22, 717). A greater degree of steric hindrance reduces the rate of reduction by intracellular glutathione and also extracellular (systemic) reducing agents, consequentially reducing the ease by which toxin is released, both inside and outside the cell. Thus, selection of the optimum in disulphide stability in the circulation (which minimises undesirable side effects of the toxin) versus efficient release in the intracellular milieu (which maximises the therapeutic effect) can be achieved by careful selection of the degree of hindrance on either side of the disulphide bond.

The hindrance on either side of the disulphide bond is modulated through introducing one or more methyl groups on either the targeting entity (here, the bicyclic peptide) or toxin side of the molecular construct.

In one embodiment, the cytotoxic agent and linker is selected from any combinations of those described in WO 2016/067035 (the cytotoxic agents and linkers thereof are herein incorporated by reference).

In one embodiment, the linker between said cytotoxic agent and said bicyclic peptide comprises one or more amino acid residues. Examples of suitable amino acid residues as suitable linkers include Ala, Cit, Lys, Trp and Val.

In one embodiment, the cytotoxic agent is selected from MMAE and said drug conjugate additionally comprises a linker selected from: -PABC-Cit-Val-Glutaryl- or -PABC-cyclobutyl-Ala-Cit-βAla-, wherein PABC represents p-aminobenzylcarbamate. Full details of the cyclobutyl containing linker may be found in Wei et al (2018) J. Med. Chem. 61, 989-1000. In a further embodiment, the cytotoxic agent is selected from MMAE and the linker is -PABC-Cit-Val-Glutaryl-.

In an alternative embodiment, the cytotoxic agent is DM1 and said drug conjugate additionally comprises a linker which is -SPDB-(SO₃H)-, wherein SPDB represents N-succinimidyl 3-(2-pyridyldithio) propionate.

In one embodiment, the cytotoxic agent is MMAE, the bicyclic peptide is selected from BCY7556 as defined herein and the linker is selected from -PABC-Cit-Val-Glutaryl-. This BDC is known herein as BCY7683. Data is presented herein which demonstrates excellent binding to human Nectin-4 for BCY7683 in the SPR binding assay as shown in Table 4. This BDC also demonstrated good anti-tumour activity in the Non-Small Cell Lung Cancer model as shown in Example 1.

In an alternative embodiment, the cytotoxic agent is MMAE, the bicyclic peptide is selected from BCY7814 as defined herein and the linker is selected from -PABC-Cit-Val-Glutaryl-. This BDC is known herein as BCY7825. Data is presented herein which demonstrates excellent binding to human Nectin-4 for BCY7825 in the SPR binding assay as shown in Table 4. This BDC also demonstrated good anti-tumour activity in the Non-Small Cell Lung Cancer model as shown in Example 1 and the bladder cancer model as shown in Example 2.

In an alternative embodiment, the cytotoxic agent is DM1, the bicyclic peptide is selected from BCY7814 as defined herein and the linker is selected from -SPDB-(SO₃H)-. This BDC is known herein as BCY7826. Data is presented herein which demonstrates excellent binding to human Nectin-4 for BCY7826 in the SPR binding assay as shown in Table 4. This BDC also demonstrated good anti-tumour activity in the Non-Small Cell Lung Cancer model as shown in Example 1.

In an alternative embodiment, the cytotoxic agent is MMAE, the bicyclic peptide is selected from BCY8234 as defined herein and the linker is selected from -PABC-Cit-Val-Glutaryl-. This BDC is known herein as BCY8245 and is represented schematically as:

BCY8245

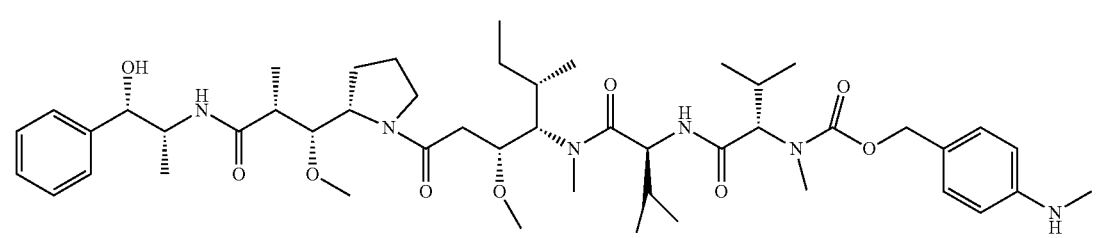

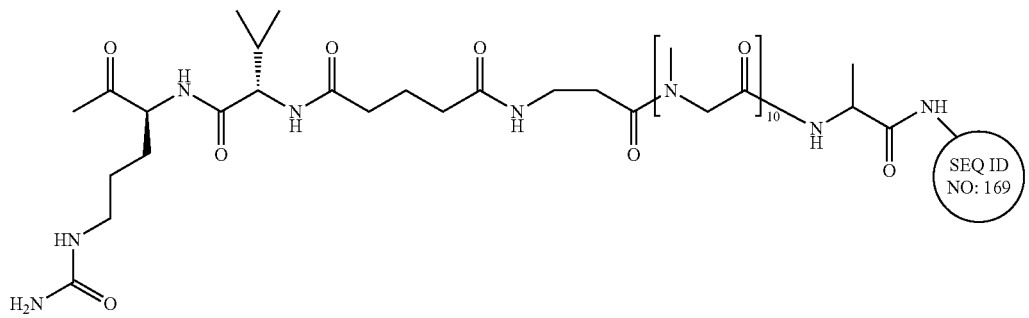

and may also be represented in a more detailed manner as:

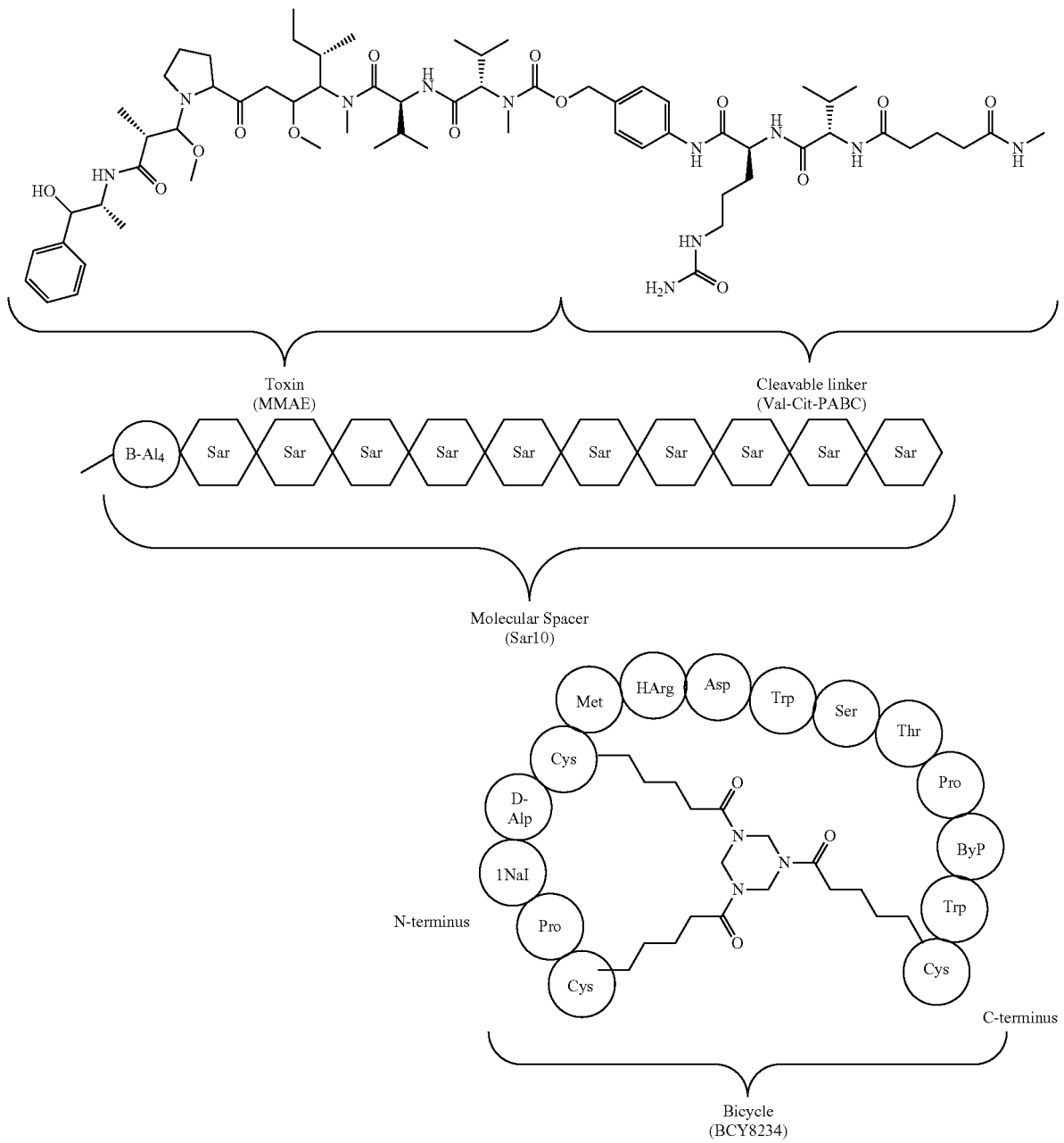

Data is presented herein which demonstrates excellent binding to human Nectin-4 for BCY8245 in the SPR binding assay as shown in Table 4. This BDC also demonstrated good anti-tumour activity in the Non-Small Cell Lung Cancer model as shown in Example 1, the bladder cancer model as shown in Example 2, the pancreatic cancer model as shown in Example 3 and the breast cancer model as shown in Example 4.

In an alternative embodiment, the cytotoxic agent is MMAE, the bicyclic peptide is selected from BCY8231 as defined herein and the linker is selected from -PABC-Cit-Val-Glutaryl-. This BDC is known herein as BCY8253. Data is presented herein which demonstrates excellent binding to human Nectin-4 for BCY8253 in the SPR binding assay as shown in Table 4. This BDC also demonstrated good anti-tumour activity in the Non-Small Cell Lung Cancer model as shown in Example 1, the bladder cancer model as shown in Example 2, the pancreatic cancer model as shown in Example 3 and the breast cancer model as shown in Example 4.

In an alternative embodiment, the cytotoxic agent is MMAE, the bicyclic peptide is selected from BCY8232 as defined herein and the linker is selected from -PABC-Cit-Val-Glutaryl-. This BDC is known herein as BCY8254. Data is presented herein which demonstrates excellent binding to human Nectin-4 for BCY8254 in the SPR binding assay as shown in Table 4. This BDC also demonstrated good anti-tumour activity in the Non-Small Cell Lung Cancer model as shown in Example 1 and the bladder cancer model as shown in Example 2.

In an alternative embodiment, the cytotoxic agent is MMAE, the bicyclic peptide is selected from BCY8235 as defined herein and the linker is selected from -PABC-Cit-Val-Glutaryl-. This BDC is known herein as BCY8255. Data is presented herein which demonstrates excellent binding to human Nectin-4 for BCY8255 in the SPR binding assay as shown in Table 4. This BDC also demonstrated good anti-tumour activity in the Non-Small Cell Lung Cancer model as shown in Example 1, the bladder cancer model as shown in Example 2, the pancreatic cancer model as shown in Example 3 and the breast cancer model as shown in Example 4.

In an alternative embodiment, the cytotoxic agent is MMAE, the bicyclic peptide is selected from BCY8234 as defined herein and the linker is selected from -PABC-cyclobutyl-(B-Ala)-. This BDC is known herein as BCY8549. Data is presented herein which demonstrates excellent binding to human Nectin-4 for BCY8549 in the SPR binding assay as shown in Table 4.

In an alternative embodiment, the cytotoxic agent is MMAE, the bicyclic peptide is selected from BCY8831 as defined herein, the linker is selected from -PABC-Cit-Val-Glutaryl- and the linker-cytotoxic agent is linked to the bicyclic peptide at the Lys3 position. This BDC is known herein as BCY8550. Data is presented herein which demonstrates excellent binding to human Nectin-4 for BCY8550 in the SPR binding assay as shown in Table 4.

In an alternative embodiment, the cytotoxic agent is MMAE, the bicyclic peptide is selected from BCY8269 as defined herein and the linker is selected from -PABC-Cit-Val-Glutaryl-. This BDC is known herein as BCY8783. Data is presented herein which demonstrates excellent binding to human Nectin-4 for BCY8783 in the SPR binding assay as shown in Table 4. This BDC also regressed tumors potently in the Non-Small Cell Lung Cancer model as shown in Example 5.

In an alternative embodiment, the cytotoxic agent is MMAE, the bicyclic peptide is selected from BCY8273 as defined herein and the linker is selected from -PABC-Cit-Val-Glutaryl-. This BDC is known herein as BCY8784. Data is presented herein which demonstrates excellent binding to human Nectin-4 for BCY8784 in the SPR binding assay as shown in Table 4. This BDC also regressed tumors potently in the Non-Small Cell Lung Cancer model as shown in Example 5.

In a further embodiment, the bicyclic drug conjugate is selected from any one of: BCY7683, BCY7825, BCY7826, BCY8245, BCY8253, BCY8254, BCY8255, BCY8549, BCY8550, BCY8783 and BCY8784. In a further embodiment, the bicyclic drug conjugate is selected from any one of: BCY7683, BCY7825, BCY7826, BCY8245, BCY8253, BCY8254, BCY8255, BCY8783 and BCY8784. In a yet further embodiment, the bicyclic drug conjugate is BCY8245. The drug conjugate BCY8245 demonstrated superior dose dependent anti-tumour activity as demonstrated in the data described herein.

In one embodiment, the drug conjugate is other than BCY8245 and/or BCY8549.

Synthesis

The peptides of the present invention may be manufactured synthetically by standard techniques followed by reaction with a molecular scaffold in vitro. When this is performed, standard chemistry may be used. This enables the rapid large scale preparation of soluble material for further downstream experiments or validation. Such methods could be accomplished using conventional chemistry such as that disclosed in Timmerman et al (supra).

Thus, the invention also relates to manufacture of polypeptides or conjugates selected as set out herein, wherein the manufacture comprises optional further steps as explained below. In one embodiment, these steps are carried out on the end product polypeptide/conjugate made by chemical synthesis.

Optionally amino acid residues in the polypeptide of interest may be substituted when manufacturing a conjugate or complex.

Peptides can also be extended, to incorporate for example another loop and therefore introduce multiple specificities.

To extend the peptide, it may simply be extended chemically at its N-terminus or C-terminus or within the loops using orthogonally protected lysines (and analogues) using standard solid phase or solution phase chemistry. Standard (bio) conjugation techniques may be used to introduce an activated or activatable N- or C-terminus. Alternatively additions may be made by fragment condensation or native chemical ligation e.g. as described in (Dawson et al. 1994. Synthesis of Proteins by Native Chemical Ligation. Science 266:776-779), or by enzymes, for example using subtiligase as described in (Chang et al. Proc Natl Acad Sci USA. 1994 Dec. 20; 91(26): 12544-8 or in Hikari et al Bioorganic & Medicinal Chemistry Letters Volume 18, Issue 22, 15 Nov. 2008, Pages 6000-6003).

Alternatively, the peptides may be extended or modified by further conjugation through disulphide bonds. This has the additional advantage of allowing the first and second peptide to dissociate from each other once within the reducing environment of the cell. In this case, the molecular scaffold (e.g. TATA) could be added during the chemical synthesis of the first peptide so as to react with the three cysteine groups; a further cysteine or thiol could then be appended to the N- or C-terminus of the first peptide, so that this cysteine or thiol only reacted with a free cysteine or thiol of the second peptide, forming a disulfide-linked bicyclic peptide-peptide conjugate.

Similar techniques apply equally to the synthesis/coupling of two bicyclic and bispecific macrocycles, potentially creating a tetraspecific molecule.

Furthermore, addition of other functional groups or effector groups may be accomplished in the same manner, using appropriate chemistry, coupling at the N- or C-termini or via side chains. In one embodiment, the coupling is conducted in such a manner that it does not block the activity of either entity.

Pharmaceutical Compositions

According to a further aspect of the invention, there is provided a pharmaceutical composition comprising a peptide ligand or a drug conjugate as defined herein in combination with one or more pharmaceutically acceptable excipients.

Generally, the present peptide ligands will be utilised in purified form together with pharmacologically appropriate excipients or carriers. Typically, these excipients or carriers include aqueous or alcoholic/aqueous solutions, emulsions or suspensions, including saline and/or buffered media. Parenteral vehicles include sodium chloride solution, Ringer's dextrose, dextrose and sodium chloride and lactated Ringer's. Suitable physiologically-acceptable adjuvants, if necessary to keep a polypeptide complex in suspension, may be chosen from thickeners such as carboxymethylcellulose, polyvinylpyrrolidone, gelatin and alginates.

Intravenous vehicles include fluid and nutrient replenishers and electrolyte replenishers, such as those based on Ringer's dextrose. Preservatives and other additives, such as antimicrobials, antioxidants, chelating agents and inert gases, may also be present (Mack (1982) Remington's Pharmaceutical Sciences, 16th Edition).

The peptide ligands of the present invention may be used as separately administered compositions or in conjunction with other agents. These can include antibodies, antibody fragments and various immunotherapeutic drugs, such as cylcosporine, methotrexate, adriamycin or cisplatinum and immunotoxins. Pharmaceutical compositions can include "cocktails" of various cytotoxic or other agents in conjunction with the protein ligands of the present invention, or even combinations of selected polypeptides according to the present invention having different specificities, such as polypeptides selected using different target ligands, whether or not they are pooled prior to administration.

The route of administration of pharmaceutical compositions according to the invention may be any of those commonly known to those of ordinary skill in the art. For therapy, the peptide ligands of the invention can be administered to any patient in accordance with standard techniques. The administration can be by any appropriate mode, including parenterally, intravenously, intramuscularly, intraperitoneally, transdermally, via the pulmonary route, or also, appropriately, by direct infusion with a catheter. Preferably, the pharmaceutical compositions according to the invention will be administered by inhalation. The dosage and frequency of administration will depend on the age, sex and condition of the patient, concurrent administration of other drugs, counterindications and other parameters to be taken into account by the clinician.

The peptide ligands of this invention can be lyophilised for storage and reconstituted in a suitable carrier prior to use. This technique has been shown to be effective and art-known lyophilisation and reconstitution techniques can be employed. It will be appreciated by those skilled in the art that lyophilisation and reconstitution can lead to varying degrees of activity loss and that levels may have to be adjusted upward to compensate.

The compositions containing the present peptide ligands or a cocktail thereof can be administered for prophylactic and/or therapeutic treatments. In certain therapeutic applications, an adequate amount to accomplish at least partial inhibition, suppression, modulation, killing, or some other measurable parameter, of a population of selected cells is defined as a "therapeutically-effective dose". Amounts needed to achieve this dosage will depend upon the severity of the disease and the general state of the patient's own immune system, but generally range from 0.005 to 5.0 mg of selected peptide ligand per kilogram of body weight, with doses of 0.05 to 2.0 mg/kg/dose being more commonly used. For prophylactic applications, compositions containing the present peptide ligands or cocktails thereof may also be administered in similar or slightly lower dosages.

A composition containing a peptide ligand according to the present invention may be utilised in prophylactic and therapeutic settings to aid in the alteration, inactivation, killing or removal of a select target cell population in a mammal. In addition, the peptide ligands described herein may be used extracorporeally or in vitro selectively to kill, deplete or otherwise effectively remove a target cell population from a heterogeneous collection of cells. Blood from a mammal may be combined extracorporeally with the selected peptide ligands whereby the undesired cells are killed or otherwise removed from the blood for return to the mammal in accordance with standard techniques.

Co-Administration with One or More Other Therapeutic Agent

Depending upon the particular condition, or disease, to be treated, additional therapeutic agents that are normally administered to treat that condition, may also be present in the compositions of this invention. Thus, in one embodiment, the pharmaceutical composition additionally comprises one or more therapeutic agents. As used herein, additional therapeutic agents that are normally administered to treat a particular disease, or condition, are known as "appropriate for the disease, or condition, being treated."

In some embodiments, the present invention provides a method of treating a disclosed disease or condition comprising administering to a patient in need thereof an effective amount of a compound disclosed herein or a pharmaceutically acceptable salt thereof and co-administering simultaneously or sequentially an effective amount of one or more additional therapeutic agents, such as those described herein. In some embodiments, the method includes co-administering one additional therapeutic agent. In some embodiments, the method includes co-administering two additional therapeutic agents. In some embodiments, the combination of the disclosed compound and the additional therapeutic agent or agents acts synergistically.

A compound of the current invention may also be used in combination with known therapeutic processes, for example, the administration of hormones or radiation. In certain embodiments, a provided compound is used as a radiosensitizer, especially for the treatment of tumors which exhibit poor sensitivity to radiotherapy.

A compound of the current invention can be administered alone or in combination with one or more other therapeutic compounds, possible combination therapy taking the form of fixed combinations or the administration of a compound of the invention and one or more other therapeutic compounds being staggered or given independently of one another, or the combined administration of fixed combinations and one or more other therapeutic compounds. A compound of the current invention can besides or in addition be administered especially for tumor therapy in combination with chemotherapy, radiotherapy, immunotherapy, phototherapy, surgical intervention, or a combination of these. Long-term therapy is equally possible as is adjuvant therapy in the context of other treatment strategies, as described above. Other possible treatments are therapy to maintain the patient's status after tumor regression, or even chemopreventive therapy, for example in patients at risk.

One or more other therapeutic agent may be administered separately from a compound or composition of the invention, as part of a multiple dosage regimen. Alternatively, one or more other therapeutic agents may be part of a single dosage form, mixed together with a compound of this invention in a single composition. If administered as a multiple dosage regime, one or more other therapeutic agent and a compound or composition of the invention may be administered simultaneously, sequentially or within a period of time from one another, for example within 1, 2, 3, 4, 5, 6, 7, 8, 9, 10, 11, 12, 13, 14, 15, 16, 17, 18, 19, 20, 21, 22, 23, or 24 hours from one another. In some embodiments, one or more other therapeutic agent and a compound or composition of the invention are administered as a multiple dosage regimen within greater than 24 hours apart.

As used herein, the term "combination," "combined," and related terms refers to the simultaneous or sequential administration of therapeutic agents in accordance with this invention. For example, a compound of the present invention may be administered with one or more other therapeutic agent simultaneously or sequentially in separate unit dosage forms or together in a single unit dosage form. Accordingly, the present invention provides a single unit dosage form comprising a compound of the current invention, one or more other therapeutic agent, and a pharmaceutically acceptable carrier, adjuvant, or vehicle.

The amount of a compound of the invention and one or more other therapeutic agent (in those compositions which comprise an additional therapeutic agent as described above) that may be combined with the carrier materials to produce a single dosage form will vary depending upon the host treated and the particular mode of administration. Preferably, a composition of the invention should be formulated so that a dosage of between 0.01-100 mg/kg body weight/day of a compound of the invention can be administered.

In those compositions which comprise one or more other therapeutic agent, the one or more other therapeutic agent and a compound of the invention may act synergistically. Therefore, the amount of the one or more other therapeutic agent in such compositions may be less than that required in a monotherapy utilizing only that therapeutic agent. In such compositions a dosage of between 0.01-1,000 μg/kg body weight/day of the one or more other therapeutic agent can be administered.

The amount of one or more other therapeutic agent present in the compositions of this invention may be no more than the amount that would normally be administered in a composition comprising that therapeutic agent as the only active agent. Preferably the amount of one or more other therapeutic agent in the presently disclosed compositions will range from about 50% to 100% of the amount normally present in a composition comprising that agent as the only therapeutically active agent. In some embodiments, one or more other therapeutic agent is administered at a dosage of about 50%, about 55%, about 60%, about 65%, about 70%, about 75%, about 80%, about 85%, about 90%, or about 95% of the amount normally administered for that agent. As used herein, the phrase "normally administered" means the amount of an FDA approved therapeutic agent provided for dosing as per the FDA label insert.

The compounds of this invention, or pharmaceutical compositions thereof, may also be incorporated into compositions for coating an implantable medical device, such as prostheses, artificial valves, vascular grafts, stents and catheters. Vascular stents, for example, have been used to overcome restenosis (re-narrowing of the vessel wall after injury). However, patients using stents or other implantable devices risk clot formation or platelet activation. These unwanted effects may be prevented or mitigated by pre-coating the device with a pharmaceutically acceptable composition comprising a kinase inhibitor. Implantable devices coated with a compound of this invention are another embodiment of the present invention.

Exemplary Other Therapeutic Agents

In some embodiments, one or more other therapeutic agent is a Poly ADP ribose polymerase (PARP) inhibitor. In some embodiments, a PARP inhibitor is selected from olaparib (Lynparza®, AstraZeneca); rucaparib (Rubraca®, Clovis Oncology); niraparib (Zejula®, Tesaro); talazoparib (MDV3800/BMN 673/LT00673, Medivation/Pfizer/Biomarin); veliparib (ABT-888, AbbVie); and BGB-290 (BeiGene, Inc.).

In some embodiments, one or more other therapeutic agent is a histone deacetylase (HDAC) inhibitor. In some embodiments, an HDAC inhibitor is selected from vorinostat (Zolinza®, Merck); romidepsin (Istodax®, Celgene); panobinostat (Farydak®, Novartis); belinostat (Beleodaq®, Spectrum Pharmaceuticals); entinostat (SNDX-275, Syndax Pharmaceuticals) (NCT00866333); and chidamide (Epidaza®), HBI-8000, Chipscreen Biosciences, China).

In some embodiments, one or more other therapeutic agent is a CDK inhibitor, such as a CDK4/CDK6 inhibitor. In some embodiments, a CDK 4/6 inhibitor is selected from palbociclib (Ibrance®, Pfizer); ribociclib (Kisqali®, Novartis); abemaciclib (Ly2835219, Eli Lilly); and trilaciclib (G1T28, G1 Therapeutics).

In some embodiments, one or more other therapeutic agent is a phosphatidylinositol 3 kinase (PI3K) inhibitor. In some embodiments, a PI3K inhibitor is selected from idelalisib (Zydelig®, Gilead), alpelisib (BYL719, Novartis), taselisib (GDC-0032, Genentech/Roche); pictilisib (GDC-0941, Genentech/Roche); copanlisib (BAY806946, Bayer); duvelisib (formerly IPI-145, Infinity Pharmaceuticals); PQR309 (Piqur Therapeutics, Switzerland); and TGR1202 (formerly RP5230, TG Therapeutics).

In some embodiments, one or more other therapeutic agent is a platinum-based therapeutic, also referred to as platins. Platins cause cross-linking of DNA, such that they inhibit DNA repair and/or DNA synthesis, mostly in rapidly reproducing cells, such as cancer cells. In some embodiments, a platinum-based therapeutic is selected from cisplatin (Platinol®, Bristol-Myers Squibb); carboplatin (Paraplatin®), Bristol-Myers Squibb; also, Teva; Pfizer); oxaliplatin (Eloxitin®) Sanofi-Aventis); nedaplatin (Aqupla®, Shionogi), picoplatin (Poniard Pharmaceuticals); and satraplatin (JM-216, Agennix).

In some embodiments, one or more other therapeutic agent is a taxane compound, which causes disruption of microtubules, which are essential for cell division. In some embodiments, a taxane compound is selected from paclitaxel (Taxol®, Bristol-Myers Squibb), docetaxel (Taxotere®, Sanofi-Aventis; Docefrez®, Sun Pharmaceutical), albumin-bound paclitaxel (Abraxane®; Abraxis/Celgene), cabazitaxel (Jevtana®, Sanofi-Aventis), and SID530 (SK Chemicals, Co.) (NCT00931008).

In some embodiments, one or more other therapeutic agent is a nucleoside inhibitor, or a therapeutic agent that interferes with normal DNA synthesis, protein synthesis, cell replication, or will otherwise inhibit rapidly proliferating cells.

In some embodiments, a nucleoside inhibitor is selected from trabectedin (guanidine alkylating agent, Yondelis®, Janssen Oncology), mechlorethamine (alkylating agent, Valchlor®, Aktelion Pharmaceuticals); vincristine (Oncovin®, Eli Lilly; Vincasar®, Teva Pharmaceuticals; Marqibo®, Talon Therapeutics); temozolomide (prodrug to alkylating agent 5-(3-methyltriazen-1-yl)-imidazole-4-carboxamide (MTIC) Temodar®, Merck); cytarabine injection (ara-C, antimetabolic cytidine analog, Pfizer); lomustine (alkylating agent, CeeNUR, Bristol-Myers Squibb; Gleostine®, NextSource Biotechnology); azacitidine (pyrimidine nucleoside analog of cytidine, Vidaza®, Celgene); omacetaxine mepesuccinate (cephalotaxine ester) (protein synthesis inhibitor, Synribo®; Teva Pharmaceuticals); asparaginase *Erwinia chrysanthemi* (enzyme for depletion of asparagine, Elspar®, Lundbeck; Erwinaze®, EUSA Pharma); eribulin mesylate (microtubule inhibitor, tubulin-based antimitotic, Halaven®, Eisai); cabazitaxel (microtubule inhibitor, tubulin-based antimitotic, Jevtana®, Sanofi-Aventis); capacetrine (thymidylate synthase inhibitor, Xeloda®, Genentech); bendamustine (bifunctional mechlorethamine derivative, believed to form Interstrand DNA cross-links, Treanda®, Cephalon/ Teva); Ixabepilone (semi-synthetic analog of epothilone B, microtubule inhibitor, tubulin-based antimitotic, Ixempra®, Bristol-Myers Squibb); nelarabine (prodrug of deoxyguanosine analog, nucleoside metabolic inhibitor, Arranon®, Novartis); clorafabine (prodrug of ribonucleotide reductase inhibitor, competitive inhibitor of deoxycytidine, Clolar®, Sanofi-Aventis); and trifluridine and tipiracil (thymidine-based nucleoside analog and thymidine phosphorylase inhibitor, Lonsurf®, Talho Oncology).

In some embodiments, one or more other therapeutic agent is a kinase inhibitor or VEGF-R antagonist. Approved VEGF inhibitors and kinase inhibitors useful in the present invention include: bevacizumab (Avastin®, Genentech/ Roche) an anti-VEGF monoclonal antibody; ramucirumab (Cyramza®, Eli Lilly), an anti-VEGFR-2 antibody and ziv-aflibercept, also known as VEGF Trap (Zaltrap®; Regeneron/Sanofi). VEGFR inhibitors, such as regorafenib (Stivarga®, Bayer); vandetanib (Caprelsa®, AstraZeneca); axitinib (Inlyta®, Pfizer); and lenvatinib (Lenvima®, Eisai); Raf inhibitors, such as sorafenib (Nexavar®, Bayer AG and Onyx); dabrafenib (Tafinlar®, Novartis); and vemurafenib (Zelboraf®, Genentech/Roche); MEK inhibitors, such as cobimetanib (Cotellic®, Exelexis/Genentech/Roche); trametinib (Mekinist®, Novartis); Bor-Abl tyrosine kinase inhibitors, such as imatinib (Gleevec®, Novartis); nilotinib (Tasigna®, Novartis); dasatinib (Sprycel®, BristolMyersSquibb); bosutinib (Bosulif®, Pfizer); and ponatinib (Inclusig®, Ariad Pharmaceuticals); Her2 and EGFR inhibitors, such as gefitinib (Iressa®, AstraZeneca); erlotinib (Tarceeva®, Genentech/Roche/Astellas); lapatinib (Tykerb®, Novartis); afatinib (Gilotrif®, Boehringer Ingelheim); osimertinib (targeting activated EGFR, Tagrisso®, AstraZeneca); and brigatinib (Alunbrig®, Ariad Pharmaceuticals); c-Met and VEGFR2 inhibitors, such as cabozanitib (Cometriq®, Exelexis); and multikinase inhibitors, such as sunitinib (Sutent®, Pfizer); pazopanib (Votrient®, Novartis); ALK inhibitors, such as crizotinib (Xalkori®, Pfizer); ceritinib (Zykadia®, Novartis); and alectinib (Alecenza®, Genentech/Roche); Bruton's tyrosine kinase inhibitors, such as ibrutinib (Imbruvica®), Pharmacyclics/Janssen); and Flt3 receptor inhibitors, such as midostaurin (Rydapt®, Novartis).

Other kinase inhibitors and VEGF-R antagonists that are in development and may be used in the present invention include: tivozanib (Aveo Pharmaecuticals); vatalanib (Bayer/Novartis); lucitanib (Clovis Oncology); dovitinib (TKI258, Novartis); Chiauanib (Chipscreen Biosciences); CEP-11981 (Cephalon); linifanib (Abbott Laboratories); neratinib (HKI-272, Puma Biotechnology); radotinib (Supect®, IY5511, II-Yang Pharmaceuticals, S. Korea); ruxolitinib (Jakafi®, Incyte Corporation); PTC299 (PTC Therapeutics); CP-547,632 (Pfizer); foretinib (Exelexis, GlaxoSmithKline); quizartinib (Daiichi Sankyo) and motesanib (Amgen/Takeda).

In some embodiments, one or more other therapeutic agent is an mTOR inhibitor, which inhibits cell proliferation, angiogenesis and glucose uptake. In some embodiments, an mTOR inhibitor is everolimus (Afinitor®, Novartis); temsirolimus (Torisel®, Pfizer); and sirolimus (Rapamune®, Pfizer).

In some embodiments, one or more other therapeutic agent is a proteasome inhibitor. Approved proteasome inhibitors useful in the present invention include bortezomib (Velcade®, Takeda); carfilzomib (Kyprolis®, Amgen); and ixazomib (Ninlaro®, Takeda).

In some embodiments, one or more other therapeutic agent is a growth factor antagonist, such as an antagonist of platelet-derived growth factor (PDGF), or epidermal growth factor (EGF) or its receptor (EGFR). Approved PDGF antagonists which may be used in the present invention include olaratumab (Lartruvo®; Eli Lilly). Approved EGFR antagonists which may be used in the present invention include: cetuximab (Erbitux®, Eli Lilly); necitumumab (Portrazza®, Eli Lilly), panitumumab (Vectibix®), Amgen); and osimertinib (targeting activated EGFR, Tagrisso®, AstraZeneca).

In some embodiments, one or more other therapeutic agent is an aromatase inhibitor. In some embodiments, an aromatase inhibitor is selected from: exemestane (Aromasin®, Pfizer); anastazole (Arimidex®, AstraZeneca) and letrozole (Femara®, Novartis).

In some embodiments, one or more other therapeutic agent is an antagonist of the hedgehog pathway. Approved hedgehog pathway inhibitors which may be used in the present invention include: sonidegib (Odomzo®, Sun Pharmaceuticals); and vismodegib (Erivedge®, Genentech), both for treatment of basal cell carcinoma.

In some embodiments, one or more other therapeutic agent is a folic acid inhibitor. Approved folic acid inhibitors useful in the present invention include pemetrexed (Alimta®, Eli Lilly).

In some embodiments, one or more other therapeutic agent is a CC chemokine receptor 4 (CCR4) inhibitor. CCR4 inhibitors being studied that may be useful in the present invention include mogamulizumab (Poteligeo®, Kyowa Hakko Kirin, Japan).

In some embodiments, one or more other therapeutic agent is an isocitrate dehydrogenase (IDH) inhibitor. IDH inhibitors being studied which may be used in the present invention include: AG120 (Celgene; NCT02677922); AG221 (Celgene, NCT02677922; NCT02577406); BAY1436032 (Bayer, NCT02746081); IDH305 (Novartis, NCT02987010).

In some embodiments, one or more other therapeutic agent is an arginase inhibitor. Arginase inhibitors being studied which may be used in the present invention include: AEB1102 (pegylated recombinant arginase, Aeglea Biotherapeutics), which is being studied in Phase 1 clinical trials for acute myeloid leukemia and myelodysplastic syndrome (NCT02732184) and solid tumors (NCT02561234); and CB-1158 (Calithera Biosciences).

In some embodiments, one or more other therapeutic agent is a glutaminase inhibitor. Glutaminase inhibitors being studied which may be used in the present invention include CB-839 (Calithera Biosciences).

In some embodiments, one or more other therapeutic agent is an antibody that binds to tumor antigens, that is, proteins expressed on the cell surface of tumor cells. Approved antibodies that bind to tumor antigens which may be used in the present invention include: rituximab (Rituxan®, Genentech/BiogenIdec); ofatumumab (anti-CD20, Arzerra®, GlaxoSmithKline); obinutuzumab (anti-CD20, Gazyva®, Genentech), ibritumomab (anti-CD20 and Yttrium-90, Zevalin®, Spectrum Pharmaceuticals); daratumumab (anti-CD38, Darzalex®, Janssen Biotech), dinutuximab (anti-glycolipid GD2, Unituxin®, United Therapeutics); trastuzumab (anti-HER2, Herceptin®, Genentech); ado-trastuzumab emtansine (anti-HER2, fused to emtansine, Kadcyla®, Genentech); and pertuzumab (anti-HER2, Perjeta®, Genentech); and brentuximab vedotin (anti-CD30-drug conjugate, Adcetris®, Seattle Genetics).

In some embodiments, one or more other therapeutic agent is a topoisomerase inhibitor. Approved topoisomerase inhibitors useful in the present invention include: irinotecan (Onivyde®, Merrimack Pharmaceuticals); topotecan (Hycamtin®, GlaxoSmithKline). Topoisomerase inhibitors being studied which may be used in the present invention include pixantrone (Pixuvri®, CTI Biopharma).

In some embodiments, one or more other therapeutic agent is an inhibitor of anti-apoptotic proteins, such as BCL-2. Approved anti-apoptotics which may be used in the present invention include: venetoclax (Venclexta®, AbbVie/Genentech); and blinatumomab (Blincyto®, Amgen). Other therapeutic agents targeting apoptotic proteins which have undergone clinical testing and may be used in the present invention include navitoclax (ABT-263, Abbott), a BCL-2 inhibitor (NCT02079740).

In some embodiments, one or more other therapeutic agent is an androgen receptor inhibitor. Approved androgen receptor inhibitors useful in the present invention include: enzalutamide (Xtandi®, Astellas/Medivation); approved inhibitors of androgen synthesis include abiraterone (Zytiga®, Centocor/Ortho); approved antagonist of gonadotropin-releasing hormone (GnRH) receptor (degaralix, Firmagon®, Ferring Pharmaceuticals).

In some embodiments, one or more other therapeutic agent is a selective estrogen receptor modulator (SERM), which interferes with the synthesis or activity of estrogens. Approved SERMs useful in the present invention include raloxifene (Evista®, Eli Lilly).

In some embodiments, one or more other therapeutic agent is an inhibitor of bone resorption. An approved therapeutic which inhibits bone resorption is Denosumab (Xgeva®, Amgen), an antibody that binds to RANKL, prevents binding to its receptor RANK, found on the surface of osteoclasts, their precursors, and osteoclast-like giant cells, which mediates bone pathology in solid tumors with osseous metastases. Other approved therapeutics that inhibit bone resorption include bisphosphonates, such as zoledronic acid (Zometa®, Novartis).

In some embodiments, one or more other therapeutic agent is an inhibitor of interaction between the two primary p53 suppressor proteins, MDMX and MDM2. Inhibitors of p53 suppression proteins being studied which may be used in the present invention include ALRN-6924 (Alleron), a stapled peptide that equipotently binds to and disrupts the interaction of MDMX and MDM2 with p53. ALRN-6924 is currently being evaluated in clinical trials for the treatment of AML, advanced myelodysplastic syndrome (MDS) and peripheral T-cell lymphoma (PTCL) (NCT02909972; NCT02264613).

In some embodiments, one or more other therapeutic agent is an inhibitor of transforming growth factor-beta (TGF-beta or TGFß). Inhibitors of TGF-beta proteins being studied which may be used in the present invention include NIS793 (Novartis), an anti-TGF-beta antibody being tested in the clinic for treatment of various cancers, including breast, lung, hepatocellular, colorectal, pancreatic, prostate and renal cancer (NCT 02947165). In some embodiments, the inhibitor of TGF-beta proteins is fresolimumab (GC1008; Sanofi-Genzyme), which is being studied for melanoma (NCT00923169); renal cell carcinoma (NCT00356460); and non-small cell lung cancer (NCT02581787). Additionally, in some embodiments, the additional therapeutic agent is a TGF-beta trap, such as described in Connolly et al. (2012) Int'l J. Biological Sciences 8:964-978. One therapeutic compound currently in clinical trials for treatment of solid tumors is M7824 (Merck KgaA—formerly MSB0011459X), which is a bispecific, anti-PD-L1/TGFß trap compound (NCT02699515); and (NCT02517398). M7824 is comprised of a fully human IgG1 antibody against PD-L1 fused to the extracellular domain of human TGF-beta receptor II, which functions as a TGFß "trap."

In some embodiments, one or more other therapeutic agent is selected from glembatumumab vedotin-monomethyl auristatin E (MMAE) (Celldex), an anti-glycoprotein NMB (gpNMB) antibody (CR011) linked to the cytotoxic MMAE. gpNMB is a protein overexpressed by multiple tumor types associated with cancer cells' ability to metastasize.

In some embodiments, one or more other therapeutic agent is an antiproliferative compound. Such antiproliferative compounds include, but are not limited to: aromatase inhibitors; antiestrogens; topoisomerase I inhibitors; topoisomerase II inhibitors; microtubule active compounds; alkylating compounds; histone deacetylase inhibitors; compounds which induce cell differentiation processes; cyclooxygenase inhibitors; MMP inhibitors; mTOR inhibitors; antineoplastic antimetabolites; platin compounds; compounds targeting/decreasing a protein or lipid kinase activity and further anti-angiogenic compounds; compounds which target, decrease or inhibit the activity of a protein or lipid phosphatase; gonadorelin agonists; anti-androgens; methionine aminopeptidase inhibitors; matrix metalloproteinase inhibitors; bisphosphonates; biological response modifiers; antiproliferative antibodies; heparanase inhibitors; inhibitors of Ras oncogenic isoforms; telomerase inhibitors; proteasome inhibitors; compounds used in the treatment of hematologic malignancies; compounds which target, decrease or inhibit the activity of Flt-3; Hsp90 inhibitors such as 17-AAG (17-allylaminogeldanamycin, NSC330507), 17-DMAG (17-dimethylaminoethylamino-17-demethoxy-geldanamycin, NSC707545), IPI-504, CNF1010, CNF2024, CNF1010 from Conforma Therapeutics; temozolomide (Temodal®); kinesin spindle protein inhibitors, such as SB715992 or SB743921 from GlaxoSmithKline, or pentamidine/chlorpromazine from CombinatoRx; MEK inhibitors such as ARRY142886 from Array BioPharma, $AZd_6244$ from AstraZeneca, PD181461 from Pfizer and leucovorin.

The term "aromatase inhibitor" as used herein relates to a compound which inhibits estrogen production, for instance, the conversion of the substrates androstenedione and testosterone to estrone and estradiol, respectively. The term includes, but is not limited to steroids, especially atamestane, exemestane and formestane and, in particular, non-steroids, especially aminoglutethimide, roglethimide, pyridoglutethimide, trilostane, testolactone, ketoconazole, vorozole, fadrozole, anastrozole and letrozole. Exemestane is marketed under the trade name Aromasin™. Formestane is marketed under the trade name Lentaron™. Fadrozole is marketed under the trade name Afema™. Anastrozole is marketed under the trade name Arimidex™. Letrozole is marketed under the trade names Femara™ or Femar™. Aminoglutethimide is marketed under the trade name Orimeten™. A combination of the invention comprising a chemotherapeutic agent which is an aromatase inhibitor is particularly useful for the treatment of hormone receptor positive tumors, such as breast tumors.

The term "antiestrogen" as used herein relates to a compound which antagonizes the effect of estrogens at the estrogen receptor level. The term includes, but is not limited to tamoxifen, fulvestrant, raloxifene and raloxifene hydrochloride. Tamoxifen is marketed under the trade name Nolvadex™. Raloxifene hydrochloride is marketed under the trade name Evista™. Fulvestrant can be administered under the trade name Faslodex™. A combination of the invention comprising a chemotherapeutic agent which is an antiestrogen is particularly useful for the treatment of estrogen receptor positive tumors, such as breast tumors.

The term "anti-androgen" as used herein relates to any substance which is capable of inhibiting the biological effects of androgenic hormones and includes, but is not limited to, bicalutamide (Casodex™). The term "gonadorelin agonist" as used herein includes, but is not limited to abarelix, goserelin and goserelin acetate. Goserelin can be administered under the trade name Zoladex™.

The term "topoisomerase I inhibitor" as used herein includes, but is not limited to topotecan, gimatecan, irinotecan, camptothecian and its analogues, 9-nitrocamptothecin and the macromolecular camptothecin conjugate PNU-166148. Irinotecan can be administered, e.g. in the form as it is marketed, e.g. under the trademark Camptosar™. Topotecan is marketed under the trade name Hycamptin™.

The term "topoisomerase II inhibitor" as used herein includes, but is not limited to the anthracyclines such as doxorubicin (including liposomal formulation, such as Caelyx™), daunorubicin, epirubicin, idarubicin and nemorubicin, the anthraquinones mitoxantrone and losoxantrone, and the podophillotoxines etoposide and teniposide. Etoposide is marketed under the trade name Etopophos™. Teniposide is marketed under the trade name VM 26-Bristol. Doxorubicin is marketed under the trade name Acriblastin™ or Adriamycin™. Epirubicin is marketed under the trade name Farmorubicin™. Idarubicin is marketed. under the trade name Zavedos™. Mitoxantrone is marketed under the trade name Novantron.

The term "microtubule active agent" relates to microtubule stabilizing, microtubule destabilizing compounds and microtublin polymerization inhibitors including, but not limited to: taxanes, such as paclitaxel and docetaxel; vinca alkaloids, such as vinblastine or vinblastine sulfate, vincristine or vincristine sulfate, and vinorelbine; discodermolides; cochicine and epothilones and derivatives thereof. Paclitaxel is marketed under the trade name Taxol™. Docetaxel is marketed under the trade name Taxotere™. Vinblastine sulfate is marketed under the trade name Vinblastin R.P™. Vincristine sulfate is marketed under the trade name Farmistin™.

The term "alkylating agent" as used herein includes, but is not limited to, cyclophosphamide, ifosfamide, melphalan or nitrosourea (BCNU or Gliadel). Cyclophosphamide is marketed under the trade name Cyclostin™. Ifosfamide is marketed under the trade name Holoxan™.

The term "histone deacetylase inhibitors" or "HDAC inhibitors" relates to compounds which inhibit the histone deacetylase and which possess antiproliferative activity. This includes, but is not limited to, suberoylanilide hydroxamic acid (SAHA).

The term "antineoplastic antimetabolite" includes, but is not limited to, 5-fluorouracil or 5-FU, capecitabine, gemcitabine, DNA demethylating compounds, such as 5-azacytidine and decitabine, methotrexate and edatrexate, and folic acid antagonists such as pemetrexed. Capecitabine is marketed under the trade name Xeloda™. Gemcitabine is marketed under the trade name Gemzar™.

The term "platin compound" as used herein includes, but is not limited to, carboplatin, cisplatin, cisplatinum and oxaliplatin. Carboplatin can be administered, e.g., in the form as it is marketed, e.g. under the trademark Carboplat™. Oxaliplatin can be administered, e.g., in the form as it is marketed, e.g. under the trademark Eloxatin™.

The term "compounds targeting/decreasing a protein or lipid kinase activity; or a protein or lipid phosphatase activity; or further anti-angiogenic compounds" as used herein includes, but is not limited to, protein tyrosine kinase and/or serine and/or threonine kinase inhibitors or lipid kinase inhibitors, such as: a) compounds targeting, decreasing or inhibiting the activity of the platelet-derived growth factor-receptors (PDGFR), such as compounds which target, decrease or inhibit the activity of PDGFR, especially compounds which inhibit the PDGF receptor, such as an N-phenyl-2-pyrimidine-amine derivative, such as imatinib, SU101, SU6668 and GFB-111; b) compounds targeting, decreasing or inhibiting the activity of the fibroblast growth factor-receptors (FGFR); c) compounds targeting, decreasing or inhibiting the activity of the insulin-like growth factor receptor I (IGF-IR), such as compounds which target, decrease or inhibit the activity of IGF-IR, especially compounds which inhibit the kinase activity of IGF-I receptor, or antibodies that target the extracellular domain of IGF-I receptor or its growth factors; d) compounds targeting, decreasing or inhibiting the activity of the Trk receptor tyrosine kinase family, or ephrin B4 inhibitors; e) compounds targeting, decreasing or inhibiting the activity of the Axl receptor tyrosine kinase family; f) compounds targeting, decreasing or inhibiting the activity of the Ret receptor tyrosine kinase; g) compounds targeting, decreasing or inhibiting the activity of the Kit/SCFR receptor tyrosine kinase, such as imatinib; h) compounds targeting, decreasing or inhibiting the activity of the C-kit receptor tyrosine kinases, which are part of the PDGFR family, such as compounds which target, decrease or inhibit the activity of the c-Kit receptor tyrosine kinase family, especially compounds which inhibit the c-Kit receptor, such as imatinib; i) compounds targeting, decreasing or inhibiting the activity of members of the c-Abl family, their gene-fusion products (e.g. BCR-Abl kinase) and mutants, such as compounds which target decrease or inhibit the activity of c-Abl family members and their gene fusion products, such as an N-phenyl-2-pyrimidine-amine derivative, such as imatinib or nilotinib (AMN107); PD180970; AG957; NSC 680410; PD173955 from ParkeDavis; or dasatinib (BMS-354825); j) compounds targeting, decreasing or inhibiting the activity of members of the protein kinase C (PKC) and Raf family of serine/threonine kinases, members of the MEK, SRC, JAK/pan-JAK, FAK, PDK1, PKB/Akt, Ras/MAPK, PI3K, SYK, TYK2, BTK and TEC family, and/or members of the cyclin-dependent kinase family (CDK) including staurosporine derivatives, such as midostaurin; examples of further compounds include UCN-01, safingol, BAY 43-9006, Bryostatin 1, Perifosine; Ilmofosine; RO 318220 and RO 320432; GO 6976; Isis 3521; LY333531/LY379196; isochinoline compounds; FTIs; PD184352 or QAN697 (a P13K inhibitor) or AT7519 (CDK inhibitor); k) compounds targeting, decreasing or inhibiting the activity of protein-tyrosine kinase inhibitors, such as compounds which target, decrease or inhibit the activity of protein-tyrosine kinase inhibitors include imatinib mesylate (Gleevec™) or tyrphostin such as Tyrphostin A23/RG-50810; AG 99; Tyrphostin AG 213; Tyrphostin AG 1748; Tyrphostin AG 490; Tyrphostin B44; Tyrphostin B44 (+) enantiomer; Tyrphostin AG 555; AG 494; Tyrphostin AG 556, AG957 and adaphostin (4-{[(2,5-dihydroxyphenyl)methyllamino}-benzoic acid adamantyl ester; NSC 680410, adaphostin); l) compounds targeting, decreasing or inhibiting the activity of the epidermal growth factor family of receptor tyrosine kinases (EGFR1 ErbB2, ErbB3, ErbB4 as homo- or heterodimers) and their mutants, such as compounds which target, decrease or inhibit the activity of the epidermal growth factor receptor family are especially compounds, proteins or antibodies which inhibit members of the EGF receptor tyrosine kinase family, such as EGF receptor, ErbB2, ErbB3 and ErbB4 or bind to EGF or EGF related ligands, CP 358774, ZD 1839, ZM 105180; trastuzumab (Herceptin™), cetuximab (Erbitux™), Iressa, Tarceva, OSI-774, CI-1033, EKB-569, GW-2016, E1.1, E2.4, E2.5, E6.2, E6.4, E2.11, E6.3 or E7.6.3, and 7H-pyrrolo-[2,3-d]pyrimidine derivatives; m) compounds targeting, decreasing or inhibiting the activity of the c-Met receptor, such as compounds which target, decrease or inhibit the activity of c-Met, especially compounds which inhibit the kinase activity of c-Met receptor, or antibodies that target the extracellular domain of c-Met or bind to HGF, n) compounds targeting, decreasing or inhibiting the kinase activity of one or more JAK family members (JAK1/JAK2/JAK3/TYK2 and/or pan-JAK), including but not limited to PRT-062070, SB-1578, baricitinib, pacritinib, momelotinib, VX-509, AZD-1480, TG-101348, tofacitinib, and ruxolitinib; o) compounds targeting, decreasing or inhibiting the kinase activity of PI3 kinase (PI3K) including but not limited to ATU-027, SF-1126, DS-7423, PBI-05204, GSK-2126458, ZSTK-474, buparlisib, pictrelisib, PF-4691502, BYL-719, dactolisib, XL-147, XL-765, and idelalisib; and; and p) compounds targeting, decreasing or inhibiting the signaling effects of hedgehog protein (Hh) or smoothened receptor (SMO) pathways, including but not limited to cyclopamine, vismodegib, itraconazole, erismodegib, and IPI-926 (saridegib).

The term "PI3K inhibitor" as used herein includes, but is not limited to compounds having inhibitory activity against one or more enzymes in the phosphatidylinositol-3-kinase family, including, but not limited to PI3Kα, PI3Kγ, PI3Kδ, PI3Kβ, PI3K-C2α, PI3K-C2β, PI3K-C2γ, Vps34, p110-α, p110-β, p110-γ, p110-δ, p85-α, p85-β, p55-γ, p150, p101, and p87. Examples of PI3K inhibitors useful in this invention include but are not limited to ATU-027, SF-1126, DS-7423, PBI-05204, GSK-2126458, ZSTK-474, buparlisib, pictrelisib, PF-4691502, BYL-719, dactolisib, XL-147, XL-765, and idelalisib.

The term "Bcl-2 inhibitor" as used herein includes, but is not limited to compounds having inhibitory activity against B-cell lymphoma 2 protein (Bcl-2), including but not limited to ABT-199, ABT-731, ABT-737, apogossypol, Ascenta's pan-Bcl-2 inhibitors, curcumin (and analogs thereof), dual Bcl-2/Bcl-xL inhibitors (Infinity Pharmaceuticals/Novartis Pharmaceuticals), Genasense (G3139), HA14-1 (and analogs thereof; see WO 2008/118802), navitoclax (and analogs thereof, see U.S. Pat. No. 7,390,799), NH-1 (Shenayng Pharmaceutical University), obatoclax (and analogs thereof, see WO 2004/106328), S-001 (Gloria Pharmaceuticals), TW series compounds (Univ. of Michigan), and venetoclax. In some embodiments the Bcl-2 inhibitor is a small molecule therapeutic. In some embodiments the Bcl-2 inhibitor is a peptidomimetic.

The term "BTK inhibitor" as used herein includes, but is not limited to compounds having inhibitory activity against Bruton's Tyrosine Kinase (BTK), including, but not limited to AVL-292 and ibrutinib.

The term "SYK inhibitor" as used herein includes, but is not limited to compounds having inhibitory activity against spleen tyrosine kinase (SYK), including but not limited to PRT-062070, R-343, R-333, Excellair, PRT-062607, and fostamatinib.

Further examples of BTK inhibitory compounds, and conditions treatable by such compounds in combination with compounds of this invention can be found in WO 2008/039218 and WO 2011/090760, the entirety of which are incorporated herein by reference.

Further examples of SYK inhibitory compounds, and conditions treatable by such compounds in combination with compounds of this invention can be found in WO 2003/063794, WO 2005/007623, and WO 2006/078846, the entirety of which are incorporated herein by reference.

Further examples of PI3K inhibitory compounds, and conditions treatable by such compounds in combination with compounds of this invention can be found in WO 2004/019973, WO 2004/089925, WO 2007/016176, U.S. Pat. No. 8,138,347, WO 2002/088112, WO 2007/084786, WO 2007/129161, WO 2006/122806, WO 2005/113554, and WO 2007/044729 the entirety of which are incorporated herein by reference.

Further examples of JAK inhibitory compounds, and conditions treatable by such compounds in combination with compounds of this invention can be found in WO 2009/114512, WO 2008/109943, WO 2007/053452, WO 2000/142246, and WO 2007/070514, the entirety of which are incorporated herein by reference.

Further anti-angiogenic compounds include compounds having another mechanism for their activity, e.g. unrelated to protein or lipid kinase inhibition e.g. thalidomide (Thalomid™) and TNP-470.

Examples of proteasome inhibitors useful for use in combination with compounds of the invention include, but are not limited to bortezomib, disulfiram, epigallocatechin-3-gallate (EGCG), salinosporamide A, carfilzomib, ONX-0912, CEP-18770, and MLN9708.

Compounds which target, decrease or inhibit the activity of a protein or lipid phosphatase are e.g. inhibitors of phosphatase 1, phosphatase 2A, or CDC25, such as okadaic acid or a derivative thereof.

Compounds which induce cell differentiation processes include, but are not limited to, retinoic acid, α- γ- or δ-tocopherol or α- γ- or δ-tocotrienol.

The term cyclooxygenase inhibitor as used herein includes, but is not limited to, Cox-2 inhibitors, 5-alkyl substituted 2-arylaminophenylacetic acid and derivatives, such as celecoxib (Celebrex™), rofecoxib (Vioxx™), etoricoxib, valdecoxib or a 5-alkyl-2-arylaminophenylacetic acid, such as 5-methyl-2-(2'-chloro-6'-fluoroanilino)phenyl acetic acid and lumiracoxib.

The term "bisphosphonates" as used herein includes, but is not limited to, etridonic, clodronic, tiludronic, pamidronic, alendronic, ibandronic, risedronic and zoledronic acid. Etridonic acid is marketed under the trade name Didronel™. Clodronic acid is marketed under the trade name Bonefos™. Tiludronic acid is marketed under the trade name Skelid™. Pamidronic acid is marketed under the trade name Aredia™. Alendronic acid is marketed under the trade name Fosamax™, Ibandronic acid is marketed under the trade name Bondranat™. Risedronic acid is marketed under the trade name Actonel™. Zoledronic acid is marketed under the trade name Zometa™. The term "mTOR inhibitors" relates to compounds which inhibit the mammalian target of rapamycin (mTOR) and which possess antiproliferative activity such as sirolimus (Rapamune®), everolimus (Certican™), CCI-779 and ABT578.

The term "heparanase inhibitor" as used herein refers to compounds which target, decrease or inhibit heparin sulfate degradation. The term includes, but is not limited to, PI-88.

The term "biological response modifier" as used herein refers to a lymphokine or interferons.

The term "inhibitor of Ras oncogenic isoforms", such as H-Ras, K-Ras, or N-Ras, as used herein refers to compounds which target, decrease or inhibit the oncogenic activity of Ras; for example, a "farnesyl transferase inhibitor" such as L-744832, DK8G557 or R115777 (Zarnestra™). The term "telomerase inhibitor" as used herein refers to compounds which target, decrease or inhibit the activity of telomerase. Compounds which target, decrease or inhibit the activity of telomerase are especially compounds which inhibit the telomerase receptor, such as telomestatin.

The term "methionine aminopeptidase inhibitor" as used herein refers to compounds which target, decrease or inhibit the activity of methionine aminopeptidase. Compounds which target, decrease or inhibit the activity of methionine aminopeptidase include, but are not limited to, bengamide or a derivative thereof.

The term "proteasome inhibitor" as used herein refers to compounds which target, decrease or inhibit the activity of the proteasome. Compounds which target, decrease or inhibit the activity of the proteasome include, but are not limited to, Bortezomib (Velcade™) and MLN 341.

The term "matrix metalloproteinase inhibitor" or ("MMP" inhibitor) as used herein includes, but is not limited to, collagen peptidomimetic and nonpeptidomimetic inhibitors, tetracycline derivatives, e.g. hydroxamate peptidomimetic inhibitor batimastat and its orally bioavailable analogue marimastat (BB-2516), prinomastat (AG3340), metastat (NSC 683551) BMS-279251, BAY 12-9566, TAA211, MMI270B or AAJ996.

The term "compounds used in the treatment of hematologic malignancies" as used herein includes, but is not limited to, FMS-like tyrosine kinase inhibitors, which are compounds targeting, decreasing or inhibiting the activity of FMS-like tyrosine kinase receptors (Flt-3R); interferon, 1-β-D-arabinofuransylcytosine (ara-c) and bisulfan; and ALK inhibitors, which are compounds which target, decrease or inhibit anaplastic lymphoma kinase.

Compounds which target, decrease or inhibit the activity of FMS-like tyrosine kinase receptors (Flt-3R) are especially compounds, proteins or antibodies which inhibit members of the Flt-3R receptor kinase family, such as PKC412, midostaurin, a staurosporine derivative, SU11248 and MLN518.

The term "HSP90 inhibitors" as used herein includes, but is not limited to, compounds targeting, decreasing or inhibiting the intrinsic ATPase activity of HSP90; degrading, targeting, decreasing or inhibiting the HSP90 client proteins via the ubiquitin proteosome pathway. Compounds targeting, decreasing or inhibiting the intrinsic ATPase activity of HSP90 are especially compounds, proteins or antibodies which inhibit the ATPase activity of HSP90, such as 17-allylamino, 17-demethoxygeldanamycin (17AAG), a geldanamycin derivative; other geldanamycin related compounds; radicicol and HDAC inhibitors.

The term "antiproliferative antibodies" as used herein includes, but is not limited to, trastuzumab (Herceptin™), Trastuzumab-DM1, erbitux, bevacizumab (Avastin™), rituximab (Rituxan®), PRO64553 (anti-CD40) and 2C4 Antibody. By antibodies is meant intact monoclonal antibodies, polyclonal antibodies, multispecific antibodies formed from at least 2 intact antibodies, and antibody fragments so long as they exhibit the desired biological activity.

For the treatment of acute myeloid leukemia (AML), compounds of the current invention can be used in combination with standard leukemia therapies, especially in combination with therapies used for the treatment of AML. In particular, compounds of the current invention can be administered in combination with, for example, farnesyl transferase inhibitors and/or other drugs useful for the treatment of AML, such as Daunorubicin, Adriamycin, Ara-C, VP-16, Teniposide, Mitoxantrone, Idarubicin, Carboplatinum and PKC412.

Other anti-leukemic compounds include, for example, Ara-C, a pyrimidine analog, which is the 2-alpha-hydroxy ribose (arabinoside) derivative of deoxycytidine. Also included is the purine analog of hypoxanthine, 6-mercaptopurine (6-MP) and fludarabine phosphate. Compounds which target, decrease or inhibit activity of histone deacetylase (HDAC) inhibitors such as sodium butyrate and suberoylanilide hydroxamic acid (SAHA) inhibit the activity of the enzymes known as histone deacetylases. Specific HDAC inhibitors include MS275, SAHA, FK228 (formerly FR901228), Trichostatin A and compounds disclosed in U.S. Pat. No. 6,552,065 including, but not limited to, N-hydroxy-3-[4-[2-(2-methyl-1H-indol-3-yl)-ethyl]-amino]methyl] phenyl]-2E-2-propenamide, or a pharmaceutically acceptable salt thereof and N-hydroxy-3-[4-[(2-hydroxyethyl){2-(1H-indol-3-yl)ethyl]-amino]methyl]phenyl]-2E-2-propenamide, or a pharmaceutically acceptable salt thereof, especially the lactate salt. Somatostatin receptor antagonists as used herein refer to compounds which target, treat or inhibit the somatostatin receptor such as octreotide, and SOM230. Tumor cell damaging approaches refer to approaches such as ionizing radiation. The term "ionizing radiation" referred to above and hereinafter means ionizing radiation that occurs as either electromagnetic rays (such as X-rays and gamma rays) or particles (such as alpha and beta particles). Ionizing radiation is provided in, but not limited to, radiation therapy and is known in the art. See Hellman, Principles of Radiation Therapy, Cancer, in Principles and Practice of Oncology, Devita et al., Eds., 4$^{th}$ Edition, Vol. 1, pp. 248-275 (1993).

Also included are EDG binders and ribonucleotide reductase inhibitors. The term "EDG binders" as used herein refers to a class of immunosuppressants that modulates lymphocyte recirculation, such as FTY720. The term "ribonucleotide reductase inhibitors" refers to pyrimidine or purine nucleoside analogs including, but not limited to, fludarabine and/or cytosine arabinoside (ara-C), 6-thioguanine, 5-fluorouracil, cladribine, 6-mercaptopurine (especially in combination with ara-C against ALL) and/or pentostatin. Ribonucleotide reductase inhibitors are especially hydroxyurea or 2-hydroxy-1H-isoindole-1,3-dione derivatives.

Also included are in particular those compounds, proteins or monoclonal antibodies of VEGF such as: 1-(4-chloroanilino)-4-(4-pyridylmethyl) phthalazine or a pharmaceutically acceptable salt thereof, 1-(4-chloroanilino)-4-(4-pyridylmethyl) phthalazine succinate; Angiostatin™; Endostatin™; anthranilic acid amides; ZD4190; Zd$_6$474; SU5416; SU6668; bevacizumab; or anti-VEGF antibodies or anti-VEGF receptor antibodies, such as rhuMAb and RHUFab, VEGF aptamer such as Macugon; FLT-4 inhibitors, FLT-3 inhibitors, VEGFR-2 IgGI antibody, Angiozyme (RPI 4610) and Bevacizumab (Avastin™).

Photodynamic therapy as used herein refers to therapy which uses certain chemicals known as photosensitizing compounds to treat or prevent cancers. Examples of photodynamic therapy include treatment with compounds, such as Visudyne™ and porfimer sodium.

Angiostatic steroids as used herein refers to compounds which block or inhibit angiogenesis, such as, e.g., anecortave, triamcinolone, hydrocortisone, 11-α-epihydrocotisol, cortexolone, 17α-hydroxyprogesterone, corticosterone, desoxycorticosterone, testosterone, estrone and dexamethasone.

Implants containing corticosteroids refers to compounds, such as fluocinolone and dexamethasone.

Other chemotherapeutic compounds include, but are not limited to: plant alkaloids, hormonal compounds and antagonists; biological response modifiers, preferably lymphokines or interferons; antisense oligonucleotides or oligonucleotide derivatives; shRNA or siRNA; or miscellaneous compounds or compounds with other or unknown mechanism of action.

The structure of the active compounds identified by code numbers, generic or trade names may be taken from the actual edition of the standard compendium "The Merck Index" or from databases, e.g. Patents International (e.g. IMS World Publications).

Exemplary Immuno-Oncology Agents

In some embodiments, one or more other therapeutic agent is an immuno-oncology agent. As used herein, the term "an immuno-oncology agent" refers to an agent which is effective to enhance, stimulate, and/or up-regulate immune responses in a subject. In some embodiments, the administration of an immuno-oncology agent with a compound of the invention has a synergic effect in treating a cancer.

An immuno-oncology agent can be, for example, a small molecule drug, an antibody, or a biologic or small molecule. Examples of biologic immuno-oncology agents include, but are not limited to, cancer vaccines, antibodies, and cytokines. In some embodiments, an antibody is a monoclonal antibody. In some embodiments, a monoclonal antibody is humanized or human.

In some embodiments, an immuno-oncology agent is (i) an agonist of a stimulatory (including a co-stimulatory) receptor or (ii) an antagonist of an inhibitory (including a co-inhibitory) signal on T cells, both of which result in amplifying antigen-specific T cell responses.

Certain of the stimulatory and inhibitory molecules are members of the immunoglobulin super family (IgSF). One important family of membrane-bound ligands that bind to co-stimulatory or co-inhibitory receptors is the B7 family, which includes B7-1, B7-2, B7-H1 (PD-L1), B7-DC (PD-L2), B7-H2 (ICOS-L), B7-H3, B7-H4, B7-H5 (VISTA), and B7-H6. Another family of membrane bound ligands that bind to co-stimulatory or co-inhibitory receptors is the TNF family of molecules that bind to cognate TNF receptor family members, which includes CD40 and CD40L, OX-40, OX-40L, CD70, CD27L, CD30, CD30L, 4-1BBL, CD137 (4-1BB), TRAIL/Apo2-L, TRAILR1/DR4, TRAILR2/DR5, TRAILR3, TRAILR4, OPG, RANK, RANKL, TWEAKR/Fn14, TWEAK, BAFFR, EDAR, XEDAR, TACI, APRIL, BCMA, LTBR, LIGHT, DCR3, HVEM, VEGI/TL1A, TRAMP/DR3, EDAR, EDA1, XEDAR, EDA2, TNFR1, Lymphotoxin α/TNFβ, TNFR2, TNFα, LTβR, Lymphotoxin α1β2, FAS, FASL, RELT, DR6, TROY and NGFR.

In some embodiments, an immuno-oncology agent is a cytokine that inhibits T cell activation (e.g., IL-6, IL-10, TGF-β, VEGF, and other immunosuppressive cytokines) or a cytokine that stimulates T cell activation, for stimulating an immune response.

In some embodiments, a combination of a compound of the invention and an immuno-oncology agent can stimulate T cell responses. In some embodiments, an immuno-oncology agent is: (I) an antagonist of a protein that inhibits T cell activation (e.g., immune checkpoint inhibitors) such as CTLA-4, PD-1, PD-L1, PD-L2, LAG-3, TIM-3, Galectin 9, CEACAM-1, BTLA, CD69, Galectin-1, TIGIT, CD113, GPR56, VISTA, 2B4, CD48, GARP, PD1H, LAIR1, TIM-1, and TIM-4; or (ii) an agonist of a protein that stimulates T cell activation such as B7-1, B7-2, CD28, 4-1BB (CD137), 4-1BBL, ICOS, ICOS-L, OX40, OX40L, GITR, GITRL, CD70, CD27, CD40, DR3 and CD28H.

In some embodiments, an immuno-oncology agent is an antagonist of inhibitory receptors on NK cells or an agonist of activating receptors on NK cells. In some embodiments, an immuno-oncology agent is an antagonist of KIR, such as lirilumab.

In some embodiments, an immuno-oncology agent is an agent that inhibits or depletes macrophages or monocytes, including but not limited to CSF-1R antagonists such as CSF-1R antagonist antibodies including RG7155 (WO 2011/70024, WO 2011/107553, WO 2011/131407, WO 2013/87699, WO 2013/119716, WO 2013/132044) or FPA-008 (WO 2011/140249; WO 2013/169264; WO 2014/036357).

In some embodiments, an immuno-oncology agent is selected from agonistic agents that ligate positive costimulatory receptors, blocking agents that attenuate signaling through inhibitory receptors, antagonists, and one or more agents that increase systemically the frequency of anti-tumor T cells, agents that overcome distinct immune suppressive pathways within the tumor microenvironment (e.g., block inhibitory receptor engagement (e.g., PD-L1/PD-1 interactions), deplete or inhibit Tregs (e.g., using an anti-CD25 monoclonal antibody (e.g., daclizumab) or by ex vivo anti-CD25 bead depletion), inhibit metabolic enzymes such as IDO, or reverse/prevent T cell energy or exhaustion) and agents that trigger innate immune activation and/or inflammation at tumor sites.

In some embodiments, an immuno-oncology agent is a CTLA-4 antagonist. In some embodiments, a CTLA-4 antagonist is an antagonistic CTLA-4 antibody. In some embodiments, an antagonistic CTLA-4 antibody is YERVOY (ipilimumab) or tremelimumab.

In some embodiments, an immuno-oncology agent is a PD-1 antagonist. In some embodiments, a PD-1 antagonist is administered by infusion. In some embodiments, an immuno-oncology agent is an antibody or an antigen-binding portion thereof that binds specifically to a Programmed Death-1 (PD-1) receptor and inhibits PD-1 activity. In some embodiments, a PD-1 antagonist is an antagonistic PD-1 antibody. In some embodiments, an antagonistic PD-1 antibody is OPDIVO (nivolumab), KEYTRUDA (pembrolizumab), or MEDI-0680 (AMP-514; WO 2012/145493). In some embodiments, an immuno-oncology agent may be pidilizumab (CT-011). In some embodiments, an immuno-oncology agent is a recombinant protein composed of the extracellular domain of PD-L2 (B7-DC) fused to the Fc portion of IgG1, called AMP-224.

In some embodiments, an immuno-oncology agent is a PD-L1 antagonist. In some embodiments, a PD-L1 antagonist is an antagonistic PD-L1 antibody. In some embodiments, a PD-L1 antibody is MPDL3280A (RG7446; WO 2010/077634), durvalumab (MEDI4736), BMS-936559 (WO 2007/005874), and MSB0010718C (WO 2013/79174).

In some embodiments, an immuno-oncology agent is a LAG-3 antagonist. In some embodiments, a LAG-3 antagonist is an antagonistic LAG-3 antibody. In some embodiments, a LAG3 antibody is BMS-986016 (WO 2010/19570, WO 2014/08218), or IMP-731 or IMP-321 (WO 2008/132601, WO 2009/44273).

In some embodiments, an immuno-oncology agent is a CD137 (4-1BB) agonist. In some embodiments, a CD137

(4-1BB) agonist is an agonistic CD137 antibody. In some embodiments, a CD137 antibody is urelumab or PF-05082566 (WO 2012/32433).

In some embodiments, an immuno-oncology agent is a GITR agonist. In some embodiments, a GITR agonist is an agonistic GITR antibody. In some embodiments, a GITR antibody is BMS-986153, BMS-986156, TRX-518 (WO 2006/105021, WO 2009/009116), or MK-4166 (WO 2011/028683).

In some embodiments, an immuno-oncology agent is an indoleamine (2,3)-dioxygenase (IDO) antagonist. In some embodiments, an IDO antagonist is selected from: epacadostat (INCB024360, Incyte); indoximod (NLG-8189, New-Link Genetics Corporation); capmanitib (INC280, Novartis); GDC-0919 (Genentech/Roche); PF-06840003 (Pfizer); BMS: F001287 (Bristol-Myers Squibb); Phy906/KD108 (Phytoceutica); an enzyme that breaks down kynurenine (Kynase, Kyn Therapeutics); and NLG-919 (WO 2009/73620, WO 2009/1156652, WO 2011/56652, WO 2012/142237).

In some embodiments, an immuno-oncology agent is an OX40 agonist. In some embodiments, an OX40 agonist is an agonistic OX40 antibody. In some embodiments, an OX40 antibody is MEDI-6383 or MEDI-6469.

In some embodiments, an immuno-oncology agent is an OX40L antagonist. In some embodiments, an OX40L antagonist is an antagonistic OX40 antibody. In some embodiments, an OX40L antagonist is RG-7888 (WO 2006/029879).

In some embodiments, an immuno-oncology agent is a CD40 agonist. In some embodiments, a CD40 agonist is an agonistic CD40 antibody. In some embodiments, an immuno-oncology agent is a CD40 antagonist. In some embodiments, a CD40 antagonist is an antagonistic CD40 antibody. In some embodiments, a CD40 antibody is lucatumumab or dacetuzumab.

In some embodiments, an immuno-oncology agent is a CD27 agonist. In some embodiments, a CD27 agonist is an agonistic CD27 antibody. In some embodiments, a CD27 antibody is varlilumab.

In some embodiments, an immuno-oncology agent is MGA271 (to B7H3) (WO 2011/109400).

In some embodiments, an immuno-oncology agent is abagovomab, adecatumumab, afutuzumab, alemtuzumab, anatumomab mafenatox, apolizumab, atezolimab, avelumab, blinatumomab, BMS-936559, catumaxomab, durvalumab, epacadostat, epratuzumab, indoximod, inotuzumab ozogamicin, intelumumab, ipilimumab, isatuximab, lambrolizumab, MED14736, MPDL3280A, nivolumab, obinutuzumab, ocaratuzumab, ofatumumab, olatatumab, pembrolizumab, pidilizumab, rituximab, ticilimumab, samalizumab, or tremelimumab.

In some embodiments, an immuno-oncology agent is an immunostimulatory agent. For example, antibodies blocking the PD-1 and PD-L1 inhibitory axis can unleash activated tumor-reactive T cells and have been shown in clinical trials to induce durable anti-tumor responses in increasing numbers of tumor histologies, including some tumor types that conventionally have not been considered immunotherapy sensitive. See, e.g., Okazaki, T. et al. (2013) Nat. Immunol. 14, 1212-1218; Zou et al. (2016) Sci. Transl. Med. 8. The anti-PD-1 antibody nivolumab (Opdivo®, Bristol-Myers Squibb, also known as ONO-4538, $MDX_{1106}$ and BMS-936558), has shown potential to improve the overall survival in patients with renal clear cell carcinoma (RCC) who had experienced disease progression during or after prior anti-angiogenic therapy.

In some embodiments, the immunomodulatory therapeutic specifically induces apoptosis of tumor cells. Approved immunomodulatory therapeutics which may be used in the present invention include: pomalidomide (Pomalyst®, Celgene); lenalidomide (Revlimid®, Celgene); ingenol mebutate (Picato®, LEO Pharma).

In some embodiments, an immuno-oncology agent is a cancer vaccine. In some embodiments, the cancer vaccine is selected from: sipuleucel-T (Provenge®, Dendreon/Valeant Pharmaceuticals), which has been approved for treatment of asymptomatic, or minimally symptomatic metastatic castrate-resistant (hormone-refractory) prostate cancer; and talimogene laherparepvec (Imlygic®, BioVex/Amgen, previously known as T-VEC), a genetically modified oncolytic viral therapy approved for treatment of unresectable cutaneous, subcutaneous and nodal lesions in melanoma. In some embodiments, an immuno-oncology agent is selected from an oncolytic viral therapy such as pexastimogene devacirepvec (PexaVec/JX-594, SillaJen/formerly Jennerex Biotherapeutics), a thymidine kinase-(TK-) deficient vaccinia virus engineered to express GM-CSF, for hepatocellular carcinoma (NCT02562755) and melanoma (NCT00429312); pelareorep (Reolysin®, Oncolytics Biotech), a variant of respiratory enteric orphan virus (reovirus) which does not replicate in cells that are not RAS-activated, in numerous cancers, including colorectal cancer (NCT01622543); prostate cancer (NCT01619813); head and neck squamous cell cancer (NCT01166542); pancreatic adenocarcinoma (NCT00998322); and non-small cell lung cancer (NSCLC) (NCT 00861627); enadenotucirev (NG-348, PsiOxus, formerly known as ColoAd1), an adenovirus engineered to express a full length CD80 and an antibody fragment specific for the T-cell receptor CD3 protein, in ovarian cancer (NCT02028117); metastatic or advanced epithelial tumors such as in colorectal cancer, bladder cancer, head and neck squamous cell carcinoma and salivary gland cancer (NCT02636036); ONCOS-102 (Targovax/formerly Oncos), an adenovirus engineered to express GM-CSF, in melanoma (NCT03003676); and peritoneal disease, colorectal cancer or ovarian cancer (NCT02963831); GL-ONC1 (GLV-1h68/GLV-1h153, Genelux GmbH), vaccinia viruses engineered to express beta-galactosidase (beta-gal)/beta-glucoronidase or beta-gal/human sodium iodide symporter (hNIS), respectively, were studied in peritoneal carcinomatosis (NCT01443260); fallopian tube cancer, ovarian cancer (NCT 02759588); or CG0070 (Cold Genesys), an adenovirus engineered to express GM-CSF, in bladder cancer (NCT02365818).

In some embodiments, an immuno-oncology agent is selected from: JX-929 (SillaJen/formerly Jennerex Biotherapeutics), a TK- and vaccinia growth factor-deficient vaccinia virus engineered to express cytosine deaminase, which is able to convert the prodrug 5-fluorocytosine to the cytotoxic drug 5-fluorouracil; TG01 and TG02 (Targovax/formerly Oncos), peptide-based immunotherapy agents targeted for difficult-to-treat RAS mutations; and TILT-123 (TILT Biotherapeutics), an engineered adenovirus designated: Ad5/3-E2F-delta24-hTNFα-IRES-hIL20; and VSV-GP (ViraTherapeutics) a vesicular stomatitis virus (VSV) engineered to express the glycoprotein (GP) of lymphocytic choriomeningitis virus (LCMV), which can be further engineered to express antigens designed to raise an antigen-specific $CD8^+$ T cell response.

In some embodiments, an immuno-oncology agent is a T-cell engineered to express a chimeric antigen receptor, or CAR. The T-cells engineered to express such chimeric antigen receptor are referred to as CAR-T cells.

CARs have been constructed that consist of binding domains, which may be derived from natural ligands, single chain variable fragments (scFv) derived from monoclonal antibodies specific for cell-surface antigens, fused to endodomains that are the functional end of the T-cell receptor (TCR), such as the CD3-zeta signaling domain from TCRs, which is capable of generating an activation signal in T lymphocytes. Upon antigen binding, such CARs link to endogenous signaling pathways in the effector cell and generate activating signals similar to those initiated by the TCR complex.

For example, in some embodiments the CAR-T cell is one of those described in U.S. Pat. No. 8,906,682 (hereby incorporated by reference in its entirety), which discloses CAR-T cells engineered to comprise an extracellular domain having an antigen binding domain (such as a domain that binds to CD19), fused to an intracellular signaling domain of the T cell antigen receptor complex zeta chain (such as CD3 zeta). When expressed in the T cell, the CAR is able to redirect antigen recognition based on the antigen binding specificity. In the case of CD19, the antigen is expressed on malignant B cells. Over 200 clinical trials are currently in progress employing CAR-T in a wide range of indications. [clinicaltrials.gov/ct2/results?term=chimeric+antigen+receptors&pg=1].

In some embodiments, an immunostimulatory agent is an activator of retinoic acid receptor-related orphan receptor γ (RORγt). RORγt is a transcription factor with key roles in the differentiation and maintenance of Type 17 effector subsets of CD4+ (Th17) and CD8+ (Tc17) T cells, as well as the differentiation of IL-17 expressing innate immune cell subpopulations such as NK cells. In some embodiments, an activator of RORγt is LYC-55716 (Lycera), which is currently being evaluated in clinical trials for the treatment of solid tumors (NCT02929862).

In some embodiments, an immunostimulatory agent is an agonist or activator of a toll-like receptor (TLR). Suitable activators of TLRs include an agonist or activator of TLR9 such as SD-101 (Dynavax). SD-101 is an immunostimulatory CpG which is being studied for B-cell, follicular and other lymphomas (NCT02254772). Agonists or activators of TLR8 which may be used in the present invention include motolimod (VTX-2337, VentiRx Pharmaceuticals) which is being studied for squamous cell cancer of the head and neck (NCT02124850) and ovarian cancer (NCT02431559).

Other immuno-oncology agents that may be used in the present invention include: urelumab (BMS-663513, Bristol-Myers Squibb), an anti-CD137 monoclonal antibody; varlilumab (CDX-1127, Celldex Therapeutics), an anti-CD27 monoclonal antibody; BMS-986178 (Bristol-Myers Squibb), an anti-OX40 monoclonal antibody; lirilumab (IPH2102/BMS-986015, Innate Pharma, Bristol-Myers Squibb), an anti-KIR monoclonal antibody; monalizumab (IPH2201, Innate Pharma, AstraZeneca) an anti-NKG2A monoclonal antibody; andecaliximab (GS-5745, Gilead Sciences), an anti-MMP9 antibody; and MK-4166 (Merck & Co.), an anti-GITR monoclonal antibody.

In some embodiments, an immunostimulatory agent is selected from elotuzumab, mifamurtide, an agonist or activator of a toll-like receptor, and an activator of RORγt.

In some embodiments, an immunostimulatory therapeutic is recombinant human interleukin 15 (rhIL-15). rhIL-15 has been tested in the clinic as a therapy for melanoma and renal cell carcinoma (NCT01021059 and NCT01369888) and leukemias (NCT02689453). In some embodiments, an immunostimulatory agent is recombinant human interleukin 12 (rhIL-12). In some embodiments, an IL-15 based immunotherapeutic is heterodimeric IL-15 (hetIL-15, Novartis/Admune), a fusion complex composed of a synthetic form of endogenous IL-15 complexed to the soluble IL-15 binding protein IL-15 receptor alpha chain (IL15:sIL-15RA), which has been tested in Phase 1 clinical trials for melanoma, renal cell carcinoma, non-small cell lung cancer and head and neck squamous cell carcinoma (NCT02452268). In some embodiments, a recombinant human interleukin 12 (rhIL-12) is NM-IL-12 (Neumedicines, Inc.), NCT02544724, or NCT02542124.

In some embodiments, an immuno-oncology agent is selected from those described in Jerry L. Adams et al., "Big opportunities for small molecules in immuno-oncology," Cancer Therapy 2015, Vol. 14, pages 603-622, the content of which is incorporated herein by reference in its entirety. In some embodimetne, an immuno-oncology agent is selected from the examples described in Table 1 of Jerry L. Adams et al. In some embodiments, an immuno-oncology agent is a small molecule targeting an immuno-oncoloby target selected from those listed in Table 2 of Jerry L. Adams et al. In some embodiments, an immuno-oncology agent is a small molecule agent selected from those listed in Table 2 of Jerry L. Adams et al.

In some embodiments, an immuno-oncology agent is selected from the small molecule immuno-oncology agents described in Peter L. Toogood, "Small molecule immuno-oncology therapeutic agents," Bioorganic & Medicinal Chemistry Letters 2018, Vol. 28, pages 319-329, the content of which is incorporated herein by reference in its entirety. In some embodiments, an immuno-oncology agent is an agent targeting the pathways as described in Peter L. Toogood.

In some embodiments, an immuno-oncology agent is selected from those described in Sandra L. Ross et al., "Bispecific T cell engager (BITE®) antibody constructs can mediate bystander tumor cell killing", PLOS ONE 12(8): e0183390, the content of which is incorporated herein by reference in its entirety. In some embodiments, an immuno-oncology agent is a bispecific T cell engager (BITER) antibody construct. In some embodiments, a bispecific T cell engager (BITE®) antibody construct is a CD19/CD3 bispecific antibody construct. In some embodiments, a bispecific T cell engager (BITE®) antibody construct is an EGFR/CD3 bispecific antibody construct. In some embodiments, a bispecific T cell engager (BITE®) antibody construct activates T cells. In some embodiments, a bispecific T cell engager (BITE®) antibody construct activates T cells, which release cytokines inducing upregulation of intercellular adhesion molecule 1 (ICAM-1) and FAS on bystander cells. In some embodiments, a bispecific T cell engager (BITER) antibody construct activates T cells which result in induced bystander cell lysis. In some embodiments, the bystander cells are in solid tumors. In some embodiments, the bystander cells being lysed are in proximity to the BITE®-acticvated T cells. In some embodiment, the bystander cells comprises tumor-associated antigen (TAA) negatgive cancer cells. In some embodiment, the bystander cells comprise EGFR-negative cancer cells. In some embodiments, an immuno-oncology agent is an antibody which blocks the PD-L1/PD1 axis and/or CTLA4. In some embodiments, an immuno-oncology agent is an ex vivo expanded tumor-infiltrating T cell. In some embodiments, an immuno-oncology agent is a bispecific antibody construct or chimeric antigen receptors (CARs) that directly connect T cells with tumor-associated surface antigens (TAAs).

Exemplary Immune Checkpoint Inhibitors

In some embodiments, an immuno-oncology agent is an immune checkpoint inhibitor as described herein.

The term "checkpoint inhibitor" as used herein relates to agents useful in preventing cancer cells from avoiding the immune system of the patient. One of the major mechanisms of anti-tumor immunity subversion is known as "T-cell exhaustion," which results from chronic exposure to antigens that has led to up-regulation of inhibitory receptors. These inhibitory receptors serve as immune checkpoints in order to prevent uncontrolled immune reactions.

PD-1 and co-inhibitory receptors such as cytotoxic T-lymphocyte antigen 4 (CTLA-4, B and T Lymphocyte Attenuator (BTLA; CD272), T cell Immunoglobulin and Mucin domain-3 (Tim-3), Lymphocyte Activation Gene-3 (Lag-3; CD223), and others are often referred to as checkpoint regulators. They act as molecular "gatekeepers" that allow extracellular information to dictate whether cell cycle progression and other intracellular signaling processes should proceed.

In some embodiments, an immune checkpoint inhibitor is an antibody to PD-1. PD-1 binds to the programmed cell death 1 receptor (PD-1) to prevent the receptor from binding to the inhibitory ligand PDL-1, thus overriding the ability of tumors to suppress the host anti-tumor immune response.

In one aspect, the checkpoint inhibitor is a biologic therapeutic or a small molecule. In another aspect, the checkpoint inhibitor is a monoclonal antibody, a humanized antibody, a fully human antibody, a fusion protein or a combination thereof. In a further aspect, the checkpoint inhibitor inhibits a checkpoint protein selected from CTLA-4, PDLI, PDL2, PDI, B7-H3, B7-H4, BTLA, HVEM, TIM3, GAL9, LAG3, VISTA, KIR, 2B4, CD160, CGEN-15049, CHK 1, CHK2, A2aR, B-7 family ligands or a combination thereof. In an additional aspect, the checkpoint inhibitor interacts with a ligand of a checkpoint protein selected from CTLA-4, PDLI, PDL2, PDI, B7-H3, B7-H4, BTLA, HVEM, TIM3, GAL9, LAG3, VISTA, KIR, 2B4, CD160, CGEN-15049, CHK 1, CHK2, A2aR, B-7 family ligands or a combination thereof. In an aspect, the checkpoint inhibitor is an immunostimulatory agent, a T cell growth factor, an interleukin, an antibody, a vaccine or a combination thereof. In a further aspect, the interleukin is IL-7 or IL-15. In a specific aspect, the interleukin is glycosylated IL-7. In an additional aspect, the vaccine is a dendritic cell (DC) vaccine.

Checkpoint inhibitors include any agent that blocks or inhibits in a statistically significant manner, the inhibitory pathways of the immune system. Such inhibitors may include small molecule inhibitors or may include antibodies, or antigen binding fragments thereof, that bind to and block or inhibit immune checkpoint receptors or antibodies that bind to and block or inhibit immune checkpoint receptor ligands. Illustrative checkpoint molecules that may be targeted for blocking or inhibition include, but are not limited to, CTLA-4, PDL1, PDL2, PD1, B7-H3, B7-H4, BTLA, HVEM, GAL9, LAG3, TIM3, VISTA, KIR, 2B4 (belongs to the CD2 family of molecules and is expressed on all NK, γδ, and memory CD8+ (αβ) T cells), CD160 (also referred to as BY55), CGEN-15049, CHK 1 and CHK2 kinases, A2aR, and various B-7 family ligands. B7 family ligands include, but are not limited to, B7-1, B7-2, B7-DC, B7-H1, B7-H2, B7-H3, B7-H4, B7-H5, B7-H6 and B7-H7. Checkpoint inhibitors include antibodies, or antigen binding fragments thereof, other binding proteins, biologic therapeutics, or small molecules, that bind to and block or inhibit the activity of one or more of CTLA-4, PDL1, PDL2, PD1, BTLA, HVEM, TIM3, GAL9, LAG3, VISTA, KIR, 2B4, CD 160 and CGEN-15049. Illustrative immune checkpoint inhibitors include Tremelimumab (CTLA-4 blocking antibody), anti-OX40, PD-LI monoclonal Antibody (Anti-B7-HI; MEDI4736), MK-3475 (PD-1 blocker), Nivolumab (anti-PDI antibody), CT-011 (anti-PDI antibody), BY55 monoclonal antibody, AMP224 (anti-PDLI antibody), BMS-936559 (anti-PDLI antibody), MPLDL3280A (anti-PDLI antibody), MSB0010718C (anti-PDLI antibody), and ipilimumab (anti-CTLA-4 checkpoint inhibitor). Checkpoint protein ligands include, but are not limited to PD-LI, PD-L2, B7-H3, B7-H4, CD28, CD86 and TIM-3.

In certain embodiments, the immune checkpoint inhibitor is selected from a PD-1 antagonist, a PD-L1 antagonist, and a CTLA-4 antagonist. In some embodiments, the checkpoint inhibitor is selected from the group consisting of nivolumab (Opdivo®), ipilimumab (Yervoy®), and pembrolizumab (Keytruda®). In some embodiments, the checkpoint inhibitor is selected from: nivolumab (anti-PD-1 antibody, Opdivo®, Bristol-Myers Squibb); pembrolizumab (anti-PD-1 antibody, KeytrudaQ, Merck); ipilimumab (anti-CTLA-4 antibody, Yervoy®, Bristol-Myers Squibb); durvalumab (anti-PD-L1 antibody, Imfinzi®), AstraZeneca); and atezolizumab (anti-PD-L1 antibody, Tecentriq®, Genentech).

In some embodiments, the checkpoint inhibitor is selected from the group consisting of lambrolizumab (MK-3475), nivolumab (BMS-936558), pidilizumab (CT-011), AMP-224, MDX-1105, MEDI4736, MPDL3280A, BMS-936559, ipilimumab, lirlumab, IPH2101, pembrolizumab (Keytruda®), and tremelimumab.

In some embodiments, an immune checkpoint inhibitor is: REGN2810 (Regeneron), an anti-PD-1 antibody tested in patients with basal cell carcinoma (NCT03132636); NSCLC (NCT03088540); cutaneous squamous cell carcinoma (NCT02760498); lymphoma (NCT02651662); and melanoma (NCT03002376); pidilizumab (CureTech), also known as CT-011, an antibody that binds to PD-1, in clinical trials for diffuse large B-cell lymphoma and multiple myeloma; avelumab (Bavencio®, Pfizer/Merck KGaA), also known as MSB0010718C), a fully human IgG1 anti-PD-L1 antibody, in clinical trials for non-small cell lung cancer, Merkel cell carcinoma, mesothelioma, solid tumors, renal cancer, ovarian cancer, bladder cancer, head and neck cancer, and gastric cancer; or PDR001 (Novartis), an inhibitory antibody that binds to PD-1, in clinical trials for non-small cell lung cancer, melanoma, triple negative breast cancer and advanced or metastatic solid tumors. Tremelimumab (CP-675,206; Astrazeneca) is a fully human monoclonal antibody against CTLA-4 that has been studied in clinical trials for a number of indications, including: mesothelioma, colorectal cancer, kidney cancer, breast cancer, lung cancer and non-small cell lung cancer, pancreatic ductal adenocarcinoma, pancreatic cancer, germ cell cancer, squamous cell cancer of the head and neck, hepatocellular carcinoma, prostate cancer, endometrial cancer, metastatic cancer in the liver, liver cancer, large B-cell lymphoma, ovarian cancer, cervical cancer, metastatic anaplastic thyroid cancer, urothellal cancer, fallopian tube cancer, multiple myeloma, bladder cancer, soft tissue sarcoma, and melanoma. AGEN-1884 (Agenus) is an anti-CTLA4 antibody that is being studied in Phase 1 clinical trials for advanced solid tumors (NCT02694822).

In some embodiments, a checkpoint inhibitor is an inhibitor of T-cell immunoglobulin mucin containing protein-3 (TIM-3). TIM-3 inhibitors that may be used in the present invention include TSR-022, LY3321367 and MBG453.

TSR-022 (Tesaro) is an anti-TIM-3 antibody which is being studied in solid tumors (NCT02817633). LY3321367 (Eli Lilly) is an anti-TIM-3 antibody which is being studied in solid tumors (NCT03099109). MBG453 (Novartis) is an anti-TIM-3 antibody which is being studied in advanced malignancies (NCT02608268).

In some embodiments, a checkpoint inhibitor is an inhibitor of T cell immunoreceptor with Ig and ITIM domains, or TIGIT, an immune receptor on certain T cells and NK cells. TIGIT inhibitors that may be used in the present invention include BMS-986207 (Bristol-Myers Squibb), an anti-TIGIT monoclonal antibody (NCT02913313); OMP-313M32 (Oncomed); and anti-TIGIT monoclonal antibody (NCT03119428).

In some embodiments, a checkpoint inhibitor is an inhibitor of Lymphocyte Activation Gene-3 (LAG-3). LAG-3 inhibitors that may be used in the present invention include BMS-986016 and REGN3767 and IMP321. BMS-986016 (Bristol-Myers Squibb), an anti-LAG-3 antibody, is being studied in glioblastoma and gliosarcoma (NCT02658981). REGN3767 (Regeneron), is also an anti-LAG-3 antibody, and is being studied in malignancies (NCT03005782). IMP321 (Immutep S.A.) is an LAG-3-Ig fusion protein, being studied in: melanoma (NCT02676869); adenocarcinoma (NCT02614833); and metastatic breast cancer (NCT00349934).

Checkpoint inhibitors that may be used in the present invention include OX40 agonists. OX40 agonists that are being studied in clinical trials include: PF-04518600/PF-8600 (Pfizer), an agonistic anti-OX40 antibody, in metastatic kidney cancer (NCT03092856) and advanced cancers and neoplasms (NCT02554812; NCT05082566); GSK3174998 (Merck), an agonistic anti-OX40 antibody, in Phase 1 cancer trials (NCT02528357); MEDI0562 (Medimmune/AstraZeneca), an agonistic anti-OX40 antibody, in advanced solid tumors (NCT02318394 and NCT02705482); MEDI6469, an agonistic anti-OX40 antibody (Medimmune/AstraZeneca), in patients with colorectal cancer (NCT02559024), breast cancer (NCT01862900), head and neck cancer (NCT02274155) and metastatic prostate cancer (NCT01303705); and BMS-986178 (Bristol-Myers Squibb) an agonistic anti-OX40 antibody, in advanced cancers (NCT02737475).

Checkpoint inhibitors that may be used in the present invention include CD137 (also called 4-1BB) agonists. CD137 agonists that are being studied in clinical trials include: utomilumab (PF-05082566, Pfizer) an agonistic anti-CD137 antibody, in diffuse large B-cell lymphoma (NCT02951156) and in advanced cancers and neoplasms (NCT02554812 and NCT05082566); urelumab (BMS-663513, Bristol-Myers Squibb), an agonistic anti-CD137 antibody, in melanoma and skin cancer (NCT02652455) and glioblastoma and gliosarcoma (NCT02658981).

Checkpoint inhibitors that may be used in the present invention include CD27 agonists. CD27 agonists that are being studied in clinical trials include: varlilumab (CDX-1127, Celldex Therapeutics) an agonistic anti-CD27 antibody, in squamous cell head and neck cancer, ovarian carcinoma, colorectal cancer, renal cell cancer, and glioblastoma (NCT02335918); lymphomas (NCT01460134); and glioma and astrocytoma (NCT02924038).

Checkpoint inhibitors that may be used in the present invention include glucocorticoid-induced tumor necrosis factor receptor (GITR) agonists. GITR agonists that are being studied in clinical trials include: TRX518 (Leap Therapeutics), an agonistic anti-GITR antibody, in malignant melanoma and other malignant solid tumors (NCT01239134 and NCT02628574); GWN323 (Novartis), an agonistic anti-GITR antibody, in solid tumors and lymphoma (NCT02740270); INCAGN01876 (Incyte/Agenus), an agonistic anti-GITR antibody, in advanced cancers (NCT02697591 and NCT03126110); MK-4166 (Merck), an agonistic anti-GITR antibody, in solid tumors (NCT02132754) and MEDI1873 (Medimmune/AstraZeneca), an agonistic hexameric GITR-ligand molecule with a human IgG1 Fc domain, in advanced solid tumors (NCT02583165).

Checkpoint inhibitors that may be used in the present invention include inducible T-cell co-stimulator (ICOS, also known as CD278) agonists. ICOS agonists that are being studied in clinical trials include: MEDI-570 (Medimmune), an agonistic anti-ICOS antibody, in lymphomas (NCT02520791); GSK3359609 (Merck), an agonistic anti-ICOS antibody, in Phase 1 (NCT02723955); and JTX-2011 (Jounce Therapeutics), an agonistic anti-ICOS antibody, in Phase 1 (NCT02904226).

Checkpoint inhibitors that may be used in the present invention include killer IgG-like receptor (KIR) inhibitors. KIR inhibitors that are being studied in clinical trials include: lirilumab (IPH2102/BMS-986015, Innate Pharma/Bristol-Myers Squibb), an anti-KIR antibody, in leukemias (NCT01687387, NCT02399917, NCT02481297, NCT02599649), multiple myeloma (NCT02252263), and lymphoma (NCT01592370); IPH2101 (1-7F9, Innate Pharma) in myeloma (NCT01222286 and NCT01217203); and IPH4102 (Innate Pharma), an anti-KIR antibody that binds to three domains of the long cytoplasmic tail (KIR3DL2), in lymphoma (NCT02593045).

Checkpoint inhibitors that may be used in the present invention include CD47 inhibitors of interaction between CD47 and signal regulatory protein alpha (SIRPa). CD47/SIRPa inhibitors that are being studied in clinical trials include: ALX-148 (Alexo Therapeutics), an antagonistic variant of (SIRPa) that binds to CD47 and prevents CD47/SIRPa-mediated signaling, in phase 1 (NCT03013218); TTI-621 (SIRPa-Fc, Trillium Therapeutics), a soluble recombinant fusion protein created by linking the N-terminal CD47-binding domain of SIRPa with the Fc domain of human IgG1, acts by binding human CD47, and preventing it from delivering its "do not eat" signal to macrophages, is in clinical trials in Phase 1 (NCT02890368 and NCT02663518); CC-90002 (Celgene), an anti-CD47 antibody, in leukemias (NCT02641002); and Hu5F9-G4 (Forty Seven, Inc.), in colorectal neoplasms and solid tumors (NCT02953782), acute myeloid leukemia (NCT02678338) and lymphoma (NCT02953509).

Checkpoint inhibitors that may be used in the present invention include CD73 inhibitors. CD73 inhibitors that are being studied in clinical trials include: MEDI9447 (Medimmune), an anti-CD73 antibody, in solid tumors (NCT02503774); and BMS-986179 (Bristol-Myers Squibb), an anti-CD73 antibody, in solid tumors (NCT02754141).

Checkpoint inhibitors that may be used in the present invention include agonists of stimulator of interferon genes protein (STING, also known as transmembrane protein 173, or TMEM 173). Agonists of STING that are being studied in clinical trials include: MK-1454 (Merck), an agonistic synthetic cyclic dinucleotide, in lymphoma (NCT03010176); and ADU-S100 (MIW815, Aduro Biotech/Novartis), an agonistic synthetic cyclic dinucleotide, in Phase 1 (NCT02675439 and NCT03172936).

Checkpoint inhibitors that may be used in the present invention include CSF1R inhibitors. CSF1R inhibitors that are being studied in clinical trials include: pexidartinib (PLX3397, Plexxikon), a CSF1R small molecule inhibitor, in colorectal cancer, pancreatic cancer, metastatic and advanced cancers (NCT02777710) and melanoma, non-small cell lung cancer, squamous cell head and neck cancer, gastrointestinal stromal tumor (GIST) and ovarian cancer (NCT02452424); and IMC-CS4 (LY3022855, Lilly), an anti-CSF-1R antibody, in pancreatic cancer (NCT03153410), melanoma (NCT03101254), and solid tumors (NCT02718911); and BLZ945 (4-[2 ((1R,2R)-2-hydroxycyclohexylamino)-benzothiazol-6-yloxyl]-pyridine-2-carboxylic acid methylamide, Novartis), an orally available inhibitor of CSF1R, in advanced solid tumors (NCT02829723).

Checkpoint inhibitors that may be used in the present invention include NKG2A receptor inhibitors. NKG2A receptor inhibitors that are being studied in clinical trials include monalizumab (IPH2201, Innate Pharma), an anti-NKG2A antibody, in head and neck neoplasms (NCT02643550) and chronic lymphocytic leukemia (NCT02557516).

In some embodiments, the immune checkpoint inhibitor is selected from nivolumab, pembrolizumab, ipilimumab, avelumab, durvalumab, atezolizumab, or pidilizumab.

Therapeutic Uses

The bicyclic peptides of the invention have specific utility as Nectin-4 binding agents.

Nectin-4 is a surface molecule that belongs to the nectin family of proteins, which comprises 4 members. Nectins are cell adhesion molecules that play a key role in various biological processes such as polarity, proliferation, differentiation and migration, for epithelial, endothelial, immune and neuronal cells, during development and adult life. They are involved in several pathological processes in humans. They are the main receptors for poliovirus, herpes simplex virus and measles virus. Mutations in the genes encoding Nectin-1 (PVRL1) or Nectin-4 (PVRL4) cause ectodermal dysplasia syndromes associated with other abnormalities. Nectin-4 is expressed during foetal development. In adult tissues its expression is more restricted than that of other members of the family. Nectin-4 is a tumour-associated antigen in 50%, 49% and 86% of breast, ovarian and lung carcinomas, respectively, mostly on tumours of bad prognosis. Its expression is not detected in the corresponding normal tissues. In breast tumours, Nectin-4 is expressed mainly in triple-negative and ERBB2+ carcinomas. In the serum of patients with these cancers, the detection of soluble forms of Nectin-4 is associated with a poor prognosis. Levels of serum Nectin-4 increase during metastatic progression and decrease after treatment. These results suggest that Nectin-4 could be a reliable target for the treatment of cancer. Accordingly, several anti-Nectin-4 antibodies have been described in the prior art. In particular, Enfortumab Vedotin (ASG-22ME) is an antibody-drug conjugate (ADC) targeting Nectin-4 and is currently clinically investigated for the treatment of patients suffering from solid tumours.

Polypeptide ligands selected according to the method of the present invention may be employed in in vivo therapeutic and prophylactic applications, in vitro and in vivo diagnostic applications, in vitro assay and reagent applications, and the like. Ligands having selected levels of specificity are useful in applications which involve testing in non-human animals, where cross-reactivity is desirable, or in diagnostic applications, where cross-reactivity with homologues or paralogues needs to be carefully controlled. In some applications, such as vaccine applications, the ability to elicit an immune response to predetermined ranges of antigens can be exploited to tailor a vaccine to specific diseases and pathogens.

Substantially pure peptide ligands of at least 90 to 95% homogeneity are preferred for administration to a mammal, and 98 to 99% or more homogeneity is most preferred for pharmaceutical uses, especially when the mammal is a human. Once purified, partially or to homogeneity as desired, the selected polypeptides may be used diagnostically or therapeutically (including extracorporeally) or in developing and performing assay procedures, immunofluorescent stainings and the like (Lefkovite and Pernis, (1979 and 1981) Immunological Methods, Volumes I and II, Academic Press, NY).

According to a further aspect of the invention, there is provided a peptide ligand or a drug conjugate as defined herein, for use in preventing, suppressing or treating a disease or disorder mediated by Nectin-4.

According to a further aspect of the invention, there is provided a method of preventing, suppressing or treating a disease or disorder mediated by Nectin-4, which comprises administering to a patient in need thereof an effector group and drug conjugate of the peptide ligand as defined herein.

In one embodiment, the Nectin-4 is mammalian Nectin-4. In a further embodiment, the mammalian Nectin-4 is human Nectin-4.

In one embodiment, the disease or disorder mediated by Nectin-4 is selected from viral infections, ectodermal dysplasia syndromes and other abnormalities, breast, ovarian and lung carcinomas, metastatic progression, and solid tumours.

In a further embodiment, the disease or disorder mediated by Nectin-4 is selected from cancer.

Examples of cancers (and their benign counterparts) which may be treated (or inhibited) include, but are not limited to tumours of epithelial origin (adenomas and carcinomas of various types including adenocarcinomas, squamous carcinomas, transitional cell carcinomas and other carcinomas) such as carcinomas of the bladder and urinary tract, breast, gastrointestinal tract (including the esophagus, stomach (gastric), small intestine, colon, rectum and anus), liver (hepatocellular carcinoma), gall bladder and biliary system, exocrine pancreas, kidney, lung (for example adenocarcinomas, small cell lung carcinomas, non-small cell lung carcinomas, bronchioalveolar carcinomas and mesotheliomas), head and neck (for example cancers of the tongue, buccal cavity, larynx, pharynx, nasopharynx, tonsil, salivary glands, nasal cavity and paranasal sinuses), ovary, fallopian tubes, peritoneum, vagina, vulva, penis, cervix, myometrium, endometrium, thyroid (for example thyroid follicular carcinoma), adrenal, prostate, skin and adnexae (for example melanoma, basal cell carcinoma, squamous cell carcinoma, keratoacanthoma, dysplastic naevus); haematological malignancies (i.e. leukemias, lymphomas) and pre-malignant haematological disorders and disorders of borderline malignancy including haematological malignancies and related conditions of lymphoid lineage (for example acute lymphocytic leukemia [ALL], chronic lymphocytic leukemia [CLL], B-cell lymphomas such as diffuse large B-cell lymphoma [DLBCL], follicular lymphoma, Burkitt's lymphoma, mantle cell lymphoma, T-cell lymphomas and leukaemias, natural killer [NK] cell lymphomas, Hodgkin's lymphomas, hairy cell leukaemia, monoclonal gammopathy of uncertain significance, plasmacytoma, multiple myeloma, and post-transplant lymphoproliferative disorders), and haematological malignancies and related conditions of myeloid lineage (for example acute myelogenousleukemia [AML], chronic myelogenousleukemia [CML], chronic myelomonocyticleukemia [CMML], hypereosinophilic syndrome, myeloproliferative disorders such as polycythaemia vera, essential thrombocythaemia and primary myelofibrosis, myeloproliferative syndrome, myelodysplastic syndrome, and promyelocyticleukemia); tumours of mesenchymal origin, for example sarcomas of soft tissue, bone or cartilage such as osteosarcomas, fibrosarcomas, chondrosarcomas, rhabdomyosarcomas, leiomyosarcomas, liposarcomas, angiosarcomas, Kaposi's sarcoma, Ewing's sarcoma, synovial sarcomas, epithelioid sarcomas, gastrointestinal stromal tumours, benign and malignant histiocytomas, and dermatofibrosarcomaprotuberans; tumours of the central or peripheral nervous system (for example astrocytomas, gliomas and glioblastomas, meningiomas, ependymomas, pineal tumours and schwannomas); endocrine tumours (for example pituitary tumours, adrenal tumours, islet cell tumours, parathyroid tumours, carcinoid tumours and medullary carcinoma of the thyroid); ocular and adnexal tumours (for example retinoblastoma); germ cell and trophoblastic tumours (for example teratomas, seminomas, dysgerminomas, hydatidiform moles and choriocarcinomas); and paediatric and embryonal tumours (for example medulloblastoma, neuroblastoma, Wilms tumour, and primitive neuroectodermal tumours); or syndromes, congenital or otherwise, which leave the patient susceptible to malignancy (for example Xeroderma Pigmentosum).

In a further embodiment, the cancer is selected from a hematopoietic malignancy such as selected from: non-Hodgkin's lymphoma (NHL), Burkitt's lymphoma (BL), multiple myeloma (MM), B chronic lymphocytic leukemia (B-CLL), B and T acute lymphocytic leukemia (ALL), T cell lymphoma (TCL), acute myeloid leukemia (AML), hairy cell leukemia (HCL), Hodgkin's Lymphoma (HL), and chronic myeloid leukemia (CML).

In a yet further embodiment, the cancer is selected from lung cancer (e.g. non-small cell lung cancer), bladder cancer, pancreatic cancer and breast cancer. Data is presented herein in Examples 1 to 5 which demonstrates that selected bicyclic drug conjugates of the invention exhibited anti-tumour activity in these cancer models.

References herein to the term "prevention" involves administration of the protective composition prior to the induction of the disease. "Suppression" refers to administration of the composition after an inductive event, but prior to the clinical appearance of the disease. "Treatment" involves administration of the protective composition after disease symptoms become manifest.

Animal model systems which can be used to screen the effectiveness of the peptide ligands in protecting against or treating the disease are available. The use of animal model systems is facilitated by the present invention, which allows the development of polypeptide ligands which can cross react with human and animal targets, to allow the use of animal models.

Furthermore, data is presented herein which demonstrates an association between copy number variation (CNV) and gene expression for Nectin-4 from multiple tumor types. Thus, according to a further aspect of the invention, there is provided a method of preventing, suppressing or treating cancer, which comprises administering to a patient in need thereof an effector group and drug conjugate of the peptide ligand as defined herein, wherein said patient is identified as having an increased copy number variation (CNV) of Nectin-4.

In one embodiment, the cancer is selected from those identified herein as having increased CNV of Nectin-4. In a further embodiment, the cancer is selected from those identified herein as having increased CNV of Nectin-4, namely: breast, uterine, bladder, lung adenocarcinoma, lung squamous, cervical, head and neck, pancreatic, thyroid, colorectal, thymoma, sarcoma, renal clear cell carcinoma (RCC), prostate and stomach.

The invention is further described below with reference to the following examples.

EXAMPLES

| Abbreviations | |
|---|---|
| 1,2,4-TriAz | 3-(1,2,4-Triazol-1-yl)-alanine |
| 1Nal | 1-Naphthylalanine |
| 2FuAla | 2-Furylalanine |
| 2MePhe | 2-Methyl-Phenylalanine |
| 2Nal | 2-Naphthylalanine |
| 2Pal | 2-Pyridylalanine |
| 3,3-DPA | 3,3-Diphenylalanine |
| 3MePhe | 3-Methyl-Phenylalanine |
| 3Pal | 3-Pyridylalanine |
| 4,4-BPA | 4,4-Biphenylalanine |
| 4,4-DFP | 4,4-Difluoroproline |
| 4MePhe | 4-Methyl-Phenylalanine |
| 4Pal | 4-Pyridylalanine |
| 4ThiAz | Beta-(4-Thiazolyl)-Alanine |
| 5FTrp | 5-Fluoro-L-tryptophan |
| Agb | 2-Amino-4-guanidinobutyric acid |
| Aib | Aminoisobutyric acid |
| AzaTrp | Azatryptophan |
| Aze | Azetidine |
| C5A | Cyclopentyl glycine |
| Cha | 3-Cyclohexyl-alanine |
| Cpa | Cyclopropylalanine |
| Cya | Cysteic acid |
| DOPA | 3,4-Dihydroxy-phenylalanine |
| HArg | HomoArginine |
| HGln | HomoGlutamine |
| Hleu | HomeLeucine |
| Hphe | HomoPhenylalanine |
| Hse(me) | Homoserine(Me) |
| HSer | HomoSerine |
| HyP | Hydroxyproline |
| Lys(Ac) | Lysine(Acetyl) |
| Met(O2) | Methionine sulfone |
| Nle | Norleucine |
| Oic | Octahydroindolecarboxylic acid |
| Oxa | Oxazolidine-4-carboxylic acid |
| pCoPhe | para-Carboxy-Phenylalanine |
| PheOPhe | 4-Phenoxy-phenylalanine |
| Phg | Phenylglycine |
| Pip | Pipecolic acid |
| Pro(4NH) | 4-Amino-Proline |
| tBuAla | t-Butyl-Alanine |
| TetraZ | Tetrazole Alanine |
| Thi | Thienyl-alanine |
| THP(O) | Tetrahydropyran-4-propanoic acid |
| THP(SO2) | Dioxo-4-tetrahydrothiopyranylacetic acid |
| Trp(Me) | Methyl Trptophan |

Materials and Methods

Peptide Synthesis

Peptide synthesis was based on Fmoc chemistry, using a Symphony peptide synthesiser manufactured by Peptide Instruments and a Syro II synthesiser by MultiSynTech. Standard Fmoc-amino acids were employed (Sigma, Merck), with appropriate side chain protecting groups: where applicable standard coupling conditions were used in each case, followed by deprotection using standard methodology.

Alternatively, peptides were purified using HPLC and following isolation they were modified with 1,3,5-Triacryloylhexahydro-1,3,5-triazine (TATA, Sigma). For this, linear peptide was diluted with 50:50 MeCN:$H_2O$ up to ~35 mL, ~500 μL of 100 mM TATA in acetonitrile was added, and the reaction was initiated with 5 mL of 1 M $NH_4HCO_3$ in $H_2O$. The reaction was allowed to proceed for ~30-60 min at RT, and lyophilised once the reaction had completed (judged by MALDI). Once completed, 1 ml of 1M L-cysteine hydrochloride monohydrate (Sigma) in $H_2O$ was added to the reaction for ~60 min at RT to quench any excess TATA. Following lyophilisation, the modified peptide was purified as above, while replacing the Luna C8 with a Gemini C18 column (Phenomenex), and changing the acid to 0.1% trifluoroacetic acid. Pure fractions containing the correct TATA-modified material were pooled, lyophilised and kept at −20° C. for storage.

All amino acids, unless noted otherwise, were used in the L-configurations.

In some cases peptides are converted to activated disulfides prior to coupling with the free thiol group of a toxin using the following method; a solution of 4-methyl(succinimidyl 4-(2-pyridylthio)pentanoate) (100 mM) in dry DMSO (1.25 mol equiv) was added to a solution of peptide (20 mM) in dry DMSO (1 mol equiv). The reaction was well mixed and DIPEA (20 mol equiv) was added. The reaction was monitored by LC/MS until complete.

Preparation of Bicyclic Peptide Drug Conjugates

Preparation of BCY7826

Separation Condition: A phase: 0.075% TFA in $H_2O$, B phase: MeCN

Separation method: 18-48-55 min, RT=53.5 min

Separation column: Luna 200*25 mm 10 μm, C18, 110A and Gemin150*30 mm, C18, 5 μm, 110A, connection, 50° C.

Dissolve method: DMF.

Separation purity: 95%

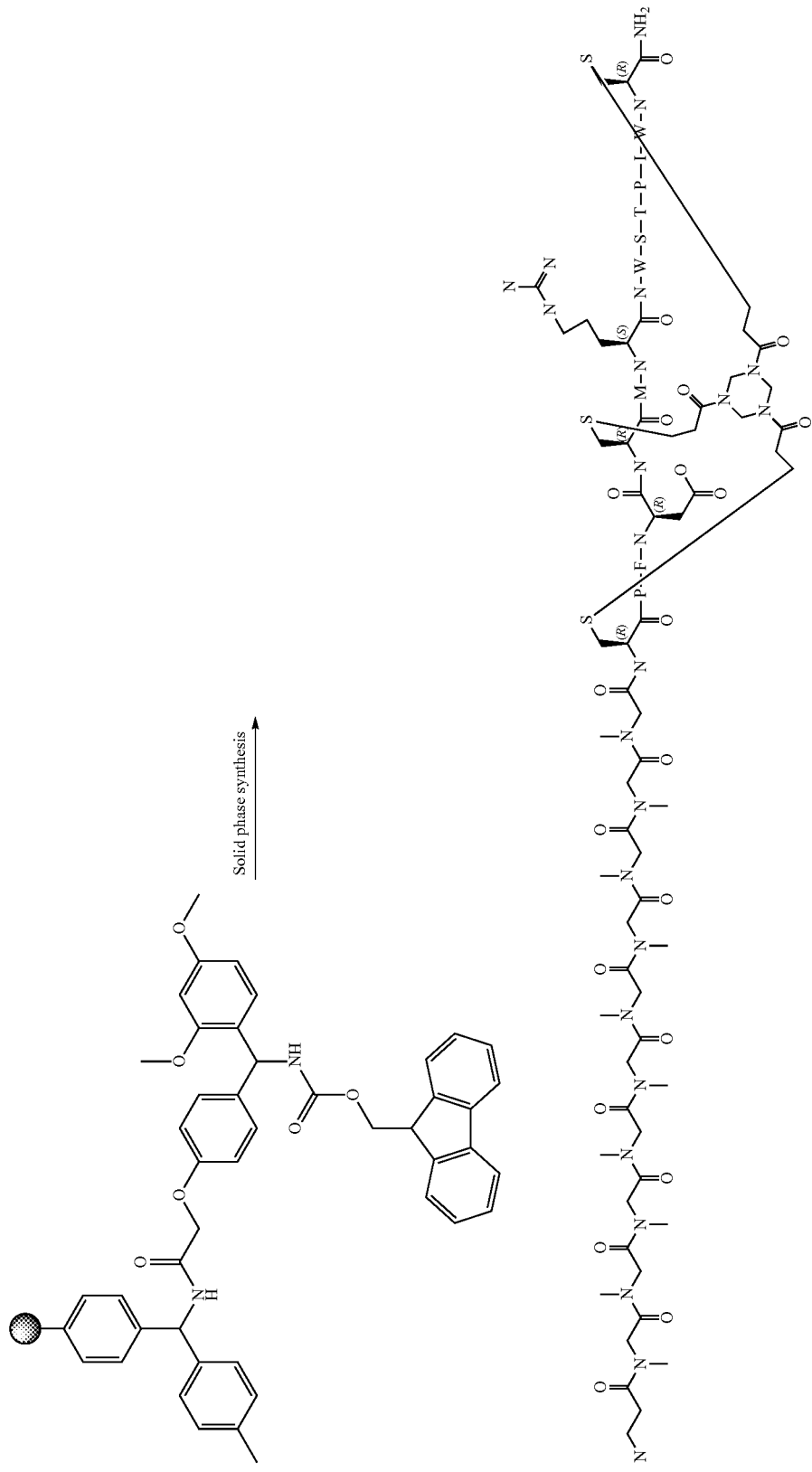

The peptide was synthesized by solid phase synthesis. 1.11 g Rink Amide MBHA Resin (sub: 0.45 mmol/g) was used. To a mixture containing Rink Amide MBHA (0.5 mmol, 1.11 g, 0.45 mmol/g) and Fmoc-Cys (Trt)-OH (0.87 g, 1.5 mmol, 3.0 eq) was added DMF (20 mL), then DIC (3.0 eq) and HOAt (3.0 eq) were added and mixed for 1 h. 20% piperidine in DMF was used for deblocking. And other amino acids were coupled with 3.0 eq using activator reagents, DIC (3.0 eq) and HOAt (3.0 eq) in DMF (20 mL). The reaction was monitored by ninhydrin color reaction or tetrachlor color reaction. After synthesis completion, the peptide resin was washed with DMF×3, MeOH×3, and then dried under Na bubbling overnight. After that the peptide resin was treated with 92.5% TFA/2.5% TIS/2.5% EDT/2.5% $H_2O$ for 3 h. The peptide was precipitated with cold isopropyl ether (200 mL) and centrifuged (3 min at 3000 rpm). Isopropyl ether wash two additional times (200 mL). Dry the crude peptide under vacuum 2 h. Crude peptide is used (i.e. after peptide cleavage and isopropyl ether precipitation, the precipitate is lyophilised to remove residual isopropyl ether and TFA), dissolve the lyophilised powder (0.5 mmol) in 500 ml of $ACN/H_2O$ (50:50), and add 5 mL of 100 mM TATA. Add 10 mL of ammonium bicarbonate in $H_2O$ (1 M) and mix for 1 h. Once the cyclisation is complete, the reaction must be quenched with 10.0 eq of Cysteine over TATA. Add at least 5 mL of the 1 M Cysteine to the solution, mix and leave to stand for an hour. The solution was lyophilised to get crude product. The crude peptide was purified by prep-HPLC and lyophilized to give the product BCY7814 (144.1 mg, 97.1% purity; 9.6% yield) as white a solid.

| (HPLC analysis condition) Instrument - Agilent 1200 HPLC-BE(1-614) | |
|---|---|
| Gradient | 20-50-20 + 3 MIN |
| Column | Gemini-NX C18 5 um 110 A 150*4.6 mm |
| Mobile Phase | A: $H_2O$ (0.1% TFA) |
| | B: $CH_3CN$ |
| Flow Rate | 1 mL/Min |
| Wavelength | 220/254 nm |
| Oven Tem. | 30° C. |

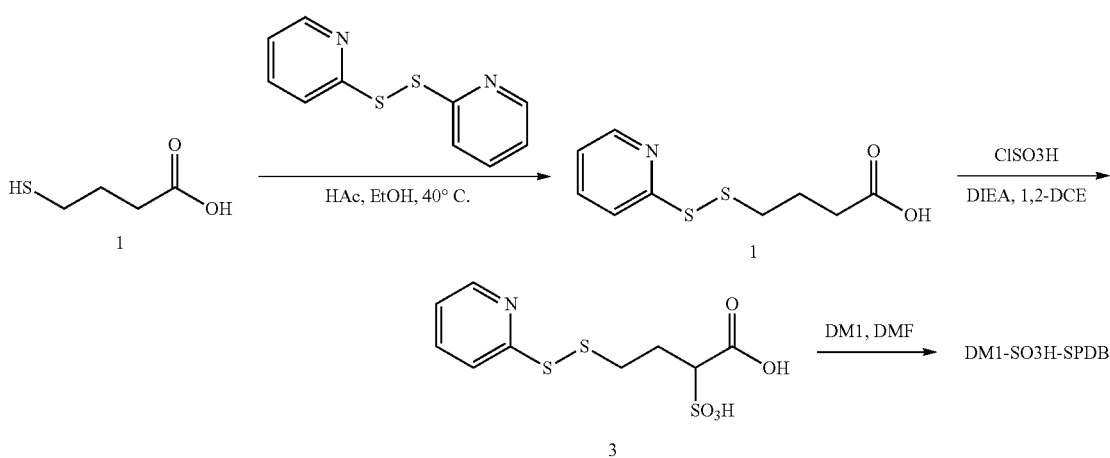

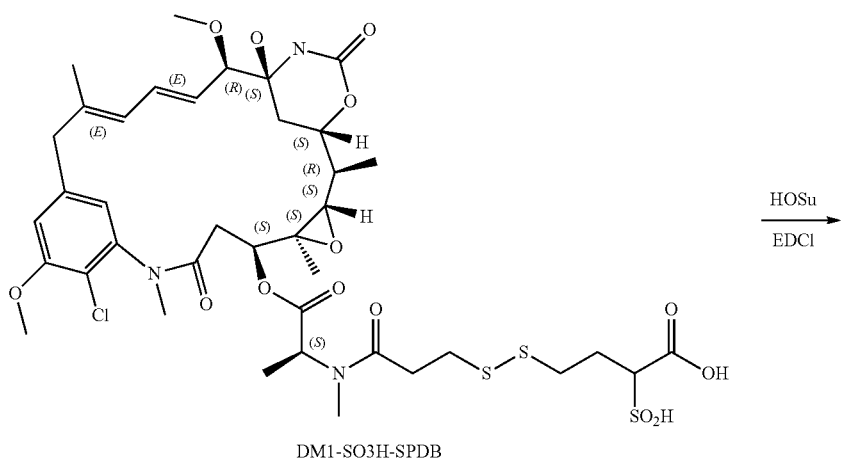

DM1-SO3H-SPDB

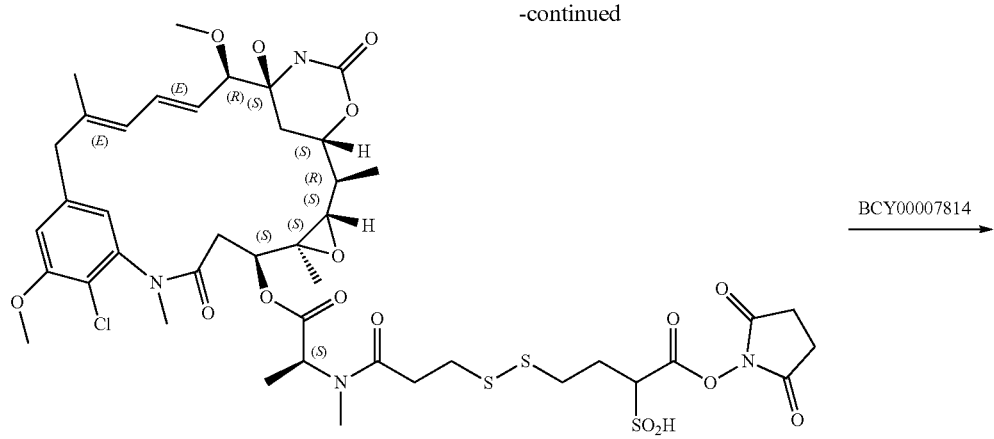

DM1-SO3H-SPDB-NHS

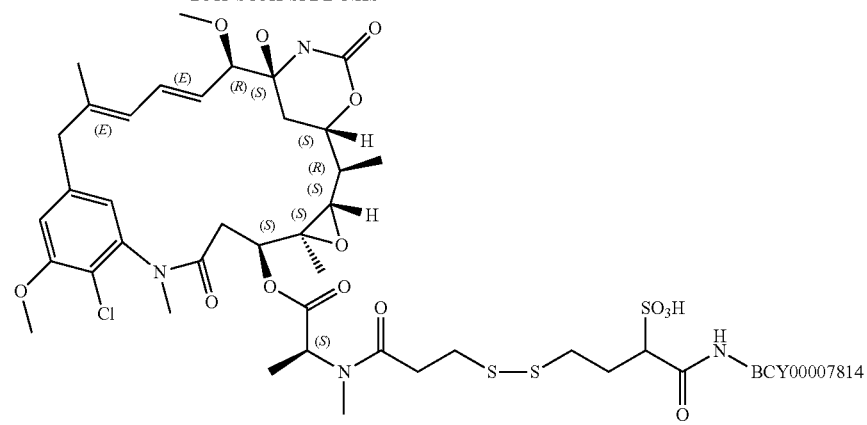

BCY00007826

To a solution of BCY7814 (61.80 mg, 21.29 µmol, 1.1 eq) in DMA (4 mL) was added DIEA (7.50 mg, 58.05 µmol, 10.11 µL, 3.0 eq) and DM1-SO3H-SPDB-NHS. The mixture was stirred at 25° C. for 16 hr. LC-MS showed DM1-SO3H-SPDB-NHS was consumed completely and one main peak with desired m/z was detected. The reaction was directly purified by prep-HPLC (TFA condition). Compound BCY7826 (0.0242 g, 6.31 µmol, 32.63% yield, 99.7% purity) was obtained as a white solid. Retention time=13.99 min, Mass found=1254.1 (M/3+1)

Preparation of BCY8549
  Separation Condition: A phase: 0.075% TFA in $H_2O$, B phase: MeCN
  Separation method: 18-48-55 min, RT=53.5 min
  Separation column: Luna 200*25 mm 10 µm, C18, 110A and Gemin150*30 mm, C18, 5 µm, 110A, connection, 50° C.
  Dissolve method: DMF.
  Separation purity: 95%
  BCY8234 was synthesized by solid phase synthesis.

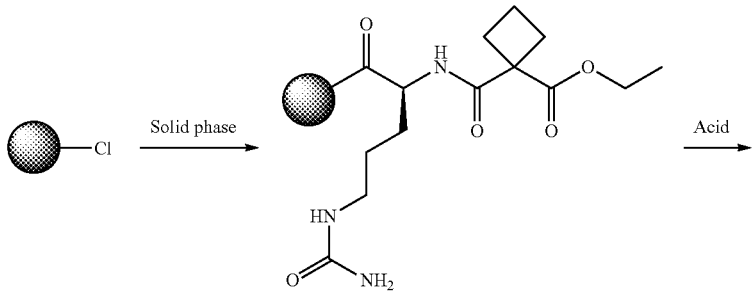

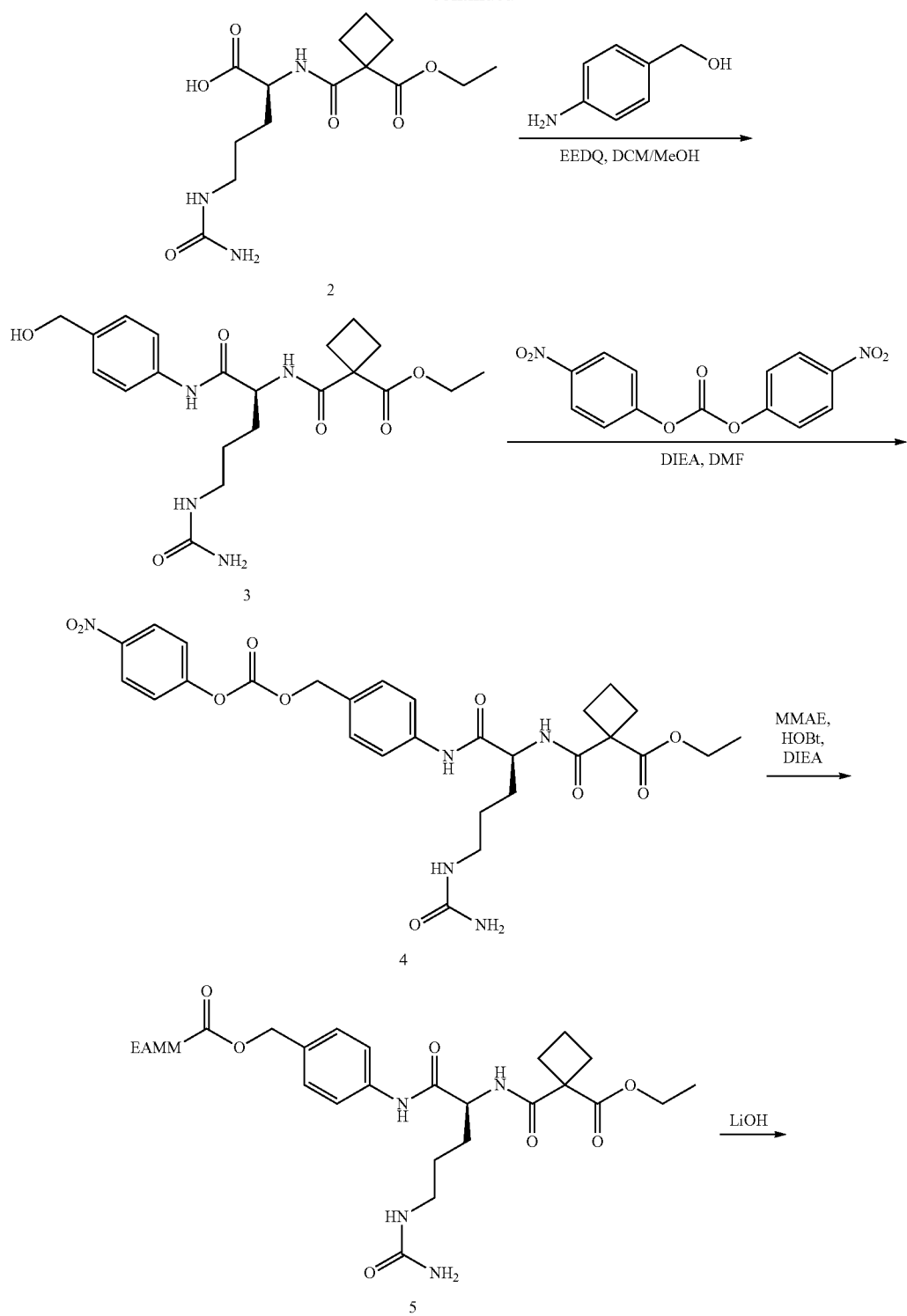

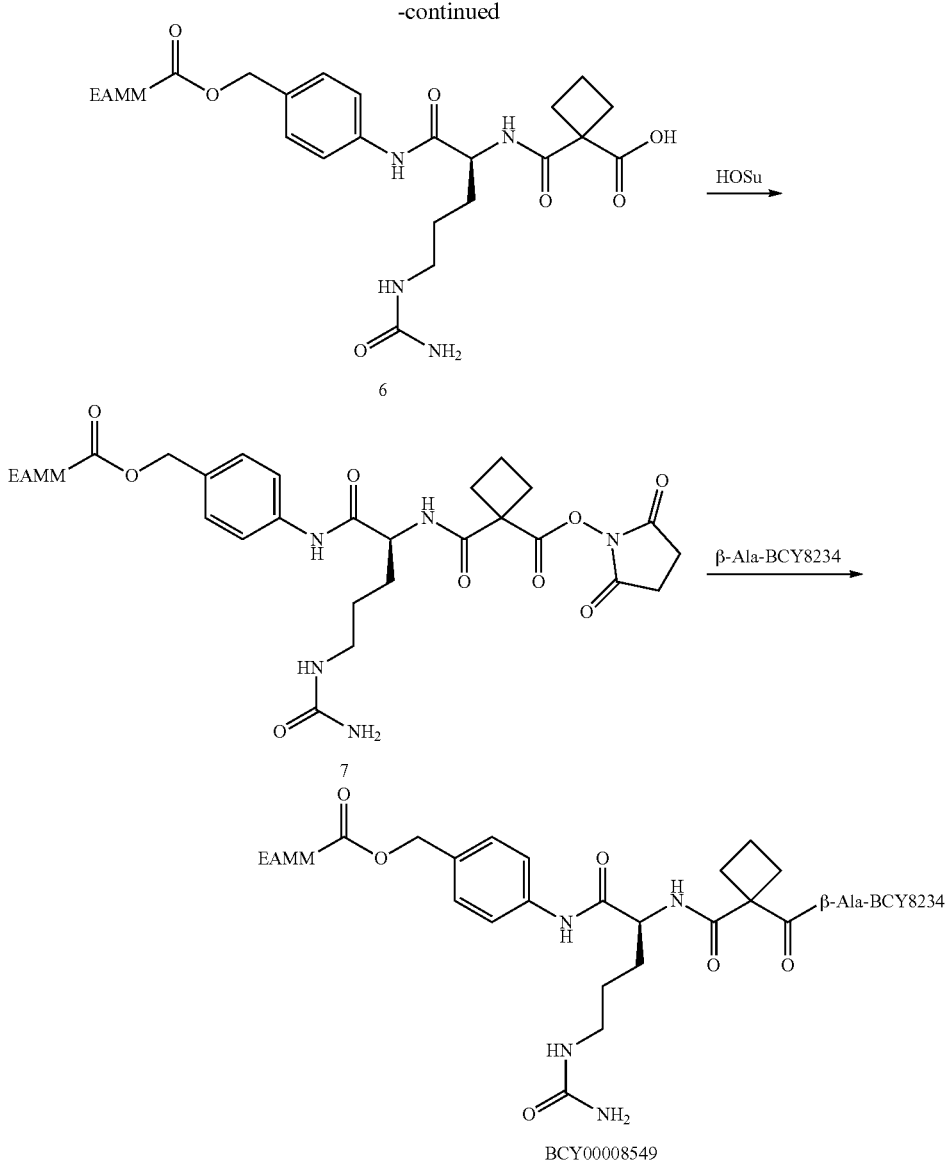

Preparation of Compound 2

The peptide was synthesized using standard Fmoc chemistry.

1) Add DCM to the vessel containing CTC Resin (5 mmol, 4.3 g, 1.17 mmol/g) and Fmoc-Cit-OH (2.0 g, 5 mmol, 1.0 eq) with $N_2$ bubbling.
2) Add DIEA (4.0 eq) dropwise and mix for 2 hours.
3) Add MeOH (5 mL) and mix for 30 min.
4) Drain and wash with DMF for 5 times.
5) Add 20% piperidine/DMF and react on 30 min.
6) Drain and wash with DMF for 5 times.
7) Add Fmoc-amino acid solution and mix 30 seconds, then add activation buffer, $N_2$ bubbling for about 1 hour.
8) Repeat above step 4 to 7 for the coupling of following amino acids.

Note:

| # | Materials | Coupling reagents |
|---|---|---|
| 1 | Fmoc-Cit-OH (1.0 eq) | DIEA(4.0 eq) |
| 2 | 1-ethoxycarbonyl-cyclobutanecarboxylic acid (3.0 eq) | HATU(2.85 eq) and DIEA(6.0 eq) |

20% piperidine in DMF was used for Fmoc deprotection for 30 min. The coupling reaction was monitored by ninhydrin test, and the resin was washed with DMF for 5 times.

Peptide Cleavage and Purification:

1) Add cleavage buffer (20% TFIP/80% DCM) to the flask containing the side chain protected peptide at room temperature and stir for 1 hour twice.
2) Filter and collect the filtrate.
3) Concentrate to remove the solvent.
4) The crude peptide was lyophilized to give the final product (1.4 g, 85.0% yield).

Preparation of Compound 3

To a solution of compound 2 (1.65 g, 5.01 mmol, 1.0 eq) in DCM (30 mL) and MeOH (15 mL) was added EEDQ (2.48 g, 10.02 mmol, 2.0 eq) and (4-aminophenyl) methanol (740.37 mg, 6.01 mmol, 1.2 eq). The mixture was stirred at 15° C. for 16 hr. LC-MS showed compound 2 was consumed completely and one main peak with desired m/z was detected. TLC indicated compound 2 was consumed completely and many new spots formed. The reaction mixture was concentrated under reduced pressure to remove solvent to give a residue. The residue was purified by flash silica gel chromatography (ISCO®; 80 SepaFlash® Silica Flash Column, Eluent of 0~15 DCM/MeOH gradient @ 60 mL/min). Compound 3 (1.3 g, 2.99 mmol, 59.72% yield) was obtained as a yellow solid.

Preparation of Compound 4

To a solution of compound 3 (1.3 g, 2.99 mmol, 1.0 eq) in DMF (10 mL) was added DIEA (2.32 g, 17.95 mmol, 3.13 mL, 6.0 eq) and bis(4-nitrophenyl) carbonate (3.64 g, 11.97 mmol, 4.0 eq). The mixture was stirred at 15° C. for 1 hr. LC-MS showed compound 3 was consumed completely and one main peak with desired m/z was detected. The residue was purified by prep-HPLC (neutral condition). Compound 4 (1.0 g, 1.67 mmol, 55.74% yield) was obtained as a yellow solid.

Preparation of Compound 5

To a solution of compound 5 (250.53 mg, 417.84 µmol, 1.5 eq) in DMF (5 mL) was added HOBt (56.46 mg, 417.84 µmol, 1.5 eq) and DIEA (108.01 mg, 835.68 µmol, 145.56 µL, 3.0 eq), MMAE (0.200 g, 278.56 µmol, 1.0 eq) The mixture was stirred at 35° C. for 12 hr. LC-MS showed MMAE was consumed completely and one main peak with desired m/z was detected. The reaction was directly purified by prep-HPLC (neutral condition). Compound 5 (0.180 g, 152.74 µmol, 54.83% yield) was obtained as a yellow solid.

Preparation of Compound 6

To a solution of compound 5 (0.170 g, 144.26 µmol, 1.0 eq) in THF (5 mL) and $H_2O$ (5 ml) was added LiOH·$H_2O$ (12.11 mg, 288.51 µmol, 2.0 eq). The mixture was stirred at 15° C. for 1 hr. LC-MS showed compound 5 was consumed completely and one main peak with desired m/z was detected. Adjusted PH=7 used by AcOH and THF was removed under reduced pressure to give a residue. The residue was purified by prep-HPLC (neutral condition). Compound 6 (0.185 g, crude) was obtained as a yellow solid.

Preparation of BCY8549

To a solution of compound 6 (0.100 g, 86.93 µmol, 1.0 eq) in DMA (4 mL) was added HOSu (10.00 mg, 86.93 µmol, 1.0 eq) and EDCI (16.66 mg, 86.93 µmol, 1.0 eq). After the NHS ester was formed, β-Ala-BCY8234 (525.98 mg, 173.85 µmol, 2.0 eq) and DIEA (33.70 mg, 260.78 µmol, 45.42 µL, 3.0 eq). The mixture was stirred at 15° C. for 4 hr. LC-MS showed compound 6 was consumed completely and one main peak with desired m/z was detected. The reaction was directly purified by prep-HPLC (TFA condition). Compound BCY8549 (0.0528 g, 12.15 µmol, 13.98% yield, 95.70% purity) was obtained as a white solid. Retenton time=11.48 min. Mass found=1386.4 (M/3+H)

Preparation of BCY8245

Separation Condition: A phase: 0.075% TFA in $H_2O$, B phase: MeCN

Separation method: 18-48-55 min, RT=53.5 min

Separation column: Luna 200*25 mm 10 µm, C18, 110A and Gemin150*30 mm, C18, 5 µm, 110A, connection, 50° C.

Dissolve method: DMF

Separation purity: 95%

The BCY8234 was synthesized by solid phase synthesis.

Reaction Scheme of BCY8245 is Shown Below:

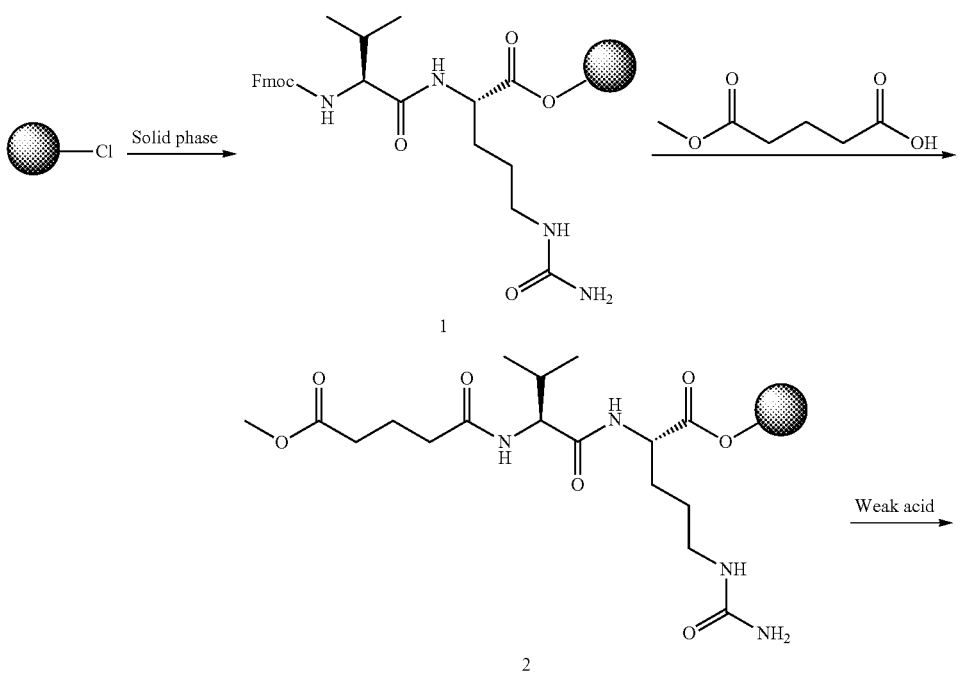

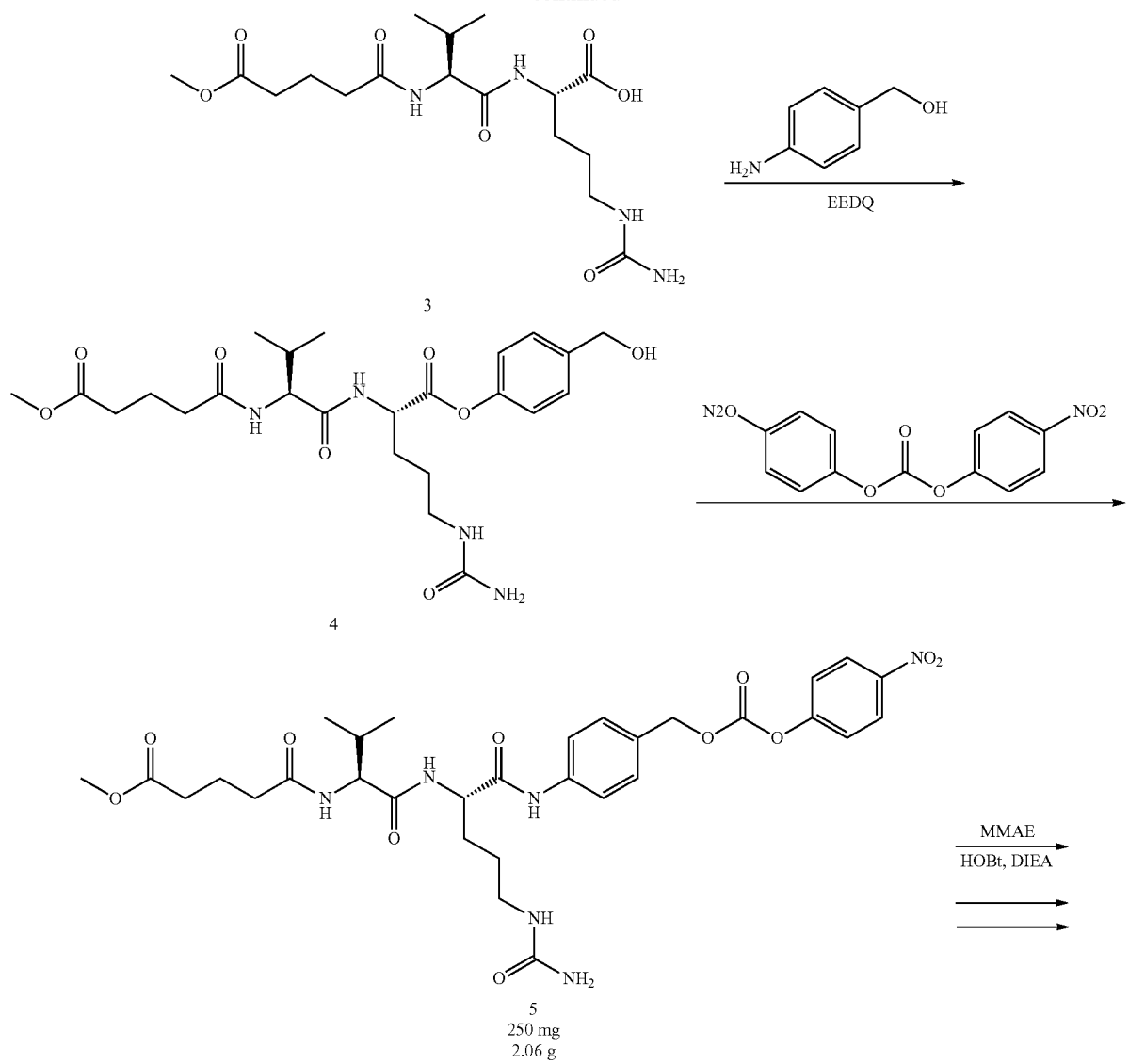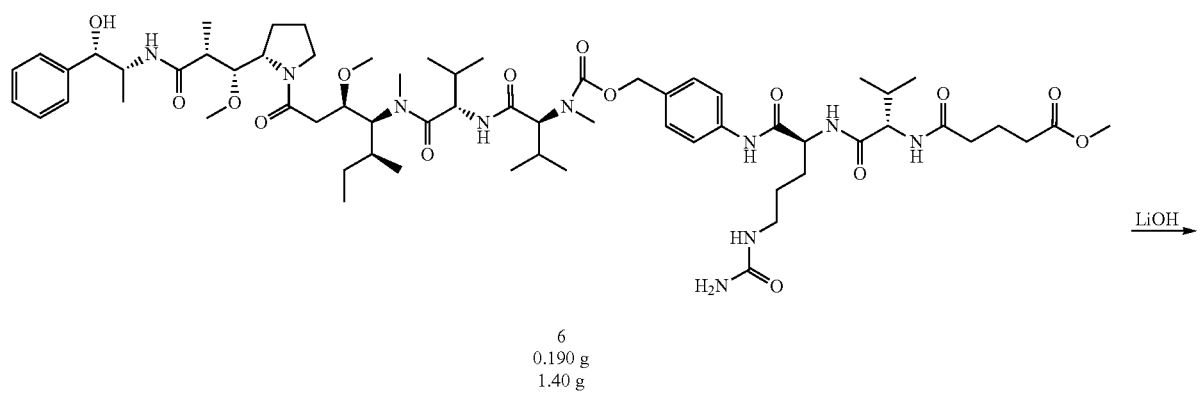

-continued

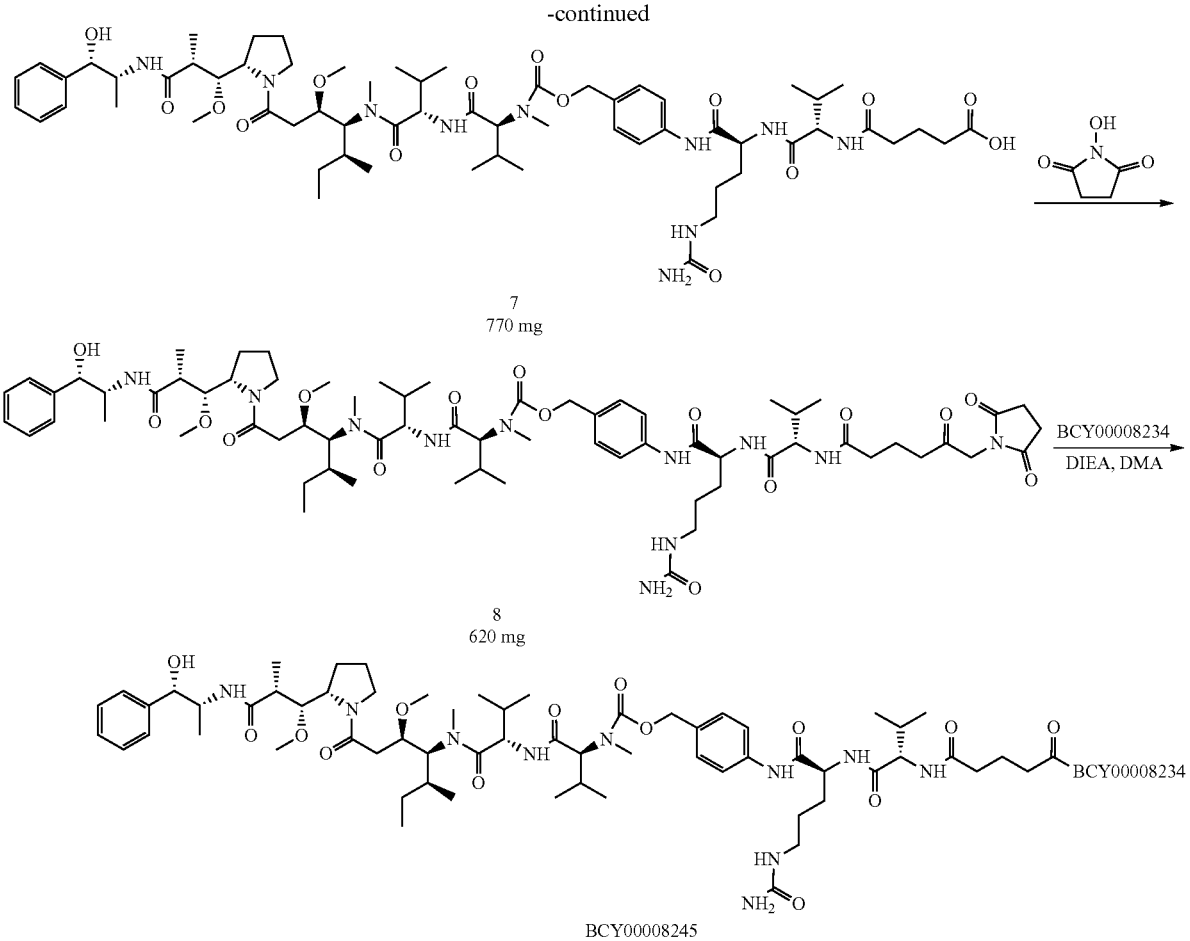

Preparation of Compound 3

The compound 3 was synthesized by solid phase method.

Preparation of Compound 4

To a solution of compound 3 (1.3 g, 3.23 mmol, 1.0 eq) in DCM (10 mL) and MeOH (5 mL) was added EEDQ (1.60 g, 6.46 mmol, 2.0 eq) and (4-aminophenyl) methanol (517.16 mg, 4.20 mmol, 1.3 eq). The mixture was stirred at 20° C. for 16 hr. LC-MS showed compound 3 was consumed completely and one main peak with desired m/z was detected. The solvent was removed under reduced pressure. The residue was purified by flash silica gel chromatography (ISCO®; 40 g SepaFlash® Silica Flash Column, Eluent of 0~15% DCM/MeOH gradient @ 40 mL/min). Compound 4 (0.950 g, 1.87 mmol, 57.94% yield) was obtained as a yellow solid.

Preparation of Compound 5

To a solution of compound 4 (0.950 g, 1.87 mmol, 1.0 eq) in DMF (5 mL) was added DIEA (1.21 g, 9.36 mmol, 1.63 mL, 5.0 eq) and bis(4-nitrophenyl) carbonate (2.28 g, 7.49 mmol, 4.0 eq). The mixture was stirred at 20° C. for 1 hr. LC-MS showed compound 4 was consumed completely and one main peak with desired m/z was detected. The reaction was directly purified by prep-HPLC (neutral condition). Compound 5 (0.400 g, 594.64 µmol, 31.77% yield) was obtained as a white solid.

Preparation of Compound 6

To a solution of compound 5 (0.200 g, 297.32 µmol, 1.0 eq) in DMF (5 mL) was added HOBt (52.23 mg, 386.51 µmol, 1.3 eq) and DIEA (115.28 mg, 891.95 µmol, 155.36 µL, 3.0 eq), MMAE (192.12 mg, 267.59 µmol, 0.9 eq). The mixture was stirred at 20° C. for 16 hr. LC-MS showed compound 5 was consumed completely and one main peak with desired m/z was detected. The reaction was directly purified by prep-HPLC (neutral condition). Compound 6 (0.160 g, 127.84 µmol, 43.00% yield) was obtained as a white solid.

Preparation of Compound 7

To a solution of compound 6 (0.160 g, 127.84 µmol, 1.0 eq) in THF (3 mL) and $H_2O$ (3 mL) was added LiOH·$H_2O$ (26.82 mg, 639.21 µmol, 5.0 eq). The mixture was stirred at 20° C. for 1 hr. LC-MS showed compound 6 was consumed completely and one main peak with desired m/z was detected. The THF was removed under reduced pressure and adjusted the pH=7 by AcOH, the mixture was lyophilizated. Compound 7 (0.130 g, 105.05 µmol, 82.17% yield) was obtained as a white solid.

Preparation of Compound 8

To a solution of compound 7 (36.27 mg, 315.15 µmol, 3.0 eq) in DMA (6 mL) and DCM (2 mL) was added EDCI (60.41 mg, 315.15 µmol, 3.0 eq). The mixture was stirred at 15° C. for 3 hr. LC-MS showed compound 7 was consumed completely and one main peak with desired m/z was detected. DCM was removed under reduced pressure. The reaction was directly purified by prep-HPLC (neutral condition). Compound 8 (0.095 g, 71.18 µmol, 67.76% yield) was obtained as a white solid.

Preparation of BCY8245

To a solution of BCY8234 (66.41 mg, 22.48 µmol, 1.0 eq) in DMA (4 mL) was added DIEA (8.72 mg, 67.44 µmol, 11.75 µL, 3.0 eq) and compound 8 (0.030 g, 22.48 µmol, 1.0 eq). The mixture was stirred at 20° C. for 16 hr. LC-MS showed BCY8234 was consumed completely and one main peak with desired m/z or desired mass was detected. The reaction was directly purified by prep-HPLC (TFA condition). Compound BCY8245 (0.0427 g, 10.16 µmol, 45.19% yield, 99.30% purity) was obtained as a white solid. Retention time=11.7 min. Mass found=1043.9 (M/4+H)

The follow bicyclic drug conjugates were made in an analogous manner to BCY8245:

| BCY No. | Scale (amt of peptide used) | Amt MMAE-PABC-vc-Glutarate-NHS used | Yield (mg) | Yield (%) | Purity (%) | LCMS Mass found (actual mass) | RT (min) |
|---|---|---|---|---|---|---|---|
| BCY7683 | 60 | 25 | 20.5 | 28.39 | 99.6 | 1285.1 = M/3 + H (3852.58) | 14.52 |
| BCY7825 | 84 | 35 | 34.1 | 31.22 | 99.0 | 1374.9 = M/3 + H (4122.85) | 12.18 |
| BCY8253 | 123 | 50 | 54.1 | 33.17 | 96.9 | 1406.7 = M/3 + H (4219.95) | 10.34 |
| BCY8254 | 76 | 34 | 36.4 | 33.70 | 99.4 | 1405.6 = M/3 + H (4214.94) | 10.35 |
| BCY8255 | 123 | 50 | 42.5 | 25.94 | 96.4 | 1405.7 = M/3 + H (4215.93) | 10.54 |
| BCY8550 | 68 | 30 | 50.1 | 52.28 | 99.2 | 1058.0 = M/4 + H (4227.1) | 12.08 |
| BCY8783 | 61 | 30 | 47.1 | 48.18 | 96.8 | 1404.1 = M/3 + H (4209.89) | 12.76 |
| BCY8784 | 34 | 20 | 23.1 | 34.74 | 95.7 | 1415.3 = M/3 + H (4245.94) | 13.50 |

Biological Data

Nectin-4 Direct Binding Assay

Affinity of the peptides of the invention for human Nectin-4 (Ki) was determined using a fluorescence polarisation assay, in accordance with the methods disclosed in WO 2016/067035. Peptides of the invention with a fluorescent tag (either fluorescein, SIGMA or Alexa Fluor488™, Fisher Scientific) were diluted to 2.5 nM in PBS with 0.01% tween 20 or 50 mM HEPES with 100 mM NaCl and 0.01% tween pH 7.4 (both referred to as assay buffer). This was combined with a titration of protein in the same assay buffer as the peptide to give 1 nM peptide in a total volume of 25 µL in a black walled and bottomed low bind low volume 384 well plates, typically 5 µL assay buffer, 10 µL protein then 10 µL fluorescent peptide. One in two serial dilutions were used to give 12 different concentrations with top concentrations ranging from 500 nM for known high affinity binders to 10 µM for low affinity binders and selectivity assays. Measurements were conducted on a BMG PHERAstar FS equipped with an "FP 485 520 520" optic module which excites at 485 nm and detects parallel and perpendicular emission at 520 nm. The PHERAstar FS was set at 25° C. with 200 flashes per well and a positioning delay of 0.1 second, with each well measured at 5 to 10 minute intervals for 60 minutes. The gain used for analysis was determined for each tracer at the end of the 60 minutes where there was no protein in the well. Data was analysed using Systat Sigmaplot version 12.0. mP values were fit to a user defined quadratic equation to generate a Kd value: f=ymin+(ymax−ymin)/Lig*((x+Lig+Kd)/2-sqrt((((x+Lig+Kd)/2)^2)−(Lig*x))). "Lig" was a defined value of the concentration of tracer used.

Nectin-4 Competition Binding Assay

Peptides without a fluorescent tag were tested in competition with ACPFGCHTDWSWPIWCA-Sar6-K(FI) (SEQ ID NO: 217) and (Kd=5 nM—determined using the protocol above). Peptides were diluted to an appropriate concentration in assay buffer as described in the direct binding assay with a maximum of 5% DMSO, then serially diluted 1 in 2. Five µL of diluted peptide was added to the plate followed by 10 µL of human Nectin-4, then 10 µL fluorescent peptide added. Measurements were conducted as for the direct binding assay, however the gain was determined prior to the first measurement. Data analysis was in Systat Sigmaplot version 12.0 where the mP values were fit to a user defined cubic equation to generate a Ki value:

f=ymin+(ymax−ymin)/Lig*((Lig*((2*((Klig+Kcomp+Lig+Comp-Prot*c)^2-3*(Kcomp*(Lig-Prot*c)+Klig*(Comp-Prot*c)+Klig*Kcomp))^0.5*COS(ARCCOS((-2*(Klig+Kcomp+Lig+Comp-Prot*c)^3+9*(Klig+Kcomp+Lig+Comp-Prot*c)*(Kcomp*(Lig-Prot*c)+Klig*(Comp-Prot*c)+Klig*Kcomp)-27*(-1*Klig*Kcomp*Prot*c)/(2*((((Klig+Kcomp+Lig+Comp-Prot*c)^2-3*(Kcomp*(Lig-Prot*c)+Klig*(Comp-Prot*c)+Klig*Kcomp))^3)^0.5)))/3))−(Klig+Kcomp+Lig+Comp-Prot*c)))/((3*Klig)+((2*((Klig+Kcomp+Lig+Comp-Prot*c)^2-3*(Kcomp*(Lig-Prot*c)+Klig*(Comp-Prot*c)+Klig*Kcomp))^0.5*COS (ARCCOS ((-2*(Klig+Kcomp+Lig+Comp-Prot*c)^3+9*(Klig+Kcomp+Lig+Comp-Prot*c)*(Kcomp*(Lig-Prot*c)+Klig*(Comp-Prot*c)+Klig*Kcomp)-27*(-1*Klig*Kcomp*Prot*c))/(2*(((Klig+Kcomp+Lig+Comp-Prot*c)^2-3*(Kcomp*(Lig-Prot*c)+Klig*(Comp-Prot+c)+Klig*Kcomp))^3)^0.5))/3)−(Klig+Kcomp+Lig+Comp-Prot*c)))).

"Lig", "KLig" and "Prot" were all defined values relating to: fluorescent peptide concentration, the Kd of the fluorescent peptide and Nectin concentration respectively.

Nectin-4 Biacore SPR Binding Assay

Biacore experiments were performed to determine $k_a$ ($M^{-1} s^{-1}$), $k_d$ ($s^{-1}$), $K_D$ (nM) values of monomeric peptides binding to human Necin-4 protein (obtained from Charles River).

Human Nectin-4 (residues Gly32-Ser349; NCBI RefSeq: NP_112178.2) with a gp67 signal sequence and C-terminal FLAG tag was cloned into pFastbac-1 and baculovirus made using standard Bac-to-Bac™ protocols (Life Technologies). Sf21 cells at 1×10$^6$ ml$^{-1}$ in Excell-420 medium (Sigma) at 27° C. were infected at an MOI of 2 with a P1 virus stock and the supernatant harvested at 72 hours. The supernatant was batch bound for 1 hour at 4° C. with Anti-FLAG M2 affinity agarose resin (Sigma) washed in PBS and the resin subsequently transferred to a column and washed extensively with PBS. The protein was eluted with 100 μg/ml FLAG peptide. The eluted protein was concentrated to 2 ml and loaded onto an S-200 Superdex column (GE Healthcare) in PBS at 1 ml/min. 2 ml fractions were collected and the fractions containing Nectin-4 protein were concentrated to 16 mg/ml.

The protein was randomly biotinylated in PBS using EZ-Link™ Sulfo-NHS-LC-LC-Biotin reagent (Thermo Fisher) as per the manufacturer's suggested protocol. The protein was extensively desalted to remove uncoupled biotin using spin columns into PBS.

For analysis of peptide binding, a Biacore 3000 instrument was used utilising a CM5 chip (GE Healthcare). Streptavidin was immobilised on the chip using standard amine-coupling chemistry at 25° C. with HBS-N (10 mM HEPES, 0.15 M NaCl, pH 7.4) as the running buffer. Briefly, the carboxymethyl dextran surface was activated with a 7 minute injection of a 1:1 ratio of 0.4 M 1-ethyl-3-(3-dimethylaminopropyl) carbodiimide hydrochloride (EDC)/ 0.1 M N-hydroxy succinimide (NHS) at a flow rate of 10 μl/min. For capture of streptavidin, the protein was diluted to 0.2 mg/ml in 10 mM sodium acetate (pH 4.5) and captured by injecting 120 μl of streptavidin onto the activated chip surface. Residual activated groups were blocked with a 7 minute injection of 1 M ethanolamine (pH 8.5) and biotinylated Nectin-4 captured to a level of 1,200-1,800 RU. Buffer was changed to PBS/0.05% Tween 20 and a dilution series of the peptides was prepared in this buffer with a final DMSO concentration of 0.5%. The top peptide concentration was 100 nM with 6 further 2-fold dilutions. The SPR analysis was run at 25° C. at a flow rate of 50 μl/min with 60 seconds association and dissociation between 400 and 1,200 seconds depending upon the individual peptide. Data were corrected for DMSO excluded volume effects. All data were double-referenced for blank injections and reference surface using standard processing procedures and data processing and kinetic fitting were performed using Scrubber software, version 2.0c (BioLogic Software). Data were fitted using simple 1:1 binding model allowing for mass transport effects where appropriate.

Certain peptide ligands of the invention were tested in the above mentioned Nectin-4 binding assays and the results are shown in Tables 1 and 2:

TABLE 1

Direct Binding Data for Selected Peptide Ligands of the Invention

| Peptide name | Sequence | Molecular Scaffold | Ki (nM) |
|---|---|---|---|
| 80-09-02-N006 | FI-A-(SQ ID NO: 1)-A | TATA | 5.0 |
| BCY488 (80-10-00) | A-(SEQ ID NO: 31)-A | TATA | 208 |
| BCY462 (80-10-12-T01) | VDW-(SEQ ID NO: 33)-A | TATA | 269 |
| BCY3400 (80-10-13-T01) | QKW-(SEQ ID NO: 34)-A | TATA | 72 |
| BCY471 (80-11-00) | A-(SEQ ID NO: 35)-A | TATA | 888 |
| BCY472 (80-11-01) | A-(SEQ ID NO: 36)-A | TATA | 502 |
| BCY3406 (80-11-08-T01) | A-(SEQ ID NO: 37)-SRF | TATA | 30 |
| BCY8208 | (Carboxyfluorescein) (SEQ ID NO: 115) | TATA | 745 | wherein "A" represents L-Alanine and "a" represents L-Alanine and * refers to a mean of 2 experiments

TABLE 2

Competition Binding Data for Selected Peptide Ligands of the Invention

| Bicycle No. | K$_i$ (μM) | Number of Experiments |
|---|---|---|
| BCY428 | 0.061 | 34 |
| BCY429 | 0.0426 | 2 |
| BCY430 | 0.3103 | 7 |
| BCY431 | 0.412 | 2 |
| BCY432 | 1.096 | 3 |
| BCY433 | 0.0694 | 2 |
| BCY3385 | 0.0286 | 13 |
| BCY3386 | 0.0802 | 2 |
| BCY3387 | 0.2343 | 2 |
| BCY3388 | 0.1293 | 2 |
| BCY3389 | 0.0998 | 7 |
| BCY3390 | 0.3019 | 7 |
| BCY3391 | 0.1981 | 2 |
| BCY3392 | 0.0363 | 2 |
| BCY3393 | 0.1729 | 3 |
| BCY3394 | 0.1016 | 2 |
| BCY3395 | 0.0174 | 2 |
| BCY3396 | 0.1024 | 2 |
| BCY3397 | 0.0332 | 2 |
| BCY3398 | 0.1639 | 2 |
| BCY3399 | 0.4099 | 2 |
| BCY3400 | 0.047 | 3 |
| BCY3401 | 0.1536 | 2 |
| BCY7265 | 0.0383 | 2 |
| BCY7266 | 0.041 | 2 |
| BCY7272 | 0.041 | 2 |
| BCY7273 | 0.084 | 2 |
| BCY7274 | 0.0905 | 2 |
| BCY7275 | 0.0433 | 2 |
| BCY7276 | 0.3256 | 2 |
| BCY7278 | 0.069 | 2 |

TABLE 2-continued

Competition Binding Data for Selected Peptide Ligands of the Invention

| Bicycle No. | $K_i$ (µM) | Number of Experiments |
|---|---|---|
| BCY7279 | 0.0444 | 2 |
| BCY7280 | 0.219 | 2 |
| BCY7281 | 0.0229 | 2 |
| BCY7282 | 0.0265 | 2 |
| BCY7342 | 0.3097 | 2 |
| BCY7344 | 0.0398 | 2 |
| BCY7346 | 0.0649 | 2 |
| BCY7347 | 0.0361 | 2 |
| BCY7348 | 0.0206 | 2 |
| BCY7350 | 0.01 | 2 |
| BCY7352 | 0.1318 | 2 |
| BCY7354 | 0.884 | 1 |
| BCY7356 | 0.0434 | 2 |
| BCY7357 | 0.0452 | 2 |
| BCY7359 | 0.1605 | 2 |
| BCY7360 | 0.0682 | 2 |
| BCY7365 | 0.2819 | 2 |
| BCY7367 | 0.0263 | 2 |
| BCY7368 | 0.023 | 2 |
| BCY7369 | 0.0778 | 2 |
| BCY7370 | 0.1445 | 2 |
| BCY7372 | 0.0726 | 2 |
| BCY7390 | 0.0171 | 20 |
| BCY7391 | 0.0133 | 2 |
| BCY7392 | 0.0272 | 5 |
| BCY7393 | 0.232 | 1 |
| BCY7420 | 0.0636 | 2 |
| BCY7421 | 0.0285 | 2 |
| BCY7422 | 0.0579 | 2 |
| BCY7424 | 0.562 | 1 |
| BCY7426 | 0.069 | 1 |
| BCY7521 | 0.2237 | 2 |
| BCY7535 | 0.064 | 2 |
| BCY7536 | 0.069 | 2 |
| BCY7537 | 0.0384 | 2 |
| BCY7538 | 0.0085 | 2 |
| BCY7539 | 0.0468 | 2 |
| BCY7540 | 0.3567 | 2 |
| BCY7541 | 0.0765 | 2 |
| BCY7556 | 0.0261 | 2 |
| BCY7557 | 0.0225 | 2 |
| BCY7558 | 0.0219 | 6 |
| BCY7559 | 0.017 | 2 |
| BCY7580 | 0.0135 | 2 |
| BCY7581 | 0.0194 | 2 |
| BCY7582 | 0.0379 | 2 |
| BCY7584 | 0.0135 | 2 |
| BCY7585 | 0.0185 | 2 |
| BCY7588 | 0.342 | 1 |
| BCY7589 | 0.0345 | 2 |
| BCY7590 | 0.0385 | 2 |
| BCY7591 | 0.18 | 1 |
| BCY7592 | 0.0374 | 2 |
| BCY7593 | 0.028 | 2 |
| BCY7594 | 0.073 | 2 |
| BCY7595 | 0.2189 | 2 |
| BCY7596 | 0.353 | 1 |
| BCY7597 | 0.169 | 1 |
| BCY7598 | 0.0749 | 2 |
| BCY7606 | 0.034 | 1 |
| BCY7607 | 0.077 | 1 |
| BCY7608 | 0.042 | 1 |
| BCY7611 | 0.205 | 1 |
| BCY7612 | 0.064 | 1 |
| BCY7613 | 0.0444 | 2 |
| BCY7614 | 0.021 | 1 |
| BCY7615 | 0.0284 | 2 |
| BCY7616 | 0.051 | 1 |
| BCY7618 | 0.013 | 1 |
| BCY7620 | 0.246 | 1 |
| BCY7622 | 0.031 | 1 |
| BCY7623 | 0.021 | 1 |
| BCY7624 | 0.571 | 1 |
| BCY7625 | 0.141 | 1 |
| BCY7627 | 0.101 | 1 |
| BCY7628 | 0.023 | 1 |
| BCY7631 | 0.019 | 1 |
| BCY7632 | 0.123 | 1 |
| BCY7634 | 0.024 | 1 |
| BCY7635 | 0.0152 | 4 |
| BCY7636 | 0.522 | 1 |
| BCY7639 | 0.49 | 1 |
| BCY7640 | 0.086 | 1 |
| BCY7643 | 0.019 | 1 |
| BCY7656 | 0.0719 | 2 |
| BCY7657 | 0.0232 | 2 |
| BCY7658 | 0.0336 | 2 |
| BCY7659 | 0.0779 | 2 |
| BCY7660 | 0.0262 | 2 |
| BCY7661 | 0.0294 | 2 |
| BCY7662 | 0.0148 | 2 |
| BCY7663 | 0.0255 | 2 |
| BCY7664 | 0.07 | 2 |
| BCY7665 | 0.0241 | 2 |
| BCY7666 | 0.0814 | 2 |
| BCY7667 | 0.0273 | 2 |
| BCY7668 | 0.4236 | 2 |
| BCY7765 | 0.0087 | 22 |
| BCY7793 | 0.042 | 1 |
| BCY7815 | 0.032 | 1 |
| BCY7816 | 0.036 | 1 |
| BCY7817 | 0.014 | 1 |
| BCY7819 | 0.012 | 1 |
| BCY7820 | 0.01 | 1 |
| BCY7821 | 0.084 | 1 |
| BCY7822 | 0.027 | 1 |
| BCY7876 | 0.0592 | 2 |
| BCY7877 | 0.0095 | 2 |
| BCY7879 | 0.0125 | 2 |
| BCY7881 | 0.0144 | 2 |
| BCY7883 | 0.1893 | 2 |
| BCY7884 | 0.223 | 1 |
| BCY7886 | 0.015 | 2 |
| BCY7887 | 0.0214 | 2 |
| BCY7889 | 0.0581 | 3 |
| BCY7890 | 0.0989 | 4 |
| BCY7891 | 0.005 | 2 |
| BCY7892 | 0.0095 | 2 |
| BCY7894 | 0.1263 | 2 |
| BCY7895 | 0.0491 | 4 |
| BCY7896 | 0.044 | 2 |
| BCY7897 | 0.166 | 1 |
| BCY7902 | 0.004 | 1 |
| BCY7903 | 0.041 | 1 |
| BCY7904 | 0.008 | 1 |
| BCY7906 | 0.006 | 1 |
| BCY7907 | 0.01 | 1 |
| BCY7908 | 0.02 | 1 |
| BCY7911 | 0.013 | 1 |
| BCY7912 | 0.009 | 1 |
| BCY7913 | 0.016 | 1 |
| BCY7914 | 0.062 | 1 |
| BCY7915 | 0.02 | 1 |
| BCY7916 | 0.045 | 3 |
| BCY7973 | 0.004 | 1 |
| BCY7979 | 0.191 | 1 |
| BCY7993 | 0.038 | 1 |
| BCY7996 | 0.021 | 1 |
| BCY7997 | 0.022 | 1 |
| BCY7998 | 0.135 | 1 |
| BCY8000 | 0.06 | 1 |
| BCY8028 | 0.0619 | 3 |
| BCY8029 | 0.0778 | 3 |
| BCY8030 | 0.0025 | 7 |
| BCY8031 | 0.0036 | 3 |
| BCY8032 | 1.064 | 1 |
| BCY8036 | 0.0075 | 3 |
| BCY8037 | 0.0056 | 3 |

TABLE 2-continued

Competition Binding Data for Selected Peptide Ligands of the Invention

| Bicycle No. | $K_i$ (μM) | Number of Experiments |
|---|---|---|
| BCY8038 | 0.008 | 5 |
| BCY8039 | 0.0214 | 3 |
| BCY8040 | 0.0108 | 3 |
| BCY8041 | 0.0391 | 3 |
| BCY8042 | 0.0204 | 3 |
| BCY8043 | 0.0088 | 3 |
| BCY8044 | 0.1698 | 2 |
| BCY8084 | 0.0264 | 2 |
| BCY8085 | 0.0151 | 2 |
| BCY8087 | 0.0179 | 2 |
| BCY8088 | 0.0089 | 2 |
| BCY8089 | 0.008 | 2 |
| BCY8090 | 0.057 | 1 |
| BCY8091 | 0.023 | 2 |
| BCY8094 | 0.0289 | 2 |
| BCY8120 | 0.003 | 2 |
| BCY8121 | 0.004 | 2 |
| BCY8122 | 0.003 | 2 |
| BCY8123 | 0.0045 | 2 |
| BCY8124 | 0.0035 | 4 |
| BCY8125 | 0.0031 | 4 |
| BCY8126 | 0.0027 | 6 |
| BCY8127 | 0.0024 | 4 |
| BCY8128 | 0.0022 | 4 |
| BCY8129 | 0.0031 | 4 |
| BCY8153 | 0.035 | 1 |
| BCY8154 | 0.008 | 1 |
| BCY8157 | 0.005 | 1 |
| BCY8158 | 0.177 | 1 |
| BCY8161 | 0.004 | 1 |
| BCY8162 | 0.003 | 1 |
| BCY8163 | 0.003 | 1 |
| BCY8174 | 0.0123 | 2 |
| BCY8175 | 0.0035 | 2 |
| BCY8176 | 0.0035 | 2 |
| BCY8177 | 0.0175 | 2 |
| BCY8178 | 0.083 | 1 |
| BCY8180 | 0.003 | 2 |
| BCY8181 | 0.0035 | 2 |
| BCY8182 | 0.002 | 2 |
| BCY8183 | 0.002 | 2 |
| BCY8184 | 0.0032 | 4 |
| BCY8185 | 0.0261 | 2 |
| BCY8186 | 0.006 | 2 |
| BCY8187 | 0.005 | 2 |
| BCY8188 | 0.02 | 2 |
| BCY8189 | 0.1658 | 2 |
| BCY8191 | 0.0045 | 2 |
| BCY8192 | 0.005 | 2 |
| BCY8193 | 0.003 | 2 |
| BCY8194 | 0.0035 | 2 |
| BCY8211 | 0.0045 | 2 |
| BCY8212 | 0.003 | 2 |
| BCY8213 | 0.0035 | 2 |
| BCY8214 | 0.0063 | 2 |
| BCY8215 | 0.003 | 2 |

Certain bicyclic peptides of the invention were tested in the above mentioned SPR assay and the results are shown in Table 3:

TABLE 3

SPR Data for Selected Peptide Ligands of the Invention

| Bicycle No. | Human SPR Kd (nM) | n |
|---|---|---|
| BCY428 | 333.52 | 4 |
| BCY3385 | 87.37 | 3 |
| BCY7390 | 40.31 | 5 |
| BCY7391 | 59.8 | 3 |
| BCY7392 | 35.7 | 3 |
| BCY7393 | 1383.33 | 3 |
| BCY7559 | 14.9 | 2 |
| BCY7618 | 17.6 | 1 |
| BCY7765 | 24.94 | 15 |
| BCY7793 | 47 | 1 |
| BCY8030 | 1.71 | 1 |
| BCY8038 | 44.53 | 3 |
| BCY8120 | 0.67 | 1 |
| BCY8121 | 0.53 | 1 |
| BCY8122 | 0.89 | 1 |
| BCY8123 | 2.66 | 1 |
| BCY8124 | 0.69 | 1 |
| BCY8125 | 0.52 | 1 |
| BCY8126 | 1.07 | 4 |
| BCY8127 | 1.84 | 3 |
| BCY8128 | 1.06 | 3 |
| BCY8129 | 0.87 | 3 |
| BCY8161 | 0.94 | 1 |
| BCY8162 | 4.3 | 1 |
| BCY8163 | 0.61 | 1 |
| BCY8182 | 0.96 | 1 |
| BCY8183 | 0.56 | 1 |
| BCY8184 | 0.56 | 1 |
| BCY8192 | 1.81 | 1 |
| BCY8193 | 1.3 | 1 |
| BCY8194 | 1.9 | 1 |
| BCY8211 | 7.32 | 1 |
| BCY8212 | 2.42 | 1 |
| BCY8213 | 1.95 | 1 |

TABLE 3-continued

SPR Data for Selected Peptide Ligands of the Invention

| Bicycle No. | Human SPR Kd (nM) | n |
|---|---|---|
| BCY8214 | 0.54 | 1 |
| BCY8215 | 1.62 | 1 |
| BCY8276 | 0.86 | 1 |
| BCY8277 | 5.99 | 1 |
| BCY8278 | 1.92 | 1 |
| BCY8279 | 3.31 | 1 |
| BCY8280 | 2 | 1 |
| BCY8281 | 6.11 | 1 |
| BCY8831 | 2.14 | 1 |
| BCY8238 | 3.88 | 1 |
| BCY8116 | 0.372 | 1 | n = mean number of experiments

Certain bicyclic peptides of the invention were conjugated to cytotoxic agents and tested in the above mentioned SPR assay and the results are shown in Table 4:

TABLE 4

SPR Data for Selected BDCs of the Invention

| Bicyclic Drug Conjugate (BDC) No. | Peptide | Human SPR Kd (nM) |
|---|---|---|
| BCY7683 | MMAE-PABC-Cit-Val-Glutaryl-BCY7556 | 27.10 (n = 1) |
| BCY7825 | MMAE-PABC-Cit-Val-Glutaryl-BCY7814 | 11.60 (n = 1) |
| BCY7826 | DM1-SPDB(SO$_3$H)-BCY7814 | 12.10 (n = 1) |
| BCY8245 | MMAE-PABC-Cit-Val-Glutaryl-BCY8234 | 5.12 (n = 4) |
| BCY8253 | MMAE-PABC-Cit-Val-Glutaryl-BCY8231 | 6.22 (n = 4) |
| BCY8254 | MMAE-PABC-Cit-Val-Glutaryl-BCY8232 | 4.11 (n = 1) |
| BCY8255 | MMAE-PABC-Cit-Val-Glutaryl-BCY8235 | 8.58 (n = 4) |
| BCY8549 | MMAE-PABC-cyclobutyl-(B-Ala)-BCY8234 | 1.44 (n = 1) |
| BCY8550 | MMAE-PABC-Cit-Val-Glutaryl-(Lys3)-BCY8831 | 0.27 (n = 1) |
| BCY8783 | MMAE-PABC-Cit-Val-Glutaryl-BCY8269 | 0.804 (n = 1) |
| BCY8784 | MMAE-PABC-Cit-Val-Glutaryl-BCY8273 | 0.662 (n = 1) |

In Vivo Studies

In each of Examples 1 to 5 and 9 the following methodology was adopted for each study:

Test and Positive Control Articles

| Number | Physical Description | Molecular Weight | Purity | Storage Condition |
|---|---|---|---|---|
| BCY7683 | Lyophilised powder | 3852.59 | 99.6% | stored at −80° C. |
| BCY7825 | Lyophilised powder | 4122.85 | 98.40% | stored at −80° C. |
| BCY7826 | Lyophilised powder | 3821.83 | 99.70% | stored at −80° C. |
| BCY8234 | Lyophilised powder | 2954.34 | 98.1% | stored at −80° C. |
| BCY8242 | Lyophilised powder | 6346.46 | 97.40% | stored at −80° C. |
| BCY8245 | Lyophilised powder | 4173.85 | 99.60% | stored at −80° C. |
| BCY8253 | Lyophilised powder | 4218.96 | 97.00% | stored at −80° C. |
| BCY8254 | Lyophilised powder | 4213.96 | 99.40% | stored at −80° C. |
| BCY8255 | Lyophilised powder | 4214.97 | 99.40% | stored at −80° C. |
| BCY8549 | Lyophilised powder | 4157.81 | 95.70% | stored at −80° C. |
| BCY8550 | Lyophilised powder | 4228.98 | 99.20% | stored at −80° C. |
| BCY8781 | Lyophilised powder | 4173.85 | 99.0% | stored at −80° C. |
| BCY8783 | Lyophilised powder | 4209.91 | 96.80% | stored at −80° C. |
| BCY8784 | Lyophilised powder | 4245.96 | 95.70% | stored at −80° C. |

Experimental Methods and Procedures (i) Observations

All the procedures related to animal handling, care and the treatment in the study were performed according to the guidelines approved by the Institutional Animal Care and Use Committee (IACUC) of WuXi AppTec, following the guidance of the Association for Assessment and Accreditation of Laboratory Animal Care (AAALAC). At the time of routine monitoring, the animals were daily checked for any effects of tumor growth and treatments on normal behavior such as mobility, food and water consumption (by looking only), body weight gain/loss, eye/hair matting and any other abnormal effect as stated in the protocol. Death and observed clinical signs were recorded on the basis of the numbers of animals within each subset.

(ii) Tumor Measurements and the Endpoints

The major endpoint was to see if the tumor growth could be delayed or mice could be cured. Tumor volume was measured three times weekly in two dimensions using a caliper, and the volume was expressed in mm$^3$ using the formula: V=0.5 a×b$^2$ where a and b are the long and short diameters of the tumor, respectively. The tumor size was then used for calculations of T/C value. The T/C value (in percent) is an indication of antitumor effectiveness; T and C are the mean volumes of the treated and control groups, respectively, on a given day. TGI was calculated for each group using the formula: TGI (%)=[1−(T$_i$−T$_0$)/(V$_i$−V$_0$)]×100; T$_i$ is the average tumor volume of a treatment group on a given day, T$_0$ is the average tumor volume of the treatment group on the day of treatment start, V$_i$ is the average tumor volume of the vehicle control group on the same day with T$_i$, and V$_0$ is the average tumor volume of the vehicle group on the day of treatment start.

(iii) Statistical Analysis

Summary statistics, including mean and the standard error of the mean (SEM), are provided for the tumor volume of each group at each time point.

Statistical analysis of difference in tumor volume among the groups was conducted on the data obtained at the best therapeutic time point after the final dose.

A one-way ANOVA was performed to compare tumor volume among groups, and when a significant F-statistics (a ratio of treatment variance to the error variance) was obtained, comparisons between groups were carried out with Games-Howell test. All data were analyzed using GraphPad Prism 5.0. $P<0.05$ was considered to be statistically significant.

Example 1: In Vivo Efficacy Test of BCY7683, BCY7825, BCY7826, BCY8245, BCY8253, BCY8254 and BCY8255 in Treatment of NCI-H292 Xenograft (Non-Small Cell Lung Cancer (NSCLC) Model) in BALB/c Nude Mice 1. Study Objective The objective of the research was to evaluate the in vivo anti-tumor efficacy of BCY7683, BCY7825, BCY7826, BCY8245, BCY8253, BCY8254 and BCY8255 in treatment of NCI-H292 xenograft model in BALB/c nude mice.

2. Experimental Design

| Group | Treatment | n | Dose (mg/kg) | Dosing Volume (μl/g) | Dosing Route | Schedule |
|---|---|---|---|---|---|---|
| 1 | Vehicle | 3 | — | 10 | iv | biw |
| 2 | BCY7683 | 3 | 5/3* | 10 | iv | biw/qw** |
| 3 | BCY7825 | 3 | 1 | 10 | iv | biw |
| 4 | BCY7825 | 3 | 3 | 10 | iv | biw |
| 5 | BCY7825 | 3 | 3 | 10 | iv | qw |
| 6 | BCY7826 | 3 | 1 | 10 | iv | biw |
| 7 | BCY7826 | 3 | 3 | 10 | iv | biw |
| 8 | BCY7826 | 3 | 3 | 10 | iv | qw |
| 9 | BCY8245 | 3 | 1/3/5$^a$ | 10 | iv | qw |
| 10 | BCY8253 | 3 | 1/3/5a | 10 | iv | qw |
| 11 | BCY8254 | 3 | 1/3/5a | 10 | iv | qw |
| 12 | BCY8255 | 3 | 1/3/5a | 10 | iv | qw |
| 13 | BCY8245 | 3 | 3 mg/kg | 10 | iv | qw |
| 14 | BCY8245 | 3 | 3 mg/kg | 10 | iv | biw |
| 15 | BCY8245 | 3 | 5 mg/kg | 10 | iv | qw |
| 16 | BCY8253 | 3 | 3 mg/kg | 10 | iv | qw |
| 17 | BCY8253 | 3 | 3 mg/kg | 10 | iv | biw |
| 18 | BCY8253 | 3 | 5 mg/kg | 10 | iv | qw |
| 19 | BCY8255 | 3 | 3 mg/kg | 10 | iv | qw |
| 20 | BCY8255 | 3 | 3 mg/kg | 10 | iv | biw |
| 21 | BCY8255 | 3 | 5 mg/kg | 10 | iv | qw |

Note:

n: animal number; Dosing volume: adjust dosing volume based on body weight 10 μl/g.

*The dosage of BCY7683 was decreased to 3 mg/kg from day 7.

**The treatment schedule was adjust based on the bodyweight at the dosing day.

3. Materials 3.1 Animals and Housing Condition 3.1.1. Animals

Species: Mus Musculus
Strain: Balb/c nude
Age: 6-8 weeks
Sex: female
Body weight: 18-22 g
Number of animals: 12 mice for BCY7683 test, 21 mice for BCY7825 and BCY7826, 18 mice for BCY8245, BCY8253, BCY8254 and BCY8255 plus spare
Animal supplier: Shanghai LC Laboratory Animal Co., LTD.

3.1.2. Housing Condition

The mice were kept in individual ventilation cages at constant temperature and humidity with 3 animals in each cage.

Temperature: 20~26° C.
Humidity 40-70%.
Cages: Made of polycarbonate. The size is 300 mm×180 mm×150 mm. The bedding material is corn cob, which is changed twice per week.
Diet: Animals had free access to irradiation sterilized dry granule food during the entire study period.
Water: Animals had free access to sterile drinking water.
Cage identification: The identification labels for each cage contained the following information: number of animals, sex, strain, the date received, treatment, study number, group number and the starting date of the treatment.
Animal identification: Animals were marked by ear coding.

3.2 Test and Positive Control Articles

4. Experimental Methods and Procedures 4.1 Cell Culture

The NCI-H292 tumor cells will be maintained in medium supplemented with 10% heat inactivated fetal bovine serum at 37° C. in an atmosphere of 5% $CO_2$ in air. The tumor cells will be routinely subcultured twice weekly. The cells growing in an exponential growth phase will be harvested and counted for tumor inoculation.

4.2 Tumor Inoculation

Each mouse will be inoculated subcutaneously at the right flank with NCI-H292 tumor cells ($10\times10^6$) in 0.2 ml of PBS for tumor development. The animals will be randomized and treatment will be started when the average tumor volume reaches approximately 158-406 mm$^3$. The test article administration and the animal numbers in each group are shown in the following experimental design table.

4.3 Testing Article Formulation Preparation

| Treatment | Dose (mg/ml) | Formulation |
|---|---|---|
| Vehicle | — | 2.5% DMSO, 10% Kolliphor, 50 mM Hepes pH 7 |
| BCY7683 | 0.5 | Dissolve 2.25 mg BCY7683 with 112 μl DMSO, then dilute 22.5 μl 20 mg/ml BCY7683 stock with 90 μl Kolliphor, 45 μl 1 mM Hepes and 742.5 water. |
| | 0.3 | Dilute the 0.5 mg/ml dosing solution with buffer of 2.5% DMSO, 10% Kolliphor, and 50 mM Hepes pH 7. |

| Treatment | Dose (mg/ml) | Formulation |
|---|---|---|
| Vehicle | — | 25 mM Histidine, 10% sucrose pH = 7 |
| BCY7825 | Formulation buffer | 10% Kolliphor, 50 mM Hepes pH = 7 |
| | 1 | Dissolve 3.2 mg BCY7825 into 3.2 ml formulation buffer |
| | 0.3 | Dilute 270 µl 1 mg/ml BCY7825 into 630 µl formulation buffer |
| | 0.1 | Dilute 90 µl 1 mg/ml BCY7825 into 810 µl formulation buffer |

-continued

| Treatment | Dose (mg/ml) | Formulation |
|---|---|---|
| BCY7826 | Formulation buffer | 25 mM Histidine, 10% sucrose pH = 7 |
| | 1 | Dissolve 3.2 mg BCY7826 into 3.2 ml formulation buffer |
| | 0.3 | Dilute 270 µl 1 mg/ml BCY7826 into 630 µl formulation buffer |
| | 0.1 | Dilute 90 µl 1 mg/ml BCY7826 into 810 µl formulation buffer |

| Test article | Con. (mg/ml) | Formulation |
|---|---|---|
| Vehicle | — | 25 mM Histidine pH 7 10% sucrose |
| BCY8245 | 1 | Dissolve 1.61 mg BCY8245 with 1.604 ml buffer(vehicle) |
| | 0.1 | Dilute 90 µl 1 mg/ml BCY8245 stock with 810 µl buffer(vehicle) |
| | 0.3 | Dilute 270 µl 1 mg/ml BCY8245 stock with 630 µl buffer(vehicle) |
| | 0.5 | Dilute 450 µl 1 mg/ml BCY8245 stock with 450 µl buffer(vehicle) |
| BCY8253 | 1 | Dissolve 1.15 mg BCY8253 with 1.116 ml buffer(vehicle) |
| | 0.1 | Dilute 90 µl 1 mg/ml BCY8253 stock with 810 µl buffer(vehicle) |
| | 0.3 | Dilute 270 µl 1 mg/ml BCY8253 stock with 630 µl buffer(vehicle) |
| | 0.5 | Dilute 450 µl 1 mg/ml BCY8253 stock with 450 µl buffer(vehicle) |
| BCY8254 | 1 | Dissolve 1.80 mg BCY8254 with 1.789 ml buffer(vehicle) |
| | 0.1 | Dilute 90 µl 1 mg/ml BCY8254 stock with 810 µl buffer(vehicle) |
| | 0.3 | Dilute 270 µl 1 mg/ml BCY8254 stock with 630 µl buffer(vehicle) |
| | 0.5 | Dilute 450 µl 1 mg/ml BCY8254 stock with 450 µl buffer(vehicle) |
| BCY8255 | 1 | Dissolve 1.30 mg BCY8255 with 1.192 ml 50 mM Acetate/acetic acid pH 5 10% sucrose |
| | 0.1 | Dilute 90 µl 1 mg/ml BCY8255 stock with 810 µl 50 mM Acetate/acetic acid pH 5 10% sucrose |
| | 0.3 | Dilute 270 µl 1 mg/ml BCY8255 stock with 630 µl 50 mM Acetate/acetic acid pH 5 10% sucrose |
| | 0.5 | Dilute 450 µl 1 mg/ml BCY8255 stock with 450 µl 50 mM Acetate/acetic acid pH 5 10% sucrose |

| Test article | Con. (mg/ml) | Formulation |
|---|---|---|
| Vehicle | — | 25 mM Histidine pH 7 10% sucrose |
| BCY8245 | 1 | Dissolve 10.56 mg BCY8245 in 10.518 ml Histidine buffer |
| BCY8245 | 0.5 | Dilute 400 µl 1 mg/ml BCY8245 stock with 400 µl Histidine buffer |
| BCY8245 | 0.3 | Dilute 240 µl 1 mg/ml BCY8245 stock with 560 µl Histidine buffer |
| BCY8253 | 1 | Dissolve 11.35 mg BCY8253 in 11.010 ml Histidine buffer |
| BCY8253 | 0.5 | Dilute 400 µl 1 mg/ml BCY8253 stock with 400 µl Histidine buffer |
| BCY8253 | 0.3 | Dilute 240 µl 1 mg/ml BCY8253 stock with 560 µl Histidine buffer |
| BCY8255 | 1 | Dissolve 10.78 mg BCY8255 in 10.715 ml Acetate buffer |
| BCY8255 | 0.5 | Dilute 400 µl 1 mg/ml BCY8255 stock with 400 µl Acetate buffer |
| BCY8255 | 0.3 | Dilute 240 µl 1 mg/ml BCY8255 stock with 560 µl Acetate buffer |

1. Histidine buffer: 25 mM Histidine pH 7 10% sucrose
2. Acetate buffer: 50 mM Acetate/acetic acid pH 5 10% sucrose
3. BCY8245(1 mg/mL), BCY8253(1 mg/mL) and BCY8255(1 mg/mL) stocks were separated into individual tubes and stored at −80° C.

4.4 Sample Collection

At the end of study, the plasma was collected at 5 min, 15 min, 30 min, 60 min and 120 min post last dosing.

5. Results 5.1 Tumor Growth Curves

Tumor growth curves are shown in FIGS. 1 to 10.

5.2 Tumor Volume Trace

Mean tumor volume over time in female Balb/c nude mice bearing NCI-H292 xenograft is shown in the below Tables:

TABLE 5

Tumor volume trace over time

| Treatment | Days after the start of treatment ||||||||
|---|---|---|---|---|---|---|---|---|
| | 0 | 2 | 4 | 7 | 9 | 11 | 14 | 16 |
| Vehicle, biw | 175 ± 4 | 321 ± 28 | 407 ± 51 | 538 ± 35 | 620 ± 27 | 712 ± 60 | 879 ± 88 | — |
| BCY7683, 5/3 mpk, biw/qw | 176 ± 11 | 162 ± 18 | 97 ± 16 | 88 ± 17 | 72 ± 14 | 58 ± 16 | 47 ± 9 | — |

TABLE 6

Tumor volume trace over time

| Treatment | Days after the start of treatment |||||||
|---|---|---|---|---|---|---|---|
| | 0 | 2 | 5 | 7 | 9 | 12 | 14 |
| Vehicle, biw | 158 ± 11 | 227 ± 7 | 302 ± 25 | 398 ± 47 | 452 ± 47 | 558 ± 46 | 718 ± 79 |
| BCY7825, 1 mpk, biw | 156 ± 11 | 214 ± 20 | 332 ± 31 | 444 ± 46 | 505 ± 62 | 605 ± 52 | 754 ± 66 |
| BCY7825, 3 mpk, biw | 159 ± 28 | 195 ± 29 | 119 ± 30 | 102 ± 35 | 103 ± 35 | 65 ± 21 | 73 ± 24 |
| BCY7825, 3 mpk, qw | 157 ± 17 | 179 ± 22 | 162 ± 18 | 179 ± 20 | 146 ± 23 | 109 ± 8 | 116 ± 25 |
| BCY7826, 1 mpk, biw | 157 ± 15 | 223 ± 3 | 297 ± 13 | 350 ± 10 | 449 ± 69 | 530 ± 71 | 625 ± 111 |
| BCY7826, 3 mpk, biw | 158 ± 27 | 171 ± 32 | 121 ± 25 | 110 ± 29 | 99 ± 22 | 87 ± 16 | 91 ± 19 |
| BCY7826, 3 mpk, qw | 157 ± 10 | 183 ± 14 | 215 ± 32 | 284 ± 35 | 319 ± 33 | 247 ± 14 | 298 ± 16 |

TABLE 7

Tumor volume trace over time

| Treatment | Days after the start of treatment |||
|---|---|---|---|
| | 16 | 19 | 21 |
| Vehicle, biw | 895 ± 160 | 1026 ± 175 | 1107 ± 210 |
| BCY7825, 1 mpk, biw | 890 ± 126 | 982 ± 133 | 1063 ± 139 |
| BCY7825, 3 mpk, biw | 87 ± 26 | 81 ± 28 | 80 ± 29 |
| BCY7825, 3 mpk, qw | 130 ± 30 | 133 ± 28 | 177 ± 34 |
| BCY7826, 1 mpk, biw | 671 ± 109 | 731 ± 144 | 774 ± 151 |
| BCY7826, 3 mpk, biw | 88 ± 19 | 75 ± 23 | 93 ± 33 |
| BCY7826, 3 mpk, qw | 333 ± 13 | 378 ± 19 | 425 ± 25 |

TABLE 8

Tumor volume trace over time

| Treatment | 0 | 2 | 4 | 7 | 9 | 11 | 14 | 16 |
|---|---|---|---|---|---|---|---|---|
| Vehicle, qw | 410 ± 77 | 516 ± 69 | 627 ± 61 | 931 ± 141 | 1118 ± 225 | 1208 ± 257 | 1495 ± 365 | 1743 ± 419 |
| BCY8245, 1/3/5 mpk, qw | 404 ± 65 | 391 ± 42 | 542 ± 14 | 721 ± 136 | 762 ± 115 | 607 ± 95 | 614 ± 89 | 626 ± 93 |
| BCY8253 1/3/mpk, qw | 401 ± 15 | 420 ± 34 | 536 ± 26 | 789 ± 71 | 713 ± 29 | 593 ± 65 | 637 ± 13 | 708 ± 40 |
| BCY8254 1/3/5 mpk, qw | 408 ± 65 | 442 ± 48 | 601 ± 71 | 737 ± 76 | 747 ± 73 | 565 ± 47 | 543 ± 53 | 599 ± 26 |
| BCY8255, 1/3/5 mpk, qw | 408 ± 62 | 482 ± 50 | 582 ± 39 | 750 ± 111 | 771 ± 96 | 698 ± 58 | 670 ± 83 | 761 ± 59 |

| Treatment | 18 | 21 | 23 | 25 | 28 | 30 | 32 | 35 |
|---|---|---|---|---|---|---|---|---|
| Vehicle, qw | 1950 ± 551 | 2149 ± 639 | | | | | | |
| BCY8245, 1/3/5 mpk, qw | 611 ± 93 | 654 ± 152 | 732 ± 139 | 755 ± 132 | 713 ± 114 | 762 ± 165 | 968 ± 290 | 1119 ± 216 |
| BCY8253 1/3/5 mpk, qw | 658 ± 95 | 697 ± 140 | 685 ± 110 | 737 ± 81 | 930 ± 100 | 965 ± 163 | 1029 ± 185 | 1293 ± 26 |
| BCY8254 1/3/5 mpk, qw | 623 ± 43 | 684 ± 97 | 740 ± 82 | 771 ± 158 | 840 ± 55 | 856 ± 129 | 883 ± 89 | 1004 ± 171 |
| BCY8255, 1/3/5 mpk, qw | 838 ± 127 | 856 ± 163 | 1003 ± 170 | 1058 ± 211 | 1103 ± 233 | 1182 ± 258 | 1259 ± 226 | 1320 ± 267 |

TABLE 9

Tumor volume trace over time

| | Days after the start of treatment | | | | | | |
|---|---|---|---|---|---|---|---|
| Treatment | 0 | 2 | 4 | 7 | 9 | 11 | 14 |
| Vehicle, qw | 161 ± 2 | 270 ± 14 | 357 ± 14 | 448 ± 17 | 570 ± 16 | 720 ± 36 | 948 ± 61 |
| BCY8245, 3 mpk, qw | 160 ± 5 | 220 ± 11 | 266 ± 15 | 218 ± 23 | 167 ± 10 | 161 ± 36 | 149 ± 43 |
| BCY8245, 3 mpk, biw | 162 ± 13 | 243 ± 19 | 211 ± 12 | 101 ± 11 | 100 ± 8 | 87 ± 7 | 65 ± 3 |
| BCY8245, 5 mpk, qw | 160 ± 9 | 176 ± 7 | 191 ± 3 | 105 ± 8 | 82 ± 3 | 91 ± 14 | 83 ± 8 |
| BCY8253, 3 mpk, qw | 162 ± 7 | 187 ± 9 | 176 ± 20 | 159 ± 15 | 147 ± 8 | 114 ± 13 | 98 ± 3 |
| BCY8253, 3 mpk, biw | 162 ± 14 | 174 ± 9 | 149 ± 7 | 70 ± 2 | 68 ± 6 | 58 ± 2 | 49 ± 5 |
| BCY8253, 5 mpk, qw | 161 ± 10 | 161 ± 9 | 121 ± 9 | 97 ± 3 | 79 ± 6 | 82 ± 8 | 68 ± 9 |
| BCY8255, 3 mpk, qw | 162 ± 8 | 195 ± 14 | 160 ± 5 | 123 ± 1 | 108 ± 5 | 104 ± 3 | 100 ± 9 |
| BCY8255, 3 mpk, biw | 162 ± 15 | 204 ± 16 | 148 ± 11 | 132 ± 16 | 102 ± 20 | 106 ± 38 | 96 ± 35 |
| BCY8255, 5 mpk, qw | 164 ± 8 | 171 ± 8 | 103 ± 9 | 101 ± 5 | 89 ± 11 | 87 ± 32 | 97 ± 44 |

5.3 Tumor Growth Inhibition Analysis

Tumor growth inhibition rate for BCY7683, BCY7825, BCY7826, BCY8245, BCY8253, BCY8254 and BCY8255 in the NCI-H292 xenograft model on day 14 was calculated based on tumor volume measurements.

TABLE 10

Tumor growth inhibition analysis

| Treatment | Tumor Volume (mm$^3$)$^a$ | T/C$^b$ (%) | TGI (%) | P value compare with vehicle |
|---|---|---|---|---|
| Vehicle, biw | 879 ± 88 | — | — | — |
| BCY7683, 5 mpk, biw/qw | 47 ± 9 | 5.3 | 118.4 | p < 0.001 |

$^a$Mean ± SEM.
$^b$Tumor Growth Inhibition is calculated by dividing the group average tumor volume for the treated group by the group average tumor volume for the control group (T/C).

TABLE 11

Tumor growth inhibition analysis

| Treatment | Tumor Volume (mm$^3$)$^a$ | T/C$^b$ (%) | TGI (%) | P value |
|---|---|---|---|---|
| Vehicle, biw | 1107 ± 210 | — | — | — |
| BCY7825, 1 mpk, biw | 1063 ± 139 | 96.0 | 4.3 | p > 0.05 |
| BCY7825, 3 mpk, biw | 80 ± 29 | 7.3 | 108.3 | p < 0.001 |
| BCY7825, 3 mpk, qw | 177 ± 34 | 16.0 | 97.9 | p < 0.001 |
| BCY7826, 1 mpk, biw | 774 ± 151 | 70.0 | 34.9 | p > 0.05 |
| BCY7826, 3 mpk, biw | 93 ± 33 | 8.4 | 106.9 | p < 0.001 |
| BCY7826, 3 mpk, qw | 425 ± 25 | 38.4 | 71.7 | p < 0.01 |

TABLE 12

Tumor growth inhibition analysis

| Treatment | Tumor Volume (mm$^3$)$^a$ | T/C$^b$ (%) | TGI (%) | P value compare with vehicle |
|---|---|---|---|---|
| Vehicle, qw | 2149 ± 639 | — | — | — |
| BCY8245, 1/3/5 mpk, qw | 654 ± 152 | 30.4 | 85.7 | p < 0.05 |
| BCY8253, 1/3/5 mpk, qw | 697 ± 140 | 32.4 | 83.0 | p < 0.05 |
| BCY8254, 1/3/5 mpk, qw | 684 ± 97 | 31.8 | 84.1 | p < 0.05 |
| BCY8255, 1/3/5 mpk, qw | 856 ± 163 | 39.8 | 74.2 | p < 0.05 |

$^a$Mean ± SEM.
$^b$Tumor Growth Inhibition is calculated by dividing the group average tumor volume for the treated group by the group average tumor volume for the control group (T/C).

TABLE 13

Tumor growth inhibition analysis

| Treatment | Tumor Volume (mm$^3$)$^a$ | T/C$^b$ (%) | TGI (%) | P value compare with vehicle |
|---|---|---|---|---|
| Vehicle, qw | 948 ± 61 | — | — | — |
| BCY8245, 3 mpk, qw | 149 ± 43 | 15.8 | 101.4 | p < 0.001 |
| BCY8245, 3 mpk, biw | 65 ± 3 | 6.9 | 112.2 | p < 0.001 |
| BCY8245, 5 mpk, qw | 83 ± 8 | 8.8 | 109.8 | p < 0.001 |
| BCY8253, 3 mpk, qw | 98 ± 3 | 10.4 | 108.1 | p < 0.001 |
| BCY8253, 3 mpk, biw | 49 ± 5 | 5.2 | 114.3 | p < 0.001 |
| BCY8253, 5 mpk, qw | 68 ± 9 | 7.2 | 111.9 | p < 0.001 |
| BCY8255, 3 mpk, qw | 100 ± 9 | 10.6 | 107.9 | p < 0.001 |
| BCY8255, 3 mpk, biw | 96 ± 35 | 10.1 | 108.5 | p < 0.001 |
| BCY8255, 5 mpk, qw | 97 ± 44 | 10.2 | 108.5 | p < 0.001 |

$^a$Mean ± SEM.
$^b$Tumor Growth Inhibition is calculated by dividing the group average tumor volume for the treated group by the group average tumor volume for the control group (T/C).

6. Results Summary and Discussion

In this study, the therapeutic efficacy of BCY7683, BCY7825, BCY7826, BCY8245, BCY8253, BCY8254 and BCY8255 in the NCI-H292 xenograft model was evaluated. The measured tumor volumes of all treatment groups at various time points are shown in FIGS. 1 to 10 and Tables 5 to 13.

The mean tumor size of vehicle treated mice reached 879 mm$^3$ on day 14. BCY7683 at 5 mg/kg showed rapid tumor regress after the treatment, but the treatment induced severe bodyweight loss, then the dosing was suspended on day 3 and adjusted to 3 mg/kg on day 7. Finally, BCY7683 (TV=47 mm$^3$, TGI=118.4%, p<0.001) produced obvious anti-tumor efficacy and all mice survived to the endpoint.

The mean tumor size of vehicle treated mice reached 1107 mm$^3$ on day 21. BCY7825 at 1 mg/kg (TV=1063 mm$^3$, TGI=4.3%, p>0.05) didn't produce any anti-tumor activity, BCY7825 at 3 mg/kg biw (TV=80 mm$^3$, TGI=108.3%, p<0.001) and 3 mg/kg qw (TV=177 mm$^3$, TGI=97.9%, p<0.001) regressed the tumor quickly and showed potent anti-tumor activity.

BCY7826 at 1 mg/kg (TV=774 mm$^3$, TGI=34.9%, p>0.05) didn't produce obvious anti-tumor activity, BCY7826 at 3 mg/kg biw (TV=93 mm$^3$, TGI=106.9%, p<0.001) and 3 mg/kg (TV=425 mm$^3$, TGI=71.7%, p<0.01) qw produced dosing frequency dependent antitumor activity. Among them, BCY7826 at 3 mg/kg biw induced obvious tumor regression.

BCY8245, BCY8253, BCY8254 and BCY8255 at 1 mg/kg didn't produce significant antitumor activity, all of the four test articles showed obvious antitumor activity after increasing the dosage to 3 mg/kg from day 7, but the efficacy was not further improved after increasing the dosage to 5 mg/kg on day 21. In this study, all of the treatment animals showed continued bodyweight loss during the dosing schedule, this may be due to the tumor burden and the toxicity of test articles.

BCY8245 at 3 mg/kg, qw (TV=149 mm$^3$, TGI=101.4%, p<0.001), 3 mg/kg, biw (TV=65 mm$^3$, TGI=112.2%, p<0.001) and 5 mg/kg, qw (TV=83 mm$^3$, TGI=109.8%, p<0.001) produced significant antitumor activity.

BCY8253 at 3 mg/kg, qw (TV=98 mm$^3$, TGI=108.1%, p<0.001), 3 mg/kg, biw (TV=49 mm$^3$, TGI=114.3%, p<0.001) and at 5 mg/kg, qw (TV=68 mm³, TGI=111.9%, p<0.001) produced significant antitumor activity.

BCY8255 at 3 mg/kg, qw (TV=100 mm³, TGI=107.9%, p<0.001), 3 mg/kg, biw (TV=96 mm³, TGI=108.5%, p<0.001) and at 5 mg/kg, qw (TV=97 mm³, TGI=108.5%, p<0.001) produced significant antitumor activity.

All of the test articles at 3 mg/kg, qw, 3 mg/kg, biw and 5 mg/kg, qw showed comparable antitumor activity, the efficacy didn't further improve when increasing the dosage or dose-frequency.

In this study, animals treated with BCY8253 at 5 mg/kg showed over average 15% bodyweight loss at day 9, mice in other groups maintained the bodyweight well.

Example 2: In Vivo Efficacy Test of BCY7825, BCY8245, BCY8253, BCY8254 and BCY8255 in Treatment of HT-1376 Xenograft (Bladder Cancer Model) in CB17-SCID Mice 1 Study Objective The objective of the research is to evaluate the in vivo anti-tumor efficacy of test articles in treatment of HT-1376 xenograft in CB17-SCID mice.

2. Experimental Design

| Group | Treatment | n | Dose (mg/kg) | Dosing Volume (µl/g) | Dosing Route | Schedule |
|---|---|---|---|---|---|---|
| 1 | Vehicle | 3 | — | 10 | iv | qw |
| 2 | BCY7825 | 3 | 1 mg/kg | 10 | iv | qw |
| 3 | BCY7825 | 3 | 3 mg/kg | 10 | iv | qw |
| 4 | BCY8245 | 3 | 1/3ᵃ mg/kg | 10 | iv | qw |
| 5 | BCY8253 | 3 | 1/3ᵃ mg/kg | 10 | iv | qw |
| 6 | BCY8254 | 3 | 1/3ᵃ mg/kg | 10 | iv | qw |
| 7 | BCY8255 | 3 | 1/3ᵃ mg/kg | 10 | iv | qw |
| 8 | Vehicle | 5 | — | 10 | iv | qw |
| 9 | BCY8245 | 3 | 3 mg/kg | 10 | iv | qw |
| 10 | BCY8245 | 3 | 3 mg/kg | 10 | iv | biw |
| 11 | BCY8245 | 3 | 5 mg/kg | 10 | iv | qw |
| 12 | BCY8253 | 3 | 3 mg/kg | 10 | iv | qw |
| 13 | BCY8253 | 3 | 3 mg/kg | 10 | iv | biw |
| 14 | BCY8253 | 3 | 5 mg/kg | 10 | iv | qw |
| 15 | BCY8255 | 3 | 3 mg/kg | 10 | iv | qw |
| 16 | BCY8255 | 3 | 3 mg/kg | 10 | iv | biw |
| 17 | BCY8255 | 3 | 5 mg/kg | 10 | iv | qw |

ᵃ1 mg/kg for the first week and 3 mg/kg for the following 2 weeks

3. Materials 3.1 Animals and Housing Condition
3.1.1. Animals
  Species: Mus Musculus
  Strain: CB17-SCID
  Age: 6-8 weeks
  Sex: female
  Body weight: 18-22 g
  Number of animals: 21-41 mice plus spare
  Animal supplier: Shanghai LC Laboratory Animal Co., LTD.
3.1.2. Housing Condition The mice were kept in individual ventilation cages at constant temperature and humidity with 3 or 5 animals in each cage.
  Temperature: 20~26° C.
  Humidity 40-70%.

Cages: Made of polycarbonate. The size is 300 mm×180 mm×150 mm. The bedding material is corn cob, which is changed twice per week.

Diet: Animals had free access to irradiation sterilized dry granule food during the entire study period.

Water: Animals had free access to sterile drinking water.

Cage identification: The identification labels for each cage contained the following information: number of animals, sex, strain, the date received, treatment, study number, group number and the starting date of the treatment.

Animal identification: Animals were marked by ear coding.

4. Experimental Methods and Procedures 4.1 Cell Culture

The HT-1376 tumor cells were maintained in vitro as a monolayer culture in EMEM medium supplemented with 10% heat inactivated fetal bovine serum at 37° C. in an atmosphere of 5% $CO_2$ in air. The tumor cells were routinely subcultured twice weekly by trypsin-EDTA treatment.

The cells growing in an exponential growth phase were harvested and counted for tumor inoculation.

4.2 Tumor Inoculation

Each mouse was inoculated subcutaneously at the right flank with HT-1376 tumor cells ($5\times10^6$) in 0.2 ml of PBS with matrigel (1:1) for tumor development. Animals were randomized when the average tumor volume reached 153-164 mm³. The test article administration and the animal numbers in each group were shown in the experimental design table.

4.3 Testing Article Formulation Preparation

| Test article | Con. (mg/ml) | Formulation |
|---|---|---|
| Vehicle | — | 25 mM Histidine pH 7 10% sucrose |
| BCY7825 | 0.1 | Dilute 90 µl 1 mg/ml BCY7825 stock with 810 µl 10% Kolliphor, 50 mM Hepes pH 7 |
| BCY7825 | 0.3 | Dilute 270 µl 1 mg/ml BCY7825 stock with 630 µl 10% Kolliphor, 50 mM Hepes pH 7 |
| BCY8245 | 0.1 | Dilute 90 µl 1 mg/ml BCY8245 stock with 810 µl buffer (vehicle) |
| BCY8245 | 0.3 | Dilute 270 µl 1 mg/ml BCY8245 stock with 630 µl buffer (vehicle) |
| BCY8253 | 0.1 | Dilute 90 µl 1 mg/ml BCY8253 stock with 810 µl buffer (vehicle) |
| BCY8253 | 0.3 | Dilute 270 µl 1 mg/ml BCY8253 stock with 630 µl buffer (vehicle) |
| BCY8254 | 0.3 | Dilute 270 µl 1 mg/ml BCY8254 stock with 630 µl buffer (vehicle) |
| BCY8255 | 0.1 | Dilute 900 µl 1 mg/ml BCY8255 stock with 810 µl buffer (vehicle) |
| BCY8255 | 0.3 | Dilute 270 µl 1 mg/ml BCY8255 stock with 630 µl buffer (vehicle) |

| Test article | Con. (mg/ml) | Formulation |
|---|---|---|
| Vehicle | — | 25 mM Histidine pH 7 10% sucrose |
| BCY8245 | 0.5 | Dilute 400 µl 1 mg/ml BCY8245 stock with 400 µl Histidine buffer |
| BCY8245 | 0.3 | Dilute 240 µl 1 mg/ml BCY8245 stock with 560 µl Histidine buffer |
| BCY8253 | 0.5 | Dilute 400 µl 1 mg/ml BCY8253 stock with 400 µl Histidine buffer |

-continued

| Test article | Con. (mg/ml) | Formulation |
|---|---|---|
| BCY8253 | 0.3 | Dilute 240 μl 1 mg/ml BCY8253 stock with 560 μl Histidine buffer |
| BCY8255 | 0.5 | Dilute 400 μl 1 mg/ml BCY8255 stock with 400 μl Acetate buffer |
| BCY8255 | 0.3 | Dilute 240 μl 1 mg/ml BCY8255 stock with 560 μl Acetate buffer |

1. Histidine buffer: 25 mM Histidine pH7 10% sucrose
2. Acetate buffer: 50 mM Acetate/acetic acid pH 5 10% sucrose 4.4 Sample Collection At the end of study, the plasma of group 3, 4, 5, 6 and group 7 were collected at 5 min, 15 min, 30 min, 60 min and 120 min post last dosing. The plasma of group 11, 14 and 17 were collected at 5 min, 15 min, 30 min, 60 min and 120 min post last dosing. The tumor of groups 11, 14 and group 17 were collected at 2 h post last dosing. The tumor of groups 8, 9, 10, 12, 13, 15 and 16 were collected at 2 h post last dosing.

5. Results 5.1 Tumor Growth Curves

Tumor growth curves are shown in FIGS. 11 to 18.

5.2 Tumor Volume Trace

Mean tumor volume over time in female CB17-SCID mice bearing HT-1376 xenograft is shown in Tables 14 and 15.

TABLE 14

Tumor volume trace over time

| | | Days after the start of treatment | | | | | | | | | |
|---|---|---|---|---|---|---|---|---|---|---|---|
| Gr. | Treatment | 0 | 2 | 4 | 7 | 9 | 11 | 14 | 16 | 18 | 21 |
| 1 | Vehicle, qw | 168 ± 37 | 220 ± 47 | 274 ± 56 | 391 ± 73 | 442 ± 75 | 503 ± 82 | 576 ± 84 | 649 ± 81 | 801 ± 84 | 884 ± 81 |
| 2 | BCY7825, 1 mpk, qw | 165 ± 26 | 222 ± 42 | 280 ± 36 | 385 ± 31 | 431 ± 21 | 478 ± 31 | 546 ± 17 | 636 ± 37 | 603 ± 94 | 772 ± 101 |
| 3 | BCY7825, 3 mpk, qw | 165 ± 23 | 195 ± 26 | 209 ± 12 | 307 ± 24 | 365 ± 21 | 358 ± 15 | 412 ± 13 | 423 ± 19 | 467 ± 14 | 545 ± 9 |
| 4 | BCY8245, 1/3 mpk, qw | 164 ± 16 | 184 ± 12 | 206 ± 14 | 265 ± 21 | 291 ± 10 | 281 ± 28 | 335 ± 16 | 354 ± 11 | 309 ± 19 | 347 ± 14 |
| 5 | BCY8253, 1/3 mpk, qw | 163 ± 37 | 201 ± 47 | 240 ± 42 | 333 ± 49 | 358 ± 19 | 305 ± 28 | 370 ± 33 | 386 ± 41 | 348 ± 15 | 448 ± 19 |
| 6 | BCY8254, 1/3 mpk, qw | 162 ± 17 | 156 ± 18 | 200 ± 22 | 305 ± 28 | 338 ± 55 | 326 ± 33 | 419 ± 36 | 429 ± 42 | 453 ± 34 | 539 ± 75 |
| 7 | BCY8255, 1/3 mpk, qw | 162 ± 28 | 198 ± 40 | 257 ± 43 | 352 ± 49 | 375 ± 81 | 332 ± 22 | 385 ± 45 | 440 ± 12 | 514 ± 144 | 549 ± 149 |

TABLE 15

Tumor volume trace over time

| | | Days after the start of treatment | | | | | | |
|---|---|---|---|---|---|---|---|---|
| Gr. | Treatment | 0 | 2 | 5 | 7 | 9 | 12 | 14 |
| 8 | Vehicle, qw | 153 ± 16 | 266 ± 30 | 398 ± 41 | 529 ± 56 | 721 ± 76 | 908 ± 91 | 1069 ± 90 |
| 9 | BCY8245, 3 mpk, qw | 153 ± 26 | 254 ± 53 | 298 ± 69 | 398 ± 61 | 468 ± 73 | 502 ± 67 | 603 ± 76 |
| 10 | BCY8245, 3 mpk, biw | 154 ± 30 | 248 ± 58 | 203 ± 15 | 273 ± 45 | 356 ± 50 | 391 ± 53 | 407 ± 53 |
| 11 | BCY8245, 5 mpk, qw | 153 ± 15 | 237 ± 41 | 228 ± 36 | 317 ± 31 | 394 ± 20 | 438 ± 31 | 465 ± 33 |
| 12 | BCY8253, 3 mpk, qw | 153 ± 12 | 209 ± 9 | 269 ± 8 | 343 ± 29 | 447 ± 33 | 466 ± 25 | 533 ± 29 |
| 13 | BCY8253, 3 mpk, biw | 153 ± 13 | 214 ± 33 | 246 ± 18 | 286 ± 23 | 364 ± 41 | 400 ± 33 | 442 ± 45 |
| 14 | BCY8253, 5 mpk, qw | 153 ± 15 | 217 ± 49 | 231 ± 49 | 308 ± 36 | 360 ± 44 | 401 ± 70 | 442 ± 62 |
| 15 | BCY8255, 3 mpk, qw | 153 ± 22 | 233 ± 3 | 284 ± 6 | 358 ± 27 | 476 ± 40 | 486 ± 65 | 538 ± 59 |
| 16 | BCY8255, 3 mpk, biw | 153 ± 21 | 233 ± 33 | 218 ± 23 | 298 ± 45 | 336 ± 42 | 365 ± 31 | 390 ± 40 |
| 17 | BCY8255, 5 mpk, qw | 152 ± 17 | 233 ± 30 | 290 ± 4 | 338 ± 10 | 406 ± 26 | 459 ± 68 | 516 ± 64 |

5.3 Tumor Growth Inhibition Analysis

Tumor growth inhibition rate for Test articles in the HT-1376 xenograft model was calculated based on tumor volume measurements at day 21 after the start of treatment.

TABLE 16

Tumor growth inhibition analysis

| Gr | Treatment | Tumor Volume (mm³)$^a$ | T/C$^b$ (%) | TGI (%) | P value compared with vehicle |
|---|---|---|---|---|---|
| 1 | Vehicle, qw | 884 ± 81 | — | — | — |
| 2 | BCY7825, 1 mpk, qw | 772 ± 101 | 87.3 | 15.2 | p > 0.05 |
| 3 | BCY7825, 3 mpk, qw | 545 ± 9 | 61.6 | 46.9 | p < 0.05 |
| 4 | BCY8245, 3 mpk, qw | 347 ± 14 | 39.2 | 74.5 | p < 0.001 |
| 5 | BCY8253, 3 mpk, qw | 448 ± 19 | 50.6 | 60.2 | p < 0.01 |
| 6 | BCY8254, 3 mpk, qw | 539 ± 75 | 60.9 | 47.4 | p < 0.05 |
| 7 | BCY8255, 3 mpk, qw | 549 ± 149 | 62.1 | 45.9 | p < 0.05 |

$^a$Mean ± SEM.

TABLE 17

Tumor growth inhibition analysis

| Gr | Treatment | Tumor Volume (mm³)$^a$ | T/C$^b$ (%) | TGI (%) | P value compared with vehicle |
|---|---|---|---|---|---|
| 8 | Vehicle, qw | 1069 ± 90 | — | — | — |
| 9 | BCY8245, 3 mpk, qw | 603 ± 76 | 56.4 | 50.9 | p < 0.01 |
| 10 | BCY8245, 3 mpk, biw | 407 ± 53 | 38.1 | 72.3 | p < 0.001 |
| 11 | BCY8245, 5 mpk, qw | 465 ± 33 | 43.5 | 66.0 | p < 0.001 |
| 12 | BCY8253, 3 mpk, qw | 533 ± 29 | 49.8 | 58.5 | p < 0.01 |
| 13 | BCY8253, 3 mpk, biw | 442 ± 45 | 41.3 | 68.4 | p < 0.001 |
| 14 | BCY8253, 5 mpk, qw | 442 ± 62 | 41.4 | 68.5 | p < 0.001 |
| 15 | BCY8255, 3 mpk, qw | 538 ± 59 | 50.3 | 58.0 | p < 0.01 |
| 16 | BCY8255, 3 mpk, biw | 390 ± 40 | 36.5 | 74.1 | p < 0.001 |
| 17 | BCY8255, 5 mpk, qw | 516 ± 64 | 48.3 | 60.3 | p < 0.01 |

$^a$Mean ± SEM.
$^b$Tumor Growth Inhibition is calculated by dividing the group average tumor volume for the treated group by the group average tumor volume for the control group (T/C).

6. Results Summary and Discussion

Groups 1-7

In this study, the therapeutic efficacy of test articles in the HT-1376 xenograft model was evaluated. The measured tumor volumes of all treatment groups at various time points are shown in FIGS. 11 to 15 and Tables 14 and 15.

The mean tumor size of vehicle treated mice reached 884 mm³ on day 21. BCY7825 at 1 mg/kg (TV=772 mm³, TGI=15.2%, p>0.05) didn't produce significant antitumor activity, BCY7825 at 3 mg/kg (TV=545 mm³, TGI=46.9%, p<0.05) produced significant antitumor activity.

BCY8245, BCY8253, BCY8254 and BCY8255 at 1 mg/kg produced slight antitumor activity, and better efficacy was found after increasing dosage to 3 mg/kg from day 7.

In this study, some mice treated with test articles at 3 mg/kg showed over 10% bodyweight loss, one mouse treated with BCY8255 at 3 mg/kg was found dead on day 16, the mice in vehicle and BCY7825 1 mg/kg groups maintained the bodyweight well.

Groups 8-17

Figure 16:
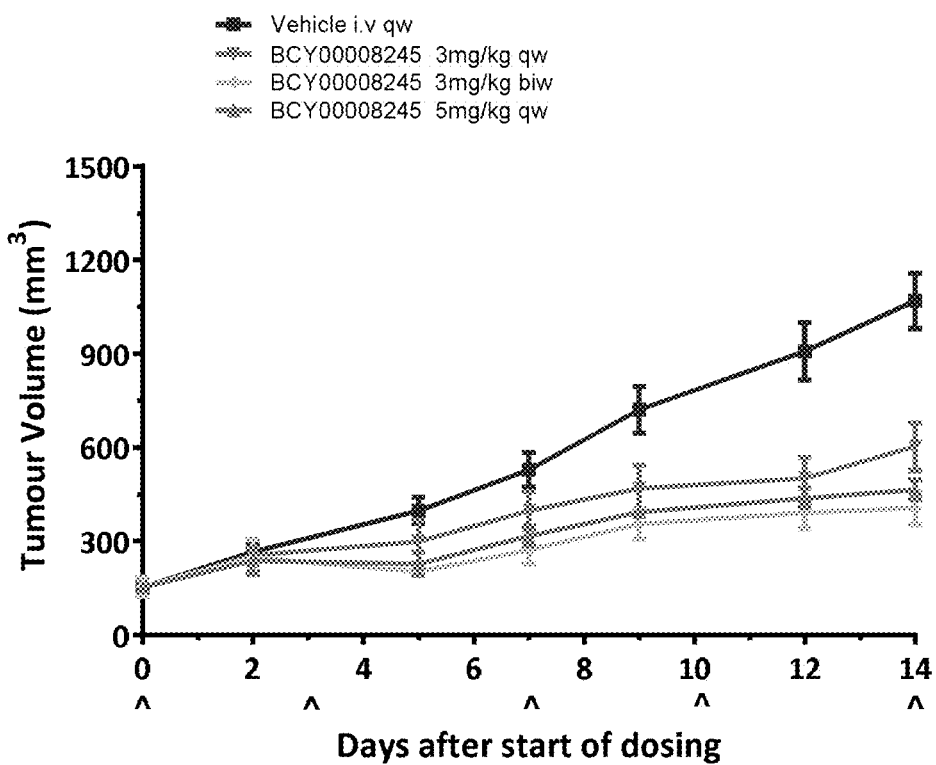
FIGS. 16 to 18: Tumor volume traces after administering BCY8245, BCY8253 and BCY8255, respectively, to female CB17-SCID mice bearing HT-1376 xenograft.
Figure 17:
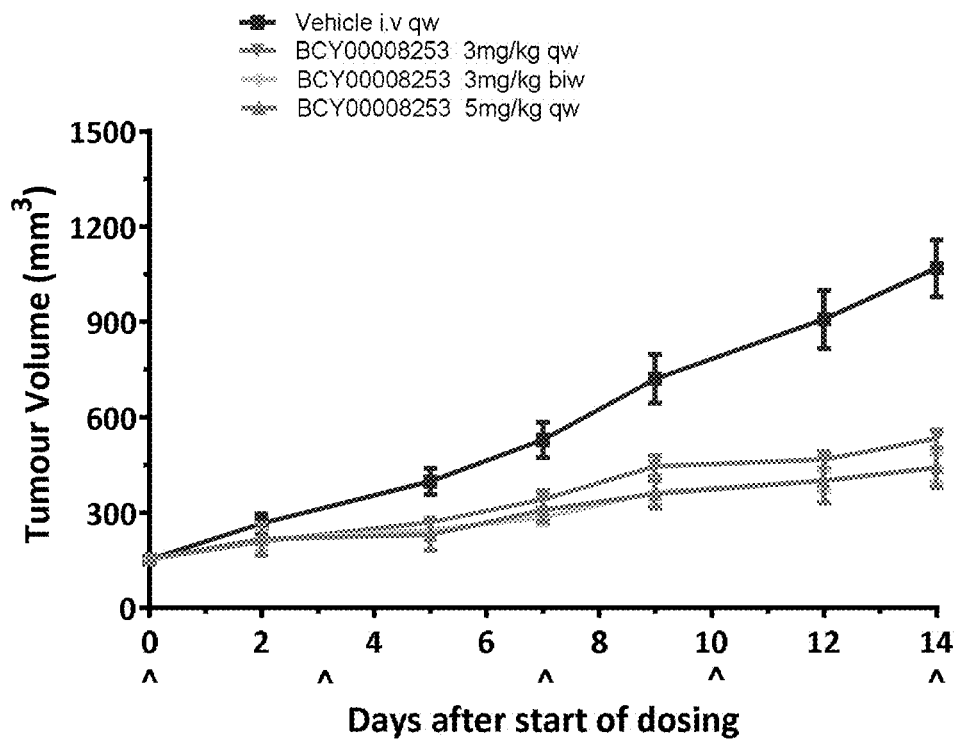
Figure 18:
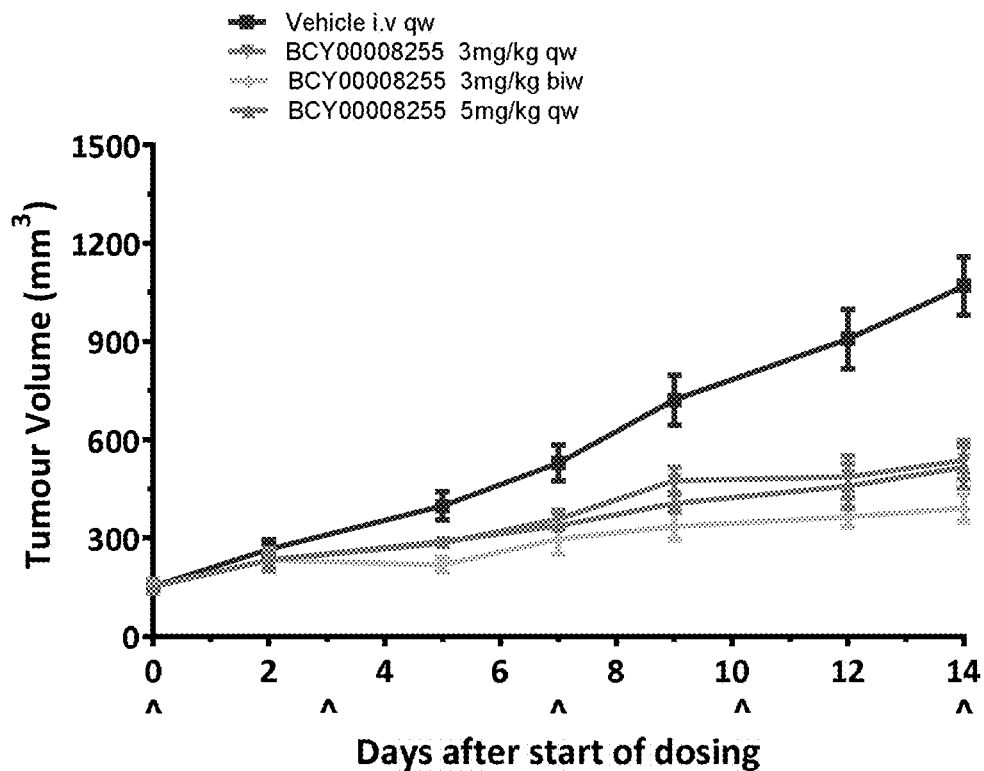

In this study, the therapeutic efficacy of test articles in the HT-1376 xenograft model was evaluated. The measured tumor volumes of all treatment groups at various time points are shown in FIGS. 16 to 18 and Tables 16 and 17.

BCY8245 at 3 mg/kg, qw (TV=603 mm³, TGI=50.9%, p<0.01), 3 mg/kg, biw (TV=407 mm³, TGI=72.3%, p<0.001) and 5 mg/kg, qw (TV=465 mm³, TGI=66.0%, p<0.001) produced significant antitumor activity.

BCY8253 at 3 mg/kg, qw (TV=533 mm³, TGI=58.5%, p<0.01), 3 mg/kg, biw (TV=442 mm³, TGI=68.4%, p<0.001) and 5 mg/kg, qw (TV=442 mm³, TGI=68.5%, p<0.001) produced significant antitumor activity.

BCY8255 at 3 mg/kg, qw (TV=538 mm³, TGI=58.0%, p<0.01), 3 mg/kg, biw (TV=390 mm³, TGI=74.1%, p<0.001) and 5 mg/kg, qw (TV=516 mm³, TGI=60.3%, p<0.01) produced significant antitumor activity.

In this study, BCY8245 and BCY8253 at 5 mg/kg qw caused over 10% animal bodyweight loss during the treatment schedule.

Example 3: In Vivo Efficacy Study of BCY8245, BCY8253 and BCY8255 in Treatment of Panc2.13 Xenograft (Pancreatic Cancer Model) in Balb/c Nude Mice

1. Study Objective

The objective of the research is to evaluate the in vivo anti-tumor efficacy of test articles in treatment of Panc2.13 xenograft in Balb/c nude mice.

2. Experimental Design

| Group | Treatment | n | Dose (mg/kg) | Dosing Volume (μl/g) | Dosing Route | Schedule |
|---|---|---|---|---|---|---|
| 1 | Vehicle | 5 | — | 10 | iv | qw |
| 2 | BCY8245 | 3 | 3 mg/kg | 10 | iv | qw |
| 3 | BCY8245 | 3 | 3 mg/kg | 10 | iv | biw |
| 4 | BCY8245 | 3 | 5 mg/kg | 10 | iv | qw |
| 5 | BCY8253 | 3 | 3 mg/kg | 10 | iv | qw |
| 6 | BCY8253 | 3 | 3 mg/kg | 10 | iv | biw |
| 7 | BCY8253 | 3 | 5 mg/kg | 10 | iv | qw |
| 8 | BCY8255 | 3 | 3 mg/kg | 10 | iv | qw |
| 9 | BCY8255 | 3 | 3 mg/kg | 10 | iv | biw |
| 10 | BCY8255 | 3 | 5 mg/kg | 10 | iv | qw |

3. Materials 3.1 Animals and Housing Condition
3.1.1 Animals
  Species: Mus Musculus
  Strain: Balb/c nude
  Age: 6-8 weeks
  Sex: female
  Body weight: 18-22 g
  Number of animals: 41 mice plus spare
  Animal supplier: Shanghai LC Laboratory Animal Co., LTD.

3.1.2. Housing condition

The mice were kept in individual ventilation cages at constant temperature and humidity with 3 or 5 animals in each cage.
Temperature: 20~26° C.
Humidity 40-70%.
Cages: Made of polycarbonate. The size is 300 mm×180 mm×150 mm. The bedding material is corn cob, which is changed twice per week.
Diet: Animals had free access to irradiation sterilized dry granule food during the entire study period.
Water: Animals had free access to sterile drinking water.
Cage identification: The identification labels for each cage contained the following information: number of animals, sex, strain, the date received, treatment, study number, group number and the starting date of the treatment.
Animal identification: Animals were marked by ear coding.

4. Experimental Methods and Procedures 4.1 Cell Culture

The Panc2.13 tumor cells will be maintained in RMPI1640 medium supplemented with 15% heat inactivated fetal bovine serum and 10 units/ml human recombinant insulin at 37° C. in an atmosphere of 5% $CO_2$ in air. The tumor cells will be routinely subcultured twice weekly. The cells growing in an exponential growth phase will be harvested and counted for tumor inoculation.

4.2 Tumor Inoculation

Each mouse was inoculated subcutaneously at the right flank with Panc2.13 tumor cells (5×10$^6$) with Matrigel (1:1) in 0.2 ml of PBS for tumor development. 41 animals were randomized when the average tumor volume reached 149 mm$^3$. The test article administration and the animal numbers in each group were shown in the experimental design table.

4.3 Testing Article Formulation Preparation

| Test article | Con. (mg/ml) | Formulation |
|---|---|---|
| Vehicle | — | 25 mM Histidine pH 7 10% sucrose |
| BCY8245 | 0.5 | Dilute 400 μl 1 mg/ml BCY8245 stock with 400 μl Histidine buffer |
| BCY8245 | 0.3 | Dilute 240 μl 1 mg/ml BCY8245 stock with 560 μl Histidine buffer |
| BCY8253 | 0.5 | Dilute 400 μl 1 mg/ml BCY8253 stock with 400 μl Histidine buffer |
| BCY8253 | 0.3 | Dilute 240 μl 1 mg/ml BCY8253 stock with 560 μl Histidine buffer |
| BCY8255 | 0.5 | Dilute 400 μl 1 mg/ml BCY8255 stock with 400 μl Acetate buffer |
| BCY8255 | 0.3 | Dilute 240 μl 1 mg/ml BCY8255 stock with 560 μl Acetate buffer |

3. Histidine buffer: 25 mM Histidine pH7 10% sucrose
4. Acetate buffer: 50 mM Acetate/acetic acid pH 5 10% sucrose 4.4 Sample Collection At the end of study, the tumor of all groups were collected at 2 h post last dosing.

5. Results 5.1 Tumor Growth Curves

Figure 19:
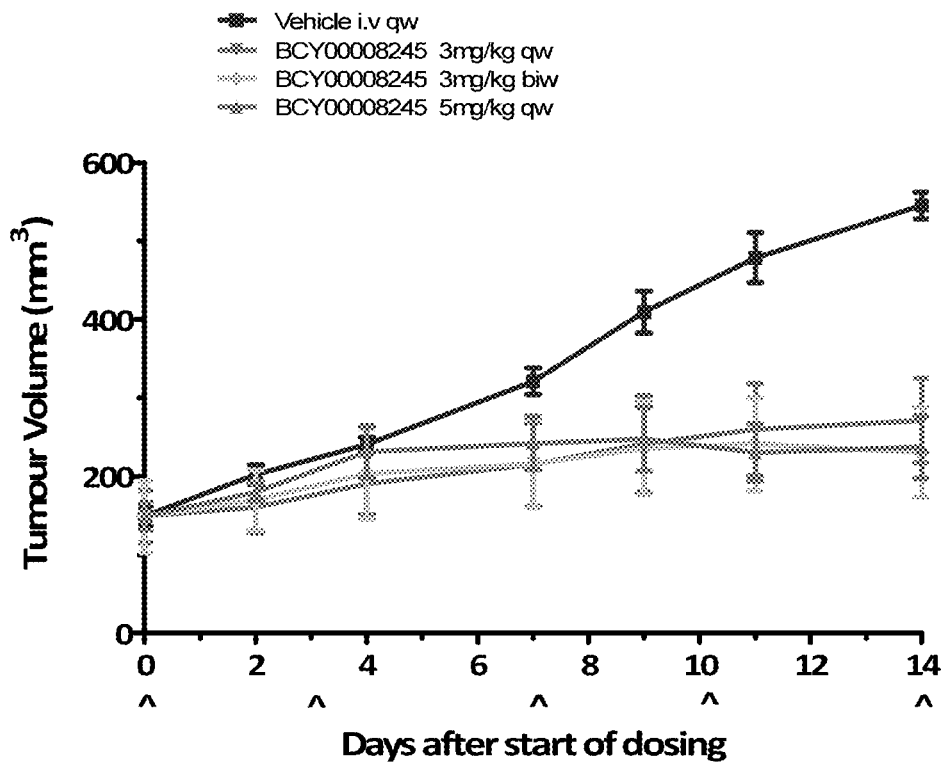
FIGS. 19 to 21: Tumor volume traces after administering BCY8245, BCY8253 and BCY8255, respectively, to female Balb/c nude mice bearing Panc2.13 xenograft.
Figure 20:
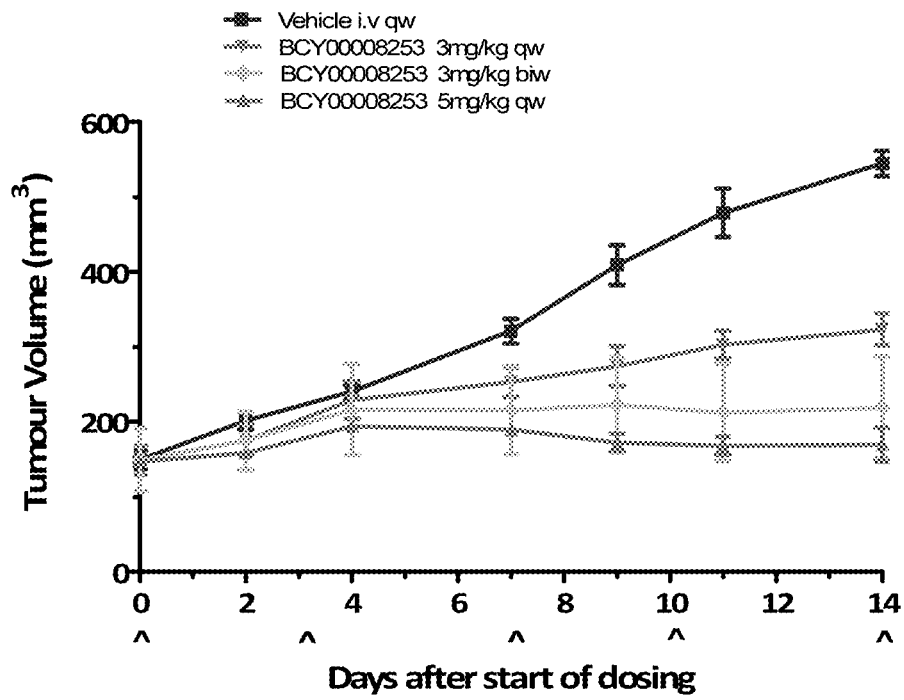
Figure 21:
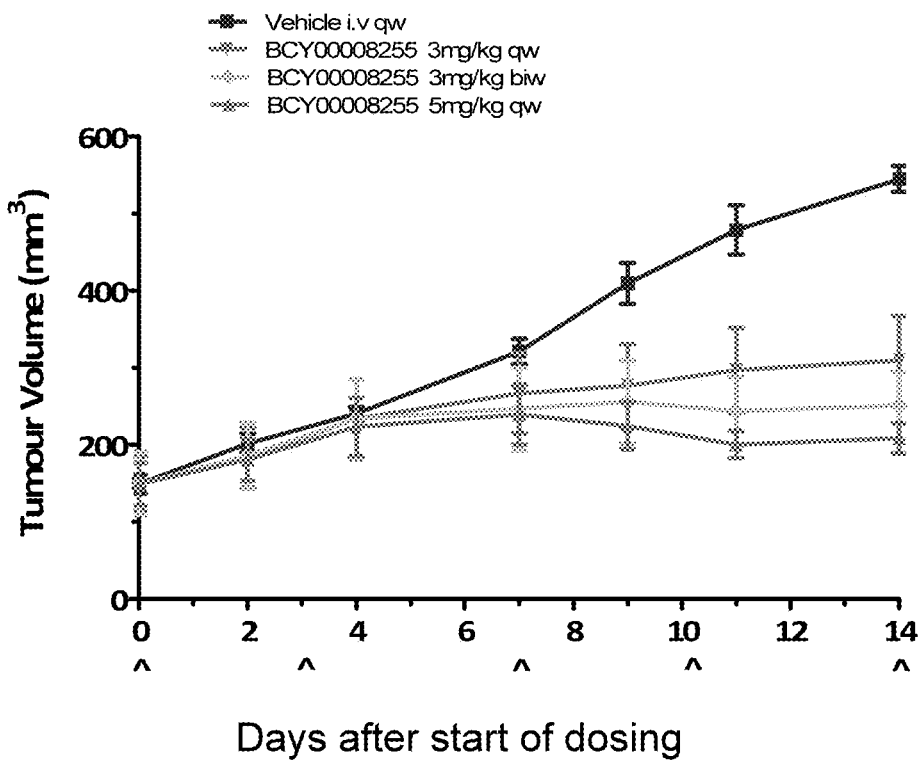

Tumor growth curves are shown in FIGS. 19 to 21.

5.2 Tumor Volume Trace

Mean tumor volume over time in female Balb/c nude mice bearing Panc2.13 xenograft is shown in Table 18.

TABLE 18

Tumor volume trace over time

| | | Days after the start of treatment | | | | | | |
|---|---|---|---|---|---|---|---|---|
| Gr. | Treatment | 0 | 2 | 4 | 7 | 9 | 11 | 14 |
| 1 | Vehicle, qw | 149 ± 12 | 202 ± 12 | 240 ± 9 | 321 ± 17 | 410 ± 27 | 479 ± 32 | 545 ± 17 |
| 2 | BCY8245, 3 mpk, qw | 149 ± 34 | 160 ± 33 | 191 ± 39 | 215 ± 53 | 242 ± 62 | 259 ± 59 | 271 ± 54 |
| 3 | BCY8245, 3 mpk, biw | 148 ± 46 | 170 ± 38 | 204 ± 57 | 216 ± 56 | 236 ± 59 | 241 ± 60 | 231 ± 57 |
| 4 | BCY8245, 5 mpk, qw | 149 ± 18 | 180 ± 11 | 231 ± 33 | 242 ± 34 | 248 ± 40 | 231 ± 37 | 238 ± 40 |
| 5 | BCY8253, 3 mpk, qw | 149 ± 19 | 176 ± 20 | 230 ± 25 | 253 ± 20 | 274 ± 27 | 303 ± 18 | 324 ± 21 |
| 6 | BCY8253, 3 mpk, biw | 149 ± 42 | 175 ± 39 | 217 ± 61 | 216 ± 59 | 222 ± 64 | 213 ± 64 | 219 ± 68 |
| 7 | BCY8253, 5 mpk, qw | 148 ± 7 | 159 ± 8 | 195 ± 5 | 190 ± 5 | 173 ± 11 | 168 ± 12 | 170 ± 23 |
| 8 | BCY8255, 3 mpk, qw | 150 ± 35 | 184 ± 39 | 234 ± 52 | 267 ± 52 | 277 ± 54 | 297 ± 55 | 310 ± 58 |
| 9 | BCY8255, 3 mpk, biw | 149 ± 41 | 186 ± 43 | 233 ± 52 | 247 ± 53 | 256 ± 54 | 244 ± 44 | 251 ± 44 |
| 10 | BCY8255, 5 mpk, qw | 150 ± 27 | 180 ± 27 | 223 ± 37 | 239 ± 39 | 224 ± 31 | 200 ± 18 | 209 ± 19 |

5.3 Tumor Growth Inhibition Analysis

Tumor growth inhibition rate for Test articles in the Panc2.13 xenograft model was calculated based on tumor volume measurements at day 14 after the start of treatment.

TABLE 19

Tumor growth inhibition analysis

| Gr | Treatment | Tumor Volume (mm³)[a] | T/C[b] (%) | TGI (%) | P value compared with vehicle |
|---|---|---|---|---|---|
| 1 | Vehicle, qw | 545 ± 17 | — | — | — |
| 2 | BCY8245, 3 mpk, qw | 271 ± 54 | 49.6 | 69.2 | p < 0.01 |
| 3 | BCY8245, 3 mpk, biw | 231 ± 57 | 42.3 | 79.1 | p < 0.001 |
| 4 | BCY8245, 5 mpk, qw | 238 ± 40 | 43.6 | 77.5 | p < 0.001 |
| 5 | BCY8253, 3 mpk, qw | 324 ± 21 | 59.3 | 55.9 | p < 0.01 |
| 6 | BCY8253, 3 mpk, biw | 219 ± 68 | 40.2 | 82.2 | p < 0.001 |
| 7 | BCY8253, 5 mpk, qw | 170 ± 23 | 31.1 | 94.5 | p < 0.001 |
| 8 | BCY8255, 3 mpk, qw | 310 ± 58 | 56.8 | 59.5 | p < 0.01 |
| 9 | BCY8255, 3 mpk, biw | 251 ± 44 | 46.0 | 74.3 | p < 0.001 |
| 10 | BCY8255, 5 mpk, qw | 209 ± 19 | 38.2 | 85.1 | p < 0.001 |

[a]Mean ± SEM.
[b]Tumor Growth Inhibition is calculated by dividing the group average tumor volume for the treated group by the group average tumor volume for the control group (T/C).

6. Results Summary and Discussion

In this study, the therapeutic efficacy of test articles in the Panc2.13 xenograft model was evaluated. The measured tumor volumes of all treatment groups at various time points are shown in FIGS. 19 to 21 and Tables 18 and 19.

BCY8245 at 3 mg/kg, qw (TV=271 mm³, TGI=69.2%, p<0.01), 3 mg/kg, biw (TV=231 mm³, TGI=79.1%, p<0.001) and 5 mg/kg, qw (TV=238 mm³, TGI=77.5%, p<0.001) produced significant antitumor activity.

BCY8253 at 3 mg/kg, qw (TV=324 mm³, TGI=59.8%, p<0.01), 3 mg/kg, biw (TV=219 mm³, TGI=82.2%, p<0.001) and 5 mg/kg, qw (TV=170 mm³, TGI=94.5%, p<0.001) produced significant anti-tumor activity in dose or dose-frequency dependent manner.

BCY8255 at 3 mg/kg, qw (TV=310 mm³, TGI=59.5%, p<0.01), 3 mg/kg, biw (TV=251 mm³, TGI=74.3%, p<0.001) and 5 mg/kg, qw (TV=209 mm³, TGI=85.1%, p<0.001) produced significant antitumor activity.

In this study, animals in all of 5 mg/kg qw groups lost over average 15% bodyweight, especially those in BCY8253 and BCY8255 5 mg/kg groups, which lost over 20% bodyweight during the treatment schedule.

Example 4: In Vivo Efficacy Study of BCY8245, BCY8253 and BCY8255 in Treatment of MDA-MB-468 Xenograft (Breast Cancer Model) in Balb/c Nude Mice 1. Study Objective The objective of the research is to evaluate the in vivo anti-tumor efficacy of BCY8245, BCY8253 and BCY8255 in treatment of MDA-MB-468 xenograft in Balb/c nude mice.

2. Experimental Design

| Group | Treatment | n | Dose (mg/kg) | Dosing Volume (μl/g) | Dosing Route | Schedule |
|---|---|---|---|---|---|---|
| 1 | Vehicle | 5 | — | 10 | iv | qw |
| 2 | BCY8245 | 3 | 3 mg/kg | 10 | iv | qw |
| 3 | BCY8245 | 3 | 3 mg/kg | 10 | iv | biw |
| 4 | BCY8245 | 3 | 5 mg/kg | 10 | iv | qw |
| 5 | BCY8253 | 3 | 3 mg/kg | 10 | iv | qw |
| 6 | BCY8253 | 3 | 3 mg/kg | 10 | iv | biw |
| 7 | BCY8253 | 3 | 5 mg/kg | 10 | iv | qw |
| 8 | BCY8255 | 3 | 3 mg/kg | 10 | iv | qw |
| 9 | BCY8255 | 3 | 3 mg/kg | 10 | iv | biw |
| 10 | BCY8255 | 3 | 5 mg/kg | 10 | iv | qw |

3. Materials 3.1 Animals and Housing Condition
3.1.1 Animals
   Species: Mus Musculus
   Strain: Balb/c nude
   Age: 6-8 weeks
   Sex: female
   Body weight: 18-22 g
   Number of animals: 41 mice plus spare
   Animal supplier: Shanghai LC Laboratory Animal Co., LTD.
3.1.2. Housing condition
   The mice were kept in individual ventilation cages at constant temperature and humidity with 3 or 5 animals in each cage.
   Temperature: 20~26° C.
   Humidity 40-70%.
   Cages: Made of polycarbonate. The size is 300 mm×180 mm×150 mm. The bedding material is corn cob, which is changed twice per week.
   Diet: Animals had free access to irradiation sterilized dry granule food during the entire study period.
   Water: Animals had free access to sterile drinking water.
   Cage identification: The identification labels for each cage contained the following information: number of animals, sex, strain, the date received, treatment, study number, group number and the starting date of the treatment.
   Animal identification: Animals were marked by ear coding.

4. Experimental Methods and Procedures 4.1 Cell Culture
   The tumor cells were maintained in Leibovitz's L-15 medium supplemented with 10% heat inactivated fetal bovine serum at 37° C. in an atmosphere of 5% $CO_2$ in air. The tumor cells were routinely subcultured twice weekly. The cells growing in an exponential growth phase were harvested and counted for tumor inoculation.
4.2 Tumor Inoculation
   Each mouse was inoculated subcutaneously at the right flank with MDA-MB-468 tumor cells (10×10⁶) in 0.2 ml of PBS supplemented with 50% matrigel for tumor development. 41 animals were randomized when the average tumor volume reached 196 mm³. The test article administration and the animal numbers in each group were shown in the experimental design table.

4.3 Testing Article Formulation Preparation

| Test article | Con. (mg/ml) | Formulation |
|---|---|---|
| Vehicle | — | 25 mM Histidine pH 7 10% sucrose |
| BCY8245 | 1 | Dissolve 10.56 mg BCY8245 in 10.518 ml Histidine buffer |
| BCY8245 | 0.5 | Dilute 400 μl 1 mg/ml BCY8245 stock with 400 μl Histidine buffer |
| BCY8245 | 0.3 | Dilute 240 μl 1 mg/ml BCY8245 stock with 560 μl Histidine buffer |
| BCY8253 | 1 | Dissolve 11.35 mg BCY8253 in 11.010 ml Histidine buffer |
| BCY8253 | 0.5 | Dilute 400 μl 1 mg/ml BCY8253 stock with 400 μl Histidine buffer |
| BCY8253 | 0.3 | Dilute 240 μl 1 mg/ml BCY8253 stock with 560 μl Histidine buffer |
| BCY8255 | 1 | Dissolve 10.78 mg BCY8255 in 10.715 ml Acetate buffer |
| BCY8255 | 0.5 | Dilute 400 μl 1 mg/ml BCY8255 stock with 400 μl Acetate buffer |
| BCY8255 | 0.3 | Dilute 240 μl 1 mg/ml BCY8255 stock with 560 μl Acetate buffer |

1. Histidine buffer: 25 mM Histidine pH7 10% sucrose
2. Acetate buffer: 50 mM Acetate/acetic acid pH 5 10% sucrose
3. BCY8245(1 mg/mL), BCY8253(1 mg/mL) and BCY8255(1 mg/mL) stocks were separated into individual tubes and stored at −80° C.

4.4 Sample Collection

At the day 21 of study, the plasma of group 2, 5 and 8 were collected at 5 min, 15 min, 30 min, 60 min and 120 min post last dosing. The tumors of groups 1, 3, 6 and 9 were collected at 2 h post last dosing. The animals in group 4, 7 and 10 were kept running for another 21 days without any dosing, and the tumors of these groups were collected on day 42.

5. Results

5.1 Tumor Growth Curves

Figure 22:
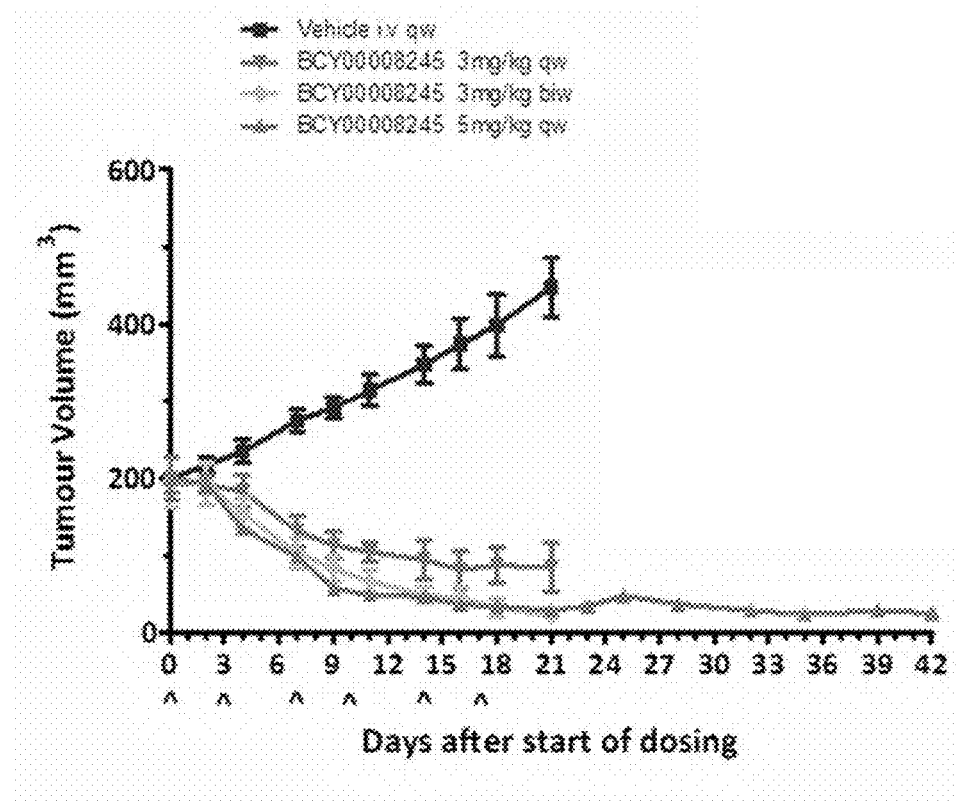
FIGS. 22 to 24: Tumor volume traces after administering BCY8245, BCY8253 and BCY8255, respectively, to female Balb/c nude mice bearing MDA-MB-468 xenograft.
Figure 23:
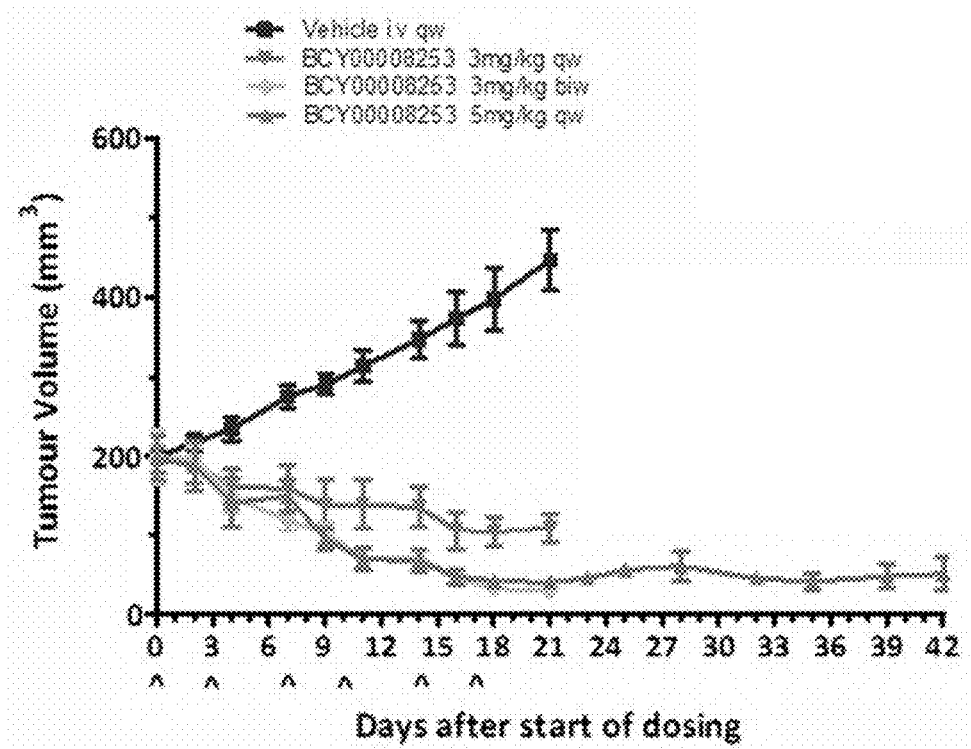
Figure 24:
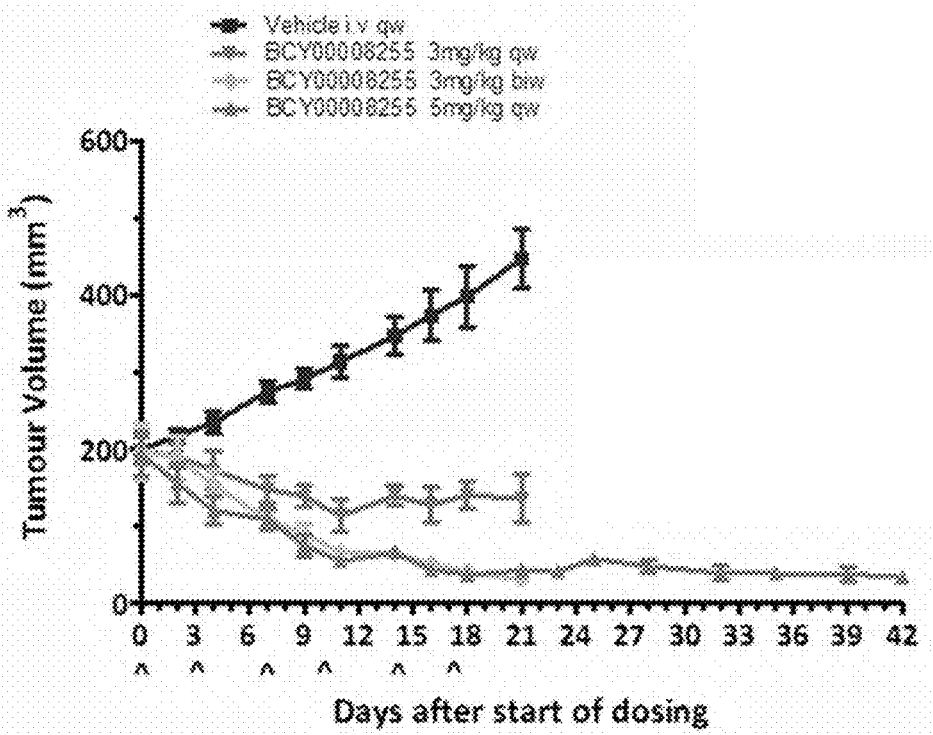
Figure 25:
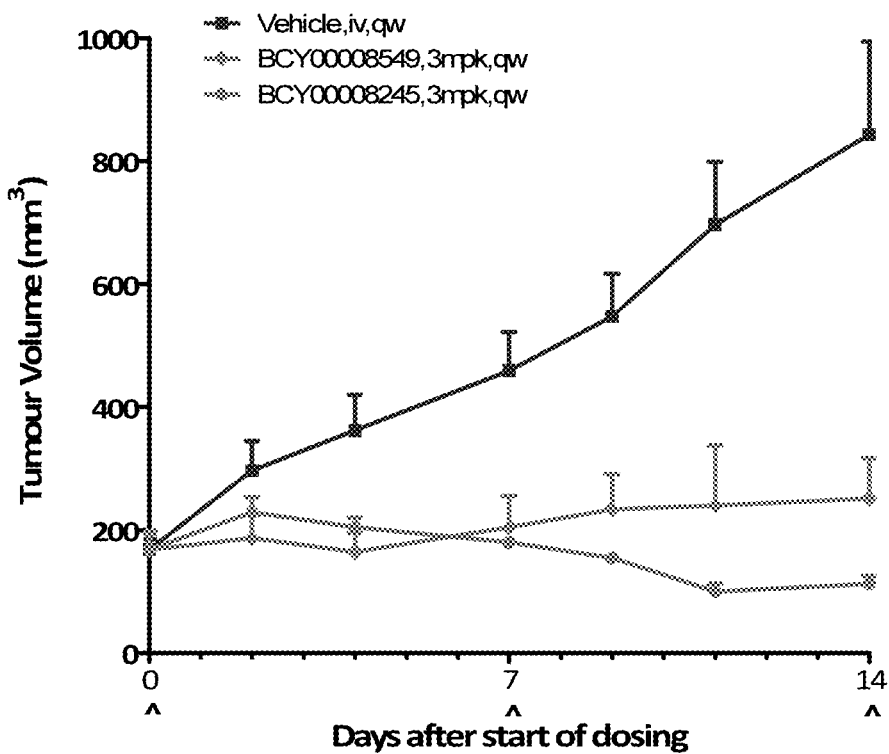
FIGS. 25 to 28: Tumor volume traces after administering BCY8549, BCY8550, BCY8783 and BCY8784, respectively (with BCY8245 as control), to female BALB/c nude mice bearing NCI-H292 xenograft.
Figure 26:
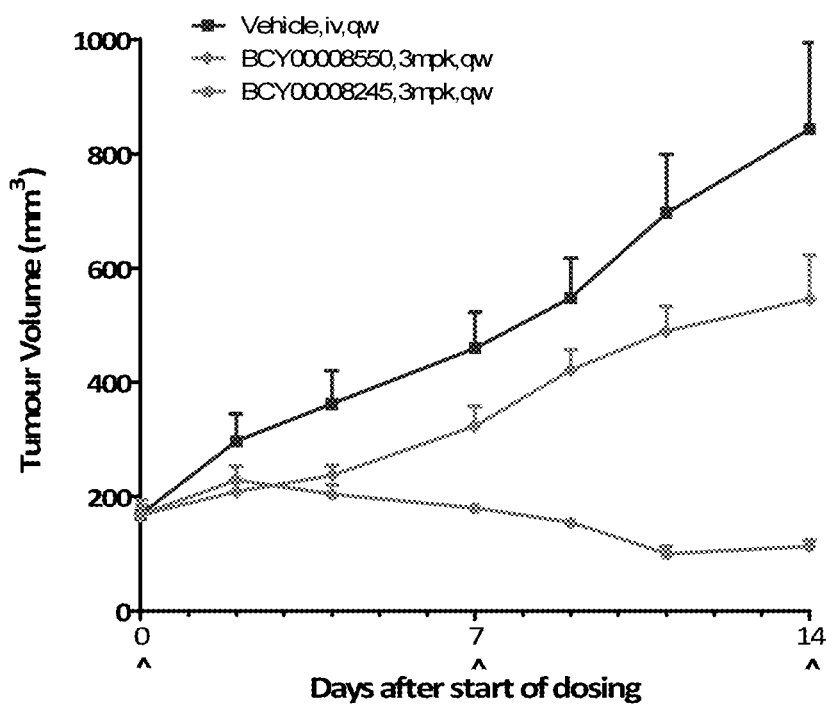
Figure 27:
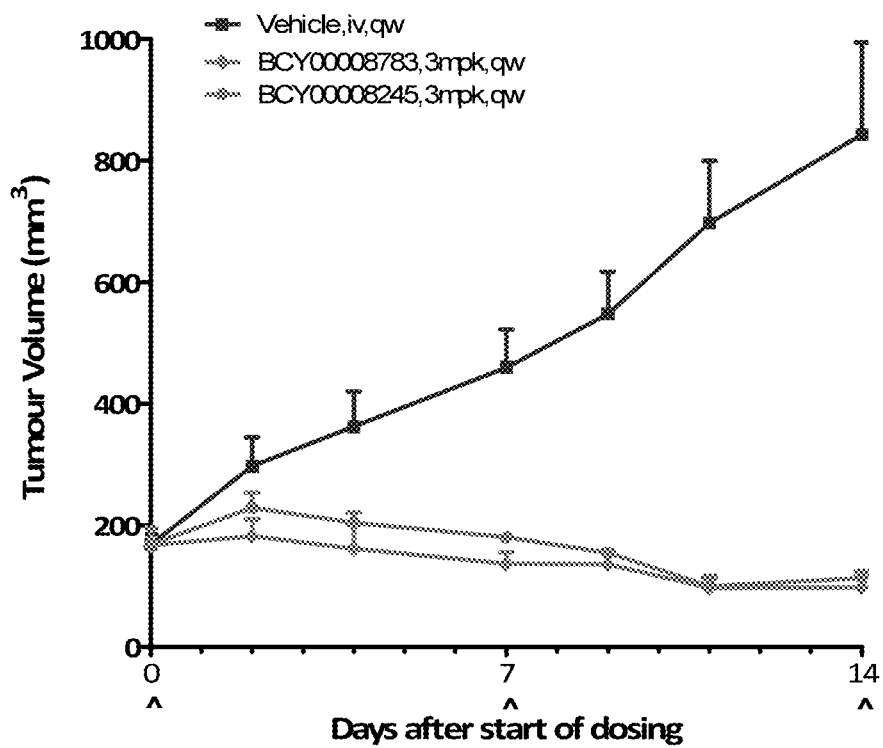
Figure 28:
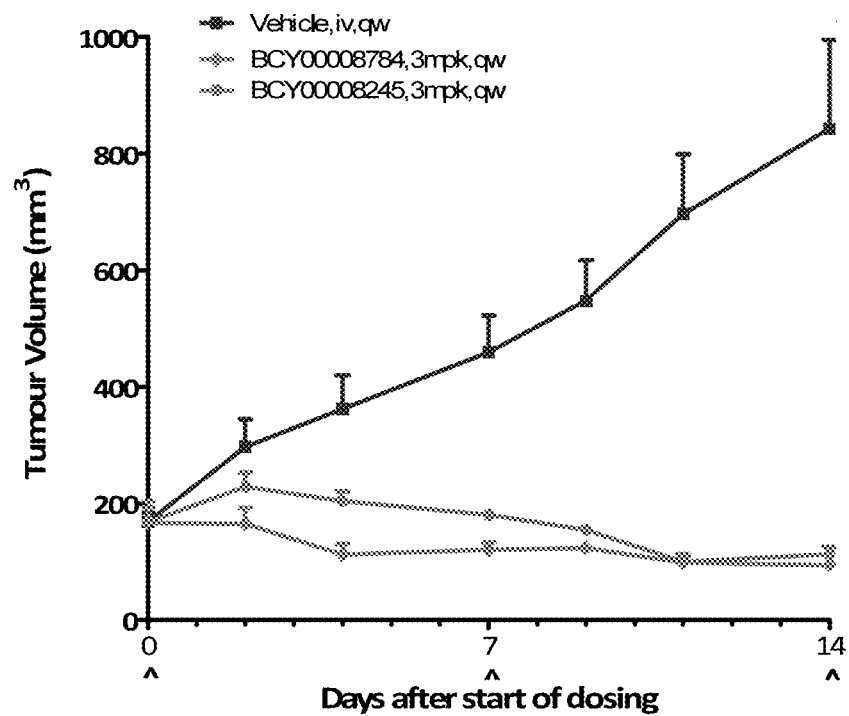
Figure 29:
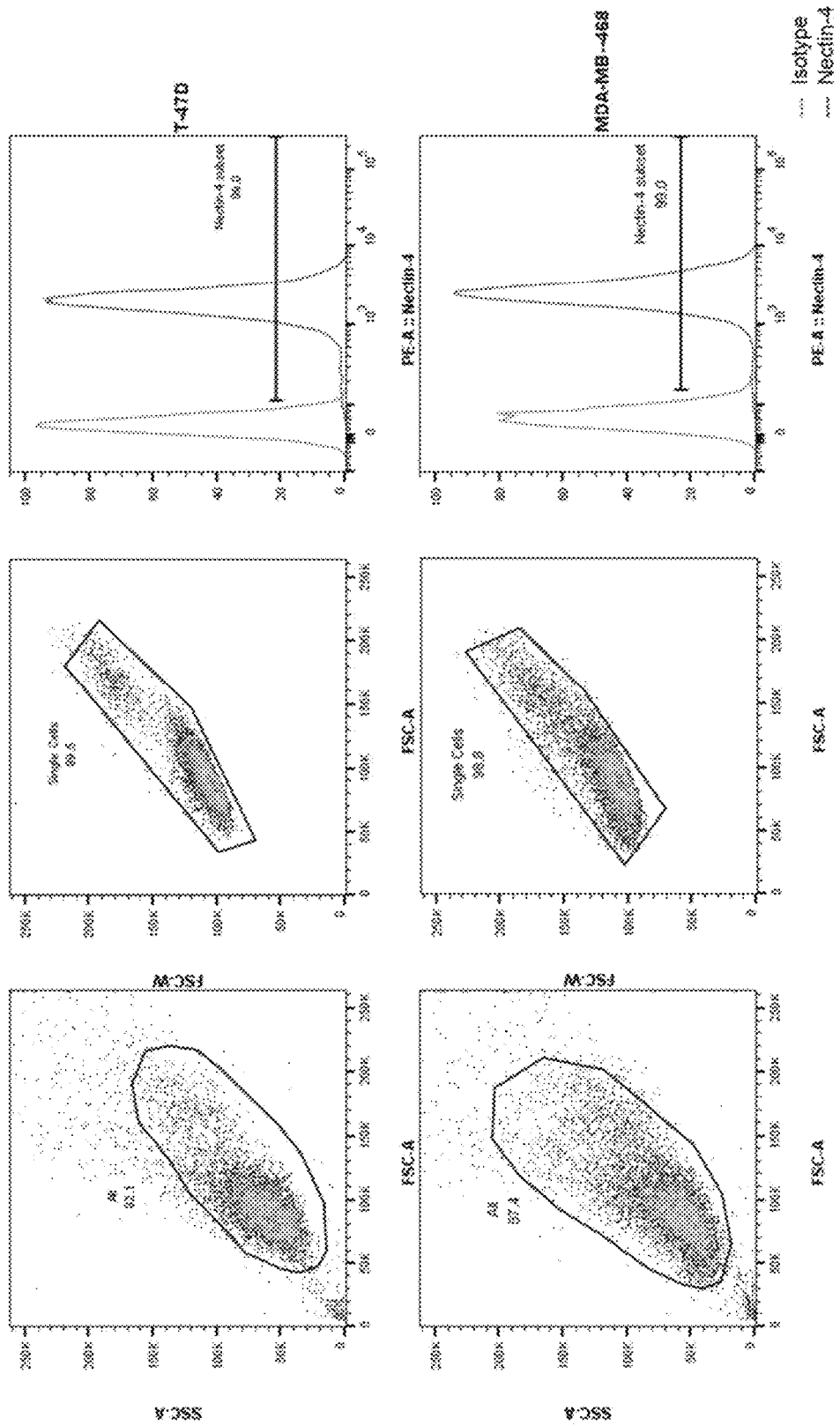
FIG. 29: Gating strategy for Nectin-4 in Breast (T-47D and MDA-MB-468).
Figure 30:
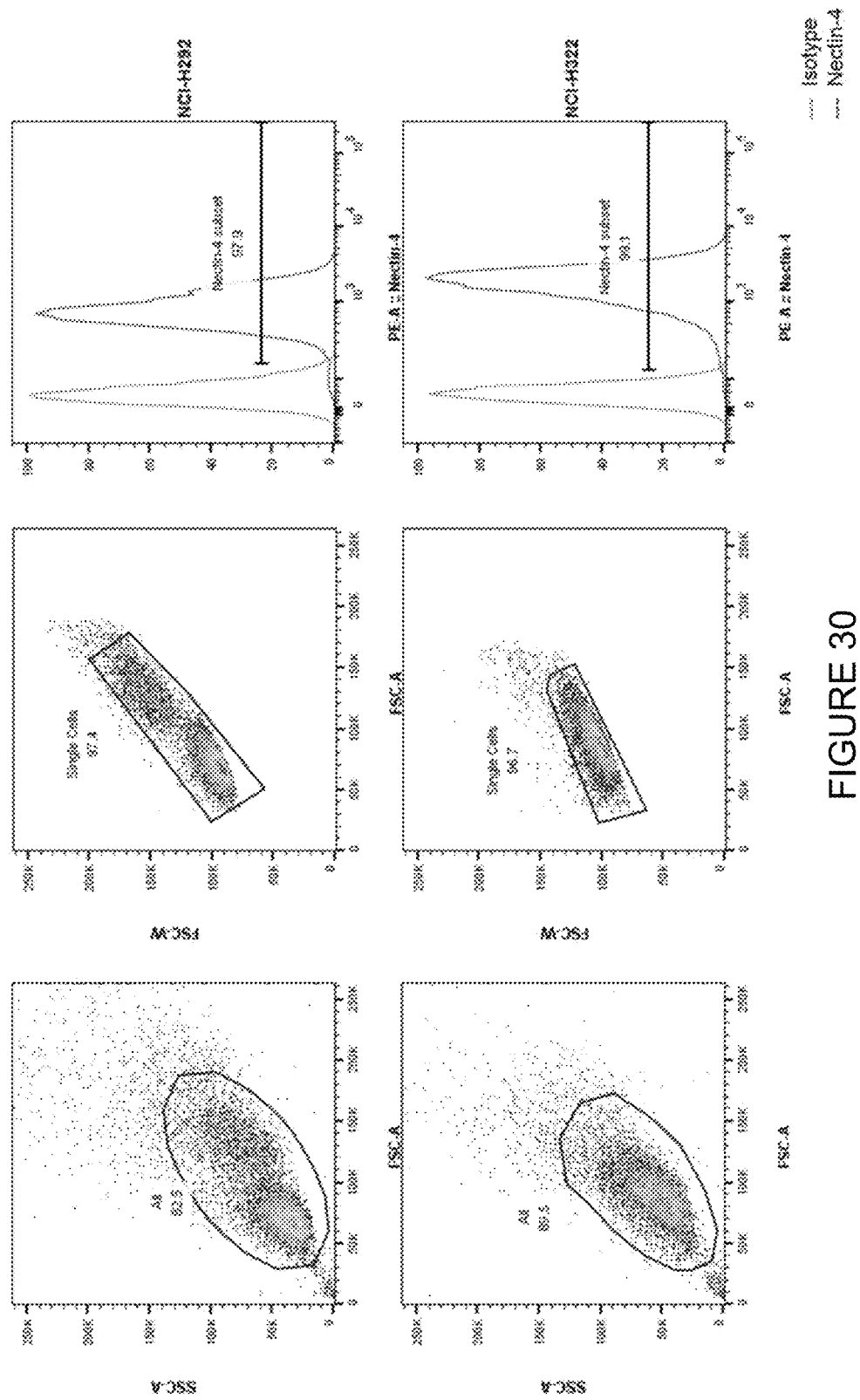
FIG. 30: Gating strategy for Nectin-4 in NCI-H292 and NCI-H322.
Figure 31:
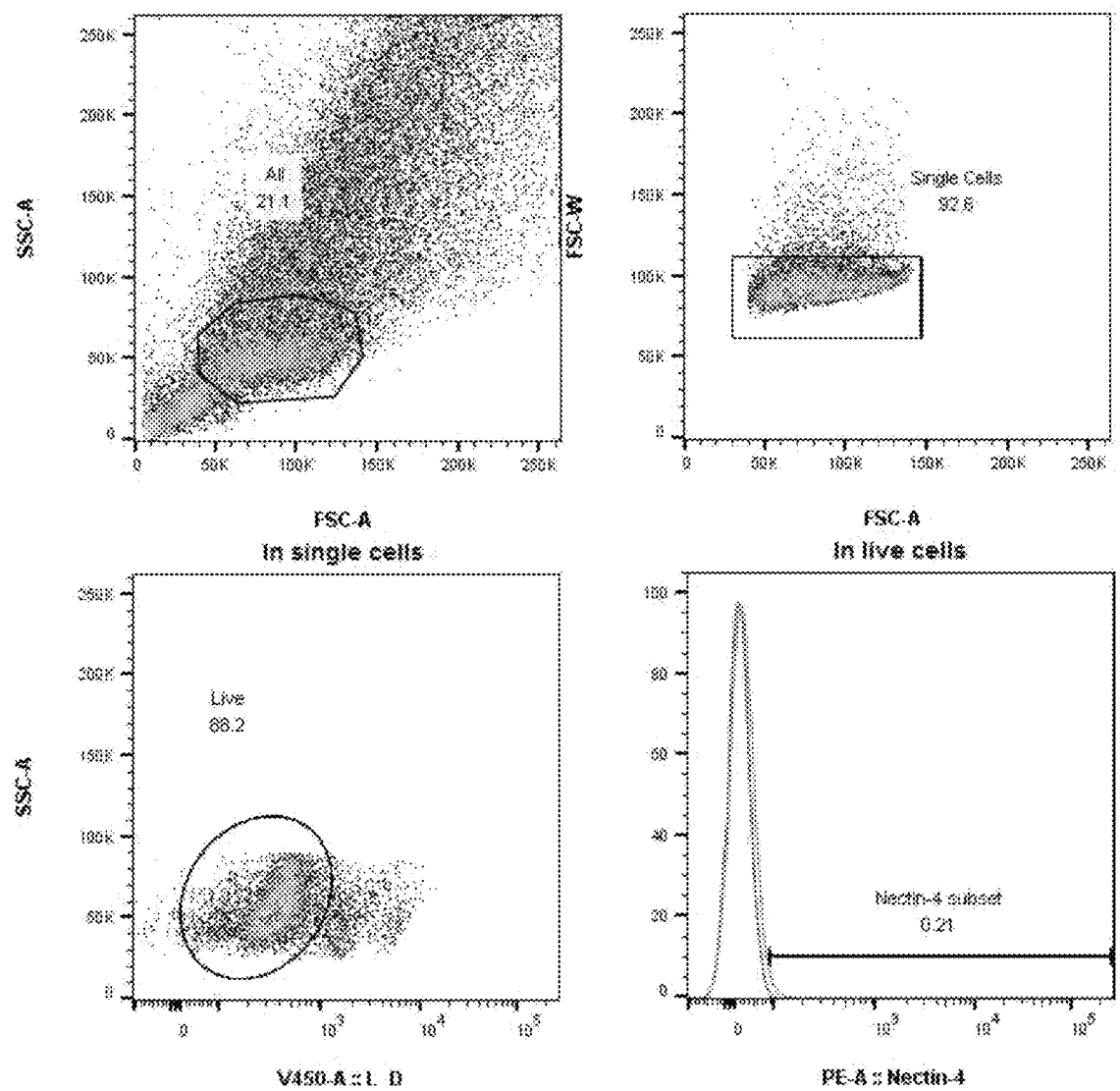
FIGS. 31 and 32: Gating strategy for Nectin-4 in NCI-H526 and HT1080, respectively.
Figure 32:
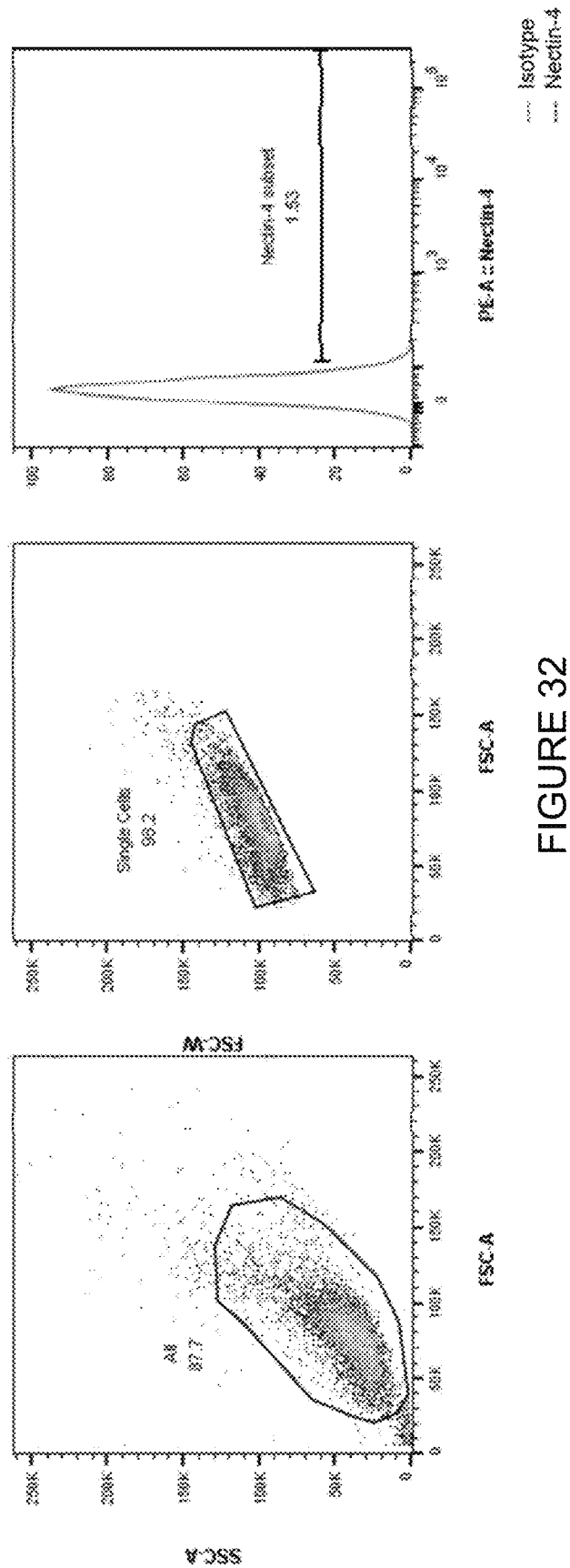
Figure 33:
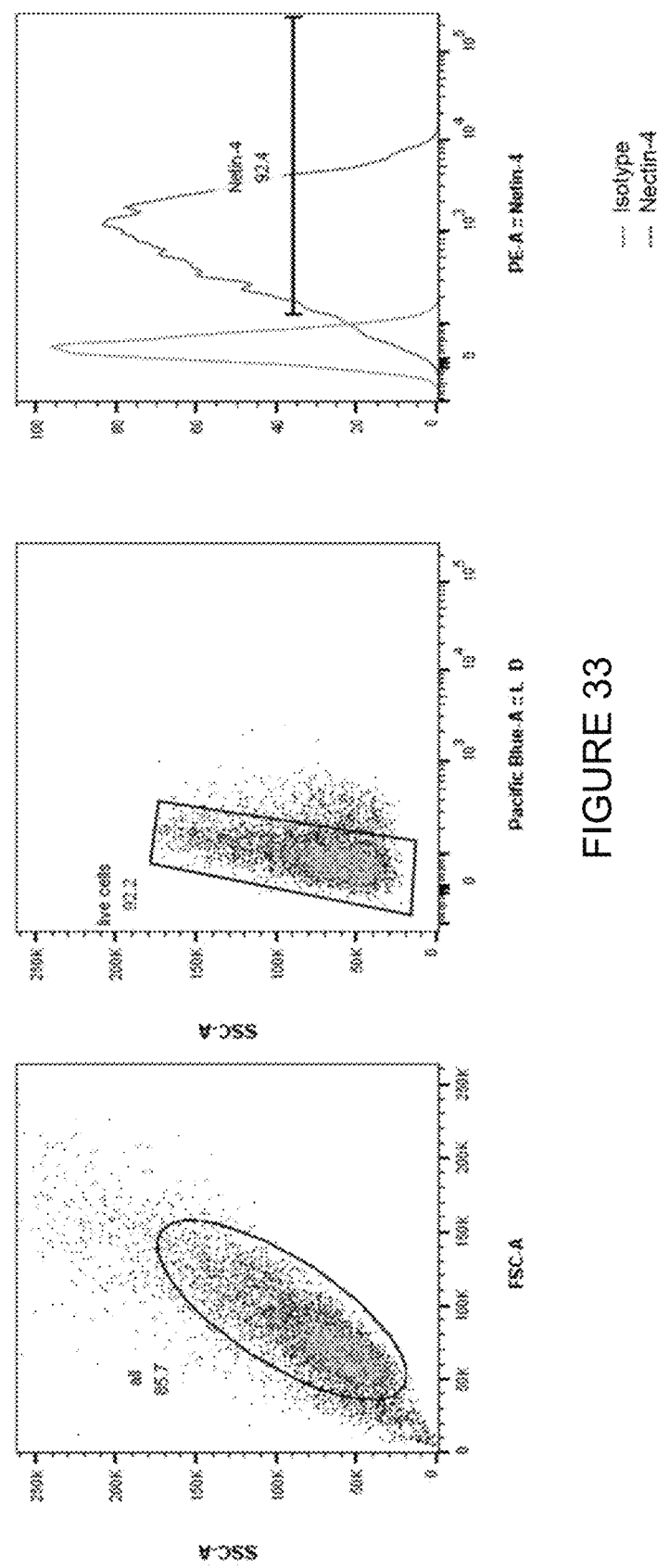
Figure 34:
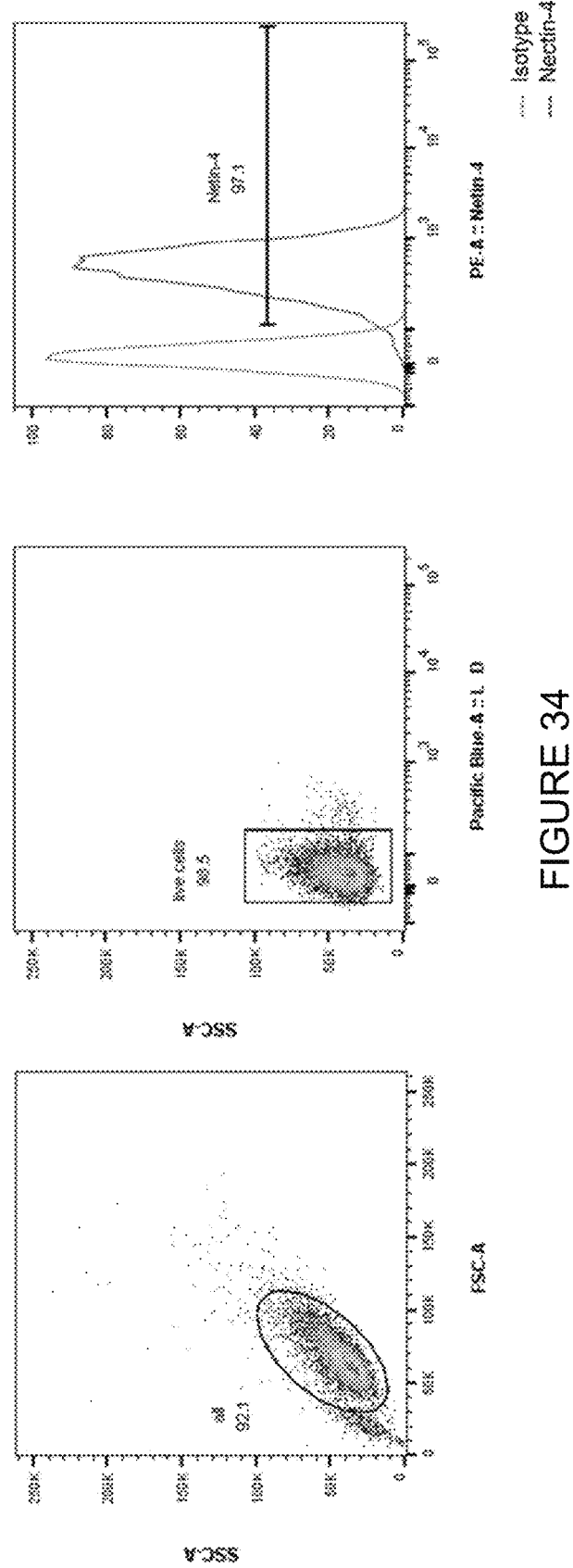
Figure 35A:
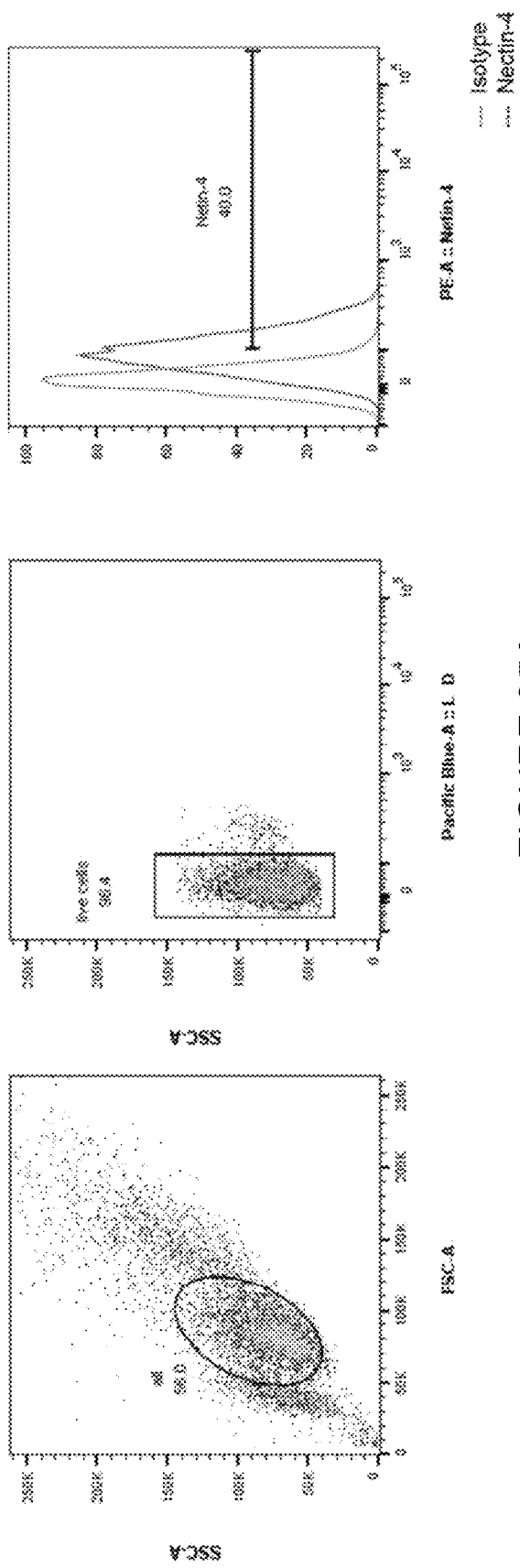
FIG. 35A and HCT-116.
Figure 35B:
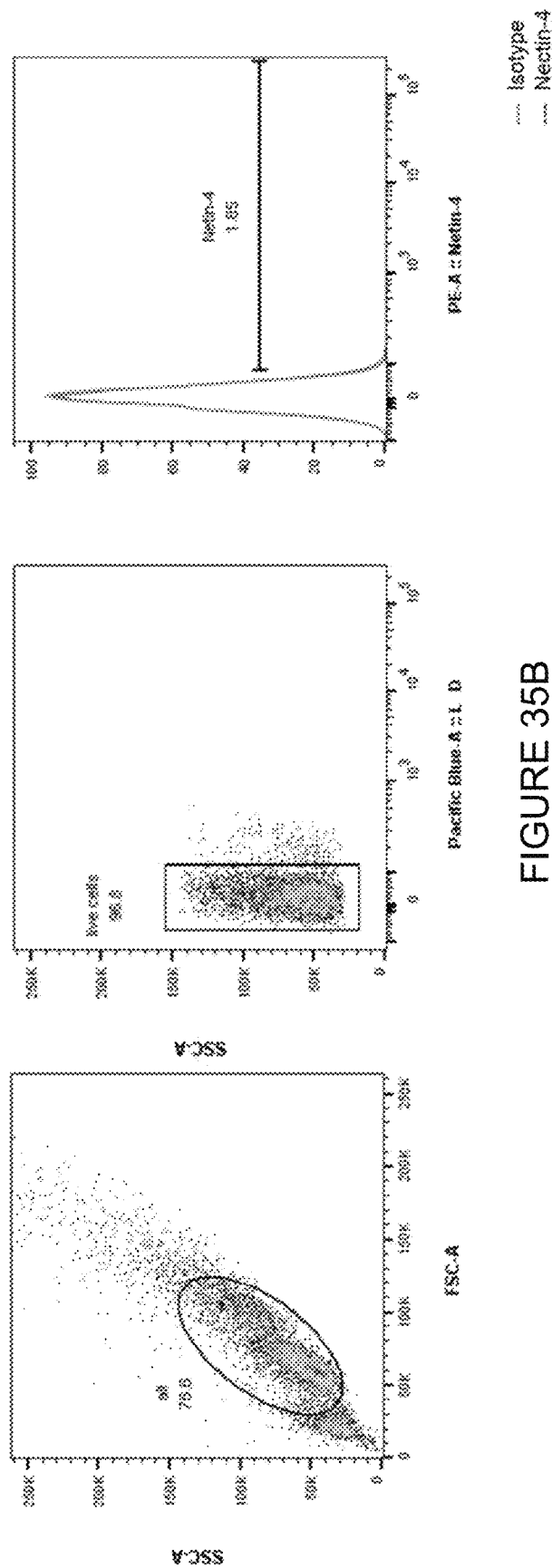
FIG. 35B), Lung cancer (A549.
Figure 36A:
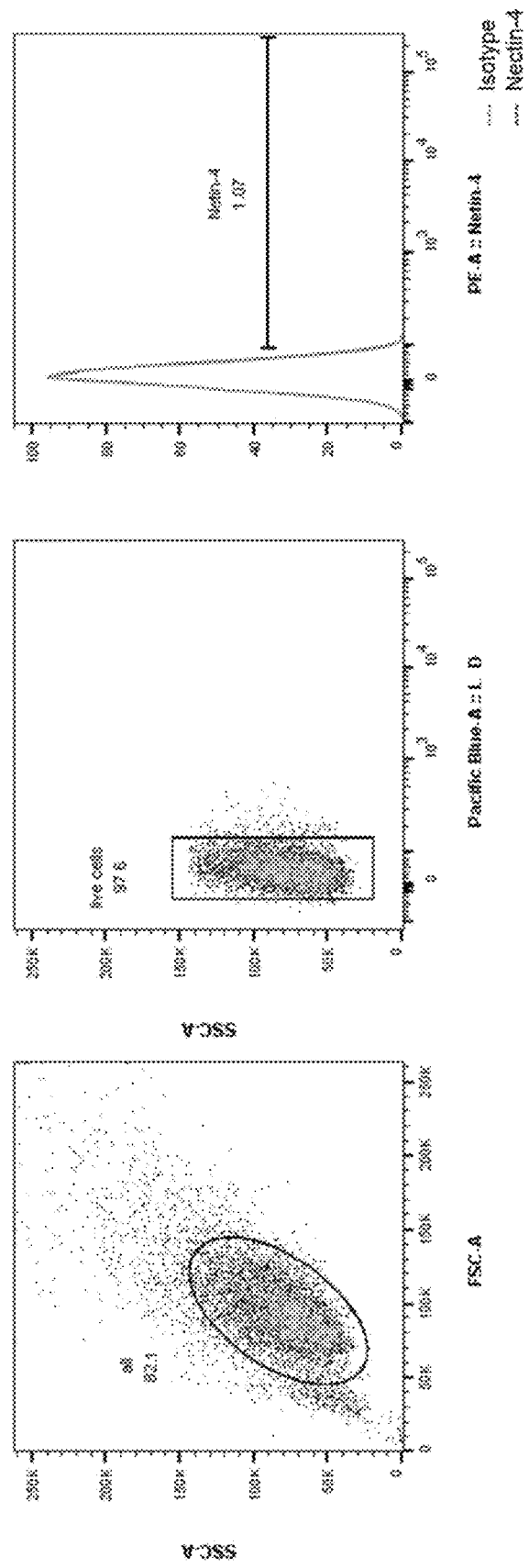
FIG. 36A, NCI-H292.
Figure 36B:
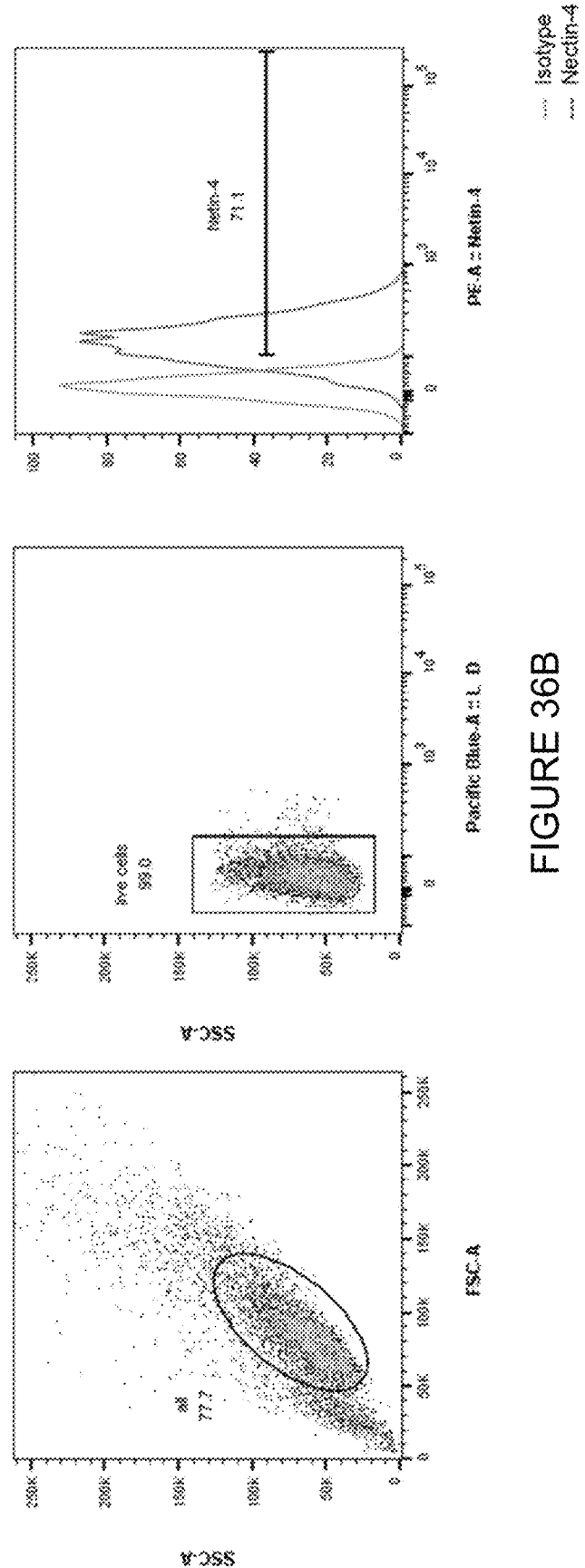
FIG. 36B, NCI-H358.
Figure 36C:
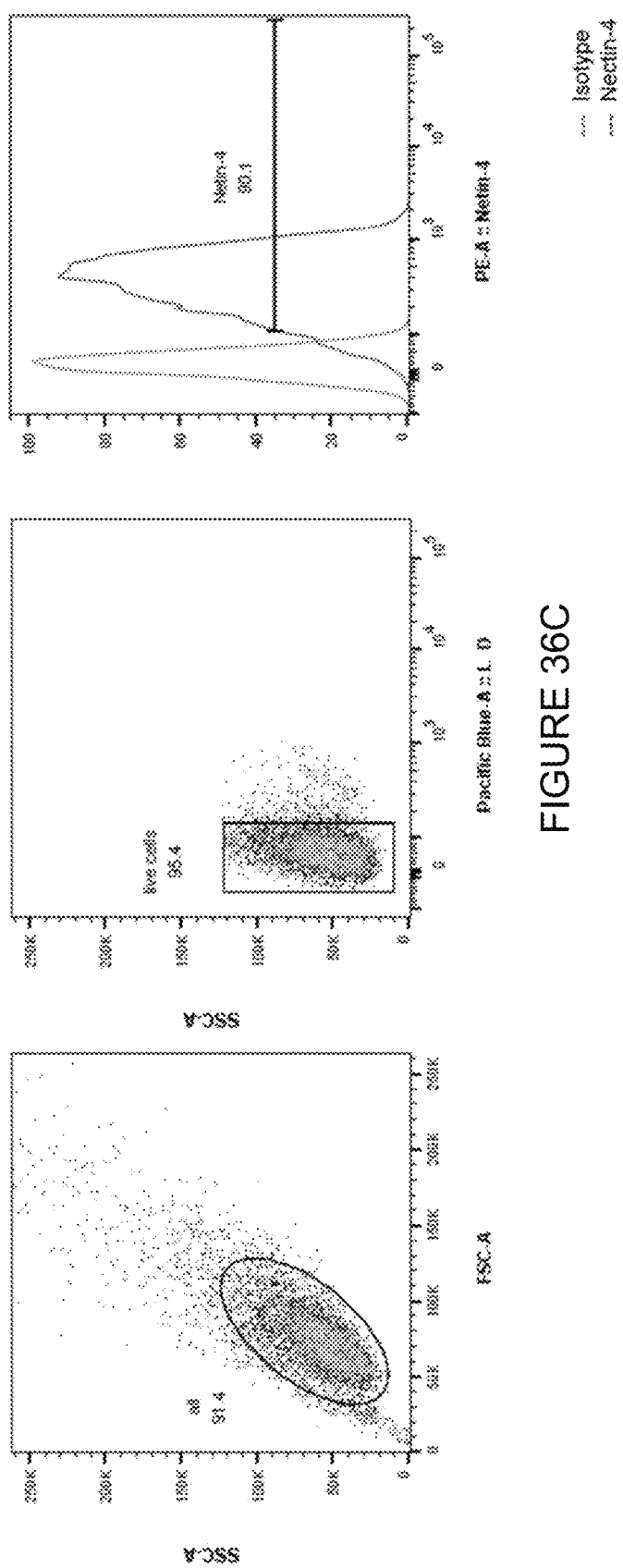
FIG. 36C and NCI-526.
Figure 36D:
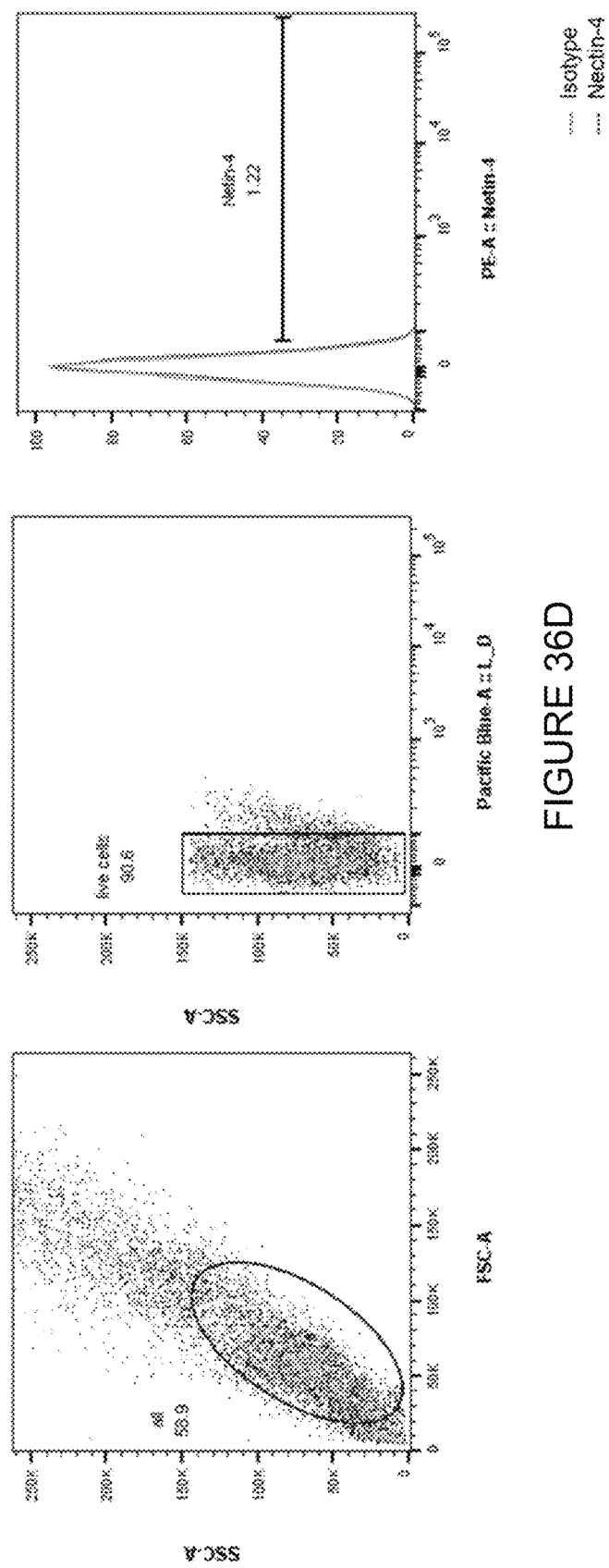
FIG. 36D), and Pancreas cancer (Panc02.13.
Figure 37:
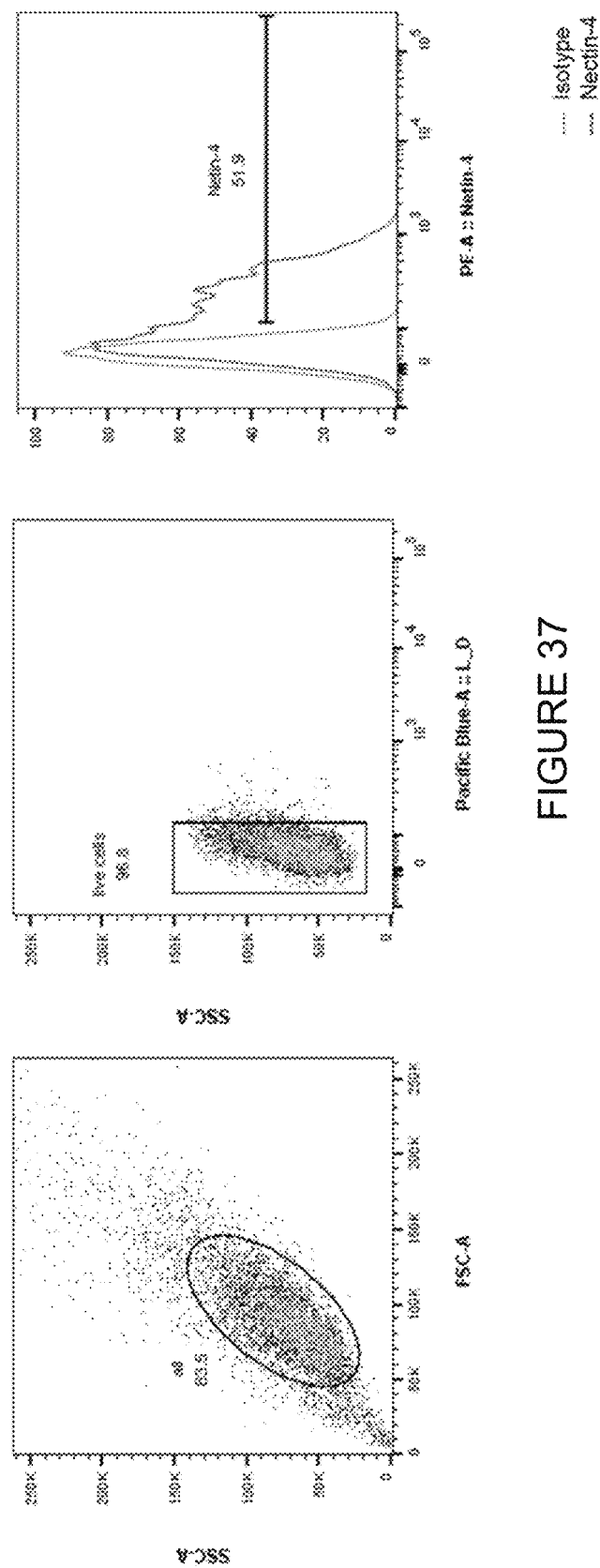
Figure 38:
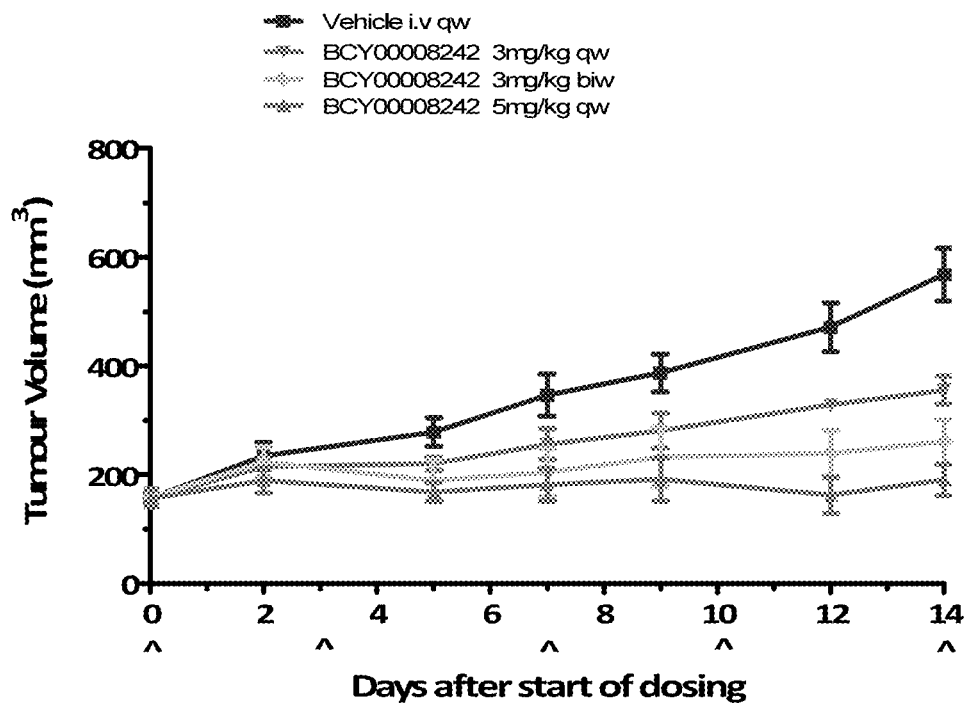
FIGS. 38-41: Tumor volume traces after administering BCY8242, BCY8245, BCY8253, and BCY8255, respectively, to female Balb/c nude mice bearing A549 xenograft.
Figure 39:
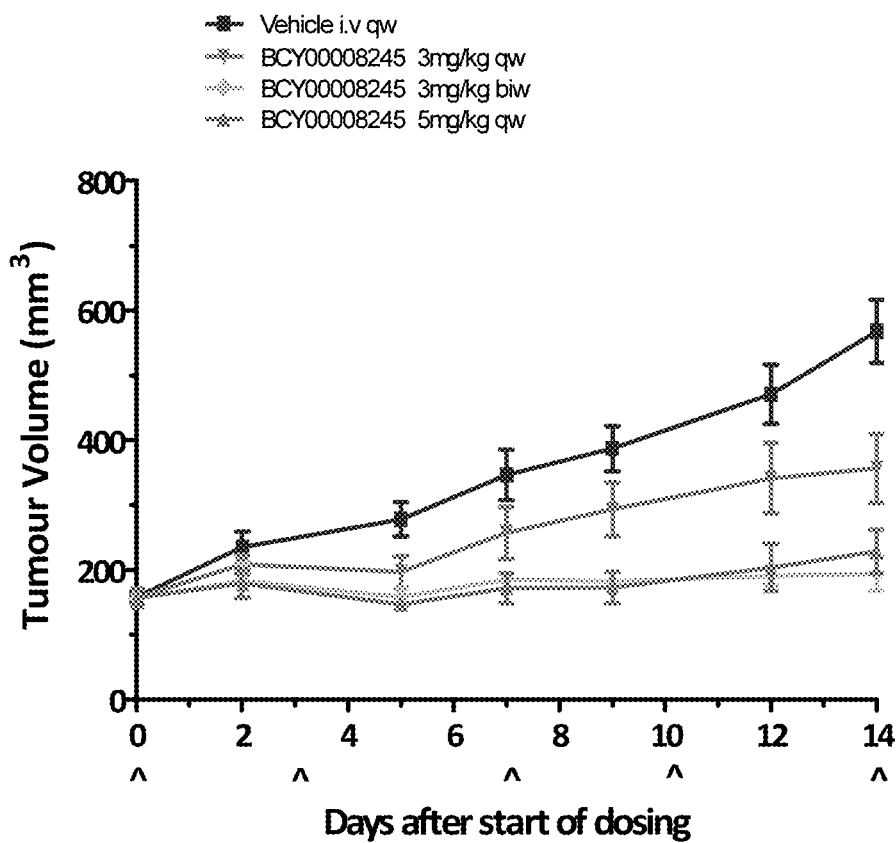
Figure 40:
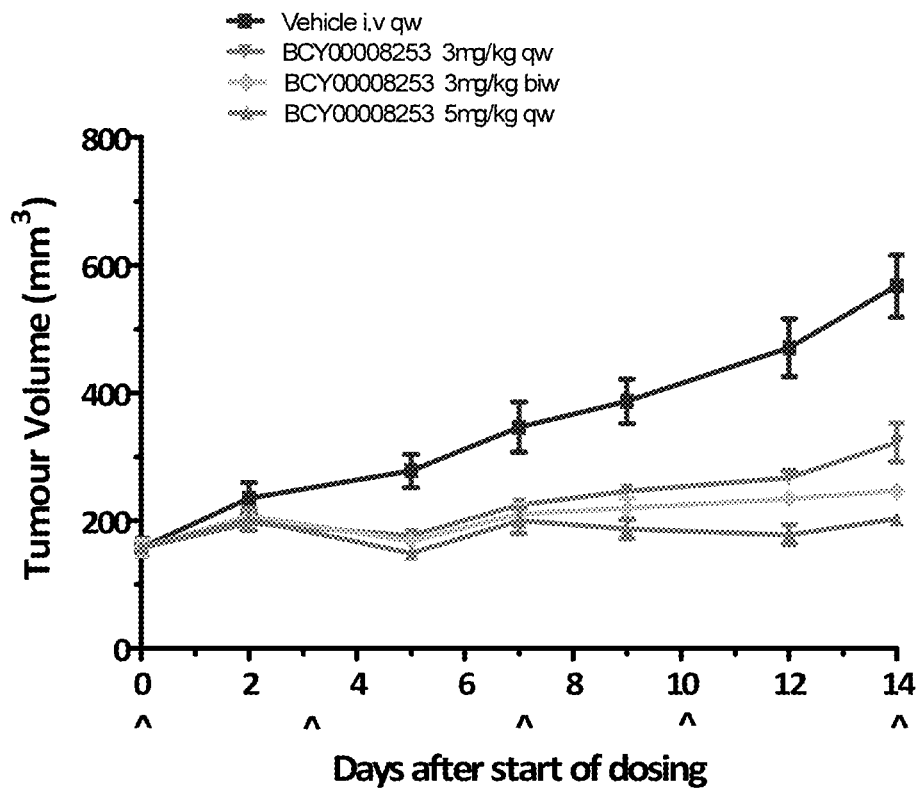
Figure 41:
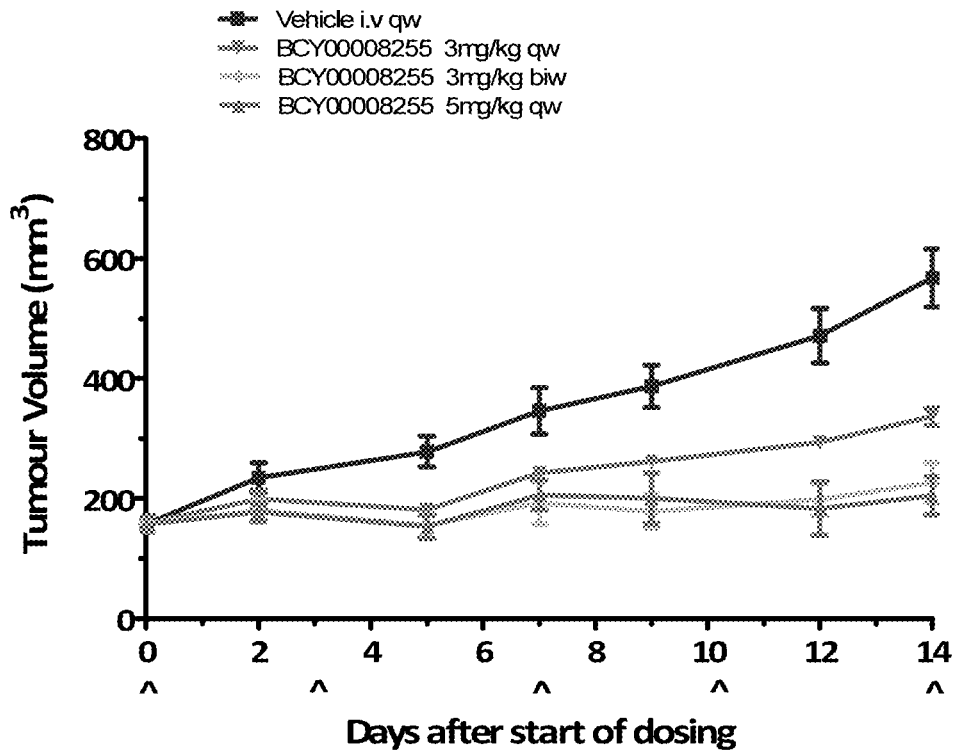
Figure 42:
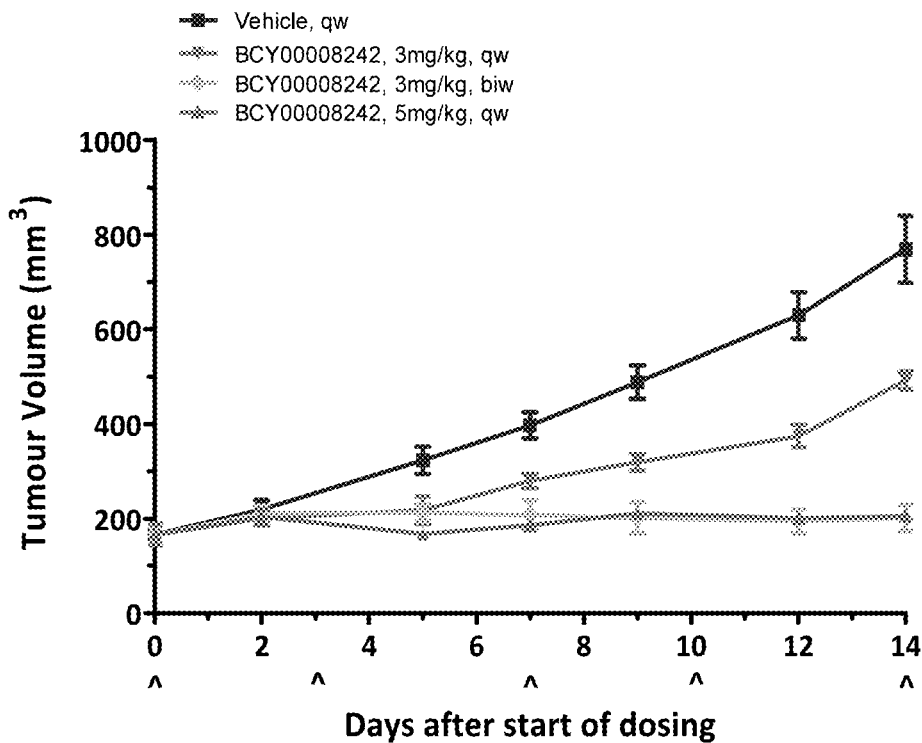
FIGS. 42-45: Tumor volume traces after administering BCY8242, BCY8245, BCY8253, and BCY8255, respectively, to female Balb/c nude mice bearing HCT116 xenograft.
Figure 43:
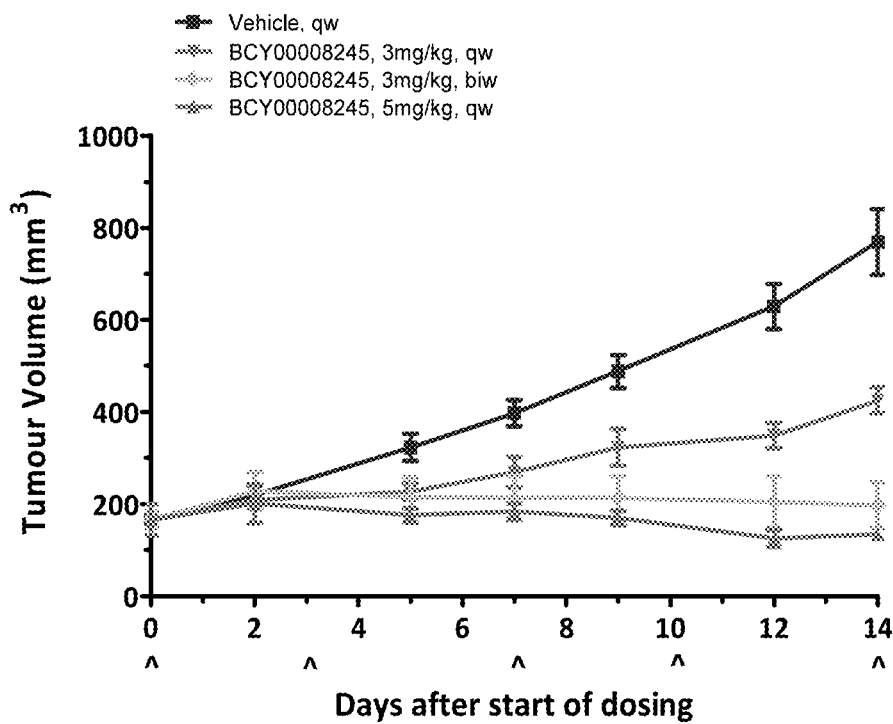
Figure 44:
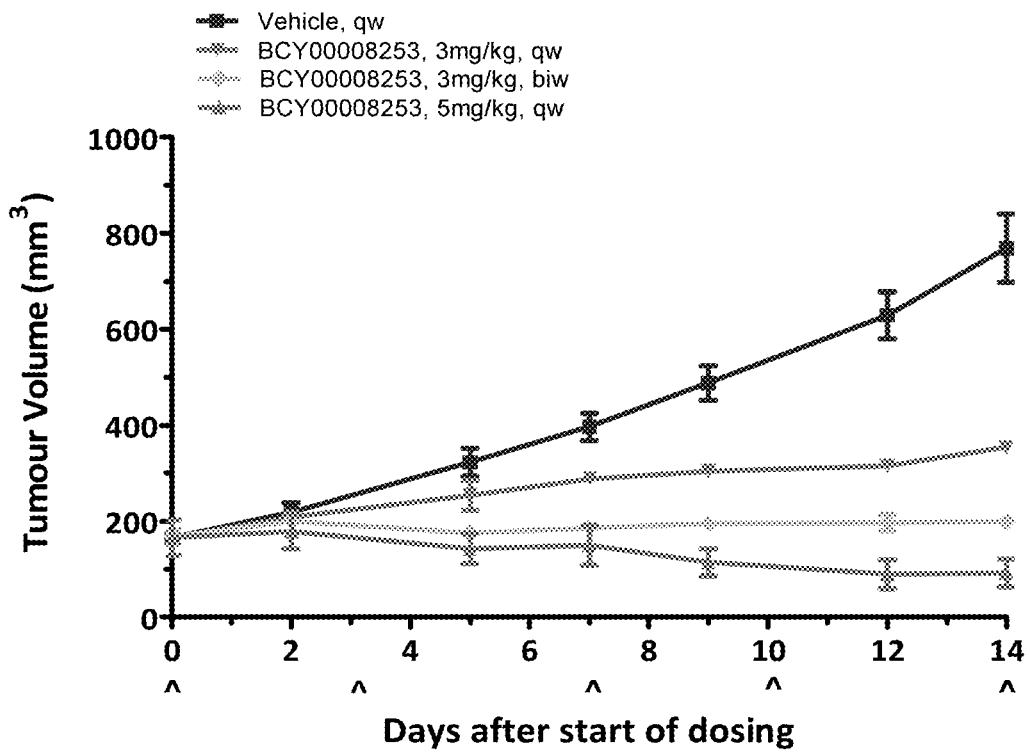
Figure 45:
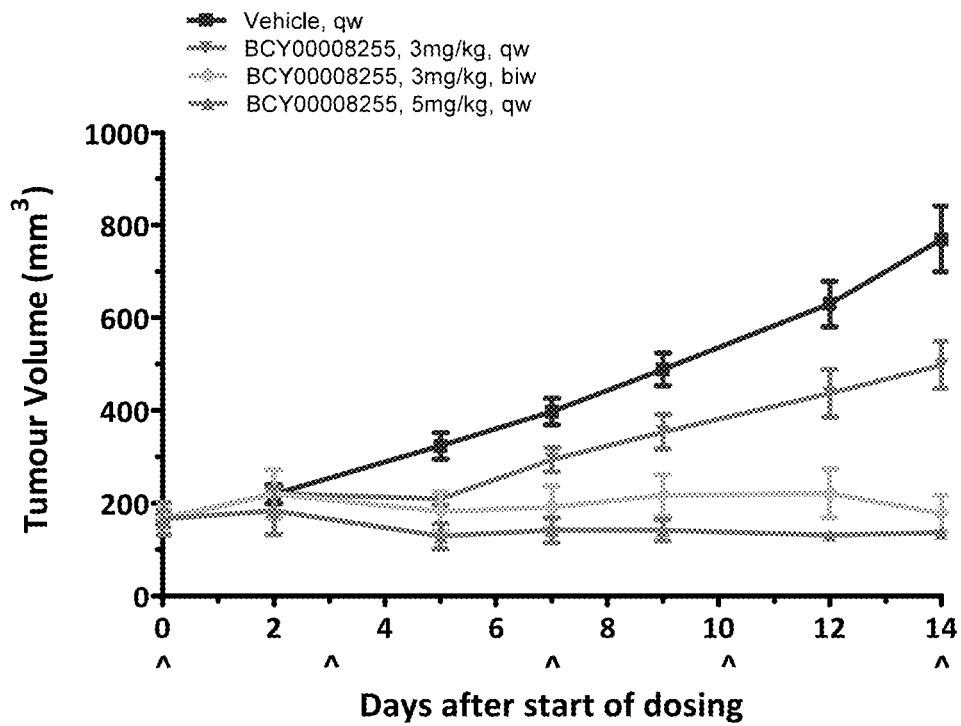
Figure 46:
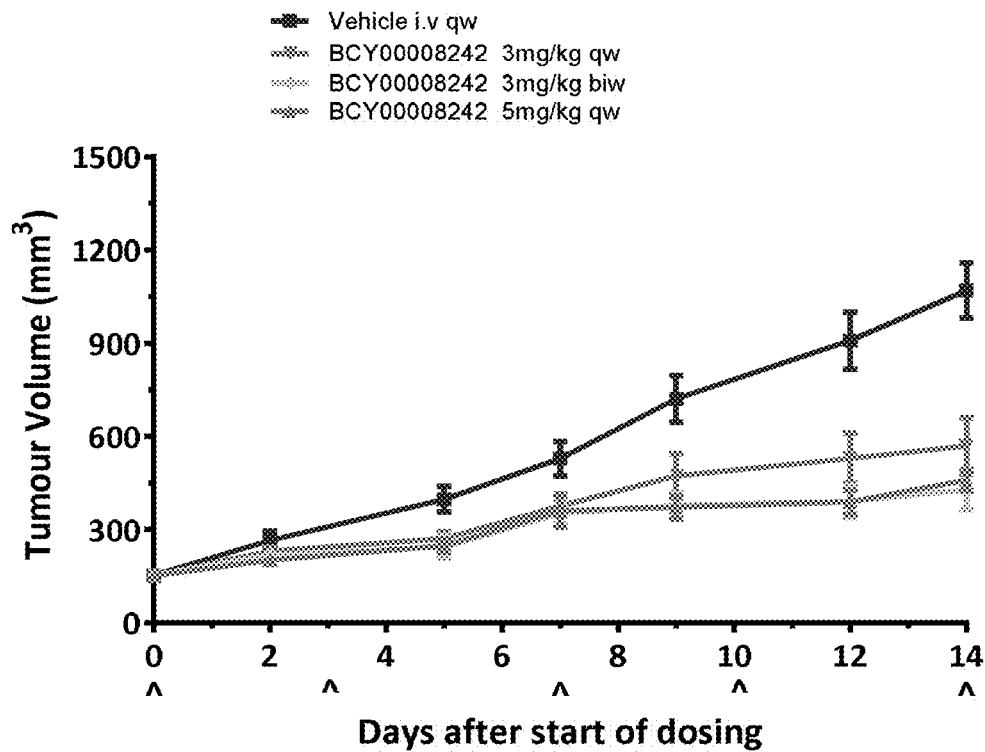
FIGS. 46-49: Tumor volume traces after administering BCY8242, BCY8245, BCY8253, and BCY8255, respectively, to female CB17-SCID mice bearing HT-1376 xenograft.
Figure 47:
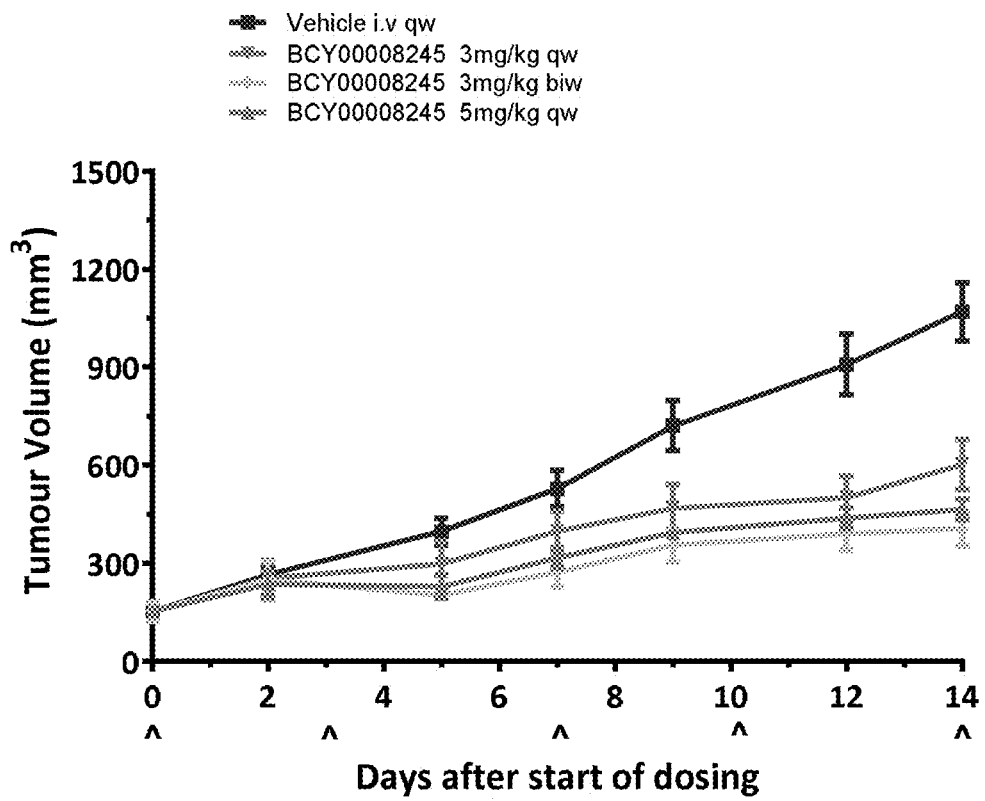
Figure 48:
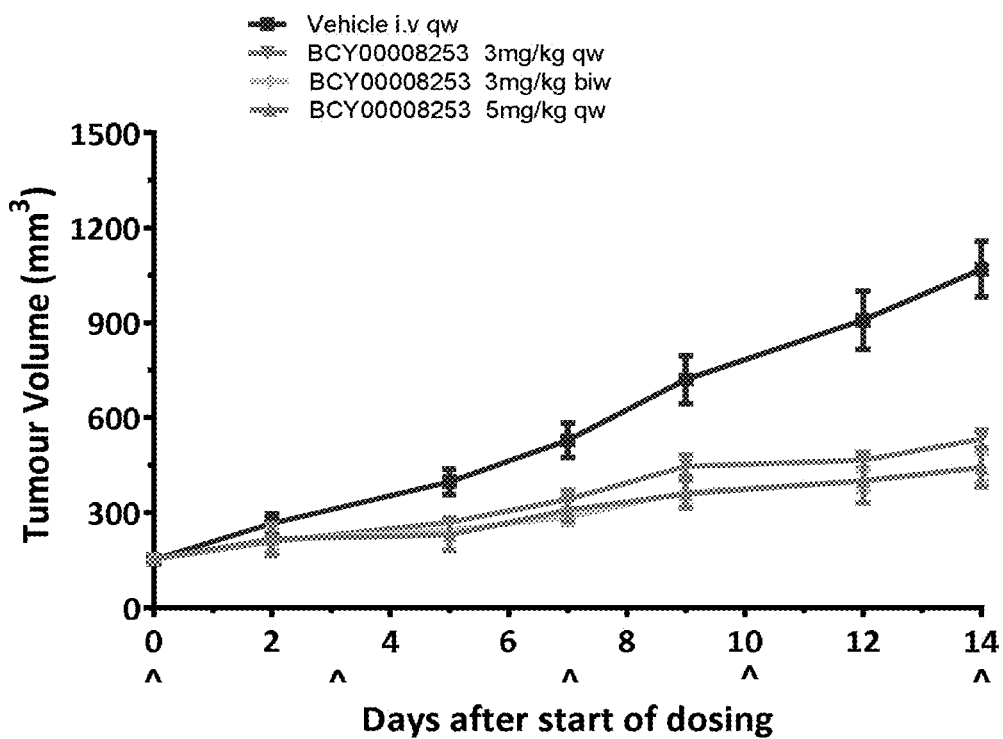
Figure 49:
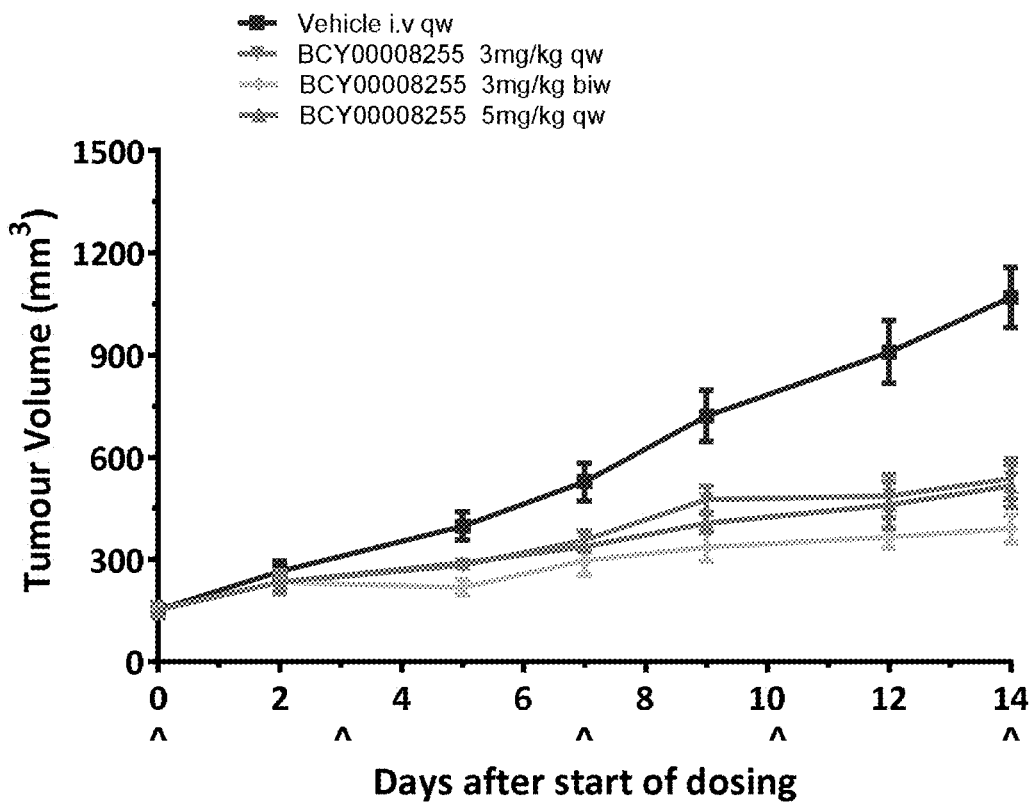
Figure 50:
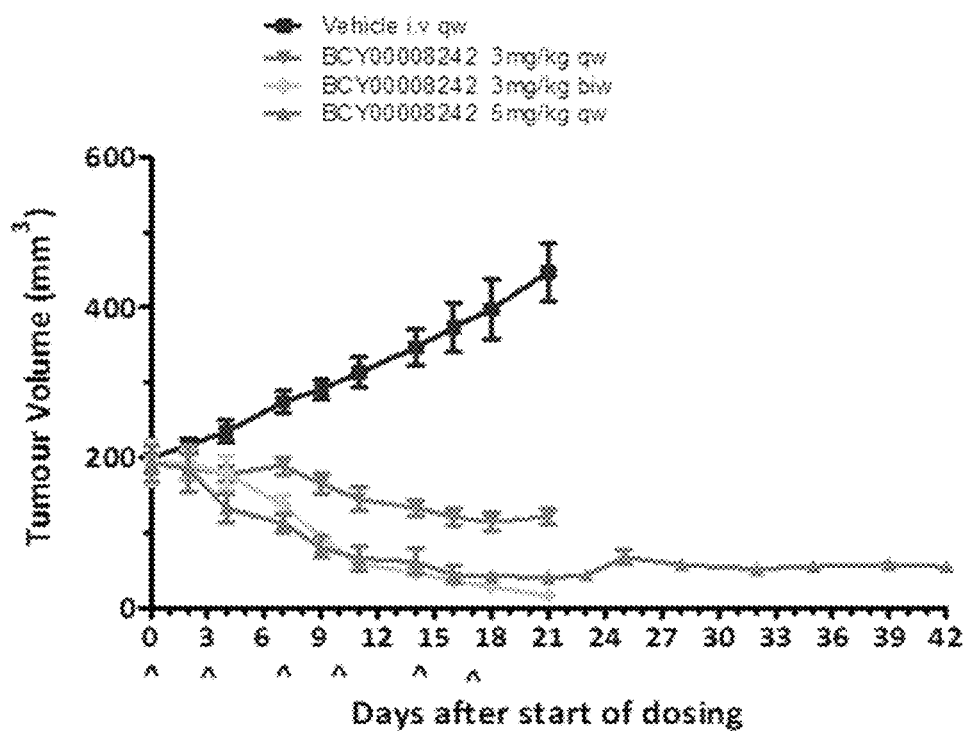
FIGS. 50-53: Tumor volume traces after administering BCY8242, BCY8245, BCY8253, and BCY8255, respectively, to female Balb/c nude mice bearing MDA-MB-468 xenograft.
Figure 51:
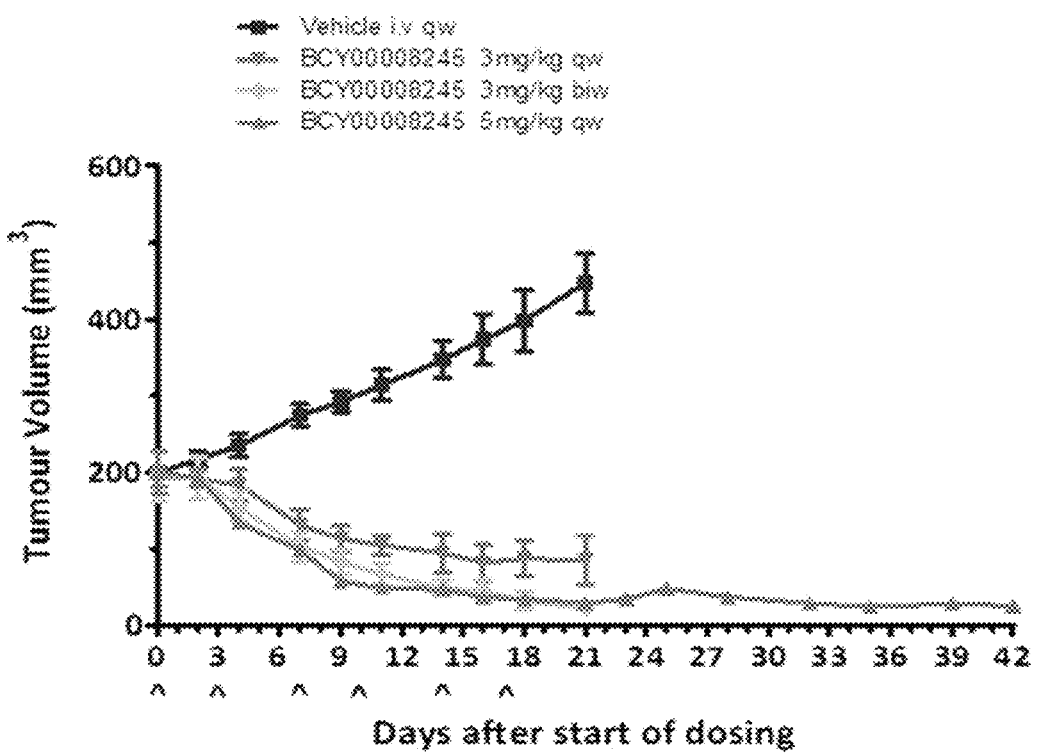
Figure 52:
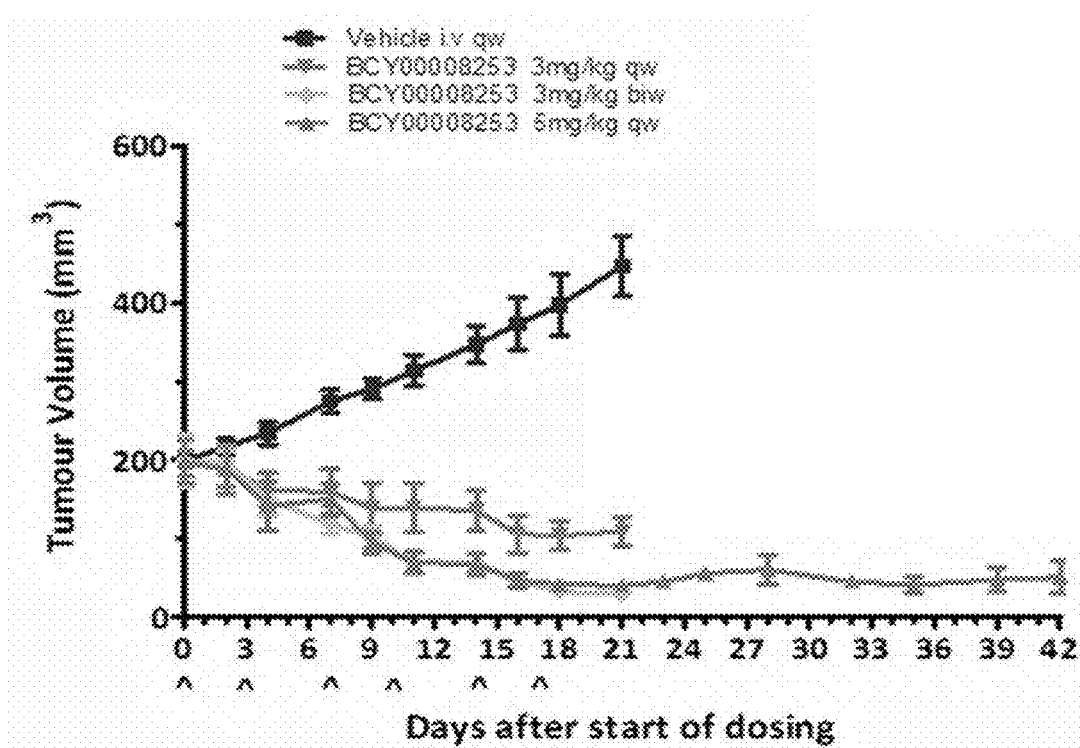
Figure 53:
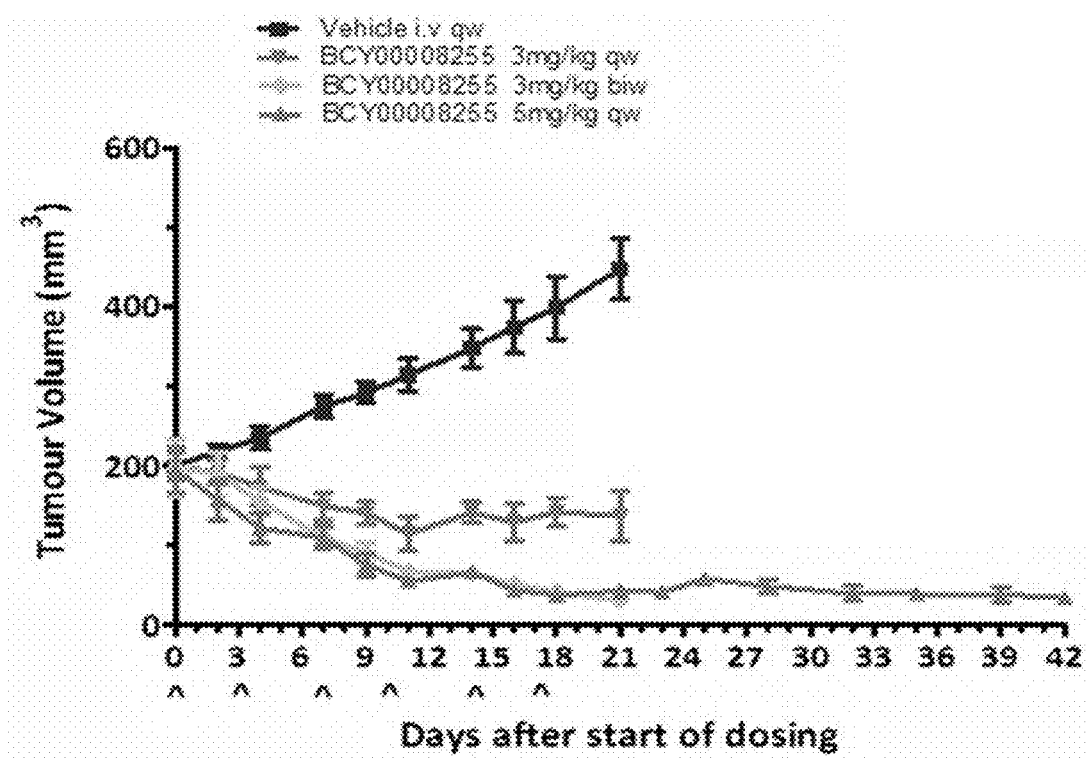
Figure 54:
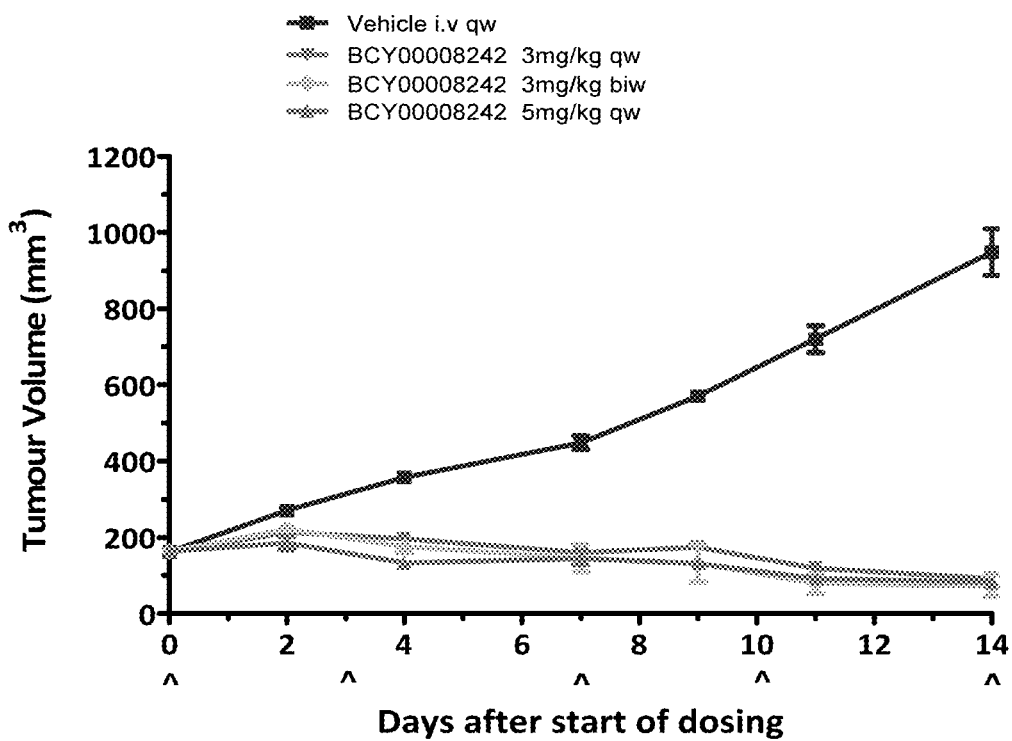
FIGS. 54-57: Tumor volume traces after administering BCY8242, BCY8245, BCY8253, and BCY8255, respectively, to female Balb/c nude mice bearing NCI-H292 xenograft.
Figure 55:
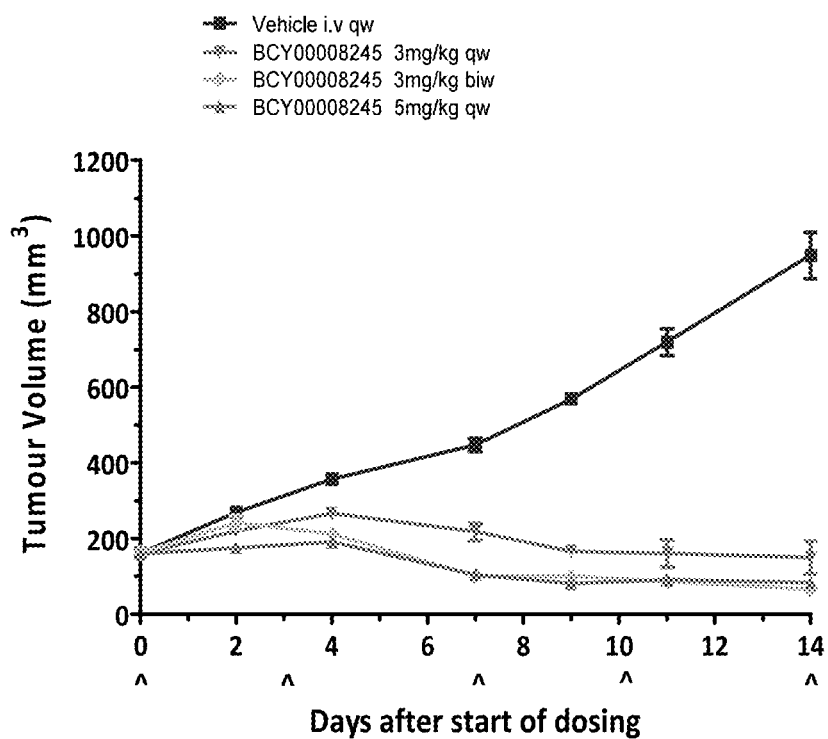
Figure 56:
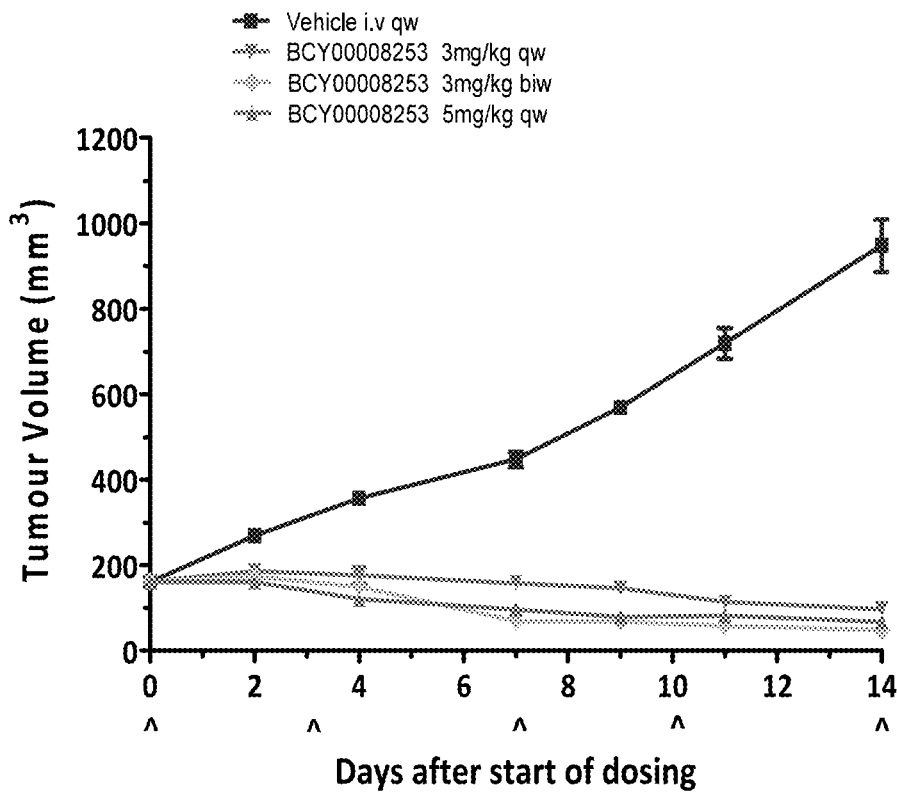
Figure 57:
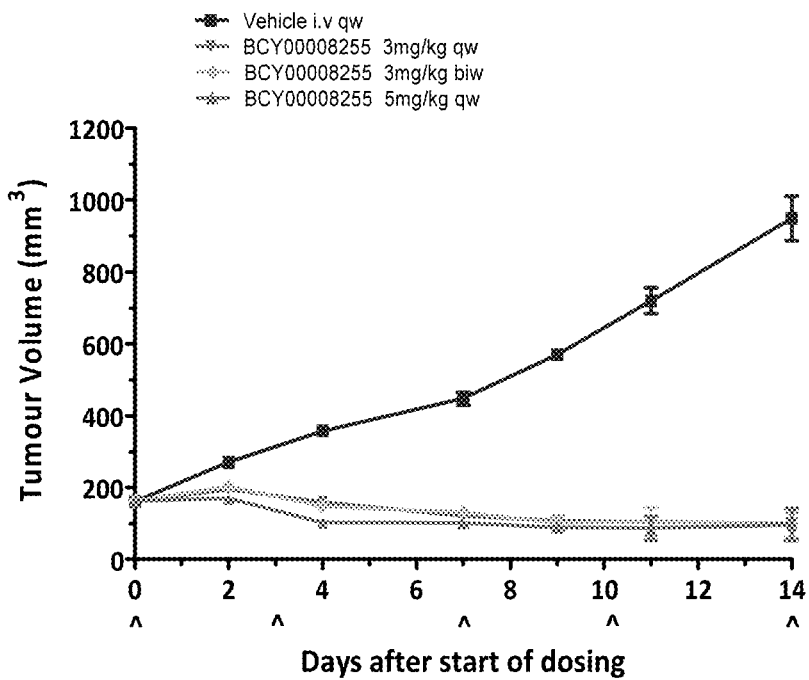

Tumor growth curves are shown in FIGS. 22 to 24.

5.2 Tumor Volume Trace

Mean tumor volume over time in female Balb/c nude mice bearing MDA-MB-468 xenograft is shown in Tables 20 and 21.

TABLE 20

Tumor volume trace over time (Day 0 to day 21)

| Gr. | Treatment | 0 | 2 | 4 | 7 | 9 | 11 | 14 | 16 | 18 | 21 |
|---|---|---|---|---|---|---|---|---|---|---|---|
| 1 | Vehicle, qw | 199 ± 6 | 217 ± 9 | 235 ± 15 | 274 ± 14 | 291 ± 14 | 314 ± 20 | 348 ± 24 | 374 ± 33 | 398 ± 39 | 447 ± 39 |
| 2 | BCY8245, 3 mpk, qw | 194 ± 12 | 192 ± 26 | 184 ± 20 | 131 ± 20 | 113 ± 17 | 104 ± 13 | 94 ± 25 | 81 ± 23 | 87 ± 23 | 85 ± 31 |
| 3 | BCY8245, 3 mpk, biw | 195 ± 33 | 193 ± 27 | 154 ± 20 | 103 ± 20 | 83 ± 16 | 67 ± 14 | 49 ± 11 | 45 ± 14 | 32 ± 12 | 22 ± 4 |
| 4 | BCY8245, 5 mpk, qw | 199 ± 28 | 193 ± 11 | 135 ± 4 | 98 ± 5 | 58 ± 5 | 49 ± 5 | 47 ± 2 | 37 ± 4 | 35 ± 3 | 29 ± 3 |
| 5 | BCY8253, 3 mpk, qw | 195 ± 17 | 190 ± 24 | 162 ± 21 | 160 ± 28 | 138 ± 33 | 139 ± 32 | 136 ± 25 | 106 ± 24 | 104 ± 18 | 109 ± 19 |
| 6 | BCY8253, 3 mpk, biw | 199 ± 34 | 198 ± 13 | 150 ± 21 | 119 ± 11 | 102 ± 14 | 69 ± 13 | 70 ± 5 | 46 ± 5 | 33 ± 5 | 29 ± 7 |
| 7 | BCY8253, 5 mpk, qw | 198 ± 28 | 188 ± 32 | 142 ± 32 | 150 ± 20 | 95 ± 13 | 69 ± 13 | 67 ± 13 | 47 ± 8 | 42 ± 5 | 40 ± 8 |
| 8 | BCY8255, 3 mpk, qw | 198 ± 18 | 191 ± 15 | 172 ± 24 | 148 ± 18 | 139 ± 13 | 114 ± 22 | 140 ± 13 | 128 ± 22 | 141 ± 18 | 136 ± 31 |
| 9 | BCY8255, 3 mpk, biw | 197 ± 36 | 190 ± 28 | 154 ± 18 | 109 ± 11 | 90 ± 13 | 67 ± 3 | 64 ± 7 | 51 ± 8 | 41 ± 5 | 31 ± 1 |
| 10 | BCY8255, 5 mpk, qw | 194 ± 29 | 156 ± 25 | 121 ± 19 | 109 ± 14 | 75 ± 14 | 55 ± 8 | 66 ± 5 | 43 ± 5 | 37 ± 1 | 42 ± 2 |

TABLE 21

Tumor volume trace over time (Day 23 to day 42)

| Gr. | Treatment | 23 | 25 | 28 | 32 | 35 | 39 | 42 |
|---|---|---|---|---|---|---|---|---|
| 4 | BCY8245, 5 mpk, qw | 35 ± 5 | 48 ± 5 | 37 ± 7 | 28 ± 6 | 24 ± 4 | 28 ± 6 | 26 ± 6 |
| 7 | BCY8253, 5 mpk, qw | 45 ± 7 | 56 ± 8 | 60 ± 19 | 45 ± 2 | 41 ± 10 | 48 ± 15 | 50 ± 20 |
| 10 | BCY8255, 5 mpk, qw | 41 ± 4 | 57 ± 7 | 48 ± 8 | 39 ± 9 | 39 ± 6 | 38 ± 9 | 34 ± 8 |

5.3 Tumor Growth Inhibition Analysis

Tumor growth inhibition rate for test articles in the MDA-MB-468 xenograft model was calculated based on tumor volume measurements at day 21 after the start of the treatment.

TABLE 22

Tumor growth inhibition analysis

| Gr | Treatment | Tumor Volume | T/C[b] (%) | TGI (%) | P value with |
|----|-----------|--------------|------------|---------|--------------|
| 1  | Vehicle, qw | 447 ± 39 | — | — | — |
| 2  | BCY8245, 3 mpk, qw | 85 ± 31 | 18.9 | 144.2 | $p < 0.001$ |
| 3  | BCY8245, 3 mpk, biw | 22 ± 4 | 4.9 | 169.8 | $p < 0.001$ |
| 4  | BCY8245, 5 mpk, qw | 29 ± 3 | 6.6 | 168.4 | $p < 0.001$ |
| 5  | BCY8253, 3 mpk, qw | 109 ± 19 | 24.4 | 134.7 | $p < 0.001$ |
| 6  | BCY8253, 3 mpk, biw | 29 ± 7 | 6.6 | 168.3 | $p < 0.001$ |
| 7  | BCY8253, 5 mpk, qw | 40 ± 8 | 8.9 | 163.9 | $p < 0.001$ |
| 8  | BCY8255, 3 mpk, qw | 136 ± 31 | 30.4 | 125.1 | $p < 0.001$ |
| 9  | BCY8255, 3 mpk, biw | 31 ± 1 | 6.9 | 166.8 | $p < 0.001$ |
| 10 | BCY8255, 5 mpk, qw | 42 ± 2 | 9.5 | 161.3 | $p < 0.001$ | a. Mean ± SEM.
[b]Tumor Growth Inhibition is calculated by dividing the group average tumor volume for the treated group by the group average tumor volume for the control group (T/C).

6. Results Summary and Discussion

In this study, the therapeutic efficacy of test articles in the MDA-MB-468 xenograft model was evaluated. The measured tumor volumes of all treatment groups at various time points are shown in FIGS. 22 to 24 and Tables 20 to 22.

BCY8245 at 3 mg/kg, qw (TV=85 mm³, TGI=144.2%, p<0.001), 3 mg/kg, biw (TV=22 mm³, TGI=169.8%, p<0.001) and 5 mg/kg, qw (TV=29 mm³, TGI=168.4%, p<0.001) produced significant anti-tumor antitumor activity in dose or dose-frequency dependent manner.

BCY8253 at 3 mg/kg, qw (TV=109 mm³, TGI=134.7%, p<0.001), 3 mg/kg, biw (TV=29 mm³, TGI=168.3%, p<0.001) and 5 mg/kg, qw (TV=40 mm³, TGI=163.9%, p<0.001) produced significant anti-tumor antitumor activity in dose or dose-frequency dependent manner.

BCY8255 at 3 mg/kg, qw (TV=136 mm³, TGI=125.1%, p<0.001), 3 mg/kg, biw (TV=31 mm³, TGI=166.8%, p<0.001) and 5 mg/kg, qw (TV=42 mm³, TGI=161.3%, p<0.001) produced significant anti-tumor antitumor activity in dose or dose-frequency dependent manner.

The dosing of 5 mg/kg groups were suspended from day 21, the tumors didn't show any relapse during extra 3 weeks' monitoring schedule.

In this study, BCY8253 and BCY8255 5 mg/kg caused severe animal body weight loss, among them, mouse 10-1 in BCY8253 5 mg/kg group was found dead on day 20.

Example 5: In Vivo Efficacy Test of BCY8549, BCY8550, BCY8783 and BCY8784 in Treatment of NCI-H292 Xenograft (Non-Small Cell Lung Cancer (NSCLC) Model) in BALB/c Nude Mice 1. Study Objective The objective of the research is to evaluate the in vivo anti-tumor efficacy of BCY8549, BCY8550, BCY8783 and BCY8784 in treatment of NCI-H292 xenograft in Balb/c nude mice.

2. Experimental Design

| Group | Treatment | n | Dose (mg/kg) | Dosing Volume (μl/g) | Dosing Route | Schedule |
|-------|-----------|---|--------------|----------------------|--------------|----------|
| 1 | Vehicle | 4 | — | 10 | iv | qw |
| 2 | BCY8549 | 3 | 3 | 10 | iv | qw |
| 3 | BCY8550 | 3 | 3 | 10 | iv | qw |
| 4 | BCY8783 | 3 | 3 | 10 | iv | qw |
| 5 | BCY8784 | 3 | 3 | 10 | iv | qw |

3. Materials 3.1 Animals and Housing Condition
3.1.1. Animals
  Species: Mus Musculus
  Strain: Balb/c nude
  Age: 6-8 weeks
  Sex: female
  Body weight: 18-22 g
  Number of animals: 43 mice plus spare
  Animal supplier: Shanghai Lingchang Biotechnology Experimental Animal Co. Ltd
3.1.2. Housing condition
  The mice were kept in individual ventilation cages at constant temperature and humidity with 3 or 4 animals in each cage.
  Temperature: 20~26° C.
  Humidity 40-70%.
  Cages: Made of polycarbonate. The size is 300 mm×180 mm×150 mm. The bedding material is corn cob, which is changed twice per week.
  Diet: Animals had free access to irradiation sterilized dry granule food during the entire study period.
  Water: Animals had free access to sterile drinking water.
  Cage identification: The identification labels for each cage contained the following information: number of animals, sex, strain, the date received, treatment, study number, group number and the starting date of the treatment.
  Animal identification: Animals were marked by ear coding.

4. Experimental Methods and Procedures 4.1 Cell Culture
  The NCI-H292 tumor cells were maintained in vitro as a monolayer culture in RPMI-1640 medium supplemented with 10% heat inactivated fetal bovine serum at 37° C. in an atmosphere of 5% $CO_2$ in air. The tumor cells were routinely subcultured twice weekly by trypsin-EDTA treatment. The cells growing in an exponential growth phase were harvested and counted for tumor inoculation.

4.2 Tumor Inoculation

Each mouse was inoculated subcutaneously at the right flank with NCI-H292 tumor cells ($10 \times 10^6$) in 0.2 ml of PBS for tumor development. 43 animals were randomized when the average tumor volume reached 168 mm$^3$. The test article administration and the animal numbers in each group were shown in the experimental design table.

Testing Article Formulation Preparation

| Treatment | Con. (mg/ml) | Formulation |
|---|---|---|
| Vehicle | — | 25 mM Histidine pH 7 10% sucrose |
| BCY8549 | 1 | Dissolved 2 mg BCY8549 with 1914 μl vehicle buffer |
| BCY8549 | 0.3 | Dilute 240 μl 1 mg/ml BCY8549 stock with 560 μl vehicle buffer |
| BCY8550 | 1 | Dissolved 1.1 mg BCY8550 in 1091 μl 10% Kolliphor, 50 mM Hepes pH 7 |
| BCY8550 | 0.3 | Dilute 240 μl 1 mg/ml BCY8550 stock with 560 μl 10% Kolliphor, 50 mM Hepes pH 7 |
| BCY8783 | 1 | Dissolved 1 mg BCY8783 in 968 μl vehicle buffer |
| BCY8783 | 0.3 | Dilute 240 μl 1 mg/ml BCY8783 stock with 560 μl vehicle buffer |
| BCY8784 | 1 | Dissolved 1.2 mg BCY8784 in 1148 μl vehicle buffer |
| BCY8784 | 0.3 | Dilute 240 μl 1 mg/ml BCY8784 stock with 560 μl vehicle buffer |

4.4 Sample Collection

At the end of study, the plasma of groups 2 and 3 mice was collected at 5 min, 15 min, 30 min, 1 h and 2 h post the last dosing.

5. Results

5.1 Tumor Growth Curves

Tumor growth curves are shown in FIGS. 25 to 28.

5.2 Tumor Volume Trace

Mean tumor volume over time in female Balb/c nude mice bearing NCI-H292 xenograft is shown in Table 23.

TABLE 23

Tumor volume trace over time

| | Days after the start of treatment | | | | | | |
|---|---|---|---|---|---|---|---|
| Gr. Treatment | 0 | 2 | 4 | 7 | 9 | 11 | 14 |
| 1 Vehicle, qw | 168 ± 16 | 297 ± 48 | 362 ± 58 | 460 ± 62 | 548 ± 69 | 697 ± 102 | 843 ± 152 |
| 2 BCY8549, 3 mpk, qw | 168 ± 30 | 187 ± 36 | 164 ± 31 | 205 ± 50 | 234 ± 57 | 240 ± 98 | 251 ± 66 |
| 3 BCY8550, 3 mpk, qw | 167 ± 18 | 208 ± 21 | 237 ± 16 | 324 ± 35 | 421 ± 35 | 489 ± 44 | 545 ± 77 |
| 4 BCY8783, 3 mpk, qw | 167 ± 28 | 182 ± 27 | 161 ± 40 | 137 ± 19 | 135 ± 22 | 97 ± 20 | 97 ± 19 |
| 5 BCY8784, 3 mpk, qw | 167 ± 36 | 165 ± 28 | 111 ± 19 | 121 ± 12 | 123 ± 8 | 99 ± 10 | 94 ± 7 |

5.3 Tumor Growth Inhibition Analysis

Tumor growth inhibition rate for test articles in the NCI-H292 xenograft model was calculated based on tumor volume measurements at day 14 after the start of treatment.

TABLE 24

Tumor growth inhibition analysis

| Gr | Treatment | Tumor Volume (mm$^3$)[a] | T/C[b] (%) | TGI (%) | P value |
|---|---|---|---|---|---|
| 1 | Vehicle, qw | 843 ± 152 | — | — | — |
| 2 | BCY8549, 3 mpk, qw | 251 ± 66 | 29.8 | 87.7 | $p < 0.05$ |
| 3 | BCY8550, 3 mpk, qw | 545 ± 77 | 64.7 | 43.9 | $p > 0.05$ |
| 4 | BCY8783, 3 mpk, qw | 97 ± 19 | 11.5 | 110.3 | $p < 0.01$ |
| 5 | BCY8784, 3 mpk, qw | 94 ± 7 | 11.1 | 110.8 | $p < 0.01$ |

[a]Mean ± SEM.
[b]Tumor Growth Inhibition is calculated by dividing the group average tumor volume for the treated group by the group average tumor volume for the control group (T/C).

6. Results Summary and Discussion

In this study, the therapeutic efficacy of BCYs in the NCI-H292 xenograft model was evaluated. The measured tumor volume of all treatment groups at various time points are shown in FIGS. 25 to 28 and Tables 23 and 24.

The mean tumor size of vehicle treated mice reached 843 mm$^3$ on day 14. BCY8550 at 3 mg/kg didn't show obvious antitumor activity, the other compounds at 3 mg/kg showed significant anti-tumor activity. Among them, BCY8783 and BCY8784 showed comparable tumor inhibitory effect with BCY8245 and regressed the tumors potently. In this study, all mice maintained bodyweight well.

Example 6: Investigation of Association Between Copy Number Variation (CNV) and Gene Expression for Nectin-4 from Multiple Tumour Types Methods 1. Select all studies in cBioPortal (cbioportal.org/) and search for NECTIN4.
   (a) Remove provisional studies.
   (b) Deselect studies with overlapping samples to prevent sample bias (based warning in cBioPortal) —always keep PanCancer study if this is an option.
   (c) Studies selected for analysis (Table 25).

TABLE 25

Studies analysed from cBioPortal and units in study

| Study Name | Units |
|---|---|
| Breast Cancer (METABRIC, Nature 2012 & Nat Commun 2016) | mRNA expression (microarray) |
| Breast Invasive Carcinoma (TCGA, PanCancer Atlas) | mRNA Expression Batch Normalized/Merged from Illumina HiSeq_RNASeqV2 syn4976369 |
| Uterine Corpus Endometrial Carcinoma (TCGA, PanCancer Atlas) | mRNA Expression Batch Normalized/Merged from Illumina HiSeq_RNASeqV2 syn4976369 |
| Bladder Urothelial Carcinoma (TCGA, PanCancer Atlas) | RSEM (Batch normalized from Illumina HiSEQ_RNASeqV2) |
| Lung Adenocarcinoma (TCGA, PanCancer Atlas) | mRNA Expression, RSEM (Batch normalized from Illumina HiSeq_RNASeqV2 |
| Cervical Squamous Cell Carcinoma (TCGA, PanCancer Atlas) | RSEM (Batch normalized from Illumina HiSeq_RNASeqV2) |
| Lung Squamous Cell Carcinoma (TCGA, PanCancer Atlas) | mRNA Expression Batch Normalized/Merged from Illumina HiSeq_RNASeqV2 syn4976369 |
| Head and Neck Squamous Cell Carcinoma (TCGA, PanCancer Atlas) | mRNA Expression, RSEM (Batch Normalized from Illumina HiSeq_RNASeqV2) |
| Pancreatic Adenocarcinoma (TCGA, PanCancer Atlas) | mRNA Expression Batch Normalized/Merged from Illumina HiSeq_RNASeqV2 syn4976369 |
| Thyroid Carcinoma (TCGA, PanCancer Atlas) | mRNA Expression Batch Normalized/Merged from Illumina HiSeq_RNASeqV2 syn4976369 |
| Colon Adenocarcinoma (TCGA, PanCancer Atlas) | RSEM (Batch normalized from Illumia HiSeq_RNASeqV2) |
| Thymoma (TCGA, PanCancer Atlas) | mRNA Expression Batch Normalized/Merged from Illumina HiSeq_RNASeqV2 syn4976369 |
| Sarcoma (TCGA, PanCancer Atlas) | mRNA Expression Batch Normalized/Merged from Illumina HiSeq_RNASeqV2 syn4976369 |
| Stomach Adenocarcinoma (TCGA, PanCancer Atlas) | mRNA Expression Batch Normalized/Merged from Illumina HiSeq_RNASeqV2 syn4976369 |
| Prostate Adenocarcinoma (TCGA, PanCancer Atlas) | mRNA Expression, RSEM (Batch normalized from Illumina HiSeq_RNASeqV2) |
| Kidney Chromophobe (TCGA, PanCancer Atlas) | mRNA Expression, RSEM (Batch normalized from Illumina HiSeq_RNASeqV2) |
| Rectum Adenocarcinoma (TCGA, PanCancer Atlas) | mRNA Expression, RSEM (Batch normalized from Illumina HiSeq_RNASeqV2) |
| Metastatic Prostate Cancer, SU2C/PCF Dream Team (Robinson et al., Cell 2015) | mRNA expression/capture (RNA Seq RPKM) |
| Pheochromocytoma and Paraganglioma (TCGA, PanCancer Atlas) | mRNA Expression Batch Normalized/Merged from Illumina HiSeq_RNASeqV2 syn4976369 |
| Kidenny Renal Clear Cell Carcinoma (TCGA, PanCancer Atlas) | mRNA Expression, RSEM (Batch normalized from Illumina HiSeq_RNASeqV2) |

TABLE 25-continued

Studies analysed from cBioPortal and units in study

| Study Name | Units |
|---|---|
| Prostate Adenocarcinoma (Fred Hutchinson CRC, Nat Med 2016) | mRNA expression |
| Colorectal Adenocarcinoma (TCGA, Nature 2012) | RNA Seq RPKM |
| Ovarian Serous Cystadenocarcinoma (TCGA, PanCancer Atlas) | mRNA Expression Batch Normalized/Merged from Illumina HiSeq_RNASeqV2 syn4976369 |
| Kidney Renal Papillary Cell Carcinoma (TCGA, PanCancer Atlas) | mRNA Expression, RSEM (Batch normalized from Illumina HiSeq_RNASeqV2) |
| Brain Lower Grade Glioma (TCGA, PanCancer Atlas) | RSEM (Batch normalized from Illumina HiSeq_RNASeqV2) |
| Esophageal Adenocarcinoma (TCGA, PanCancer Atlas) | RSEM (Batch normalized from Illumina HiSeq_RNASeqV2) |
| Adrenocortical Carcinoma (TCGA, PanCancer Atlas) | RSEM (Batch normalized from Illumina HiSeq_RNASeqV2) |
| Glioblastoma Multiforme (TCGA, PanCancer Atlas) | mRNA Expression, RSEM (Batch normalized from Illumina HiSeq_RNASeqV2) |
| Prostate Adrenocarcinoma (MSKCC, Cancer Cell 2010) | mRNA Expression |
| Uterine Carcinosarcoma (TCGA, PanCancer Atlas) | mRNA Expression Batch Normalized/Merged from Illumina HiSeq_RNASeqV2 syn4976369 |
| Acute Meyloid Leukemia (TCGA, PanCancer Atlas) | mRNA Expression, RSEM (Batch normalized from Illumina HiSeq_RNASeqV2) |
| Skin Cutaneous Melanoma (TCGA, PanCancer Atlas) | mRNA Expression Batch Normalized/Merged from Illumina HiSeq_RNASeqV2 syn4976369 |
| Mesothelioma (TCGA, PanCancer Atlas) | mRNA Expression Batch Normalized/Merged from Illumina HiSeq_RNASeqV2 syn4976369 |
| Cholangiocarcinoma (TCGA, PanCancer Atlas) | RSEM (Batch normalized from Illumina HiSeq_RNASeqV2) |
| Pediatric Acute Lymphoid Leukemia-Phase II (TARGET, 2018) | NECTIN4: mRNA expression (RNA-Seq RPKM) |
| Diffuse Large B-Cell Lymphoma (TCGA, PanCancer Atlas) | mRNA expression, RSEM (Batch normalized from Illumina HiSeq_RNASeqV2) |
| Cancer Cell Line Encyclopedia (Novartis/Broad, Nature 2012) | mRNA expression (microarray) |
| UVeal Melanoma (TCGA, PanCancer Atlas) | mRNA Expression Batch Normalized/Merged from Illumina HiSeq_RNASeqV2 syn4976369 |
| Pediatric Wilms' Tumor (TARGET, 2018) | NECTIN4: mRNA expression (RNA-Seq RPKM) |
| Testicular Germa Cell Tumors (TCGA, PanCancer Atlas) | mRNA Expression Batch Normalized/Merged from Illumina HiSeq_RNASeqV2 syn4976369 |
| Liver Hepatocellular Carcinoma (TCGA, PanCancer Atlas) | NECTIN4: mRNA Expression, RSEM (Batch normalized from Illumina HiSeq_RNASeqV2) |

2. Export CNV and RNA expression data from cBioPortal.
3. Test if CNVs are statistically significantly associated with changes in mRNA expression for Nectin-4 (log 2 not applied).
  (a) Run non-parametric Kruskal-Wallis test in GraphPad Prism (7.04) and R/R studio (threshold for significance: p<0.01).
    (i) GraphPad Prism: set up column table, run non-parametric test with no matching or pairing and do not assume Gaussian distribution.
    (ii) Packages used in R:
      1. XLConnect
      2. dolyr
      3. Kruskal-Wallis Rank Sum Test: Kruksal.test.
4. Adjust for multiple comparisons (include all possible comparisons even if n=1 within a group) in R/Rstudio using Dunn's test (threshold for significance: p<0.025).
  (a) dunn.test with multiple comparison method="bonferonni".

Results

The results are shown in Table 26 below. Across 41 publicly available TCGA datasets that report both tumor CNV and mRNA gene expression data for Nectin-4, there are many indications where cases have been reported with either Nectin-4 copy number gains (2-3 copies) or amplifications (>3 copies). In addition, separate cases have been demonstrated to have shallow deletions (<2 copies) with rare reports of tumors containing deep deletions consistent with greater than 1 copy loss or biallelic Nectin-4 loss. Indications where amplifications were detected most frequently were breast cancer (10-22%), bladder cancer (20%), lung cancer (5-7%) and hepatocellular carcinoma (8%). Indications with most frequent copy number losses were kidney chromophobe (77%), renal clear cell carcinoma (RCC) (6.5%), sarcoma (10%), colon cancer (10%), head and neck cancer (7%) and lung squamous cancer. These data indicate that there are a range of CNV within and across tumor indications and a diversity of copy number patterns across different indications. In addition to CNVs within the TCGA dataset the median Nectin-4 mRNA expression level per indication covers approximately 210 range. Therefore, given the range of Nectin-4 mRNA expression levels and the CNVs observed across and within tumor types statistical testing was performed to identify potential associations between Nectin-4 mRNA levels and Nectin-4 CNVs within individual TCGA datasets/indications. Tumors per indication were allocated to 1 of 5 classes:
  a) Deep deletion;
  b) Shallow deletion;
  c) Diploid;
  d) Gain; or
  e) Amplification.

Kruskall-Wallis testing was then performed to detect if the distributions of mRNA expression values per classes differed between classes (P<0.01). For those TCGA data sets with P<0.01 and to identify which classes were different to one another post hoc testing was performed by calculating Z-statistics with adjusted P-values calculated (Bonferonni). For simplicity of interpretation pair-wise comparisons vs. diploid per indication were reviewed (although all pair-wise P-values were calculated). 18/41 TCGA studies met Kruskal-Wallis P<0.01 & Bonferonni P<0.025 for Gain vs. Diploid and/or Amplification vs. Diploid comparisons indicating an association of increased Nectin-4 mRNA expression with increased Nectin-4 copy number. These 18 studies represented 14 independent tumor histologies:

breast, uterine, bladder, lung adenocarcinoma, lung squamous, cervical, head and neck, pancreatic, thyroid, colorectal, thymoma, sarcoma, renal clear cell carcinoma (RCC) and stomach.

In addition, 6 studies have decreased mRNA expression associated with copy number loss. Four of these six studies not only showed an association between CNV loss and reduced expression, but also reported CNV gains associated with high expression:

stomach, lung squamous, colon and thyroid.

Whereas two indications, kidney chromophobe and prostate cancer only reported associations with CNV loss and low transcript abundance. Additionally, there was a separate prostate cancer study (Metastatic Prostate Cancer, SU2C/PCF Dream Team (Robinson et al., Cell 2015)) that showed copy number gains associated with high expression (relative to diploid).

These observations of tumor CNV loss and gain with mRNA expression levels may represent the mechanism behind Nectin-4 tumor protein expression in those indications where such associations were observed. Clearly there are indications where CNVs do not appear to impact mRNA expression levels in a predictable pattern such as hepatocellular carcinoma. In vivo preclinical efficacy with certain Nectin-4 bicyclic drug conjugates of the invention has been demonstrated to correlate with Nectin-4 protein expression as measured by IHC. Therefore, if tumor Nectin-4 CNVs associate with mRNA levels and predict protein expression levels it is formally possible that patients with tumors containing copy number increases (gain or amplification) may be more likely to respond to Nectin-4 bicyclic drug conjugates of the invention. If patients could be identified with increased CNV in Nectin-4 then this information could be used to select patients for treatment with Nectin-4 bicyclic drug conjugates of the invention.

TABLE 26

Results of Investigation of Association between Copy Number Variation (CNV) and gene expression for Nectin-4

| | | Number of samples/group (n = X) | | | | | Kruskal-Wallis Test | |
| --- | --- | --- | --- | --- | --- | --- | --- | --- |
| Study name | Units | Deep deletion | Shallow deletion | Diploid | Gain | Amplification | Kruskal-Wallis Statistic | p-value |
| Breast Cancer (METABRIC, Nature 2012 & Nat Commun 2016) | mRNA expression (microarray) | 0 | 11 | 745 | 706 | 404 | 380.4 | <2.2e−16 |

TABLE 26-continued

Results of Investigation of Association between Copy Number Variation (CNV) and gene expression for Nectin-4

| Cancer Type | Method | | | | | | | |
|---|---|---|---|---|---|---|---|---|
| Breast Invasive Carcinoma (TCGA, PanCancer Atlas) | mRNA Expression Batch Normalized/ Merged from Illumina HiSeq_RNASeq V2 syn4976369 | 0 | 13 | 244 | 640 | 97 | 219.5 | <2.2e−16 |
| Uterine Corpus Endometrial Carcinoma (TCGA, PanCancer Atlas) | mRNA Expression Batch Normalized/ Merged from Illumina HiSeq_RNASeq V2 syn4976369 | 0 | 5 | 274 | 210 | 18 | 76.392 | <2.2e−16 |
| Bladder Urothelial Carcinoma (TCGA, PanCancer Atlas) | RSEM (Batch normalized from Illumina HiSeq_RNASeq V2) | 0 | 16 | 171 | 145 | 70 | 67.078 | 1.80E−14 |
| Lung Adenocarcinoma (TCGA, PanCancer Atlas) | mRNA Expression, RSEM (Batch normalized from Illumina HiSeq_RNASeq V2) | 0 | 9 | 129 | 332 | 33 | 59.578 | 7.24E−13 |
| Cervical Squamous Cell Carcinoma (TCGA, PanCancer Atlas) | RSEM (Batch normalized from Illumina HiSeq_RNASeq V2 | 0 | 7 | 115 | 147 | 6 | 51.372 | 4.08E−11 |
| Lung Squamous Cell Carcinoma (TCGA, PanCancer Atlas) | mRNA Expression Batch Normalized/ Merged from Illumina HiSeq_RNASeq V2 syn4976369 | 0 | 22 | 199 | 222 | 23 | 42.128 | 3.77E−09 |
| Head and Neck Squamous Cell Carcinoma (TCGA, PanCancer Atlas) | mRNA Expression, RSEM (Batch normalized from Illumina HiSeq_RNASeq V2) | 0 | 32 | 330 | 122 | 4 | 37.81 | 3.10E−08 |
| Pancreatic Adenocarcinoma (TCGA, PanCancer Atlas) | mRNA Expression Batch Normalized/ Merged from Illumina HiSeq_RNASeq V2 syn4976369 | 0 | 7 | 105 | 50 | 6 | 36.863 | 4.92E−08 |
| Thyroid Carcinoma (TCGA, PanCancer Atlas) | mRNA Expression Batch Normalized/ Merged from Illumina HiSeq_RNASeq V2 syn4976369 | 0 | 3 | 451 | 26 | 0 | 31.882 | 1.19E−07 |
| Colon Adenocarcinoma (TCGA, PanCancer Atlas) | RSEM (Batch normalized from Illumina HiSeq_RNASeq V2) | 0 | 40 | 266 | 80 | 2 | 31.309 | 7.32E−07 |
| Thymoma (TCGA, PanCancer Atlas) | mRNA Expression Batch Normalized/ | 0 | 0 | 95 | 22 | 2 | 26.213 | 2.03E−06 |

TABLE 26-continued

Results of Investigation of Association between Copy Number
Variation (CNV) and gene expression for Nectin-4

| | | | | | | | | |
|---|---|---|---|---|---|---|---|---|
| Sarcoma (TCGA, PanCancer Atlas) | Merged from Illumina HiSeq_RNASeq V2 syn4976369 mRNA Expression Batch Normalized/ Merged from Illumina HiSeq_RNASeq V2 syn4976369 | 0 | 22 | 120 | 74 | 14 | 26.831 | 6.39E−06 |
| Stomach Adenocarcinoma (TCGA, PanCancer Atlas) | mRNA Expression Batch Normalized/ Merged from Illumina HiSeq_RNASeq V2 syn4976369 | 0 | 11 | 253 | 134 | 9 | 19.096 | 0.0002611 |
| Prostate Adenocarcinoma (TCGA, PanCancer Atlas) | mRNA Expression, RSEM (Batch normalized from Illumina HiSeq_RNASeq V2) | 3 | 15 | 437 | 29 | 3 | 19.125 | 0.0007426 |
| Kidney Chromophobe (TCGA, PanCancer Atlas) | mRNA Expression, RSEM (Batch normalized from Illumina HiSeq_RNASeq V2 | 0 | 50 | 14 | 1 | 0 | 13.851 | 0.0009823 |
| Rectum Adenocarcinoma (TCGA, PanCancer Atlas) | mRNA Expression Batch Normalized/ Merged from Illumina HiSeq_RNASeq V2 syn4976369 | 0 | 11 | 91 | 33 | 1 | 14.056 | 0.00283 |
| Metastatic Prostate Cancer, SU2C/PCF Dream Team (Robinson et al., Cell 2015) | mRNA expression/ capture (RNA Seq RPKM) | 0 | 3 | 75 | 37 | 2 | 12.336 | 0.006317 |
| Pheochromocytoma and Paraganglioma (TCGA, PanCancer Atlas) | mRNA Expression Batch Normalized/ Merged from Illumina HiSeq_RNASeq V2 syn4976369 | 0 | 14 | 123 | 19 | 5 | 11.573 | 0.008998 |
| Kidney Renal Clear Cell Carcinoma (TCGA, PanCancer Atlas) | mRNA Expression, RSEM (Batch normalized from Illumina HiSeq_RNASeq V2) | 0 | 22 | 297 | 32 | 1 | 11.314 | 0.01014 |
| Prostate Adenocarcinoma (Fred Hutchinson CRC, Nat Med 2016) | mRNA expression | 0 | 1 | 59 | 66 | 7 | 9.8842 | 0.01958 |
| Colorectal Adenocarcinoma (TCGA, Nature 2012) | RNA Seq RPKM | 0 | 4 | 153 | 34 | 2 | 9.4054 | 0.02 |
| Ovarian Serous Cystadenocarcinoma | mRNA Expression Batch | 0 | 7 | 75 | 117 | 2 | 9.3101 | 0.02544 |

TABLE 26-continued

Results of Investigation of Association between Copy Number Variation (CNV) and gene expression for Nectin-4

| | | | | | | | | |
|---|---|---|---|---|---|---|---|---|
| (TCGA, PanCancer Atlas) | Normalized/ Merged from Illumina HiSeq_RNASeq V2 syn4976369 | | | | | | | |
| Kidney Renal Papillary Cell Carcinoma (TCGA, PanCancer Atlas) | mRNA Expression, RSEM (Batch normalized from Illumina HiSeq_RNASeq V2) | 1 | 19 | 239 | 15 | 0 | 9.1134 | 0.02782 |
| Brain Lower Grade Glioma (TCGA, PanCancer Atlas) | RSEM (Batch normalized from Illumina HiSeq_RNASeq V2) | 0 | 11 | 462 | 32 | 2 | 4.769 | 0.1895 |
| Esophageal Adenocarcinoma (TCGA, PanCancer Atlas) | RSEM (Batch normalized from Illumina HiSeq_RNASeq V2) | 0 | 8 | 78 | 86 | 9 | 4.267 | 0.234 |
| Adrenocortical Carcinoma (TCGA, PanCancer Atlas) | RSEM (Batch normalized from Illumina HiSeq_RNASeq V2) | 0 | 9 | 54 | 11 | 2 | 4.0298 | 0.2583 |
| Glioblastoma Multiforme (TCGA, PanCancer Atlas) | mRNA Expression, RSEM (Batch normalized from Illumina HiSeq_RNASeq V2) | 0 | 3 | 115 | 27 | 0 | 2.6252 | 0.2691 |
| Prostate Adenocarcinoma (MSKCC, Cancer Cell 2010) | mRNA Expression | 0 | 3 | 78 | 4 | 0 | 2.181 | 0.3361 |
| Uterine Carcinosarcoma (TCGA, PanCancer Atlas) | mRNA Expression Batch Normalized/ Merged from Illumina HiSeq_RNASeq V2 syn4976369 | 0 | 4 | 14 | 37 | 1 | 3.308 | 0.3465 |
| Acute Myeloid Leukemia (TCGA, PanCancer Atlas) | mRNA Expression, RSEM (Batch normalized from Illumina HiSeq_RNASeq V2) | 0 | 0 | 163 | 2 | 0 | 0.82638 | 0.3633 |
| Skin Cutaneous Melanoma (TCGA, PanCancer Atlas) | mRNA Expression Batch Normalized/ Merged from Illumina HiSeq_RNASeq V2 syn4976369 | 1 | 19 | 146 | 189 | 8 | 3.6483 | 0.4557 |
| Mesothelioma (TCGA, PanCancer Atlas) | mRNA Expression Batch Normalized/ Merged from Illumina HiSeq_RNASeq V2 syn4976369 | 0 | 2 | 56 | 23 | 1 | 2.3747 | 0.4984 |
| Cholangiocarcinoma (TCGA, PanCancer Atlas) | RSEM (Batch normalized from Illumina HiSeq_RNASeq V2) | 0 | 0 | 13 | 18 | 5 | 1.3058 | 0.5205 |
| Pediatric Acute Lymphoid | NECTIN4: mRNA | 0 | 4 | 66 | 10 | 1 | 2.2337 | 0.5253 |

TABLE 26-continued

Results of Investigation of Association between Copy Number Variation (CNV) and gene expression for Nectin-4

| | | | | | | | | |
|---|---|---|---|---|---|---|---|---|
| Leukemia - Phase II (TARGET, 2018) | expression (RNA-Seq RPKM) | | | | | | | |
| Diffuse Large B-Cell Lymphoma (TCGA, PanCancer Atlas) | mRNA Expression, RSEM (Batch normalized from Illumina HiSeq_RNASeq V2) | 0 | 2 | 25 | 9 | 1 | 1.4939 | 0.6837 |
| Cancer Cell Line Encyclopedia (Novartis/Broad, Nature 2012) | mRNA expression (microarray) | 1 | 112 | 396 | 319 | 49 | 1.9013 | 0.7539 |
| Uveal Melanoma (TCGA, PanCancer Atlas) | mRNA Expression Batch Normalized/ Merged from Illumina HiSeq_RNASeq V2 syn4976369 | 0 | 0 | 72 | 8 | 0 | 0.067914 | 0.7944 |
| Pediatric Wilms' Tumor (TARGET, 2018) | NECTIN4: mRNA expression (RNA-Seq RPKM) | 0 | 1 | 50 | 46 | 4 | 0.78538 | 0.853 |
| Testicular Germ Cell Tumors (TCGA, PanCancer Atlas) | mRNA Expression Batch Normalized/ Merged from Illumina HiSeq_RNASeq V2 syn4976369 | 0 | 1 | 76 | 67 | 0 | 0.14279 | 0.9311 |
| Liver Hepatocellular Carcinoma (TCGA, PanCancer Atlas) | NECTIN4: mRNA Expression, RSEM (Batch normalized from Illumina HiSeq_RNASeq V2) | 0 | 1 | 89 | 224 | 34 | 0.2908 | 0.9618 |

| | Pairwise Comparison, Z statistic (adjusted p-value), Bonferonni | | | |
|---|---|---|---|---|
| Study name | Deep Deletion – Diploid | Diploid – Shallow deletion | Diploid- Gain | Amplification – Diploid |
| Breast Cancer (METABRIC, Nature 2012 & Nat Commun 2016) | N/A | 0.568782 (1.0000) | −11.89096 (0.0000)* | 18.85085 (0.0000)* |
| Breast Invasive Carcinoma (TCGA, PanCancer Atlas) | N/A | 1.186089 (0.7068) | −12.30176 (0.0000)* | 12.07432 (0.0000)* |
| Uterine Corpus Endometrial Carcinoma (TCGA, PanCancer Atlas) | N/A | 1.130854 (0.7743) | −7.274308 (0.0000)* | 5.601260 (0.0000)* |

TABLE 26-continued

Results of Investigation of Association between Copy Number
Variation (CNV) and gene expression for Nectin-4

| | | | | |
|---|---|---|---|---|
| Bladder Urothelial Carcinoma (TCGA, PanCancer Atlas) | N/A | 0.060907 (1.0000) | −3.323839 (0.0027)* | 8.054269 (0.0000)* |
| Lung Adenocarcinoma (TCGA, PanCancer Atlas) | N/A | 0.237200 (1.0000) | −6.244156 (0.0000)* | 6.247228 (0.0000)* |
| Cervical Squamous Cell Carcinoma (TCGA, PanCancer Atlas) | N/A | 1.093749 (0.8222) | −6.170067 (0.0000)* | 3.815296 (0.0004)* |
| Lung Squamous Cell Carcinoma (TCGA, PanCancer Atlas) | N/A | 2.819759 (0.0144)* | −3.034709 (0.0072)* | 4.860629 (0.0000)* |
| Head and Neck Squamous Cell Carcinoma (TCGA, PanCancer Atlas) | N/A | 1.736867 (0.2472) | −4.848550 (0.0000)* | 3.033083 (0.0073)* |
| Pancreatic Adenocarcinoma (TCGA, PanCancer Atlas) | N/A | 1.333193 (0.5474) | −4.388701 (0.0000)* | 4.166401 (0.0001)* |
| Thyroid Carcinoma (TCGA, PanCancer Atlas) | N/A | 2.486724 (0.0193)* | −5.021279 (0.0000)* | N/A |
| Colon Adenocarcinoma (TCGA, PanCancer Atlas) | N/A | 3.811621 (0.0004)* | −2.987223 (0.0084)* | 1.759508 (0.2355) |
| Thymoma (TCGA, PanCancer Atlas) | N/A | N/A | −4.962115 (0.0000)* | 1.567541 (0.1755) |
| Sarcoma (TCGA, PanCancer Atlas) | N/A | −0.410850 (1.0000) | −4.582047 (0.0000)* | 3.106262 (0.0057)* |
| Stomach Adenocarcinoma (TCGA, PanCancer Atlas) | N/A | 2.835658 (0.0137)* | −2.921683 (0.0104)* | −0.265333 (1.0000) |
| Prostate Adenocarcinoma (TCGA, PanCancer Atlas) | −2.532734 (0.0566) | 3.202764 (0.0068)* | −1.351661 (0.8824) | 0.509151 (1.0000) |
| Kidney Chromophobe (TCGA, PanCancer Atlas) | N/A | 3.609735 (0.0005)* | −0.058395 (1.0000) | N/A |

TABLE 26-continued

Results of Investigation of Association between Copy Number
Variation (CNV) and gene expression for Nectin-4

| | | | | | |
|---|---|---|---|---|---|
| Rectum Adenocarcinoma (TCGA, PanCancer Atlas) | | N/A | 1.050760 (0.8801) | −2.951363 (0.0095)* | 1.809506 (0.2111) |
| Metastatic Prostate Cancer, SU2C/PCF Dream Team (Robinson et al., Cell 2015) | | N/A | 0.040058 (1.0000) | −3.420479 (0.0019)* | −0.362109 (1.0000) |
| Pheochromocytoma and Paraganglioma (TCGA, PanCancer Atlas) | | N/A | −1.271308 (0.6109) | −2.597791 (0.0281) | 2.201970 (0.0830) |
| Kidney Renal Clear Cell Carcinoma (TCGA, PanCancer Atlas) | | N/A | −0.748380 (1.0000) | −2.996852 (0.0082)* | 1.502464 (0.3989) |
| Prostate Adenocarcinoma (Fred Hutchinson CRC, Nat Med 2016) | | N/A | 0.677737 (1.0000) | −0.409530 (1.0000) | 3.028793 (0.0074)* |
| Colorectal Adenocarcinoma (TCGA, Nature 2012) | | N/A | 0.062894 (1.0000) | −1.860678 (0.1884) | 2.514653 (0.0357) |
| Ovarian Serous Cystadenocarcinoma (TCGA, PanCancer Atlas) | | N/A | 1.589035 (0.3362) | −2.168253 (0.0904) | 0.062706 (1.0000) |
| Kidney Renal Papillary Cell Carcinoma (TCGA, PanCancer Atlas) | 1.607764 (0.3237) | −0.569938 (1.0000) | −2.552083 (0.0321) | N/A | |
| Brain Lower Grade Glioma (TCGA, PanCancer Atlas) | | N/A | 0.462462 (1.0000) | −1.718955 (0.2569) | 1.261960 (0.6209) |
| Esophageal Adenocarcinoma (TCGA, PanCancer Atlas) | | N/A | 0.747441 (1.0000) | 0.768855 (1.0000) | 1.756911 (0.2368) |
| Adrenocortical Carcinoma (TCGA, PanCancer Atlas) | | N/A | 0.157281 (1.0000) | −0.131234 (1.0000) | 1.984800 (0.1415) |
| Glioblastoma Multiforme (TCGA, PanCancer Atlas) | | N/A | 0.180194 (1.0000) | −1.593755 (0.1665) | N/A |
| Prostate Adenocarcinoma (MSKCC, Cancer Cell 2010) | | N/A | 1.423206 (0.2320) | 0.454433 (0.9743) | N/A |
| Uterine Carcinosarcoma (TCGA, PanCancer Atlas) | | N/A | 0.104285 (1.0000) | −0.539065 (1.0000) | 1.764353 (0.2330) |

TABLE 26-continued

Results of Investigation of Association between Copy Number
Variation (CNV) and gene expression for Nectin-4

| | | | | |
|---|---|---|---|---|
| Acute Myeloid Leukemia (TCGA, PanCancer Atlas) | N/A | N/A | 0.909052 (0.1817) | N/A |
| Skin Cutaneous Melanoma (TCGA, PanCancer Atlas) | −0.898187 (1.0000) | −1.116994 (1.0000) | −1.235317 (1.0000) | 0.900287 (1.0000) |
| Mesothelioma (TCGA, PanCancer Atlas) | N/A | −1.426445 (0.4612) | 0.418206 (1.0000) | 0.143440 (1.0000) |
| Cholangiocarcinoma (TCGA, PanCancer Atlas) | N/A | N/A | −0.653051 (0.7706) | 1.121055 (0.3934) |
| Pediatric Acute Lymphoid Leukemia - Phase II (TARGET, 2018) | N/A | 0.133399 (1.0000) | −0.504875 (1.0000) | −1.375728 (0.5067) |
| Diffuse Large B-Cell Lymphoma (TCGA, PanCancer Atlas) | N/A | 0.374642 (1.0000) | 1.170326 (0.7256) | −0.405844 (1.0000) |
| Cancer Cell Line Encyclopedia (Novartis/Broad, Nature 2012) | −0.398204 (1.0000) | 0.562427 (1.0000) | −0.847920 (1.0000) | −0.379251 (1.0000) |
| Uveal Melanoma (TCGA, PanCancer Atlas) | N/A | N/A | −0.260603 (0.3972) | N/A |
| Pediatric Wilms' Tumor (TARGET, 2018) | N/A | 0.165021 (1.0000) | −0.815915 (1.0000) | −0.090701 (1.0000) |
| Testicular Germ Cell Tumors (TCGA, PanCancer Atlas) | N/A | 0.366969 (1.0000) | 0.061216 (1.0000) | N/A |
| Liver Hepatocellular Carcinoma (TCGA, PanCancer Atlas) | N/A | 0.082418 (1.0000) | 0.188961 (1.0000) | 0.363341 (1.0000) |

Example 7: Expression Analysis of Nectin-4 in 6 Cell Lines

1. Study Objective

The objective of the study was to evaluate the expression of Nectin-4 in 6 cell lines by flow cytometry, including 2 Breast cancer (T-47D, MDA-MB-468), 3 Lung cancer (NCI-H292, NCI-H322, NCI-H526) and 1 fibrosarcoma (HT-1080) cell lines).

2. Panel Design

Panel for FCM in T-47D, MDA-MB-468, NCI-H292, NCI-H322 and HT-1080

| Fluorochrome | Blank | Isotype | Panel |
|---|---|---|---|
| PE | — | Isotype ctrl | Nectin-4 |

Panel for NCI-H526

| Fluorochrome | Blank | Isotype | Panel |
|---|---|---|---|
| PE | — | Isotype ctrl | Nectin-4 |
| BV421 | Live/Dead | Live/Dead | Live/Dead |

3. Material

3.1. Sample
Cell Lines List

| Item | Cell lines | Cancer Type | Vendor | Culture Properties | Culture Media |
|---|---|---|---|---|---|
| 1 | T-47D | Breast cancer | ATCC-HTB-133 | adherent | RPMI-1640 + 0.2 Units/ml bovine insulin + 10% FBS |
| 2 | MDA-MB-468 | Breast cancer | ATCC-HTB-132 | adherent | Leibovitz's L-15 + 10% FBS |
| 3 | NCI-H292 | Lung | 91091815 | adherent | RPMI-1640 + 10% FBS |
| 4 | NCI-H322 | Lung | 95111734 | adherent | RPMI-1640 + 2 mM Glutamine + 10% FBS |
| 5 | NCI-H526 | Lung | CRL-5811 | round clusters in suspension | RPMI-1640 + 10% FBS |
| 6 | HT1080 | Fibrosarcoma | ECACC-85111505 | adherent | EMEM + 2 mM Glutamine + 1% Non Essential Amino Acids (NEAA) + 10% FBS |

3.2. Reagents
Antibodies and Kit for Flow Cytometry Analysis

| Fluorescence | Marker | Catalog | Provider | Comment |
|---|---|---|---|---|
| PE | Nectin-4 | FAB2659P | R&D | AAAO0217021 |
| PE | Isotype control IgG2b | IC0041P | R&D | From BICY-20161117A |

DPBS (Corning-21-031-CV)
Staining buffer (eBioscience-00-4222)
Fixation buffer (BD-554655)

3.3. Instruments
Eppendorf Centrifuge 5810R
BD FACS Canto Flow Cytometer (BD)

4. Experimental Methods and Procedures

4.1. Sample collection
Harvest the cell lines growing in an exponential growth phase. Count cells by haemocytometer with Trypan blue staining. Centrifuge the cells at 400×g for 5 min at 4° C., wash cells for two times with staining buffer, and suspend the cells in staining buffer to 1 $X_{10^7}$/mL.

4.2. Antibody Staining
1) Aliquoted 100 μL cell suspension to each well of a 96-well V-plate.
2) Added Isotype control or antibodies into suspension cells and incubated for 30 min at 4° C. in the dark.
3) Washed cells 2× by centrifugation at 400×g for 5 min at 4° C. and discarded supernatant.
4) Resuspended cells with 100 μL fixation buffer and incubated for 30 min at 4° C. in the dark.
5) Washed cells 2× by centrifugation at 300×g for 5 min at 4° C. and removed supernatant
6) Resuspended cells in 400 μL staining buffer.
7) Analyzed the FACS data using FlowJo V10 software.

4.3. Data Analysis
All the FACS data was analyzed by Flowjo V10 software and Graphpad Prism or Excel software.

5. Results

5.1 Gate Strategy for Panel
Gating strategy for Nectin-4 is shown in FIGS. 29-32.

5.2. Data Analysis

5.2.1. Viability of cell lines
The viability of cell lines was as below.

| No. | Cell line | Cancer Type | Viability | Viable cells/million |
|---|---|---|---|---|
| 1 | T-47D | Breast | 98.1 | 8.6 |
| 2 | MDA-MB-468 | Breast | 98.7 | 5.3 |
| 3 | NCI-H292 | Lung | 98.7 | 10.4 |
| 4 | NCI-H322 | Lung | 98.5 | 6.6 |

-continued

| No. | Cell line | Cancer Type | Viability | Viable cells/million |
|-----|-----------|-------------|-----------|----------------------|
| 5 | NCI-H526 | Lung | 79.9 | 4.0 |
| 6 | HT1080 | Fibrosarcoma | 98.0 | 14.7 |

5.2.2. The Positive Expression of Nectin-4 in Cell Lines
Positive expression and MFI of Nectin-4 in 6 cell lines were as list.

| No. | Cell line | Nectin-4 | MFI-Isotype | MFI-Panel |
|-----|-----------|----------|-------------|-----------|
| 1 | T-47D | 99.0% | 132 | 1808 |
| 2 | MDA-MB-468 | 99.0% | 184 | 2324 |

-continued

| No. | Cell line | Nectin-4 | MFI-Isotype | MFI-Panel |
|-----|-----------|----------|-------------|-----------|
| 3 | NCI-H292 | 97.9% | 180 | 729 |
| 4 | NCI-H322 | 99.1% | 145 | 1655 |
| 5 | NCI-H526 | 0.21% | 104 | 91.3 |
| 6 | HT1080 | 1.53% | 134 | 134 |

6. Discussion

There was a high expression of Nectin-4 in Breast cancer T-47D (99.0%), MDA-MB-468 (99.0%) and lung cancer NCI-H292 (97.9%), NCI-H322 (99.1%). In NCI-H526 and HT-1080, no expression of Nectin-4 was found.

Example 8: Expression Analysis of Nectin-4 in 9 CDX Cell Lines by Flow Cytometry

1. Study Objective

The objective of this project is to evaluate the surface expression of Nectin-4 (PVRL-4) in 9 cell lines, including 1 Breast cancer (MDA-MB-468), 4 Lung cancer (NCI-H292, NCI-H358, NCI-H526, A549), 1 Pancreatic cancer (Panc02.13), 2 Colorectal cancer (HCT-116, HT-29) and 1 Bladder cancer (HT1376) cell lines.

2. Panel Design

Panel for FCM in 9 Cell Lines

| Fluorochrome | Blank | Isotype | Panel |
|--------------|-------|---------|-------|
| PE | — | Isotype control IgG2b | Nectin-4 |
| BV421 | Live/Dead | Live/Dead | Live/Dead |

3. Materials

3.1 Samples
Cell Lines List

| Item | Cell Line | Cancer Type | Vendor | Culture Properties | Culture Media |
|------|-----------|-------------|--------|--------------------|---------------|
| 1 | HT1376 | Bladder | ATCC-CRL-1472 | adherent | EMEM + 10% FBS |
| 2 | MDA-MB-468 | Breast | ATCC-HTB-132 | adherent | Leibovitz's L-15 + 10% FBS |
| 3 | HCT-116 | Colorectal | ATCC-CCL-247 | adherent | RPMI 1640 + 10% FBS |
| 4 | HT-29 | Colorectal | ATCC-HTB-38 | adherent | McCoy's 5a + 10% FBS |
| 5 | A549 | Lung | ATCC-CCL-185 | adherent | F-12K + 10% FBS |
| 6 | NCI-H292 | Lung | ECACC-91091815 | suspension | RPMI 1640 + 10% FBS |
| 7 | NCI-H358 | Lung | ECACC-95111733 | adherent | RPMI 1640 + 10% FBS |
| 8 | NCI-526 | Lung | ATCC-CRL-5811 | adherent | RPMI 1640 + 10% FBS |
| 9 | Panc02.13 | Pancreas | ATCC-CRL-2554 | adherent | RPMI-1640 + 15% FBS + 5 ug/ml human insulin |

3.2. Reagents
1) DPBS (Corning, 21-031-CV)
2) Trypsin 0.25% (Invitrogen-25200072)
3) Staining buffer (eBioscience, 00-4222)
4) Fixation buffer (BD, 554655)
5) Antibody

| Fluorescence | Marker | Catalog | Vendor | Comment |
|--------------|--------|---------|--------|---------|
| PE | Nectin-4 | FAB2659P | R&D | AAAO0217021 |
| PE | Mouse IgG2b | IC0041P | R&D | |
| BV421 | Live/Dead | L34964 | Invitrogen | — |

3.3. Instruments
Eppendorf Centrifuge 5810R
BD FACS Canto Flow Cytometer (BD)

4. Experimental Methods and Procedures

4.1 Cell Culture
Cell Thawing
1) Cleaned the frozen vials with 70% alcohol and quickly thawed vials in 37° C. water bath.
2) Centrifuged cell suspension at approximately 1000 rpm for 5 minutes, removed the supernatant and added pre-warming medium into the flasks.
3) Incubated culture flasks at 37° C., 5% CO$_2$ incubator.

Cell Passage
1) Warmed medium and trypsin in 37° C. water bath.
2) Removed culture medium and rinsed the cell layer with DPBS.
3) Added 5 mL 0.25% trypsin solution to flask and diluted trypsin with 5 mL medium.

4) Centrifuged cell suspension at 1000 rpm for 5 min.
5) Added 15 mL fresh medium and re-suspended cells by pipetting gently.
6) Added appropriate cell suspension to new culture flasks.
7) Incubated culture flasks at 37° C., 5% $CO_2$ incubator.

4.2. Samples Collection

Harvested the cell lines growing in an exponential growth phase. Counted cells with Trypan blue staining. Centrifuged the cells at 400×g for 5 min at 4° C., washed cells with staining buffer for twice, and suspended the cells in staining buffer to $5 \times 10^6$/mL.

4.3. Antibody Staining

Aliquoted 100 μL cell suspension to each well of a 96-well V-plate. Added Isotype control or antibodies into suspension cells and incubated for 30 min at 4° C. in the dark. Washed cells 2 times by centrifugation at 400×g for 5 min at 4° C. and discarded supernatant. Re-suspended cells in 300 μL staining buffer. Analyzed the FACS data using Flow Jo V10 software.

4.4. Data Analysis

All the FACS data was analyzed by Flow Jo V10 software and GraphPad Prism or Excel software.

5. Results 5.1. Gate Strategy for Panel

Gating strategy for Nectin-4 is shown in FIGS. 34-37.

5.2. Data Analysis

Positive expression and MFI of Nectin-4 in 9 cell lines were as list.

| No. | Cell Line | Nectin-4 | MFI-Isotype | MFI-Panel |
|---|---|---|---|---|
| 1 | HT1376 | 92.4% | 36.2 | 803 |
| 2 | MDA-MB-468 | 97.1% | 28.9 | 460 |
| 3 | HCT-116 | 1.85% | 14.5 | 15.6 |
| 4 | HT-29 | 40.0% | 20.5 | 88.3 |
| 5 | A549 | 1.07% | 20.5 | 21.6 |
| 6 | NCI-H292 | 71.1% | 22.9 | 149 |
| 7 | NCI-H358 | 90.1% | 26.5 | 361 |
| 8 | NCI-526 | 1.22% | 8.33 | 12.1 |
| 9 | Panc02.13 | 51.9% | 36.2 | 128 |

6. Discussion

There was a high expression of Nectin-4 in Bladder cancer HT-1376 (92.4%), Breast cancer MDA-MB-468 (97.1%) and lung cancer NCI-H358 (90.1%). A medium expression of Nectin-4 was found in HT-29 (40.0%), NCI-H292 (71.1%) and Panc02.13 (51.9%). In HCT-116, A549 and NCI-526, no expression of Nectin-4 was found. This data will be used to guide model selection for efficacy studies.

Example 9: In Vivo Efficacy Studies

Example 9.1: In Vivo Efficacy Study of Test Articles in Treatment of A549 Xenograft in Balb/c Nude Mice 1. Study Objective The objective of the research is to evaluate the in vivo anti-tumor efficacy of test articles in treatment of A549 xenograft in Balb/c nude mice.

2. Experimental Design

| Group | Treatment | n | Dose (mg/kg) | Dosing Volume (μl/g) | Dosing Route | Schedule |
|---|---|---|---|---|---|---|
| 1 | Vehicle | 5 | — | 10 | iv | qw |
| 2 | BCY8242 | 3 | 3 mg/kg | 10 | iv | qw |
| 3 | BCY8242 | 3 | 3 mg/kg | 10 | iv | biw |
| 4 | BCY8242 | 3 | 5 mg/kg | 10 | iv | qw |
| 5 | BCY8245 | 3 | 3 mg/kg | 10 | iv | qw |
| 6 | BCY8245 | 3 | 3 mg/kg | 10 | iv | biw |
| 7 | BCY8245 | 3 | 5 mg/kg | 10 | iv | qw |
| 8 | BCY8253 | 3 | 3 mg/kg | 10 | iv | qw |
| 9 | BCY8253 | 3 | 3 mg/kg | 10 | iv | biw |
| 10 | BCY8253 | 3 | 5 mg/kg | 10 | iv | qw |
| 11 | BCY8255 | 3 | 3 mg/kg | 10 | iv | qw |
| 12 | BCY8255 | 3 | 3 mg/kg | 10 | iv | biw |
| 13 | BCY8255 | 3 | 5 mg/kg | 10 | iv | qw |

3. Materials

Animals and Housing Condition 3.1.1. Animals
Species: Mus Musculus
Strain: Balb/c nude
Age: 6-8 weeks
Sex: female
Body weight: 18-22 g
Number of animals: 41 mice plus spare 3.1.2. Housing condition
The mice were kept in individual ventilation cages at constant temperature and humidity with 3 or 5 animals in each cage.
Temperature: 20~26° C.
Humidity 40-70%.
Cages: Made of polycarbonate. The size is 300 mm×180 mm×150 mm. The bedding material is corn cob, which is changed twice per week.
Diet: Animals had free access to irradiation sterilized dry granule food during the entire study period.
Water: Animals had free access to sterile drinking water.
Cage identification: The identification labels for each cage contained the following information: number of animals, sex, strain, the date received, treatment, study number, group number and the starting date of the treatment.
Animal identification: Animals were marked by ear coding.

4. Experimental Methods and Procedures 4.1. Cell Culture

The A549 tumor cells were maintained in vitro as a monolayer culture in F-12K medium supplemented with 10% heat inactivated fetal bovine serum at 37° C. in an atmosphere of 5% $CO_2$ in air. The tumor cells were routinely subcultured twice weekly by trypsin-EDTA treatment. The cells growing in an exponential growth phase were harvested and counted for tumor inoculation.

4.2. Tumor Inoculation

Each mouse was inoculated subcutaneously at the right flank with A549 tumor cells ($5 \times 10^6$) in 0.2 ml of PBS for tumor development. 41 animals were randomized when the average tumor volume reached 158 $mm^3$. The test article administration and the animal numbers in each group were shown in the experimental design table.

4.3. Testing Article Formulation Preparation

| Test article | Con. (mg/ml) | Formulation |
|---|---|---|
| Vehicle | — | 25 mM Histidine pH 7 10% sucrose |
| BCY8242 | 0.5 | Dilute 510 μl 20 mg/ml BCY8242 stock with 19.886 ml Histidine buffer |
| BCY8242 | 0.3 | Dilute 480 μl 0.5 mg/ml BCY8242 stock with 320 μl Histidine buffer |
| BCY8245 | 0.5 | Dilute 400 μl 1 mg/ml BCY8245 stock with 400 μl Histidine buffer |
| BCY8245 | 0.3 | Dilute 240 μl 1 mg/ml BCY8245 stock with 560 μl Histidine buffer |
| BCY8253 | 0.5 | Dilute 400 μl 1 mg/ml BCY8253 stock with 400 μl Histidine buffer |
| BCY8253 | 0.3 | Dilute 240 μl 1 mg/ml BCY8253 stock with 560 μl Histidine buffer |
| BCY8255 | 0.5 | Dilute 400 μl 1 mg/ml BCY8255 stock with 400 μl Acetate buffer |
| BCY8255 | 0.3 | Dilute 240 μl 1 mg/ml BCY8255 stock with 560 μl Acetate buffer |

1. Histidine buffer: 25 mM Histidine pH 7 10% sucrose
2. Acetate buffer: 50 mM Acetate/acetic acid pH 5 10% sucrose

4.4. Sample Collection

At the end of study, the tumor of all groups except group 2, 3, 4 were collected at 2 h post last dosing. The tumor of group 2, 3, 4 were collected without any dosing.

5. Results

5.1. Tumor Growth Curves

Tumor growth curves are shown in FIGS. 38-41.

5.2. Tumor Volume Trace

Mean tumor volume over time in female Balb/c nude mice bearing A549 xenograft is shown in Table 27.

TABLE 27

Tumor volume trace over time

| Gr. | Treatment | Days after the start of treatment | | | | | | |
|---|---|---|---|---|---|---|---|---|
| | | 0 | 2 | 5 | 7 | 9 | 12 | 14 |
| 1 | Vehicle, qw | 158 ± 13 | 235 ± 24 | 278 ± 26 | 346 ± 39 | 387 ± 35 | 471 ± 45 | 568 ± 49 |
| 2 | BCY8242, 3 mpk, qw | 157 ± 13 | 215 ± 19 | 221 ± 12 | 257 ± 28 | 282 ± 32 | 329 ± 6 | 356 ± 26 |
| 3 | BCY8242, 3 mpk, biw | 158 ± 10 | 224 ± 29 | 189 ± 38 | 205 ± 44 | 232 ± 55 | 239 ± 41 | 261 ± 41 |
| 4 | BCY8242, 5 mpk, qw | 157 ± 16 | 189 ± 23 | 169 ± 17 | 182 ± 30 | 191 ± 39 | 162 ± 33 | 191 ± 29 |
| 5 | BCY8245, 3 mpk, qw | 157 ± 10 | 208 ± 15 | 197 ± 25 | 257 ± 40 | 293 ± 41 | 341 ± 54 | 356 ± 53 |
| 6 | BCY8245, 3 mpk, biw | 157 ± 14 | 183 ± 27 | 158 ± 16 | 184 ± 6 | 182 ± 8 | 190 ± 15 | 194 ± 27 |
| 7 | BCY8245, 5 mpk, qw | 157 ± 14 | 179 ± 22 | 147 ± 10 | 172 ± 23 | 173 ± 24 | 204 ± 36 | 228 ± 33 |
| 8 | BCY8253, 3 mpk, qw | 158 ± 10 | 197 ± 9 | 177 ± 4 | 225 ± 4 | 246 ± 5 | 268 ± 11 | 323 ± 30 |
| 9 | BCY8253, 3 mpk, biw | 158 ± 12 | 207 ± 9 | 168 ± 9 | 210 ± 15 | 219 ± 17 | 234 ± 10 | 247 ± 11 |
| 10 | BCY8253, 5 mpk, qw | 158 ± 7 | 203 ± 18 | 149 ± 7 | 199 ± 20 | 187 ± 15 | 178 ± 15 | 203 ± 6 |
| 11 | BCY8255, 3 mpk, qw | 158 ± 9 | 199 ± 15 | 181 ± 10 | 243 ± 1 | 261 ± 8 | 293 ± 4 | 337 ± 15 |
| 12 | BCY8255, 3 mpk, biw | 158 ± 14 | 180 ± 17 | 155 ± 19 | 193 ± 36 | 179 ± 28 | 199 ± 27 | 227 ± 34 |
| 13 | BCY8255, 5 mpk, qw | 158 ± 14 | 177 ± 16 | 153 ± 19 | 206 ± 25 | 201 ± 42 | 183 ± 44 | 205 ± 32 |

5.3. Tumor Growth Inhibition Analysis

Tumor growth inhibition rate for test articles in the A549 xenograft model was calculated based on tumor volume measurements at day 14 after the start of treatment.

TABLE 28

Tumor growth inhibition analysis

| Gr | Treatment | Tumor Volume (mm³)[a] | T/C[b] (%) | TGI (%) | P value compared with vehicle |
|---|---|---|---|---|---|
| 1 | Vehicle, qw | 568 ± 49 | — | — | — |
| 2 | BCY8242, 3 mpk, qw | 356 ± 26 | 62.7 | 51.6 | p < 0.05 |

TABLE 28-continued

Tumor growth inhibition analysis

| Gr | Treatment | Tumor Volume (mm³)[a] | T/C[b] (%) | TGI (%) | P value compared with vehicle |
|---|---|---|---|---|---|
| 3 | BCY8242, 3 mpk, biw | 261 ± 41 | 46.0 | 74.9 | p < 0.01 |
| 4 | BCY8242, 5 mpk, qw | 191 ± 29 | 33.6 | 91.7 | p < 0.001 |
| 5 | BCY8245, 3 mpk, qw | 356 ± 53 | 62.8 | 51.4 | p < 0.05 |
| 6 | BCY8245, 3 mpk, biw | 194 ± 27 | 34.2 | 90.8 | p < 0.001 |
| 7 | BCY8245, 5 mpk, qw | 228 ± 33 | 40.2 | 82.6 | p < 0.001 |
| 8 | BCY8253, 3 mpk, qw | 323 ± 30 | 56.8 | 59.8 | p < 0.01 |
| 9 | BCY8253, 3 mpk, biw | 247 ± 11 | 43.4 | 78.3 | p < 0.001 |
| 10 | BCY8253, 5 mpk, qw | 203 ± 6 | 35.7 | 89.2 | p < 0.001 |
| 11 | BCY8255, 3 mpk, qw | 337 ± 15 | 59.4 | 56.4 | p < 0.01 |
| 12 | BCY8255, 3 mpk, biw | 227 ± 34 | 39.9 | 83.4 | p < 0.001 |
| 13 | BCY8255, 5 mpk, qw | 205 ± 32 | 36.1 | 88.5 | p < 0.001 |

[a]Mean ± SEM.
[b]Tumor Growth Inhibition is calculated by dividing the group average tumor volume for the treated group by the group average tumor volume for the control group (T/C).

6. Results Summary and Discussion

In this study, the therapeutic efficacy of test articles in the A549 xenograft model was evaluated. The measured tumor volumes of all treatment groups at various time points are shown in FIGS. 38-41 and Tables 27 and 28.

The mean tumor size of vehicle treated mice reached 568 mm³ on day 14. BCY8242 at 3 mg/kg, qw (TV=356 mm³, TGI=51.6%, p<0.05), BCY8242 at 3 mg/kg biw (TV=261 mm³, TGI=74.9%, p<0.01) and 5 mg/kg, qw (TV=191 mm³, TGI=91.7%, p<0.001) produced significant anti-tumor anti-tumor activity in dose or dose-frequency dependent manner.

BCY8245 at 3 mg/kg, qw (TV=356 mm³, TGI=51.4%, p<0.05), 3 mg/kg, biw (TV=194 mm³, TGI=90.8%, p<0.01) and 5 mg/kg, qw (TV=228 mm³, TGI=82.6%, p<0.001) produced significant anti-tumor antitumor activity in dose or dose-frequency dependent manner.

BCY8253 at 3 mg/kg, qw (TV=323 mm³, TGI=59.8%, p<0.01), 3 mg/kg, biw (TV=247 mm³, TGI=78.3%, p<0.001) and 5 mg/kg, qw (TV=203 mm³, TGI=89.2%, p<0.001) produced significant anti-tumor antitumor activity in dose or dose-frequency dependent manner.

BCY8255 at 3 mg/kg, qw (TV=337 mm³, TGI=56.4%, p<0.01), 3 mg/kg, biw (TV=227 mm³, TGI=83.4%, p<0.001) and 5 mg/kg, qw (TV=205 mm³, TGI=88.5%, p<0.001) produced significant anti-tumor antitumor activity in dose or dose-frequency dependent manner.

In this study, animals in BCY8242 at 3 mg/kg biw and 5 mg/kg qw, BCY8253 and BCY8255 at 5 mg/kg qw lost over average 10% bodyweight during the treatment schedule, animals in BCY8245 groups maintained the bodyweight well. In this cell line, which shows minimal expression of Nectin-4 in FACS studies, tumor growth is restrained by BCY8245 but the tumor does not undergo regression, emphasising the target driven requirement for optimal efficacy.

Example 9.2: In Vivo Efficacy Study of Test Articles in Treatment of HCT116 Xenograft in Balb/c Nude Mice

1. Study Objective

The objective of the research is to evaluate the in vivo anti-tumor efficacy of test articles in treatment of HCT116 xenograft in Balb/c nude mice.

2. Experimental Design

| Group | Treatment | n | Dose (mg/kg) | Dosing Volume (μl/g) | Dosing Route | Schedule |
|---|---|---|---|---|---|---|
| 1 | Vehicle | 5 | — | 10 | iv | qw |
| 2 | BCY8242 | 3 | 3 | 10 | iv | qw |
| 3 | BCY8242 | 3 | 3 | 10 | iv | biw |
| 4 | BCY8242 | 3 | 5 | 10 | iv | qw |
| 5 | BCY8245 | 3 | 3 | 10 | iv | qw |
| 6 | BCY8245 | 3 | 3 | 10 | iv | biw |
| 7 | BCY8245 | 3 | 5 | 10 | iv | qw |
| 8 | BCY8253 | 3 | 3 | 10 | iv | qw |
| 9 | BCY8253 | 3 | 3 | 10 | iv | biw |
| 10 | BCY8253 | 3 | 5 | 10 | iv | qw |
| 11 | BCY8255 | 3 | 3 | 10 | iv | qw |
| 12 | BCY8255 | 3 | 3 | 10 | iv | biw |
| 13 | BCY8255 | 3 | 5 | 10 | iv | qw |

3. Materials 3.1. Animals and Housing Condition
3.1.1. Animals
  Species: Mus Musculus
  Strain: Balb/c nude
  Age: 6-8 weeks
  Sex: female
  Body weight: 18-22 g
  Number of animals: 41 mice plus spare
3.1.2. Housing condition
  The mice were kept in individual ventilation cages at constant temperature and humidity with 3 or 5 animals in each cage.
  Temperature: 20~26° C.
  Humidity 40-70%.
  Cages: Made of polycarbonate. The size is 300 mm×180 mm×150 mm. The bedding material is corn cob, which is changed twice per week.
  Diet: Animals had free access to irradiation sterilized dry granule food during the entire study period.
  Water: Animals had free access to sterile drinking water.
  Cage identification: The identification labels for each cage contained the following information: number of animals, sex, strain, the date received, treatment, study number, group number and the starting date of the treatment.
  Animal identification: Animals were marked by ear coding.

4. Experimental Methods and Procedures 4.1 Cell Culture
  The HCT116 cells were maintained in medium supplemented with 10% heat inactivated fetal bovine serum at 37° C. in an atmosphere of 5% $CO_2$ in air. The tumor cells were routinely subcultured twice weekly. The cells growing in an exponential growth phase were harvested and counted for tumor inoculation.

4.2. Tumor Inoculation

Each mouse was inoculated subcutaneously at the right flank with HCT116 tumor cells ($5.0 \times 10^6$) in 0.2 ml of PBS for tumor development. 41 animals were randomized when the average tumor volume reached 166 mm³. The test article administration and the animal numbers in each group were shown in the experimental design table.

4.3. Testing Article Formulation Preparation

| Test article | Con. (mg/ml) | Formulation |
|---|---|---|
| Vehicle | — | 25 mM Histidine pH 7 10% sucrose |
| BCY8242 | 0.5 | Dilute 510 μl 20 mg/ml BCY8242 stock with 19.886 ml Histidine buffer |
| BCY8242 | 0.3 | Dilute 480 μl 0.5 mg/ml BCY8242 stock with 320 μl Histidine buffer |
| BCY8245 | 0.5 | Dilute 400 μl 1 mg/ml BCY8245 stock with 400 μl Histidine buffer |
| BCY8245 | 0.3 | Dilute 240 μl 1 mg/ml BCY8245 stock with 560 μl Histidine buffer |
| BCY8253 | 0.5 | Dilute 400 μl 1 mg/ml BCY8253 stock with 400 μl Histidine buffer |
| BCY8253 | 0.3 | Dilute 240 μl 1 mg/ml BCY8253 stock with 560 μl Histidine buffer |
| BCY8255 | 0.5 | Dilute 400 μl 1 mg/ml BCY8255 stock with 400 μl Acetate buffer |
| BCY8255 | 0.3 | Dilute 240 μl 1 mg/ml BCY8255 stock with 560 μl Acetate buffer |

3. Histidine buffer: 25 mM Histidine pH 7 10% sucrose
4. Acetate buffer: 50 mM Acetate/acetic acid pH 5 10% sucrose

4.4. Sample Collection

At the end of study on day 14, tumors from group 1, 2, 5, 8 and 11 were collected for FFPE. For group 4, 7, 10 and 13, plasma were collected at 5 min, 15 min, 30 min, 60 min and 120 min post dosing. Tumors were also collected and stored at −80° C.

5. Results

5.1. Tumor Growth Curves

Tumor growth curves are shown in FIGS. 42-45.

5.2. Tumor Volume Trace

Mean tumor volume over time in female Balb/c nude mice bearing HCT116 xenograft is shown in Table 29.

5.3. Tumor Growth Inhibition Analysis

Tumor growth inhibition rate for test articles in the HCT116 xenograft model was calculated based on tumor volume measurements at day 14 after the start of the treatment.

TABLE 30

Tumor growth inhibition analysis

| Group | Treatment | Tumor Volume (mm³)$^a$ | T/C$^b$ (%) | TGI (%) | P value |
|---|---|---|---|---|---|
| 1 | Vehicle, qw | 769 ± 71 | — | — | — |
| 2 | BCY8242, 3 mpk, qw | 492 ± 19 | 64.0 | 45.9 | p < 0.001 |

TABLE 29

Tumor volume trace over time

| | | Days after the start of treatment | | | | | | |
|---|---|---|---|---|---|---|---|---|
| Group | Treatment | 0 | 2 | 4 | 7 | 9 | 12 | 14 |
| 1 | Vehicle, qw | 166 ± 12 | 219 ± 21 | 323 ± 29 | 397 ± 28 | 488 ± 36 | 630 ± 49 | 769 ± 71 |
| 2 | BCY8242, 3 mpk, qw | 166 ± 3 | 201 ± 16 | 219 ± 29 | 280 ± 14 | 319 ± 17 | 375 ± 23 | 492 ± 19 |
| 3 | BCY8242, 3 mpk, biw | 166 ± 16 | 212 ± 17 | 213 ± 17 | 208 ± 30 | 202 ± 33 | 195 ± 25 | 201 ± 28 |
| 4 | BCY8242, 5 mpk, qw | 167 ± 24 | 203 ± 16 | 168 ± 10 | 186 ± 9 | 211 ± 5 | 201 ± 8 | 206 ± 7 |
| 5 | BCY8245, 3 mpk, qw | 167 ± 11 | 209 ± 13 | 227 ± 17 | 269 ± 33 | 324 ± 39 | 348 ± 27 | 425 ± 28 |
| 6 | BCY8245, 3 mpk, biw | 166 ± 18 | 229 ± 40 | 215 ± 42 | 213 ± 49 | 213 ± 48 | 206 ± 55 | 197 ± 50 |
| 7 | BCY8245, 5 mpk, qw | 166 ± 35 | 201 ± 42 | 176 ± 15 | 183 ± 17 | 170 ± 16 | 125 ± 18 | 134 ± 12 |
| 8 | BCY8253, 3 mpk, qw | 166 ± 10 | 210 ± 11 | 254 ± 31 | 288 ± 8 | 305 ± 3 | 316 ± 13 | 354 ± 6 |
| 9 | BCY8253, 3 mpk, biw | 167 ± 15 | 200 ± 3 | 175 ± 11 | 186 ± 8 | 195 ± 8 | 197 ± 17 | 199 ± 9 |
| 10 | BCY8253, 5 mpk, qw | 166 ± 37 | 179 ± 37 | 143 ± 31 | 150 ± 41 | 115 ± 28 | 90 ± 30 | 92 ± 29 |
| 11 | BCY8255, 3 mpk, qw | 166 ± 18 | 221 ± 12 | 209 ± 14 | 294 ± 26 | 354 ± 37 | 437 ± 51 | 498 ± 52 |
| 12 | BCY8255, 3 mpk, biw | 167 ± 32 | 220 ± 52 | 182 ± 42 | 191 ± 44 | 217 ± 46 | 221 ± 53 | 178 ± 40 |
| 13 | BCY8255, 5 mpk, qw | 166 ± 35 | 183 ± 51 | 128 ± 27 | 141 ± 27 | 142 ± 24 | 132 ± 10 | 137 ± 5 |

TABLE 30-continued

Tumor growth inhibition analysis

| Group | Treatment | Tumor Volume (mm³)[a] | T/C[b] (%) | TGI (%) | P value |
|---|---|---|---|---|---|
| 3 | BCY8242, 3 mpk, biw | 201 ± 28 | 26.2 | 94.1 | p < 0.001 |
| 4 | BCY8242, 5 mpk, qw | 206 ± 7 | 26.7 | 93.5 | p < 0.001 |
| 5 | BCY8245, 3 mpk, qw | 425 ± 28 | 55.2 | 57.1 | p < 0.001 |
| 6 | BCY8245, 3 mpk, biw | 197 ± 50 | 25.6 | 94.9 | p < 0.001 |
| 7 | BCY8245, 5 mpk, qw | 134 ± 12 | 17.4 | 105.2 | p < 0.001 |
| 8 | BCY8253, 3 mpk, qw | 354 ± 6 | 46.0 | 68.8 | p < 0.001 |
| 9 | BCY8253, 3 mpk, biw | 199 ± 9 | 25.9 | 94.7 | p < 0.001 |
| 10 | BCY8253, 5 mpk, qw | 92 ± 29 | 12.0 | 112.2 | p < 0.001 |
| 11 | BCY8255, 3 mpk, qw | 498 ± 52 | 64.7 | 44.9 | p < 0.001 |
| 12 | BCY8255, 3 mpk, biw | 178 ± 40 | 23.1 | 98.3 | p < 0.001 |
| 13 | BCY8255, 5 mpk, qw | 137 ± 5 | 17.8 | 104.9 | p < 0.001 |

[a]Mean ± SEM;
[b]Tumor Growth Inhibition is calculated by dividing the group average tumor volume for the treated group by the group average tumor volume for the control group (T/C).

6. Results Summary and Discussion

In this study, the therapeutic efficacy of test articles in the HCT116 xenograft model was evaluated. The measured tumor volumes of all treatment groups at various time points are shown in FIGS. 42-45 and Tables 29 and 30.

The mean tumor size of vehicle treated mice reached 769 mm³ on day 14 after the start of treatment. BCY8242 at 3 mg/kg, qw (TV=492 mm³, TGI=45.9%, p<0.001), 3 mg/kg, biw (TV=201 mm³, TGI=94.1%, p<0.001) and 5 mg/kg, qw (TV=206 mm³, TGI=93.5%, p<0.001) produced significant anti-tumor antitumor activity in dose or dose-frequency dependent manner.

BCY8245 at 3 mg/kg, qw (TV=425 mm³, TGI=57.1%, p<0.001), 3 mg/kg, biw (TV=197 mm³, TGI=94.9%, p<0.001) and 5 mg/kg, qw (TV=134 mm³, TGI=105.2%, p<0.001) produced significant anti-tumor antitumor activity in dose or dose-frequency dependent manner.

BCY8253 at 3 mg/kg, qw (TV=354 mm³, TGI=68.8%, p<0.001), 3 mg/kg, biw (TV=199 mm³, TGI=94.7%, p<0.001) and 5 mg/kg, qw (TV=92 mm³, TGI=112.2%, p<0.001) produced significant anti-tumor antitumor activity in dose or dose-frequency dependent manner.

BCY8255 at 3 mg/kg, qw (TV=498 mm³, TGI=44.9%, p<0.001), 3 mg/kg, biw (TV=178 mm³, TGI=98.3%, p<0.001) and 5 mg/kg, qw (TV=137 mm³, TGI=104.9%, p<0.001) produced significant anti-tumor antitumor activity in dose or dose-frequency dependent manner.

In this study, animals in all of 5 mg/kg qw groups lost over average 10% bodyweight, especially those in BCY8253 and BCY8255 5 mg/kg groups, which lost over 20% bodyweight; BCY8253 and BCY8255 3 mg/kg biw also caused 15% bodyweight during the treatment schedule.

In this cell line, which shows minimal expression of Nectin-4 in FACS studies, tumor growth is restrained by BCY8245 but the tumor does not undergo regression, emphasising the target driven requirement for optimal efficacy.

Example 9.3: In Vivo Efficacy Study of Test Articles in Treatment of HT-1376 Xenograft in CB17-SCID Mice

1. Study Objective

The objective of the research is to evaluate the in vivo anti-tumor efficacy of test articles in treatment of HT-1376 xenograft in CB17-SCID mice.

2. Experimental Design

| Group | Treatment | n | Dose (mg/kg) | Dosing Volume (μl/g) | Dosing Route | Schedule |
|---|---|---|---|---|---|---|
| 1 | Vehicle | 5 | — | 10 | iv | qw |
| 2 | BCY8242 | 3 | 3 mg/kg | 10 | iv | qw |
| 3 | BCY8242 | 3 | 3 mg/kg | 10 | iv | biw |
| 4 | BCY8242 | 3 | 5 mg/kg | 10 | iv | qw |
| 5 | BCY8245 | 3 | 3 mg/kg | 10 | iv | qw |
| 6 | BCY8245 | 3 | 3 mg/kg | 10 | iv | biw |
| 7 | BCY8245 | 3 | 5 mg/kg | 10 | iv | qw |
| 8 | BCY8253 | 3 | 3 mg/kg | 10 | iv | qw |
| 9 | BCY8253 | 3 | 3 mg/kg | 10 | iv | biw |
| 10 | BCY8253 | 3 | 5 mg/kg | 10 | iv | qw |
| 11 | BCY8255 | 3 | 3 mg/kg | 10 | iv | qw |
| 12 | BCY8255 | 3 | 3 mg/kg | 10 | iv | biw |
| 13 | BCY8255 | 3 | 5 mg/kg | 10 | iv | qw |

3. Materials 3.1 Animals and Housing Condition
3.1.1. Animals
  Species: Mus Musculus
  Strain: CB17-SCID
  Age: 6-8 weeks
  Sex: female
  Body weight: 18-22 g
  Number of animals: 41 mice plus spare
3.1.2. Housing condition
  The mice were kept in individual ventilation cages at constant temperature and humidity with 3 or 5 animals in each cage.
  Temperature: 20~26° C.
  Humidity 40-70%.
  Cages: Made of polycarbonate. The size is 300 mm×180 mm×150 mm. The bedding material is corn cob, which is changed twice per week.
  Diet: Animals had free access to irradiation sterilized dry granule food during the entire study period.
  Water: Animals had free access to sterile drinking water.
  Cage identification: The identification labels for each cage contained the following information: number of animals, sex, strain, the date received, treatment, study number, group number and the starting date of the treatment.
  Animal identification: Animals were marked by ear coding.

4. Experimental Methods and Procedures 4.1 Cell Culture
  The HT-1376 tumor cells will be maintained in EMEM medium supplemented with 10% heat inactivated fetal bovine serum at 37° C. in an atmosphere of 5% $CO_2$ in air. The tumor cells will be routinely subcultured twice weekly.

The cells growing in an exponential growth phase will be harvested and counted for tumor inoculation.

4.2 Tumor Inoculation

Each mouse was inoculated subcutaneously at the right flank with HT-1376 tumor cells ($5 \times 10^6$) with Matrigel (1:1) in 0.2 ml of PBS for tumor development. 41 animals were randomized when the average tumor volume reached 153 mm$^3$. The test article administration and the animal numbers in each group were shown in the experimental design table.

4.3. Testing Article Formulation Preparation

| Test article | Con. (mg/ml) | Formulation |
|---|---|---|
| Vehicle | — | 25 mM Histidine pH 7 10% sucrose |
| BCY8242 | 0.5 | Dilute 510 μl 20 mg/ml BCY8242 stock with 19.886 ml Histidine buffer |
| BCY8242 | 0.3 | Dilute 480 μl 0.5 mg/ml BCY8242 stock with 320 μl Histidine buffer |
| BCY8245 | 0.5 | Dilute 400 μl 1 mg/ml BCY8245 stock with 400 μl Histidine buffer |
| BCY8245 | 0.3 | Dilute 240 μl 1 mg/ml BCY8245 stock with 560 μl Histidine buffer |
| BCY8253 | 0.5 | Dilute 400 μl 1 mg/ml BCY8253 stock with 400 μl Histidine buffer |
| BCY8253 | 0.3 | Dilute 240 μl 1 mg/ml BCY8253 stock with 560 μl Histidine buffer |
| BCY8255 | 0.5 | Dilute 400 μl 1 mg/ml BCY8255 stock with 400 μl Acetate buffer |
| BCY8255 | 0.3 | Dilute 240 μl 1 mg/ml BCY8255 stock with 560 μl Acetate buffer |

5. Histidine buffer: 25 mM Histidine pH 7 10% sucrose
6. Acetate buffer: 50 mM Acetate/acetic acid pH 5 10% sucrose 4.4. Sample Collection At the end of study, the plasma of group 7, 10 and group 13 were collected at 5 min, 15 min, 30 min, 60 min and 120 min post last dosing. The tumor of groups 7, 10 and group 13 were collected at 2 h post last dosing. The tumor of group 1, 5, 6, 8, 9, 11 and 12 were collected at 2 h post last dosing. The tumor of group 2, 3 and group 4 were collected without any dosing.

5. Results 5.1. Tumor Growth Curves

Tumor growth curves are shown in FIGS. 46-49, 5.2. Tumor Volume Trace

Mean tumor volume over time in female CB17-SCID mice bearing HT-1376 xenograft is shown in Table 31.

TABLE 31

Tumor volume trace over time

| Gr. | Treatment | Days after the start of treatment | | | | | | |
|---|---|---|---|---|---|---|---|---|
| | | 0 | 2 | 5 | 7 | 9 | 12 | 14 |
| 1 | Vehicle, qw | 153 ± 16 | 266 ± 30 | 398 ± 41 | 529 ± 56 | 721 ± 76 | 908 ± 91 | 1069 ± 90 |
| 2 | BCY8242, 3 mpk, qw | 153 ± 17 | 231 ± 1 | 271 ± 21 | 376 ± 31 | 473 ± 70 | 530 ± 81 | 570 ± 92 |
| 3 | BCY8242, 3 mpk, biw | 153 ± 15 | 220 ± 8 | 245 ± 37 | 354 ± 35 | 378 ± 38 | 391 ± 52 | 428 ± 66 |
| 4 | BCY8242, 5 mpk, qw | 152 ± 13 | 202 ± 14 | 249 ± 22 | 361 ± 54 | 372 ± 37 | 389 ± 40 | 459 ± 34 |
| 5 | BCY8245, 3 mpk, qw | 153 ± 26 | 254 ± 53 | 298 ± 69 | 398 ± 61 | 468 ± 73 | 502 ± 67 | 603 ± 76 |
| 6 | BCY8245, 3 mpk, biw | 154 ± 30 | 248 ± 58 | 203 ± 15 | 273 ± 45 | 356 ± 50 | 391 ± 53 | 407 ± 53 |
| 7 | BCY8245, 5 mpk, qw | 153 ± 15 | 237 ± 41 | 228 ± 36 | 317 ± 31 | 394 ± 20 | 438 ± 31 | 465 ± 33 |
| 8 | BCY8253, 3 mpk, qw | 153 ± 12 | 209 ± 9 | 269 ± 8 | 343 ± 29 | 447 ± 33 | 466 ± 25 | 533 ± 29 |
| 9 | BCY8253, 3 mpk, biw | 153 ± 13 | 214 ± 33 | 246 ± 18 | 286 ± 23 | 364 ± 41 | 400 ± 33 | 442 ± 45 |
| 10 | BCY8253, 5 mpk, qw | 153 ± 15 | 217 ± 49 | 231 ± 49 | 308 ± 36 | 360 ± 44 | 401 ± 70 | 442 ± 62 |
| 11 | BCY8255, 3 mpk, qw | 153 ± 22 | 233 ± 3 | 284 ± 6 | 358 ± 27 | 476 ± 40 | 486 ± 65 | 538 ± 59 |
| 12 | BCY8255, 3 mpk, biw | 153 ± 21 | 233 ± 33 | 218 ± 23 | 298 ± 45 | 336 ± 42 | 365 ± 31 | 390 ± 40 |
| 13 | BCY8255, 5 mpk, qw | 152 ± 17 | 233 ± 30 | 290 ± 4 | 338 ± 10 | 406 ± 26 | 459 ± 68 | 516 ± 64 |

5.3. Tumor Growth Inhibition Analysis

Tumor growth inhibition rate for Test articles in the HT-1376 xenograft model was calculated based on tumor volume measurements at day 14 after the start of treatment.

TABLE 32

Tumor growth inhibition analysis

| Gr | Treatment | Tumor Volume (mm$^3$)$^a$ | T/C$^b$ (%) | TGI (%) | P value compared with vehicle |
|---|---|---|---|---|---|
| 1 | Vehicle, qw | 1069 ± 90 | — | — | — |
| 2 | BCY8242, 3 mpk, qw | 570 ± 92 | 53.3 | 54.5 | p < 0.01 |
| 3 | BCY8242, 3 mpk, biw | 428 ± 66 | 40.1 | 70.0 | p < 0.001 |
| 4 | BCY8242, 5 mpk, qw | 459 ± 34 | 43.0 | 66.4 | p < 0.001 |

TABLE 32-continued

Tumor growth inhibition analysis

| Gr | Treatment | Tumor Volume (mm³)[a] | T/C[b] (%) | TGI (%) | P value compared with vehicle |
|---|---|---|---|---|---|
| 5 | BCY8245, 3 mpk, qw | 603 ± 76 | 56.4 | 50.9 | p < 0.01 |
| 6 | BCY8245, 3 mpk, biw | 407 ± 53 | 38.1 | 72.3 | p < 0.001 |
| 7 | BCY8245, 5 mpk, qw | 465 ± 33 | 43.5 | 66.0 | p < 0.001 |
| 8 | BCY8253, 3 mpk, qw | 533 ± 29 | 49.8 | 58.5 | p < 0.01 |
| 9 | BCY8253, 3 mpk, biw | 442 ± 45 | 41.3 | 68.4 | p < 0.001 |
| 10 | BCY8253, 5 mpk, qw | 442 ± 62 | 41.4 | 68.5 | p < 0.001 |
| 11 | BCY8255, 3 mpk, qw | 538 ± 59 | 50.3 | 58.0 | p < 0.01 |
| 12 | BCY8255, 3 mpk, biw | 390 ± 40 | 36.5 | 74.1 | p < 0.001 |
| 13 | BCY8255, 5 mpk, qw | 516 ± 64 | 48.3 | 60.3 | p < 0.01 |

[a]Mean ± SEM.
[b]Tumor Growth Inhibition is calculated by dividing the group average tumor volume for the treated group by the group average tumor volume for the control group (T/C).

6. Results Summary and Discussion

In this study, the therapeutic efficacy of test articles in the HT-1376 xenograft model was evaluated. The measured tumor volumes of all treatment groups at various time points are shown in FIGS. 46-49 and Tables 31 and 32.

The mean tumor size of vehicle treated mice reached 1069 mm³ on day 14. BCY8242 at 3 mg/kg, qw (TV=570 mm³, TGI=54.5%, p<0.01), 3 mg/kg, biw (TV=428 mm³, TGI=70.0%, p<0.001) and 5 mg/kg, qw (TV=459 mm³, TGI=66.4%, p<0.001) produced significant antitumor activity.

BCY8245 at 3 mg/kg, qw (TV=603 mm³, TGI=50.9%, p<0.01), 3 mg/kg, biw (TV=407 mm³, TGI=72.3%, p<0.001) and 5 mg/kg, qw (TV=465 mm³, TGI=66.0%, p<0.001) produced significant antitumor activity.

BCY8253 at 3 mg/kg, qw (TV=533 mm³, TGI=58.5%, p<0.01), 3 mg/kg, biw (TV=442 mm³, TGI=68.4%, p<0.001) and 5 mg/kg, qw (TV=442 mm³, TGI=68.5%, p<0.001) produced significant antitumor activity.

BCY8255 at 3 mg/kg, qw (TV=538 mm³, TGI=58.0%, p<0.01), 3 mg/kg, biw (TV=390 mm³, TGI=74.1%, p<0.001) and 5 mg/kg, qw (TV=516 mm³, TGI=60.3%, p<0.01) produced significant antitumor activity.

In this study, BCY8242 at 3 mg/kg biw and 5 mg/kg qw caused over 10% and 20% animal bodyweight loss respectively, BCY8245 and BCY8253 at 5 mg/kg qw caused over 10% animal bodyweight loss during the treatment schedule.

Example 9.4: In Vivo Efficacy Study of Test Articles in Treatment of MDA-MB-468 Xenograft in Balb/c Nude Mice

1. Study Objective

The objective of the research is to evaluate the in vivo anti-tumor efficacy of test articles in treatment of MDA-MB-468 xenograft in Balb/c nude mice.

2. Experimental Design

| Group | Treatment | n | Dose (mg/kg) | Dosing Volume (µl/g) | Dosing Route | Schedule |
|---|---|---|---|---|---|---|
| 1 | Vehicle | 5 | — | 10 | iv | qw |
| 2 | BCY8242 | 3 | 3 mg/kg | 10 | iv | qw |
| 3 | BCY8242 | 3 | 3 mg/kg | 10 | iv | biw |
| 4 | BCY8242 | 3 | 5 mg/kg | 10 | iv | qw |
| 5 | BCY8245 | 3 | 3 mg/kg | 10 | iv | qw |
| 6 | BCY8245 | 3 | 3 mg/kg | 10 | iv | biw |
| 7 | BCY8245 | 3 | 5 mg/kg | 10 | iv | qw |
| 8 | BCY8253 | 3 | 3 mg/kg | 10 | iv | qw |
| 9 | BCY8253 | 3 | 3 mg/kg | 10 | iv | biw |
| 10 | BCY8253 | 3 | 5 mg/kg | 10 | iv | qw |
| 11 | BCY8255 | 3 | 3 mg/kg | 10 | iv | qw |
| 12 | BCY8255 | 3 | 3 mg/kg | 10 | iv | biw |
| 13 | BCY8255 | 3 | 5 mg/kg | 10 | iv | qw |

3. Materials 3.1. Animals and Housing Condition
3.1.1. Animals
  Species: Mus Musculus
  Strain: Balb/c nude
  Age: 6-8 weeks
  Sex: female
  Body weight: 18-22 g
  Number of animals: 41 mice plus spare
3.1.2. Housing condition
The mice were kept in individual ventilation cages at constant temperature and humidity with 3 or 5 animals in each cage.
  Temperature: 20~26° C.
  Humidity 40-70%.
  Cages: Made of polycarbonate. The size is 300 mm×180 mm×150 mm. The bedding material is corn cob, which is changed twice per week.
  Diet: Animals had free access to irradiation sterilized dry granule food during the entire study period.
  Water: Animals had free access to sterile drinking water.
  Cage identification: The identification labels for each cage contained the following information: number of animals, sex, strain, the date received, treatment, study number, group number and the starting date of the treatment.
  Animal identification: Animals were marked by ear coding.

4. Experimental Methods and Procedures 4.1. Cell Culture
The tumor cells were maintained in Leibovitz's L-15 medium supplemented with 10% heat inactivated fetal bovine serum at 37° C. in an atmosphere of 5% CO₂ in air. The tumor cells were routinely subcultured twice weekly. The cells growing in an exponential growth phase were harvested and counted for tumor inoculation.
4.2. Tumor Inoculation
Each mouse was inoculated subcutaneously at the right flank with MDA-MB-468 tumor cells (10×10⁶) in 0.2 ml of PBS supplemented with 50% matrigel for tumor development. 41 animals were randomized when the average tumor volume reached 196 mm³. The test article administration and the animal numbers in each group were shown in the experimental design table.

4.3. Testing Article Formulation Preparation

| Test article | Con. (mg/ml) | Formulation |
| --- | --- | --- |
| Vehicle | — | 25 mM Histidine pH 7 10% sucrose |
| BCY8242 | 20 | Dissolve 10.47 mg BCY8242 in 510 μl DMSO |
| BCY8242 | 0.5 | Dilute 510 μl 20 mg/ml BCY8242 stock with 19.886 ml Histidine buffer |
| BCY8242 | 0.3 | Dilute 480 μl 0.5 mg/ml BCY8242 stock with 320 μl Histidine buffer |
| BCY8245 | 1 | Dissolve 10.56 mg BCY8245 in 10.518 ml Histidine buffer |
| BCY8245 | 0.5 | Dilute 400 μl 1 mg/ml BCY8245 stock with 400 μl Histidine buffer |
| BCY8245 | 0.3 | Dilute 240 μl 1 mg/ml BCY8245 stock with 560 μl Histidine buffer |
| BCY8253 | 1 | Dissolve 11.35 mg BCY8253 in 11.010 ml Histidine buffer |
| BCY8253 | 0.5 | Dilute 400 μl 1 mg/ml BCY8253 stock with 400 μl Histidine buffer |
| BCY8253 | 0.3 | Dilute 240 μl 1 mg/ml BCY8253 stock with 560 μl Histidine buffer |
| BCY8255 | 1 | Dissolve 10.78 mg BCY8255 in 10.715 ml Acetate buffer |
| BCY8255 | 0.5 | Dilute 400 μl 1 mg/ml BCY8255 stock with 400 μl Acetate buffer |
| BCY8255 | 0.3 | Dilute 240 μl 1 mg/ml BCY8255 stock with 560 μl Acetate buffer |

1. Histidine buffer: 25 mM Histidine pH 7 10% sucrose
2. Acetate buffer: 50 mM Acetate/acetic acid pH 5 10% sucrose
3. BCY8242(0.5 mg/mL), BCY8245(1 mg/mL), BCY8253(1 mg/mL) and BCY8255(1 mg/mL) stocks were separated into individual tubes and stored at −80° C.

4.4. Sample Collection

At the day 21 of study, the plasma of group 5, 8 and group 11 were collected at 5 min, 15 min, 30 min, 60 min and 120 min post last dosing. The tumors of groups 1, 6, 9 and group 12 were collected at 2 h post last dosing. The tumors of group 3 were collected without any dosing. The mice of group 2 were euthanized. The animals in group 4, 7, 10 and 13 were kept running for another 21 days without any dosing, and the tumors of these groups were collected on day 42.

5. Results

5.1. Tumor Growth Curves

Tumor growth curves are shown in FIGS. 50-53.

5.2. Tumor Volume Trace

Mean tumor volume over time in female Balb/c nude mice bearing MDA-MB-468 xenograft is shown in Tables 33 and 34.

5.3. Tumor Growth Inhibition Analysis

Tumor growth inhibition rate for test articles in the MDA-MB-468 xenograft model was calculated based on tumor volume measurements at day 21 after the start of the treatment.

TABLE 33

Tumor volume trace over time (Day 0 to day 21)

| Gr. | Treatment | 0 | 2 | 4 | 7 | 9 | 11 | 14 | 16 | 18 | 21 |
| --- | --- | --- | --- | --- | --- | --- | --- | --- | --- | --- | --- |
| 1 | Vehicle, qw | 199 ± 6 | 217 ± 9 | 235 ± 15 | 274 ± 14 | 291 ± 14 | 314 ± 20 | 348 ± 24 | 374 ± 33 | 398 ± 39 | 447 ± 39 |
| 2 | BCY8242, 3 mpk, qw | 192 ± 11 | 188 ± 17 | 178 ± 10 | 190 ± 11 | 166 ± 13 | 144 ± 16 | 133 ± 10 | 121 ± 11 | 114 ± 13 | 122 ± 10 |
| 3 | BCY8242, 3 mpk, biw | 194 ± 29 | 192 ± 20 | 179 ± 23 | 137 ± 12 | 94 ± 7 | 59 ± 5 | 47 ± 7 | 37 ± 6 | 28 ± 3 | 16 ± 3 |
| 4 | BCY8242, 5 mpk, qw | 193 ± 24 | 186 ± 30 | 133 ± 20 | 112 ± 13 | 80 ± 14 | 66 ± 16 | 61 ± 17 | 45 ± 11 | 42 ± 6 | 40 ± 5 |
| 5 | BCY8245, 3 mpk, qw | 194 ± 12 | 192 ± 26 | 184 ± 20 | 131 ± 20 | 113 ± 17 | 104 ± 13 | 94 ± 25 | 81 ± 23 | 87 ± 23 | 85 ± 31 |
| 6 | BCY8245, 3 mpk, biw | 195 ± 33 | 193 ± 27 | 154 ± 20 | 103 ± 20 | 83 ± 16 | 67 ± 14 | 49 ± 11 | 45 ± 14 | 32 ± 12 | 22 ± 4 |
| 7 | BCY8245, 5 mpk, qw | 199 ± 28 | 193 ± 11 | 135 ± 4 | 98 ± 5 | 58 ± 5 | 49 ± 5 | 47 ± 2 | 37 ± 4 | 35 ± 3 | 29 ± 3 |
| 8 | BCY8253, 3 mpk, qw | 195 ± 17 | 190 ± 24 | 162 ± 21 | 160 ± 28 | 138 ± 33 | 139 ± 32 | 136 ± 25 | 106 ± 24 | 104 ± 18 | 109 ± 19 |
| 9 | BCY8253, 3 mpk, biw | 199 ± 34 | 198 ± 13 | 150 ± 21 | 119 ± 11 | 102 ± 14 | 69 ± 13 | 70 ± 5 | 46 ± 5 | 33 ± 5 | 29 ± 7 |
| 10 | BCY8253, 5 mpk, qw | 198 ± 28 | 188 ± 32 | 142 ± 32 | 150 ± 20 | 95 ± 13 | 69 ± 13 | 67 ± 13 | 47 ± 8 | 42 ± 5 | 40 ± 8 |

TABLE 33-continued

Tumor volume trace over time (Day 0 to day 21)

Days after the start of treatment

| Gr. | Treatment | 0 | 2 | 4 | 7 | 9 | 11 | 14 | 16 | 18 | 21 |
|---|---|---|---|---|---|---|---|---|---|---|---|
| 11 | BCY8255, 3 mpk, qw | 198 ± 18 | 191 ± 15 | 172 ± 24 | 148 ± 18 | 139 ± 13 | 114 ± 22 | 140 ± 13 | 128 ± 22 | 141 ± 18 | 136 ± 31 |
| 12 | BCY8255, 3 mpk, biw | 197 ± 36 | 190 ± 28 | 154 ± 18 | 109 ± 11 | 90 ± 13 | 67 ± 3 | 64 ± 7 | 51 ± 8 | 41 ± 5 | 31 ± 1 |
| 13 | BCY8255, 5 mpk, qw | 194 ± 29 | 156 ± 25 | 121 ± 19 | 109 ± 14 | 75 ± 14 | 55 ± 8 | 66 ± 5 | 43 ± 5 | 37 ± 1 | 42 ± 2 |

TABLE 34

Tumor volume trace over time (Day 23 to day 42)

Days after the start of treatment

| Gr. | Treatment | 23 | 25 | 28 | 32 | 35 | 39 | 42 |
|---|---|---|---|---|---|---|---|---|
| 4 | BCY8242, 5 mpk, qw | 43 ± 4 | 68 ± 10 | 57 ± 7 | 52 ± 3 | 55 ± 2 | 58 ± 2 | 55 ± 5 |
| 7 | BCY8245, 5 mpk, qw | 35 ± 5 | 48 ± 5 | 37 ± 7 | 28 ± 6 | 24 ± 4 | 28 ± 6 | 26 ± 6 |
| 10 | BCY8253, 5 mpk, qw | 45 ± 7 | 56 ± 8 | 60 ± 19 | 45 ± 2 | 41 ± 10 | 48 ± 15 | 50 ± 20 |
| 13 | BCY8255, 5 mpk, qw | 41 ± 4 | 57 ± 7 | 48 ± 8 | 39 ± 9 | 39 ± 6 | 38 ± 9 | 34 ± 8 |

TABLE 35

Tumor growth inhibition analysis

| Gr | Treatment | Tumor Volume | T/C[b] (%) | TGI (%) | P value with |
|---|---|---|---|---|---|
| 1 | Vehicle, qw | 447 ± 39 | — | — | — |
| 2 | BCY8242, 3 mpk, qw | 122 ± 10 | 27.2 | 128.2 | p < 0.001 |
| 3 | BCY8242, 3 mpk, biw | 16 ± 3 | 3.6 | 171.8 | p < 0.001 |
| 4 | BCY8242, 5 mpk, qw | 40 ± 5 | 9.0 | 161.5 | p < 0.001 |
| 5 | BCY8245, 3 mpk, qw | 85 ± 31 | 18.9 | 144.2 | p < 0.001 |
| 6 | BCY8245, 3 mpk, biw | 22 ± 4 | 4.9 | 169.8 | p < 0.001 |
| 7 | BCY8245, 5 mpk, qw | 29 ± 3 | 6.6 | 168.4 | p < 0.001 |
| 8 | BCY8253, 3 mpk, qw | 109 ± 19 | 24.4 | 134.7 | p < 0.001 |
| 9 | BCY8253, 3 mpk, biw | 29 ± 7 | 6.6 | 168.3 | p < 0.001 |
| 10 | BCY8253, 5 mpk, qw | 40 ± 8 | 8.9 | 163.9 | p < 0.001 |
| 11 | BCY8255, 3 mpk, qw | 136 ± 31 | 30.4 | 125.1 | p < 0.001 |
| 12 | BCY8255, 3 mpk, biw | 31 ± 1 | 6.9 | 166.8 | p < 0.001 |
| 13 | BCY8255, 5 mpk, qw | 42 ± 2 | 9.5 | 161.3 | p < 0.001 | a. Mean ± SEM
[b]Tumor Growth Inhibition is calculated by dividing the group average tumor volume for the treated group by the group average tumor volume for the control group (T/C).

6. Results Summary and Discussion

In this study, the therapeutic efficacy of test articles in the MDA-MB-468 xenograft model was evaluated. The measured tumor volumes of all treatment groups at various time points are shown in FIGS. 50-53 and Tables 33 to 35.

The mean tumor size of vehicle treated mice reached 447 mm$^3$ on day 21. BCY8242 at 3 mg/kg, qw (TV=122 mm$^3$, TGI=128.2%, p<0.001), 3 mg/kg, biw (TV=16 mm$^3$, TGI=171.8%, p<0.001) and 5 mg/kg, qw (TV=40 mm$^3$, TGI=161.5%, p<0.001) produced significant anti-tumor antitumor activity in dose or dose-frequency dependent manner.

BCY8245 at 3 mg/kg, qw (TV=85 mm$^3$, TGI=144.2%, p<0.001), 3 mg/kg, biw (TV=22 mm$^3$, TGI=169.8%, p<0.001) and 5 mg/kg, qw (TV=29 mm$^3$, TGI=168.4%, p<0.001) produced significant anti-tumor antitumor activity in dose or dose-frequency dependent manner.

BCY8253 at 3 mg/kg, qw (TV=109 mm$^3$, TGI=134.7%, p<0.001), 3 mg/kg, biw (TV=29 mm$^3$, TGI=168.3%, p<0.001) and 5 mg/kg, qw (TV=40 mm$^3$, TGI=163.9%, p<0.001) produced significant anti-tumor antitumor activity in dose or dose-frequency dependent manner.

BCY8255 at 3 mg/kg, qw (TV=136 mm$^3$, TGI=125.1%, p<0.001), 3 mg/kg, biw (TV=31 mm$^3$, TGI=166.8%, p<0.001) and 5 mg/kg, qw (TV=42 mm$^3$, TGI=161.3%, p<0.001) produced significant anti-tumor antitumor activity in dose or dose-frequency dependent manner.

The dosing of 5 mg/kg groups were suspended from day 21, the tumors didn't show any relapse during extra 3 weeks' monitoring schedule.

In this study, BCY8242, BCY8253 and BCY8255 5 mg/kg caused severe animal body weight loss, among them, mouse 10-1 in BCY8253 5 mg/kg group was found dead on day 20.

In this cell line, which shows high expression of Nectin-4 in FACS studies, BCY8245 causes regression of the tumor emphasizing the target driven nature of optimal efficacy.

Example 9.5: In Vivo Efficacy Study of Test Articles in Treatment of NCI-H292 Xenograft in Balb/c Nude Mice

1. Study Objective

The objective of the research is to evaluate the in vivo anti-tumor efficacy of test articles in treatment of NCI-H292 xenograft in Balb/c nude mice.

2. Experimental Design

| Group | Treatment | n | Dose (mg/kg) | Dosing Volume (µl/g) | Dosing Route | Schedule |
|---|---|---|---|---|---|---|
| 1 | Vehicle | 5 | — | 10 | iv | qw |
| 2 | BCY8242 | 3 | 3 mg/kg | 10 | iv | qw |
| 3 | BCY8242 | 3 | 3 mg/kg | 10 | iv | biw |
| 4 | BCY8242 | 3 | 5 mg/kg | 10 | iv | qw |
| 5 | BCY8245 | 3 | 3 mg/kg | 10 | iv | qw |
| 6 | BCY8245 | 3 | 3 mg/kg | 10 | iv | biw |
| 7 | BCY8245 | 3 | 5 mg/kg | 10 | iv | qw |
| 8 | BCY8253 | 3 | 3 mg/kg | 10 | iv | qw |
| 9 | BCY8253 | 3 | 3 mg/kg | 10 | iv | biw |
| 10 | BCY8253 | 3 | 5 mg/kg | 10 | iv | qw |
| 11 | BCY8255 | 3 | 3 mg/kg | 10 | Iv | qw |
| 12 | BCY8255 | 3 | 3 mg/kg | 10 | iv | biw |
| 13 | BCY8255 | 3 | 5 mg/kg | 10 | iv | qw |

3. Materials 3.1. Animals and Housing Condition
3.1.1. Animals
  Species: Mus Musculus
  Strain: Balb/c nude
  Age: 6-8 weeks
  Sex: female
  Body weight: 18-22 g
  Number of animals: 41 mice plus spare
3.1.2. Housing condition The mice were kept in individual ventilation cages at constant temperature and humidity with 3 or 5 animals in each cage.
  Temperature: 20~26° C.
  Humidity 40-70%.
  Cages: Made of polycarbonate. The size is 300 mm×180 mm×150 mm. The bedding material is corn cob, which is changed twice per week.
  Diet: Animals had free access to irradiation sterilized dry granule food during the entire study period.
  Water: Animals had free access to sterile drinking water.
  Cage identification: The identification labels for each cage contained the following information: number of animals, sex, strain, the date received, treatment, study number, group number and the starting date of the treatment.
  Animal identification: Animals were marked by ear coding.

4. Experimental Methods and Procedures 4.1. Cell Culture

The NCI-H292 tumor cells were maintained in vitro as a monolayer culture in RPMI-1640 medium supplemented with 10% heat inactivated fetal bovine serum at 37° C. in an atmosphere of 5% $CO_2$ in air. The tumor cells were routinely subcultured twice weekly by trypsin-EDTA treatment. The cells growing in an exponential growth phase were harvested and counted for tumor inoculation.

4.2. Tumor Inoculation

Each mouse was inoculated subcutaneously at the right flank with NCI-H292 tumor cells ($10 \times 10^6$) in 0.2 ml of PBS for tumor development. 41 animals were randomized when the average tumor volume reached 162 $mm^3$. The test article administration and the animal numbers in each group were shown in the experimental design table.

4.3. Testing Article Formulation Preparation

| Test article | Con. (mg/ml) | Formulation |
|---|---|---|
| Vehicle | — | 25 mM Histidine pH 7 10% sucrose |
| BCY8242 | 20 | Dissolve 10.47 mg BCY8242 in 510 µl DMSO |
| BCY8242 | 0.5 | Dilute 510 µl 20 mg/ml BCY8242 stock with 19.886 ml Histidine buffer |
| BCY8242 | 0.3 | Dilute 480 µl 0.5 mg/ml BCY8242 stock with 320 µl Histidine buffer |
| BCY8245 | 1 | Dissolve 10.56 mg BCY8245 in 10.518 ml Histidine buffer |
| BCY8245 | 0.5 | Dilute 400 µl 1 mg/ml BCY8245 stock with 400 µl Histidine buffer |
| BCY8245 | 0.3 | Dilute 240 µl 1 mg/ml BCY8245 stock with 560 µl Histidine buffer |
| BCY8253 | 1 | Dissolve 11.35 mg BCY8253 in 11.010 ml Histidine buffer |
| BCY8253 | 0.5 | Dilute 400 µl 1 mg/ml BCY8253 stock with 400 µl Histidine buffer |
| BCY8253 | 0.3 | Dilute 240 µl 1 mg/ml BCY8253 stock with 560 µl Histidine buffer |
| BCY8255 | 1 | Dissolve 10.78 mg BCY8255 in 10.715 ml Acetate buffer |
| BCY8255 | 0.5 | Dilute 400 µl 1 mg/ml BCY8255 stock with 400 µl Acetate buffer |
| BCY8255 | 0.3 | Dilute 240 µl 1 mg/ml BCY8255 stock with 560 µl Acetate buffer |

1. Histidine buffer: 25 mM Histidine pH 7 10% sucrose
2. Acetate buffer: 50 mM Acetate/acetic acid pH 5 10% sucrose
3. BCY8242(0.5 mg/mL), BCY8245(1 mg/mL), BCY8253(1 mg/mL) and BCY8255(1 mg/mL) stocks were separated into individual tubes and stored at −80° C.

4.4. Sample Collection

At the end of study, the tumor of all groups except group 2, 3, 4 were collected at 2 h post last dosing. The tumor of group 2, 3, 4 were collected without any dosing.

5. Results 5.1 Tumor Growth Curves

Tumor growth curves are shown in FIGS. 54-57.

5.2. Tumor Volume Trace

Mean tumor volume over time in female Balb/c nude mice bearing NCI-H292 xenograft is shown in Table 36.

TABLE 36

| | | Tumor volume trace over time | | | | | | |
|---|---|---|---|---|---|---|---|---|
| | | Days after the start of treatment | | | | | | |
| Gr. | Treatment | 0 | 2 | 4 | 7 | 9 | 11 | 14 |
| 1 | Vehicle, qw | 161 ± 2 | 270 ± 14 | 357 ± 14 | 448 ± 17 | 570 ± 16 | 720 ± 36 | 948 ± 61 |

TABLE 36-continued

Tumor volume trace over time

| Gr. | Treatment | \multicolumn{7}{c}{Days after the start of treatment} |
| --- | --- | --- | --- | --- | --- | --- | --- | --- |
|  |  | 0 | 2 | 4 | 7 | 9 | 11 | 14 |
| 2 | BCY8242, 3 mpk, qw | 160 ± 1 | 214 ± 13 | 197 ± 15 | 159 ± 2 | 175 ± 7 | 119 ± 8 | 92 ± 10 |
| 3 | BCY8242, 3 mpk, biw | 162 ± 12 | 221 ± 9 | 176 ± 17 | 146 ± 36 | 131 ± 49 | 79 ± 25 | 73 ± 28 |
| 4 | BCY8242, 5 mpk, qw | 163 ± 8 | 185 ± 18 | 133 ± 4 | 145 ± 18 | 131 ± 12 | 91 ± 5 | 81 ± 5 |
| 5 | BCY8245, 3 mpk, qw | 160 ± 5 | 220 ± 11 | 266 ± 15 | 218 ± 23 | 167 ± 10 | 161 ± 36 | 149 ± 43 |
| 6 | BCY8245, 3 mpk, biw | 162 ± 13 | 243 ± 19 | 211 ± 12 | 101 ± 11 | 100 ± 8 | 87 ± 7 | 65 ± 3 |
| 7 | BCY8245, 5 mpk, qw | 160 ± 9 | 176 ± 7 | 191 ± 3 | 105 ± 8 | 82 ± 3 | 91 ± 14 | 83 ± 8 |
| 8 | BCY8253, 3 mpk, qw | 162 ± 7 | 187 ± 9 | 176 ± 20 | 159 ± 15 | 147 ± 8 | 114 ± 13 | 98 ± 3 |
| 9 | BCY8253, 3 mpk, biw | 162 ± 14 | 174 ± 9 | 149 ± 7 | 70 ± 2 | 68 ± 6 | 58 ± 2 | 49 ± 5 |
| 10 | BCY8253, 5 mpk, qw | 161 ± 10 | 161 ± 9 | 121 ± 9 | 97 ± 3 | 79 ± 6 | 82 ± 8 | 68 ± 9 |
| 11 | BCY8255, 3 mpk, qw | 162 ± 8 | 195 ± 14 | 160 ± 5 | 123 ± 1 | 108 ± 5 | 104 ± 3 | 100 ± 9 |
| 12 | BCY8255, 3 mpk, biw | 162 ± 15 | 204 ± 16 | 148 ± 11 | 132 ± 16 | 102 ± 20 | 106 ± 38 | 96 ± 35 |
| 13 | BCY8255, 5 mpk, qw | 164 ± 8 | 171 ± 8 | 103 ± 9 | 101 ± 5 | 89 ± 11 | 87 ± 32 | 97 ± 44 |

5.3. Tumor Growth Inhibition Analysis

Tumor growth inhibition rate for test articles in the NCI-H292 xenograft model was calculated based on tumor volume measurements at day 14 after the start of treatment.

TABLE 37

Tumor growth inhibition analysis

| Gr | Treatment | Tumor Volume (mm$^3$)$^a$ | T/C$^b$ (%) | TGI (%) | P value compared with vehicle |
| --- | --- | --- | --- | --- | --- |
| 1 | Vehicle, qw | 948 ± 61 | — | — | — |
| 2 | BCY8242, 3 mpk, qw | 92 ± 10 | 9.7 | 108.6 | p < 0.001 |
| 3 | BCY8242, 3 mpk, biw | 73 ± 28 | 7.7 | 111.4 | p < 0.001 |
| 4 | BCY8242, 5 mpk, qw | 81 ± 5 | 8.6 | 110.4 | p < 0.001 |
| 5 | BCY8245, 3 mpk, qw | 149 ± 43 | 15.8 | 101.4 | p < 0.001 |
| 6 | BCY8245, 3 mpk, biw | 65 ± 3 | 6.9 | 112.2 | p < 0.001 |
| 7 | BCY8245, 5 mpk, qw | 83 ± 8 | 8.8 | 109.8 | p < 0.001 |
| 8 | BCY8253, 3 mpk, qw | 98 ± 3 | 10.4 | 108.1 | p < 0.001 |
| 9 | BCY8253, 3 mpk, biw | 49 ± 5 | 5.2 | 114.3 | p < 0.001 |
| 10 | BCY8253, 5 mpk, qw | 68 ± 9 | 7.2 | 111.9 | p < 0.001 |
| 11 | BCY8255, 3 mpk, qw | 100 ± 9 | 10.6 | 107.9 | p < 0.001 |
| 12 | BCY8255, 3 mpk, biw | 96 ± 35 | 10.1 | 108.5 | p < 0.001 |
| 13 | BCY8255, 5 mpk, qw | 97 ± 44 | 10.2 | 108.5 | p < 0.001 |

$^a$Mean ± SEM.
$^b$Tumor Growth Inhibition is calculated by dividing the group average tumor volume for the treated group by the group average tumor volume for the control group (T/C).

6. Results Summary and Discussion

In this study, the therapeutic efficacy of test articles in the NCI-H292 xenograft model was evaluated. The measured tumor volumes of all treatment groups at various time points are shown in FIGS. 54-57 and Tables 36 and 37.

The mean tumor size of vehicle treated mice reached 948 mm$^3$ on day 14. BCY8242 at 3 mg/kg, qw (TV=92 mm$^3$, TGI=108.6%, p<0.001), 3 mg/kg, biw (TV=73 mm$^3$, TGI=111.4%, p<0.001) and 5 mg/kg, qw (TV=81 mm$^3$, TGI=110.4%, p<0.001) produced significant antitumor activity.

BCY8245 at 3 mg/kg, qw (TV=149 mm$^3$, TGI=101.4%, p<0.001), 3 mg/kg, biw (TV=65 mm$^3$, TGI=112.2%, p<0.001) and 5 mg/kg, qw (TV=83 mm$^3$, TGI=109.8%, p<0.001) produced significant antitumor activity.

BCY8253 at 3 mg/kg, qw (TV=98 mm$^3$, TGI=108.1%, p<0.001), 3 mg/kg, biw (TV=49 mm$^3$, TGI=114.3%, p<0.001) and at 5 mg/kg, qw (TV=68 mm$^3$, TGI=111.9%, p<0.001) produced significant antitumor activity.

BCY8255 at 3 mg/kg, qw (TV=100 mm$^3$, TGI=107.9%, p<0.001), 3 mg/kg, biw (TV=96 mm$^3$, TGI=108.5%, p<0.001) and at 5 mg/kg, qw (TV=97 mm$^3$, TGI=108.5%, p<0.001) produced significant antitumor activity.

All of the test articles at 3 mg/kg, qw, 3 mg/kg, biw and 5 mg/kg, qw showed comparable antitumor activity, the efficacy didn't further improve when increasing the dosage or dose-frequency.

In this study, animals treated with BCY8253 at 5 mg/kg showed over average 15% bodyweight loss at day 9, mice in other groups maintained the bodyweight well.

In this cell line, which shows high expression of Nectin-4 in FACS studies, BCY8245 causes regression of the tumor emphasizing the target driven nature of optimal efficacy.

Example 9.6: In Vivo Efficacy Study of Test Articles in Treatment of NCI-H526 Xenograft in Balb/c Nude Mice

1. Study Objective

The objective of the research is to evaluate the in vivo anti-tumor efficacy of test articles in treatment of NCI-H526 xenograft in Balb/c nude mice.

2. Experimental Design

| Group | Treatment | n | Dose (mg/kg) | Dosing Volume (μl/g) | Dosing Route | Schedule |
|---|---|---|---|---|---|---|
| 1 | Vehicle | 3 | — | 10 | iv | qw |
| 2 | BCY8245 | 3 | 3 | 10 | iv | qw |
| 3 | BCY8245 | 3 | 3 | 10 | Iv | biw |
| 4 | BCY8245 | 3 | 5 | 10 | iv | qw |
| 5 | BCY8255 | 3 | 3 | 10 | iv | qw |
| 6 | BCY8255 | 3 | 3 | 10 | iv | biw |
| 7 | BCY8255 | 3 | 5 | 10 | iv | qw |

3. Materials

3.1. Animals and Housing Condition

3.1.1. Animals

Species: Mus Musculus
Strain: Balb/c nude
Age: 6-8 weeks
Sex: female
Body weight: 18-22 g
Number of animals: 21 mice plus spare

3.1.2. Housing condition

The mice were kept in individual ventilation cages at constant temperature and humidity with 3 animals in each cage.
Temperature: 20~26° C.
Humidity 40-70%.
Cages: Made of polycarbonate. The size is 300 mm×180 mm×150 mm. The bedding material is corn cob, which is changed twice per week.
Diet: Animals had free access to irradiation sterilized dry granule food during the entire study period.
Water: Animals had free access to sterile drinking water.
Cage identification: The identification labels for each cage contained the following information: number of animals, sex, strain, the date received, treatment, study number, group number and the starting date of the treatment.
Animal identification: Animals were marked by ear coding.

4. Experimental Methods and Procedures

4.1 Cell Culture

The NCI-H526 cells were maintained in medium supplemented with 10% heat inactivated fetal bovine serum at 37° C. in an atmosphere of 5% $CO_2$ in air. The tumor cells were routinely subcultured twice weekly. The cells growing in an exponential growth phase were harvested and counted for tumor inoculation.

4.2. Tumor Inoculation

Each mouse was inoculated subcutaneously at the right flank with NCI-H526 tumor cells ($5.0 \times 10^6$ in 0.2 ml of PBS for tumor development. 21 animals were randomized when the average tumor volume reached 181 mm³. The test article administration and the animal numbers in each group were shown in the experimental design table.

4.3. Testing Article Formulation Preparation

| Test article | Con. (mg/ml) | Formulation |
|---|---|---|
| Vehicle | — | 25 mM Histidine pH 7 10% sucrose |
| BCY8245 | 0.5 | Dilute 400 μl 1 mg/ml BCY8245 stock with 400 μl Histidine buffer |
| BCY8245 | 0.3 | Dilute 240 μl 1 mg/ml BCY8245 stock with 560 μl Histidine buffer |
| BCY8255 | 0.5 | Dilute 400 μl 1 mg/ml BCY8255 stock with 400 μl Acetate buffer |
| BCY8255 | 0.3 | Dilute 240 μl 1 mg/ml BCY8255 stock with 560 μl Acetate buffer |

7. Histidine buffer: 25 mM Histidine pH 7 10% sucrose
8. Acetate buffer: 50 mM Acetate/acetic acid pH 5 10% sucrose

4.4. Sample Collection

At the end of study on day 14, all tumors were collected for FFPE.

5. Results

5.1. Tumor Growth Curves

Figure 58:
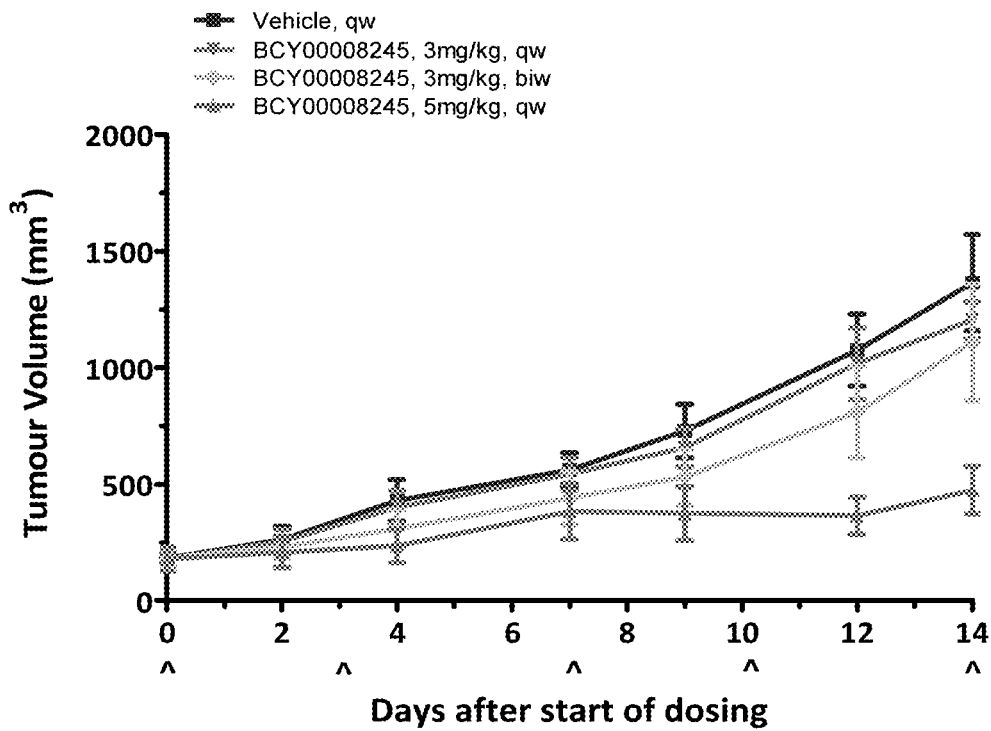
FIGS. 58-59: Tumor volume traces after administering BCY8245 and BCY8255, respectively, to female Balb/c nude mice bearing NCI-H526 xenograft.
Figure 59:
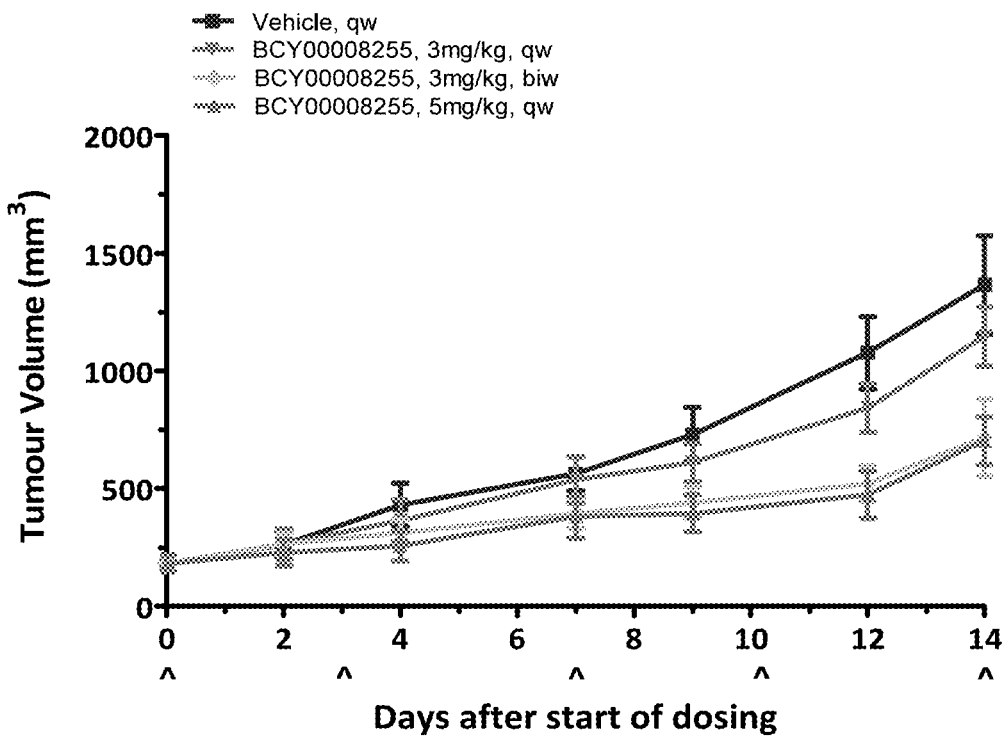
Figure 60:
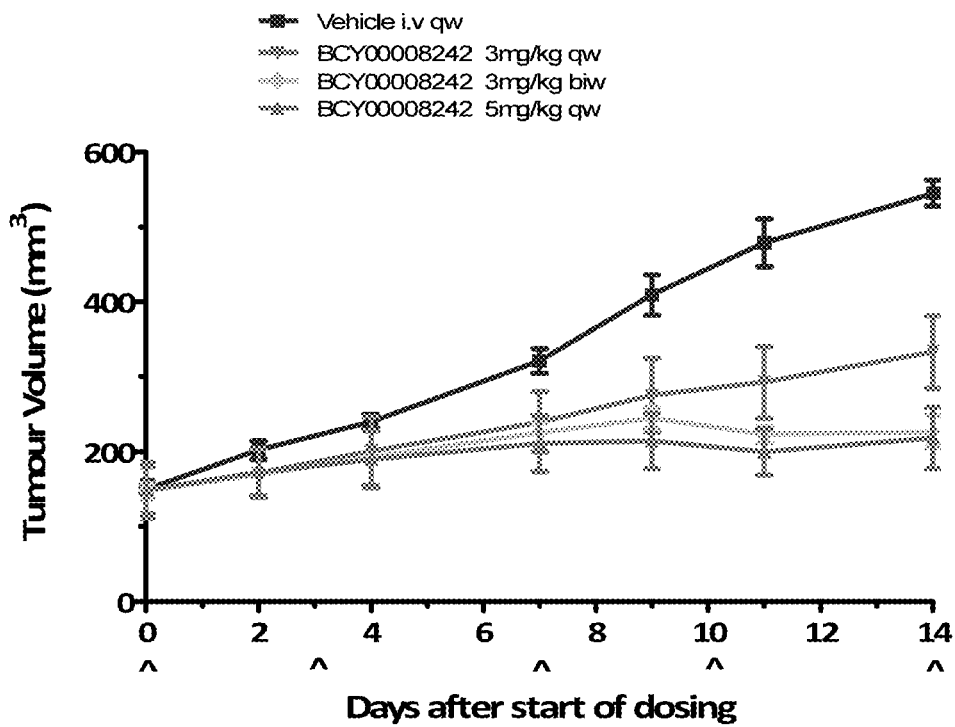
FIGS. 60-63: Tumor volume traces after administering BCY8242, BCY8245, BCY8253, and BCY8255, respectively, to female Balb/c nude mice bearing Panc2.13 xenograft.
Figure 61:
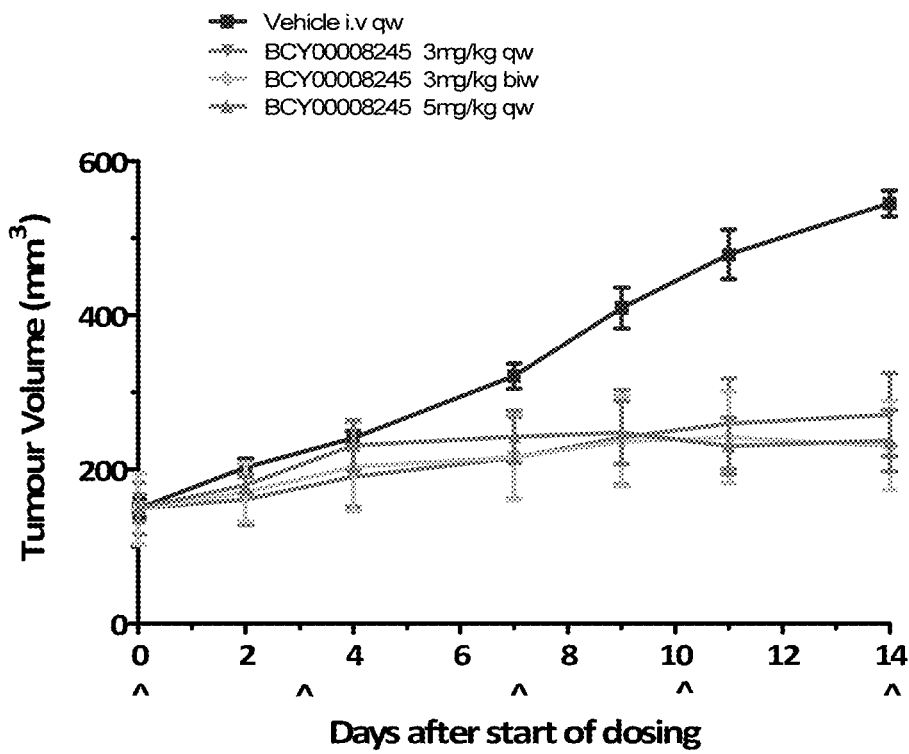
Figure 62:
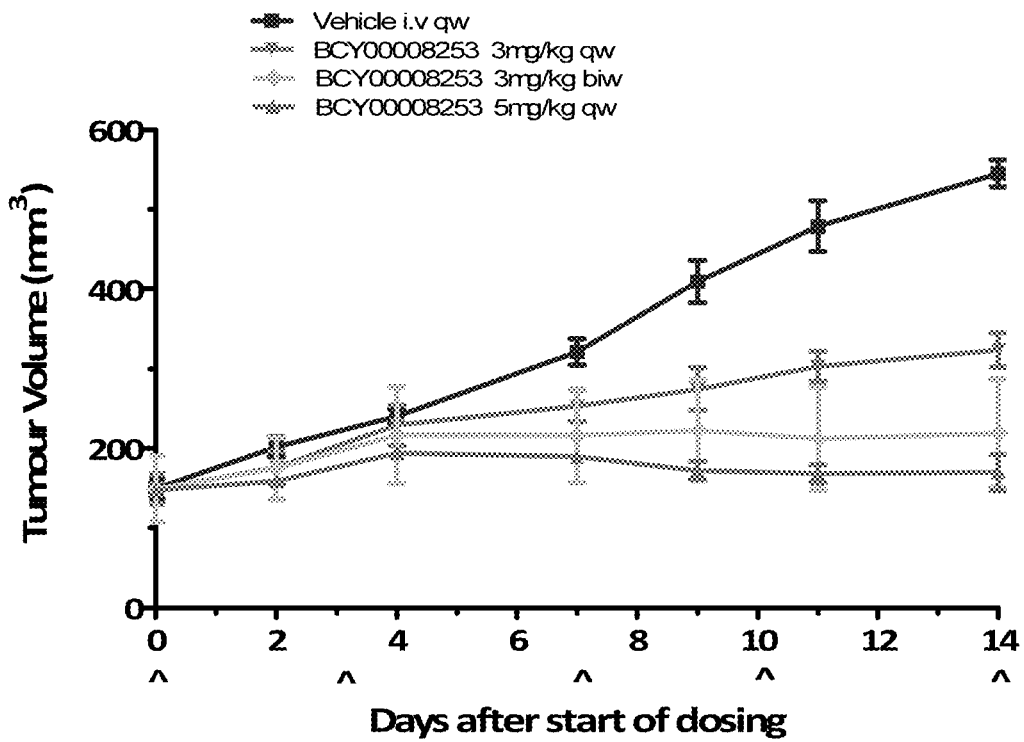
Figure 63:
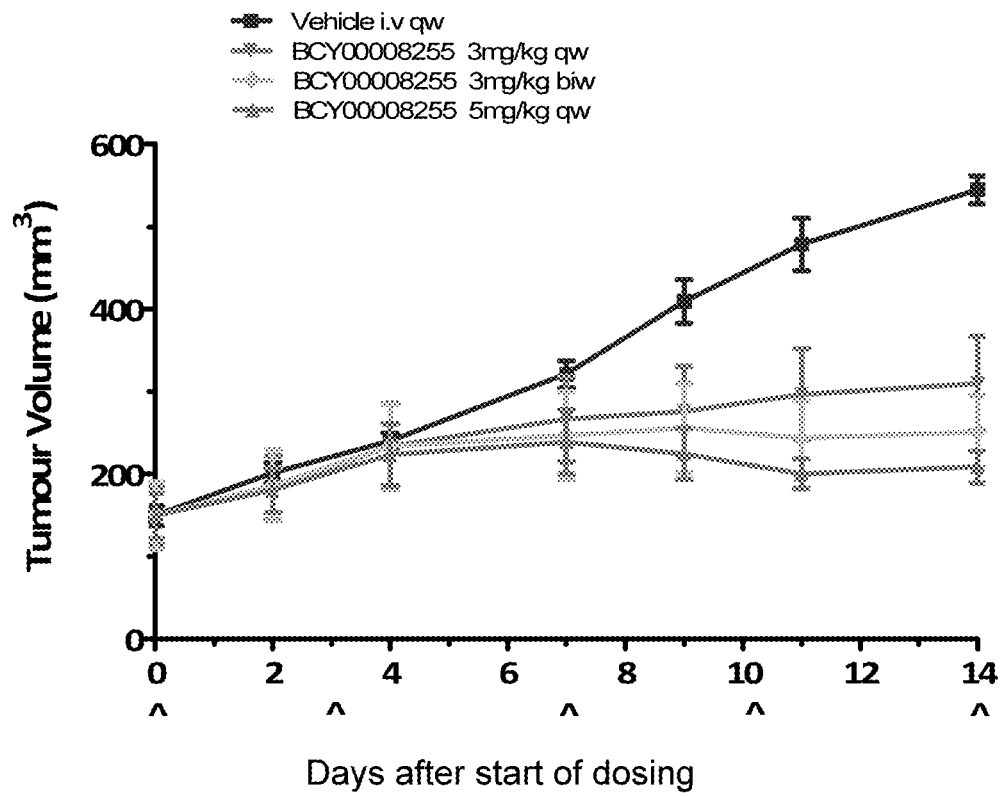

Tumor growth curves are shown in FIGS. 58 and 59.

5.2. Tumor Volume Trace

Mean tumor volume over time in female Balb/c nude mice bearing NCI-H526 xenograft is shown in Table 38.

TABLE 38

Tumor volume trace over time

| Group | Treatment | Days after the start of treatment | | | | | | |
|---|---|---|---|---|---|---|---|---|
| | | 0 | 2 | 4 | 7 | 9 | 12 | 14 |
| 1 | Vehicle, qw | 181 ± 32 | 262 ± 56 | 431 ± 90 | 563 ± 72 | 729 ± 115 | 1076 ± 155 | 1365 ± 208 |
| 2 | BCY8245, 3 mpk, qw | 180 ± 32 | 256 ± 51 | 403 ± 72 | 545 ± 68 | 657 ± 83 | 1019 ± 155 | 1205 ± 79 |
| 3 | BCY8245, 3 mpk, biw | 182 ± 43 | 232 ± 49 | 308 ± 79 | 440 ± 112 | 530 ± 121 | 810 ± 197 | 1109 ± 250 |
| 4 | BCY8245, 5 mpk, qw | 180 ± 52 | 209 ± 66 | 236 ± 72 | 383 ± 119 | 375 ± 115 | 365 ± 79 | 476 ± 103 |
| 5 | BCY8255, 3 mpk, qw | 182 ± 30 | 264 ± 63 | 364 ± 88 | 537 ± 97 | 610 ± 80 | 842 ± 103 | 1146 ± 125 |
| 6 | BCY8255, 3 mpk, biw | 181 ± 29 | 264 ± 46 | 313 ± 56 | 393 ± 62 | 440 ± 67 | 520 ± 76 | 715 ± 163 |

TABLE 38-continued

| | | Tumor volume trace over time | | | | | | |
|---|---|---|---|---|---|---|---|---|
| | | Days after the start of treatment | | | | | | |
| Group | Treatment | 0 | 2 | 4 | 7 | 9 | 12 | 14 |
| 7 | BCY8255, 5 mpk, qw | 182 ± 35 | 227 ± 57 | 256 ± 63 | 381 ± 90 | 395 ± 76 | 474 ± 100 | 704 ± 101 |

5.3. Tumor Growth Inhibition Analysis

Tumor growth inhibition rate for test articles in the NCI-H526 xenograft model was calculated based on tumor volume measurements at day 14 after the start of the treatment.

TABLE 39

Tumor growth inhibition analysis

| Group | Treatment | Tumor Volume (mm³)[a] | T/C[b] (%) | TGI (%) | P value |
|---|---|---|---|---|---|
| 1 | Vehicle, qw | 1365 ± 208 | — | — | — |
| 2 | BCY8245, 3 mpk, qw | 1205 ± 79 | 88.3 | 13.4 | p > 0.05 |
| 3 | BCY8245, 3 mpk, biw | 1109 ± 250 | 81.3 | 21.6 | p > 0.05 |
| 4 | BCY8245, 5 mpk, qw | 476 ± 103 | 34.9 | 75.0 | p < 0.01 |
| 5 | BCY8255, 3 mpk, qw | 1146 ± 125 | 84.0 | 18.5 | p > 0.05 |
| 6 | BCY8255, 3 mpk, biw | 715 ± 163 | 52.4 | 54.9 | p > 0.05 |
| 7 | BCY8255, 5 mpk, qw | 704 ± 101 | 51.5 | 55.9 | p < 0.05 |

[a]Mean ± SEM;
[b]Tumor Growth Inhibition is calculated by dividing the group average tumor volume for the treated group by the group average tumor volume for the control group (T/C).

6. Results Summary and Discussion

In this study, the therapeutic efficacy of test articles in the NCI-H526 xenograft model was evaluated. The measured tumor volumes of all treatment groups at various time points are shown in FIGS. 58 and 59, and Tables 38 and 39.

The mean tumor size of vehicle treated mice reached 13653 on day 14 after the start of treatment. BCY8245 at 3 mg/kg, qw (TV=1205 mm³, TGI=13.4%, p>0.05) and 3 mg/kg, biw (TV=1109 mm³, TGI=21.6%, p>0.05) showed slight anti-tumor activity, BCY8245 at 5 mg/kg, qw (TV=476 mm³, TGI=75.0%, p<0.01) showed significant antitumor activity. BCY8255 at 3 mg/kg, qw (TV=1146 mm³, TGI=18.5%, p>0.05) showed slight antitumor activity. BCY8255 at 3 mg/kg, biw (TV=715 mm³, TGI=54.9%, p>0.05) produced moderate antitumor activity but without statistical significance. BCY8255 at 5 mg/kg, qw (TV=704 mm³, TGI=55.9%, p<0.05) showed significant antitumor activity.

In this study, BCY8245 at 5 mg/kg biw caused over 10% animal bodyweight loss, BCY8255 3 mg/kg biw and 5 mg/kg qw lost caused over 15% animal bodyweight loss during the treatment schedule.

In this cell line, which shows minimal expression of Nectin-4 in FACS studies, tumor growth is restrained by BCY8245 but the tumor does not undergo regression, emphasising the target driven requirement for optimal efficacy.

Example 9.7: In Vivo Efficacy Study of Test Articles in Treatment of Panc2.13 Xenograft in Balb/c Nude Mice 1. Study Objective The objective of the research is to evaluate the in vivo anti-tumor efficacy of test articles in treatment of Panc2.13 xenograft in Balb/c nude mice.

2. Experimental Design

| Group | Treatment | n | Dose (mg/kg) | Dosing Volume (μl/g) | Dosing Route | Schedule |
|---|---|---|---|---|---|---|
| 1 | Vehicle | 5 | — | 10 | iv | qw |
| 2 | BCY8242 | 3 | 3 mg/kg | 10 | iv | qw |
| 3 | BCY8242 | 3 | 3 mg/kg | 10 | iv | biw |
| 4 | BCY8242 | 3 | 5 mg/kg | 10 | Iv | qw |
| 5 | BCY8245 | 3 | 3 mg/kg | 10 | Iv | qw |
| 6 | BCY8245 | 3 | 3 mg/kg | 10 | iv | biw |
| 7 | BCY8245 | 3 | 5 mg/kg | 10 | iv | qw |
| 8 | BCY8253 | 3 | 3 mg/kg | 10 | iv | qw |
| 9 | BCY8253 | 3 | 3 mg/kg | 10 | iv | biw |
| 10 | BCY8253 | 3 | 5 mg/kg | 10 | iv | qw |
| 11 | BCY8255 | 3 | 3 mg/kg | 10 | Iv | qw |
| 12 | BCY8255 | 3 | 3 mg/kg | 10 | iv | biw |
| 13 | BCY8255 | 3 | 5 mg/kg | 10 | iv | qw |

3. Materials 3.1. Animals and Housing Condition
3.1.1. Animals
　Species: Mus Musculus
　Strain: Balb/c nude
　Age: 6-8 weeks
　Sex: female
　Body weight: 18-22 g
　Number of animals: 41 mice plus spare
3.1.2. Housing condition The mice were kept in individual ventilation cages at constant temperature and humidity with 3 or 5 animals in each cage.
　Temperature: 20~26° C.
　Humidity 40-70%.
　Cages: Made of polycarbonate. The size is 300 mm×180 mm×150 mm. The bedding material is corn cob, which is changed twice per week.
　Diet: Animals had free access to irradiation sterilized dry granule food during the entire study period.
　Water: Animals had free access to sterile drinking water.
　Cage identification: The identification labels for each cage contained the following information: number of animals, sex, strain, the date received, treatment, study number, group number and the starting date of the treatment.
　Animal identification: Animals were marked by ear coding.

4. Experimental Methods and Procedures

4.1. Cell Culture

The Panc2.13 tumor cells will be maintained in RMPI1640 medium supplemented with 15% heat inactivated fetal bovine serum and 10 units/ml human recombinant insulin at 37° C. in an atmosphere of 5% $CO_2$ in air. The tumor cells will be routinely subcultured twice weekly. The cells growing in an exponential growth phase will be harvested and counted for tumor inoculation.

4.2. Tumor Inoculation

Each mouse was inoculated subcutaneously at the right flank with Panc2.13 tumor cells ($5 \times 10^6$ with Matrigel (1:1) in 0.2 ml of PBS for tumor development. 41 animals were randomized when the average tumor volume reached 149 $mm^3$. The test article administration and the animal numbers in each group were shown in the experimental design table.

4.3. Testing Article Formulation Preparation

| Test article | Con. (mg/ml) | Formulation |
|---|---|---|
| Vehicle | — | 25 mM Histidine pH 7 10% sucrose |
| BCY8242 | 0.5 | Dilute 510 µl 20 mg/ml BCY8242 stock with 19.886 ml Histidine buffer |
| BCY8242 | 0.3 | Dilute 480 µl 0.5 mg/ml BCY8242 stock with 320 µl Histidine buffer |
| BCY8245 | 0.5 | Dilute 400 µl 1 mg/ml BCY8245 stock with 400 µl Histidine buffer |
| BCY8245 | 0.3 | Dilute 240 µl 1 mg/ml BCY8245 stock with 560 µl Histidine buffer |
| BCY8253 | 0.5 | Dilute 400 µl 1 mg/ml BCY8253 stock with 400 µl Histidine buffer |
| BCY8253 | 0.3 | Dilute 240 µl 1 mg/ml BCY8253 stock with 560 µl Histidine buffer |
| BCY8255 | 0.5 | Dilute 400 µl 1 mg/ml BCY8255 stock with 400 µl Acetate buffer |
| BCY8255 | 0.3 | Dilute 240 µl 1 mg/ml BCY8255 stock with 560 µl Acetate buffer |

9. Histidine buffer: 25 mM Histidine pH 7 10% sucrose
10. Acetate buffer: 50 mM Acetate/acetic acid pH 5 10% sucrose

4.4. Sample Collection

At the end of study, the tumor of all groups except group 2, 3, 4 were collected at 2 h post last dosing. The tumor of group 2, 3, 4 were collected without any dosing.

5. Results

5.1. Tumor Growth Curves

Tumor growth curves are shown in FIGS. 60-63.

5.2. Tumor Volume Trace

Mean tumor volume over time in female Balb/c nude mice bearing Panc2.13 xenograft is shown in Table 40.

TABLE 40

Tumor volume trace over time

| Gr. | Treatment | 0 | 2 | 4 | 7 | 9 | 11 | 14 |
|---|---|---|---|---|---|---|---|---|
| 1 | Vehicle, qw | 149 ± 12 | 202 ± 12 | 240 ± 9 | 321 ± 17 | 410 ± 27 | 479 ± 32 | 545 ± 17 |
| 2 | BCY8242, 3 mpk, qw | 149 ± 31 | 172 ± 33 | 201 ± 46 | 240 ± 40 | 275 ± 49 | 293 ± 48 | 334 ± 49 |
| 3 | BCY8242, 3 mpk, biw | 148 ± 10 | 169 ± 6 | 192 ± 1 | 226 ± 13 | 245 ± 14 | 223 ± 11 | 227 ± 22 |
| 4 | BCY8242, 5 mpk, qw | 149 ± 37 | 172 ± 32 | 190 ± 38 | 211 ± 37 | 214 ± 37 | 199 ± 31 | 218 ± 41 |
| 5 | BCY8245, 3 mpk, qw | 149 ± 34 | 160 ± 33 | 191 ± 39 | 215 ± 53 | 242 ± 62 | 259 ± 59 | 271 ± 54 |
| 6 | BCY8245, 3 mpk, biw | 148 ± 46 | 170 ± 38 | 204 ± 57 | 216 ± 56 | 236 ± 59 | 241 ± 60 | 231 ± 57 |
| 7 | BCY8245, 5 mpk, qw | 149 ± 18 | 180 ± 11 | 231 ± 33 | 242 ± 34 | 248 ± 40 | 231 ± 37 | 238 ± 40 |
| 8 | BCY8253, 3 mpk, qw | 149 ± 19 | 176 ± 20 | 230 ± 25 | 253 ± 20 | 274 ± 27 | 303 ± 18 | 324 ± 21 |
| 9 | BCY8253, 3 mpk, biw | 149 ± 42 | 175 ± 39 | 217 ± 61 | 216 ± 59 | 222 ± 64 | 213 ± 64 | 219 ± 68 |
| 10 | BCY8253, 5 mpk, qw | 148 ± 7 | 159 ± 8 | 195 ± 5 | 190 ± 5 | 173 ± 11 | 168 ± 12 | 170 ± 23 |
| 11 | BCY8255, 3 mpk, qw | 150 ± 35 | 184 ± 39 | 234 ± 52 | 267 ± 52 | 277 ± 54 | 297 ± 55 | 310 ± 58 |
| 12 | BCY8255, 3 mpk, biw | 149 ± 41 | 186 ± 43 | 233 ± 52 | 247 ± 53 | 256 ± 54 | 244 ± 44 | 251 ± 44 |
| 13 | BCY8255, 5 mpk, qw | 150 ± 27 | 180 ± 27 | 223 ± 37 | 239 ± 39 | 224 ± 31 | 200 ± 18 | 209 ± 19 |

5.3. Tumor Growth Inhibition Analysis

Tumor growth inhibition rate for Test articles in the Panc2.13 xenograft model was calculated based on tumor volume measurements at day 14 after the start of treatment.

TABLE 41

Tumor growth inhibition analysis

| Gr | Treatment | Tumor Volume $(mm^3)^a$ | T/C[b] (%) | TGI (%) | P value compared with vehicle |
|---|---|---|---|---|---|
| 1 | Vehicle, qw | 545 ± 17 | — | — | — |
| 2 | BCY8242, 3 mpk, qw | 334 ± 49 | 61.2 | 53.2 | $p < 0.01$ |
| 3 | BCY8242, 3 mpk, biw | 227 ± 22 | 41.6 | 80.0 | $p < 0.001$ |
| 4 | BCY8242, 5 mpk, qw | 218 ± 41 | 40.0 | 82.4 | $p < 0.001$ |
| 5 | BCY8245, 3 mpk, qw | 271 ± 54 | 49.6 | 69.2 | $p < 0.01$ |
| 6 | BCY8245, 3 mpk, biw | 231 ± 57 | 42.3 | 79.1 | $p < 0.001$ |
| 7 | BCY8245, 5 mpk, qw | 238 ± 40 | 43.6 | 77.5 | $p < 0.001$ |
| 8 | BCY8253, 3 mpk, qw | 324 ± 21 | 59.3 | 55.9 | $p < 0.01$ |
| 9 | BCY8253, 3 mpk, biw | 219 ± 68 | 40.2 | 82.2 | $p < 0.001$ |
| 10 | BCY8253, 5 mpk, qw | 170 ± 23 | 31.1 | 94.5 | $p < 0.001$ |
| 11 | BCY8255, 3 mpk, qw | 310 ± 58 | 56.8 | 59.5 | $p < 0.01$ |
| 12 | BCY8255, 3 mpk, biw | 251 ± 44 | 46.0 | 74.3 | $p < 0.001$ |
| 13 | BCY8255, 5 mpk, qw | 209 ± 19 | 38.2 | 85.1 | $p < 0.001$ |

[a]Mean ± SEM.
[b]Tumor Growth Inhibition is calculated by dividing the group average tumor volume for the treated group by the group average tumor volume for the control group (T/C).

6. Results Summary and Discussion

In this study, the therapeutic efficacy of test articles in the Panc2.13 xenograft model was evaluated. The measured tumor volumes of all treatment groups at various time points are shown in FIGS. 60-63 and Tables 40 and 41.

The mean tumor size of vehicle treated mice reached 545 mm$^3$ on day 14. BCY8242 at 3 mg/kg, qw (TV=334 mm$^3$, TGI=53.2%, p<0.01), 3 mg/kg, biw (TV=227 mm$^3$, TGI=80.0%, p<0.001) and 5 mg/kg, qw (TV=218 mm$^3$, TGI=82.4%, p<0.001) produced significant anti-tumor antitumor activity in dose or dose-frequency dependent manner.

BCY8245 at 3 mg/kg, qw (TV=271 mm$^3$, TGI=69.2%, p<0.01), 3 mg/kg, biw (TV=231 mm$^3$, TGI=79.1%, p<0.001) and 5 mg/kg, qw (TV=238 mm$^3$, TGI=77.5%, p<0.001) produced significant antitumor activity.

BCY8253 at 3 mg/kg, qw (TV=324 mm$^3$, TGI=59.8%, p<0.01), 3 mg/kg, biw (TV=219 mm$^3$, TGI=82.2%, p<0.001) and 5 mg/kg, qw (TV=170 mm$^3$, TGI=94.5%, p<0.001) produced significant anti-tumor antitumor activity in dose or dose-frequency dependent manner.

BCY8255 at 3 mg/kg, qw (TV=310 mm$^3$, TGI=59.5%, p<0.01), 3 mg/kg, biw (TV=251 mm$^3$, TGI=74.3%, p<0.001) and 5 mg/kg, qw (TV=209 mm$^3$, TGI=85.1%, p<0.001) produced significant antitumor activity.

In this study, animals in all of 5 mg/kg qw groups lost over average 15% bodyweight, especially those in BCY8253 and BCY8255 5 mg/kg groups, which lost over 20% bodyweight during the treatment schedule.

In this cell line, which shows only moderate expression of Nectin-4 in FACS studies, tumor growth is restrained by BCY8245 but the tumor does not undergo regression.

Example 9.8: In Vivo Efficacy Study of Test Articles in Treatment of MDA-MB-468 Xenograft in Balb/c Nude Mice

1. Study Objective

The objective of the research is to evaluate the in vivo anti-tumor efficacy of BCY8245, BCY8781 and BCY8245 in combination with BCY8234 in treatment of MDA-MB-468 xenograft in Balb/c nude mice to determine the role target binding has to play in optimal efficacy.

2. Experimental Design

| Group | Treatment | Dose (mg/kg) | N | Dosing Route | Schedule |
|---|---|---|---|---|---|
| 1 | Vehicle | — | 4 | i.v. | Qw, 3 weeks |
| 2 | BCY8245 | 0.3 | 4 | i.v. | Qw, 3 weeks |
| 3 | BCY8245 | 1 | 4 | i.v. | Qw, 3 weeks |
| 4 | BCY8245 | 3 | 4 | i.v. | Qw, 3 weeks |
| 5 | BCY8781 | 0.3 | 4 | i.v. | Qw, 3 weeks |
| 6 | BCY8781 | 1 | 4 | i.v. | Qw, 3 weeks |
| 7 | BCY8781 | 3 | 4 | i.v. | Qw, 3 weeks |
| 8 | BCY8245 + BCY8234 | 1 + 300 | 4 | i.v. | Qw, 3 weeks |
| 9 | BCY8245 + BCY8234 | 3 + 300 | 4 | i.v. | Qw, 3 weeks |

Note:
N, the number of animals in each group.

3. Materials 3.1. Animals and Housing Condition
3.1.1. Animals
  Species: Mus Musculus
  Strain: Balb/c nude
  Age: 6-8 weeks
  Sex: female
  Body weight: 18-22 g
  Number of animals: 36 mice plus spare
3.1.2. Housing Condition
  The mice were kept in individual ventilation cages at constant temperature and humidity with 4 animals in each cage.
  Temperature: 20~26° C.
  Humidity 40-70%.
  Cages: Made of polycarbonate. The size is 300 mm×180 mm×150 mm. The bedding material is corn cob, which is changed twice per week.
  Diet: Animals had free access to irradiation sterilized dry granule food during the entire study period.
  Water: Animals had free access to sterile drinking water.
  Cage identification: The identification labels for each cage contained the following information: number of animals, sex, strain, the date received, treatment, study number, group number and the starting date of the treatment.
  Animal identification: Animals were marked by ear coding.

4. Experimental Methods and Procedures 4.1. Cell Culture
The tumor cells were maintained in Leibovitz's L-15 medium supplemented with 10% heat inactivated fetal bovine serum at 37° C. in an atmosphere of 0% $CO_2$ in air. The tumor cells were routinely subcultured twice weekly. The cells growing in an exponential growth phase were harvested and counted for tumor inoculation.

4.2. Tumor Inoculation
Each mouse was inoculated subcutaneously at the right flank with MDA-MB-468 tumor cells (10×10$^6$) in 0.2 ml of PBS supplemented with 50% matrigel for tumor development. 36 animals were randomized when the average tumor volume reached 186 mm$^3$. The test article administration and the animal numbers in each group were shown in the experimental design table.

4.3. Testing Article Formulation Preparation

| Test article | Purity | Conc. (mg/ml) | Formulation |
|---|---|---|---|
| Vehicle | — | — | 25 mM Histidine, pH 7 10% sucrose |
| BCY8245 | 99.4% | 1 | Dissolve 5.0 mg BCY8245 in 4.97 ml Histidine buffer[1] |
| | | 0.03 | Dilute 36 µl 1 mg/ml BCY8245 stock with 1164 µl Histidine buffer |
| | | 0.1 | Dilute 120 µl 1 mg/ml BCY8245 stock with 1080 µl Histidine buffer |
| | | 0.3 | Dilute 360 µl 1 mg/ml BCY8245 stock with 840 µl Histidine buffer |
| BCY8781 | 99.0% | 1 | Dissolve 2.5 mg BCY8781 in 49.5 µl DMSO, dilute with 2.426 ml Histidine buffer |
| | | 0.03 | Dilute 36 µl 1 mg/ml BCY8781 stock with 1164 µl Histidine buffer |

-continued

| Test article | Purity | Conc. (mg/ml) | Formulation |
|---|---|---|---|
| | | 0.1 | Dilute 120 µl 1 mg/ml BCY8781 stock with 1080 µl Histidine buffer |
| | | 0.3 | Dilute 360 µl 1 mg/ml BCY8781 stock with 840 µl Histidine buffer |
| BCY8234 | 98.10% | 30 | Dissolve 147 mg BCY8234 in 4.807 ml Histidine buffer |

[1] 25 mM Histidine pH 7 10% sucrose 4.4. Sample Collection

At the day 21 of study, the tumors of group 5, 6, 7, 8 and group 9 were collected for FFPE.

At the end of the study, the tumors of group 3 was collected for FFPE.

5. Results 5.1. Tumor Growth Curve

Figure 64:
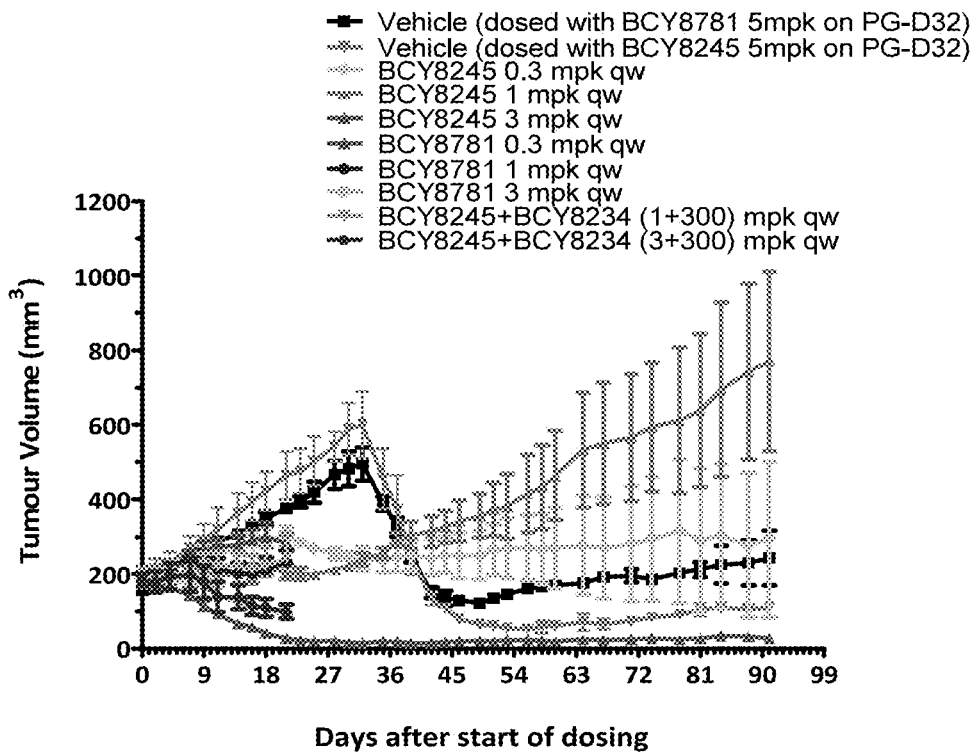
FIG. 64: Tumor volume traces after administering BCY8245, BCY8781 or BCY8245 in combination with BCY8234 to female Balb/c nude mice bearing MDA-MB-468 xenograft.

The tumor growth curve is shown in FIG. 64.

5.2. Tumor Volume Trace

Mean tumor volume over time in female Balb/c nude mice bearing MDA-MB-468 xenograft is shown in Tables 42 to 44.

5.3. Tumor Growth Inhibition Analysis

Tumor growth inhibition rate for test articles in the MDA-MB-468 xenograft model was calculated based on tumor volume measurements at day 21 after the start of the treatment.

6. Results Summary and Discussion

In this study, the therapeutic efficacy of test articles in the MDA-MB-468 xenograft model was evaluated. The measured tumor volumes of all treatment groups at various time points are shown in FIG. 64 and Tables 42 to 45.

The mean tumor size of vehicle treated mice reached 420 $mm^3$ on day 21. BCY8245 at 1 mg/kg, qw (TV=204 $mm^3$, TGI=92.1%, $p<0.001$), 3 mg/kg, qw (TV=27 $mm^3$, TGI=164.9%, $p<0.001$) produced significant anti-tumor activity in dose-dependent manner. BCY8245 at 0.3 mg/kg qw or biw did not show any anti-tumor activity.

BCY8781 at 0.3 mg/kg, qw (or biw) (TV=283 $mm^3$, TGI=58.3%, $p<0.05$), 1 mg/kg, qw (TV=232 $mm^3$, TGI=80.1%, $p<0.01$), 3 mg/kg, qw (TV=91 $mm^3$, TGI=139.4%, $p<0.001$) produced significant anti-tumor activity in dose-dependent manner.

BCY8245 at 1 mg/kg, qw and 3 mg/kg, qw in combination with BCY8234 (the toxin free cognate peptide) 300 mg/kg, qw produced significant anti-tumor activity (TV=242 $mm^3$, TGI=75.4%, $p<0.01$) produced significant anti-tumor activity. When comparing with BCY8245 alone, the anti-tumor activity of BCY8245 at 3 mg/kg was antagonized by BCY8234 at 300 mg/kg ($p<0.001$). This reduction in efficacy by the competing toxin-free peptide demonstrates the importance of target binding for optimal efficacy. The efficacy response seen with the non-binding BTC, BCY8781, was comparable to that seen with BCY8245 in the presence of excess toxin-free binding peptide. This again emphasises the advantages of target driven binding for optimal efficacy.

The vehicle group was split into two groups on day 32 and received a dose of 5 mg/kg BCY8781 or 5 mg/kg BCY8245 respectively, the tumors showed obvious tumor regression after the single dose.

During the following monitoring schedule, the mice treated with BCY8245 1 mg/kg qw showed obvious tumor relapse, while the mice treated with BCY8245 3 mg/kg qw didn't show any tumor relapse.

TABLE 42

Tumor volume trace over time (Day 0 to day 21)

| | | Days after the start of treatment | | | | | | | | | |
|---|---|---|---|---|---|---|---|---|---|---|---|
| Gr. | Treatment | 0 | 2 | 4 | 7 | 9 | 11 | 14 | 16 | 18 | 21 |
| 1 | Vehicle, qw | 182 ± 15 | 196 ± 18 | 217 ± 18 | 260 ± 15 | 283 ± 19 | 302 ± 26 | 335 ± 27 | 362 ± 28 | 386 ± 31 | 420 ± 37 |
| 2 | BCY8245 0.3 mpk, qw | 188 ± 21 | 189 ± 19 | 211 ± 21 | 235 ± 28 | 252 ± 25 | 253 ± 33 | 275 ± 26 | 277 ± 27 | 295 ± 26 | 300 ± 27 |
| 3 | BCY8245 1 mpk, qw | 185 ± 21 | 187 ± 22 | 183 ± 22 | 190 ± 28 | 205 ± 29 | 195 ± 27 | 201 ± 25 | 197 ± 22 | 218 ± 24 | 204 ± 19 |
| 4 | BCY8245 3 mpk, qw | 181 ± 14 | 171 ± 17 | 163 ± 10 | 141 ± 21 | 113 ± 16 | 92 ± 5 | 66 ± 4 | 58 ± 2 | 41 ± 2 | 27 ± 1 |
| 5 | BCY8781 0.3 mpk, qw | 184 ± 14 | 187 ± 12 | 204 ± 9 | 245 ± 17 | 262 ± 24 | 272 ± 21 | 277 ± 24 | 290 ± 29 | 297 ± 41 | 283 ± 23 |
| 6 | BCY8781 1 mpk, qw | 184 ± 12 | 175 ± 16 | 188 ± 21 | 206 ± 25 | 223 ± 26 | 213 ± 29 | 202 ± 31 | 200 ± 24 | 211 ± 34 | 232 ± 32 |
| 7 | BCY8781 3 mpk, qw | 184 ± 15 | 179 ± 17 | 180 ± 20 | 177 ± 27 | 170 ± 21 | 142 ± 21 | 124 ± 13 | 108 ± 12 | 107 ± 8 | 91 ± 7 |
| 8 | BCY8245 + BCY8234 1 + 300 mpk, qw | 184 ± 15 | 189 ± 22 | 194 ± 28 | 212 ± 30 | 221 ± 34 | 221 ± 39 | 223 ± 36 | 211 ± 38 | 221 ± 51 | 242 ± 67 |
| 9 | BCY8245 + BCY8234 3 + 300 mpk, qw | 184 ± 16 | 178 ± 57 | 193 ± 36 | 197 ± 46 | 179 ± 44 | 138 ± 41 | 137 ± 32 | 114 ± 24 | 110 ± 24 | 99 ± 18 |

TABLE 43

Tumor volume trace over time (Day 23 to day 32)

| | | Days after the start of treatment | | | | |
|---|---|---|---|---|---|---|
| Gr. | Treatment | 23 | 25 | 28 | 30 | 32 |
| 1 | Vehicle, qw | 434 ± 35 | 460 ± 38 | 504 ± 32 | 535 ± 46 | 548 ± 51 |
| 2 | BCY8245 0.3 mpk, qw | 284 ± 14 | 268 ± 10 | 254 ± 15 | 240 ± 21 | 241 ± 32 |
| 3 | BCY8245 1 mpk, qw | 200 ± 16 | 199 ± 13 | 210 ± 6 | 221 ± 14 | 239 ± 16 |
| 4 | BCY8245 3 mpk, qw | 22 ± 3 | 19 ± 3 | 20 ± 3 | 15 ± 2 | 15 ± 1 |

TABLE 44

Tumor volume trace over time (Day 35 to day 91)

| Days | Group 1, Vehicle, qw dosed with BCY8781 5 mpk on PG-D32 | Group 1, Vehicle, qw, dosed with BCY8245 5 mpk on PG-D32 | Group 2, BCY8245, 0.3 mpk, qw | Group 3 BCY8245, 1 mpk, qw | Group 4, BCY8245, 3 mpk, qw |
|---|---|---|---|---|---|
| 35 | 389 ± 19 | 455 ± 81 | 237 ± 33 | 255 ± 15 | 19 ± 2 |
| 37 | 326 ± 26 | 373 ± 92 | 246 ± 40 | 292 ± 19 | 16 ± 2 |
| 39 | 248 ± 18 | 247 ± 48 | 248 ± 37 | 304 ± 36 | 14 ± 1 |
| 42 | 149 ± 14 | 134 ± 18 | 245 ± 48 | 314 ± 42 | 14 ± 2 |
| 44 | 135 ± 20 | 108 ± 3 | 251 ± 48 | 327 ± 42 | 18 ± 4 |
| 46 | 129 ± 8 | 79 ± 3 | 248 ± 61 | 342 ± 55 | 19 ± 4 |
| 49 | 120 ± 1 | 63 ± 8 | 250 ± 65 | 356 ± 59 | 20 ± 4 |
| 51 | 134 ± 6 | 62 ± 5 | 264 ± 68 | 374 ± 71 | 18 ± 5 |
| 53 | 144 ± 2 | 53 ± 12 | 268 ± 81 | 381 ± 87 | 22 ± 4 |
| 56 | 161 ± 1 | 52 ± 13 | 271 ± 87 | 416 ± 104 | 21 ± 4 |
| 58 | 166 ± 7 | 58 ± 0 | 267 ± 95 | 433 ± 113 | 20 ± 5 |
| 60 | 169 ± 10 | 61 ± 7 | 270 ± 108 | 464 ± 119 | 18 ± 6 |
| 64 | 176 ± 10 | 71 ± 23 | 276 ± 132 | 532 ± 154 | 23 ± 6 |
| 67 | 191 ± 5 | 66 ± 14 | 269 ± 137 | 550 ± 162 | 23 ± 5 |
| 71 | 194 ± 18 | 73 ± 5 | 280 ± 155 | 565 ± 170 | 24 ± 7 |
| 74 | 186 ± 1 | 82 ± 4 | 295 ± 167 | 594 ± 173 | 27 ± 8 |
| 78 | 203 ± 11 | 90 ± 8 | 313 ± 194 | 612 ± 195 | 23 ± 6 |
| 81 | 212 ± 20 | 104 ± 17 | 291 ± 192 | 639 ± 206 | 27 ± 8 |
| 84 | 224 ± 51 | 110 ± 1 | 301 ± 194 | 695 ± 234 | 34 ± 7 |
| 88 | 230 ± 60 | 106 ± 7 | 277 ± 194 | 743 ± 236 | 32 ± 7 |
| 91 | 242 ± 75 | 110 ± 3 | 293 ± 209 | 771 ± 240 | 26 ± 6 |

TABLE 45

Tumor growth inhibition analysis

| Gr | Treatment | Tumor Volume (mm$^3$)$^a$ | T/C$^b$ (%) | TGI (%) | P value compared with vehicle | Combo compared With BCY8245 |
|---|---|---|---|---|---|---|
| 1 | Vehicle, qw | 420 ± 37 | — | — | — | — |
| 2 | BCY8245 0.3 mpk, qw | 300 ± 27 | 71.4 | 52.7 | p > 0.05 | |
| 3 | BCY8245 1 mpk, qw | 204 ± 19 | 48.6 | 92.1 | p < 0.001 | |
| 4 | BCY8245 3 mpk, qw | 27 ± 1 | 6.5 | 164.9 | p < 0.001 | |
| 5 | BCY8781 0.3 mpk, qw | 283 ± 23 | 67.4 | 58.3 | p < 0.05 | |
| 6 | BCY8781 1 mpk, qw | 232 ± 32 | 55.2 | 80.1 | p < 0.01 | |
| 7 | BCY8781 3 mpk, qw | 91 ± 7 | 21.6 | 139.4 | p < 0.001 | |
| 8 | BCY8245 + BCY8234 1 + 300 mpk, qw | 242 ± 67 | 57.8 | 75.4 | p < 0.01 | p > 0.05 |

TABLE 45-continued

| | | Tumor growth inhibition analysis | | | | |
|---|---|---|---|---|---|---|
| Gr | Treatment | Tumor Volume (mm³)[a] | T/C[b] (%) | TGI (%) | P value compared with vehicle | Combo compared With BCY8245 |
| 9 | BCY8245 + BCY8234 3 + 300 mpk, qw | 99 ± 18 | 23.5 | 135.9 | p < 0.001 | P < 0.001 |

[a]Mean ± SEM.
[b]Tumor Growth Inhibition is calculated by dividing the group average tumor volume for the treated group by the group average tumor volume for the control group (T/C).

Example 9.9: In Vivo Efficacy Study of Test Articles in Treatment of MDA-MB-468 Xenograft in Balb/c Nude Mice

1. Study Objective

The objective of the research is to evaluate the in vivo anti-tumor efficacy of BCY8245 alone or in combination with BCY8234 in treatment of MDA-MB-468 xenograft in Balb/c nude mice.

2. Experimental Design

| Group | Treatment | Dose (mg/kg) | N | Dosing Route | Schedule |
|---|---|---|---|---|---|
| 1 | Vehicle | — | 5 | i.v. | Qw, 3 |
| 2 | BCY8245 | 1 | 5 | i.v. | Qw, 3 |
| 3 | BCY8245 | 3 | 5 | i.v. | Qw, 3 |
| 4 | BCY8245 + BCY8234 | 3 + 300 = 300 | 5 | i.v. | Qw, 3 weeks |

Note:
N, the number of animals in each group.

3. Materials 3.1 Animals and Housing Condition
3.1.1. Animals
  Species: Mus Musculus
  Strain: Balb/c nude
  Age: 6-8 weeks
  Sex: female
  Body weight: 18-22 g
  Number of animals: 20 mice plus spare
3.1.2. Housing condition
  The mice were kept in individual ventilation cages at constant temperature and humidity with 5 animals in each cage.
  Temperature: 20~26° C.
  Humidity 40-70%.
  Cages: Made of polycarbonate. The size is 300 mm×180 mm×150 mm. The bedding material is corn cob, which is changed twice per week.
  Diet: Animals had free access to irradiation sterilized dry granule food during the entire study period.
  Water: Animals had free access to sterile drinking water.
  Cage identification: The identification labels for each cage contained the following information: number of animals, sex, strain, the date received, treatment, study number, group number and the starting date of the treatment.
  Animal identification: Animals were marked by ear coding.

4. Experimental Methods and Procedures 4.1 Cell Culture
  The tumor cells were maintained in Leibovitz's L-15 medium supplemented with 10% heat inactivated fetal bovine serum at 37° C. in an atmosphere of 0% $CO_2$ in air. The tumor cells were routinely subcultured twice weekly. The cells growing in an exponential growth phase were harvested and counted for tumor inoculation.
4.2. Tumor Inoculation
  Each mouse was inoculated subcutaneously at the right flank with MDA-MB-468 tumor cells ($10 \times 10^6$) in 0.2 ml of PBS supplemented with 50% matrigel for tumor development. 20 animals were randomized when the average tumor volume reached 464 mm³. The test article administration and the animal numbers in each group were shown in the experimental design table.
4.3. Testing Article Formulation Preparation

| Test article | Purity | Conc. (mg/ml) | Formulation |
|---|---|---|---|
| Vehicle | — | — | 25 mM Histidine pH 7 10% sucrose |
| BCY8245 | 99.7% | 1 | Dissolve 5.0 mg BCY8245 in 4.985 ml Histidine buffer[1] |
| | | 0.1 | Dilute 140 µl 1 mg/ml BCY8245 stock with 1260 µl Histidine buffer |
| | | 0.3 | Dilute 420 µl 1 mg/ml BCY8245 stock with 980 µl Histidine buffer |
| BCY8234 | 98.10% | 30 | Dissolve 147 mg BCY8234 in 4.807 ml Histidine buffer |

[1]25 mM Histidine pH 7 10% sucrose 4.4. Sample Collection
  At the end of the study, the tumors of group 3 was collected for FFPE.

Figure 65:
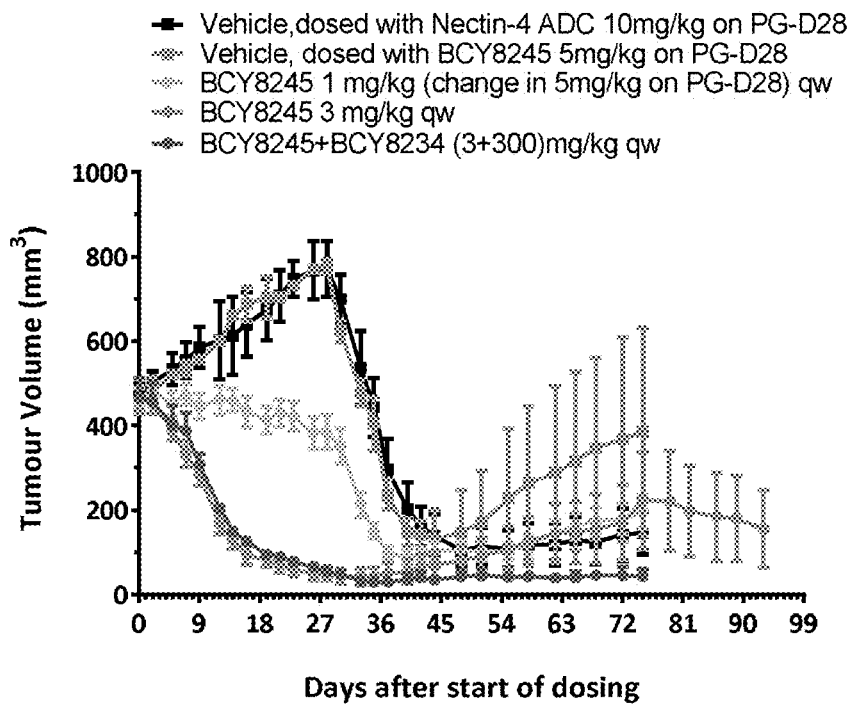
FIG. 65: Tumor volume traces after administering BCY8245 alone or BCY8245 in combination with BCY8234 to female Balb/c nude mice bearing MDA-MB-468 xenograft.

5. Results 5.1. Tumor Growth Curve
  The tumor growth curve is shown in FIG. 65.
5.2. Tumor Volume Trace
  Mean tumor volume over time in female Balb/c nude mice bearing MDA-MB-468 xenograft is shown in Tables 46 to 48.
5.3. Tumor Growth Inhibition Analysis
  Tumor growth inhibition rate for test articles in the MDA-MB-468 xenograft model was calculated based on tumor volume measurements at day 28 after the start of the treatment.

6. Results Summary and Discussion

In this study, the therapeutic efficacy of test articles in the MDA-MB-468 xenograft model was evaluated. The measured tumor volumes of all treatment groups at various time points is shown in FIG. 65 and Tables 46 to 49.

The initial tumor starting size was intentionally greater than that previously used to determine whether BCY8245 showed efficacy in this larger size. The mean tumor size of vehicle treated mice reached 773 mm³ on day 28. BCY8245 at 1 mg/kg, qw (TV=384 mm³, TGI=126.6%, p<0.001) and 3 mg/kg, qw (TV=50 mm³, TGI=234.6%, p<0.001) produced significant anti-tumor activity in dose dependent manner on day 28. Among them, the mice treated with BCY8245, 3 mg/kg qw showed some tumor relapse after ceasing the treatment, the further dosing from day 76 didn't work on complete tumor regression.

BCY8245 at 3 mg/kg, qw in combination with BCY8234 300 mg/kg, qw produced significant anti-tumor activity (TV=55 mm³, TGI=234.0%, p<0.001) on day 28, and the tumors didn't showed any relapse during the whole monitoring schedule.

The mice of vehicle group treated with 10 mg/kg Nectin-4 ADC or 5 mg/kg BCY8245 and the mice of group 2 (BCY8245, 1 mpk, qw) treated with 5 mg/kg BCY8245 on PG-D28 showed effective tumor regression in the following 3 weeks, after then, the tumors showed regrowth in the next 4 weeks when taken off drug.

BCY8245 was able to cause tumor regression in the tumors of approximately 450 mm³, but also when administered to the group previously receiving vehicle, in tumours with a starting volume of approximately 770 mm³.

TABLE 46

Tumor volume trace over time (Day 0 to day 28)

| | | Days after the start of treatment | | | | | | | | | | | | |
|---|---|---|---|---|---|---|---|---|---|---|---|---|---|---|
| Gr. | Treatment | 0 | 2 | 5 | 7 | 9 | 12 | 14 | 16 | 19 | 21 | 23 | 26 | 28 |
| 1 | Vehicle, qw | 466 ± 89 | 494 ± 94 | 529 ± 106 | 548 ± 109 | 574 ± 117 | 602 ± 130 | 632 ± 133 | 659 ± 129 | 686 ± 133 | 706 ± 145 | 741 ± 148 | 769 ± 157 | 773 ± 155 |
| 2 | BCY8245 1 mpk, qw | 466 ± 22 | 480 ± 24 | 453 ± 29 | 474 ± 25 | 446 ± 31 | 461 ± 34 | 460 ± 28 | 433 ± 37 | 412 ± 32 | 430 ± 32 | 421 ± 34 | 382 ± 37 | 384 ± 41 |
| 3 | BCY8245 3 mpk, qw | 464 ± 28 | 451 ± 24 | 388 ± 25 | 333 ± 30 | 284 ± 26 | 168 ± 24 | 129 ± 20 | 93 ± 23 | 83 ± 17 | 71 ± 19 | 60 ± 17 | 49 ± 17 | 50 ± 17 |
| 4 | BCY8245 + BCY8234 (3 + 300) mpk, qw | 467 ± 45 | 457 ± 46 | 401 ± 47 | 389 ± 42 | 309 ± 25 | 205 ± 9 | 150 ± 9 | 125 ± 5 | 95 ± 3 | 90 ± 5 | 78 ± 5 | 66 ± 4 | 55 ± 5 |

TABLE 47

Tumor volume trace over time (Day 30 to day 75)

| Days after the start of treatment | Group 1, Vehicle, dosed with 5 mpk BCY8781 on PG-D28 | Group1, Vehicle, dosed with 5 mpk BCY8245 on PG-D28 | Group 2, BCY8245, 1 mpk, change in 5 mpk on PG-D28 | Group3, BCY8245, 3 mpk, qw | Group 4, BCY8245 + BCY8234 3 + 300 mpk, qw |
|---|---|---|---|---|---|
| 30 | 700 ± 57 | 625 ± 27 | 351 ± 42 | 44 ± 18 | 49 ± 8 |
| 33 | 537 ± 88 | 477 ± 31 | 213 ± 29 | 43 ± 20 | 33 ± 10 |
| 35 | 443 ± 70 | 405 ± 65 | 151 ± 18 | 44 ± 20 | 31 ± 10 |
| 37 | 297 ± 71 | 237 ± 36 | 98 ± 16 | 50 ± 24 | 31 ± 10 |
| 40 | 203 ± 64 | 148 ± 33 | 89 ± 17 | 55 ± 29 | 36 ± 14 |
| 42 | 161 ± 47 | 142 ± 33 | 95 ± 16 | 66 ± 32 | 40 ± 13 |

TABLE 47-continued

Tumor volume trace over time (Day 30 to day 75)

| Days after the start of treatment | Group 1, Vehicle, dosed with 5 mpk BCY8781 on PG-D28 | Group1, Vehicle, dosed with 5 mpk BCY8245 on PG-D28 | Group 2, BCY8245, 1 mpk, change in 5 mpk on PG-D28 | Group3, BCY8245, 3 mpk, qw | Group 4, BCY8245 + BCY8234 3 + 300 mpk, qw |
|---|---|---|---|---|---|
| 44 | 139 ± 50 | 132 ± 69 | 103 ± 20 | 71 ± 33 | 35 ± 11 |
| 48 | 103 ± 35 | 146 ± 100 | 106 ± 21 | 80 ± 36 | 43 ± 14 |
| 51 | 114 ± 45 | 171 ± 122 | 103 ± 21 | 91 ± 43 | 45 ± 18 |
| 55 | 108 ± 44 | 227 ± 166 | 104 ± 20 | 108 ± 53 | 42 ± 13 |
| 56 | 119 ± 50 | 264 ± 182 | 120 ± 23 | 125 ± 58 | 43 ± 12 |
| 62 | 118 ± 50 | 288 ± 206 | 145 ± 29 | 146 ± 70 | 40 ± 12 |
| 65 | 129 ± 55 | 316 ± 212 | 163 ± 31 | 147 ± 74 | 41 ± 14 |
| 68 | 124 ± 51 | 347 ± 215 | 173 ± 32 | 155 ± 81 | 46 ± 13 |
| 72 | 142 ± 62 | 368 ± 242 | 180 ± 36 | 170 ± 89 | 45 ± 20 |
| 75 | 146 ± 50 | 385 ± 245 | 196 ± 40 | 223 ± 115 | 43 ± 19 |

TABLE 48

Tumor volume trace over time (Day 79 to day 103)

| | | Days after the start of treatment | | | | | | | |
|---|---|---|---|---|---|---|---|---|---|
| Gr. | Treatment | 79 | 82 | 86 | 89 | 93 | 96 | 100 | 103 |
| 3 | BCY8245 3 mpk, qw | 221 ± 118 | 198 ± 107 | 185 ± 105 | 180 ± 102 | 155 ± 91 | 166 ± 95 | 221 ± 119 | 250 ± 125 |

TABLE 49

Tumor growth inhibition analysis

| Gr | Treatment | Tumor Volume (mm³)[a] | T/C[b] (%) | TGI (%) | P value compared with vehicle |
|---|---|---|---|---|---|
| 1 | Vehicle, qw | 773 ± 155 | — | — | — |
| 2 | BCY8245 1 mpk, qw | 384 ± 41 | 49.7 | 126.6 | p < 0.001 |
| 3 | BCY8245 3 mpk, qw | 50 ± 17 | 6.4 | 234.6 | p < 0.001 |
| 4 | BCY8245 + BCY8234 3 + 300 mpk, qw | 55 ± 5 | 7.1 | 234.0 | p < 0.001 |

[a]Mean ± SEM.
[b]Tumor Growth Inhibition is calculated by dividing the group average tumor volume for the treated group by the group average tumor volume for the control group (T/C).

Example 10: In Vivo PK Studies

Figure 73:
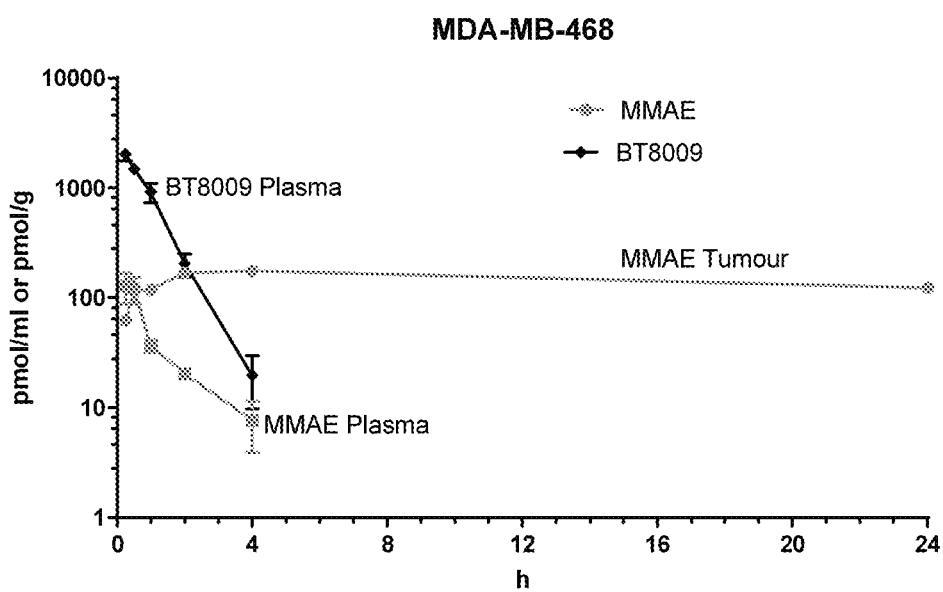
FIG. 73: MDA-MB-468 cells express Nectin-4 and show prolonged retention of MMAE in tumour.

MDA-MB-468 xenograft animals were injected with BCY8245 (BT8009) at 3 mg/kg. At various timepoints, animals were euthanized and plasma and tumour taken and snap frozen. Samples were analysed for MMAE. The plasma levels of BT8009 (BCY8245) are from historical PK studies. The concentrations of MMAE in plasma, MMAE in tumor, and BT8009 in plasma are shown in FIG. 73. MMAE was retained in the tumour longer than in plasma supporting the hypothesis that systemic exposure is significantly less than tumour exposure.

Example 11: HCS Assay

Figure 74:
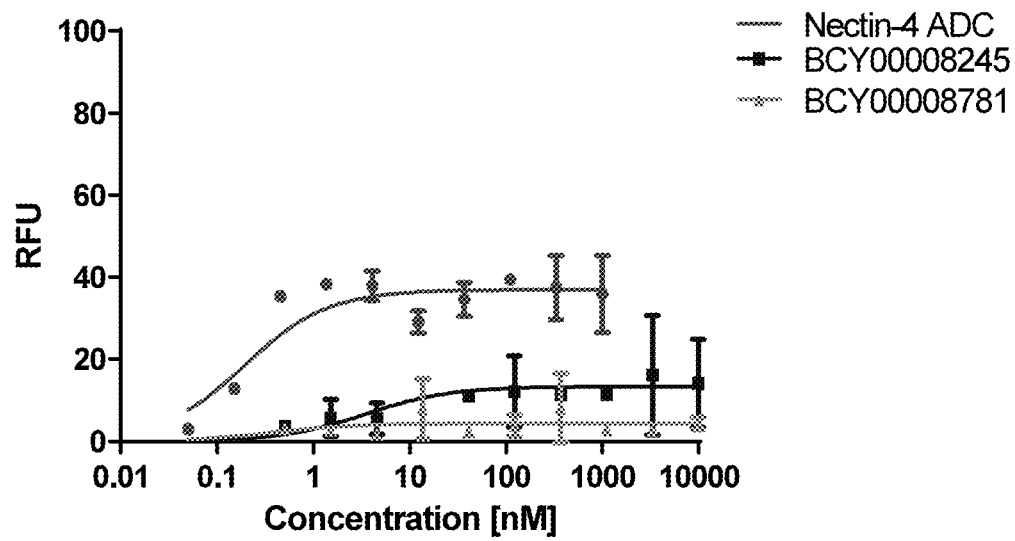
FIG. 74: HCS-Data analysis on MDA-MB-468 cell line.
Figure 74:
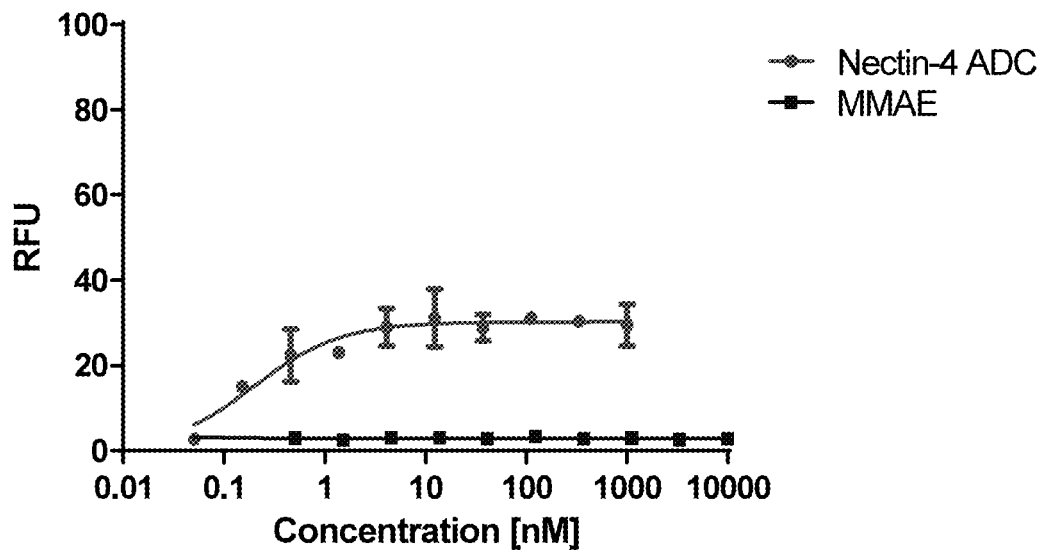

HCS assay was used in Nectin-4 BDC binding study. Cells were incubated with test agent and then washed. Detection was by a fluorescent antibody to MMAE. MDA-MB-468 cells show moderate Nectin-4 expression with 20000 cells giving the best images. NCI-H292 cells show low expression in this assay, detection of MMAE was poor even at 20000 cells. HCS Data on MDA-MB-468 cell line is shown in FIG. 74, and Table 50.

TABLE 50

| Test Item | Max fluorescent intensity | Kd (nM) | Historical Kd (nM) |
|---|---|---|---|
| Nectin-4 ADC | 33.63 | 0.2 | 0.28 ± 0.07 |
| BCY8245 | 13.34 | 3.52 | 5.18 |
| BCY8781 | 3.15 | >10000 | >10000 |
| MMAE | 2.95 | >10000 | >10000 |

Nectin-4 ADC and BCY8245 were retained on the cells and co-localised with a membrane stain. BCY8781 and MMAE showed minimal retention. Kd of all compounds on MDA-MB-468 cell line were consistent with historical data. The Nectin-4 ADC showed detectable binding affinity on MDA-MB-468 cell line. BCY8425 showed single digit nanomolar affinity with a Bmax lower than for the Nectin-4 ADC. This reduced maximum fluorescent intensity is because the Nectin-4 ADC has an MMAE to drug ration of 4 whereas BCY8245 has an MMAE to drug ratio of 1. BCY8781 showed only very weak binding affinity on MDA-MB-468 cell line whilst MMAE showed almost no detectable binding affinity on MDA-MB-468 cell line.

Example 12: In Vivo Efficacy of BCY8245 in Two PDX Models of Lung Cancer

Purpose

To evaluate the efficacy of BCY8245 in a PDX model of squamous cell non-small and adenocarcinoma (both non-small cell carcinomas).

Animals
 Species: Mus Musculus
 Strain: Balb/c nude
 Age: 6-8 weeks
 Sex: female
 Body weight: 18-22
Agents in Test
 BCY8245 and Nectin-4 ADC or BCY8781
Pre-Study Animals
 Each mouse was inoculated subcutaneously at the right flank with LU-01-0007 or LU-01-0412 tumor fragment (~30 mm$^3$) for tumor development. Animals were randomized when the average tumor volume reached 161 mm$^3$ (LU-01-0007) or 147 mm$^3$ (LU-01-0412)

In life Measurements and the Endpoints

Animals were checked daily for any effects of tumor growth and treatments on normal behavior such as mobility, food and water consumption (by looking only), body weight gain/loss, eye/hair matting and any other abnormal effect as stated in the protocol. Death and observed clinical signs were recorded on the basis of the numbers of animals within each subset.

The major endpoint was to see if the tumor growth could be delayed or mice could be cured. Tumor volume was measured three times weekly in two dimensions using a caliper, and the volume was expressed in mm$^3$ using the formula: V=0.5 a×b$^2$ where a and b are the long and short diameters of the tumor, respectively. The tumor size was then used for calculations of T/C value. The T/C value (in percent) is an indication of antitumor effectiveness; T and C are the mean volumes of the treated and control groups, respectively, on a given day. TGI was calculated for each group using the formula: TGI (%)=[1−(T$_i$−T$_0$)/(V$_i$−V$_0$)]×100; Tris the average tumor volume of a treatment group on a given day. T$_0$ is the average tumor volume of the treatment group on the day of treatment start, Vi is the average tumor volume of the vehicle control group on the same day with T$_i$, and V$_0$ is the average tumor volume of the vehicle group on the day of treatment start.

Figure 66:
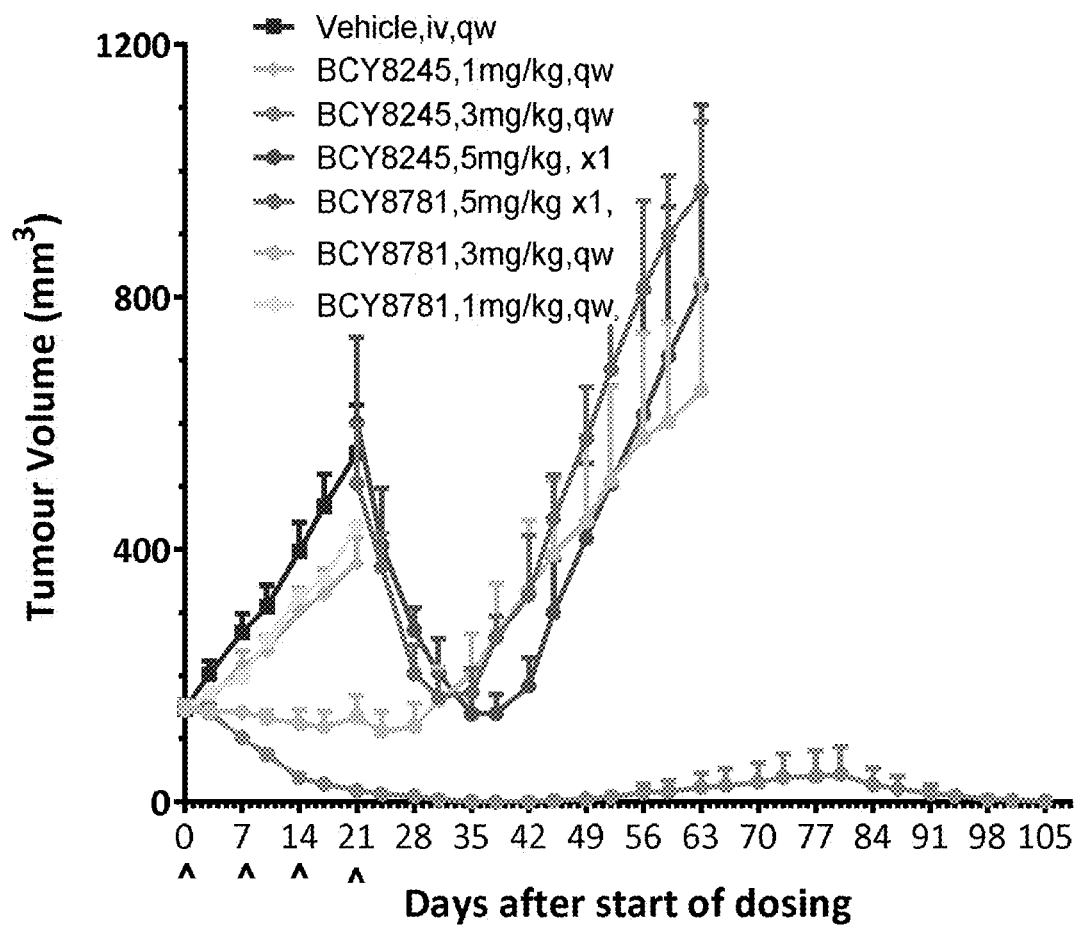
FIGS. 66-71: Tumor volume traces in Lu-01-0412, LU-01-0007, CTG-1771, CTG-1171, CTG-1106, and CTG-0896 PDX xenografts.
Figure 67:
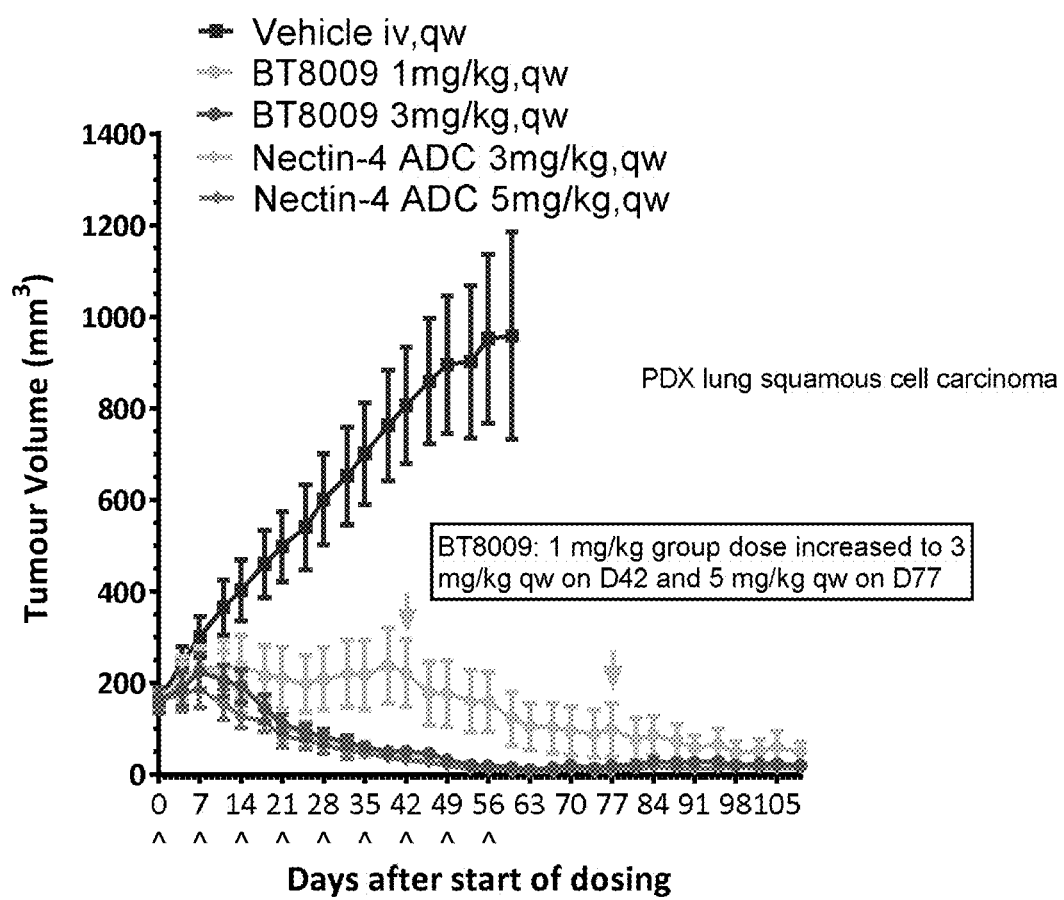
Figure 68:
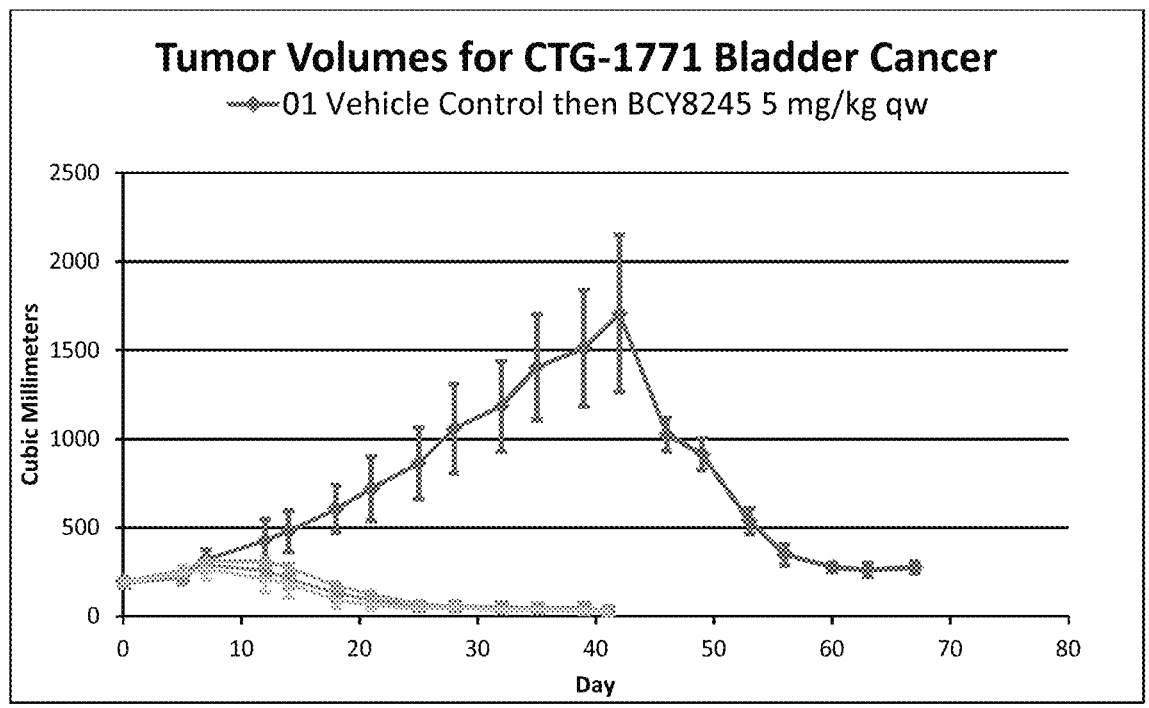
Figure 68:
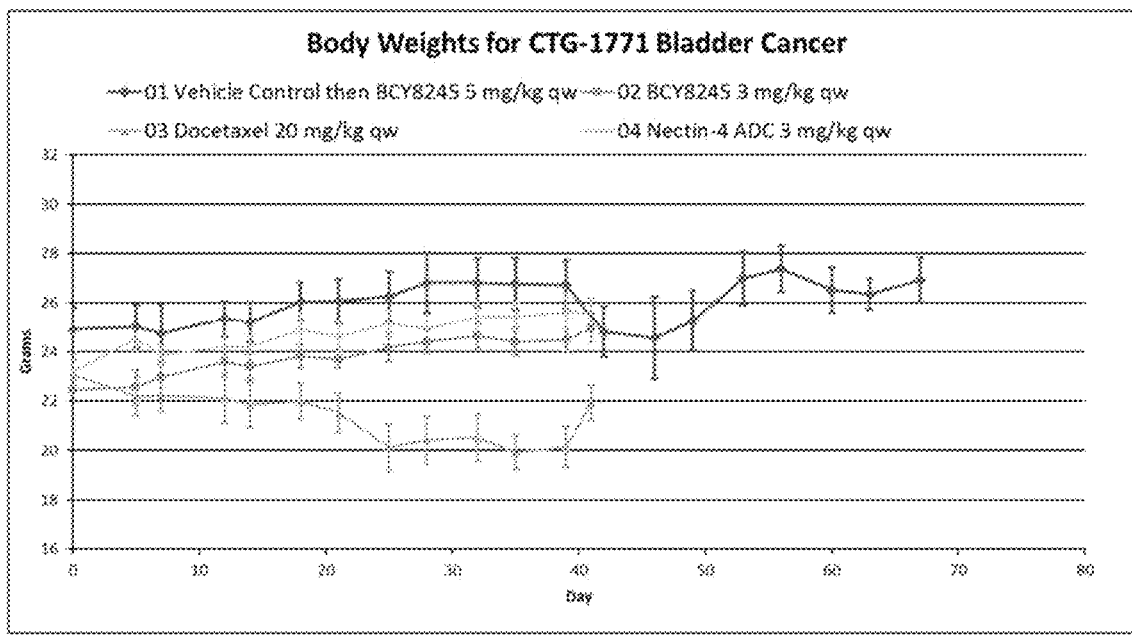
Figure 69:
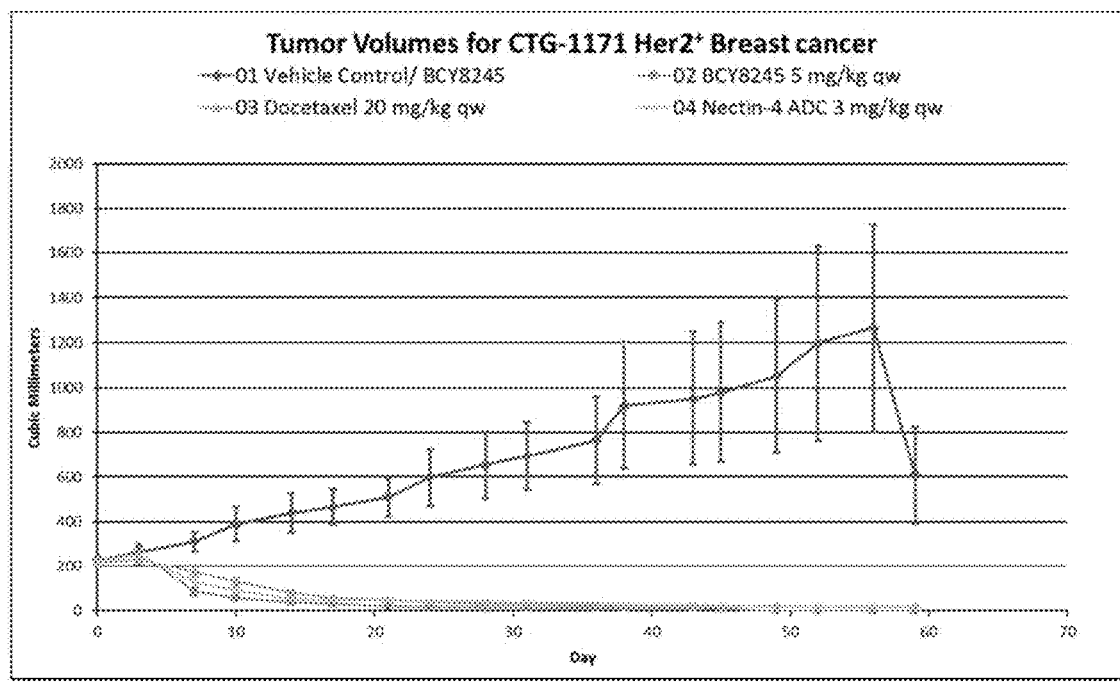
Figure 69:
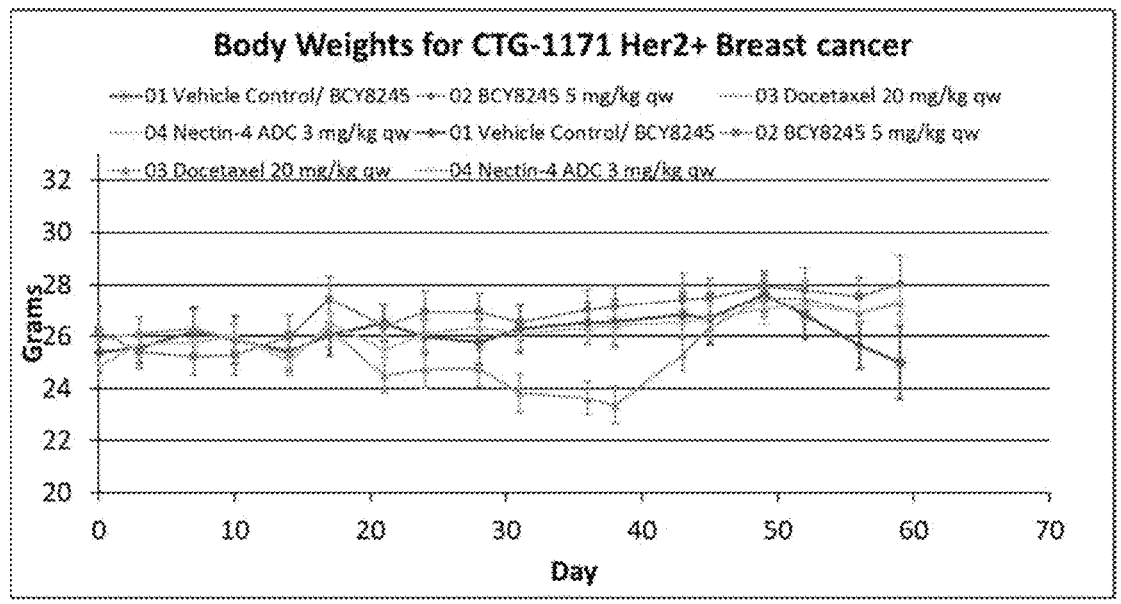
Figure 70:
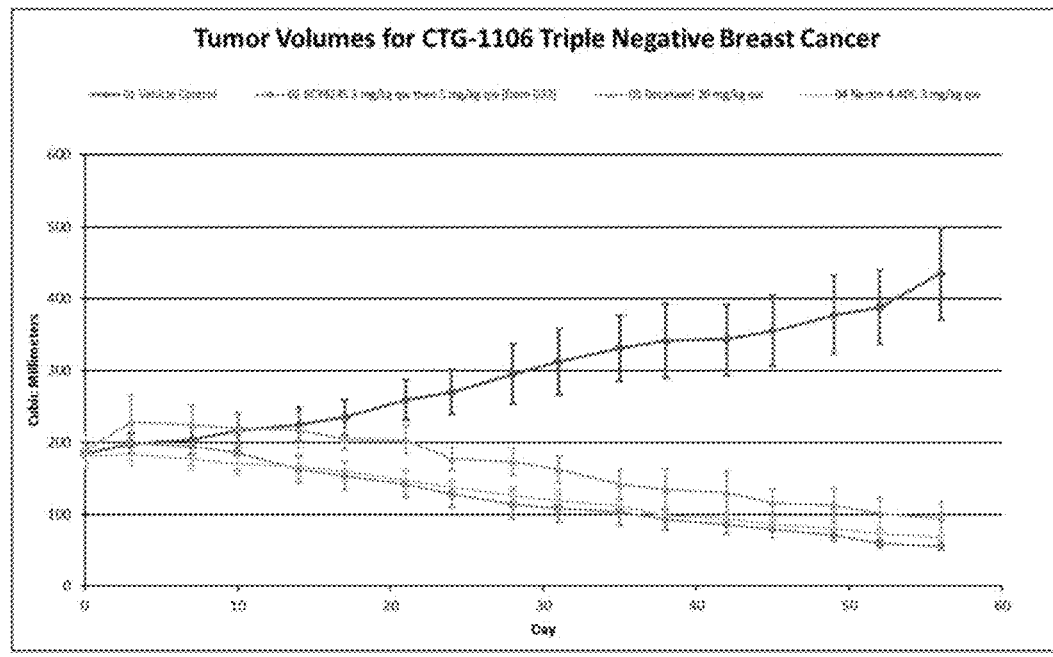
Figure 70:
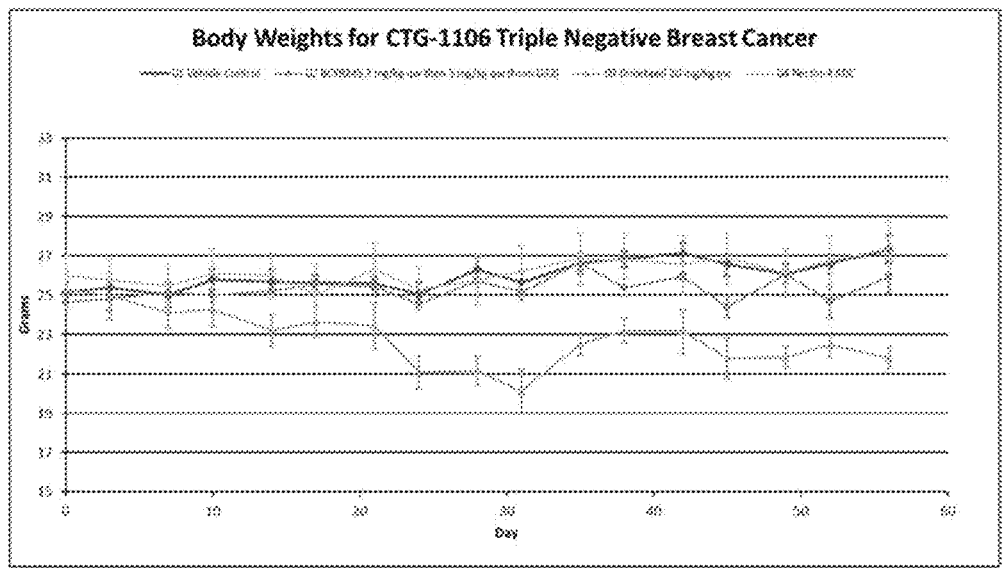
Figure 71:
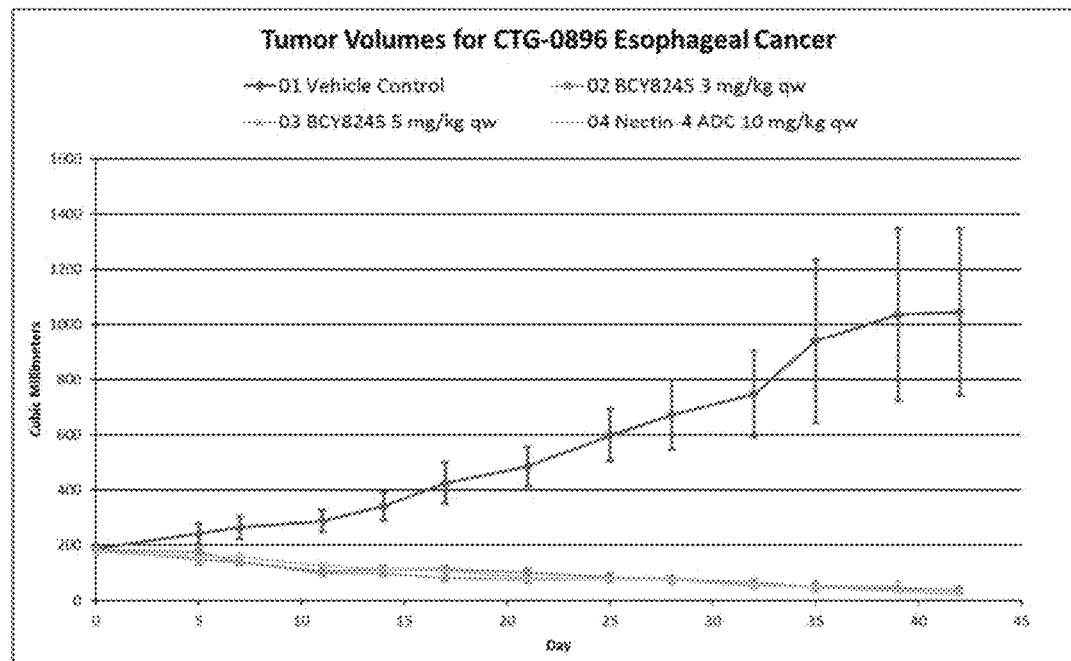
Figure 71:
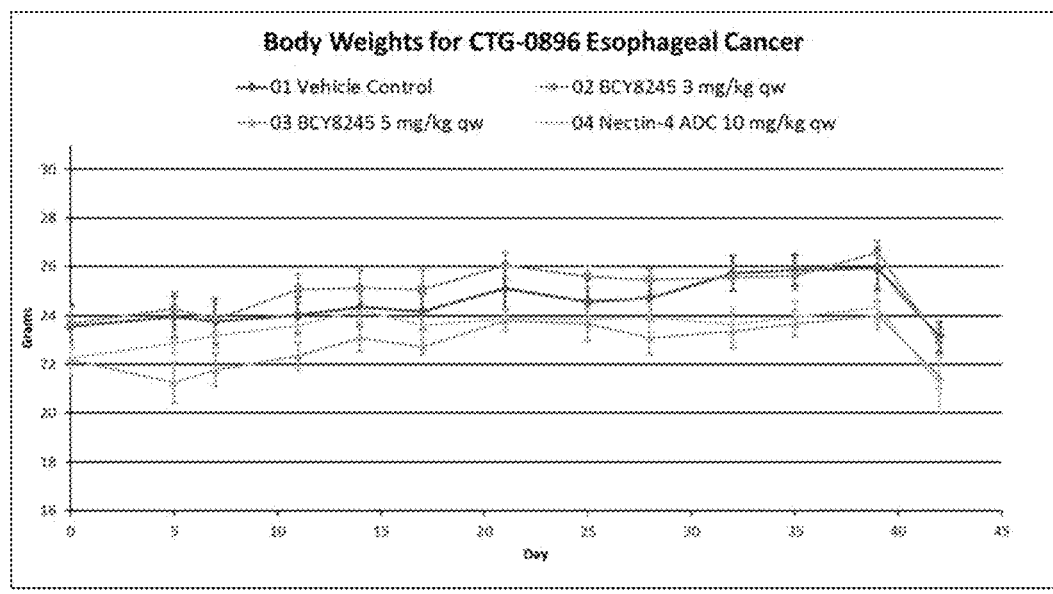
Figure 72:
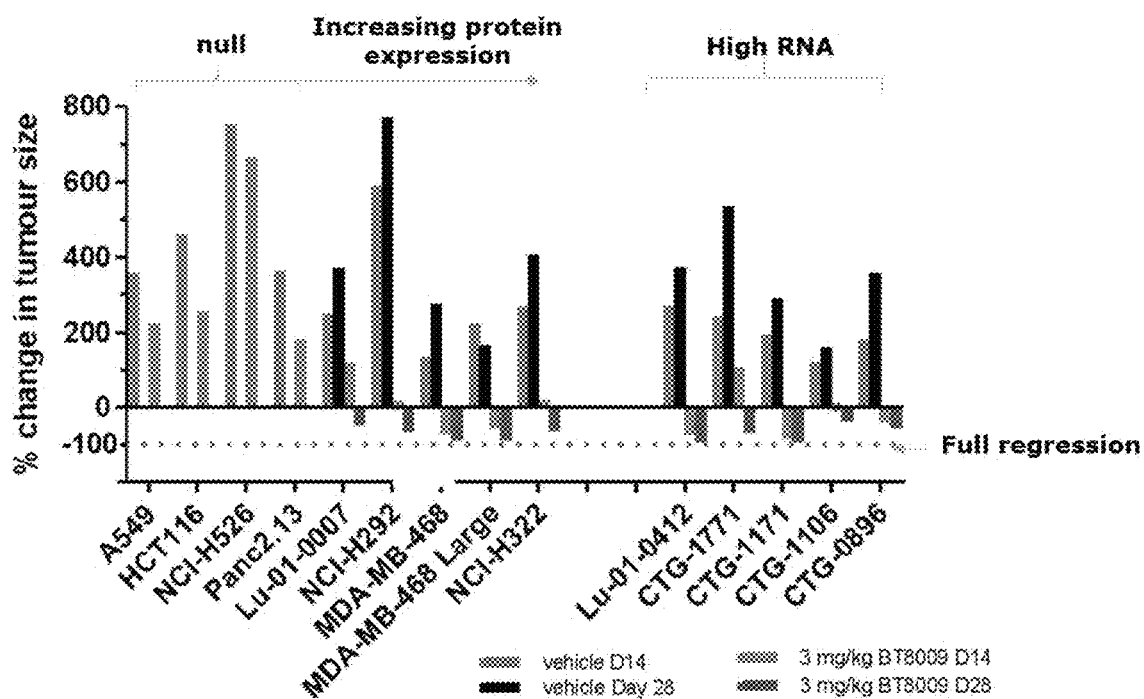
FIG. 72: BT8009 (i.e. BCY8245) efficacy correlates with expression CDX/PDX xenografts. Xenografts with little/no Nectin-4 expression show reduced tumour growth rate. Xenografts expressing Nectin-4 show regressions of tumour. Both PDX and CDX models are included in this analysis, values are collated from various reports.

The results of these studies are shown in FIGS. 66 and 67.

Lu-01-0412 (FIG. 66): BCY8245 produced a dose related efficacy in this PDX model with a reduction in tumour growth rate at 1 mg/kg qw but marked tumor regression at 3 mg/kg qw to baseline. After cessation of dosing (Day 21) 5/6 animals showed no tumour regrowth out to 105 days post study start. The single animal showing regrowth was responsive to 3 mg/kg BCY8245 and showed restored regression to baseline. BCY8781 the non-binding BDC produced stable disease at 3 mg/kg and on cessation of dosing tumor rapidly grew at the same rate as the vehicle treated group, emphasising the increased efficacy that Nectin-4 binding affords these agents. Large tumors (the vehicle treated group) regressed in response to a single dose of BCY8245 or BCY8781.

LU-01-0007 (FIG. 67): BCY8245 produced a dose related efficacy with 1 mg/kg qw producing stable disease and 3 mg/kg producing full regression. Dosing had to be maintained out to day 56 to attain full regression (when dosing was ceased). There was no tumor regrowth in this group out to beyond (the latter being maintained out to 126 days post study start). The Nectin-4 ADC gave a similar degree of efficacy. The 1 mg/kg stable disease group was responsive to increases in dosing (3 and 5 mg/kg) suggesting that low doses of BCY8245 do not lead to a development of resistance.

Example 13: In Vivo Evaluation of BCY8245 in Low Passage PDX Models of Human Breast, Esophageal and Bladder Cancer in Immunocompromised Mice Purpose To evaluate the antitumor activity of Bicycle Agent in Low Passage Champions TumorGraft Models of Human Breast, Esophageal, and Bladder Cancer in Immunocompromised mice.

Test System
 Species: Mouse
 Strain: Athymic Nude-Foxn1nu (Immune-compromised)

Source: Envigo: Indianapolis, Indiana
Gender: Female
Target age at initiation of dosing: At least 6-8 weeks of age
Target weight at initiation of dosing: At least 18 grams
Acclimation period: 3 days Experimental Design Pre-study Animals: When sufficient stock animals reach 1.0-1.5 cm$^3$, tumors will be harvested for re-implantation into pre-study animals. Pre-study animals will be implanted unilaterally on the left flank with tumor fragments harvested from stock animals. Each animal is implanted from a specific passage lot and documented.

Study Animals: Pre-study tumor volumes are recorded for each experiment beginning seven to ten days after implantation. When tumors reach an average tumor volume of 150-300 mm$^3$, animals will be matched by tumor volume into treatment or control groups to be used for dosing and dosing initiated on Day 0.

Agents in Test

BCY8245 and Nectin-4 Antibody Drug conjugate, comparison with vehicle control. Standard of care agent Docetaxel may be included. All agents to be dosed qw by intravenous route, doses are indicated on graphs.

In Life Measurements

Efficacy Tumor Volume: Tumor volumes will be taken twice weekly. A final tumor volume will be taken on the day study reaches endpoint. If possible, a final tumor volume will be taken if an animal is found moribund.

Efficacy Animal Weights: Animals will be weighed twice weekly. A final weight will be taken on the day the study reaches end point or if animal is found moribund, if possible. Animals exhibiting ≥10% weight loss when compared to Day 0 will be provided DietGel® ad libitum. Any animal exhibiting >20% net weight loss for a period lasting 7 days or if mice display >30% net weight loss when compared to Day 0 will be considered moribund and euthanized.

Data Analysis

Agent Toxicity: Beginning on Day 0, animals will be observed daily and weighed twice weekly using a digital scale; data including individual and mean gram weights (Mean We #SEM), mean percent weight change versus Day 0 (% vD0) will be recorded for each group and % vD0 plotted at study completion. Animal deaths will be recorded daily and designated as drug-related (D), technical (T), tumor related (B), or unknown (U) based on weight loss and gross observation; single agent or combination groups reporting a mean % vD0>20% and/or >10% mortality will be considered above the maximum tolerated dose (MTD) for that treatment on the evaluated regimen. Maximum mean % vD0 (weight nadir) for each treatment group is reported at study completion.

Agent Efficacy

Tumor Growth Inhibition-Beginning on Day 0, tumor dimensions are measured twice weekly by digital caliper and data including individual and mean estimated tumor volumes (Mean TV+SEM) recorded for each group; tumor volume is calculated using the formula (1): TV=width 2×length×0.52. At study completion, percent tumor growth inhibition (% TGI) values will be calculated and reported for each treatment group (T) versus control (C) using initial (i) and final (f) tumor measurements by the formula (2): % TGI=1-(Tf-Ti)/(Cf-Ci). Individual mice reporting a tumor volume ≤30% of the Day 0 measurement for two consecutive measurements will be considered partial responders (PR). Individual mice lacking palpable tumors (0.00 mm$^3$ for two consecutive measurements) will be classified as complete responders (CR); a CR that persists until study completion will be considered a tumor-free survivor (TFS). Tumor doubling time (DT) will be determined for the vehicle treated groups using the formula DT=(Df-Di)*log 2/(log TVf-log TVi) where D=Day and TV=Tumor Volume. All data collected in this study is managed electronically and stored on a redundant server system.

The results of these studies are shown in FIGS. 68 to 71.

BCY8245 was tested in four low passage PDX models representing bladder cancer (CTG-1771), an estrogen and progesterone negative Her2 positive breast cancer (CTG-1171) a triple negative breast cancer (CTG-1106) and an esophageal cancer (CTG-0896). In all of these models BCY8245 showed excellent efficacy evoking tumor regression and in three of the four full regression to baseline. Efficacy was comparable to the ADC in all cases and superior or equal to Docetaxel SOC. In all models BCY8245 was better tolerated than Docetaxel.

The invention claimed is:

1. A peptide ligand comprising a polypeptide comprising the amino acid sequence (SEQ ID NO: 218)
$C_i$-$X_6$-$X_7$-$X_8$-$C_{ii}$-$X_9$-$X_{10}$-$X_{11}$-$X_{12}$-$X_{13}$-$X_{14}$-$X_{15}$-$X_{16}$-$X_{17}$-$C_{iii}$;

or pharmaceutically acceptable salt thereof,
and a molecular scaffold covalently bound to the polypeptide at amino acids $C_i$, $C_{ii}$, and $C_{iii}$;
wherein each of $C_i$, $C_{ii}$ and $C_{iii}$ is independently cysteine or an amino acid isosteric and isoelectronic with cysteine;
$X_6$ represents Pro;
$X_7$ represents 1-naphthylalanine (1-Nal);
$X_8$ represents D-Asp;
$X_9$ represents Met;
$X_{10}$ represents homoarginine (HArg);
$X_{11}$ represents Asp;
$X_{12}$ represents Trp;
$X_{13}$ represents Ser;
$X_{14}$ represents Thr;
$X_{15}$ represents Pro;
$X_{16}$ represents hydroxyproline (HyP); and
$X_{17}$ represents Trp.

2. The peptide ligand of claim 1, comprising a N-terminal spacer group.

3. The peptide ligand of claim 1, comprising a C-terminal amide group.

4. The peptide ligand of claim 1, wherein the polypeptide is cyclised with the molecular scaffold such that at least two polypeptide loops are formed on the molecular scaffold, and wherein the molecular scaffold is 1,1',1"-(1,3,5-triazinane-1,3,5-triyl)triprop-2-en-1-one (TATA).

5. The peptide ligand of claim 1, wherein the peptide ligand is a free acid or a sodium, potassium, calcium, or ammonium salt.

6. A drug conjugate comprising the peptide ligand of claim 1, conjugated to one or more cytotoxic agents.

7. The drug conjugate of claim 6, wherein said one or more cytotoxic agents are independently selected from MMAE and DM1.

8. The drug conjugate of claim 7, comprising a linker between said one or more cytotoxic agent and said peptide ligand.

9. The drug conjugate of claim 8, wherein the linker comprises-PABC-Cit-Val-Glutaryl- or -PABC-cyclobutyl-Ala-Cit-βAla-.

10. The drug conjugate of claim 9, wherein said one or more cytotoxic agent is MMAE and the linker comprises-PABC-Cit-Val-Glutaryl-.

11. A drug conjugate comprising
a peptide ligand comprising a polypeptide cyclised with a molecular scaffold such that at least two polypeptide loops are formed on the molecular scaffold, wherein the molecular scaffold is 1,1',1"-(1,3,5-triazinane-1,3,5-triyl)triprop-2-en-1-one (TATA);
wherein the polypeptide comprises the amino acid sequence (SEQ ID NO: 218)
$C_i$-$X_6$-$X_7$-$X_8$-$C_{ii}$-$X_9$-$X_{10}$-$X_{11}$-$X_{12}$-$X_{13}$-$X_{14}$-$X_{15}$-$X_{16}$-$X_{17}$-$C_{iii}$;

the molecular scaffold being covalently bound to the polypeptide at amino acids $C_i$, $C_{ii}$, and $C_{iii}$;
each of $C_i$, $C_{ii}$ and $C_{iii}$ being independently cysteine or an amino acid isosteric and isoelectronic with cysteine;
$X_6$ represents Pro;
$X_7$ represents 1-naphthylalanine (1-Nal);
$X_8$ represents D-Asp;
$X_9$ represents Met;
$X_{10}$ represents homoarginine (HArg);
$X_{11}$ represents Asp;
$X_{12}$ represents Trp;
$X_{13}$ represents Ser;
$X_{14}$ represents Thr;
$X_{15}$ represents Pro;
$X_{16}$ represents hydroxyproline (HyP);
$X_{17}$ represents Trp;
the peptide ligand comprising a N-terminal spacer group; and
the peptide ligand being conjugated via a linker to a cytotoxic agent; wherein the cytotoxic agent is MMAE and the linker is -PABC-Cit-Val-Glutaryl-;
or a pharmaceutically acceptable salt thereof.

* * * * *

SEQUENCE LISTING

```
Sequence total quantity: 218
SEQ ID NO: 1           moltype = AA  length = 15
FEATURE                Location/Qualifiers
REGION                 1..15
                       note = synthetic
source                 1..15
                       mol_type = protein
                       organism = synthetic construct
SEQUENCE: 1
CPFGCMKNWS WPIWC                                                     15

SEQ ID NO: 2           moltype = AA  length = 15
FEATURE                Location/Qualifiers
REGION                 1..15
                       note = synthetic
source                 1..15
                       mol_type = protein
                       organism = synthetic construct
SEQUENCE: 2
CPFGCMRNWS WPIWC                                                     15

SEQ ID NO: 3           moltype = AA  length = 15
FEATURE                Location/Qualifiers
REGION                 1..15
```

```
                          note = synthetic
MOD_RES                   6
                          note = neopentyl  glycine
source                    1..15
                          mol_type = protein
                          organism = synthetic construct
SEQUENCE: 3
CPFGCXKNWS WPIWC                                                             15

SEQ ID NO: 4              moltype = AA  length = 15
FEATURE                   Location/Qualifiers
REGION                    1..15
                          note = synthetic
MOD_RES                   6
                          note = homoleucine
source                    1..15
                          mol_type = protein
                          organism = synthetic construct
SEQUENCE: 4
CPFGCXKNWS WPIWC                                                             15

SEQ ID NO: 5              moltype = AA  length = 15
FEATURE                   Location/Qualifiers
REGION                    1..15
                          note = synthetic
source                    1..15
                          mol_type = protein
                          organism = synthetic construct
SEQUENCE: 5
CPFGCIKNWS WPIWC                                                             15

SEQ ID NO: 6              moltype = AA  length = 15
FEATURE                   Location/Qualifiers
REGION                    1..15
                          note = synthetic
source                    1..15
                          mol_type = protein
                          organism = synthetic construct
SEQUENCE: 6
CPFACMKNWS WPIWC                                                             15

SEQ ID NO: 7              moltype = AA  length = 15
FEATURE                   Location/Qualifiers
REGION                    1..15
                          note = synthetic
source                    1..15
                          mol_type = protein
                          organism = synthetic construct
SEQUENCE: 7
CPFGCQKNWS WPIWC                                                             15

SEQ ID NO: 8              moltype = AA  length = 15
FEATURE                   Location/Qualifiers
REGION                    1..15
                          note = synthetic
source                    1..15
                          mol_type = protein
                          organism = synthetic construct
SEQUENCE: 8
CPFGCMKNWS DPIWC                                                             15

SEQ ID NO: 9              moltype = AA  length = 15
FEATURE                   Location/Qualifiers
REGION                    1..15
                          note = synthetic
MOD_RES                   14
                          note = 1-naphthyl alanine
source                    1..15
                          mol_type = protein
                          organism = synthetic construct
SEQUENCE: 9
CPFGCMKNWS WPIXC                                                             15

SEQ ID NO: 10             moltype = AA  length = 15
FEATURE                   Location/Qualifiers
REGION                    1..15
                          note = synthetic
MOD_RES                   2
                          note = hydroxyproline
```

```
source                      1..15
                            mol_type = protein
                            organism = synthetic construct
SEQUENCE: 10
CXFGCMKNWS WPIWC                                                              15

SEQ ID NO: 11               moltype = AA  length = 15
FEATURE                     Location/Qualifiers
REGION                      1..15
                            note = synthetic
source                      1..15
                            mol_type = protein
                            organism = synthetic construct
SEQUENCE: 11
CPYGCMKNWS WPIWC                                                              15

SEQ ID NO: 12               moltype = AA  length = 15
FEATURE                     Location/Qualifiers
REGION                      1..15
                            note = synthetic
source                      1..15
                            mol_type = protein
                            organism = synthetic construct
SEQUENCE: 12
CPFGCMSNWS WPIWC                                                              15

SEQ ID NO: 13               moltype = AA  length = 15
FEATURE                     Location/Qualifiers
REGION                      1..15
                            note = synthetic
source                      1..15
                            mol_type = protein
                            organism = synthetic construct
SEQUENCE: 13
CPFGCMDNWS WPIWC                                                              15

SEQ ID NO: 14               moltype = AA  length = 15
FEATURE                     Location/Qualifiers
REGION                      1..15
                            note = synthetic
MOD_RES                     7
                            note = homoarginine
source                      1..15
                            mol_type = protein
                            organism = synthetic construct
SEQUENCE: 14
CPFGCMXNWS WPIWC                                                              15

SEQ ID NO: 15               moltype = AA  length = 15
FEATURE                     Location/Qualifiers
REGION                      1..15
                            note = synthetic
source                      1..15
                            mol_type = protein
                            organism = synthetic construct
SEQUENCE: 15
CPFGCMKDWS WPIWC                                                              15

SEQ ID NO: 16               moltype = AA  length = 15
FEATURE                     Location/Qualifiers
REGION                      1..15
                            note = synthetic
source                      1..15
                            mol_type = protein
                            organism = synthetic construct
SEQUENCE: 16
CPFGCMKHWS WPIWC                                                              15

SEQ ID NO: 17               moltype = AA  length = 15
FEATURE                     Location/Qualifiers
REGION                      1..15
                            note = synthetic
MOD_RES                     9
                            note = 1-naphthyl alanine
source                      1..15
                            mol_type = protein
                            organism = synthetic construct
SEQUENCE: 17
CPFGCMKNXS WPIWC                                                              15
```

```
SEQ ID NO: 18            moltype = AA   length = 15
FEATURE                  Location/Qualifiers
REGION                   1..15
                         note = synthetic
MOD_RES                  9
                         note = 2-naphthyl alanine
source                   1..15
                         mol_type = protein
                         organism = synthetic construct
SEQUENCE: 18
CPFGCMKNXS WPIWC                                                             15

SEQ ID NO: 19            moltype = AA   length = 15
FEATURE                  Location/Qualifiers
REGION                   1..15
                         note = synthetic
source                   1..15
                         mol_type = protein
                         organism = synthetic construct
SEQUENCE: 19
CPFGCMKNWS TPIWC                                                             15

SEQ ID NO: 20            moltype = AA   length = 15
FEATURE                  Location/Qualifiers
REGION                   1..15
                         note = synthetic
source                   1..15
                         mol_type = protein
                         organism = synthetic construct
SEQUENCE: 20
CPFGCMKNWS WPDWC                                                             15

SEQ ID NO: 21            moltype = AA   length = 15
FEATURE                  Location/Qualifiers
REGION                   1..15
                         note = synthetic
MOD_RES                  14
                         note = 2-naphthyl alanine
source                   1..15
                         mol_type = protein
                         organism = synthetic construct
SEQUENCE: 21
CPFGCMKNWS WPIXC                                                             15

SEQ ID NO: 22            moltype = AA   length = 15
FEATURE                  Location/Qualifiers
REGION                   1..15
                         note = synthetic
MOD_RES                  7
                         note = homoarginine
source                   1..15
                         mol_type = protein
                         organism = synthetic construct
SEQUENCE: 22
CPFGCMXNWS WPIWC                                                             15

SEQ ID NO: 23            moltype = AA   length = 15
FEATURE                  Location/Qualifiers
REGION                   1..15
                         note = synthetic
MOD_RES                  7
                         note = K(Ac) (N-acetyllysine)
source                   1..15
                         mol_type = protein
                         organism = synthetic construct
SEQUENCE: 23
CPFGCMXNWS WPIWC                                                             15

SEQ ID NO: 24            moltype = AA   length = 15
FEATURE                  Location/Qualifiers
REGION                   1..15
                         note = synthetic
source                   1..15
                         mol_type = protein
                         organism = synthetic construct
SEQUENCE: 24
CPFGCMKNWS APIWC                                                             15
```

```
SEQ ID NO: 25           moltype = AA   length = 15
FEATURE                 Location/Qualifiers
REGION                  1..15
                        note = synthetic
source                  1..15
                        mol_type = protein
                        organism = synthetic construct
SEQUENCE: 25
CPFGCMKNWS WPAWC                                                            15

SEQ ID NO: 26           moltype = AA   length = 15
FEATURE                 Location/Qualifiers
REGION                  1..15
                        note = synthetic
source                  1..15
                        mol_type = protein
                        organism = synthetic construct
SEQUENCE: 26
CAFGCMKNWS WPIWC                                                            15

SEQ ID NO: 27           moltype = AA   length = 15
FEATURE                 Location/Qualifiers
REGION                  1..15
                        note = synthetic
source                  1..15
                        mol_type = protein
                        organism = synthetic construct
SEQUENCE: 27
CPFGCMANWS WPIWC                                                            15

SEQ ID NO: 28           moltype = AA   length = 15
FEATURE                 Location/Qualifiers
REGION                  1..15
                        note = synthetic
source                  1..15
                        mol_type = protein
                        organism = synthetic construct
SEQUENCE: 28
CPFGCMKAWS WPIWC                                                            15

SEQ ID NO: 29           moltype = AA   length = 15
FEATURE                 Location/Qualifiers
REGION                  1..15
                        note = synthetic
MOD_RES                 6
                        note = Nle
source                  1..15
                        mol_type = protein
                        organism = synthetic construct
SEQUENCE: 29
CPFGCXKNWS WPIWC                                                            15

SEQ ID NO: 30           moltype = AA   length = 15
FEATURE                 Location/Qualifiers
REGION                  1..15
                        note = synthetic
source                  1..15
                        mol_type = protein
                        organism = synthetic construct
SEQUENCE: 30
CPFGCMKNWA WPIWC                                                            15

SEQ ID NO: 31           moltype = AA   length = 13
FEATURE                 Location/Qualifiers
REGION                  1..13
                        note = synthetic
source                  1..13
                        mol_type = protein
                        organism = synthetic construct
SEQUENCE: 31
CWPLDSYWCA RIC                                                              13

SEQ ID NO: 32           moltype = AA   length = 13
FEATURE                 Location/Qualifiers
REGION                  1..13
                        note = synthetic
source                  1..13
                        mol_type = protein
                        organism = synthetic construct
```

```
SEQUENCE: 32
CAPLDDYWCG RIC                                                          13

SEQ ID NO: 33           moltype = AA  length = 13
FEATURE                 Location/Qualifiers
REGION                  1..13
                        note = synthetic
source                  1..13
                        mol_type = protein
                        organism = synthetic construct
SEQUENCE: 33
CAPLDDYWCD RIC                                                          13

SEQ ID NO: 34           moltype = AA  length = 13
FEATURE                 Location/Qualifiers
REGION                  1..13
                        note = synthetic
source                  1..13
                        mol_type = protein
                        organism = synthetic construct
SEQUENCE: 34
CAPLSDYWCN RIC                                                          13

SEQ ID NO: 35           moltype = AA  length = 15
FEATURE                 Location/Qualifiers
REGION                  1..15
                        note = synthetic
source                  1..15
                        mol_type = protein
                        organism = synthetic construct
SEQUENCE: 35
CVTTSYDCFL HLLGC                                                        15

SEQ ID NO: 36           moltype = AA  length = 15
FEATURE                 Location/Qualifiers
REGION                  1..15
                        note = synthetic
source                  1..15
                        mol_type = protein
                        organism = synthetic construct
SEQUENCE: 36
CVTTSYDCWV RLGQC                                                        15

SEQ ID NO: 37           moltype = AA  length = 15
FEATURE                 Location/Qualifiers
REGION                  1..15
                        note = synthetic
source                  1..15
                        mol_type = protein
                        organism = synthetic construct
SEQUENCE: 37
CVTTSYDCWV TLGHC                                                        15

SEQ ID NO: 38           moltype = AA  length = 15
FEATURE                 Location/Qualifiers
REGION                  1..15
                        note = synthetic
VARIANT                 2
                        note = P/A/Hyp
VARIANT                 3
                        note = F/Y
VARIANT                 4
                        note = G/A
VARIANT                 6..8
                        note = any amino acid
VARIANT                 9
                        note = W/1-Nal/2-Nal
VARIANT                 10
                        note = S/A
VARIANT                 11
                        note = any amino acid
VARIANT                 13
                        note = I/D/A
VARIANT                 14
                        note = W/1-Nal/2-Nal
source                  1..15
                        mol_type = protein
                        organism = synthetic construct
SEQUENCE: 38
```

```
CXXXCXXXXX XPXXC                                                          15

SEQ ID NO: 39           moltype = AA  length = 13
FEATURE                 Location/Qualifiers
REGION                  1..13
                        note = synthetic
VARIANT                 2
                        note = W/A
VARIANT                 5
                        note = D/S
VARIANT                 6
                        note = S/D
VARIANT                 10
                        note = any amino acid
source                  1..13
                        mol_type = protein
                        organism = synthetic construct
SEQUENCE: 39
CXPLXXYWCX RIC                                                            13

SEQ ID NO: 40           moltype = AA  length = 15
FEATURE                 Location/Qualifiers
REGION                  1..15
                        note = synthetic
VARIANT                 9
                        note = F/W
VARIANT                 10
                        note = L/V
VARIANT                 11
                        note = H/R/T
VARIANT                 13
                        note = L/G
VARIANT                 14
                        note = G/Q/H
source                  1..15
                        mol_type = protein
                        organism = synthetic construct
SEQUENCE: 40
CVTTSYDCXX XLXXC                                                          15

SEQ ID NO: 41           moltype =   length =
SEQUENCE: 41
000

SEQ ID NO: 42           moltype = AA  length = 13
FEATURE                 Location/Qualifiers
REGION                  1..13
                        note = synthetic
VARIANT                 2
                        note = W/A/Y
VARIANT                 3
                        note = P/A
VARIANT                 5
                        note = D/S/A
VARIANT                 6
                        note = S/D/P/A
VARIANT                 8
                        note = W/1-Nal
VARIANT                 10
                        note = any amino acid
VARIANT                 11
                        note = R/HArg/A
source                  1..13
                        mol_type = protein
                        organism = synthetic construct
SEQUENCE: 42
CXXLXXYXCX XIC                                                            13

SEQ ID NO: 43           moltype = AA  length = 13
FEATURE                 Location/Qualifiers
REGION                  1..13
                        note = synthetic
source                  1..13
                        mol_type = protein
                        organism = synthetic construct
SEQUENCE: 43
CWPLDPYWCG RIC                                                            13

SEQ ID NO: 44           moltype = AA  length = 13
```

```
FEATURE               Location/Qualifiers
REGION                1..13
                      note = synthetic
source                1..13
                      mol_type = protein
                      organism = synthetic construct
SEQUENCE: 44
CYPLSPYWCE RIC                                                                  13

SEQ ID NO: 45         moltype = AA  length = 15
FEATURE               Location/Qualifiers
REGION                1..15
                      note = synthetic
source                1..15
                      mol_type = protein
                      organism = synthetic construct
SEQUENCE: 45
CPFGCMETWS WPIWC                                                                15

SEQ ID NO: 46         moltype = AA  length = 15
FEATURE               Location/Qualifiers
REGION                1..15
                      note = synthetic
source                1..15
                      mol_type = protein
                      organism = synthetic construct
SEQUENCE: 46
CPFGCMRGWS WPIWC                                                                15

SEQ ID NO: 47         moltype = AA  length = 15
FEATURE               Location/Qualifiers
REGION                1..15
                      note = synthetic
source                1..15
                      mol_type = protein
                      organism = synthetic construct
SEQUENCE: 47
CPFGCMSGWS WPIWC                                                                15

SEQ ID NO: 48         moltype = AA  length = 15
FEATURE               Location/Qualifiers
REGION                1..15
                      note = synthetic
source                1..15
                      mol_type = protein
                      organism = synthetic construct
SEQUENCE: 48
CPFGCMEGWS WPIWC                                                                15

SEQ ID NO: 49         moltype = AA  length = 15
FEATURE               Location/Qualifiers
REGION                1..15
                      note = synthetic
source                1..15
                      mol_type = protein
                      organism = synthetic construct
SEQUENCE: 49
CPFGCMEDWS WPIWC                                                                15

SEQ ID NO: 50         moltype = AA  length = 15
FEATURE               Location/Qualifiers
REGION                1..15
                      note = synthetic
source                1..15
                      mol_type = protein
                      organism = synthetic construct
SEQUENCE: 50
CPFGCMPGWS WPIWC                                                                15

SEQ ID NO: 51         moltype = AA  length = 15
FEATURE               Location/Qualifiers
REGION                1..15
                      note = synthetic
source                1..15
                      mol_type = protein
                      organism = synthetic construct
SEQUENCE: 51
CPFGCMKSWS WPIWC                                                                15
```

```
SEQ ID NO: 52         moltype = AA   length = 15
FEATURE               Location/Qualifiers
REGION                1..15
                      note = synthetic
source                1..15
                      mol_type = protein
                      organism = synthetic construct
SEQUENCE: 52
CPFGCMKTWS WPIWC                                                      15

SEQ ID NO: 53         moltype = AA   length = 15
FEATURE               Location/Qualifiers
REGION                1..15
                      note = synthetic
source                1..15
                      mol_type = protein
                      organism = synthetic construct
SEQUENCE: 53
CPFGCMKGWS WPIWC                                                      15

SEQ ID NO: 54         moltype = AA   length = 15
FEATURE               Location/Qualifiers
REGION                1..15
                      note = synthetic
source                1..15
                      mol_type = protein
                      organism = synthetic construct
SEQUENCE: 54
CPFGCQEHWS WPIWC                                                      15

SEQ ID NO: 55         moltype = AA   length = 15
FEATURE               Location/Qualifiers
REGION                1..15
                      note = synthetic
source                1..15
                      mol_type = protein
                      organism = synthetic construct
SEQUENCE: 55
CPFGCIKSWS WPIWC                                                      15

SEQ ID NO: 56         moltype = AA   length = 15
FEATURE               Location/Qualifiers
REGION                1..15
                      note = synthetic
source                1..15
                      mol_type = protein
                      organism = synthetic construct
SEQUENCE: 56
CPFGCQEDWS WPIWC                                                      15

SEQ ID NO: 57         moltype = AA   length = 15
FEATURE               Location/Qualifiers
REGION                1..15
                      note = synthetic
source                1..15
                      mol_type = protein
                      organism = synthetic construct
SEQUENCE: 57
CPFGCMSDWS WPIWC                                                      15

SEQ ID NO: 58         moltype = AA   length = 13
FEATURE               Location/Qualifiers
REGION                1..13
                      note = synthetic
source                1..13
                      mol_type = protein
                      organism = synthetic construct
SEQUENCE: 58
CWPLDDYWCP RIC                                                        13

SEQ ID NO: 59         moltype = AA   length = 15
FEATURE               Location/Qualifiers
REGION                1..15
                      note = synthetic
MOD_RES               7
                      note = Homoarginine
source                1..15
                      mol_type = protein
                      organism = synthetic construct
```

```
SEQUENCE: 59
CPFGCMXNWS WPIWC                                                        15

SEQ ID NO: 60           moltype = AA  length = 15
FEATURE                 Location/Qualifiers
REGION                  1..15
                        note = synthetic
MOD_RES                 7
                        note = K(Ac) (N-acetyllysine)
source                  1..15
                        mol_type = protein
                        organism = synthetic construct
SEQUENCE: 60
CPFGCMXNWS WPIWC                                                        15

SEQ ID NO: 61           moltype = AA  length = 15
FEATURE                 Location/Qualifiers
REGION                  1..15
                        note = synthetic
MOD_RES                 7
                        note = K(ac) (N-acetyllysine)
source                  1..15
                        mol_type = protein
                        organism = synthetic construct
SEQUENCE: 61
CPFGCMXSWS WPIWC                                                        15

SEQ ID NO: 62           moltype = AA  length = 15
FEATURE                 Location/Qualifiers
REGION                  1..15
                        note = synthetic
MOD_RES                 6
                        note = Nle
source                  1..15
                        mol_type = protein
                        organism = synthetic construct
SEQUENCE: 62
CPFGCXKSWS WPIWC                                                        15

SEQ ID NO: 63           moltype = AA  length = 15
FEATURE                 Location/Qualifiers
REGION                  1..15
                        note = synthetic
MOD_RES                 7
                        note = Homoarginine
source                  1..15
                        mol_type = protein
                        organism = synthetic construct
SEQUENCE: 63
CPFGCMXSWS WPIWC                                                        15

SEQ ID NO: 64           moltype = AA  length = 15
FEATURE                 Location/Qualifiers
REGION                  1..15
                        note = synthetic
MOD_RES                 7
                        note = D-lysine
source                  1..15
                        mol_type = protein
                        organism = synthetic construct
SEQUENCE: 64
CPFGCMXSWS WPIWC                                                        15

SEQ ID NO: 65           moltype = AA  length = 13
FEATURE                 Location/Qualifiers
REGION                  1..13
                        note = synthetic
MOD_RES                 11
                        note = Homoarginine
source                  1..13
                        mol_type = protein
                        organism = synthetic construct
SEQUENCE: 65
CAPLSDYWCN XIC                                                          13

SEQ ID NO: 66           moltype = AA  length = 15
FEATURE                 Location/Qualifiers
REGION                  1..15
                        note = synthetic
```

```
MOD_RES            3
                   note = d-Alanine
source             1..15
                   mol_type = protein
                   organism = synthetic construct
SEQUENCE: 66
CPXGCMKNWS WPIWC                                                          15

SEQ ID NO: 67      moltype = AA  length = 15
FEATURE            Location/Qualifiers
REGION             1..15
                   note = synthetic
MOD_RES            4
                   note = d-Alanine
source             1..15
                   mol_type = protein
                   organism = synthetic construct
SEQUENCE: 67
CPFXCMKNWS WPIWC                                                          15

SEQ ID NO: 68      moltype = AA  length = 15
FEATURE            Location/Qualifiers
REGION             1..15
                   note = synthetic
MOD_RES            7
                   note = d-Alanine
source             1..15
                   mol_type = protein
                   organism = synthetic construct
SEQUENCE: 68
CPFGCMXNWS WPIWC                                                          15

SEQ ID NO: 69      moltype = AA  length = 15
FEATURE            Location/Qualifiers
REGION             1..15
                   note = synthetic
MOD_RES            8
                   note = d-alanine
source             1..15
                   mol_type = protein
                   organism = synthetic construct
SEQUENCE: 69
CPFGCMKXWS WPIWC                                                          15

SEQ ID NO: 70      moltype = AA  length = 15
FEATURE            Location/Qualifiers
REGION             1..15
                   note = synthetic
MOD_RES            9
                   note = d-alanine
source             1..15
                   mol_type = protein
                   organism = synthetic construct
SEQUENCE: 70
CPFGCMKNXS WPIWC                                                          15

SEQ ID NO: 71      moltype = AA  length = 15
FEATURE            Location/Qualifiers
REGION             1..15
                   note = synthetic
MOD_RES            13
                   note = d-Alanine
source             1..15
                   mol_type = protein
                   organism = synthetic construct
SEQUENCE: 71
CPFGCMKNWS WPXWC                                                          15

SEQ ID NO: 72      moltype = AA  length = 15
FEATURE            Location/Qualifiers
REGION             1..15
                   note = synthetic
MOD_RES            2
                   note = d-Alanine
source             1..15
                   mol_type = protein
                   organism = synthetic construct
SEQUENCE: 72
CXFGCMKNWS WPIWC                                                          15
```

```
SEQ ID NO: 73            moltype = AA  length = 15
FEATURE                  Location/Qualifiers
REGION                   1..15
                         note = synthetic
MOD_RES                  6
                         note = t-Butyl-Alanine
source                   1..15
                         mol_type = protein
                         organism = synthetic construct
SEQUENCE: 73
CPFGCXKNWS WPIWC                                                          15

SEQ ID NO: 74            moltype = AA  length = 15
FEATURE                  Location/Qualifiers
REGION                   1..15
                         note = synthetic
MOD_RES                  6
                         note = HomoLeucine
source                   1..15
                         mol_type = protein
                         organism = synthetic construct
SEQUENCE: 74
CPFGCXKNWS WPIWC                                                          15

SEQ ID NO: 75            moltype = AA  length = 15
FEATURE                  Location/Qualifiers
REGION                   1..15
                         note = synthetic
MOD_RES                  14
                         note = 1-Naphthylalanine
source                   1..15
                         mol_type = protein
                         organism = synthetic construct
SEQUENCE: 75
CPFGCMKNWS WPIXC                                                          15

SEQ ID NO: 76            moltype = AA  length = 15
FEATURE                  Location/Qualifiers
REGION                   1..15
                         note = synthetic
MOD_RES                  4
                         note = d-Aspartic acid
MOD_RES                  7
                         note = HomoArginine
source                   1..15
                         mol_type = protein
                         organism = synthetic construct
SEQUENCE: 76
CPFXCMXNWS WPIWC                                                          15

SEQ ID NO: 77            moltype = AA  length = 15
FEATURE                  Location/Qualifiers
REGION                   1..15
                         note = synthetic
MOD_RES                  4
                         note = d-alanine
MOD_RES                  7
                         note = HomoArginine
source                   1..15
                         mol_type = protein
                         organism = synthetic construct
SEQUENCE: 77
CPFXCMXNWS WPIWC                                                          15

SEQ ID NO: 78            moltype = AA  length = 15
FEATURE                  Location/Qualifiers
REGION                   1..15
                         note = synthetic
MOD_RES                  3
                         note = 3-Methyl-Phenylalanine
source                   1..15
                         mol_type = protein
                         organism = synthetic construct
SEQUENCE: 78
CPXGCMKNWS WPIWC                                                          15

SEQ ID NO: 79            moltype = AA  length = 15
FEATURE                  Location/Qualifiers
```

```
REGION                  1..15
                        note = synthetic
MOD_RES                 3
                        note = 4-Methyl-Phenylalanine
source                  1..15
                        mol_type = protein
                        organism = synthetic construct
SEQUENCE: 79
CPXGCMKNWS WPIWC                                                          15

SEQ ID NO: 80           moltype = AA  length = 15
FEATURE                 Location/Qualifiers
REGION                  1..15
                        note = synthetic
MOD_RES                 3
                        note = HomoPhenylalanine
source                  1..15
                        mol_type = protein
                        organism = synthetic construct
SEQUENCE: 80
CPXGCMKNWS WPIWC                                                          15

SEQ ID NO: 81           moltype = AA  length = 15
FEATURE                 Location/Qualifiers
REGION                  1..15
                        note = synthetic
MOD_RES                 4
                        note = d-aspartic acid
source                  1..15
                        mol_type = protein
                        organism = synthetic construct
SEQUENCE: 81
CPFXCMKNWS WPIWC                                                          15

SEQ ID NO: 82           moltype = AA  length = 15
FEATURE                 Location/Qualifiers
REGION                  1..15
                        note = synthetic
MOD_RES                 6
                        note = Homoserine(Me)
source                  1..15
                        mol_type = protein
                        organism = synthetic construct
SEQUENCE: 82
CPFGCXKNWS WPIWC                                                          15

SEQ ID NO: 83           moltype = AA  length = 15
FEATURE                 Location/Qualifiers
REGION                  1..15
                        note = synthetic
MOD_RES                 9
                        note = Azatryptophan
source                  1..15
                        mol_type = protein
                        organism = synthetic construct
SEQUENCE: 83
CPFGCMKNXS WPIWC                                                          15

SEQ ID NO: 84           moltype = AA  length = 15
FEATURE                 Location/Qualifiers
REGION                  1..15
                        note = synthetic
source                  1..15
                        mol_type = protein
                        organism = synthetic construct
SEQUENCE: 84
CPFGCMKNWS FPIWC                                                          15

SEQ ID NO: 85           moltype = AA  length = 15
FEATURE                 Location/Qualifiers
REGION                  1..15
                        note = synthetic
source                  1..15
                        mol_type = protein
                        organism = synthetic construct
SEQUENCE: 85
CPFGCMKNWS YPIWC                                                          15

SEQ ID NO: 86           moltype = AA  length = 15
```

```
FEATURE              Location/Qualifiers
REGION               1..15
                     note = synthetic
MOD_RES              11
                     note = 1-Naphthylalanine
source               1..15
                     mol_type = protein
                     organism = synthetic construct
SEQUENCE: 86
CPFGCMKNWS XPIWC                                                           15

SEQ ID NO: 87        moltype = AA  length = 15
FEATURE              Location/Qualifiers
REGION               1..15
                     note = synthetic
MOD_RES              11
                     note = 2-Naphthylalanine
source               1..15
                     mol_type = protein
                     organism = synthetic construct
SEQUENCE: 87
CPFGCMKNWS XPIWC                                                           15

SEQ ID NO: 88        moltype = AA  length = 15
FEATURE              Location/Qualifiers
REGION               1..15
                     note = synthetic
MOD_RES              11
                     note = Azatryptophan
source               1..15
                     mol_type = protein
                     organism = synthetic construct
SEQUENCE: 88
CPFGCMKNWS XPIWC                                                           15

SEQ ID NO: 89        moltype = AA  length = 15
FEATURE              Location/Qualifiers
REGION               1..15
                     note = synthetic
MOD_RES              12
                     note = Azetidine
source               1..15
                     mol_type = protein
                     organism = synthetic construct
SEQUENCE: 89
CPFGCMKNWS WXIWC                                                           15

SEQ ID NO: 90        moltype = AA  length = 15
FEATURE              Location/Qualifiers
REGION               1..15
                     note = synthetic
MOD_RES              12
                     note = Pipecolic acid
source               1..15
                     mol_type = protein
                     organism = synthetic construct
SEQUENCE: 90
CPFGCMKNWS WXIWC                                                           15

SEQ ID NO: 91        moltype = AA  length = 15
FEATURE              Location/Qualifiers
REGION               1..15
                     note = synthetic
source               1..15
                     mol_type = protein
                     organism = synthetic construct
SEQUENCE: 91
CPFGCMKNWS WPIFC                                                           15

SEQ ID NO: 92        moltype = AA  length = 15
FEATURE              Location/Qualifiers
REGION               1..15
                     note = synthetic
source               1..15
                     mol_type = protein
                     organism = synthetic construct
SEQUENCE: 92
CPFGCMKNWS WPIYC                                                           15
```

```
SEQ ID NO: 93          moltype = AA  length = 15
FEATURE                Location/Qualifiers
REGION                 1..15
                       note = synthetic
MOD_RES                14
                       note = Azatryptophan
source                 1..15
                       mol_type = protein
                       organism = synthetic construct
SEQUENCE: 93
CPFGCMKNWS WPIXC                                                            15

SEQ ID NO: 94          moltype = AA  length = 15
FEATURE                Location/Qualifiers
REGION                 1..15
                       note = synthetic
source                 1..15
                       mol_type = protein
                       organism = synthetic construct
SEQUENCE: 94
CGFGCMKNWS WPIWC                                                            15

SEQ ID NO: 95          moltype = AA  length = 15
FEATURE                Location/Qualifiers
REGION                 1..15
                       note = synthetic
MOD_RES                2
                       note = Azetidine
source                 1..15
                       mol_type = protein
                       organism = synthetic construct
SEQUENCE: 95
CXFGCMKNWS WPIWC                                                            15

SEQ ID NO: 96          moltype = AA  length = 15
FEATURE                Location/Qualifiers
REGION                 1..15
                       note = synthetic
MOD_RES                4
                       note = K(Ac)(N-acetyllysine)
source                 1..15
                       mol_type = protein
                       organism = synthetic construct
SEQUENCE: 96
CPFXCMKNWS WPIWC                                                            15

SEQ ID NO: 97          moltype = AA  length = 15
FEATURE                Location/Qualifiers
REGION                 1..15
                       note = synthetic
source                 1..15
                       mol_type = protein
                       organism = synthetic construct
SEQUENCE: 97
CPFGCLKNWS WPIWC                                                            15

SEQ ID NO: 98          moltype = AA  length = 15
FEATURE                Location/Qualifiers
REGION                 1..15
                       note = synthetic
MOD_RES                6
                       note = MetO2
source                 1..15
                       mol_type = protein
                       organism = synthetic construct
SEQUENCE: 98
CPFGCXKNWS WPIWC                                                            15

SEQ ID NO: 99          moltype = AA  length = 15
FEATURE                Location/Qualifiers
REGION                 1..15
                       note = synthetic
source                 1..15
                       mol_type = protein
                       organism = synthetic construct
SEQUENCE: 99
CPFGCMPNWS WPIWC                                                            15

SEQ ID NO: 100         moltype = AA  length = 15
```

```
FEATURE              Location/Qualifiers
REGION               1..15
                     note = synthetic
source               1..15
                     mol_type = protein
                     organism = synthetic construct
SEQUENCE: 100
CPFGCMQNWS WPIWC                                                          15

SEQ ID NO: 101       moltype = AA  length = 15
FEATURE              Location/Qualifiers
REGION               1..15
                     note = synthetic
source               1..15
                     mol_type = protein
                     organism = synthetic construct
SEQUENCE: 101
CPFGCMKNWS WPPWC                                                          15

SEQ ID NO: 102       moltype = AA  length = 15
FEATURE              Location/Qualifiers
REGION               1..15
                     note = synthetic
MOD_RES              3
                     note = 2-Pyridylalanine
source               1..15
                     mol_type = protein
                     organism = synthetic construct
SEQUENCE: 102
CPXGCMKNWS WPIWC                                                          15

SEQ ID NO: 103       moltype = AA  length = 13
FEATURE              Location/Qualifiers
REGION               1..13
                     note = synthetic
source               1..13
                     mol_type = protein
                     organism = synthetic construct
SEQUENCE: 103
CAALSDYWCN RIC                                                            13

SEQ ID NO: 104       moltype = AA  length = 13
FEATURE              Location/Qualifiers
REGION               1..13
                     note = synthetic
source               1..13
                     mol_type = protein
                     organism = synthetic construct
SEQUENCE: 104
CAPLADYWCN RIC                                                            13

SEQ ID NO: 105       moltype = AA  length = 13
FEATURE              Location/Qualifiers
REGION               1..13
                     note = synthetic
source               1..13
                     mol_type = protein
                     organism = synthetic construct
SEQUENCE: 105
CAPLSAYWCN RIC                                                            13

SEQ ID NO: 106       moltype = AA  length = 13
FEATURE              Location/Qualifiers
REGION               1..13
                     note = synthetic
source               1..13
                     mol_type = protein
                     organism = synthetic construct
SEQUENCE: 106
CAPLSDYWCA RIC                                                            13

SEQ ID NO: 107       moltype = AA  length = 13
FEATURE              Location/Qualifiers
REGION               1..13
                     note = synthetic
source               1..13
                     mol_type = protein
                     organism = synthetic construct
SEQUENCE: 107
```

```
CAPLSDYWCN AIC                                                            13

SEQ ID NO: 108          moltype = AA  length = 13
FEATURE                 Location/Qualifiers
REGION                  1..13
                        note = synthetic
MOD_RES                 5
                        note = D-alanine
source                  1..13
                        mol_type = protein
                        organism = synthetic construct
SEQUENCE: 108
CAPLXDYWCN RIC                                                            13

SEQ ID NO: 109          moltype = AA  length = 13
FEATURE                 Location/Qualifiers
REGION                  1..13
                        note = synthetic
MOD_RES                 6
                        note = D-alanine
source                  1..13
                        mol_type = protein
                        organism = synthetic construct
SEQUENCE: 109
CAPLSXYWCN RIC                                                            13

SEQ ID NO: 110          moltype = AA  length = 13
FEATURE                 Location/Qualifiers
REGION                  1..13
                        note = synthetic
MOD_RES                 10
                        note = D-alanine
source                  1..13
                        mol_type = protein
                        organism = synthetic construct
SEQUENCE: 110
CAPLSDYWCX RIC                                                            13

SEQ ID NO: 111          moltype = AA  length = 15
FEATURE                 Location/Qualifiers
REGION                  1..15
                        note = synthetic
MOD_RES                 9
                        note = 1-naphthyl alanine
source                  1..15
                        mol_type = protein
                        organism = synthetic construct
SEQUENCE: 111
CPFGCMKNXS WPIWC                                                          15

SEQ ID NO: 112          moltype = AA  length = 15
FEATURE                 Location/Qualifiers
REGION                  1..15
                        note = synthetic
MOD_RES                 9
                        note = 2-naphthyl alanine
source                  1..15
                        mol_type = protein
                        organism = synthetic construct
SEQUENCE: 112
CPFGCMKNXS WPIWC                                                          15

SEQ ID NO: 113          moltype = AA  length = 15
FEATURE                 Location/Qualifiers
REGION                  1..15
                        note = synthetic
MOD_RES                 14
                        note = 2-naphthyl alanine
source                  1..15
                        mol_type = protein
                        organism = synthetic construct
SEQUENCE: 113
CPFGCMKNWS WPIXC                                                          15

SEQ ID NO: 114          moltype = AA  length = 15
FEATURE                 Location/Qualifiers
REGION                  1..15
                        note = synthetic
MOD_RES                 2
```

```
                            note = hydroxyproline
source                      1..15
                            mol_type = protein
                            organism = synthetic construct
SEQUENCE: 114
CXFGCMKNWS WPIWC                                                     15

SEQ ID NO: 115              moltype = AA   length = 15
FEATURE                     Location/Qualifiers
REGION                      1..15
                            note = synthetic
MOD_RES                     4
                            note = D-aspartic acid
MOD_RES                     7
                            note = homoarginine
source                      1..15
                            mol_type = protein
                            organism = synthetic construct
SEQUENCE: 115
CPFXCMXNWS TPIWC                                                     15

SEQ ID NO: 116              moltype = AA   length = 15
FEATURE                     Location/Qualifiers
REGION                      1..15
                            note = synthetic
MOD_RES                     4
                            note = D-aspartic acid
MOD_RES                     7
                            note = Homoarginine
MOD_RES                     8
                            note = D-lysine
source                      1..15
                            mol_type = protein
                            organism = synthetic construct
SEQUENCE: 116
CPFXCMXXWS TPIWC                                                     15

SEQ ID NO: 117              moltype = AA   length = 15
FEATURE                     Location/Qualifiers
REGION                      1..15
                            note = synthetic
MOD_RES                     4
                            note = D-aspartic acid
MOD_RES                     7
                            note = Homoarginine
source                      1..15
                            mol_type = protein
                            organism = synthetic construct
SEQUENCE: 117
CPFXCMXNWS TPKWC                                                     15

SEQ ID NO: 118              moltype = AA   length = 15
FEATURE                     Location/Qualifiers
REGION                      1..15
                            note = synthetic
MOD_RES                     2
                            note = 4-Amino-Proline
MOD_RES                     4
                            note = D-aspartic acid
MOD_RES                     7
                            note = Homoarginine
source                      1..15
                            mol_type = protein
                            organism = synthetic construct
SEQUENCE: 118
CXFXCMXNWS TPIWC                                                     15

SEQ ID NO: 119              moltype = AA   length = 15
FEATURE                     Location/Qualifiers
REGION                      1..15
                            note = synthetic
MOD_RES                     4
                            note = D-aspartic acid
source                      1..15
                            mol_type = protein
                            organism = synthetic construct
SEQUENCE: 119
CPFXCMKNWS TPIWC                                                     15
```

```
SEQ ID NO: 120           moltype = AA  length = 15
FEATURE                  Location/Qualifiers
REGION                   1..15
                         note = synthetic
MOD_RES                  4
                         note = D-lysine
MOD_RES                  7
                         note = Homoarginine
source                   1..15
                         mol_type = protein
                         organism = synthetic construct
SEQUENCE: 120
CPFXCMXNWS TPIWC                                                     15

SEQ ID NO: 121           moltype = AA  length = 15
FEATURE                  Location/Qualifiers
REGION                   1..15
                         note = synthetic
MOD_RES                  4
                         note = D-aspartic acid
MOD_RES                  7
                         note = homoarginine
source                   1..15
                         mol_type = protein
                         organism = synthetic construct
SEQUENCE: 121
CPFXCKXNWS TPIWC                                                     15

SEQ ID NO: 122           moltype = AA  length = 15
FEATURE                  Location/Qualifiers
REGION                   1..15
                         note = synthetic
MOD_RES                  4
                         note = D-aspartic acid
MOD_RES                  7
                         note = Homoarginine
source                   1..15
                         mol_type = protein
                         organism = synthetic construct
SEQUENCE: 122
CPFXCMXKWS TPIWC                                                     15

SEQ ID NO: 123           moltype = AA  length = 15
FEATURE                  Location/Qualifiers
REGION                   1..15
                         note = synthetic
MOD_RES                  2
                         note = Oxazolidine-4-carboxylic acid
MOD_RES                  4
                         note = D-Aspartic acid
MOD_RES                  7
                         note = Homoarginine
source                   1..15
                         mol_type = protein
                         organism = synthetic construct
SEQUENCE: 123
CXFXCMXNWS TPIWC                                                     15

SEQ ID NO: 124           moltype = AA  length = 15
FEATURE                  Location/Qualifiers
REGION                   1..15
                         note = synthetic
MOD_RES                  4
                         note = D-aspartic acid
MOD_RES                  7
                         note = Homoarginine
MOD_RES                  8
                         note = Thienyl-alanine
source                   1..15
                         mol_type = protein
                         organism = synthetic construct
SEQUENCE: 124
CPFXCMXXWS TPIWC                                                     15

SEQ ID NO: 125           moltype = AA  length = 15
FEATURE                  Location/Qualifiers
REGION                   1..15
                         note = synthetic
MOD_RES                  4
```

```
                              note = D-aspartic acid
MOD_RES                       7
                              note = Homoarginine
MOD_RES                       8
                              note = Beta-(4-Thiazolyl)-Alanine
source                        1..15
                              mol_type = protein
                              organism = synthetic construct
SEQUENCE: 125
CPFXCMXXWS TPIWC                                                        15

SEQ ID NO: 126                moltype = AA  length = 15
FEATURE                       Location/Qualifiers
REGION                        1..15
                              note = synthetic
MOD_RES                       4
                              note = D-aspartic acid
MOD_RES                       7
                              note = Homoarginine
MOD_RES                       8
                              note = 3-(1,2,4-Triazol-1-yl)-alanine
source                        1..15
                              mol_type = protein
                              organism = synthetic construct
SEQUENCE: 126
CPFXCMXXWS TPIWC                                                        15

SEQ ID NO: 127                moltype = AA  length = 15
FEATURE                       Location/Qualifiers
REGION                        1..15
                              note = synthetic
MOD_RES                       4
                              note = D-aspartic acid
MOD_RES                       7
                              note = homoarginine
MOD_RES                       11
                              note = 3-(1,2,4-Triazol-1-yl)-alanine
source                        1..15
                              mol_type = protein
                              organism = synthetic construct
SEQUENCE: 127
CPFXCMXNWS XPIWC                                                        15

SEQ ID NO: 128                moltype = AA  length = 15
FEATURE                       Location/Qualifiers
REGION                        1..15
                              note = synthetic
MOD_RES                       4
                              note = D-aspartic acid
MOD_RES                       7
                              note = Homoarginine
MOD_RES                       12
                              note = Oxazolidine-4-carboxylic acid
source                        1..15
                              mol_type = protein
                              organism = synthetic construct
SEQUENCE: 128
CPFXCMXNWS TXIWC                                                        15

SEQ ID NO: 129                moltype = AA  length = 15
FEATURE                       Location/Qualifiers
REGION                        1..15
                              note = synthetic
MOD_RES                       3
                              note = 3,4-Dihydroxy-phenylalanine
MOD_RES                       4
                              note = D-aspartic acid
MOD_RES                       7
                              note = homoarginine
source                        1..15
                              mol_type = protein
                              organism = synthetic construct
SEQUENCE: 129
CPXXCMXNWS TPIWC                                                        15

SEQ ID NO: 130                moltype = AA  length = 15
FEATURE                       Location/Qualifiers
REGION                        1..15
                              note = synthetic
```

```
MOD_RES         4
                note = D-aspartic acid
MOD_RES         7
                note = homoarginine
MOD_RES         11
                note = 3,4-Dihydroxy-phenylalanine
source          1..15
                mol_type = protein
                organism = synthetic construct
SEQUENCE: 130
CPFXCMXNWS XPIWC                                                    15

SEQ ID NO: 131  moltype = AA  length = 15
FEATURE         Location/Qualifiers
REGION          1..15
                note = synthetic
MOD_RES         4
                note = D-aspartic acid
MOD_RES         7
                note = homoarginine
MOD_RES         11
                note = Dioxo-4-tetrahydrothiopyranylacetic acid
source          1..15
                mol_type = protein
                organism = synthetic construct
SEQUENCE: 131
CPFXCMXNWS XPIWC                                                    15

SEQ ID NO: 132  moltype = AA  length = 15
FEATURE         Location/Qualifiers
REGION          1..15
                note = synthetic
MOD_RES         4
                note = D-aspartic acid
MOD_RES         7
                note = homoarginine
MOD_RES         13
                note = Dioxo-4-tetrahydrothiopyranylacetic acid
source          1..15
                mol_type = protein
                organism = synthetic construct
SEQUENCE: 132
CPFXCMXNWS TPXWC                                                    15

SEQ ID NO: 133  moltype = AA  length = 15
FEATURE         Location/Qualifiers
REGION          1..15
                note = synthetic
MOD_RES         4
                note = D-aspartic acid
MOD_RES         7
                note = Homoarginine
MOD_RES         9
                note = 5-Fluoro-L-tryptophan
source          1..15
                mol_type = protein
                organism = synthetic construct
SEQUENCE: 133
CPFXCMXNXS TPIWC                                                    15

SEQ ID NO: 134  moltype = AA  length = 15
FEATURE         Location/Qualifiers
REGION          1..15
                note = synthetic
MOD_RES         4
                note = D-aspartic acid
MOD_RES         7
                note = Homoarginine
MOD_RES         14
                note = 5-Fluoro-L-tryptophan
source          1..15
                mol_type = protein
                organism = synthetic construct
SEQUENCE: 134
CPFXCMXNWS TPIXC                                                    15

SEQ ID NO: 135  moltype = AA  length = 15
FEATURE         Location/Qualifiers
REGION          1..15
```

```
                    note = synthetic
MOD_RES             4
                    note = D-aspartic acid
MOD_RES             7
                    note = Homoarginine
MOD_RES             11
                    note = Tetrahydropyran- 4-propanoic acid
source              1..15
                    mol_type = protein
                    organism = synthetic construct
SEQUENCE: 135
CPFXCMXNWS XPIWC                                                   15

SEQ ID NO: 136      moltype = AA  length = 15
FEATURE             Location/Qualifiers
REGION              1..15
                    note = synthetic
MOD_RES             4
                    note = D-aspartic acid
MOD_RES             7
                    note = Homoarginine
MOD_RES             13
                    note = Tetrahydropyran-4-propanoic acid
source              1..15
                    mol_type = protein
                    organism = synthetic construct
SEQUENCE: 136
CPFXCMXNWS TPXWC                                                   15

SEQ ID NO: 137      moltype = AA  length = 15
FEATURE             Location/Qualifiers
REGION              1..15
                    note = synthetic
MOD_RES             2
                    note = 4,4-Difluoroproline
MOD_RES             4
                    note = D-aspartic acid
MOD_RES             7
                    note = Homoarginine
source              1..15
                    mol_type = protein
                    organism = synthetic construct
SEQUENCE: 137
CXFXCMXNWS TPIWC                                                   15

SEQ ID NO: 138      moltype = AA  length = 15
FEATURE             Location/Qualifiers
REGION              1..15
                    note = synthetic
MOD_RES             2
                    note = Octahydroindolecarboxylic acid
MOD_RES             4
                    note = D-aspartic acid
MOD_RES             7
                    note = Homoarginine
source              1..15
                    mol_type = protein
                    organism = synthetic construct
SEQUENCE: 138
CXFXCMXNWS TPIWC                                                   15

SEQ ID NO: 139      moltype = AA  length = 15
FEATURE             Location/Qualifiers
REGION              1..15
                    note = synthetic
MOD_RES             4
                    note = D-phenylalanine
MOD_RES             7
                    note = Homoarginine
source              1..15
                    mol_type = protein
                    organism = synthetic construct
SEQUENCE: 139
CPFXCMXNWS TPIWC                                                   15

SEQ ID NO: 140      moltype = AA  length = 15
FEATURE             Location/Qualifiers
REGION              1..15
                    note = synthetic
```

```
MOD_RES          4
                 note = D-glutamic acid
MOD_RES          7
                 note = Homoarginine
source           1..15
                 mol_type = protein
                 organism = synthetic construct
SEQUENCE: 140
CPFXCMXNWS TPIWC                                                    15

SEQ ID NO: 141   moltype = AA  length = 15
FEATURE          Location/Qualifiers
REGION           1..15
                 note = synthetic
MOD_RES          4
                 note = D-glutamine
MOD_RES          7
                 note = Homoarginine
source           1..15
                 mol_type = protein
                 organism = synthetic construct
SEQUENCE: 141
CPFXCMXNWS TPIWC                                                    15

SEQ ID NO: 142   moltype = AA  length = 15
FEATURE          Location/Qualifiers
REGION           1..15
                 note = synthetic
MOD_RES          4
                 note = D-leucine
MOD_RES          7
                 note = Homoarginine
source           1..15
                 mol_type = protein
                 organism = synthetic construct
SEQUENCE: 142
CPFXCMXNWS TPIWC                                                    15

SEQ ID NO: 143   moltype = AA  length = 15
FEATURE          Location/Qualifiers
REGION           1..15
                 note = synthetic
MOD_RES          4
                 note = D-serine
MOD_RES          7
                 note = Homoarginine
source           1..15
                 mol_type = protein
                 organism = synthetic construct
SEQUENCE: 143
CPFXCMXNWS TPIWC                                                    15

SEQ ID NO: 144   moltype = AA  length = 15
FEATURE          Location/Qualifiers
REGION           1..15
                 note = synthetic
MOD_RES          4
                 note = D-aspartic acid
MOD_RES          7
                 note = Homoarginine
MOD_RES          10
                 note = homoserine
source           1..15
                 mol_type = protein
                 organism = synthetic construct
SEQUENCE: 144
CPFXCMXNWX TPIWC                                                    15

SEQ ID NO: 145   moltype = AA  length = 15
FEATURE          Location/Qualifiers
REGION           1..15
                 note = synthetic
MOD_RES          4
                 note = D-aspartic acid
MOD_RES          7
                 note = Homoarginine
MOD_RES          13
                 note = Cyclopentyl glycine
source           1..15
```

```
                            mol_type = protein
                            organism = synthetic construct
SEQUENCE: 145
CPFXCMXNWS TPXWC                                                            15

SEQ ID NO: 146              moltype = AA   length = 15
FEATURE                     Location/Qualifiers
REGION                      1..15
                            note = synthetic
MOD_RES                     4
                            note = D-aspartic acid
MOD_RES                     7
                            note = Homoarginine
MOD_RES                     13
                            note = Cyclopropylalanine
source                      1..15
                            mol_type = protein
                            organism = synthetic construct
SEQUENCE: 146
CPFXCMXNWS TPXWC                                                            15

SEQ ID NO: 147              moltype = AA   length = 15
FEATURE                     Location/Qualifiers
REGION                      1..15
                            note = synthetic
MOD_RES                     4
                            note = D-aspartic acid
MOD_RES                     7
                            note = Homoarginine
MOD_RES                     13
                            note = 3-Cyclohexyl-alanine
source                      1..15
                            mol_type = protein
                            organism = synthetic construct
SEQUENCE: 147
CPFXCMXNWS TPXWC                                                            15

SEQ ID NO: 148              moltype = AA   length = 15
FEATURE                     Location/Qualifiers
REGION                      1..15
                            note = synthetic
MOD_RES                     4
                            note = D-aspartic acid
MOD_RES                     6
                            note = HomoGlutamine
MOD_RES                     7
                            note = Homoarginine
source                      1..15
                            mol_type = protein
                            organism = synthetic construct
SEQUENCE: 148
CPFXCXXNWS TPIWC                                                            15

SEQ ID NO: 149              moltype = AA   length = 15
FEATURE                     Location/Qualifiers
REGION                      1..15
                            note = synthetic
MOD_RES                     4
                            note = D-aspartic acid
MOD_RES                     6
                            note = Cyclopentyl glycine
MOD_RES                     7
                            note = Homoarginine
source                      1..15
                            mol_type = protein
                            organism = synthetic construct
SEQUENCE: 149
CPFXCXXNWS TPIWC                                                            15

SEQ ID NO: 150              moltype = AA   length = 15
FEATURE                     Location/Qualifiers
REGION                      1..15
                            note = synthetic
MOD_RES                     4
                            note = D-aspartic acid
MOD_RES                     7
                            note = Homoarginine
MOD_RES                     9
                            note = Methyl Trptophan
```

```
source                   1..15
                         mol_type = protein
                         organism = synthetic construct
SEQUENCE: 150
CPFXCMXNXS TPIWC                                                    15

SEQ ID NO: 151           moltype = AA  length = 15
FEATURE                  Location/Qualifiers
REGION                   1..15
                         note = synthetic
MOD_RES                  4
                         note = D-aspartic acid
MOD_RES                  5
                         note = NMeCys
MOD_RES                  7
                         note = Homoarginine
source                   1..15
                         mol_type = protein
                         organism = synthetic construct
SEQUENCE: 151
CPFXXMXNWS TPIWC                                                    15

SEQ ID NO: 152           moltype = AA  length = 14
FEATURE                  Location/Qualifiers
REGION                   1..14
                         note = synthetic
MOD_RES                  4
                         note = D-aspartic acid
MOD_RES                  6
                         note = Homoarginine
MOD_RES                  10
                         note = NMeThr
source                   1..14
                         mol_type = protein
                         organism = synthetic construct
SEQUENCE: 152
CPFXCXNWSX PIWC                                                     14

SEQ ID NO: 153           moltype = AA  length = 13
FEATURE                  Location/Qualifiers
REGION                   1..13
                         note = synthetic
MOD_RES                  8
                         note = 1-naphthyl alanine
source                   1..13
                         mol_type = protein
                         organism = synthetic construct
SEQUENCE: 153
CAPLSDYXCN RIC                                                      13

SEQ ID NO: 154           moltype = AA  length = 13
FEATURE                  Location/Qualifiers
REGION                   1..13
                         note = synthetic
MOD_RES                  10
                         note = D-aspartic acid
source                   1..13
                         mol_type = protein
                         organism = synthetic construct
SEQUENCE: 154
CAPLSDYWCX RIC                                                      13

SEQ ID NO: 155           moltype = AA  length = 15
FEATURE                  Location/Qualifiers
REGION                   1..15
                         note = synthetic
MOD_RES                  3
                         note = 1-naphthyl alanine
MOD_RES                  4
                         note = D-aspartic acid
MOD_RES                  7
                         note = Homoarginine
source                   1..15
                         mol_type = protein
                         organism = synthetic construct
SEQUENCE: 155
CPXXCMXNWS TPIWC                                                    15

SEQ ID NO: 156           moltype = AA  length = 15
```

```
                    FEATURE        Location/Qualifiers
                    REGION         1..15
                                   note = synthetic
                    MOD_RES        3
                                   note = 2-naphthyl alanine
                    MOD_RES        4
                                   note = D-aspartic acid
                    MOD_RES        7
                                   note = Homoarginine
                    source         1..15
                                   mol_type = protein
                                   organism = synthetic construct
SEQUENCE: 156
CPXXCMXNWS TPIWC                                                              15

SEQ ID NO: 157 moltype = AA  length = 15
                    FEATURE        Location/Qualifiers
                    REGION         1..15
                                   note = synthetic
                    MOD_RES        3
                                   note = 4,4-Biphenylalanine
                    MOD_RES        4
                                   note = D-aspartic acid
                    MOD_RES        7
                                   note = Homarginine
                    source         1..15
                                   mol_type = protein
                                   organism = synthetic construct
SEQUENCE: 157
CPXXCMXNWS TPIWC                                                              15

SEQ ID NO: 158 moltype = AA  length = 15
                    FEATURE        Location/Qualifiers
                    REGION         1..15
                                   note = synthetic
                    MOD_RES        4
                                   note = D-aspartic acid
                    MOD_RES        7
                                   note = Homoarginine
                    source         1..15
                                   mol_type = protein
                                   organism = synthetic construct
SEQUENCE: 158
CPFXCMXNWS TPPWC                                                              15

SEQ ID NO: 159 moltype = AA  length = 15
                    FEATURE        Location/Qualifiers
                    REGION         1..15
                                   note = synthetic
                    MOD_RES        4
                                   note = D-aspartic acid
                    MOD_RES        7
                                   note = Homoarginine
                    MOD_RES        13
                                   note = Hydroxyproline
                    source         1..15
                                   mol_type = protein
                                   organism = synthetic construct
SEQUENCE: 159
CPFXCMXNWS TPXWC                                                              15

SEQ ID NO: 160 moltype = AA  length = 15
                    FEATURE        Location/Qualifiers
                    REGION         1..15
                                   note = synthetic
                    MOD_RES        4
                                   note = D-aspartic acid
                    MOD_RES        7
                                   note = Homoarginine
                    source         1..15
                                   mol_type = protein
                                   organism = synthetic construct
SEQUENCE: 160
CPFXCLXNWS TPPWC                                                              15

SEQ ID NO: 161 moltype = AA  length = 15
                    FEATURE        Location/Qualifiers
                    REGION         1..15
                                   note = synthetic
```

```
MOD_RES          4
                 note = D-aspartic acid
MOD_RES          7
                 note = homoarginine
source           1..15
                 mol_type = protein
                 organism = synthetic construct
SEQUENCE: 161
CPFXCLXNWS TPIWC                                                      15

SEQ ID NO: 162   moltype = AA  length = 15
FEATURE          Location/Qualifiers
REGION           1..15
                 note = synthetic
MOD_RES          4
                 note = D-aspartic acid
MOD_RES          7
                 note = homoarginine
source           1..15
                 mol_type = protein
                 organism = synthetic construct
SEQUENCE: 162
CPYXCMXNWS TPIWC                                                      15

SEQ ID NO: 163   moltype = AA  length = 15
FEATURE          Location/Qualifiers
REGION           1..15
                 note = synthetic
MOD_RES          2
                 note = Aminoisobutyric acid
MOD_RES          4
                 note = D-aspartic acid
MOD_RES          7
                 note = homoarginine
source           1..15
                 mol_type = protein
                 organism = synthetic construct
SEQUENCE: 163
CXFXCMXNWS TPIWC                                                      15

SEQ ID NO: 164   moltype = AA  length = 15
FEATURE          Location/Qualifiers
REGION           1..15
                 note = synthetic
MOD_RES          2
                 note = Sarcosine
MOD_RES          4
                 note = D-aspartic acid
MOD_RES          7
                 note = Homoarginine
source           1..15
                 mol_type = protein
                 organism = synthetic construct
SEQUENCE: 164
CXFXCMXNWS TPIWC                                                      15

SEQ ID NO: 165   moltype = AA  length = 15
FEATURE          Location/Qualifiers
REGION           1..15
                 note = synthetic
MOD_RES          4
                 note = D-arginine
MOD_RES          7
                 note = Homoarginine
source           1..15
                 mol_type = protein
                 organism = synthetic construct
SEQUENCE: 165
CPFXCMXNWS TPIWC                                                      15

SEQ ID NO: 166   moltype = AA  length = 15
FEATURE          Location/Qualifiers
REGION           1..15
                 note = synthetic
MOD_RES          4
                 note = D-aspartic acid
MOD_RES          7
                 note = Homoarginine
source           1..15
```

```
                              mol_type = protein
                              organism = synthetic construct
SEQUENCE: 166
CPFXCMXNWS TPKWC                                                              15

SEQ ID NO: 167                moltype = AA  length = 15
FEATURE                       Location/Qualifiers
REGION                        1..15
                              note = synthetic
MOD_RES                       3
                              note = 1-naphthyl alanine
MOD_RES                       4
                              note = D-aspartic acid
MOD_RES                       7
                              note = Homoarginine
MOD_RES                       13
                              note = hydroxyproline
source                        1..15
                              mol_type = protein
                              organism = synthetic construct
SEQUENCE: 167
CPXXCMXNWS TPXWC                                                              15

SEQ ID NO: 168                moltype = AA  length = 15
FEATURE                       Location/Qualifiers
REGION                        1..15
                              note = synthetic
MOD_RES                       3
                              note = 1-naphthyl alanine
MOD_RES                       4
                              note = D-aspartic acid
MOD_RES                       7
                              note = Homoarginine
MOD_RES                       13
                              note = hydroxyproline
source                        1..15
                              mol_type = protein
                              organism = synthetic construct
SEQUENCE: 168
CPXXCMXHWS TPXWC                                                              15

SEQ ID NO: 169                moltype = AA  length = 15
FEATURE                       Location/Qualifiers
REGION                        1..15
                              note = synthetic
MOD_RES                       3
                              note = 1-naphthyl alanine
MOD_RES                       4
                              note = D-aspartic acid
MOD_RES                       7
                              note = Homoarginine
MOD_RES                       13
                              note = hydroxyproline
source                        1..15
                              mol_type = protein
                              organism = synthetic construct
SEQUENCE: 169
CPXXCMXDWS TPXWC                                                              15

SEQ ID NO: 170                moltype = AA  length = 15
FEATURE                       Location/Qualifiers
REGION                        1..15
                              note = synthetic
MOD_RES                       3
                              note = 1-naphthyl alanine
MOD_RES                       4
                              note = D-aspartic acid
MOD_RES                       7
                              note = Homoarginine
source                        1..15
                              mol_type = protein
                              organism = synthetic construct
SEQUENCE: 170
CPXXCMXDWS TPIWC                                                              15

SEQ ID NO: 171                moltype = AA  length = 15
FEATURE                       Location/Qualifiers
REGION                        1..15
                              note = synthetic
```

```
MOD_RES          3
                 note = 1-naphthyl alanine
MOD_RES          4
                 note = D-arginine
MOD_RES          7
                 note = Homoarginine
MOD_RES          13
                 note = hydroxyproline
source           1..15
                 mol_type = protein
                 organism = synthetic construct
SEQUENCE: 171
CPXXCMXNWS TPXWC                                                                15

SEQ ID NO: 172       moltype = AA  length = 15
FEATURE              Location/Qualifiers
REGION               1..15
                     note = synthetic
MOD_RES          3
                 note = 1-naphthyl alanine
MOD_RES          4
                 note = D-arginine
MOD_RES          7
                 note = Homoarginine
MOD_RES          13
                 note = hydroxyproline
source           1..15
                 mol_type = protein
                 organism = synthetic construct
SEQUENCE: 172
CPXXCMXHWS TPXWC                                                                15

SEQ ID NO: 173       moltype = AA  length = 15
FEATURE              Location/Qualifiers
REGION               1..15
                     note = synthetic
MOD_RES          4
                 note = D-aspartic acid
MOD_RES          7
                 note = NMeHArg
source           1..15
                 mol_type = protein
                 organism = synthetic construct
SEQUENCE: 173
CPFXCMXNWS TPIWC                                                                15

SEQ ID NO: 174       moltype = AA  length = 15
FEATURE              Location/Qualifiers
REGION               1..15
                     note = synthetic
MOD_RES          4
                 note = D-aspartic acid
MOD_RES          7
                 note = Homoarginine
MOD_RES          8
                 note = NMeAsn
source           1..15
                 mol_type = protein
                 organism = synthetic construct
SEQUENCE: 174
CPFXCMXXWS TPIWC                                                                15

SEQ ID NO: 175       moltype = AA  length = 15
FEATURE              Location/Qualifiers
REGION               1..15
                     note = synthetic
MOD_RES          4
                 note = D-aspartic acid
MOD_RES          7
                 note = Homoarginine
MOD_RES          11
                 note = NMeThr
source           1..15
                 mol_type = protein
                 organism = synthetic construct
SEQUENCE: 175
CPFXCMXNWS XPIWC                                                                15

SEQ ID NO: 176       moltype = AA  length = 15
```

```
FEATURE              Location/Qualifiers
REGION               1..15
                     note = synthetic
MOD_RES              4
                     note = D-aspartic acid
MOD_RES              7
                     note = Homoarginine
MOD_RES              13
                     note = NMeIle
source               1..15
                     mol_type = protein
                     organism = synthetic construct
SEQUENCE: 176
CPFXCMXNWS TPXWC                                                              15

SEQ ID NO: 177       moltype = AA  length = 15
FEATURE              Location/Qualifiers
REGION               1..15
                     note = synthetic
MOD_RES              3
                     note = 1-Naphthylalanine
MOD_RES              4
                     note = D-aspartic acid
MOD_RES              7
                     note = Homoarginine
MOD_RES              8
                     note = Cysteic acid
MOD_RES              13
                     note = Hydroxyproline
source               1..15
                     mol_type = protein
                     organism = synthetic construct
SEQUENCE: 177
CPXXCMXXWS TPXWC                                                              15

SEQ ID NO: 178       moltype = AA  length = 15
FEATURE              Location/Qualifiers
REGION               1..15
                     note = synthetic
MOD_RES              3
                     note = 1-Naphthylalanine
MOD_RES              4
                     note = D-aspartic acid
MOD_RES              7
                     note = Cysteic acid
MOD_RES              13
                     note = Hydroxyproline
source               1..15
                     mol_type = protein
                     organism = synthetic construct
SEQUENCE: 178
CPXXCMXDWS TPXWC                                                              15

SEQ ID NO: 179       moltype = AA  length = 15
FEATURE              Location/Qualifiers
REGION               1..15
                     note = synthetic
MOD_RES              3
                     note = 1-Naphthylalanine
MOD_RES              4
                     note = DCya
MOD_RES              7
                     note = Homoarginine
MOD_RES              13
                     note = Hydroxyproline
source               1..15
                     mol_type = protein
                     organism = synthetic construct
SEQUENCE: 179
CPXXCMXDWS TPXWC                                                              15

SEQ ID NO: 180       moltype = AA  length = 15
FEATURE              Location/Qualifiers
REGION               1..15
                     note = synthetic
MOD_RES              3
                     note = 1-Naphthylalanine
MOD_RES              4
                     note = D-aspartic acid
```

```
MOD_RES          7
                 note = homoarginine
MOD_RES          13
                 note = Hydroxyproline
source           1..15
                 mol_type = protein
                 organism = synthetic construct
SEQUENCE: 180
CPXXCMXDWD TPXWC                                                              15

SEQ ID NO: 181   moltype = AA  length = 15
FEATURE          Location/Qualifiers
REGION           1..15
                 note = synthetic
MOD_RES          3
                 note = 2-Naphthylalanine
MOD_RES          4
                 note = D-aspartic acid
MOD_RES          7
                 note = Homoarginine
MOD_RES          13
                 note = Hydroxyproline
source           1..15
                 mol_type = protein
                 organism = synthetic construct
SEQUENCE: 181
CPXXCMXDWS TPXWC                                                              15

SEQ ID NO: 182   moltype = AA  length = 15
FEATURE          Location/Qualifiers
REGION           1..15
                 note = synthetic
MOD_RES          3
                 note = 1-Naphthylalanine
MOD_RES          4
                 note = D-aspartic acid
MOD_RES          7
                 note = Homoarginine
MOD_RES          13
                 note = Hydroxyproline
source           1..15
                 mol_type = protein
                 organism = synthetic construct
SEQUENCE: 182
CPXXCMXDWT TPXWC                                                              15

SEQ ID NO: 183   moltype = AA  length = 15
FEATURE          Location/Qualifiers
REGION           1..15
                 note = synthetic
MOD_RES          3
                 note = 1-Naphthylalanine
MOD_RES          4
                 note = D-aspartic acid
MOD_RES          7
                 note = Homoarginine
MOD_RES          10
                 note = HomoSerine
MOD_RES          13
                 note = Hydroxyproline
source           1..15
                 mol_type = protein
                 organism = synthetic construct
SEQUENCE: 183
CPXXCMXDWX TPXWC                                                              15

SEQ ID NO: 184   moltype = AA  length = 15
FEATURE          Location/Qualifiers
REGION           1..15
                 note = synthetic
MOD_RES          3
                 note = 1-Naphthylalanine
MOD_RES          4
                 note = D-aspartic acid
MOD_RES          7
                 note = Homoarginine
MOD_RES          10
                 note = D-serine
MOD_RES          13
```

```
                        note = Hydroxyproline
source                  1..15
                        mol_type = protein
                        organism = synthetic construct
SEQUENCE: 184
CPXXCMXDWX TPXWC                                                          15

SEQ ID NO: 185          moltype = AA  length = 15
FEATURE                 Location/Qualifiers
REGION                  1..15
                        note = synthetic
MOD_RES                 3
                        note = 1-Naphthylalanine
MOD_RES                 4
                        note = D-aspartic acid
MOD_RES                 7
                        note = Homoarginine
MOD_RES                 13
                        note = Hydroxyproline
source                  1..15
                        mol_type = protein
                        organism = synthetic construct
SEQUENCE: 185
CPXXCMXDWS SPXWC                                                          15

SEQ ID NO: 186          moltype = AA  length = 15
FEATURE                 Location/Qualifiers
REGION                  1..15
                        note = synthetic
MOD_RES                 3
                        note = 1-Naphthylalanine
MOD_RES                 4
                        note = D-aspartic acid
MOD_RES                 7
                        note = 2-Amino-4-guanidinobutyric acid
MOD_RES                 13
                        note = Hydroxyproline
source                  1..15
                        mol_type = protein
                        organism = synthetic construct
SEQUENCE: 186
CPXXCMXDWS TPXWC                                                          15

SEQ ID NO: 187          moltype = AA  length = 15
FEATURE                 Location/Qualifiers
REGION                  1..15
                        note = synthetic
MOD_RES                 3
                        note = 1-Naphthylalanine
MOD_RES                 4
                        note = D-aspartic acid
MOD_RES                 13
                        note = Hydroxyproline
source                  1..15
                        mol_type = protein
                        organism = synthetic construct
SEQUENCE: 187
CPXXCMPDWS TPXWC                                                          15

SEQ ID NO: 188          moltype = AA  length = 15
FEATURE                 Location/Qualifiers
REGION                  1..15
                        note = synthetic
MOD_RES                 3
                        note = 1-naphthyl alanine
MOD_RES                 4
                        note = D-aspartic acid
MOD_RES                 7
                        note = Hydroxyproline
MOD_RES                 13
                        note = Hydroxyproline
source                  1..15
                        mol_type = protein
                        organism = synthetic construct
SEQUENCE: 188
CPXXCMXDWS TPXWC                                                          15

SEQ ID NO: 189          moltype = AA  length = 15
FEATURE                 Location/Qualifiers
```

```
REGION                  1..15
                        note = synthetic
MOD_RES                 3
                        note = 1-naphthyl alanine
MOD_RES                 4
                        note = D-arginine
MOD_RES                 7
                        note = Homoarginine
MOD_RES                 13
                        note = Hydroxyproline
source                  1..15
                        mol_type = protein
                        organism = synthetic construct
SEQUENCE: 189
CPXXCMXDWS TPXWC                                                            15

SEQ ID NO: 190          moltype = AA  length = 15
FEATURE                 Location/Qualifiers
REGION                  1..15
                        note = synthetic
MOD_RES                 3
                        note = 1-Naphthylalanine
MOD_RES                 4
                        note = D-arginine
MOD_RES                 7
                        note = Homoarginine
MOD_RES                 13
                        note = Hydroxyproline
source                  1..15
                        mol_type = protein
                        organism = synthetic construct
SEQUENCE: 190
CPXXCMXDWD TPXWC                                                            15

SEQ ID NO: 191          moltype = AA  length = 15
FEATURE                 Location/Qualifiers
REGION                  1..15
                        note = synthetic
MOD_RES                 3
                        note = 2-Naphthylalanine
MOD_RES                 4
                        note = D-arginine
MOD_RES                 7
                        note = homoarginine
MOD_RES                 13
                        note = Hydroxyproline
source                  1..15
                        mol_type = protein
                        organism = synthetic construct
SEQUENCE: 191
CPXXCMXDWS TPXWC                                                            15

SEQ ID NO: 192          moltype = AA  length = 15
FEATURE                 Location/Qualifiers
REGION                  1..15
                        note = synthetic
MOD_RES                 3
                        note = 1-Naphthylalanine
MOD_RES                 4
                        note = D-arginine
MOD_RES                 7
                        note = homoarginine
MOD_RES                 13
                        note = Hydroxyproline
source                  1..15
                        mol_type = protein
                        organism = synthetic construct
SEQUENCE: 192
CPXXCMXDWT TPXWC                                                            15

SEQ ID NO: 193          moltype = AA  length = 15
FEATURE                 Location/Qualifiers
REGION                  1..15
                        note = synthetic
MOD_RES                 3
                        note = 1-Naphthylalanine
MOD_RES                 4
                        note = D-arginine
MOD_RES                 7
```

```
                              note = Homoarginine
MOD_RES                       10
                              note = Homoserine
MOD_RES                       13
                              note = Hydroxyproline
source                        1..15
                              mol_type = protein
                              organism = synthetic construct
SEQUENCE: 193
CPXXCMXDWX TPXWC                                                          15

SEQ ID NO: 194                moltype = AA  length = 15
FEATURE                       Location/Qualifiers
REGION                        1..15
                              note = synthetic
MOD_RES                       3
                              note = 1-Naphthylalanine
MOD_RES                       4
                              note = D-arginine
MOD_RES                       7
                              note = Homoarginine
MOD_RES                       10
                              note = D-serine
MOD_RES                       13
                              note = Hydroxyproline
source                        1..15
                              mol_type = protein
                              organism = synthetic construct
SEQUENCE: 194
CPXXCMXDWX TPXWC                                                          15

SEQ ID NO: 195                moltype = AA  length = 15
FEATURE                       Location/Qualifiers
REGION                        1..15
                              note = synthetic
MOD_RES                       3
                              note = 1-Naphthylalanine
MOD_RES                       4
                              note = D-arginine
MOD_RES                       7
                              note = Homoarginine
MOD_RES                       13
                              note = Hydroxyproline
source                        1..15
                              mol_type = protein
                              organism = synthetic construct
SEQUENCE: 195
CPXXCMXDWS SPXWC                                                          15

SEQ ID NO: 196                moltype = AA  length = 15
FEATURE                       Location/Qualifiers
REGION                        1..15
                              note = synthetic
MOD_RES                       3
                              note = 1-Naphthylalanine
MOD_RES                       4
                              note = D-arginine
MOD_RES                       7
                              note = 2-Amino-4-guanidinobutyric acid
MOD_RES                       13
                              note = Hydroxyproline
source                        1..15
                              mol_type = protein
                              organism = synthetic construct
SEQUENCE: 196
CPXXCMXDWS TPXWC                                                          15

SEQ ID NO: 197                moltype = AA  length = 15
FEATURE                       Location/Qualifiers
REGION                        1..15
                              note = synthetic
MOD_RES                       3
                              note = 1-Naphthylalanine
MOD_RES                       4
                              note = D-arginine
MOD_RES                       13
                              note = Hydroxyproline
source                        1..15
                              mol_type = protein
```

```
                          organism = synthetic construct
SEQUENCE: 197
CPXXCMPDWS TPXWC                                                       15

SEQ ID NO: 198            moltype = AA   length = 15
FEATURE                   Location/Qualifiers
REGION                    1..15
                          note = synthetic
MOD_RES                   3
                          note = 1-Naphthylalanine
MOD_RES                   4
                          note = D-arginine
MOD_RES                   7
                          note = Hydroxyproline
MOD_RES                   13
                          note = Hydroxyproline
source                    1..15
                          mol_type = protein
                          organism = synthetic construct
SEQUENCE: 198
CPXXCMXDWS TPXWC                                                       15

SEQ ID NO: 199            moltype = AA   length = 15
FEATURE                   Location/Qualifiers
REGION                    1..15
                          note = synthetic
MOD_RES                   3
                          note = 1-Naphthylalanine
MOD_RES                   4
                          note = D-aspartic acid
MOD_RES                   7
                          note = Homoarginine
source                    1..15
                          mol_type = protein
                          organism = synthetic construct
SEQUENCE: 199
CPXXCLXDWS TPIWC                                                       15

SEQ ID NO: 200            moltype = AA   length = 15
FEATURE                   Location/Qualifiers
REGION                    1..15
                          note = synthetic
MOD_RES                   3
                          note = 1-Naphthylalanine
MOD_RES                   4
                          note = D-aspartic acid
MOD_RES                   7
                          note = Homoarginine
MOD_RES                   13
                          note = Hydroxyproline
source                    1..15
                          mol_type = protein
                          organism = synthetic construct
SEQUENCE: 200
CPXXCLXDWS TPXWC                                                       15

SEQ ID NO: 201            moltype = AA   length = 15
FEATURE                   Location/Qualifiers
REGION                    1..15
                          note = synthetic
MOD_RES                   3
                          note = 1-Naphthylalanine
MOD_RES                   4
                          note = D-arginine
MOD_RES                   7
                          note = Homoarginine
MOD_RES                   13
                          note = Hydroxyproline
source                    1..15
                          mol_type = protein
                          organism = synthetic construct
SEQUENCE: 201
CPXXCLXDWS TPXWC                                                       15

SEQ ID NO: 202            moltype = AA   length = 15
FEATURE                   Location/Qualifiers
REGION                    1..15
                          note = synthetic
MOD_RES                   3
```

```
                           note = 1-Naphthylalanine
MOD_RES                    4
                           note = D-arginine
MOD_RES                    7
                           note = Homoarginine
MOD_RES                    13
                           note = Hydroxyproline
source                     1..15
                           mol_type = protein
                           organism = synthetic construct
SEQUENCE: 202
CPXXCLXHWS TPXWC                                                               15

SEQ ID NO: 203             moltype = AA   length = 15
FEATURE                    Location/Qualifiers
REGION                     1..15
                           note = synthetic
MOD_RES                    3
                           note = 1-Naphthylalanine
MOD_RES                    4
                           note = D-arginine
MOD_RES                    7
                           note = Homoarginine
source                     1..15
                           mol_type = protein
                           organism = synthetic construct
SEQUENCE: 203
CPXXCMXDWS TPIWC                                                               15

SEQ ID NO: 204             moltype = AA   length = 15
FEATURE                    Location/Qualifiers
REGION                     1..15
                           note = synthetic
VARIANT                    3
                           note =
                           F/3MePhe/4MePhe/HPhe/4,4-BPA/DOPA/Y/A/1-Nal/2-Nal/2Pal
VARIANT                    4
                           note = G/A/D/K/KAc/Lys(Ac)/F/E/Q/L/S/R/Cya
VARIANT                    6
                           note = absent/M/Met(O2)/Q/HGln/L/HLeu/Nle/K/I/tBuAla/HSe(Me)
MOD_RES                    7
                           note = Homoarginine
VARIANT                    8
                           note = N/NMeAsn/T/D/G/S/H/A/Thi/1,2,4-TriAz/4ThiAz/K/Cya
VARIANT                    13
                           note = I/NMeIle/A/Cha/Cpa/P/HyP/D/K/C5A/THP(O)/THP(SO2)
source                     1..15
                           mol_type = protein
                           organism = synthetic construct
SEQUENCE: 204
CPXXCXXXWS TPXWC                                                               15

SEQ ID NO: 205             moltype = AA   length = 15
FEATURE                    Location/Qualifiers
REGION                     1..15
                           note = synthetic
VARIANT                    3
                           note = F/1-Nal
VARIANT                    4
                           note = dD/dR
VARIANT                    6
                           note = M/L
MOD_RES                    7
                           note = Homoarginine
VARIANT                    8
                           note = N/H/D
VARIANT                    13
                           note = I/P/HyP
source                     1..15
                           mol_type = protein
                           organism = synthetic construct
SEQUENCE: 205
CPXXCXXXWS TPXWC                                                               15

SEQ ID NO: 206             moltype =    length =
SEQUENCE: 206
000

SEQ ID NO: 207             moltype = AA   length = 15
```

```
                                -continued

FEATURE           Location/Qualifiers
REGION            1..15
                  note = synthetic
MOD_RES           3
                  note = 1-Naphthylalanine
VARIANT           4
                  note = D/Cya
VARIANT           7
                  note = HArg/Cya
VARIANT           8
                  note = D/Cya
MOD_RES           13
                  note = Hydroxyproline
source            1..15
                  mol_type = protein
                  organism = synthetic construct
SEQUENCE: 207
CPXXCMXXWS TPXWC                                                    15

SEQ ID NO: 208    moltype = AA  length = 15
FEATURE           Location/Qualifiers
REGION            1..15
                  note = synthetic
MOD_RES           3
                  note = 1-Naphthylalanine
MOD_RES           4
                  note = DCya
MOD_RES           7
                  note = Cysteic acid
MOD_RES           13
                  note = 1-Naphthylalanine
source            1..15
                  mol_type = protein
                  organism = synthetic construct
SEQUENCE: 208
CPXXCMXDWS TPXWC                                                    15

SEQ ID NO: 209    moltype = AA  length = 15
FEATURE           Location/Qualifiers
REGION            1..15
                  note = synthetic
MOD_RES           3
                  note = 1-Naphthylalanine
MOD_RES           4
                  note = DCya
MOD_RES           7
                  note = Homoarginine
MOD_RES           8
                  note = Cysteic acid
MOD_RES           13
                  note = Hydroxyproline
source            1..15
                  mol_type = protein
                  organism = synthetic construct
SEQUENCE: 209
CPXXCMXXWS TPXWC                                                    15

SEQ ID NO: 210    moltype = AA  length = 15
FEATURE           Location/Qualifiers
REGION            1..15
                  note = synthetic
MOD_RES           3
                  note = 1-Naphthylalanine
MOD_RES           4
                  note = D-aspartic acid
MOD_RES           7
                  note = Cysteic acid
MOD_RES           8
                  note = Cysteic acid
MOD_RES           13
                  note = Hydroxyproline
source            1..15
                  mol_type = protein
                  organism = synthetic construct
SEQUENCE: 210
CPXXCMXXWS TPXWC                                                    15

SEQ ID NO: 211    moltype = AA  length = 15
FEATURE           Location/Qualifiers
```

| | | |
|---|---|---|
| REGION | 1..15 | |
| | note = synthetic | |
| MOD_RES | 3 | |
| | note = 1-naphthylalanine | |
| MOD_RES | 4 | |
| | note = D-lysine | |
| MOD_RES | 7 | |
| | note = Homoarginine | |
| MOD_RES | 13 | |
| | note = hydroxyproline | |
| source | 1..15 | |
| | mol_type = protein | |
| | organism = synthetic construct | |
| SEQUENCE: 211 | | |
| CPXXCMXDWS TPXWC | | 15 |
| | | |
| SEQ ID NO: 212 | moltype = AA  length = 15 | |
| FEATURE | Location/Qualifiers | |
| REGION | 1..15 | |
| | note = synthetic | |
| MOD_RES | 3 | |
| | note = 1-naphthylalanine | |
| MOD_RES | 4 | |
| | note = D-aspartic acid | |
| MOD_RES | 13 | |
| | note = hydroxyproline | |
| source | 1..15 | |
| | mol_type = protein | |
| | organism = synthetic construct | |
| SEQUENCE: 212 | | |
| CPXXCMKDWS TPXWC | | 15 |
| | | |
| SEQ ID NO: 213 | moltype = AA  length = 15 | |
| FEATURE | Location/Qualifiers | |
| REGION | 1..15 | |
| | note = synthetic | |
| VARIANT | 3 | |
| | note = F/3MePhe/4MePhe/HPhe/4,4-BPA/DOPA/Y/A/1-Nal/2-Nal/2Pal | |
| VARIANT | 4 | |
| | note = G/A/D/K/KAc/F/E/Q/L/S/R/Cya | |
| VARIANT | 6 | |
| | note = absent/M/Met(O2)/Q/HGln/L/HLeu/Nle/K/I/tBuAla/HSe(Me) | |
| VARIANT | 7 | |
| | note = HArg/K | |
| VARIANT | 8 | |
| | note = N/NMeAsn/T/D/G/S/H/A/Thi/1,2,4-TriAz/4ThiAz/K/Cya | |
| VARIANT | 13 | |
| | note = I/NMeIle/A/Cha/Cpa/P/HyP/D/K/C5A/THP(O)/THP(SO2) | |
| source | 1..15 | |
| | mol_type = protein | |
| | organism = synthetic construct | |
| SEQUENCE: 213 | | |
| CPXXCXXXWS TPXWC | | 15 |
| | | |
| SEQ ID NO: 214 | moltype = AA  length = 15 | |
| FEATURE | Location/Qualifiers | |
| REGION | 1..15 | |
| | note = synthetic | |
| VARIANT | 3 | |
| | note = F/1-Nal | |
| VARIANT | 4 | |
| | note = dD/dR | |
| VARIANT | 6 | |
| | note = M/L | |
| VARIANT | 7 | |
| | note = HArg/K | |
| VARIANT | 8 | |
| | note = N/H/D | |
| VARIANT | 13 | |
| | note = I/P/HyP | |
| source | 1..15 | |
| | mol_type = protein | |
| | organism = synthetic construct | |
| SEQUENCE: 214 | | |
| CPXXCXXXWS TPXWC | | 15 |
| | | |
| SEQ ID NO: 215 | moltype = AA  length = 15 | |
| FEATURE | Location/Qualifiers | |

```
REGION                  1..15
                        note = synthetic
MOD_RES                 3
                        note = 1-naphthylalanine
MOD_RES                 4
                        note = D-aspartic acid
MOD_RES                 7
                        note = homoarginine
MOD_RES                 9
                        note = D-tryptophan
MOD_RES                 13
                        note = hydroxyproline
MOD_RES                 14
                        note = D-tryptophan
source                  1..15
                        mol_type = protein
                        organism = synthetic construct
SEQUENCE: 215
CPXXCMXDXS TPXXC                                                         15

SEQ ID NO: 216          moltype = AA   length = 15
FEATURE                 Location/Qualifiers
REGION                  1..15
                        note = synthetic
MOD_RES                 7
                        note = Homoarginine
MOD_RES                 13
                        note = hydroxyproline
source                  1..15
                        mol_type = protein
                        organism = synthetic construct
SEQUENCE: 216
CPFGCMXDWS TPXWC                                                         15

SEQ ID NO: 217          moltype = AA   length = 18
FEATURE                 Location/Qualifiers
REGION                  1..18
                        note = synthetic
MOD_RES                 18
                        note = Sar6-K(Fl)
source                  1..18
                        mol_type = protein
                        organism = synthetic construct
SEQUENCE: 217
ACPFGCHTDW SWPIWCAX                                                      18

SEQ ID NO: 218          moltype = AA   length = 15
FEATURE                 Location/Qualifiers
source                  1..15
                        mol_type = protein
                        organism = synthetic construct
VARIANT                 1
                        note = X is independently cysteine or an amino acid
                         isosteric and isoelectronic with cysteine
VARIANT                 5
                        note = X is independently cysteine or an amino acid
                         isosteric and isoelectronic with cysteine
VARIANT                 15
                        note = X is independently cysteine or an amino acid
                         isosteric and isoelectronic with cysteine
MOD_RES                 3
                        note = X is 1-naphthyalanine
SITE                    4
                        note = D-Aspartic acid
MOD_RES                 7
                        note = X is homoarginine
MOD_RES                 13
                        note = X is hydroxyproline
SEQUENCE: 218
XPXDXMXDWS TPXWX                                                         15
```